US011418699B1

(12) United States Patent
Manzari et al.

(10) Patent No.: US 11,418,699 B1
(45) Date of Patent: Aug. 16, 2022

(54) USER INTERFACES FOR ALTERING VISUAL MEDIA

(71) Applicant: Apple Inc., Cupertino, CA (US)

(72) Inventors: Behkish J. Manzari, San Francisco, CA (US); Graham R. Clarke, Scotts Valley, CA (US); Toke Jansen, Cupertino, CA (US); Joseph A. Malia, San Francisco, CA (US); Andre Souza Dos Santos, San Jose, CA (US); William A. Sorrentino, III, Mill Valley, CA (US); Saumitro Dasgupta, Redwood City, CA (US); Mikko Berggren Ettienne, Ballerup (DK); Wayne Loofbourrow, San Jose, CA (US); Seyyedhossein Mousavi, Cupertino, CA (US); Jens Jacob Pallisgaard, Santa Clara, CA (US); Paul Thomas Schneider, Palo Alto, CA (US); Joshua Blake Shagam, Redwood City, CA (US); Piotr J. Stanczyk, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/484,279

(22) Filed: Sep. 24, 2021

Related U.S. Application Data

(60) Provisional application No. 63/244,213, filed on Sep. 14, 2021, provisional application No. 63/243,724,
(Continued)

(51) Int. Cl.

| | |
|---|---|
| ***H04N 5/232*** | (2006.01) |
| ***G06F 3/04883*** | (2022.01) |
| ***G06F 3/04842*** | (2022.01) |

(52) U.S. Cl.
CPC ... *H04N 5/232125* (2018.08); *G06F 3/04842* (2013.01); *G06F 3/04883* (2013.01);
(Continued)

(58) Field of Classification Search
CPC ....... H04N 5/232125; H04N 5/232127; H04N 5/23229; H04N 5/23293; G06F 3/04842; G06F 3/04883
See application file for complete search history.

(56) References Cited

U.S. PATENT DOCUMENTS 4,518,237 A 5/1985 Mizokami
4,933,702 A 6/1990 Komatsuzaki et al.
(Continued)

FOREIGN PATENT DOCUMENTS

AU 2013368443 B2 3/2016
AU 2017100683 B4 1/2018
(Continued)

OTHER PUBLICATIONS

Applicant Initiated Interview Summary received for U.S. Appl. No. 17/190,879, dated Oct. 26, 2021, 3 pages.
(Continued)

*Primary Examiner* — Padma Haliyur
(74) *Attorney, Agent, or Firm* — Dentons US LLP

(57) ABSTRACT

The present disclosure generally relates to user interfaces for altering visual media. In some embodiments, user interfaces capturing visual media (e.g., via a synthetic depth-of-field effect), playing back visual media (e.g., via a synthetic depth-of-field effect), editing visual media (e.g., that has a synthetic depth-of-field effect applied), and/or managing media capture.

84 Claims, 87 Drawing Sheets

Related U.S. Application Data filed on Sep. 13, 2021, provisional application No. 63/197,460, filed on Jun. 6, 2021, provisional application No. 63/182,751, filed on Apr. 30, 2021.

(52) U.S. Cl.
CPC ... *H04N 5/23229* (2013.01); *H04N 5/232127* (2018.08); *H04N 5/232933* (2018.08)

(56) References Cited

U.S. PATENT DOCUMENTS 5,463,443 A 10/1995 Tanaka et al.
5,557,358 A 9/1996 Mukai et al.
5,615,384 A 3/1997 Allard et al.
6,262,769 B1 7/2001 Anderson et al.
6,268,864 B1 7/2001 Chen et al.
6,278,466 B1 8/2001 Chen
6,621,524 B1 9/2003 Iijima et al.
6,677,981 B1 1/2004 Mancuso et al.
6,900,840 B1 5/2005 Schinner et al.
6,901,561 B1 5/2005 Kirkpatrick et al.
7,515,178 B1 4/2009 Fleischman et al.
7,583,892 B2 9/2009 Okumura
8,185,839 B2 5/2012 Jalon et al.
8,295,546 B2 10/2012 Craig et al.
8,379,098 B2 2/2013 Rottier et al.
8,405,680 B1 3/2013 Gomes et al.
8,423,089 B2 4/2013 Song et al.
8,493,408 B2 7/2013 Williamson et al.
8,576,304 B2 11/2013 Ishibashi
8,638,371 B2 1/2014 Laberge et al.
8,723,988 B2 5/2014 Thorn
8,736,704 B2 5/2014 Jasinski et al.
8,736,716 B2 5/2014 Prentice
8,848,097 B2 9/2014 Makii
8,885,978 B2 11/2014 Cote et al.
8,896,652 B2 11/2014 Ralston
9,001,226 B1 4/2015 Ng et al.
9,094,576 B1 7/2015 Karakotsios
9,153,031 B2 10/2015 El-saban et al.
9,207,837 B2 12/2015 Paretti et al.
9,223,486 B2 12/2015 Shin et al.
9,230,241 B1 1/2016 Singh et al.
9,230,355 B1 1/2016 Ahuja et al.
9,245,177 B2 1/2016 Perez
9,246,961 B2 1/2016 Walkin et al.
9,250,797 B2 2/2016 Roberts et al.
9,264,660 B1 2/2016 Petterson et al.
9,288,476 B2 3/2016 Sandrew et al.
9,298,263 B2 3/2016 Geisner et al.
9,313,397 B2 4/2016 Harris et al.
9,313,401 B2 4/2016 Frey et al.
9,342,230 B2 5/2016 Bastien et al.
9,349,414 B1 5/2016 Furment et al.
9,360,671 B1 6/2016 Zhou
9,448,708 B1 9/2016 Bennett et al.
9,467,812 B2 10/2016 Jung et al.
9,544,563 B1 1/2017 Cheng et al.
9,592,428 B2 3/2017 Binder
9,602,559 B1 3/2017 Barros et al.
9,609,221 B2 3/2017 Kim et al.
9,628,416 B2 4/2017 Henderson
9,667,881 B2 5/2017 Harris et al.
9,686,497 B1 6/2017 Terry
9,704,250 B1 7/2017 Gilmour et al.
9,716,825 B1 7/2017 Manzari et al.
9,767,613 B1 9/2017 Bedikian et al.
9,819,912 B2 11/2017 Maruta
9,948,589 B2 4/2018 Gonnen et al.
10,021,294 B2 7/2018 Kwon et al.
10,055,887 B1 8/2018 Gil et al.
10,091,411 B2 10/2018 Ha et al.
10,095,385 B2 10/2018 Walkin et al.
10,152,222 B2 12/2018 Ozawa et al.
10,176,622 B1 1/2019 Waggoner et al.
10,187,587 B2 1/2019 Hasinoff et al.
10,225,463 B2 3/2019 Yun et al.
10,230,901 B2 3/2019 Harris et al.
10,270,983 B1 4/2019 Van Os et al.
10,289,265 B2 5/2019 Kulkarni
10,297,034 B2 5/2019 Nash et al.
10,304,231 B2 5/2019 Saito
10,313,652 B1 6/2019 Falstrup et al.
10,326,942 B2 6/2019 Shabtay et al.
10,375,313 B1 8/2019 Van Os et al.
10,379,719 B2 8/2019 Scapel et al.
10,397,469 B1 8/2019 Yan et al.
10,397,500 B1 8/2019 Xu et al.
10,447,908 B2 10/2019 Lee et al.
10,467,729 B1 11/2019 Perera et al.
10,467,775 B1 11/2019 Waggoner et al.
10,521,091 B2 12/2019 Anzures et al.
10,521,948 B2 12/2019 Rickwald et al.
10,523,879 B2 12/2019 Dye et al.
10,574,895 B2 2/2020 Lee et al.
10,585,551 B2 3/2020 Lee et al.
10,614,139 B2 4/2020 Fujioka et al.
10,638,058 B2 * 4/2020 Matsunaga ...... H04N 5/232127
10,645,294 B1 5/2020 Manzari et al.
10,652,470 B1 5/2020 Manzari et al.
10,657,695 B2 5/2020 Chand et al.
10,659,405 B1 5/2020 Chang et al.
10,674,072 B1 6/2020 Manzari et al.
10,681,282 B1 6/2020 Manzari et al.
10,698,575 B2 6/2020 Walkin et al.
10,798,035 B2 10/2020 Lewis et al.
10,845,968 B2 11/2020 Scapel et al.
10,902,661 B1 1/2021 Mourkogiannis et al.
10,958,850 B2 3/2021 Kwak et al.
11,039,074 B1 6/2021 Manzari et al.
11,054,973 B1 7/2021 Manzari et al.
11,212,449 B1 12/2021 Manzari et al.
2002/0070945 A1 6/2002 Kage
2002/0167604 A1 11/2002 Ban et al.
2003/0001827 A1 1/2003 Gould et al.
2003/0025812 A1 2/2003 Slatter et al.
2003/0107664 A1 6/2003 Suzuki
2003/0122930 A1 7/2003 Schofield et al.
2003/0174216 A1 9/2003 Iguchi et al.
2004/0041924 A1 3/2004 White et al.
2004/0061796 A1 4/2004 Honda et al.
2004/0201699 A1 10/2004 Parulski et al.
2005/0189419 A1 9/2005 Igarashi et al.
2005/0206981 A1 9/2005 Hung
2005/0248660 A1 11/2005 Stavely et al.
2005/0270397 A1 12/2005 Battles
2006/0033831 A1 2/2006 Ejima et al.
2006/0132482 A1 6/2006 Oh et al.
2006/0158730 A1 7/2006 Kira
2006/0170791 A1 8/2006 Porter et al.
2006/0187322 A1 8/2006 Janson et al.
2006/0209067 A1 9/2006 Pellacini et al.
2006/0228040 A1 10/2006 Simon et al.
2007/0024614 A1 2/2007 Tam et al.
2007/0025723 A1 2/2007 Baudisch et al.
2007/0031062 A1 2/2007 Pal et al.
2007/0097088 A1 5/2007 Battles
2007/0113099 A1 5/2007 Takikawa et al.
2007/0140675 A1 6/2007 Yanagi et al.
2007/0153112 A1 7/2007 Ueda et al.
2007/0228259 A1 10/2007 Hohenberger
2007/0257992 A1 11/2007 Kato
2007/0273769 A1 11/2007 Takahashi
2007/0291152 A1 12/2007 Suekane et al.
2008/0030592 A1 2/2008 Border et al.
2008/0084484 A1 4/2008 Ochi et al.
2008/0106601 A1 5/2008 Matsuda
2008/0129759 A1 6/2008 Jeon et al.
2008/0129825 A1 6/2008 Deangelis et al.
2008/0143840 A1 6/2008 Corkum et al.
2008/0192020 A1 8/2008 Kang et al.
2008/0218611 A1 9/2008 Parulski et al.
2008/0222558 A1 9/2008 Cho et al.
2008/0298571 A1 12/2008 Kurtz et al.

(56) References Cited

U.S. PATENT DOCUMENTS

2008/0309811 A1 12/2008 Fujinawa et al.
2009/0009612 A1 1/2009 Tico et al.
2009/0021576 A1 1/2009 Linder et al.
2009/0021600 A1 1/2009 Watanabe
2009/0022422 A1 1/2009 Sorek et al.
2009/0027515 A1 1/2009 Maruyama et al.
2009/0027539 A1 1/2009 Kunou
2009/0040332 A1 2/2009 Yoshino et al.
2009/0046097 A1 2/2009 Franklin
2009/0051783 A1 2/2009 Kim et al.
2009/0066817 A1 3/2009 Sakamaki
2009/0073285 A1 3/2009 Terashima
2009/0102918 A1 4/2009 Sakamoto et al.
2009/0109316 A1 4/2009 Matsui
2009/0144639 A1 6/2009 Nims et al.
2009/0167671 A1 7/2009 Kerofsky
2009/0167672 A1 7/2009 Kerofsky
2009/0167890 A1 7/2009 Nakagomi et al.
2009/0175511 A1 7/2009 Lee et al.
2009/0244318 A1 10/2009 Makii
2009/0251484 A1 10/2009 Zhao et al.
2009/0263044 A1 10/2009 Imagawa et al.
2009/0322901 A1 12/2009 Subbotin et al.
2010/0020221 A1 1/2010 Tupman et al.
2010/0020222 A1 1/2010 Jones et al.
2010/0033615 A1 2/2010 Mori
2010/0039522 A1 2/2010 Huang
2010/0066853 A1 3/2010 Aoki et al.
2010/0066889 A1 3/2010 Ueda et al.
2010/0066890 A1 3/2010 Ueda et al.
2010/0066895 A1 3/2010 Ueda et al.
2010/0093400 A1 4/2010 Ju et al.
2010/0123737 A1 5/2010 Williamson et al.
2010/0124941 A1 5/2010 Cho
2010/0141786 A1 6/2010 Bigioi et al.
2010/0141787 A1 6/2010 Bigioi et al.
2010/0153847 A1 6/2010 Fama
2010/0164893 A1 7/2010 Shin et al.
2010/0188426 A1 7/2010 Ohmori et al.
2010/0194931 A1 8/2010 Kawaguchi et al.
2010/0208122 A1 8/2010 Yumiki
2010/0231777 A1 9/2010 Shintani et al.
2010/0232703 A1 9/2010 Aiso
2010/0238327 A1 9/2010 Griffith et al.
2010/0259645 A1 10/2010 Kaplan et al.
2010/0277470 A1 11/2010 Margolis
2010/0283743 A1 11/2010 Coddington
2010/0289825 A1 11/2010 Shin et al.
2010/0302280 A1 12/2010 Szeliski et al.
2010/0317410 A1 12/2010 Song et al.
2011/0008033 A1 1/2011 Ichimiya et al.
2011/0013049 A1 1/2011 Thörn
2011/0018970 A1 1/2011 Wakabayashi
2011/0019058 A1 1/2011 Sakai et al.
2011/0072394 A1 3/2011 Victor et al.
2011/0074710 A1 3/2011 Weeldreyer et al.
2011/0074830 A1 3/2011 Rapp et al.
2011/0090155 A1 4/2011 Caskey et al.
2011/0109581 A1 5/2011 Ozawa et al.
2011/0138332 A1 6/2011 Miyagawa
2011/0157379 A1 6/2011 Kimura
2011/0176039 A1 7/2011 Lo
2011/0187879 A1 8/2011 Ochiai
2011/0199495 A1 8/2011 Laberge et al.
2011/0221755 A1 9/2011 Geisner et al.
2011/0242369 A1 10/2011 Misawa et al.
2011/0249073 A1 10/2011 Cranfill et al.
2011/0249078 A1 10/2011 Abuan et al.
2011/0258537 A1 10/2011 Rives et al.
2011/0296163 A1 12/2011 Abernethy et al.
2011/0304632 A1 12/2011 Evertt et al.
2012/0002898 A1 1/2012 Côté et al.
2012/0026378 A1 2/2012 Pang et al.
2012/0056997 A1 3/2012 Jang
2012/0069028 A1 3/2012 Bouguerra
2012/0106790 A1 5/2012 Sultana et al.
2012/0127346 A1 5/2012 Sato et al.
2012/0133797 A1 5/2012 Sato et al.
2012/0162242 A1 6/2012 Amano et al.
2012/0169776 A1 7/2012 Rissa et al.
2012/0188394 A1 7/2012 Park et al.
2012/0194559 A1 8/2012 Lim
2012/0206452 A1 8/2012 Geisner et al.
2012/0206621 A1 8/2012 Chen et al.
2012/0235990 A1 9/2012 Yamaji
2012/0243802 A1 9/2012 Fintel et al.
2012/0274830 A1 11/2012 Kameyama et al.
2012/0293611 A1 11/2012 Lee
2012/0309520 A1 12/2012 Evertt et al.
2013/0010170 A1 1/2013 Matsuzawa et al.
2013/0038546 A1 2/2013 Mineo
2013/0055119 A1 2/2013 Luong
2013/0076908 A1 3/2013 Bratton et al.
2013/0083222 A1 4/2013 Matsuzawa et al.
2013/0088413 A1 4/2013 Raffle et al.
2013/0101164 A1 4/2013 Leclerc et al.
2013/0135315 A1 5/2013 Bares et al.
2013/0141362 A1 6/2013 Asanuma et al.
2013/0141513 A1 6/2013 Setton et al.
2013/0147933 A1 6/2013 Kulas et al.
2013/0155308 A1 6/2013 Wu et al.
2013/0159900 A1 6/2013 Pendharkar
2013/0165186 A1 6/2013 Choi
2013/0179831 A1 7/2013 Izaki
2013/0194378 A1 8/2013 Brown
2013/0201104 A1 8/2013 Ptucha et al.
2013/0201307 A1 8/2013 Schloter et al.
2013/0210563 A1 8/2013 Hollinger
2013/0222663 A1 8/2013 Rydenhag et al.
2013/0239057 A1 9/2013 Ubillos et al.
2013/0246948 A1 9/2013 Chen et al.
2013/0265467 A1 10/2013 Matsuzawa et al.
2013/0290905 A1 10/2013 Luvogt et al.
2013/0346916 A1 12/2013 Williamson et al.
2014/0009639 A1 1/2014 Lee
2014/0022399 A1 1/2014 Rashid et al.
2014/0028872 A1 1/2014 Lee et al.
2014/0028885 A1 1/2014 Ma et al.
2014/0033043 A1 1/2014 Kashima
2014/0033100 A1 1/2014 Noda et al.
2014/0037178 A1 2/2014 Park
2014/0043368 A1 2/2014 Yu
2014/0043517 A1 2/2014 Yim et al.
2014/0047389 A1 2/2014 Aarabi
2014/0049536 A1 2/2014 Neuman et al.
2014/0055554 A1 2/2014 Du et al.
2014/0063175 A1 3/2014 Jafry et al.
2014/0063313 A1 3/2014 Choi et al.
2014/0071061 A1 3/2014 Lin et al.
2014/0071325 A1 3/2014 Kawahara et al.
2014/0092272 A1 4/2014 Choi
2014/0095122 A1 4/2014 Appleman et al.
2014/0118563 A1 5/2014 Mehta et al.
2014/0132735 A1 5/2014 Lee et al.
2014/0152886 A1 6/2014 Morgan-Mar et al.
2014/0176469 A1 6/2014 Lim
2014/0176565 A1 6/2014 Adeyoola et al.
2014/0192233 A1 7/2014 Kakkori et al.
2014/0218371 A1 8/2014 Du et al.
2014/0232838 A1 8/2014 Jorgensen et al.
2014/0240471 A1 8/2014 Srinivasa et al.
2014/0240531 A1 8/2014 Nakai et al.
2014/0267126 A1 9/2014 Åberg et al.
2014/0267867 A1 9/2014 Lee et al.
2014/0281983 A1 9/2014 Xian et al.
2014/0282223 A1 9/2014 Bastien et al.
2014/0285698 A1 9/2014 Geiss
2014/0300635 A1 10/2014 Suzuki
2014/0300779 A1 10/2014 Yeo et al.
2014/0327639 A1 11/2014 Papakipos et al.
2014/0333671 A1 11/2014 Phang et al.
2014/0333824 A1 11/2014 Xiu
2014/0351753 A1 11/2014 Shin et al.
2014/0354845 A1 12/2014 Mølgaard et al.

(56) References Cited

U.S. PATENT DOCUMENTS

2014/0359438 A1 12/2014 Matsuki
2014/0362091 A1 12/2014 Bouaziz et al.
2014/0362274 A1 12/2014 Christie et al.
2014/0368601 A1 12/2014 Decharms
2014/0368719 A1 12/2014 Kaneko et al.
2014/0372856 A1 12/2014 Radakovitz et al.
2015/0033192 A1 1/2015 Bohannon et al.
2015/0035825 A1 2/2015 Zhou et al.
2015/0042852 A1 2/2015 Lee et al.
2015/0043806 A1 2/2015 Sunkavalli et al.
2015/0058754 A1 2/2015 Rauh
2015/0067513 A1 3/2015 Zambetti et al.
2015/0070362 A1 3/2015 Hirai
2015/0078621 A1 3/2015 Choi et al.
2015/0078726 A1 3/2015 Shakib et al.
2015/0085174 A1 3/2015 Shabtay et al.
2015/0092077 A1 4/2015 Feder et al.
2015/0109417 A1 4/2015 Zirnheld
2015/0116353 A1 4/2015 Miura et al.
2015/0116448 A1 4/2015 Gottlieb
2015/0135109 A1 5/2015 Zambetti et al.
2015/0135234 A1 5/2015 Hall
2015/0138079 A1 5/2015 Lannsjö
2015/0145950 A1 5/2015 Murphy et al.
2015/0146079 A1 5/2015 Kim
2015/0149927 A1 5/2015 Walkin et al.
2015/0150141 A1 5/2015 Szymanski et al.
2015/0154448 A1 6/2015 Murayama et al.
2015/0172534 A1 6/2015 Miyakawa et al.
2015/0181135 A1 6/2015 Shimosato
2015/0189138 A1 7/2015 Xie et al.
2015/0194186 A1 7/2015 Lee et al.
2015/0208001 A1 7/2015 Nonaka et al.
2015/0212723 A1 7/2015 Lim et al.
2015/0220249 A1 8/2015 Snibbe et al.
2015/0248198 A1 9/2015 Somlai-Fisher et al.
2015/0248583 A1 9/2015 Sekine et al.
2015/0249775 A1 9/2015 Jacumet
2015/0249785 A1 9/2015 Mehta et al.
2015/0254855 A1 9/2015 Patankar et al.
2015/0256749 A1 9/2015 Frey et al.
2015/0277686 A1 10/2015 Laforge et al.
2015/0286724 A1 10/2015 Knaapen et al.
2015/0289104 A1 10/2015 Jung et al.
2015/0301731 A1 10/2015 Okamoto et al.
2015/0310583 A1 10/2015 Hume et al.
2015/0312182 A1 10/2015 Langholz
2015/0312184 A1 10/2015 Langholz et al.
2015/0312185 A1 10/2015 Langholz et al.
2015/0334075 A1 11/2015 Wang et al.
2015/0334291 A1 11/2015 Cho et al.
2015/0341536 A1 11/2015 Huang et al.
2015/0350141 A1 12/2015 Yang et al.
2015/0350533 A1 12/2015 Harris et al.
2015/0362998 A1 12/2015 Park et al.
2015/0370458 A1 12/2015 Chen
2016/0012567 A1 1/2016 Siddiqui et al.
2016/0026371 A1 1/2016 Lu et al.
2016/0044236 A1 2/2016 Matsuzawa et al.
2016/0048598 A1 2/2016 Fujioka et al.
2016/0048599 A1 2/2016 Fujioka et al.
2016/0048725 A1 2/2016 Holz et al.
2016/0048903 A1 2/2016 Fujioka et al.
2016/0050169 A1 2/2016 Ben Atar et al.
2016/0050351 A1 2/2016 Lee et al.
2016/0050446 A1 2/2016 Fujioka et al.
2016/0065832 A1 3/2016 Kim et al.
2016/0065861 A1 3/2016 Steinberg et al.
2016/0077725 A1 3/2016 Maeda
2016/0080639 A1 3/2016 Choi et al.
2016/0088280 A1 3/2016 Sadi et al.
2016/0092035 A1 3/2016 Crocker et al.
2016/0098094 A1* 4/2016 Minkkinen ......... G06F 3/04883
345/156
2016/0117829 A1 4/2016 Yoon et al.
2016/0127636 A1 5/2016 Ito et al.
2016/0132200 A1 5/2016 Walkin et al.
2016/0132201 A1 5/2016 Shaw et al.
2016/0142649 A1 5/2016 Yim
2016/0148384 A1 5/2016 Bud et al.
2016/0162039 A1 6/2016 Eilat et al.
2016/0163084 A1 6/2016 Corazza et al.
2016/0173869 A1 6/2016 Srikanth et al.
2016/0188181 A1 6/2016 Smith
2016/0212319 A1 7/2016 Harris et al.
2016/0217601 A1 7/2016 Tsuda et al.
2016/0219217 A1 7/2016 Williams et al.
2016/0225175 A1 8/2016 Kim et al.
2016/0226926 A1 8/2016 Singh et al.
2016/0227016 A1 8/2016 Kim et al.
2016/0247309 A1 8/2016 Li et al.
2016/0255268 A1 9/2016 Kang et al.
2016/0259413 A1 9/2016 Anzures et al.
2016/0259497 A1 9/2016 Bauer et al.
2016/0259498 A1 9/2016 Foss et al.
2016/0259499 A1 9/2016 Kocienda et al.
2016/0259518 A1 9/2016 King et al.
2016/0259519 A1 9/2016 Foss et al.
2016/0259527 A1 9/2016 Kocienda et al.
2016/0259528 A1 9/2016 Foss et al.
2016/0267067 A1 9/2016 Mays et al.
2016/0283097 A1 9/2016 Voss et al.
2016/0284123 A1 9/2016 Hare et al.
2016/0307324 A1 10/2016 Higuchi et al.
2016/0337570 A1 11/2016 Tan et al.
2016/0337582 A1 11/2016 Shimauchi et al.
2016/0353030 A1 12/2016 Tang et al.
2016/0357353 A1 12/2016 Miura et al.
2016/0357387 A1 12/2016 Vet et al.
2016/0360097 A1 12/2016 Penha et al.
2016/0360116 A1 12/2016 Penha et al.
2016/0366323 A1 12/2016 Chen et al.
2016/0366344 A1 12/2016 Pan et al.
2016/0370974 A1 12/2016 Stenneth
2016/0373650 A1 12/2016 Kim et al.
2017/0011773 A1 1/2017 Lee
2017/0013179 A1 1/2017 Kang et al.
2017/0018289 A1 1/2017 Morgenstern
2017/0019604 A1 1/2017 Kim et al.
2017/0024872 A1 1/2017 Olsson et al.
2017/0026565 A1 1/2017 Hong et al.
2017/0034449 A1 2/2017 Eum et al.
2017/0039686 A1 2/2017 Miura et al.
2017/0041677 A1 2/2017 Anderson et al.
2017/0046065 A1 2/2017 Zeng et al.
2017/0048450 A1 2/2017 Lee et al.
2017/0048461 A1 2/2017 Lee et al.
2017/0048494 A1 2/2017 Boyle et al.
2017/0054960 A1 2/2017 Chien et al.
2017/0061635 A1 3/2017 Petrovich et al.
2017/0094019 A1 3/2017 Ahmed et al.
2017/0109912 A1 4/2017 Lee et al.
2017/0111567 A1 4/2017 Pila
2017/0111616 A1 4/2017 Li et al.
2017/0178287 A1 6/2017 Anderson
2017/0186162 A1 6/2017 Mihic et al.
2017/0220212 A1 8/2017 Yang et al.
2017/0230576 A1 8/2017 Sparks et al.
2017/0230585 A1 8/2017 Nash et al.
2017/0237888 A1 8/2017 Harris et al.
2017/0243389 A1 8/2017 Wild et al.
2017/0244896 A1 8/2017 Chien et al.
2017/0244897 A1 8/2017 Jung et al.
2017/0257596 A1 9/2017 Murata et al.
2017/0264817 A1 9/2017 Yan et al.
2017/0272654 A1 9/2017 Poindexter, Jr.
2017/0285764 A1 10/2017 Kim et al.
2017/0287220 A1 10/2017 Khalid et al.
2017/0302840 A1 10/2017 Hasinoff et al.
2017/0315772 A1 11/2017 Lee et al.
2017/0324784 A1 11/2017 Taine et al.
2017/0336926 A1 11/2017 Chaudhri et al.
2017/0336928 A1 11/2017 Chaudhri et al.
2017/0336961 A1 11/2017 Heo et al.

(56) References Cited

U.S. PATENT DOCUMENTS

2017/0352379 A1 12/2017 Oh et al.
2017/0354888 A1 12/2017 Benedetto et al.
2017/0358071 A1 12/2017 Yamaoka et al.
2017/0359504 A1 12/2017 Manzari et al.
2017/0359505 A1 12/2017 Manzari et al.
2017/0359506 A1 12/2017 Manzari et al.
2017/0366729 A1 12/2017 Itoh
2018/0007315 A1 1/2018 Kim et al.
2018/0021684 A1 1/2018 Benedetto
2018/0035031 A1 2/2018 Kwak et al.
2018/0047200 A1 2/2018 O'hara et al.
2018/0077332 A1 3/2018 Shimura et al.
2018/0091728 A1 3/2018 Brown et al.
2018/0091732 A1 3/2018 Wilson et al.
2018/0095649 A1 4/2018 Valdivia et al.
2018/0096487 A1 4/2018 Nash et al.
2018/0109722 A1 4/2018 Laroia et al.
2018/0113577 A1 4/2018 Burns et al.
2018/0114543 A1 4/2018 Novikoff
2018/0120661 A1 5/2018 Kilgore et al.
2018/0124299 A1 5/2018 Brook
2018/0129224 A1 5/2018 Hur
2018/0131878 A1 5/2018 Charlton et al.
2018/0146132 A1 5/2018 Manzari et al.
2018/0152611 A1 5/2018 Li et al.
2018/0184008 A1 6/2018 Kondo
2018/0184061 A1 6/2018 Kitsunai et al.
2018/0191944 A1 7/2018 Carbonell et al.
2018/0198985 A1 7/2018 Ishitsuka
2018/0199025 A1 7/2018 Holzer et al.
2018/0227479 A1 8/2018 Parameswaran et al.
2018/0227482 A1 8/2018 Holzer et al.
2018/0227505 A1 8/2018 Baltz et al.
2018/0234608 A1 8/2018 Sudo et al.
2018/0267703 A1 9/2018 Kamimaru et al.
2018/0270420 A1 9/2018 Lee et al.
2018/0278823 A1 9/2018 Horesh
2018/0284979 A1 10/2018 Choi et al.
2018/0288310 A1 10/2018 Goldenberg
2018/0302551 A1 10/2018 Yamajo et al.
2018/0302568 A1 10/2018 Kim et al.
2018/0308282 A1 10/2018 Yokoi
2018/0335927 A1 11/2018 Anzures et al.
2018/0335929 A1 11/2018 Scapel et al.
2018/0335930 A1 11/2018 Scapel et al.
2018/0336715 A1 11/2018 Rickwald et al.
2018/0349008 A1* 12/2018 Manzari ................. H04N 5/247
2018/0352165 A1 12/2018 Zhen et al.
2018/0376122 A1 12/2018 Park et al.
2019/0007589 A1 1/2019 Kadambala et al.
2019/0028650 A1 1/2019 Bernstein et al.
2019/0029513 A1 1/2019 Gunnerson et al.
2019/0051032 A1 2/2019 Chu et al.
2019/0082097 A1 3/2019 Manzari et al.
2019/0089873 A1 3/2019 Misawa et al.
2019/0114740 A1 4/2019 Ogino et al.
2019/0121216 A1 4/2019 Shabtay et al.
2019/0138259 A1 5/2019 Bagaria et al.
2019/0141030 A1 5/2019 Cockerill et al.
2019/0149706 A1 5/2019 Rivard et al.
2019/0174054 A1 6/2019 Srivastava et al.
2019/0199926 A1 6/2019 An et al.
2019/0205861 A1 7/2019 Bace
2019/0206031 A1 7/2019 Kim et al.
2019/0222769 A1 7/2019 Srivastava et al.
2019/0235743 A1 8/2019 Ono
2019/0289201 A1 9/2019 Nishimura et al.
2019/0318538 A1 10/2019 Li et al.
2019/0342507 A1 11/2019 Dye et al.
2019/0379821 A1 12/2019 Kobayashi et al.
2019/0379837 A1 12/2019 Kim et al.
2020/0045245 A1 2/2020 Van Os et al.
2020/0053288 A1 2/2020 Kim et al.
2020/0059605 A1 2/2020 Liu et al.
2020/0068121 A1 2/2020 Wang
2020/0082599 A1 3/2020 Manzari
2020/0105003 A1 4/2020 Stauber et al.
2020/0106952 A1 4/2020 Missig et al.
2020/0128191 A1 4/2020 Sun et al.
2020/0142577 A1 5/2020 Manzari et al.
2020/0204725 A1 6/2020 Li
2020/0221020 A1 7/2020 Manzari et al.
2020/0234508 A1 7/2020 Shaburov et al.
2020/0236278 A1 7/2020 Yeung et al.
2020/0244879 A1 7/2020 Hohjoh
2020/0285806 A1 9/2020 Radakovitz et al.
2020/0285851 A1 9/2020 Lin et al.
2020/0336660 A1 10/2020 Dong et al.
2020/0358963 A1 11/2020 Manzari et al.
2020/0380768 A1 12/2020 Harris et al.
2020/0380781 A1 12/2020 Barlier et al.
2020/0410763 A1 12/2020 Hare et al.
2020/0412975 A1 12/2020 Al Majid et al.
2021/0005003 A1 1/2021 Chong et al.
2021/0058351 A1 2/2021 Viklund et al.
2021/0065448 A1 3/2021 Goodrich et al.
2021/0065454 A1 3/2021 Goodrich et al.
2021/0096703 A1 4/2021 Anzures et al.
2021/0099568 A1 4/2021 Depue et al.
2021/0099761 A1 4/2021 Zhang
2021/0146838 A1 5/2021 Goseberg et al.
2021/0152505 A1 5/2021 Baldwin et al.
2021/0168108 A1 6/2021 Antmen et al.
2021/0195093 A1 6/2021 Manzari et al.
2021/0264656 A1 8/2021 Barlier et al.
2021/0318798 A1 10/2021 Manzari et al.
2021/0373750 A1 12/2021 Manzari et al.
2022/0006946 A1 1/2022 Missig et al.
2022/0053142 A1 2/2022 Manzari et al.
2022/0070385 A1 3/2022 Van Os et al.
2022/0103758 A1 3/2022 Manzari et al.
2022/0124241 A1 4/2022 Manzari et al.

FOREIGN PATENT DOCUMENTS

AU 2015297035 B2 6/2018
CA 2729392 A1 8/2011
CA 2965700 A1 5/2016
CA 2729392 C 5/2017
CN 1437365 A 8/2003
CN 101068311 A 11/2007
CN 101282422 A 10/2008
CN 101300830 A 11/2008
CN 101310519 A 11/2008
CN 101355655 A 1/2009
CN 101364031 A 2/2009
CN 101388965 A 3/2009
CN 101576996 A 11/2009
CN 101778220 A 7/2010
CN 101883213 A 11/2010
CN 101931691 A 12/2010
CN 102075727 A 5/2011
CN 102084327 A 6/2011
CN 102088554 A 6/2011
CN 102272700 A 12/2011
CN 102428655 A 4/2012
CN 102457661 A 5/2012
CN 102474560 A 5/2012
CN 102567953 A 7/2012
CN 202330968 U 7/2012
CN 103051837 A 4/2013
CN 103051841 A 4/2013
CN 103052961 A 4/2013
CN 103297719 A 9/2013
CN 103309602 A 9/2013
CN 103324329 A 9/2013
CN 103685925 A 3/2014
CN 103702039 A 4/2014
CN 103777742 A 5/2014
CN 103947190 A 7/2014
CN 103970472 A 8/2014
CN 104270597 A 1/2015
CN 104346080 A 2/2015
CN 104346099 A 2/2015

(56) References Cited

FOREIGN PATENT DOCUMENTS

| | | | |
|---|---|---|---|
| CN | 104423946 | A | 3/2015 |
| CN | 104461288 | A | 3/2015 |
| CN | 104754203 | A | 7/2015 |
| CN | 104813322 | A | 7/2015 |
| CN | 104836947 | A | 8/2015 |
| CN | 104952063 | A | 9/2015 |
| CN | 105138259 | A | 12/2015 |
| CN | 105190511 | A | 12/2015 |
| CN | 105229571 | A | 1/2016 |
| CN | 105338256 | A | 2/2016 |
| CN | 105474163 | A | 4/2016 |
| CN | 105493138 | A | 4/2016 |
| CN | 105589637 | A | 5/2016 |
| CN | 105611215 | A | 5/2016 |
| CN | 105620393 | A | 6/2016 |
| CN | 105630290 | A | 6/2016 |
| CN | 105653031 | A | 6/2016 |
| CN | 105765967 | A | 7/2016 |
| CN | 105981372 | A | 9/2016 |
| CN | 105991915 | A | 10/2016 |
| CN | 106067947 | A | 11/2016 |
| CN | 106161956 | A | 11/2016 |
| CN | 106210184 | A | 12/2016 |
| CN | 106210550 | A | 12/2016 |
| CN | 106257909 | A | 12/2016 |
| CN | 106303280 | A | 1/2017 |
| CN | 106303690 | A | 1/2017 |
| CN | 106341611 | A | 1/2017 |
| CN | 106375662 | A | 2/2017 |
| CN | 106412214 | A | 2/2017 |
| CN | 106412412 | A | 2/2017 |
| CN | 106412445 | A | 2/2017 |
| CN | 106445219 | A | 2/2017 |
| CN | 106791357 | A | 5/2017 |
| CN | 106791377 | A | 5/2017 |
| CN | 106791420 | A | 5/2017 |
| CN | 106921829 | A | 7/2017 |
| CN | 107077274 | A | 8/2017 |
| CN | 107079141 | A | 8/2017 |
| CN | 107533356 | A | 1/2018 |
| CN | 107566721 | A | 1/2018 |
| CN | 107580693 | A | 1/2018 |
| CN | 107770448 | A | 3/2018 |
| CN | 107800945 | A | 3/2018 |
| CN | 107820011 | A | 3/2018 |
| CN | 107924113 | A | 4/2018 |
| CN | 108353126 | A | 7/2018 |
| CN | 108391053 | A | 8/2018 |
| CN | 108513070 | A | 9/2018 |
| CN | 108668083 | A | 10/2018 |
| CN | 108848308 | A | 11/2018 |
| CN | 108886569 | A | 11/2018 |
| CN | 109005366 | A | 12/2018 |
| CN | 109061985 | A | 12/2018 |
| CN | 109313530 | A | 2/2019 |
| CN | 109496425 | A | 3/2019 |
| CN | 109639970 | A | 4/2019 |
| CN | 109644229 | A | 4/2019 |
| DK | 201670753 | A1 | 1/2018 |
| DK | 201670755 | A1 | 1/2018 |
| DK | 201670627 | A1 | 2/2018 |
| EP | 0651543 | A2 | 5/1995 |
| EP | 0651543 | A3 | 12/1997 |
| EP | 1278099 | A1 | 1/2003 |
| EP | 1592212 | A1 | 11/2005 |
| EP | 0651543 | B1 | 9/2008 |
| EP | 2194508 | A1 | 6/2010 |
| EP | 2430766 | A2 | 3/2012 |
| EP | 2454872 | A1 | 5/2012 |
| EP | 2482179 | A2 | 8/2012 |
| EP | 2487613 | A1 | 8/2012 |
| EP | 2487913 | A2 | 8/2012 |
| EP | 2430766 | A4 | 12/2012 |
| EP | 2579572 | A1 | 4/2013 |
| EP | 2640060 | A1 | 9/2013 |
| EP | 2682855 | A2 | 1/2014 |
| EP | 2950198 | A1 | 12/2015 |
| EP | 2966855 | A2 | 1/2016 |
| EP | 2972677 | A1 | 1/2016 |
| EP | 2430766 | B1 | 3/2016 |
| EP | 3008575 | A1 | 4/2016 |
| EP | 3012732 | A1 | 4/2016 |
| EP | 3026636 | A1 | 6/2016 |
| EP | 3033837 | A1 | 6/2016 |
| EP | 3051525 | A1 | 8/2016 |
| EP | 3107065 | A1 | 12/2016 |
| EP | 3033837 | A4 | 3/2017 |
| EP | 3209012 | A1 | 8/2017 |
| EP | 3211587 | A1 | 8/2017 |
| EP | 2194508 | B1 | 12/2017 |
| EP | 3333544 | A1 | 6/2018 |
| EP | 2556665 | B1 | 8/2018 |
| EP | 3033837 | B1 | 10/2018 |
| EP | 3393119 | A1 | 10/2018 |
| EP | 3135028 | B1 | 1/2019 |
| EP | 3457680 | A1 | 3/2019 |
| EP | 3008575 | B1 | 7/2019 |
| EP | 3633975 | A1 | 4/2020 |
| GB | 2515797 | A | 1/2015 |
| GB | 2519363 | A | 4/2015 |
| GB | 2523670 | A | 9/2015 |
| JP | 2-179078 | A | 7/1990 |
| JP | 9-116792 | A | 5/1997 |
| JP | 11-355617 | A | 12/1999 |
| JP | 2000-207549 | A | 7/2000 |
| JP | 2000-244905 | A | 9/2000 |
| JP | 2001-245204 | A | 9/2001 |
| JP | 2001-298649 | A | 10/2001 |
| JP | 2003-8964 | A | 1/2003 |
| JP | 2003-18438 | A | 1/2003 |
| JP | 2003-32597 | A | 1/2003 |
| JP | 2003-241293 | A | 8/2003 |
| JP | 2004-15595 | A | 1/2004 |
| JP | 2004-135074 | A | 4/2004 |
| JP | 2005-31466 | A | 2/2005 |
| JP | 2005-191641 | A | 7/2005 |
| JP | 2005-191985 | A | 7/2005 |
| JP | 3872041 | B2 | 1/2007 |
| JP | 2007-28211 | A | 2/2007 |
| JP | 2007-124398 | A | 5/2007 |
| JP | 2008-66978 | A | 3/2008 |
| JP | 2008-236534 | A | 10/2008 |
| JP | 2009-105919 | A | 5/2009 |
| JP | 2009-212899 | A | 9/2009 |
| JP | 2009-545256 | A | 12/2009 |
| JP | 2010-119147 | A | 5/2010 |
| JP | 2010-160581 | A | 7/2010 |
| JP | 2010-182023 | A | 8/2010 |
| JP | 2010-268052 | A | 11/2010 |
| JP | 2011-87167 | A | 4/2011 |
| JP | 2011-91570 | A | 5/2011 |
| JP | 2011-124864 | A | 6/2011 |
| JP | 2011-211552 | A | 10/2011 |
| JP | 2012-79302 | A | 4/2012 |
| JP | 2012-89973 | A | 5/2012 |
| JP | 2012-124608 | A | 6/2012 |
| JP | 2012-147379 | A | 8/2012 |
| JP | 2013-70303 | A | 4/2013 |
| JP | 2013-106289 | A | 5/2013 |
| JP | 2013-546238 | A | 12/2013 |
| JP | 2014-23083 | A | 2/2014 |
| JP | 2014-212415 | A | 11/2014 |
| JP | 2015-1716 | A | 1/2015 |
| JP | 2015-5255 | A | 1/2015 |
| JP | 2015-22716 | A | 2/2015 |
| JP | 2015-50713 | A | 3/2015 |
| JP | 2015-76717 | A | 4/2015 |
| JP | 2015-146619 | A | 8/2015 |
| JP | 2015-149095 | A | 8/2015 |
| JP | 2015-180987 | A | 10/2015 |
| JP | 2015-201839 | A | 11/2015 |
| JP | 2016-66978 | A | 4/2016 |
| JP | 2016-72965 | A | 5/2016 |
| JP | 2016-129315 | A | 7/2016 |

(56) References Cited

FOREIGN PATENT DOCUMENTS

| | | | |
|---|---|---|---|
| JP | 2017-34474 | A | 2/2017 |
| JP | 2018-107711 | A | 7/2018 |
| JP | 2019-62556 | A | 4/2019 |
| JP | 2019-145108 | A | 8/2019 |
| KR | 10-2005-0086630 | A | 8/2005 |
| KR | 10-2012-0025872 | A | 3/2012 |
| KR | 10-2012-0048397 | A | 5/2012 |
| KR | 10-2012-0057696 | A | 6/2012 |
| KR | 10-2012-0093322 | A | 8/2012 |
| KR | 10-2013-0033445 | A | 4/2013 |
| KR | 10-1341095 | B1 | 12/2013 |
| KR | 10-2014-0049850 | A | 4/2014 |
| KR | 10-2014-0062801 | A | 5/2014 |
| KR | 10-2015-0014290 | A | 2/2015 |
| KR | 10-2015-0024899 | A | 3/2015 |
| KR | 10-2016-0016910 | A | 2/2016 |
| KR | 10-2016-0019145 | A | 2/2016 |
| KR | 10-2016-0020791 | A | 2/2016 |
| KR | 10-2016-0075583 | A | 6/2016 |
| KR | 10-1674959 | B1 | 11/2016 |
| KR | 10-2017-0123125 | A | 11/2017 |
| KR | 10-2017-0135975 | A | 12/2017 |
| KR | 10-2018-0017227 | A | 2/2018 |
| KR | 10-2018-0037076 | A | 4/2018 |
| KR | 10-2018-0095331 | A | 8/2018 |
| KR | 10-2018-0108847 | A | 10/2018 |
| KR | 10-2018-0137610 | A | 12/2018 |
| KR | 10-2019-0034248 | A | 4/2019 |
| WO | 1999/39307 | A1 | 8/1999 |
| WO | 2005/043892 | A1 | 5/2005 |
| WO | 2007/126707 | A1 | 11/2007 |
| WO | 2008/014301 | A2 | 1/2008 |
| WO | 2010/059426 | A2 | 5/2010 |
| WO | 2010/077048 | A2 | 7/2010 |
| WO | 2010/102678 | A1 | 9/2010 |
| WO | 2010/077048 | A3 | 10/2010 |
| WO | 2010/131869 | A2 | 11/2010 |
| WO | 2010/134275 | A1 | 11/2010 |
| WO | 2011/007264 | A1 | 1/2011 |
| WO | 2010/131869 | A3 | 2/2011 |
| WO | 2010/059426 | A3 | 5/2011 |
| WO | 2012/001947 | A1 | 1/2012 |
| WO | 2012/006251 | A1 | 1/2012 |
| WO | 2012/019163 | A2 | 2/2012 |
| WO | 2012/051720 | A2 | 4/2012 |
| WO | 2013/082325 | A1 | 6/2013 |
| WO | 2013/152453 | A1 | 10/2013 |
| WO | 2013/152454 | A1 | 10/2013 |
| WO | 2013/189058 | A1 | 12/2013 |
| WO | 2014/066115 | A1 | 5/2014 |
| WO | 2014/105276 | A1 | 7/2014 |
| WO | 2014/159779 | A1 | 10/2014 |
| WO | 2014/160819 | A1 | 10/2014 |
| WO | 2014/165141 | A1 | 10/2014 |
| WO | 2014/200734 | A1 | 12/2014 |
| WO | 2014/200798 | A1 | 12/2014 |
| WO | 2015/023044 | A1 | 2/2015 |
| WO | 2015/037211 | A1 | 3/2015 |
| WO | 2015/080744 | A1 | 6/2015 |
| WO | 2015/085042 | A1 | 6/2015 |
| WO | 2015/112868 | A1 | 7/2015 |
| WO | 2014/200798 | A8 | 8/2015 |
| WO | 2015/144209 | A1 | 10/2015 |
| WO | 2015/166684 | A1 | 11/2015 |
| WO | 2015/183438 | A1 | 12/2015 |
| WO | 2015/187494 | A1 | 12/2015 |
| WO | 2015/190666 | A1 | 12/2015 |
| WO | 2016/028806 | A1 | 2/2016 |
| WO | 2016/028807 | A1 | 2/2016 |
| WO | 2016/028808 | A1 | 2/2016 |
| WO | 2016/028809 | A1 | 2/2016 |
| WO | 2016/064435 | A1 | 4/2016 |
| WO | 2016/073804 | A2 | 5/2016 |
| WO | 2016/073804 | A3 | 7/2016 |
| WO | 2016/145129 | A1 | 9/2016 |
| WO | 2016/172619 | A1 | 10/2016 |
| WO | 2016/204936 | A1 | 12/2016 |
| WO | 2017/058834 | A1 | 4/2017 |
| WO | 2017/153771 | A1 | 9/2017 |
| WO | 2017/201326 | A1 | 11/2017 |
| WO | 2017/218193 | A1 | 12/2017 |
| WO | 2018/006053 | A1 | 1/2018 |
| WO | 2018/048838 | A1 | 3/2018 |
| WO | 2018/049430 | A2 | 3/2018 |
| WO | 2018/057268 | A1 | 3/2018 |
| WO | 2018/099037 | A1 | 6/2018 |
| WO | 2018/144339 | A2 | 8/2018 |
| WO | 2018/159864 | A1 | 9/2018 |
| WO | 2018/212802 | A1 | 11/2018 |
| WO | 2019/050562 | A1 | 3/2019 |

OTHER PUBLICATIONS

Applicant-Initiated Interview Summary received for U.S. Appl. No. 16/528,257, dated Nov. 18, 2021, 2 pages.

Corrected Notice of Allowance received for U.S. Appl. No. 16/599,433, dated Oct. 14, 2021, 3 pages.

Corrected Notice of Allowance received for U.S. Appl. No. 16/733,718, dated Nov. 17, 2021, 2 pages.

Corrected Notice of Allowance received for U.S. Appl. No. 17/190,879, dated Nov. 19, 2021, 2 pages.

Decision to Grant received for European Patent Application No. 17809168.2, dated Oct. 21, 2021, 3 pages.

Decision to Grant received for Japanese Patent Application No. 2019-203399, dated Oct. 20, 2021, 3 pages (1 page of English Translation and 2 pages of Official Copy).

International Preliminary Report on Patentability received for PCT Patent Application No. PCT/US2020/031643, dated Nov. 18, 2021, 27 pages.

International Search Report and Written Opinion received for PCT Patent Application No. PCT/US2021/034304, dated Oct. 11, 2021, 24 pages.

Non-Final Office Action received for U.S. Appl. No. 17/190,879, dated Oct. 13, 2021, 10 pages.

Notice of Acceptance received for Australian Patent Application No. 2020260413, dated Oct. 14, 2021, 3 pages.

Notice of Acceptance received for Australian Patent Application No. 2021254567, dated Nov. 17, 2021, 3 pages.

Notice of Allowance received for Chinese Patent Application No. 202010601484.0, dated Nov. 23, 2021, 2 pages (1 page of English Translation and 1 page of Official Copy).

Notice of Allowance received for Korean Patent Application No. 10-2021-0022053, dated Nov. 23, 2021, 5 pages (2 pages of English Translation and 3 pages of Official Copy).

Notice of Allowance received for U.S. Appl. No. 16/733,718, dated Oct. 20, 2021, 24 pages.

Notice of Allowance received for U.S. Appl. No. 16/835,651, dated Nov. 10, 2021, 9 pages.

Notice of Allowance received for U.S. Appl. No. 17/190,879, dated Nov. 10, 2021, 8 pages.

Notice of Allowance received for U.S. Appl. No. 17/484,307, dated Nov. 30, 2021, 11 pages.

Notice of Allowance received for U.S. Appl. No. 17/484,321, dated Nov. 30, 2021, 10 pages.

Office Action received for Danish Patent Application No. PA201770719, dated Nov. 16, 2021, 2 pages.

Office Action received for European Patent Application No. 20210373.5, dated Dec. 9, 2021, 7 pages.

Office Action received for Indian Patent Application No. 201818045872, dated Oct. 13, 2021, 7 pages.

Office Action received for Japanese Patent Application No. 2019-566087, dated Oct. 18, 2021, 10 pages (6 pages of English Translation and 4 pages of Official Copy).

[B612] Addition of facial recognition bear/cat stamps and AR background function having moving sparkles or hearts, Available Online at: <URL, https://apptopi.jp/2017/0I/22/b612>, Jan. 22, 2017, 11 pages (Official copy only). {See communication under 37 CFR § 1.98(a) (3)}.

(56) References Cited

OTHER PUBLICATIONS

Advisory Action received for U.S. Appl. No. 16/144,629, dated Dec. 13, 2019, 9 pages.
Advisory Action received for U.S. Appl. No. 16/144,629, dated Jan. 6, 2021, 10 pages.
Android Police, "Galaxy S9+ In-Depth Camera Review", See Especially 0:43-0:53; 1:13-1:25; 1:25-1:27; 5:11-5:38; 6:12-6:26, Available Online at <https://www.youtube.com/watch?v=GZHYCdMCv-w>, Apr. 19, 2018, 3 pages.
Applicant-Initiated Interview Summary received for U.S. Appl. No. 16/144,629, dated Jul. 2, 2020, 5 pages.
Applicant-Initiated Interview Summary received for U.S. Appl. No. 16/144,629, dated Nov. 23, 2020, 3 pages.
Applicant-Initiated Interview Summary received for U.S. Appl. No. 16/528,941, dated Jun. 19, 2020, 3 pages.
Applicant-Initiated Interview Summary received for U.S. Appl. No. 16/528,941, dated Nov. 10, 2020, 2 pages.
Applicant-Initiated Interview Summary received for U.S. Appl. No. 16/584,100, dated Feb. 19, 2020, 3 pages.
Applicant-Initiated Interview Summary received for U.S. Appl. No. 16/586,344, dated Feb. 27, 2020, 3 pages.
Applicant-Initiated Interview Summary received for U.S. Appl. No. 16/599,433, dated Apr. 20, 2021, 7 pages.
Applicant-Initiated Interview Summary received for U.S. Appl. No. 16/733,718, dated Nov. 2, 2020, 4 pages.
Applicant-Initiated Interview Summary received for U.S. Appl. No. 17/027,317, dated Dec. 21, 2020, 4 pages.
Astrovideo, "AstroVideo enables you to use a low-cost, low-light video camera to capture astronomical images.", Available online at: https://www.coaa.co.uk/astrovideo.htm, Retrieved on Nov. 18, 2019, 5 pages.
Certificate of Examination received for Australian Patent Application No. 2017100683, dated Jan. 16, 2018, 2 pages.
Certificate of Examination received for Australian Patent Application No. 2019100420, dated Jul. 3, 2019, 2 pages.
Certificate of Examination received for Australian Patent Application No. 2019100794, dated Dec. 19, 2019, 2 pages.
Certificate of Examination received for Australian Patent Application No. 2020100189, dated May 12, 2020, 2 pages.
Certificate of Examination received for Australian Patent Application No. 2020100720, dated Nov. 11, 2020, 2 pages.
Certificate of Examination received for Australian Patent Application No. 2020101043, dated Dec. 22, 2020, 2 pages.
Certificate of Examination received for Australian Patent Application No. 2020104220, dated Apr. 1, 2021, 2 pages.
Certificate of Examination received for Australian Patent Application No. 2021103004, dated Sep. 13, 2021, 2 pages.
Channel Highway, "Virtual Makeover in Real-time and in full 3D", Available online at:-https://www.youtube.com/watch?v=NgUbBzb5qZg, Feb. 16, 2016, 1 page.
Clover Juli, "Moment Pro Camera App for iOS Gains Zebra Striping for Displaying Over and Underexposed Areas", Online Available at: https://web.archive.org/web/20190502081353/https://www.macrumors.com/2019/05/01/momentcamera-app-zebra-striping-and-more/, May 1, 2019, 8 pages.
Corrected Notice of Allowance received for U.S. Appl. No. 15/273,453, dated Dec. 21, 2017, 3 pages.
Corrected Notice of Allowance received for U.S. Appl. No. 15/273,453, dated Feb. 8, 2018, 2 pages.
Corrected Notice of Allowance received for U.S. Appl. No. 15/273,453, dated Nov. 27, 2017, 2 pages.
Corrected Notice of Allowance received for U.S. Appl. No. 15/273,503, dated Nov. 2, 2017, 2 pages.
Corrected Notice of Allowance received for U.S. Appl. No. 15/273,503, dated Nov. 24, 2017, 2 pages.
Corrected Notice of Allowance received for U.S. Appl. No. 15/858,175, dated Sep. 21, 2018, 2 pages.
Corrected Notice of Allowance received for U.S. Appl. No. 16/143,097, dated Nov. 8, 2019, 3 pages.
Corrected Notice of Allowance received for U.S. Appl. No. 16/191,117, dated Dec. 9, 2019, 2 pages.
Corrected Notice of Allowance received for U.S. Appl. No. 16/191,117, dated Feb. 28, 2020, 2 pages.
Corrected Notice of Allowance received for U.S. Appl. No. 16/191,117, dated Nov. 20, 2019, 2 pages.
Corrected Notice of Allowance received for U.S. Appl. No. 16/582,595, dated Apr. 7, 2020, 5 pages.
Corrected Notice of Allowance received for U.S. Appl. No. 16/582,595, dated Apr. 22, 2020, 5 pages.
Corrected Notice of Allowance received for U.S. Appl. No. 16/583,020, dated Mar. 24, 2020, 2 pages.
Corrected Notice of Allowance received for U.S. Appl. No. 16/584,044, dated Apr. 16, 2020, 3 pages.
Corrected Notice of Allowance received for U.S. Appl. No. 16/584,044, dated Jan. 29, 2020, 3 pages.
Corrected Notice of Allowance received for U.S. Appl. No. 16/584,044, dated Mar. 4, 2020, 2 pages.
Corrected Notice of Allowance received for U.S. Appl. No. 16/584,100, dated Feb. 21, 2020, 9 pages.
Corrected Notice of Allowance received for U.S. Appl. No. 16/584,693, dated Feb. 21, 2020, 15 pages.
Corrected Notice of Allowance received for U.S. Appl. No. 16/584,693, dated Mar. 4, 2020, 2 pages.
Corrected Notice of Allowance received for U.S. Appl. No. 16/584,693, dated Mar. 20, 2020, 2 pages.
Corrected Notice of Allowance received for U.S. Appl. No. 16/586,314, dated Apr. 8, 2020, 5 pages.
Corrected Notice of Allowance received for U.S. Appl. No. 16/586,314, dated Mar. 4, 2020, 3 pages.
Corrected Notice of Allowance received for U.S. Appl. No. 16/586,344, dated Apr. 7, 2020, 4 pages.
Corrected Notice of Allowance received for U.S. Appl. No. 16/586,344, dated Jan. 23, 2020, 4 pages.
Corrected Notice of Allowance received for U.S. Appl. No. 16/586,344, dated Mar. 17, 2020, 4 pages.
Corrected Notice of Allowance received for U.S. Appl. No. 16/599,433, dated Aug. 13, 2021, 5 pages.
Corrected Notice of Allowance received for U.S. Appl. No. 16/733,718, dated Aug. 18, 2021, 2 pages.
Corrected Notice of Allowance received for U.S. Appl. No. 16/825,879, dated Aug. 13, 2021, 2 pages.
Corrected Notice of Allowance received for U.S. Appl. No. 16/825,879, dated Jul. 23, 2021, 2 pages.
Corrected Notice of Allowance received for U.S. Appl. No. 16/825,879, dated Sep. 15, 2021, 2 pages.
Corrected Notice of Allowance received for U.S. Appl. No. 16/835,651, dated Aug. 10, 2021, 4 pages.
Corrected Notice of Allowance received for U.S. Appl. No. 16/835,651, dated Aug. 13, 2021, 2 pages.
Corrected Notice of Allowance received for U.S. Appl. No. 16/835,651, dated Jul. 28, 2021, 4 pages.
Corrected Notice of Allowance received for U.S. Appl. No. 16/835,651, dated Jun. 14, 2021, 2 pages.
Corrected Notice of Allowance received for U.S. Appl. No. 17/027,484, dated May 14, 2021, 5 pages.
Corrected Notice of Allowance received for U.S. Appl. No. 17/027,484, dated May 28, 2021, 5 pages.
Decision of Refusal received for Japanese Patent Application No. 2018-243463, dated Feb. 25, 2019, 8 pages (5 pages of English Translation and 3 pages of Official Copy).
Decision of Refusal received for Japanese Patent Application No. 2018-545502, dated Feb. 25, 2019, 11 pages (7 pages of English Translation and 4 pages of Official Copy).
Decision on Appeal received for Japanese Patent Application No. 2018-225131, dated Mar. 11, 2021, 5 pages (4 pages of English Translation and 1 page of Official Copy).
Decision on Appeal received for Japanese Patent Application No. 2018-545502, dated Mar. 25, 2021, 3 pages (1 page of English Translation and 2 pages of Official Copy).
Decision to Grant received for Danish Patent Application No. PA201670627, dated Nov. 29, 2018, 2 pages.

(56) References Cited

OTHER PUBLICATIONS

Decision to Grant received for Danish Patent Application No. PA201670753, dated Mar. 6, 2019, 2 pages.
Decision to Grant received for Danish Patent Application No. PA201670755, dated Mar. 6, 2019, 2 pages.
Decision to Grant received for Danish Patent Application No. PA201970593, dated Sep. 7, 2021, 2 pages.
Decision to Grant received for Danish Patent Application No. PA201970601, dated Feb. 3, 2021, 2 pages.
Decision to Grant received for Danish Patent Application No. PA201970603, dated May 21, 2021, 2 pages.
Decision to Grant received for European Patent Application No. 18176890.4, dated Jul. 9, 2020, 3 pages.
Decision to Grant received for European Patent Application No. 18183054.8, dated Jan. 21, 2021, 3 pages.
Decision to Grant received for European Patent Application No. 18209460.7, dated Apr. 9, 2021, 2 pages.
Decision to Grant received for European Patent Application No. 18214698.5, dated Sep. 10, 2020, 3 pages.
Decision to Grant received for Japanese Patent Application No. 2018-243463, dated Aug. 17, 2020, 2 pages (1 page of English Translation and 1 page of Official Copy).
Decision to Grant received for Japanese Patent Application No. 2020-070418, dated Feb. 8, 2021, 3 pages (1 page of English Translation and 2 pages of Official Copy).
Decision to Grant received for Japanese Patent Application No. 2020-184470, dated Jul. 1, 2021, 3 pages (1 page of English Translation and 2 pages of Official Copy).
Decision to Grant received for Japanese Patent Application No. 2020-184471, dated Jul. 1, 2021, 3 pages (1 page of English Translation and 2 pages of Official Copy).
Decision to Grant received for Japanese Patent Application No. 2020-193703, dated Aug. 10, 2021, 3 pages (1 page of English Translation and 2 pages of Official Copy).
Decision to Grant received for Japanese Patent Application No. 2021-051385, dated Jul. 8, 2021, 3 pages (1 page of English Translation and 2 pages of Official Copy).
Decision to Refuse received for European Patent Application No. 19724959.2, dated Jun. 22, 2021, 13 pages.
Decision to Refuse received for Japanese Patent Application No. 2018-225131, dated Jul. 8, 2019, 6 pages (4 pages of English Translation and 2 pages of Official Copy).
Decision to Refuse received for Japanese Patent Application No. 2018-243463, dated Jul. 8, 2019, 5 pages (3 pages of English Translation and 2 pages of Official Copy).
Decision to Refuse received for Japanese Patent Application No. 2018-545502, dated Jul. 8, 2019, 5 pages (3 pages of English Translation and 2 pages of Official Copy).
Digital Trends, "ModiFace Partners With Samsung To Bring AR Makeup To The Galaxy S9", Available online at:-https://www.digitaltrends.com/mobile/modiface-samsung-partnership-ar-makeup-galaxy-s9/, 2018, 16 pages.
European Search Report received for European Patent Application No. 18209460.7, dated Mar. 15, 2019, 4 pages.
European Search Report received for European Patent Application No. 18214698.5, dated Mar. 21, 2019, 5 pages.
European Search Report received for European Patent Application No. 20206196.6, dated Dec. 8, 2020, 4 pages.
European Search Report received for European Patent Application No. 20206197.4, dated Nov. 30, 2020, 4 pages.
European Search Report received for European Patent Application No. 20210373.5, dated Apr. 13, 2021, 4 pages.
European Search Report received for European Patent Application No. 21157252.4, dated Apr. 16, 2021, 4 pages.
European Search Report received for European Patent Application No. 21163791.3, dated May 6, 2021, 5 pages.
Examiner Initiated-Interview Summary received for U.S. Appl. No. 16/528,941, dated Dec. 1, 2020, 2 pages.
Examiner's Answer to Appeal Brief received for U.S. Appl. No. 16/144,629, dated Jul. 21, 2021, 21 pages.
Extended European Search Report received for European Patent Application No. 19204230.7, dated Feb. 21, 2020, 7 pages.
Extended European Search Report received for European Patent Application No. 20168009.7, dated Sep. 11, 2020, 12 pages.
Extended Search Report received for European Patent Application 17809168.2, dated Jun. 28, 2018, 9 pages.
Fedko Daria, "AR Hair Styles", Online Available at <https://www.youtube.com/watch?v=FrS6tHRbFE0>, Jan. 24, 2017, 2 pages.
Feng et al., "3D Direct Human-Computer Interface Paradigm Based on Free Hand Tracking", Chinese Journal of Computers, vol. 37, No. 6, Jun. 30, 2014, 15 pages (Official copy only). {See communication under 37 CFR § 1.98(a) (3)}.
Final Office Action received for U.S. Appl. No. 15/728,147, dated Aug. 29, 2018, 39 pages.
Final Office Action received for U.S. Appl. No. 15/728,147, dated May 28, 2019, 45 pages.
Final Office Action received for U.S. Appl. No. 16/144,629, dated Sep. 11, 2020, 22 pages.
Final Office Action received for U.S. Appl. No. 16/144,629, dated Sep. 18, 2019, 22 pages.
Final Office Action received for U.S. Appl. No. 16/528,941, dated Jul. 13, 2020, 15 pages.
Gadgets Portal, "Galaxy J5 Prime Camera Review! (vs J7 Prime) 4K", Available Online at :-https://www.youtube.com/watch?v=Rf2Gy8QmDqc, Oct. 24, 2016, 3 pages.
Gavin's Gadgets, "Honor 10 Camera App Tutorial—How to use All Modes + 90 Photos Camera Showcase", See Especially 2:58-4:32, Available Online at <https://www.youtube.com/watch?v=M5XZwXJcK74>, May 26, 2018, 3 pages.
Gibson Andrews, "Aspect Ratio: What it is and Why it Matters", Retrieved from <https://web.archive.org/web/20190331225429/https:/digital-photography-school.com/aspect-ratio-what-it-is-and-why-it-matters/>, Paragraphs: "Adjusting aspect ratio in-camera", "Cropping in post-processing", Mar. 31, 2019, 10 pages.
GSM Arena, "Honor 10 Review: Camera", Available Online at <https://web.archive.org/web/20180823142417/https://www.gsmarena.com/honor_10-review-1771p5.php>, Aug. 23, 2018, 11 pages.
Hall Brent, "Samsung Galaxy Phones Pro Mode (S7/S8/S9/Note 8/Note 9): When, why, & How To Use It", See Especially 3:18-5:57, Available Online at <https://www.youtube.com/watch?v=KwPxGUDRkTg>, Jun. 19, 2018, 3 pages.
HELPVIDEOSTV, "How to Use Snap Filters on Snapchat", Retrieved from <https://www.youtube.com/watch?v=oR-7cIWPszU&feature=youtu.be>, Mar. 22, 2017, pp. 1-2.
Hernández Carlos, "Lens Blur in the New Google Camera App", Available online at: https://research.googleblog.com/2014/04/lens-blur-in-new-google-camera-app.html, https://ai.googleblog.com/2014/04/1ens-blur-in-new-google-camera-app.html, Apr. 16, 2014, 6 pages.
Huawei Mobile PH, "Huawei P10 Tips & Tricks: Compose Portraits With Wide Aperture (Bokeh)", Available Online at <https://www.youtube.com/watch?v=WM4yo5-hrrE>, Mar. 30, 2017, 2 pages.
Iluvtrading, "Galaxy S10 / S10+: How to Use Bright Night Mode for Photos (Super Night Mode)", Online Available at: https://www.youtube.com/watch?v=SfZ7Us1S1Mk, Mar. 11, 2019, 4 pages.
Iluvtrading, "Super Bright Night Mode: Samsung Galaxy S1O vs Huawei P30 Pro (Review/How to/Explained)", Online Available at: https://www.youtube.com/watch?v=d4r3PWioY4Y, Apr. 26, 2019, 4 pages.
Imagespacetv, "Olympus OM-D E-M1 Mark II—Highlights & Shadows with Gavin Hoey", Online available at: https://www.youtube.com/watch?v=goEhh1n--hQ, Aug. 3, 2018, 3 pages.
Intention to Grant received for Danish Patent Application No. PA201670627, dated Jun. 11, 2018, 2 pages.
Intention to Grant received for Danish Patent Application No. PA201670753, dated Oct. 29, 2018, 2 pages.
Intention to Grant received for Danish Patent Application No. PA201670755, dated Nov. 13, 2018, 2 pages.
Intention to Grant received for Danish Patent Application No. PA201970593, dated Apr. 13, 2021, 2 pages.
Intention to Grant received for Danish Patent Application No. PA201970601, dated Sep. 21, 2020, 2 pages.

(56) References Cited

OTHER PUBLICATIONS

Intention to Grant received for Danish Patent Application No. PA201970603, dated Jan. 13, 2021, 2 pages.
Intention to Grant received for Danish Patent Application No. PA202070611, dated May 5, 2021, 2 pages.
Intention to Grant received for European Patent Application No. 17809168.2, dated Jun. 25, 2021, 8 pages.
Intention to Grant received for European Patent Application No. 18176890.4, dated Feb. 28, 2020, 8 pages.
Intention to Grant received for European Patent Application No. 18183054.8, dated Nov. 5, 2020, 6 pages.
Intention to Grant received for European Patent Application No. 18209460.7, dated Jan. 15, 2021, 8 pages.
Intention to Grant received for European Patent Application No. 18214698.5, dated Apr. 21, 2020, 8 pages.
International Preliminary Report on Patentability received for PCT Patent Application No. PCT/US2017/035321, dated Dec. 27, 2018, 11 pages.
International Preliminary Report on Patentability received for PCT Patent Application No. PCT/US2018/015591, dated Dec. 19, 2019, 10 pages.
International Preliminary Report on Patentability received for PCT Patent Application No. PCT/US2019/024067, dated Nov. 19, 2020, 12 pages.
International Preliminary Report on Patentability received for PCT Patent Application No. PCT/US2019/049101, dated Mar. 25, 2021, 17 pages.
International Search Report and Written Opinion received for PCT Patent Application No. PCT/US2017/035321, dated Oct. 6, 2017, 15 pages.
International Search Report and Written Opinion received for PCT Patent Application No. PCT/US2018/015591, dated Jun. 14, 2018, 14 pages.
International Search Report and Written Opinion received for PCT Patent Application No. PCT/US2019/024067, dated Oct. 9, 2019, 18 pages.
International Search Report and Written Opinion received for PCT Patent Application No. PCT/US2019/049101, dated Dec. 16, 2019, 26 pages.
International Search Report and Written Opinion received for PCT Patent Application No. PCT/US2020/031643, dated Dec. 2, 2020, 33 pages.
International Search Report and Written Opinion received for PCT Patent Application No. PCT/US2020/031643, dated Nov. 2, 2020, 34 pages.
Invitation to Pay Addition Fees received for PCT Patent Application No. PCT/US2017/035321, dated Aug. 17, 2017, 3 pages.
Invitation to Pay Additional Fees and Partial International Search Report received for PCT Patent Application No. PCT/US2019/049101, dated Oct. 24, 2019, 17 pages.
Invitation to Pay Additional Fees received for PCT Patent Application No. PCT/US2019/024067, dated Jul. 16, 2019, 13 pages.
Invitation to Pay Additional Fees received for PCT Patent Application No. PCT/US2020/031643, dated Sep. 9, 2020, 30 pages.
Invitation to Pay Additional Fees received for PCT Patent Application No. PCT/US2021/034304, dated Aug. 20, 2021, 16 pages.
Invitation to Pay Search Fees received for European Patent Application No. 18704732.9, dated Jun. 2, 2021, 3 pages.
Invitation to Pay Search Fees received for European Patent Application No. 19724959.2, dated Feb. 25, 2020, 3 pages.
KK World, "Redmi Note 7 Pro Night Camera Test I Night Photography with Night Sight & Mode", Online Available at: https://www.youtube.com/watch?v=3EKjGBjX3PY, Mar. 26, 2019, 4 pages.
Kozak Tadeusz, "When You're Video Chatting on Snapchat, How Do You Use Face Filters?", Quora, Online Available at: https://www.quora.com/When-youre-video-chatting-on-Snapchat-how-do-you-use-face-filters, Apr. 29, 2018, 1 page.
Lang Brian, "How to Audio & Video Chat with Multiple Users at the Same Time in Groups", Snapchat 101, Online Available at: <https://smartphones.gadgethacks.com/how-to/snapchat-101-audio-video-chat-with-multiple-users-same-time-groups-0184113/>, Apr. 17, 2018, 4 pages.
Minutes of the Oral Proceedings received for European Patent Application No. 19724959.2, mailed on Jun. 14, 2021, 6 pages.
Mobiscrub, "Galaxy S4 mini camera review", Available Online at :-https://www.youtube.com/watch?v=KYKOydw8QT8, Aug. 10, 2013, 3 pages.
Mobiscrub, "Samsung Galaxy S5 Camera Review—HD Video", Available Online on:-https://www.youtube.com/watch?v=BFgwDtNKMjg, Mar. 27, 2014, 3 pages.
Modifacechannel, "Sephora 3D Augmented Reality Mirror", Available Online at: https://www.youtube.com/watch?v=wwBO4PU9EXI, May 15, 2014, 1 page.
Neurotechnology, "Sentimask SDK", Available at: https://www.neurotechnology.com/sentimask.html, Apr. 22, 2018, 5 pages.
Nikon Digital Camera D7200 User's Manual, Online available at: https://download.nikonimglib.com/archive3/dbHI400jWws903mGr6q98a4k8F90/D7200UM_SG(En)05.pdf, 2005, 416 pages.
Non-Final Office Action received for U.S. Appl. No. 16/528,257, dated Jul. 30, 2021, 12 pages.
Non-Final Office Action received for U.S. Appl. No. 12/764,360, dated May 3, 2012, 19 pages.
Non-Final Office Action received for U.S. Appl. No. 15/273,522, dated Nov. 30, 2016, 15 pages.
Non-Final Office Action received for U.S. Appl. No. 15/273,544, dated May 25, 2017, 18 pages.
Non-Final Office Action received for U.S. Appl. No. 15/728,147, dated Feb. 22, 2018, 20 pages.
Non-Final Office Action received for U.S. Appl. No. 15/728,147, dated Jan. 31, 2019, 41 pages.
Non-Final Office Action received for U.S. Appl. No. 16/143,097, dated Feb. 28, 2019, 17 pages.
Non-Final Office Action received for U.S. Appl. No. 16/144,629, dated Mar. 13, 2020, 24 pages.
Non-Final Office Action received for U.S. Appl. No. 16/144,629, dated Mar. 29, 2019, 18 pages.
Non-Final Office Action received for U.S. Appl. No. 16/528,941, dated Dec. 7, 2020, 15 pages.
Non-Final Office Action received for U.S. Appl. No. 16/528,941, dated Jan. 30, 2020, 14 pages.
Non-Final Office Action received for U.S. Appl. No. 16/582,595, dated Nov. 26, 2019, 17 pages.
Non-Final Office Action received for U.S. Appl. No. 16/583,020, dated Nov. 14, 2019, 9 pages.
Non-Final Office Action received for U.S. Appl. No. 16/599,433, dated Jan. 28, 2021, 16 pages.
Non-Final Office Action received for U.S. Appl. No. 16/733,718, dated Sep. 16, 2020, 25 pages.
Non-Final Office Action received for U.S. Appl. No. 16/825,879, dated May 5, 2021, 12 pages.
Non-Final Office Action received for U.S. Appl. No. 17/027,317, dated Nov. 17, 2020, 17 pages.
Notice of Acceptance received for Australian Patent Application No. 2017286130, dated Apr. 26, 2019, 3 pages.
Notice of Acceptance received for Australian Patent Application No. 2018279787, dated Dec. 10, 2019, 3 pages.
Notice of Acceptance received for Australian Patent Application No. 2019213341, dated Aug. 25, 2020, 3 pages.
Notice of Acceptance received for Australian Patent Application No. 2019266049, dated Nov. 24, 2020, 3 pages.
Notice of Acceptance received for Australian Patent Application No. 2020201969, dated Mar. 26, 2021, 3 pages.
Notice of Acceptance received for Australian Patent Application No. 2020267151, dated Dec. 9, 2020, 3 pages.
Notice of Acceptance received for Australian Patent Application No. 2020277216, dated Mar. 15, 2021, 3 pages.
Notice of Acceptance received for Australian Patent Application No. 2021201167, dated Mar. 15, 2021, 3 pages.
Notice of Acceptance received for Australian Patent Application No. 2021203210, dated Jul. 9, 2021, 3 pages.

(56) References Cited

OTHER PUBLICATIONS

Notice of Allowance received for Brazilian Patent Application No. 112018074765-3, dated Oct. 8, 2019, 2 pages (1 page of English Translation and 1 page of Official Copy).
Notice of Allowance received for Chinese Patent Application No. 201780002533.5, dated Apr. 14, 2020, 2 pages (1 page of English Translation and 1 page of Official Copy).
Notice of Allowance received for Chinese Patent Application No. 201810566134.8, dated Apr. 7, 2020, 3 pages (1 page of English Translation and 2 pages of Official Copy).
Notice of Allowance received for Chinese Patent Application No. 201810664927.3, dated Jul. 19, 2019, 2 pages (1 page of English Translation and 1 page of Official Copy).
Notice of Allowance received for Chinese Patent Application No. 201811512767.7, dated Jul. 27, 2020, 4 pages (1 page of English Translation and 3 pages of Official Copy).
Notice of Allowance received for Chinese Patent Application No. 201910692978.1, dated Feb. 4, 2021, 6 pages (3 pages of English Translation and 3 pages of Official Copy).
Notice of Allowance received for Chinese Patent Application No. 201911202668.3, dated Feb. 4, 2021, 5 pages (2 pages of English Translation and 3 pages of Official Copy).
Notice of Allowance received for Chinese Patent Application No. 201911219525.3, dated Sep. 29, 2020, 2 pages (1 page of English Translation and 1 page of Official Copy).
Notice of Allowance received for Chinese Patent Application No. 202010218168.5, dated Aug. 25, 2021, 6 pages (3 pages of English Translation and 3 pages of Official Copy).
Notice of Allowance received for Chinese Patent Application No. 202010287953.6, dated Mar. 18, 2021, 7 pages (3 pages of English Translation and 4 pages of Official Copy).
Notice of Allowance received for Chinese Patent Application No. 202010287958.9, dated Aug. 27, 2021, 6 pages (3 pages of English Translation and 3 pages of Official Copy).
Notice of Allowance received for Chinese Patent Application No. 202010287961.0, dated Mar. 9, 2021, 8 pages (4 pages of English Translation and 4 pages of Official Copy).
Notice of Allowance received for Chinese Patent Application No. 202010287975.2, dated Mar. 1, 2021, 7 pages (3 pages of English Translation and 4 pages of Official Copy).
Notice of Allowance received for Chinese Patent Application No. 202010600151.6, dated Aug. 13, 2021, 2 pages (1 page of English Translation and 1 page of Official Copy).
Notice of Allowance received for Japanese Patent Application No. 2018-171188, dated Jul. 16, 2019, 3 pages (1 page of English Translation and 2 pages of Official Copy).
Notice of Allowance received for Korean Patent Application No. 10-2018-7026743, dated Mar. 20, 2019, 7 pages (1 page of English Translation and 6 pages of Official Copy).
Notice of Allowance received for Korean Patent Application No. 10-2018-7028849, dated Feb. 1, 2019, 4 pages (1 page of English Translation and 3 pages of Official Copy).
Notice of Allowance received for Korean Patent Application No. 10-2018-7034780, dated Jun. 19, 2019, 4 pages (1 page of English Translation and 3 pages of Official Copy).
Notice of Allowance received for Korean Patent Application No. 10-2018-7036893, dated Jun. 12, 2019, 4 pages (1 page of English Translation and 3 pages of Official Copy).
Notice of Allowance received for Korean Patent Application No. 10-2019-7027042, dated Nov. 26, 2020, 4 pages (1 page of English Translation and 3 pages of Official Copy).
Notice of Allowance received for Korean Patent Application No. 10-2019-7035478, dated Apr. 24, 2020, 4 pages (1 page of English Translation and 3 pages of Official Copy).
Notice of Allowance received for Korean Patent Application No. 10-2020-0052618, dated Mar. 23, 2021, 5 pages (2 page of English Translation and 3 pages of Official Copy).
Notice of Allowance received for Korean Patent Application No. 10-2020-0143726, dated Nov. 10, 2020, 5 pages (2 pages of English Translation and 3 pages of Official Copy).
Notice of Allowance received for Korean Patent Application No. 10-2020-0155924, dated Nov. 23, 2020, 7 pages (2 pages of English Translation and 5 pages of Official Copy).
Notice of Allowance received for Korean Patent Application No. 10-2020-7021870, dated Apr. 26, 2021, 4 pages (1 page of English Translation and 3 pages of Official Copy).
Notice of Allowance received for Korean Patent Application No. 10-2020-7031855, dated Mar. 22, 2021, 5 pages (1 page of English Translation and 4 pages of Official Copy).
Notice of Allowance received for Korean Patent Application No. 10-2021-7000954, dated Aug. 18, 2021, 5 pages (2 pages of English Translation and 3 pages of Official Copy).
Notice of Allowance received for Korean Patent Application No. 10-2021-7019525, dated Jul. 13, 2021, 5 pages (1 page of English Translation and 4 pages of Official Copy).
Notice of Allowance received for U.S. Appl. No. 16/528,941, dated Aug. 10, 2021, 5 pages.
Notice of Allowance received for U.S. Appl. No. 16/528,941, dated May 19, 2021, 5 pages.
Notice of Allowance received for U.S. Appl. No. 12/764,360, dated Oct. 1, 2012, 13 pages.
Notice of Allowance received for U.S. Appl. No. 15/273,453, dated Oct. 12, 2017, 11 pages.
Notice of Allowance received for U.S. Appl. No. 15/273,503, dated Aug. 14, 2017, 9 pages.
Notice of Allowance received for U.S. Appl. No. 15/273,522, dated Mar. 28, 2017, 9 Pages.
Notice of Allowance received for U.S. Appl. No. 15/273,522, dated May 19, 2017, 2 pages.
Notice of Allowance received for U.S. Appl. No. 15/273,522, dated May 23, 2017, 2 pages.
Notice of Allowance received for U.S. Appl. No. 15/273,544, dated Mar. 13, 2018, 8 pages.
Notice of Allowance received for U.S. Appl. No. 15/273,544, dated Oct. 27, 2017, 8 pages.
Notice of Allowance received for U.S. Appl. No. 15/728,147, dated Aug. 19, 2019, 13 pages.
Notice of Allowance received for U.S. Appl. No. 15/858,175, dated Jun. 1, 2018, 8 pages.
Notice of Allowance received for U.S. Appl. No. 15/858,175, dated Sep. 12, 2018, 8 pages.
Notice of Allowance received for U.S. Appl. No. 16/110,514, dated Apr. 29, 2019, 9 pages.
Notice of Allowance received for U.S. Appl. No. 16/110,514, dated Mar. 13, 2019, 11 pages.
Notice of Allowance received for U.S. Appl. No. 16/143,097, dated Aug. 29, 2019, 23 pages.
Notice of Allowance received for U.S. Appl. No. 16/143,201, dated Feb. 8, 2019, 9 pages.
Notice of Allowance received for U.S. Appl. No. 16/143,201, dated Nov. 28, 2018, 14 pages.
Notice of Allowance received for U.S. Appl. No. 16/191,117, dated Oct. 29, 2019, 9 pages.
Notice of Allowance received for U.S. Appl. No. 16/582,595, dated Mar. 20, 2020, 9 pages.
Notice of Allowance received for U.S. Appl. No. 16/583,020, dated Apr. 1, 2020, 5 pages.
Notice of Allowance received for U.S. Appl. No. 16/583,020, dated Feb. 28, 2020, 5 pages.
Notice of Allowance received for U.S. Appl. No. 16/584,044, dated Dec. 11, 2019, 15 pages.
Notice of Allowance received for U.S. Appl. No. 16/584,044, dated Mar. 30, 2020, 16 pages.
Notice of Allowance received for U.S. Appl. No. 16/584,044, dated Nov. 14, 2019, 13 pages.
Notice of Allowance received for U.S. Appl. No. 16/584,100, dated Apr. 8, 2020, 12 pages.
Notice of Allowance received for U.S. Appl. No. 16/584,100, dated Jan. 14, 2020, 13 pages.
Notice of Allowance received for U.S. Appl. No. 16/584,693, dated Jan. 15, 2020, 15 pages.
Notice of Allowance received for U.S. Appl. No. 16/584,693, dated May 4, 2020, 12 pages.

(56) References Cited

OTHER PUBLICATIONS

Notice of Allowance received for U.S. Appl. No. 16/586,314, dated Apr. 1, 2020, 8 pages.
Notice of Allowance received for U.S. Appl. No. 16/586,314, dated Jan. 9, 2020, 10 pages.
Notice of Allowance received for U.S. Appl. No. 16/586,344, dated Dec. 16, 2019, 12 pages.
Notice of Allowance received for U.S. Appl. No. 16/586,344, dated Mar. 27, 2020, 12 pages.
Notice of Allowance received for U.S. Appl. No. 16/599,433, dated May 14, 2021, 11 pages.
Notice of Allowance received for U.S. Appl. No. 16/599,433, dated Oct. 4, 2021, 13 pages.
Notice of Allowance received for U.S. Appl. No. 16/733,718, dated Feb. 5, 2021, 14 pages.
Notice of Allowance received for U.S. Appl. No. 16/733,718, dated Jul. 29, 2021, 26 pages.
Notice of Allowance received for U.S. Appl. No. 16/825,879, dated Jul. 13, 2021, 9 pages.
Notice of Allowance received for U.S. Appl. No. 16/825,879, dated Sep. 28, 2021, 8 pages.
Notice of Allowance received for U.S. Appl. No. 16/835,651, dated Jul. 23, 2021, 8 pages.
Notice of Allowance received for U.S. Appl. No. 16/835,651, dated Jun. 1, 2021, 10 pages.
Notice of Allowance received for U.S. Appl. No. 17/027,317, dated Apr. 12, 2021, 7 pages.
Notice of Allowance received for U.S. Appl. No. 17/027,317, dated Jan. 13, 2021, 10 pages.
Notice of Allowance received for U.S. Appl. No. 17/027,484, dated May 3, 2021, 11 pages.
Office Action received for Australian Patent Application No. 2017100683, dated Sep. 20, 2017, 3 pages.
Office Action received for Australian Patent Application No. 2017100684, dated Jan. 24, 2018, 4 pages.
Office Action received for Australian Patent Application No. 2017100684, dated Oct. 5, 2017, 4 pages.
Office Action Received for Australian Patent Application No. 2017286130, dated Jan. 21, 2019, 4 pages.
Office Action received for Australian Patent Application No. 2019100794, dated Oct. 3, 2019, 4 pages.
Office Action received for Australian Patent Application No. 2019213341, dated Jun. 30, 2020, 6 pages.
Office Action received for Australian Patent Application No. 2020100189, dated Apr. 1, 2020, 3 pages.
Office Action received for Australian Patent Application No. 2020100720, dated Jul. 9, 2020, 7 pages.
Office Action received for Australian Patent Application No. 2020100720, dated Sep. 1, 2020, 5 pages.
Office Action received for Australian Patent Application No. 2020101043, dated Aug. 14, 2020, 5 pages.
Office Action received for Australian Patent Application No. 2020101043, dated Oct. 30, 2020, 4 pages.
Office Action received for Australian Patent Application No. 2020201969, dated Sep. 25, 2020, 5 pages.
Office Action received for Australian Patent Application No. 2020239717, dated Jun. 23, 2021, 7 pages.
Office Action received for Australian Patent Application No. 2020239717, dated Sep. 28, 2021, 6 pages.
Office Action received for Australian Patent Application No. 2020260413, dated Jun. 24, 2021, 2 pages.
Office Action received for Australian Patent Application No. 2020277216, dated Dec. 17, 2020, 5 pages.
Office Action received for Australian Patent Application No. 2021103004, dated Aug. 12, 2021, 5 pages.
Office Action received for Chinese Patent Application No. 201780002533.5, dated Apr. 25, 2019, 17 pages (7 pages of English Translation and 10 pages of Official Copy).
Office Action received for Chinese Patent Application No. 201780002533.5, dated Feb. 3, 2020, 6 pages (3 pages of English Translation and 3 pages of Official Copy).
Office Action received for Chinese Patent Application No. 201780002533.5, dated Sep. 26, 2019, 21 pages (9 pages of English Translation and 12 pages of Official Copy).
Office Action received for Chinese Patent Application No. 201810566134.8, dated Aug. 13, 2019, 14 pages (8 pages of English Translation and 6 pages of Official Copy).
Office Action received for Chinese Patent Application No. 201810664927.3, dated Mar. 28, 2019, 11 pages (5 pages of English Translation and 6 pages of Official Copy).
Office Action received for Chinese Patent Application No. 201811446867.4, dated Dec. 31, 2019, 12 pages (5 pages of English Translation and 7 pages of Official Copy).
Office Action received for Chinese Patent Application No. 201811446867.4, dated May 6, 2020, 10 pages (5 pages of English Translation and 5 pages of Official Copy).
Office Action received for Chinese Patent Application No. 201811446867.4, dated Sep. 8, 2020, 9 pages (4 pages of English Translation and 5 pages of Official Copy).
Office Action received for Chinese Patent Application No. 201811512767.7, dated Dec. 20, 2019, 14 pages (7 pages of English Translation and 7 pages of Official Copy).
Office Action received for Chinese Patent Application No. 201811512767.7, dated Jun. 4, 2020, 6 pages (3 pages of English Translation and 3 pages of Official Copy).
Office Action received for Chinese Patent Application No. 201910692978.1, dated Apr. 3, 2020, 19 pages (8 pages of English Translation and 11 pages of Official Copy).
Office Action received for Chinese Patent Application No. 201910692978.1, dated Nov. 4, 2020, 4 pages (1 page of English Translation and 3 pages of Official Copy).
Office Action received for Chinese Patent Application No. 201911202668.3, dated Aug. 4, 2020, 13 pages (7 pages of English Translation and 6 pages of Official Copy).
Office Action received for Chinese Patent Application No. 201911219525.3, dated Jul. 10, 2020, 7 pages (1 page of English Translation and 6 pages of Official Copy).
Office Action received for Chinese Patent Application No. 202010218168.5, dated Feb. 9, 2021, 21 pages (9 pages of English Translation and 12 pages of Official Copy).
Office Action received for Chinese Patent Application No. 202010287950.2, dated Aug. 10, 2021, 12 pages (6 pages of English Translation and 6 pages of Official Copy).
Office Action received for Chinese Patent Application No. 202010287950.2, dated Feb. 20, 2021, 22 pages (10 pages of English Translation and 12 pages of Official Copy).
Office Action received for Chinese Patent Application No. 202010287953.6, dated Jan. 14, 2021, 14 pages (7 pages of English Translation and 7 pages of Official Copy).
Office Action received for Chinese Patent Application No. 202010287958.9, dated Jan. 5, 2021, 16 pages (8 pages of English Translation and 8 pages of Official Copy).
Office Action received for Chinese Patent Application No. 202010287961.0, dated Dec. 30, 2020, 16 pages (8 pages of English Translation and 8 pages of Official Copy).
Office Action received for Chinese Patent Application No. 202010287975.2, dated Dec. 30, 2020, 17 pages (9 pages of English Translation and 8 pages of Official Copy).
Office Action received for Chinese Patent Application No. 202010600151.6, dated Apr. 29, 2021, 11 pages (5 pages of English Translation and 6 pages of Official Copy).
Office Action received for Chinese Patent Application No. 202010600197.8, dated Jul. 2, 2021, 14 pages (6 pages of English Translation and 8 pages of Official Copy).
Office Action received for Chinese Patent Application No. 202010601484.0, dated Jun. 3, 2021, 13 pages (6 pages of English Translation and 7 pages of Official Copy).
Office Action received for Chinese Patent Application No. 202011480411.7, dated Aug. 2, 2021, 12 pages (6 pages of English Translation and 6 pages of Official Copy).

(56) References Cited

OTHER PUBLICATIONS

Office Action received for Danish Patent Application No. PA201670627, dated Apr. 5, 2017, 3 pages.
Office Action received for Danish Patent Application No. PA201670627, dated Nov. 6, 2017, 2 pages.
Office Action received for Danish Patent Application No. PA201670627, dated Oct. 11, 2016, 8 pages.
Office Action received for Danish Patent Application No. PA201670753, dated Dec. 20, 2016, 7 pages.
Office Action received for Danish Patent Application No. PA201670753, dated Jul. 5, 2017, 4 pages.
Office Action received for Danish Patent Application No. PA201670753, dated Mar. 23, 2018, 5 pages.
Office Action received for Danish Patent Application No. PA201670755, dated Apr. 6, 2017, 5 pages.
Office Action received for Danish Patent Application No. PA201670755, dated Apr. 20, 2018, 2 pages.
Office Action received for Danish Patent Application No. PA201670755, dated Dec. 22, 2016, 6 pages.
Office Action received for Danish Patent Application No. PA201670755, dated Oct. 20, 2017, 4 pages.
Office Action received for Danish Patent Application No. PA201770563, dated Aug. 13, 2018, 5 pages.
Office Action received for Danish Patent Application No. PA201770563, dated Jan. 28, 2020, 3 pages.
Office Action received for Danish Patent Application No. PA201770563, dated Jun. 28, 2019, 5 pages.
Office Action received for Danish Patent Application No. PA201770719, dated Aug. 14, 2018, 6 pages.
Office Action received for Danish Patent Application No. PA201770719, dated Feb. 19, 2019, 4 pages.
Office Action received for Danish Patent Application No. PA201770719, dated Jan. 17, 2020, 4 pages.
Office Action received for Danish Patent Application No. PA201770719, dated Jun. 30, 2021, 3 pages.
Office Action received for Danish Patent Application No. PA201770719, dated Nov. 16, 2020, 5 pages.
Office Action received for Danish Patent Application No. PA201870366, dated Aug. 22, 2019, 3 pages.
Office Action received for Danish Patent Application No. PA201870366, dated Dec. 12, 2018, 3 pages.
Office Action received for Danish Patent Application No. PA201870367, dated Dec. 20, 2018, 5 pages.
Office Action received for Danish Patent Application No. PA201870368, dated Dec. 20, 2018, 5 pages.
Office Action received for Danish Patent Application No. PA201870368, dated Oct. 1, 2019, 6 pages.
Office Action received for Danish Patent Application No. PA201870623, dated Jan. 30, 2020, 2 pages.
Office Action received for Danish Patent Application No. PA201870623, dated Jul. 12, 2019, 4 pages.
Office Action received for Danish Patent Application No. PA201970592, dated Mar. 2, 2020, 5 pages.
Office Action received for Danish Patent Application No. PA201970592, dated Oct. 26, 2020, 5 pages.
Office Action received for Danish Patent Application No. PA201970593, dated Apr. 16, 2020, 2 pages.
Office Action received for Danish Patent Application No. PA201970593, dated Feb. 2, 2021, 2 pages.
Office Action received for Danish Patent Application No. PA201970593, dated Mar. 10, 2020, 4 pages.
Office Action received for Danish Patent Application No. PA201970595, dated Mar. 10, 2020, 4 pages.
Office Action received for Danish Patent Application No. PA201970600, dated Mar. 9, 2020, 5 pages.
Office Action received for Danish Patent Application No. PA201970601, dated Aug. 13, 2020, 3 pages.
Office Action received for Danish Patent Application No. PA201970601, dated Jan. 31, 2020, 3 pages.
Office Action received for Danish Patent Application No. PA201970601, dated Nov. 11, 2019, 8 pages.
Office Action received for Danish Patent Application No. PA201970603, dated Nov. 4, 2020, 3 pages.
Office Action received for Danish Patent Application No. PA201970605, dated Mar. 10, 2020, 5 pages.
Office Action received for Danish Patent Application No. PA202070611, dated Dec. 22, 2020, 7 pages.
Office Action received for European Patent Application 17809168.2, dated Jan. 7, 2020, 5 pages.
Office Action received for European Patent Application 17809168.2, dated Oct. 8, 2020, 4 pages.
Office Action received for European Patent Application No. 18176890.4, dated Oct. 16, 2018, 8 pages.
Office Action received for European Patent Application No. 18183054.8, dated Feb. 24, 2020, 6 pages.
Office Action received for European Patent Application No. 18183054.8, dated Nov. 16, 2018, 8 pages.
Office Action received for European Patent Application No. 18209460.7, dated Apr. 10, 2019, 7 pages.
Office Action received for European Patent Application No. 18209460.7, dated Apr. 21, 2020, 5 pages.
Office Action received for European Patent Application No. 18214698.5, dated Apr. 2, 2019, 8 pages.
Office Action received for European Patent Application No. 18704732.9, dated Sep. 7, 2021, 10 pages.
Office Action received for European Patent Application No. 19204230.7, dated Sep. 28, 2020, 6 pages.
Office Action received for European Patent Application No. 19724959.2, dated Apr. 23, 2020, 10 pages.
Office Action received for European Patent Application No. 20168009.7, dated Apr. 20, 2021, 6 pages.
Office Action received for European Patent Application No. 20168009.7, dated Sep. 13, 2021, 8 pages.
Office Action received for European Patent Application No. 20206196.6, dated Jan. 13, 2021, 10 pages.
Office Action received for European Patent Application No. 20206197.4, dated Aug. 27, 2021, 6 pages.
Office Action received for European Patent Application No. 20206197.4, dated Jan. 12, 2021, 9 pages.
Office Action received for European Patent Application No. 20210373.5, dated May 10, 2021, 9 pages.
Office Action received for European Patent Application No. 21157252.4, dated Apr. 23, 2021, 8 pages.
Office Action received for European Patent Application No. 21163791.3, dated Jun. 2, 2021, 8 pages.
Office Action received for Indian Patent Application No. 201814036470, dated Feb. 26, 2021, 7 pages.
Office Action received for Indian Patent Application No. 201817024430, dated Sep. 27, 2021, 8 pages.
Office Action received for Indian Patent Application No. 201917053025, dated Mar. 19, 2021, 7 pages.
Office Action received for Indian Patent Application No. 202018006172, dated May 5, 2021, 6 pages.
Office Action received for Japanese Patent Application No. 2018-182607, dated Apr. 6, 2020, 6 pages (3 pages of English Translation and 3 pages of Official Copy).
Office Action received for Japanese Patent Application No. 2018-182607, dated Jul. 20, 2020, 5 pages (2 pages of English Translation and 3 pages of Official Copy).
Office Action received for Japanese Patent Application No. 2018-182607, dated Sep. 8, 2021, 7 pages (4 pages of English Translation and 3 pages of Official Copy).
Office Action received for Japanese Patent Application No. 2018-225131, dated Aug. 17, 2020, 21 pages (6 pages of English Translation and 15 pages of Official Copy).
Office Action received for Japanese Patent Application No. 2018-225131, dated Mar. 4, 2019, 10 pages (6 pages of English Translation and 4 pages of Official Copy).
Office Action received for Japanese Patent Application No. 2018-545502, dated Aug. 17, 2020, 14 pages (6 pages of English Translation and 8 pages of Official Copy).

(56) References Cited

OTHER PUBLICATIONS

Office Action received for Japanese Patent Application No. 2019-203399, dated Aug. 10, 2021, 4 pages (2 pages of English Translation and 2 pages of Official Copy).
Office Action received for Japanese Patent Application No. 2020-070418, dated Aug. 3, 2020, 22 pages (14 pages of English Translation and 8 pages of Official Copy).
Office Action received for Japanese Patent Application No. 2020-184470, dated May 10, 2021, 3 pages (1 page of English Translation and 2 pages of Official Copy).
Office Action received for Japanese Patent Application No. 2020-184471, dated May 10, 2021, 3 pages (1 page of English Translation and 2 pages of Official Copy).
Office Action received for Japanese Patent Application No. 2020-193703, dated Apr. 19, 2021, 4 pages (2 pages of English Translation and 2 pages of Official Copy).
Office Action received for Korean Patent Application No. 10-2018-7026743, dated Jan. 17, 2019, 5 pages (2 pages of English Translation and 3 pages of Official Copy).
Office Action received for Korean Patent Application No. 10-2018-7034780, dated Apr. 4, 2019, 11 pages (5 pages of English Translation and 6 pages of Official Copy).
Office Action received for Korean Patent Application No. 10-2018-7036893, dated Apr. 9, 2019, 6 pages (2 pages of English Translation and 4 pages of Official Copy).
Office Action received for Korean Patent Application No. 10-2019-7027042, dated May 13, 2020, 6 pages (2 pages of English Translation and 4 pages of Official Copy).
Office Action received for Korean Patent Application No. 10-2019-7035478, dated Jan. 17, 2020, 17 pages (9 pages of English Translation and 8 pages of Official Copy).
Office Action received for Korean Patent Application No. 10-2020-0052618, dated Aug. 18, 2020, 11 pages (5 pages of English Translation and 6 pages of Official Copy).
Office Action received for Korean Patent Application No. 10-2020-7021870, dated Nov. 11, 2020, 11 pages (5 pages of English Translation and 6 pages of Official Copy).
Office Action received for Korean Patent Application No. 10-2020-7031855, dated Nov. 24, 2020, 6 pages (2 pages of English Translation and 4 pages of Official Copy).
Office Action received for Korean Patent Application No. 10-2021-0022053, dated Mar. 1, 2021, 11 pages (5 pages of English Translation and 6 pages of Official Copy).
Office Action received for Korean Patent Application No. 10-2021-7000954, dated Jan. 28, 2021, 5 pages (2 pages of English Translation and 3 pages of Official Copy).
Office Action received for Korean Patent Application No. 10-2021-7020693, dated Jul. 14, 2021, 7 pages (3 pages of English Translation and 4 pages of Official Copy).
Osxdaily, "How to Zoom the Camera on iPhone", Available Online at: https://osxdaily.com/2012/04/18/zoom-camera-iphone/, Apr. 18, 2012, 6 pages.
Paine Steve, "Samsung Galaxy Camera Detailed Overview—User Interface", Retrieved from: <https://www.youtube.com/watch?v=td8UYSySulo&feature=youtu.be>, Sep. 18, 2012, pp. 1-2.
PC World, "How to make AR Emojis on the Samsung Galaxy S9", You Tube, Available Online: https://www.youtube.com/watch?v=8wQICfulkz0, Feb. 25, 2018, 2 pages.
Phonearena, "Sony Xperia Z5 camera app and UI overview", Retrieved from <https://www.youtube.com/watch?v=UtDzdTsmkfU&feature=youtu.be>, Sep. 8, 2015, pp. 1-3.
Pre-Appeal Review Report received for Japanese Patent Application No. 2018-182607, mailed on Jan. 21, 2021, 4 pages (2 pages of English Translation and 2 pages of Official Copy).
Pre-Appeal Review Report received for Japanese Patent Application No. 2018-225131, mailed on Jan. 24, 2020, 8 pages (4 pages of English Translation and 4 pages of Official Copy).
Pre-Appeal Review Report received for Japanese Patent Application No. 2018-545502, mailed on Jan. 24, 2020, 8 pages (3 pages of English Translation and 5 pages of Official Copy).
"Procamera Capture the Moment", Online Available at: http://www.procamera-app.com/procamera_manual/ProCamera_Manual_EN.pdf, Apr. 21, 2016, 63 pages.
Result of Consultation received for European Patent Application No. 19204230.7, mailed on Nov. 16, 2020, 3 pages.
Result of Consultation received for European Patent Application No. 19204230.7, mailed on Sep. 24, 2020, 5 pages.
Result of Consultation received for European Patent Application No. 19724959.2, mailed on Sep. 4, 2020, 3 pages.
Schiffhauer Alexander, "See the Light with Night Sight", Available online at: https://www.blog.google/products/pixel/see-light-night-sight, Nov. 14, 2018, 6 pages.
Search Report and Opinion received for Danish Patent Application No. PA201770563, dated Oct. 10, 2017, 9 pages.
Search Report and Opinion received for Danish Patent Application No. PA201870366, dated Aug. 27, 2018, 9 pages.
Search Report and Opinion received for Danish Patent Application No. PA201870367, dated Aug. 27, 2018, 9 pages.
Search Report and Opinion received for Danish Patent Application No. PA201870368, dated Sep. 6, 2018, 7 pages.
Search Report and Opinion received for Danish Patent Application No. PA201870623, dated Dec. 20, 2018, 8 pages.
Search Report and Opinion received for Danish Patent Application No. PA201970592, dated Nov. 7, 2019, 8 pages.
Search Report and Opinion received for Danish Patent Application No. PA201970593, dated Oct. 29, 2019, 10 pages.
Search Report and Opinion received for Danish Patent Application No. PA201970595, dated Nov. 8, 2019, 16 pages.
Search Report and Opinion received for Danish Patent Application No. PA201970600, dated Nov. 5, 2019, 11 pages.
Search Report and Opinion received for Danish Patent Application No. PA201970603, dated Nov. 15, 2019, 9 pages.
Search Report and Opinion received for Danish Patent Application No. PA201970605, dated Nov. 12, 2019, 10 pages.
Search Report received for Danish Patent Application No. PA201770719, dated Oct. 17, 2017, 9 pages.
Shaw et al., "Skills for Closeups Photography", Watson-Guptill Publications, Nov. 1999, 5 pages (Official Copy Only). {See communication under 37 CFR § 1.98(a) (3)}.
Shiftdelete.Net, "Oppo Reno 10x Zoom Ön Inceleme—Huawei P30 Pro'ya rakip mi geliyor?". Available online at <https://www.youtube.com/watch?v=ev2wlUztdrg>, See especially 5:34-6:05., Apr. 24, 2019, 2 pages.
Smart Reviews, "Honor10 Al Camera's In Depth Review", See Especially 2:37-2:48 6:39-6:49, Available Online at <https://www.youtube.com/watch?v=oKFqRvxeDBQ>, May 31, 2018, 2 pages.
Snapchat Lenses, "How To Get All Snapchat Lenses Face Effect Filter on Android", Retrived from: <https://www.youtube.com/watch?v=OPfnF1 Rlntw&feature=youtu.be>, Sep. 21, 2015, pp. 1-2.
"Sony Xperia XZ3 Camera Review - The Colors, Duke, The Colors!", Android Headlines -Android News & Tech News, Available online at Khttps://www.youtube.com/watch?v=mwpYXzWVOgw>, See especially 1:02-1:27, 2:28-2:30, Nov. 3, 2018, 3 pages.
Sony, "User Guide, Xperia XZ3, H8416/H9436/H9493", Sony Mobile Communications Inc., Retrieved from <https://www-support-downloads.sonymobile.com/h8416/userguide_EN_H8416-H9436-H9493_2_Android9.0.pdf>, See pp. 86-102., 2018, 121 p.
Summons to Attend Oral Proceedings received for European Patent Application No. 19204230.7, mailed on May 25, 2021, 10 pages.
Summons to Attend Oral Proceedings received for European Patent Application No. 19724959.2, mailed on Feb. 1, 2021,9 pages.
Summons to Attend Oral Proceedings received for European Patent Application No. 19724959.2, mailed on Mar. 31, 2021,3 pages.
Supplemental Notice of Allowance received for U.S. Appl. No. 16/143,201, mailed on Dec. 13, 2018, 2 pages.
Supplemental Notice of Allowance received for U.S. Appl. No. 16/143,201, dated Dec. 19, 2018, 2 pages.
Supplemental Notice of Allowance received for U.S. Appl. No. 16/143,201, dated Jan. 10, 2019, 2 pages.
Supplemental Notice of Allowance received for U.S. Appl. No. 16/733,718, dated Mar. 9, 2021, 21 pages.

(56) References Cited

OTHER PUBLICATIONS

Supplemental Notice of Allowance received for U.S. Appl. No. 16/733,718, dated Mar. 29, 2021, 2 pages.
Supplementary European Search Report received for European Patent Application No. 18176890.4, dated Sep. 20, 2018, 4 pages.
Supplementary European Search Report received for European Patent Application No. 18183054.8, dated Oct. 11, 2018, 4 pages.
Tech With Brett, "How to Create Your AR Emoji on the Galaxy S9 and S9+", Available online at: <https://www.youtube.com/watch?v=HHMdcBpC8MQ>, Mar. 16, 2018, 5 pages.
Techtag, "Samsung J5 Prime Camera Review | True Review", Available online at :-https://www.youtube.com/watch?v=a_p906ai6PQ, Oct. 26, 2016, 3 pages.
Techtag, "Samsung J7 Prime Camera Review (Technical Camera)", Available Online at:-https://www.youtube.com/watch?v=AJPcLP8GpFQ, Oct. 4, 2016, 3 pages.
Telleen et al., "Synthetic Shutter Speed Imaging", University of California, Santa Cruz, vol. 26, No. 3, 2007, 8 pages.
The Nitpicker, "Sony Xperia XZ3 | in-depth Preview", Available online at <https://www.youtube.com/watch?v=TGCKxBuiO5c>, See especially 12:40-17:25, Oct. 7, 2018, 3 pages.
Tico et al., "Robust method of digital image stabilization", Nokia Research Center, ISCCSP, Malta, Mar. 12-14, 2008, pp. 316-321.
Vickgeek, "Canon 80D Live View Tutorial | Enhance your image quality", Available online at:- https://www.youtube.com/watch?v=JGNCiy6Wt9c, Sep. 27, 2016, 3 pages.
Vivo India, "Bokeh Mode | Vivo V9", Available Online at <https://www.youtube.com/watch?v=B5AIHhH5Rxs>, Mar. 25, 2018, 3 pages.
Wong Richard, "Huawei Smartphone (P20/P10/P9, Mate 10/9) Wide Aperture Mode Demo", Available Online at <https://www.youtube.com/watch?v=eLY3LsZGDPA>, May 7, 2017, 2 pages.
Xeetechcare, "Samsung Galaxy S10—Super Night Mode & Ultra Fast Charging!", Online Available at: https://www.youtube.com/watch?v=3bguV4FX6aA, Mar. 28, 2019, 4 pages.
X-TECH, "Test Make up via Slick Augmented Reality Mirror Without Putting It on", Available Online at: http://x-tech.am/test-make-up-via-slick-augmented-reality-mirror-without-putting-it-on/, Nov. 29, 2014, 5 pages.
Decision on Appeal received for U.S. Appl. No. 16/144,629, dated Jan. 18, 2022, 8 pages.
Invitation to Pay Additional Fees received for PCT Patent Application No. PCT/US2021/046877, dated Jan. 5, 2022, 10 pages.
Notice of Allowance received for Korean Patent Application No. 10-2021-7020693, dated Dec. 27, 2021, 5 pages (1 page of English Translation and 4 pages of Official Copy).
Notice of Allowance received for Korean Patent Application No. 10-2021-7035687, dated Dec. 30, 2021, 5 pages (1 page of English Translation and 4 pages of Official Copy).
Notice of Allowance received for U.S. Appl. No. 16/528,257, dated Jan. 14, 2022, 10 pages.
Office Action received for Japanese Patent Application No. 2020-159338, dated Dec. 8, 2021, 9 pages (5 pages of English Translation and 4 pages of Official Copy).
Applicant-Initiated Interview Summary received for U.S. Appl. No. 17/220,596, dated Aug. 18, 2021, 3 pages.
Corrected Notice of Allowance received for U.S. Appl. No. 17/220,596, dated Nov. 4, 2021, 3 pages.
Corrected Notice of Allowance received for U.S. Appl. No. 17/220,596, dated Nov. 18, 2021, 27 pages.
Examiner-Initiated Interview Summary received for U.S. Appl. No. 17/220,596, dated Oct. 7, 2021, 2 pages.
King, Julie A., "How to Check the Exposure Meter on Your Nikon D5500", Online available at: https://www.dummies.com/article/home-auto-hobbies/photography/how-to-check-the-exposuremeter-on-your-nikon-d5500-142677, Mar. 26, 2016, 6 pages.
Non-Final Office Action received for U.S. Appl. No. 17/220,596, dated Jun. 10, 2021, 31 pages.
Notice of Allowance received for U.S. Appl. No. 17/220,596, dated Oct. 21, 2021, 43 pages.
Office Action received for Australian Patent Application No. 2020239717, dated Dec. 15, 2021, 6 pages.
Office Action received for Chinese Patent Application No. 202010287950.2, dated Nov. 19, 2021, 8 pages (5 pages of English Translation and 3 pages of Official Copy).
Office Action received for Indian Patent Application No. 202014041530, dated Dec. 8, 2021, 7 pages.
Office Action received for Korean Patent Application No. 10-2021-7036337, dated Dec. 8, 2021, 6 pages (2 pages of English Translation and 4 pages of Official Copy).
Whitacre, Michele, "Photography 101 | Exposure Meter", Online available at: https://web.archive.org/web/20160223055834/http://www.michelewhitacrephotographyblog.com, Feb. 23, 2016, 4 pages.
101931691, CN, A, Cited by Chinese Patent Office in an Office Action for related Patent Application No. 202010600197.8 dated Feb. 9, 2022, Source NPL Cite No. 18.
105338256, CN, A, Cited by Chinese Patent Office in an Office Action for related Patent Application No. 202010287950.2 dated Mar. 22, 2022, Source NPL Cite No. 17.
106791357, CN, A, Cited by Chinese Patent Office in an Office Action for related Patent Application No. 202010287950.2 dated Mar. 22, 2022, Source NPL Cite No. 17.
106791420, CN, A, Cited by Chinese Patent Office in an Office Action for related Patent Application No. 202180002106.3 dated Feb. 16, 2022, Source NPL Cite No. 33.
10-2005-0086630, KR, A, Cited by Korean Patent Office in an Office Action for related Patent Application No. 10-2022-7002829 dated Feb. 12, 2022, Source NPL Cite No. 21.
Corrected Notice of Allowance received for U.S. Appl. No. 16/144,629, dated Apr. 21, 2022, 5 pages.
Corrected Notice of Allowance received for U.S. Appl. No. 16/528,257, dated Feb. 3, 2022, 2 pages.
Corrected Notice of Allowance received for U.S. Appl. No. 17/354,376, dated Apr. 11, 2022, 5 pages.
Corrected Notice of Allowance received for U.S. Appl. No. 17/354,376, dated Feb. 16, 2022, 5 pages.
Corrected Notice of Allowance received for U.S. Appl. No. 17/354,376, dated Mar. 23, 2022, 6 pages.
Corrected Notice of Allowance received for U.S. Appl. No. 17/484,307, dated Apr. 20, 2022, 2 pages.
Corrected Notice of Allowance received for U.S. Appl. No. 17/484,307, dated Feb. 10, 2022, 7 pages.
Corrected Notice of Allowance received for U.S. Appl. No. 17/484,321, dated Mar. 24, 2022, 2 pages.
Decision to Grant received for Danish Patent Application No. PA201770719, dated Feb. 3, 2022, 2 pages.
Decision to Grant received for Japanese Patent Application No. 2018-182607, dated Apr. 13, 2022, 3 pages (1 page of English Translation and 2 pages of Official Copy).
Decision to Grant received for Japanese Patent Application No. 2019-566087, dated Jan. 26, 2022, 2 pages (1 page of English Translation and 1 page of Official Copy).
Decision to Refuse received for European Patent Application No. 19204230.7, dated Feb. 4, 2022, 15 pages.
Extended European Search Report received for European Patent Application No. 22151131.4, dated Mar. 24, 2022, 6 pages.
International Search Report and Written Opinion received for PCT Patent Application No. PCT/US2021/046877, dated Mar. 1, 2022, 17 pages.
Minutes of the Oral Proceedings received for European Patent Application No. 19204230.7, dated Feb. 2, 2022, 9 pages.
Notice of Acceptance received for Australian Patent Application No. 2022200966, dated Feb. 25, 2022, 3 pages.
Notice of Allowance received for Chinese Patent Application No. 202010287950.2, dated Mar. 22, 2022, 7 pages (3 pages of English Translation and 4 pages of Official Copy).
Notice of Allowance received for Chinese Patent Application No. 202010600197.8, dated Feb. 9, 2022, 5 pages (1 page of English Translation and 4 pages of Official Copy).
Notice of Allowance received for Chinese Patent Application No. 202011480411.7, dated Feb. 18, 2022, 6 pages (3 pages of English Translation and 3 pages of Official Copy).

(56) References Cited

OTHER PUBLICATIONS

Notice of Allowance received for Korean Patent Application No. 10-2021-7036337, dated Apr. 5, 2022, 4 pages (1 page of English Translation and 3 pages of Official Copy).
Notice of Allowance received for Korean Patent Application No. 10-2022-7002829, dated Feb. 12, 2022, 6 pages (1 page of English Translation and 5 pages of Official Copy).
Notice of Allowance received for U.S. Appl. No. 16/144,629, dated Apr. 7, 2022, 8 pages.
Notice of Allowance received for U.S. Appl. No. 17/354,376, dated Jan. 27, 2022, 10 pages.
Notice of Allowance received for U.S. Appl. No. 17/354,376, dated Mar. 4, 2022, 5 pages.
Notice of Allowance received for U.S. Appl. No. 17/354,376, dated Mar. 30, 2022, 5 pages.
Notice of Allowance received for U.S. Appl. No. 17/484,307, dated Mar. 8, 2022, 11 pages.
Office Action received for Australian Patent Application No. 2019338180, dated Feb. 18, 2022, 3 pages.
Office Action received for Australian Patent Application No. 2020239717, dated Mar. 16, 2022, 4 pages.
Office Action received for Australian Patent Application No. 2021107587, dated Feb. 1, 2022, 6 pages.
Office Action received for Australian Patent Application No. 2021201295, dated Jan. 14, 2022, 3 pages.
Office Action received for Chinese Patent Application No. 202011480411.7, dated Jan. 12, 2022, 7 pages (4 pages of English Translation and 3 pages of Official Copy).
Office Action received for Chinese Patent Application No. 202110766668.7, dated Feb. 16, 2022, 12 pages (6 pages of English Translation and 6 pages of Official Copy).
Office Action received for Chinese Patent Application No. 202180002106.3, dated Feb. 16, 2022, 12 pages (6 pages of English Translation and 6 pages of Official Copy).
Office Action received for European Patent Application No. 20206197.4, dated Mar. 18, 2022, 7 pages.
Office Action received for Indian Patent Application No. 201818025015, dated Feb. 4, 2022, 7 pages.
Office Action received for Indian Patent Application No. 201818046896, dated Feb. 2, 2022, 7 pages.
Office Action received for Indian Patent Application No. 202118021941, dated Mar. 23, 2022, 5 pages.
Office Action received for Korean Patent Application No. 10-2022-7006310, dated Mar. 8, 2022, 6 pages (2 pages of English Translation and 4 pages of Official Copy).
Record of Oral Hearing received for U.S. Appl. No. 16/144,629, dated Jan. 28, 2022, 13 pages.
Supplemental Notice of Allowance received for U.S. Appl. No. 17/484,321, dated Mar. 1, 2022, 6 pages.
Demetriou Soteris, "Analyzing & Designing the Security of Shared Resources on Smartphone Operating Systems", Dissertation, University of Illinois at Urbana-Champaign Online available at https://www.ideals.illinois.edu/bitstream/handle/2142/100907/DEMETRIOU-DISSERTATION-2018.pdf?sequence=1&isAllowed=n, 2018, 211 pages.
Dutta Tushars, "Warning! iOS Apps with Camera Access Permission Can Spy on You", Online available at https://web.archive.org/web/20180219092123/https://techviral.net/ios-apps-camera-can-spy/, Feb. 19, 2018, 3 pages.
Wu et al., "Security Threats to Mobile Multimedia Applications: Camera-Based Attacks on Mobile Phones", IEEE Communications Magazine, Available online at: http://www.ieeeprojectmadurai.in/BASE/ANDROID/Security%20Threats%20to%20Mobile.pdf, Mar. 2014, pp. 80-87.

* cited by examiner

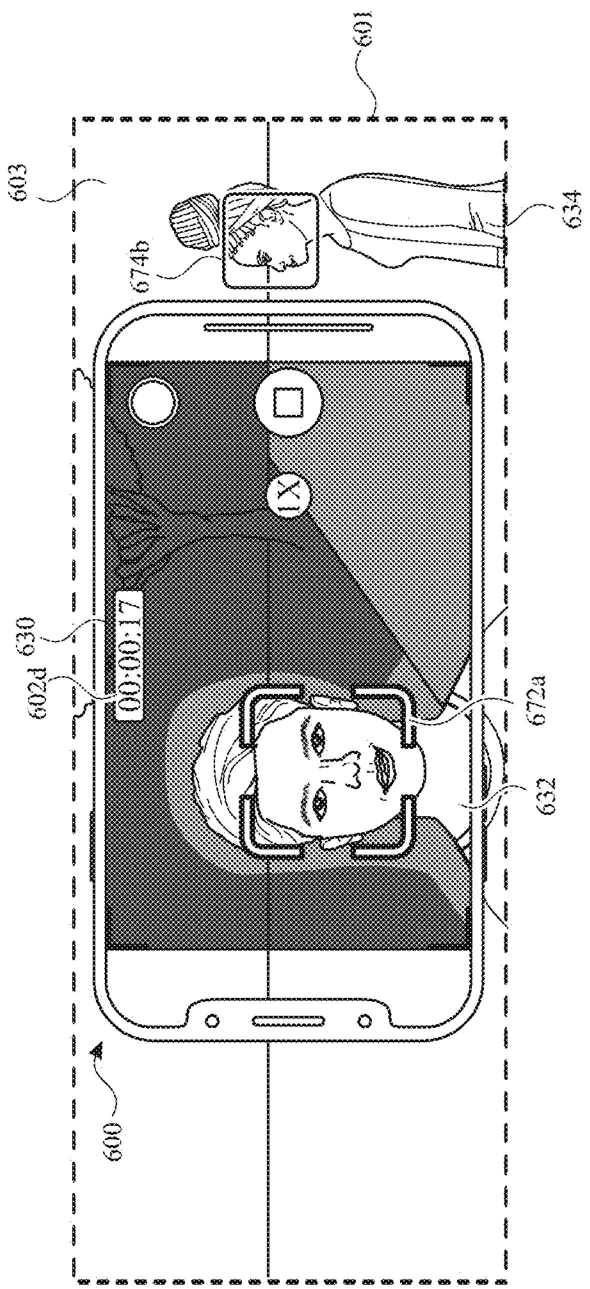
FIG. 6R1

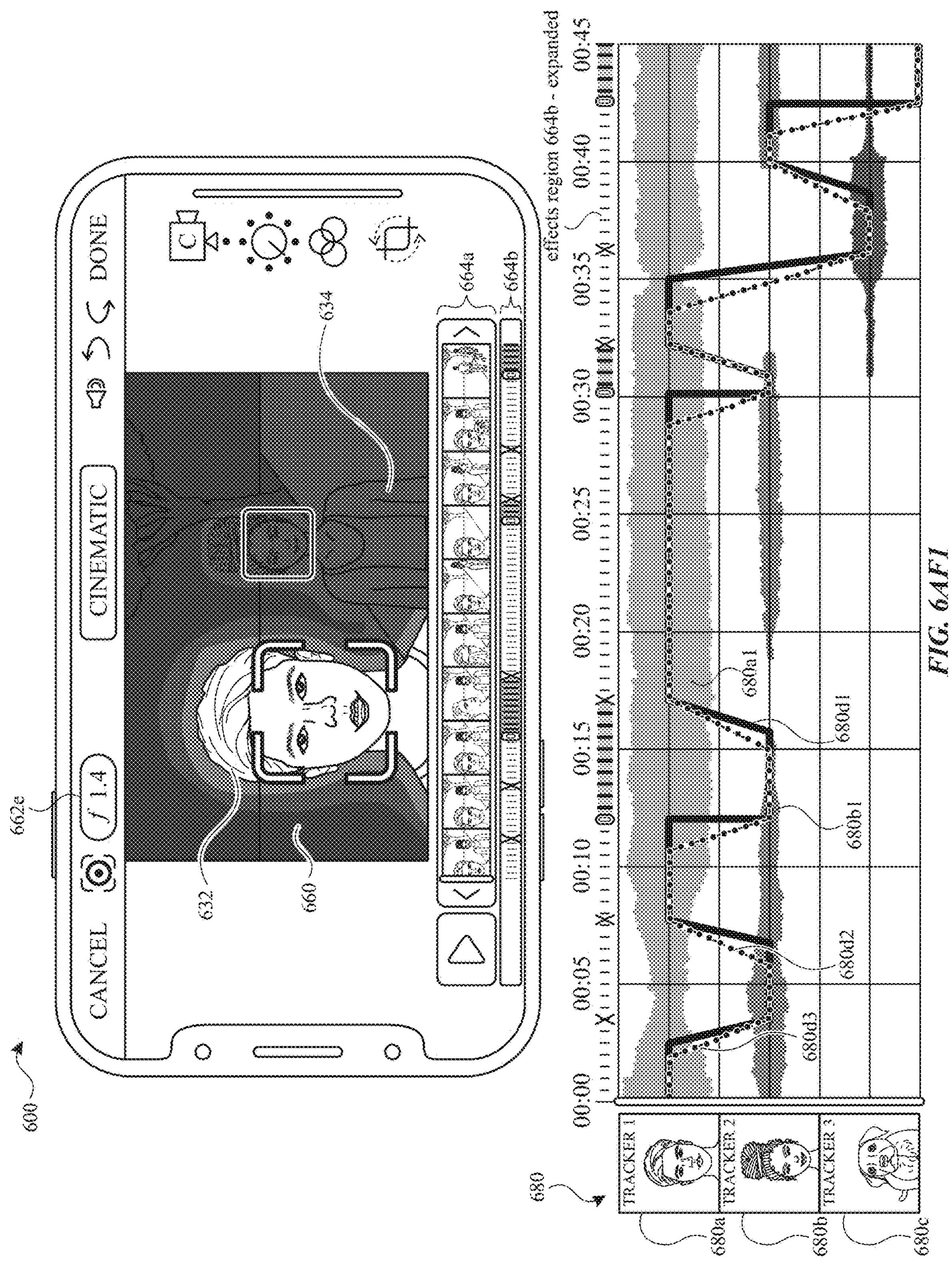
FIG. 6AF1

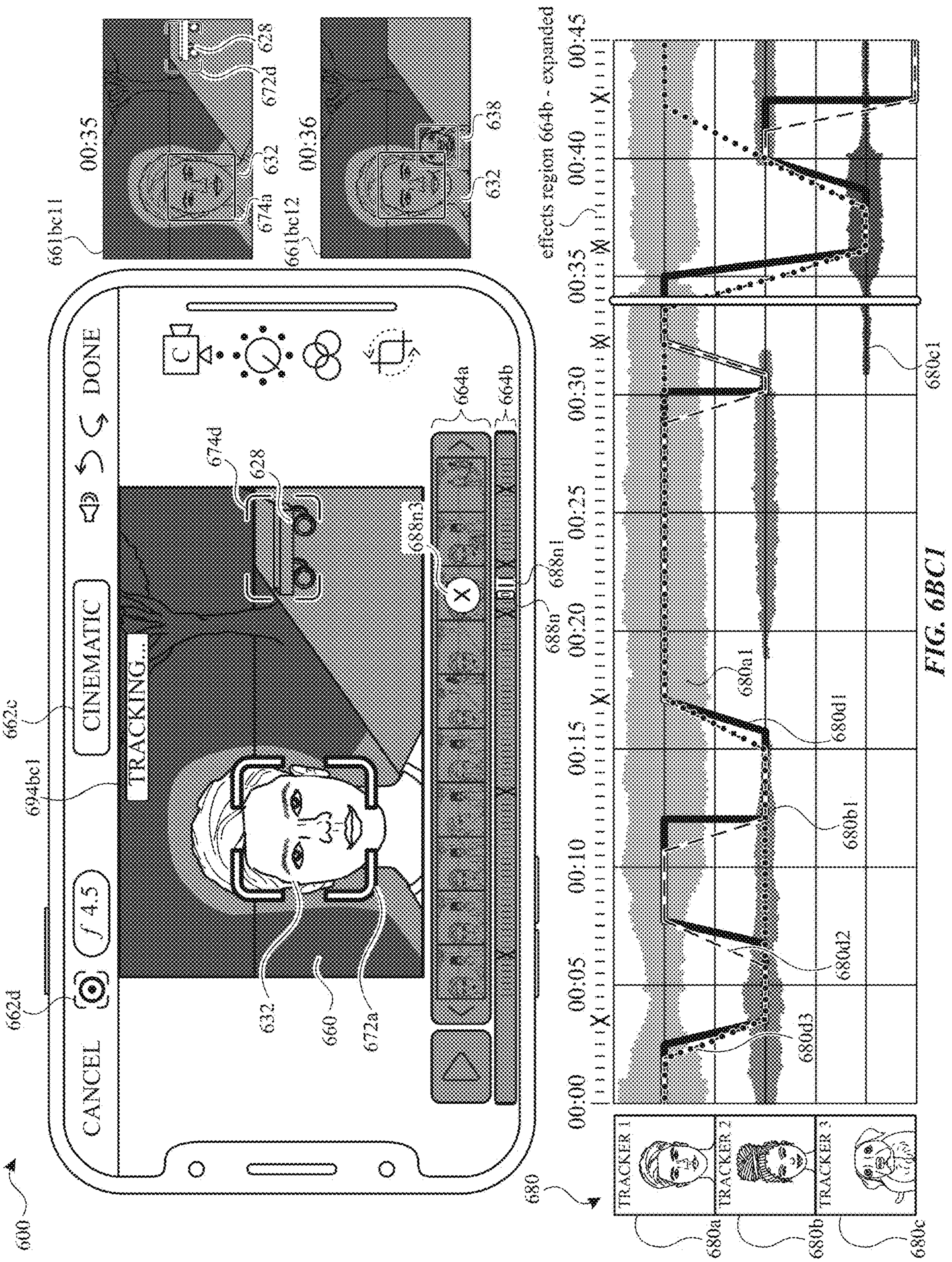
FIG. 6BC1

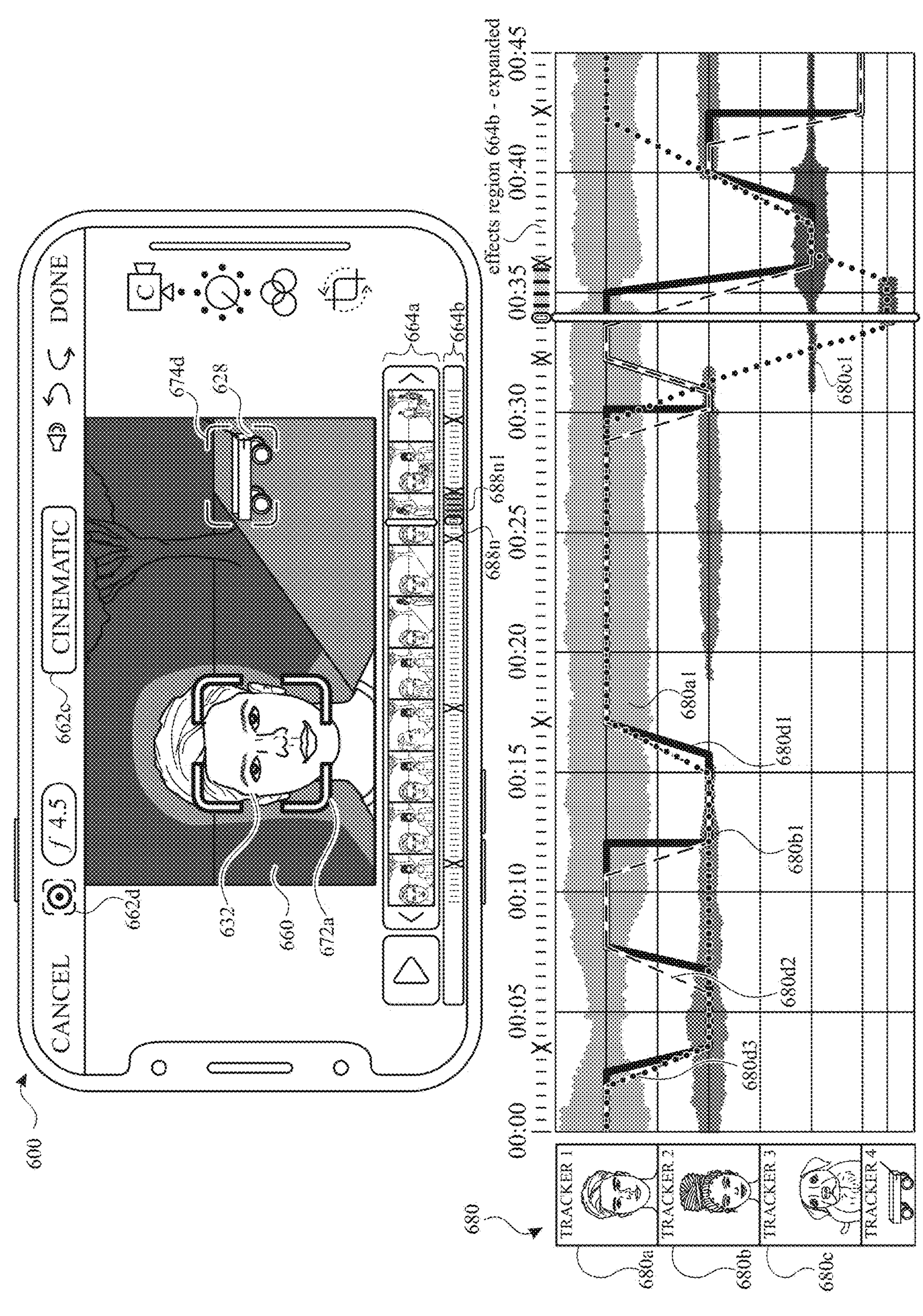
FIG. 6BC2

Figure 7:
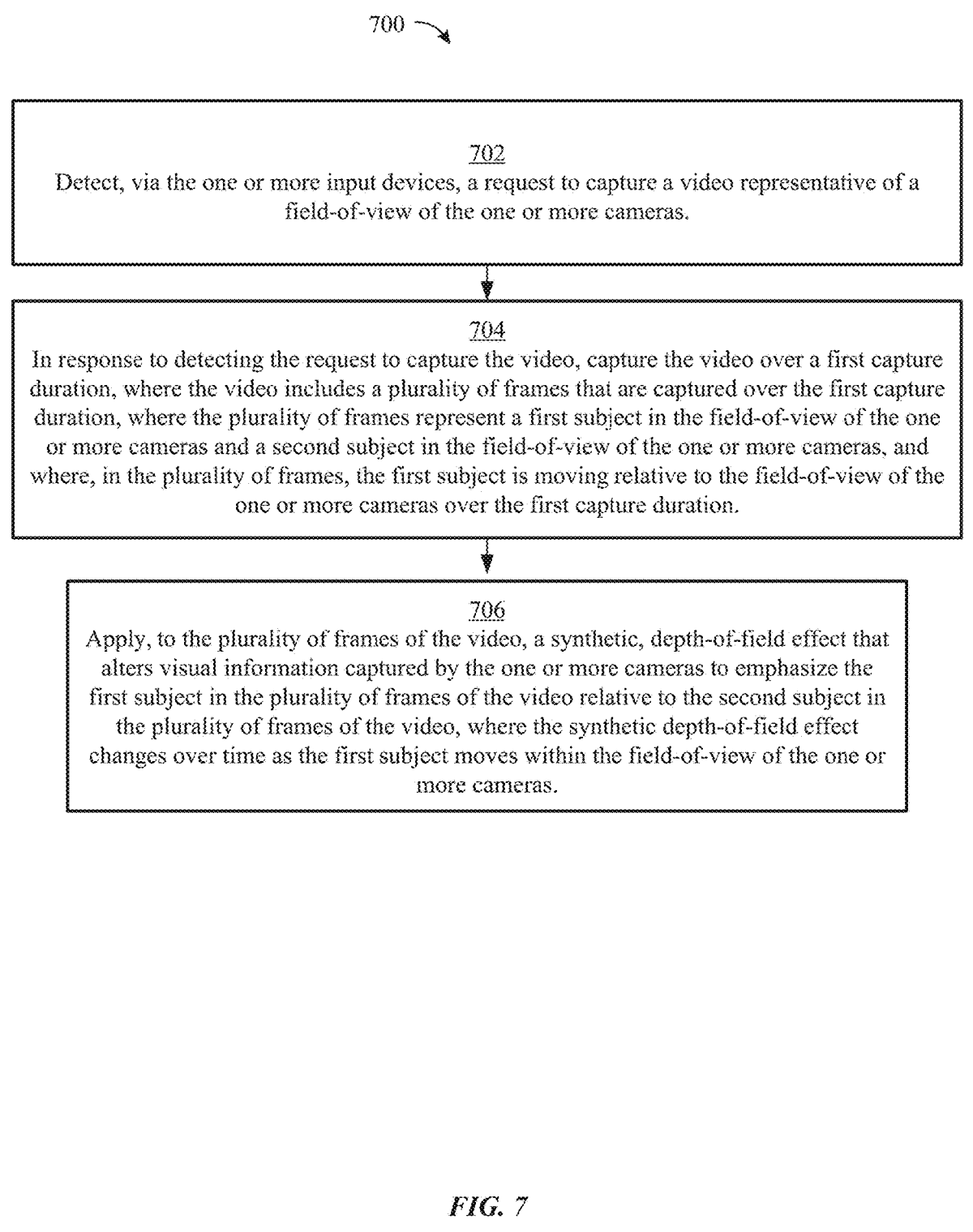

700

702
Detect, via the one or more input devices, a request to capture a video representative of a field-of-view of the one or more cameras.

704
In response to detecting the request to capture the video, capture the video over a first capture duration, where the video includes a plurality of frames that are captured over the first capture duration, where the plurality of frames represent a first subject in the field-of-view of the one or more cameras and a second subject in the field-of-view of the one or more cameras, and where, in the plurality of frames, the first subject is moving relative to the field-of-view of the one or more cameras over the first capture duration.

706
Apply, to the plurality of frames of the video, a synthetic, depth-of-field effect that alters visual information captured by the one or more cameras to emphasize the first subject in the plurality of frames of the video relative to the second subject in the plurality of frames of the video, where the synthetic depth-of-field effect changes over time as the first subject moves within the field-of-view of the one or more cameras.

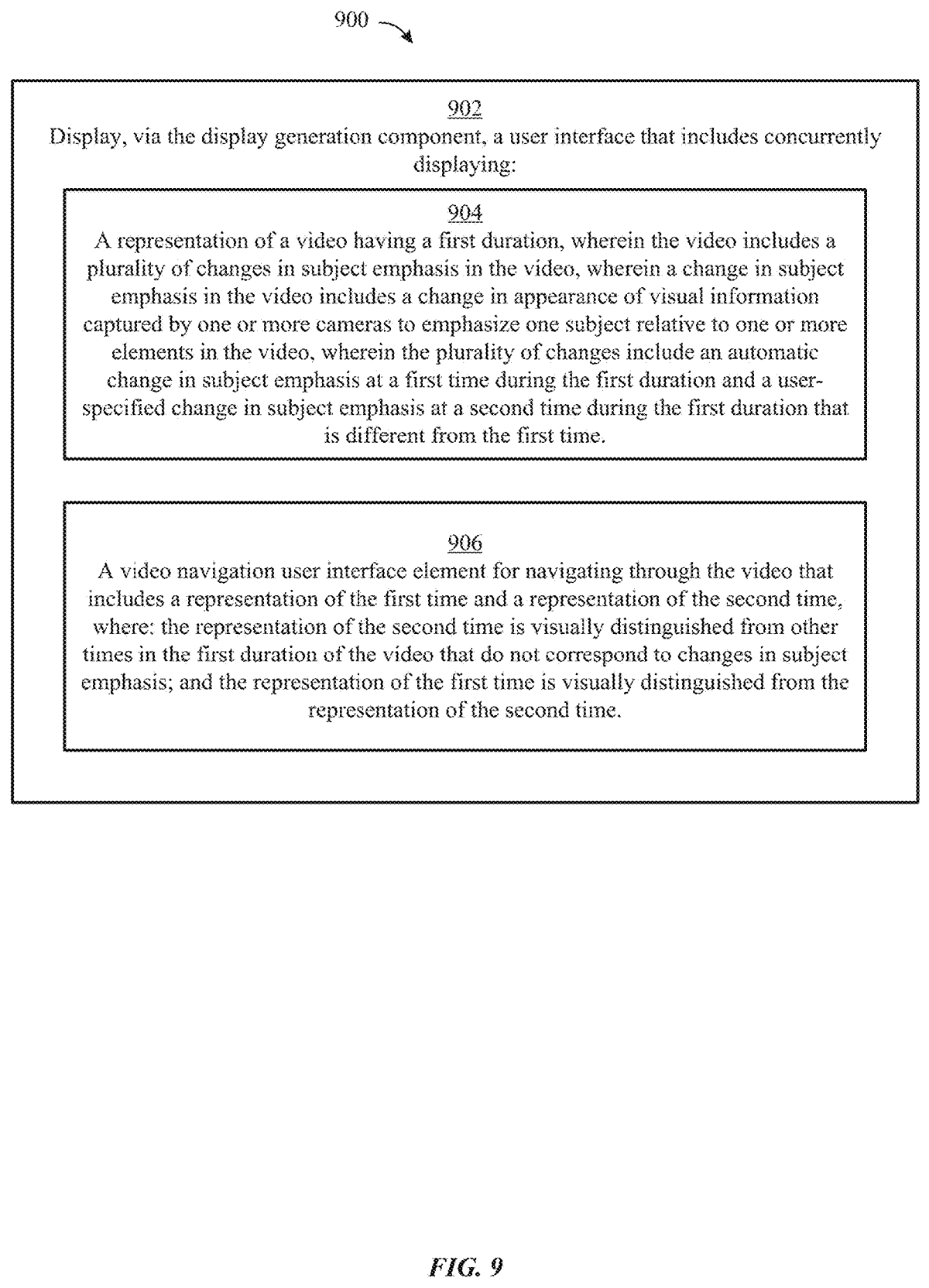

902
Display, via the display generation component, a user interface that includes concurrently displaying:

904
A representation of a video having a first duration, wherein the video includes a plurality of changes in subject emphasis in the video, wherein a change in subject emphasis in the video includes a change in appearance of visual information captured by one or more cameras to emphasize one subject relative to one or more elements in the video, wherein the plurality of changes include an automatic change in subject emphasis at a first time during the first duration and a user-specified change in subject emphasis at a second time during the first duration that is different from the first time.

906
A video navigation user interface element for navigating through the video that includes a representation of the first time and a representation of the second time, where: the representation of the second time is visually distinguished from other times in the first duration of the video that do not correspond to changes in subject emphasis; and the representation of the first time is visually distinguished from the representation of the second time.

*FIG. 9*

| | CAM 1 | CAM 2 | CAM 3 |
|---|---|---|---|
| MINIMUM FOCAL DISTANCE | A | B | C |
| MAXIMUM FIELD OF VIEW | X | Y | Z |

| | CAM 1 | CAM 2 | CAM 3 |
|---|---|---|---|
| MINIMUM FOCAL DISTANCE | A | B | C |
| MAXIMUM FIELD OF VIEW | X | Y | Z |

| | CAM 1 | CAM 2 | CAM 3 |
|---|---|---|---|
| MINIMUM FOCAL DISTANCE | A | B | C |
| MAXIMUM FIELD OF VIEW | X | Y | Z |

| | CAM 1 | CAM 2 | CAM 3 |
|---|---|---|---|
| MINIMUM FOCAL DISTANCE | A | B | C |
| MAXIMUM FIELD OF VIEW | X | Y | Z |

| | CAM 1 | CAM 2 | CAM 3 |
|---|---|---|---|
| MINIMUM FOCAL DISTANCE | A | B | C |
| MAXIMUM FIELD OF VIEW | X | Y | Z |

A < B < C
X > Y > Z

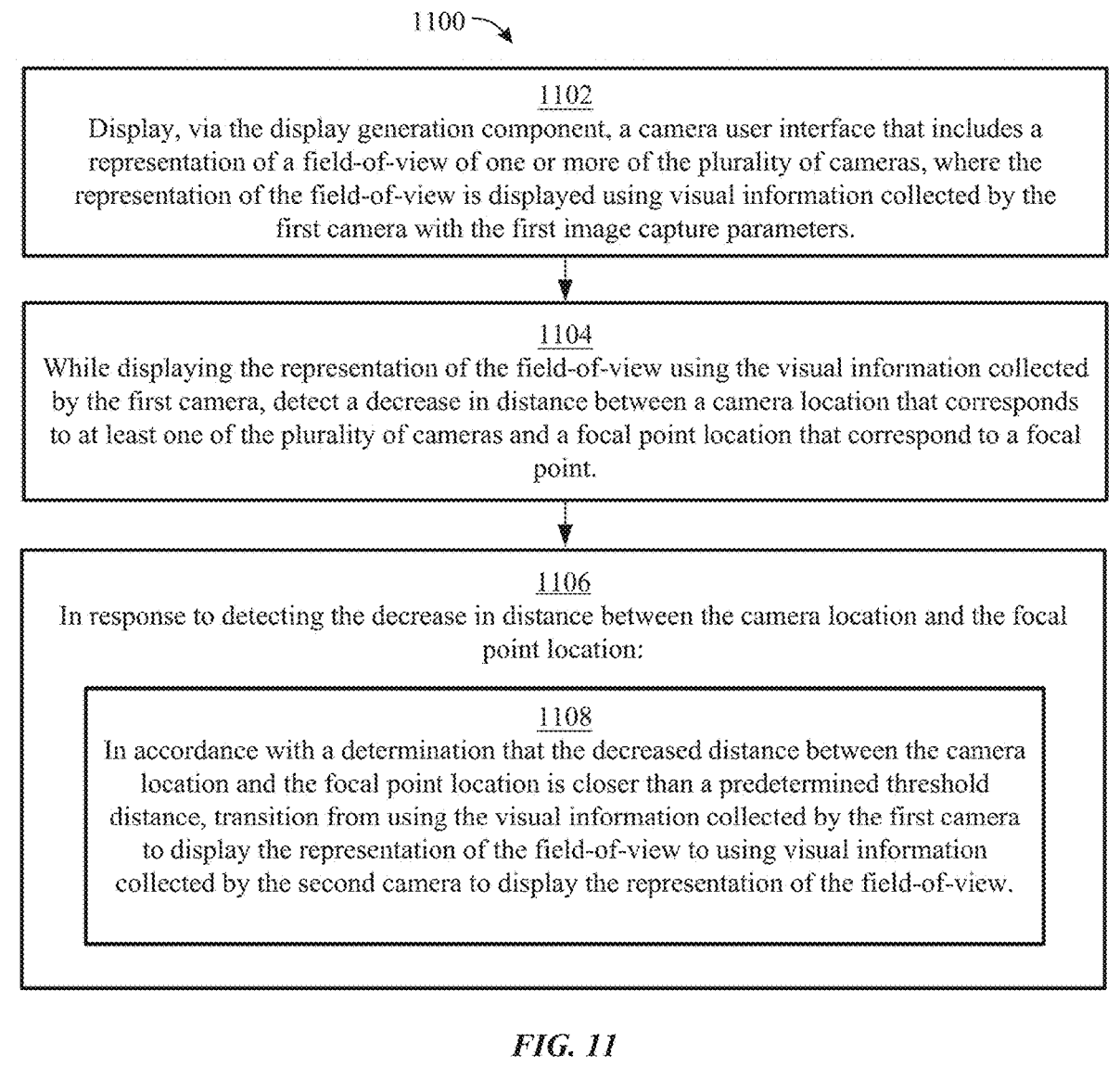

1100

1102
Display, via the display generation component, a camera user interface that includes a representation of a field-of-view of one or more of the plurality of cameras, where the representation of the field-of-view is displayed using visual information collected by the first camera with the first image capture parameters.

1104
While displaying the representation of the field-of-view using the visual information collected by the first camera, detect a decrease in distance between a camera location that corresponds to at least one of the plurality of cameras and a focal point location that correspond to a focal point.

1106
In response to detecting the decrease in distance between the camera location and the focal point location:

1108
In accordance with a determination that the decreased distance between the camera location and the focal point location is closer than a predetermined threshold distance, transition from using the visual information collected by the first camera to display the representation of the field-of-view to using visual information collected by the second camera to display the representation of the field-of-view.

*FIG. 11*

USER INTERFACES FOR ALTERING VISUAL MEDIA

CROSS-REFERENCE TO RELATED APPLICATIONS

This application claims priority to U.S. Provisional Patent Application Ser. No. 63/182,751, entitled "USER INTERFACES FOR ALTERING VISUAL MEDIA," filed on Apr. 30, 2021, U.S. Provisional Patent Application Ser. No. 63/197,460, entitled "USER INTERFACES FOR ALTERING VISUAL MEDIA," filed on Jun. 6, 2021, U.S. Provisional Patent Application Ser. No. 63/243,724, entitled "USER INTERFACES FOR ALTERING VISUAL MEDIA," filed on Sep. 13, 2021, and U.S. Provisional Patent Application Ser. No. 63/244,213, entitled "USER INTERFACES FOR ALTERING VISUAL MEDIA," filed Sep. 14, 2021. The contents of these applications are hereby incorporated by reference in their entireties.

FIELD

The present disclosure relates generally to computer user interfaces and related techniques, and more specifically to user interfaces and techniques for altering visual media.

BACKGROUND

Users of smartphones and other personal electronic devices frequently capture, store, and edit media for safe-keeping memories and sharing with friends. Some existing techniques allowed users to capture media, such as images, audio, and/or videos. Users can manage such media by, for example, capturing, storing, and editing the media.

BRIEF SUMMARY

Some techniques for altering visual information using computer systems and other electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for altering visual content, including applying a synthetic depth-of-field effect to the visual content to emphasize portions of media. Such methods and interfaces optionally complement or replace other methods for altering visual content. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with one or more cameras and one or more input devices is described. The method comprises: detecting, via the one or more input devices, a request to capture a video representative of a field-of-view of the one or more cameras; in response to detecting the request to capture the video: capturing the video over a first capture duration, where the video includes a plurality of frames that are captured over the first capture duration, where the plurality of frames represent a first subject in the field-of-view of the one or more cameras and a second subject in the field-of-view of the one or more cameras, and where, in the plurality of frames, the first subject is moving relative to the field-of-view of the one or more cameras over the first capture duration; applying, to the plurality of frames of the video, a synthetic depth-of-field effect that alters visual information captured by the one or more cameras to emphasize the first subject in the plurality of frames of the video relative to the second subject in the plurality of frames of the video, where the synthetic depth-of-field effect changes over time as the first subject moves within the field-of-view of the one or more cameras.

In accordance with some embodiments, a non-transitory computer-readable storage medium is described. The non-transitory computer-readable storage medium stores one or more programs configured to be executed by one or more processors of a computer system that is in communication with one or more cameras and one or more input devices, the one or more programs including instructions for: detecting, via the one or more input devices, a request to capture a video representative of a field-of-view of the one or more cameras; in response to detecting the request to capture the video: capturing the video over a first capture duration, where the video includes a plurality of frames that are captured over the first capture duration, where the plurality of frames represent a first subject in the field-of-view of the one or more cameras and a second subject in the field-of-view of the one or more cameras, and where, in the plurality of frames, the first subject is moving relative to the field-of-view of the one or more cameras over the first capture duration; applying, to the plurality of frames of the video, a synthetic depth-of-field effect that alters visual information captured by the one or more cameras to emphasize the first subject in the plurality of frames of the video relative to the second subject in the plurality of frames of the video, where the synthetic depth-of-field effect changes over time as the first subject moves within the field-of-view of the one or more cameras.

In accordance with some embodiments, a transitory computer-readable storage medium is described. The transitory computer-readable storage medium stores one or more programs configured to be executed by one or more processors that is in communication with one or more cameras and one or more input devices, the one or more programs including instructions for detecting, via the one or more input devices, a request to capture a video representative of a field-of-view of the one or more cameras; in response to detecting the request to capture the video: capturing the video over a first capture duration, where the video includes a plurality of frames that are captured over the first capture duration, where the plurality of frames represent a first subject in the field-of-view of the one or more cameras and a second subject in the field-of-view of the one or more cameras, and where, in the plurality of frames, the first subject is moving relative to the field-of-view of the one or more cameras over the first capture duration; applying, to the plurality of frames of the video, a synthetic depth-of-field effect that alters visual information captured by the one or more cameras to emphasize the first subject in the plurality of frames of the video relative to the second subject in the plurality of frames of the video, where the synthetic depth-of-field effect changes over time as the first subject moves within the field-of-view of the one or more cameras.

In accordance with some embodiments, a computer system is described. The computer system is configured to communicate with one or more cameras and one or more input devices. The computer system comprises: one or more processors; and memory storing one or more programs configured to be executed by the one or more processors, the one or more programs including instructions for: detecting, via the one or more input devices, a request to capture a video representative of a field-of-view of the one or more cameras; in response to detecting the request to capture the video: capturing the video over a first capture duration, where the video includes a plurality of frames that are captured over the first capture duration, where the plurality of frames represent a first subject in the field-of-view of the one or more cameras and a second subject in the field-of-view of the one or more cameras, and where, in the plurality of frames, the first subject is moving relative to the field-of-view of the one or more cameras over the first capture duration; applying, to the plurality of frames of the video, a synthetic depth-of-field effect that alters visual information captured by the one or more cameras to emphasize the first subject in the plurality of frames of the video relative to the second subject in the plurality of frames of the video, where the synthetic depth-of-field effect changes over time as the first subject moves within the field-of-view of the one or more cameras.

In accordance with some embodiments, a computer system is described. The computer system is configured to communicate with one or more cameras and one or more input devices. The computer system comprises: means for detecting, via the one or more input devices, a request to capture a video representative of a field-of-view of the one or more cameras; means, responsive to detecting the request to capture the video, for: capturing the video over a first capture duration, where the video includes a plurality of frames that are captured over the first capture duration, where the plurality of frames represent a first subject in the field-of-view of the one or more cameras and a second subject in the field-of-view of the one or more cameras, and where, in the plurality of frames, the first subject is moving relative to the field-of-view of the one or more cameras over the first capture duration; and means for applying, to the plurality of frames of the video, a synthetic depth-of-field effect that alters visual information captured by the one or more cameras to emphasize the first subject in the plurality of frames of the video relative to the second subject in the plurality of frames of the video, where the synthetic depth-of-field effect changes over time as the first subject moves within the field-of-view of the one or more cameras.

In accordance with some embodiments, a computer program product is described. The computer program product comprises: one or more programs configured to be executed by one or more processors of a computer system that is in communication with one or more cameras and one or more input devices, the one or more programs including instructions for: detecting, via the one or more input devices, a request to capture a video representative of a field-of-view of the one or more cameras; in response to detecting the request to capture the video: capturing the video over a first capture duration, where the video includes a plurality of frames that are captured over the first capture duration, where the plurality of frames represent a first subject in the field-of-view of the one or more cameras and a second subject in the field-of-view of the one or more cameras, and where, in the plurality of frames, the first subject is moving relative to the field-of-view of the one or more cameras over the first capture duration; applying, to the plurality of frames of the video, a synthetic depth-of-field effect that alters visual information captured by the one or more cameras to emphasize the first subject in the plurality of frames of the video relative to the second subject in the plurality of frames of the video, where the synthetic depth-of-field effect changes over time as the first subject moves within the field-of-view of the one or more cameras.

In accordance with some embodiments, a method performed at a computer system that is in communication with one or more cameras, a display generation component, and one or more input devices is described. The method comprises: displaying, via the display generation component, a user interface that includes: a representation of a video that includes a plurality of frames, the representation including a first subject and a second subject; and a first user interface object indicating that the first subject is being emphasized by a synthetic depth-of-field effect that alters visual information captured by the one or more cameras to emphasize the first subject in the plurality of frames relative to the second subject; while displaying the user interface that includes the representation of the video and the first user interface object, detecting, via the one or more input devices, a gesture that corresponds to selection of the second subject in the representation of the video; and in response to detecting the gesture that corresponds to selection of the second subject in the representation of the video: changing the synthetic depth-of-field effect to alter the visual information captured by the one or more cameras to emphasize the second subject in the plurality of frames relative to the first subject, and displaying a second user interface object indicating that the second subject is being emphasized by the changed synthetic depth-of-field effect that alters the visual information captured by the one or more cameras to emphasize the second subject in the plurality of frames relative to the first subject.

In accordance with some embodiments, a non-transitory computer-readable storage medium is described. The non-transitory computer-readable storage medium stores one or more programs configured to be executed by one or more processors of a computer system that is in communication with one or more cameras, a display generation component, and one or more input devices, the one or more programs including instructions for: displaying, via the display generation component, a user interface that includes: a representation of a video that includes a plurality of frames, the representation including a first subject and a second subject; and a first user interface object indicating that the first subject is being emphasized by a synthetic depth-of-field effect that alters visual information captured by the one or more cameras to emphasize the first subject in the plurality of frames relative to the second subject; while displaying the user interface that includes the representation of the video and the first user interface object, detecting, via the one or more input devices, a gesture that corresponds to selection of the second subject in the representation of the video; and in response to detecting the gesture that corresponds to selection of the second subject in the representation of the video: changing the synthetic depth-of-field effect to alter the visual information captured by the one or more cameras to emphasize the second subject in the plurality of frames relative to the first subject, and displaying a second user interface object indicating that the second subject is being emphasized by the changed synthetic depth-of-field effect that alters the visual information captured by the one or more cameras to emphasize the second subject in the plurality of frames relative to the first subject.

In accordance with some embodiments, a transitory computer-readable storage medium is described. The transitory computer-readable storage medium stores one or more programs configured to be executed by one or more processors of a computer system that is in communication with one or more cameras, a display generation component, and one or more input devices, the one or more programs including instructions for: displaying, via the display generation component, a user interface that includes: a representation of a video that includes a plurality of frames, the representation including a first subject and a second subject; and a first user interface object indicating that the first subject is being emphasized by a synthetic depth-of-field effect that alters visual information captured by the one or more cameras to emphasize the first subject in the plurality of frames relative to the second subject; while displaying the user interface that includes the representation of the video and the first user interface object, detecting, via the one or more input devices, a gesture that corresponds to selection of the second subject in the representation of the video; and in response to detecting the gesture that corresponds to selection of the second subject in the representation of the video: changing the synthetic depth-of-field effect to alter the visual information captured by the one or more cameras to emphasize the second subject in the plurality of frames relative to the first subject, and displaying a second user interface object indicating that the second subject is being emphasized by the changed synthetic depth-of-field effect that alters the visual information captured by the one or more cameras to emphasize the second subject in the plurality of frames relative to the first subject.

In accordance with some embodiments, a computer system is described. The computer system is configured to communicate with one or more cameras; a display generation component; and one or more input devices. The computer system comprises: one or more processors; and memory storing one or more programs configured to be executed by the one or more processors, the one or more programs including instructions for: displaying, via the display generation component, a user interface that includes: a representation of a video that includes a plurality of frames, the representation including a first subject and a second subject; and a first user interface object indicating that the first subject is being emphasized by a synthetic depth-of-field effect that alters visual information captured by the one or more cameras to emphasize the first subject in the plurality of frames relative to the second subject; while displaying the user interface that includes the representation of the video and the first user interface object, detecting, via the one or more input devices, a gesture that corresponds to selection of the second subject in the representation of the video; and in response to detecting the gesture that corresponds to selection of the second subject in the representation of the video: changing the synthetic depth-of-field effect to alter the visual information captured by the one or more cameras to emphasize the second subject in the plurality of frames relative to the first subject, and displaying a second user interface object indicating that the second subject is being emphasized by the changed synthetic depth-of-field effect that alters the visual information captured by the one or more cameras to emphasize the second subject in the plurality of frames relative to the first subject.

In accordance with some embodiments, a computer system is described. The computer system is configured to communicate with one or more cameras; a display generation component; and one or more input devices. The computer system comprises: means for displaying, via the display generation component, a user interface that includes: a representation of a video that includes a plurality of frames, the representation including a first subject and a second subject; and a first user interface object indicating that the first subject is being emphasized by a synthetic depth-of-field effect that alters visual information captured by the one or more cameras to emphasize the first subject in the plurality of frames relative to the second subject; while displaying the user interface that includes the representation of the video and the first user interface object, for detecting, via the one or more input devices, a gesture that corresponds to selection of the second subject in the representation of the video; and means, responsive to detecting the gesture that corresponds to selection of the second subject in the representation of the video, for: changing the synthetic depth-of-field effect to alter the visual information captured by the one or more cameras to emphasize the second subject in the plurality of frames relative to the first subject; and displaying a second user interface object indicating that the second subject is being emphasized by the changed synthetic depth-of-field effect that alters the visual information captured by the one or more cameras to emphasize the second subject in the plurality of frames relative to the first subject.

In accordance with some embodiments, a computer program product is described. The computer program product comprises: one or more cameras; a display generation component; one or more input devices; one or more processors; and memory storing one or more programs configured to be executed by the one or more processors, the one or more programs including instructions for: displaying, via the display generation component, a user interface that includes: a representation of a video that includes a plurality of frames, the representation including a first subject and a second subject; and a first user interface object indicating that the first subject is being emphasized by a synthetic depth-of-field effect that alters visual information captured by the one or more cameras to emphasize the first subject in the plurality of frames relative to the second subject; while displaying the user interface that includes the representation of the video and the first user interface object, detecting, via the one or more input devices, a gesture that corresponds to selection of the second subject in the representation of the video; and in response to detecting the gesture that corresponds to selection of the second subject in the representation of the video: changing the synthetic depth-of-field effect to alter the visual information captured by the one or more cameras to emphasize the second subject in the plurality of frames relative to the first subject, and displaying a second user interface object indicating that the second subject is being emphasized by the changed synthetic depth-of-field effect that alters the visual information captured by the one or more cameras to emphasize the second subject in the plurality of frames relative to the first subject.

In accordance with some embodiments, a method performed at a computer system that is in communication with a display generation component is described. The method comprises: displaying, via the display generation component, a user interface that includes concurrently displaying: a representation of a video having a first duration, where the video includes a plurality of changes in subject emphasis in the video, where a change in subject emphasis in the video includes a change in appearance of visual information captured by one or more cameras to emphasize one subject relative to one or more elements in the video, where the plurality of changes include an automatic change in subject emphasis at a first time during the first duration and a user-specified change in subject emphasis at a second time during the first duration that is different from the first time; and a video navigation user interface element for navigating through the video that includes a representation of the first time and a representation of the second time, where: the representation of the second time is visually distinguished from other times in the first duration of the video that do not correspond to changes in subject emphasis; and the representation of the first time is visually distinguished from the representation of the second time.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: displaying, via the display generation component, a user interface that includes concurrently displaying: a representation of a video having a first duration, where the video includes a plurality of changes in subject emphasis in the video, where a change in subject emphasis in the video includes a change in appearance of visual information captured by one or more cameras to emphasize one subject relative to one or more elements in the video, where the plurality of changes include an automatic change in subject emphasis at a first time during the first duration and a user-specified change in subject emphasis at a second time during the first duration that is different from the first time; and a video navigation user interface element for navigating through the video that includes a representation of the first time and a representation of the second time, where: the representation of the second time is visually distinguished from other times in the first duration of the video that do not correspond to changes in subject emphasis; and the representation of the first time is visually distinguished from the representation of the second time.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: displaying, via the display generation component, a user interface that includes concurrently displaying: a representation of a video having a first duration, where the video includes a plurality of changes in subject emphasis in the video, where a change in subject emphasis in the video includes a change in appearance of visual information captured by one or more cameras to emphasize one subject relative to one or more elements in the video, where the plurality of changes include an automatic change in subject emphasis at a first time during the first duration and a user-specified change in subject emphasis at a second time during the first duration that is different from the first time; and a video navigation user interface element for navigating through the video that includes a representation of the first time and a representation of the second time, where: the representation of the second time is visually distinguished from other times in the first duration of the video that do not correspond to changes in subject emphasis; and the representation of the first time is visually distinguished from the representation of the second time.

In accordance with some embodiments, a computer system is described. The computer system is configured to communicate with one or more cameras; a display generation component. The computer system comprises: one or more processors; and memory storing one or more programs configured to be executed by the one or more processors, the one or more programs including instructions for: displaying, via the display generation component, a user interface that includes concurrently displaying: a representation of a video having a first duration, where the video includes a plurality of changes in subject emphasis in the video, where a change in subject emphasis in the video includes a change in appearance of visual information captured by one or more cameras to emphasize one subject relative to one or more elements in the video, where the plurality of changes include an automatic change in subject emphasis at a first time during the first duration and a user-specified change in subject emphasis at a second time during the first duration that is different from the first time; and a video navigation user interface element for navigating through the video that includes a representation of the first time and a representation of the second time, where: the representation of the second time is visually distinguished from other times in the first duration of the video that do not correspond to changes in subject emphasis; and the representation of the first time is visually distinguished from the representation of the second time.

In accordance with some embodiments, a computer system is described. The computer system is configured to communicate with one or more cameras; a display generation component. The computer system comprises: means for displaying, via the display generation component, a user interface that includes: displaying, via the display generation component, a user interface that includes concurrently displaying: a representation of a video having a first duration, where the video includes a plurality of changes in subject emphasis in the video, where a change in subject emphasis in the video includes a change in appearance of visual information captured by one or more cameras to emphasize one subject relative to one or more elements in the video, where the plurality of changes include an automatic change in subject emphasis at a first time during the first duration and a user-specified change in subject emphasis at a second time during the first duration that is different from the first time; and a video navigation user interface element for navigating through the video that includes a representation of the first time and a representation of the second time, where: the representation of the second time is visually distinguished from other times in the first duration of the video that do not correspond to changes in subject emphasis; and the representation of the first time is visually distinguished from the representation of the second time.

In accordance with some embodiments, a computer program product is described. The computer program product comprises: a display generation component; one or more processors; memory storing one or more programs configured to be executed by the one or more processors, the one or more programs including instructions for: displaying, via the display generation component, a user interface that includes concurrently displaying: a representation of a video having a first duration, where the video includes a plurality of changes in subject emphasis in the video, where a change in subject emphasis in the video includes a change in appearance of visual information captured by one or more cameras to emphasize one subject relative to one or more elements in the video, where the plurality of changes include an automatic change in subject emphasis at a first time during the first duration and a user-specified change in subject emphasis at a second time during the first duration that is different from the first time; and a video navigation user interface element for navigating through the video that includes a representation of the first time and a representation of the second time, where: the representation of the second time is visually distinguished from other times in the first duration of the video that do not correspond to changes in subject emphasis; and the representation of the first time is visually distinguished from the representation of the second time.

In accordance with some embodiments, a method performed at a computer system that is in communication with a display generation component and a plurality of cameras that includes a first camera with first image capture parameters determined by hardware of the first camera and a second camera with second image capture parameters determined by hardware of the second camera, wherein the second image capture parameters are different than the first image capture parameters, is described. The method comprises: displaying, via the display generation component, a camera user interface that includes a representation of a field-of-view of one or more of the plurality of cameras, wherein the representation of the field-of-view is displayed using visual information collected by the first camera with the first image capture parameters; while displaying the representation of the field-of-view using the visual information collected by the first camera, detecting a decrease in distance between a camera location that corresponds to at least one of the plurality of cameras and a focal point location that correspond to a focal point; and in response to detecting the decrease in distance between the camera location and the focal point location: in accordance with a determination that the decreased distance between the camera location and the focal point location is closer than a predetermined threshold distance, transitioning from using the visual information collected by the first camera to display the representation of the field-of-view to using visual information collected by the second camera to display the representation of the field-of-view.

In accordance with some embodiments, a non-transitory computer-readable storage medium is described. The non-transitory computer-readable storage medium stores one or more programs configured to be executed by one or more processors of a computer system that is in communication with a display generation component and a plurality of cameras that includes a first camera with first image capture parameters determined by hardware of the first camera and a second camera with second image capture parameters determined by hardware of the second camera, wherein the second image capture parameters are different than the first image capture parameters, the one or more programs including instructions for: displaying, via the display generation component, a camera user interface that includes a representation of a field-of-view of one or more of the plurality of cameras, wherein the representation of the field-of-view is displayed using visual information collected by the first camera with the first image capture parameters; while displaying the representation of the field-of-view using the visual information collected by the first camera, detecting a decrease in distance between a camera location that corresponds to at least one of the plurality of cameras and a focal point location that correspond to a focal point; and in response to detecting the decrease in distance between the camera location and the focal point location: in accordance with a determination that the decreased distance between the camera location and the focal point location is closer than a predetermined threshold distance, transitioning from using the visual information collected by the first camera to display the representation of the field-of-view to using visual information collected by the second camera to display the representation of the field-of-view.

In accordance with some embodiments, a transitory computer-readable storage medium is described. The transitory computer-readable storage medium stores one or more programs configured to be executed by one or more processors of a computer system that is in communication with a display generation component and a plurality of cameras that includes a first camera with first image capture parameters determined by hardware of the first camera and a second camera with second image capture parameters determined by hardware of the second camera, wherein the second image capture parameters are different than the first image capture parameters, the one or more programs including instructions for: displaying, via the display generation component, a camera user interface that includes a representation of a field-of-view of one or more of the plurality of cameras, wherein the representation of the field-of-view is displayed using visual information collected by the first camera with the first image capture parameters; while displaying the representation of the field-of-view using the visual information collected by the first camera, detecting a decrease in distance between a camera location that corresponds to at least one of the plurality of cameras and a focal point location that correspond to a focal point; and in response to detecting the decrease in distance between the camera location and the focal point location: in accordance with a determination that the decreased distance between the camera location and the focal point location is closer than a predetermined threshold distance, transitioning from using the visual information collected by the first camera to display the representation of the field-of-view to using visual information collected by the second camera to display the representation of the field-of-view.

In accordance with some embodiments, a computer system is described. The computer system is configured to communicate with a display generation component and a plurality of cameras that includes a first camera with first image capture parameters determined by hardware of the first camera and a second camera with second image capture parameters determined by hardware of the second camera, wherein the second image capture parameters are different than the first image capture parameters. The computer system comprises: one or more processors; and memory storing one or more programs configured to be executed by the one or more processors, the one or more programs including instructions for: displaying, via the display generation component, a camera user interface that includes a representation of a field-of-view of one or more of the plurality of cameras, wherein the representation of the field-of-view is displayed using visual information collected by the first camera with the first image capture parameters; while displaying the representation of the field-of-view using the visual information collected by the first camera, detecting a decrease in distance between a camera location that corresponds to at least one of the plurality of cameras and a focal point location that correspond to a focal point; and in response to detecting the decrease in distance between the camera location and the focal point location: in accordance with a determination that the decreased distance between the camera location and the focal point location is closer than a predetermined threshold distance, transitioning from using the visual information collected by the first camera to display the representation of the field-of-view to using visual information collected by the second camera to display the representation of the field-of-view.

In accordance with some embodiments, a computer system is described. The computer system is configured to communicate with a display generation component and a plurality of cameras that includes a first camera with first image capture parameters determined by hardware of the first camera and a second camera with second image capture parameters determined by hardware of the second camera, wherein the second image capture parameters are different than the first image capture parameters, is described. The computer system comprises: means for displaying, via the display generation component, a camera user interface that includes a representation of a field-of-view of one or more of the plurality of cameras, wherein the representation of the field-of-view is displayed using visual information collected by the first camera with the first image capture parameters; means, while displaying the representation of the field-of-view using the visual information collected by the first camera, for detecting a decrease in distance between a camera location that corresponds to at least one of the plurality of cameras and a focal point location that correspond to a focal point; and means, responsive to detecting the decrease in distance between the camera location and the focal point location, for: in accordance with a determination that the decreased distance between the camera location and the focal point location is closer than a predetermined threshold distance, transitioning from using the visual information collected by the first camera to display the representation of the field-of-view to using visual information collected by the second camera to display the representation of the field-of-view.

In accordance with some embodiments, a computer program product is described. The computer program product comprises one or more programs configured to be executed by one or more processors of a computer system that is in communication with a display generation component and a plurality of cameras that includes a first camera with first image capture parameters determined by hardware of the first camera and a second camera with second image capture parameters determined by hardware of the second camera, wherein the second image capture parameters are different than the first image capture parameters. The one or more programs include instructions for: displaying, via the display generation component, a camera user interface that includes a representation of a field-of-view of one or more of the plurality of cameras, wherein the representation of the field-of-view is displayed using visual information collected by the first camera with the first image capture parameters; while displaying the representation of the field-of-view using the visual information collected by the first camera, detecting a decrease in distance between a camera location that corresponds to at least one of the plurality of cameras and a focal point location that correspond to a focal point; and in response to detecting the decrease in distance between the camera location and the focal point location: in accordance with a determination that the decreased distance between the camera location and the focal point location is closer than a predetermined threshold distance, transitioning from using the visual information collected by the first camera to display the representation of the field-of-view to using visual information collected by the second camera to display the representation of the field-of-view.

In accordance with some embodiments, a method performed at a computer system that is in communication with a display generation component is described. The method comprises: playing, via the display generation component, a portion of a video that includes a first subject emphasis change that occurs at a first time, wherein the first subject emphasis change includes a change in appearance of visual information captured by one or more cameras to emphasize a respective subject relative to one or more elements in the video during a first period of time that follows the first time; after playing the portion of the video that includes the first subject emphasis change that occurs at the first time, detecting a request to change subject emphasis at a second time in the video that is different from the first time; and in response to detecting the request to change subject emphasis at the second time in the video: changing the subject emphasis in the video during a second period of time that follows the second time; and changing the first subject emphasis change that occurs at the first time including changing the emphasis of the respective subject relative to the one or more elements in the video during the first period of time that follows the first time.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: playing, via the display generation component, a portion of a video that includes a first subject emphasis change that occurs at a first time, wherein the first subject emphasis change includes a change in appearance of visual information captured by one or more cameras to emphasize a respective subject relative to one or more elements in the video during a first period of time that follows the first time; after playing the portion of the video that includes the first subject emphasis change that occurs at the first time, detecting a request to change subject emphasis at a second time in the video that is different from the first time; and in response to detecting the request to change subject emphasis at the second time in the video: changing the subject emphasis in the video during a second period of time that follows the second time; and changing the first subject emphasis change that occurs at the first time including changing the emphasis of the respective subject relative to the one or more elements in the video during the first period of time that follows the first time.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: playing, via the display generation component, a portion of a video that includes a first subject emphasis change that occurs at a first time, wherein the first subject emphasis change includes a change in appearance of visual information captured by one or more cameras to emphasize a respective subject relative to one or more elements in the video during a first period of time that follows the first time; after playing the portion of the video that includes the first subject emphasis change that occurs at the first time, detecting a request to change subject emphasis at a second time in the video that is different from the first time; and in response to detecting the request to change subject emphasis at the second time in the video: changing the subject emphasis in the video during a second period of time that follows the second time; and changing the first subject emphasis change that occurs at the first time including changing the emphasis of the respective subject relative to the one or more elements in the video during the first period of time that follows the first time.

In accordance with some embodiments, a computer system that is configured to communicate with a display generation component is described. The computer system comprises: one or more processors; and memory storing one or more programs configured to be executed by the one or more processors, the one or more programs including instructions for: playing, via the display generation component, a portion of a video that includes a first subject emphasis change that occurs at a first time, wherein the first subject emphasis change includes a change in appearance of visual information captured by one or more cameras to emphasize a respective subject relative to one or more elements in the video during a first period of time that follows the first time; after playing the portion of the video that includes the first subject emphasis change that occurs at the first time, detecting a request to change subject emphasis at a second time in the video that is different from the first time; and in response to detecting the request to change subject emphasis at the second time in the video: changing the subject emphasis in the video during a second period of time that follows the second time; and changing the first subject emphasis change that occurs at the first time including changing the emphasis of the respective subject relative to the one or more elements in the video during the first period of time that follows the first time.

In accordance with some embodiments, a computer system that is configured to communicate with a display generation component and one or more input devices is described. The computer system comprises: means for playing, via the display generation component, a portion of a video that includes a first subject emphasis change that occurs at a first time, wherein the first subject emphasis change includes a change in appearance of visual information captured by one or more cameras to emphasize a respective subject relative to one or more elements in the video during a first period of time that follows the first time; means, after playing the portion of the video that includes the first subject emphasis change that occurs at the first time, for detecting a request to change subject emphasis at a second time in the video that is different from the first time; and means, responsive to detecting the request to change subject emphasis at the second time in the video, for: changing the subject emphasis in the video during a second period of time that follows the second time; and changing the first subject emphasis change that occurs at the first time including changing the emphasis of the respective subject relative to the one or more elements in the video during the first period of time that follows the first time.

In accordance with some embodiments, a computer program product is described. The computer program product comprises one or more programs configured to be executed by one or more processors of a computer system that is in communication with a display generation component. The one or more programs include instructions for: playing, via the display generation component, a portion of a video that includes a first subject emphasis change that occurs at a first time, wherein the first subject emphasis change includes a change in appearance of visual information captured by one or more cameras to emphasize a respective subject relative to one or more elements in the video during a first period of time that follows the first time; after playing the portion of the video that includes the first subject emphasis change that occurs at the first time, detecting a request to change subject emphasis at a second time in the video that is different from the first time; and in response to detecting the request to change subject emphasis at the second time in the video: changing the subject emphasis in the video during a second period of time that follows the second time; and changing the first subject emphasis change that occurs at the first time including changing the emphasis of the respective subject relative to the one or more elements in the video during the first period of time that follows the first time.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for altering visual content, thereby increasing the effectiveness, efficiency, and user satisfaction with such devices. Such methods and interfaces may complement or replace other methods for altering visual content.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 7 is a flow diagram illustrating an exemplary method for altering visual media using a computer system in accordance with some embodiments.

FIG. 9 is a flow diagram illustrating an exemplary method for altering visual media using a computer system in accordance with some embodiments.

FIG. 11 is a flow diagram illustrating an exemplary method for managing media capture using a computer system in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces altering visual content. For example, electronic devices are needed that allow a user to alter visual content by applying a synthetic depth-of-field effect to multiple frames of media without having to manually change and/or blur the frames of the media to mimic a depth-of-field effect. Such techniques can reduce the cognitive burden on a user who desires to alter visual content in media, thereby enhancing productivity. Further, such techniques can reduce processor use and battery power otherwise wasted on redundant user inputs.

Below, FIGS. 1A-1B, 2, 3, 4A-4B, 5A-5B, and 12 provide a description of exemplary devices and systems for performing the techniques for managing and altering visual media.

Figures 6A, 6B:
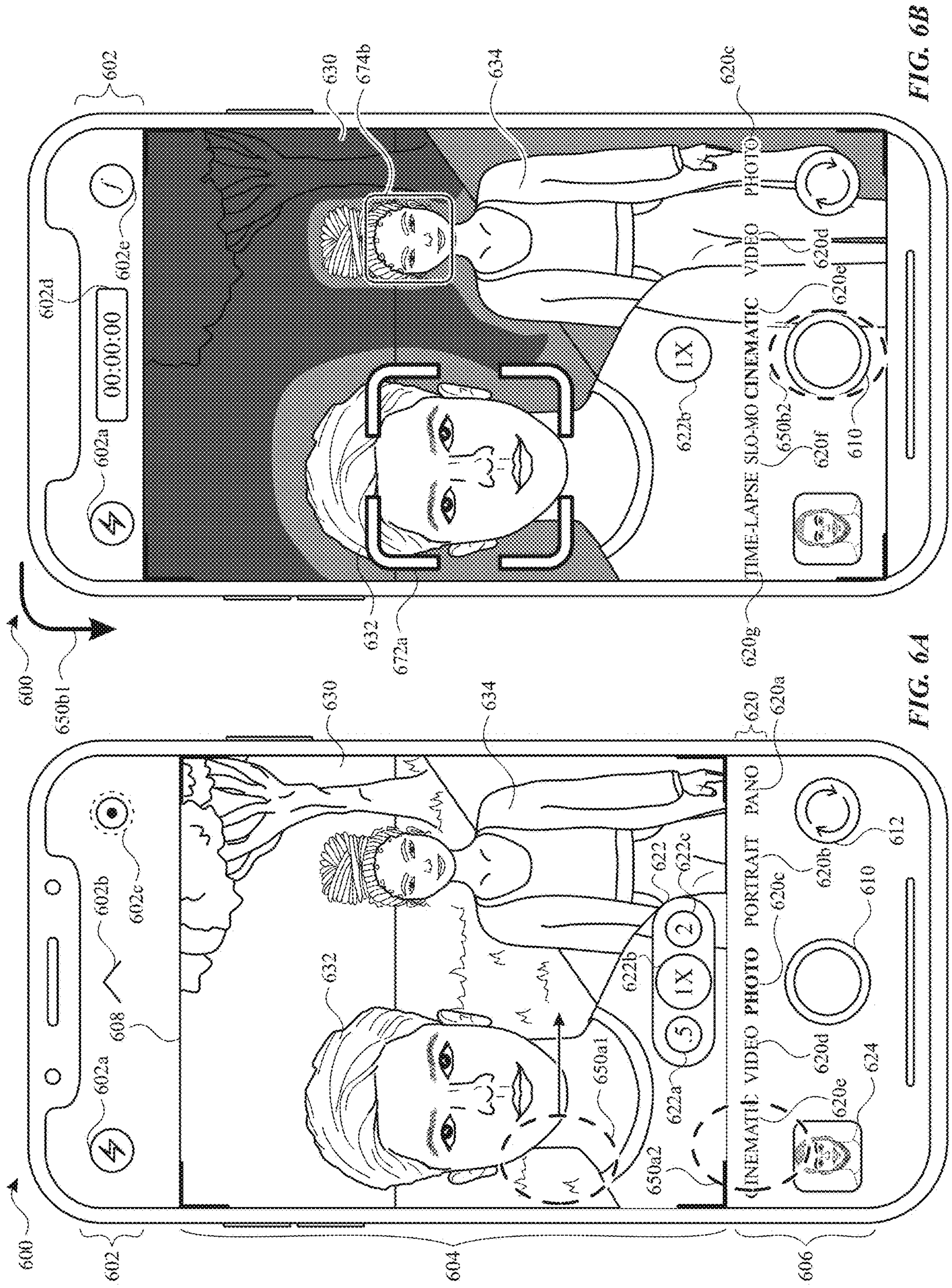
FIGS. 6A-6BJ illustrate exemplary user interfaces for altering visual media using a computer system in accordance with some embodiments.
Figure 8:
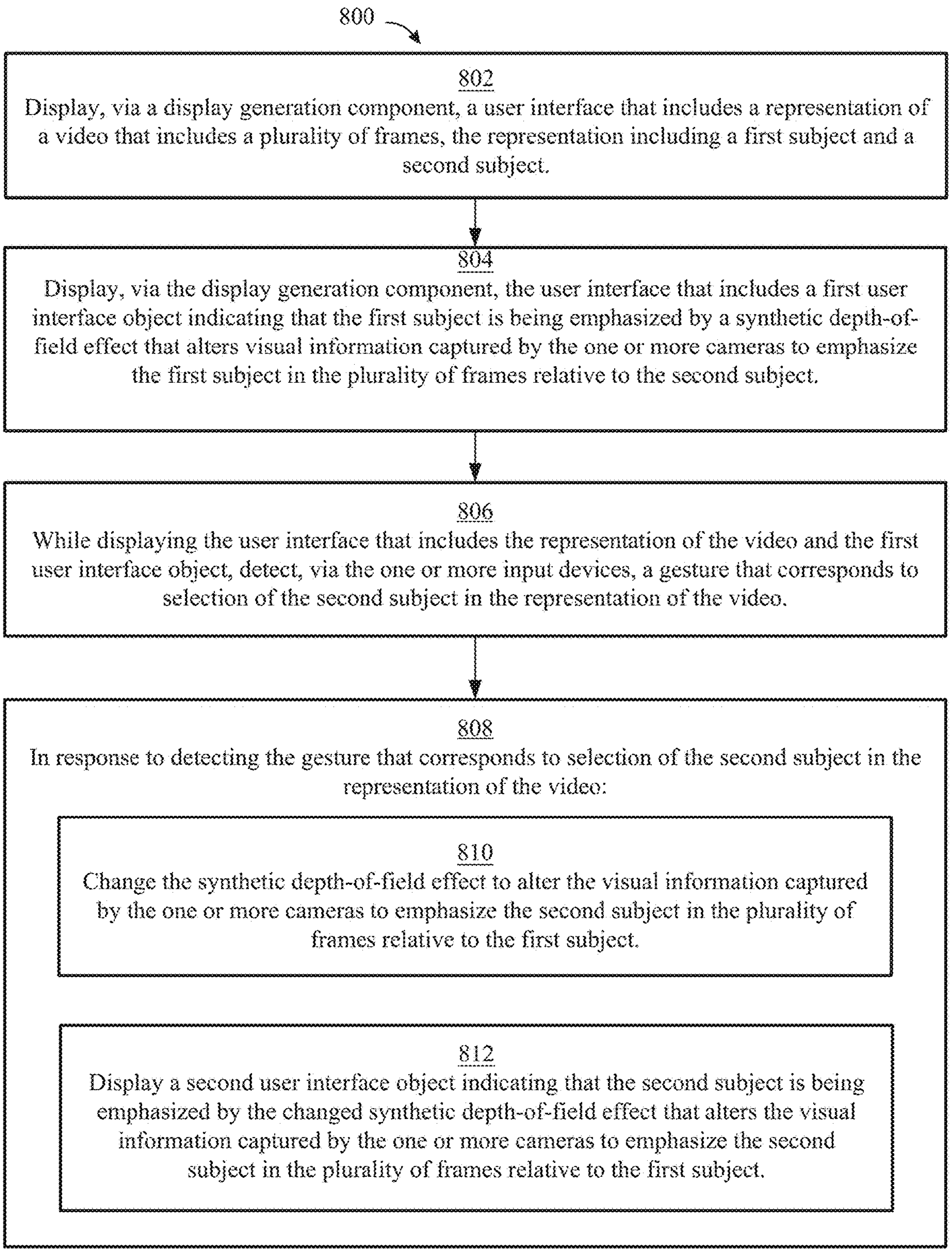
FIG. 8 is a flow diagram illustrating an exemplary method for altering visual media using a computer system in accordance with some embodiments.
Figure 13:
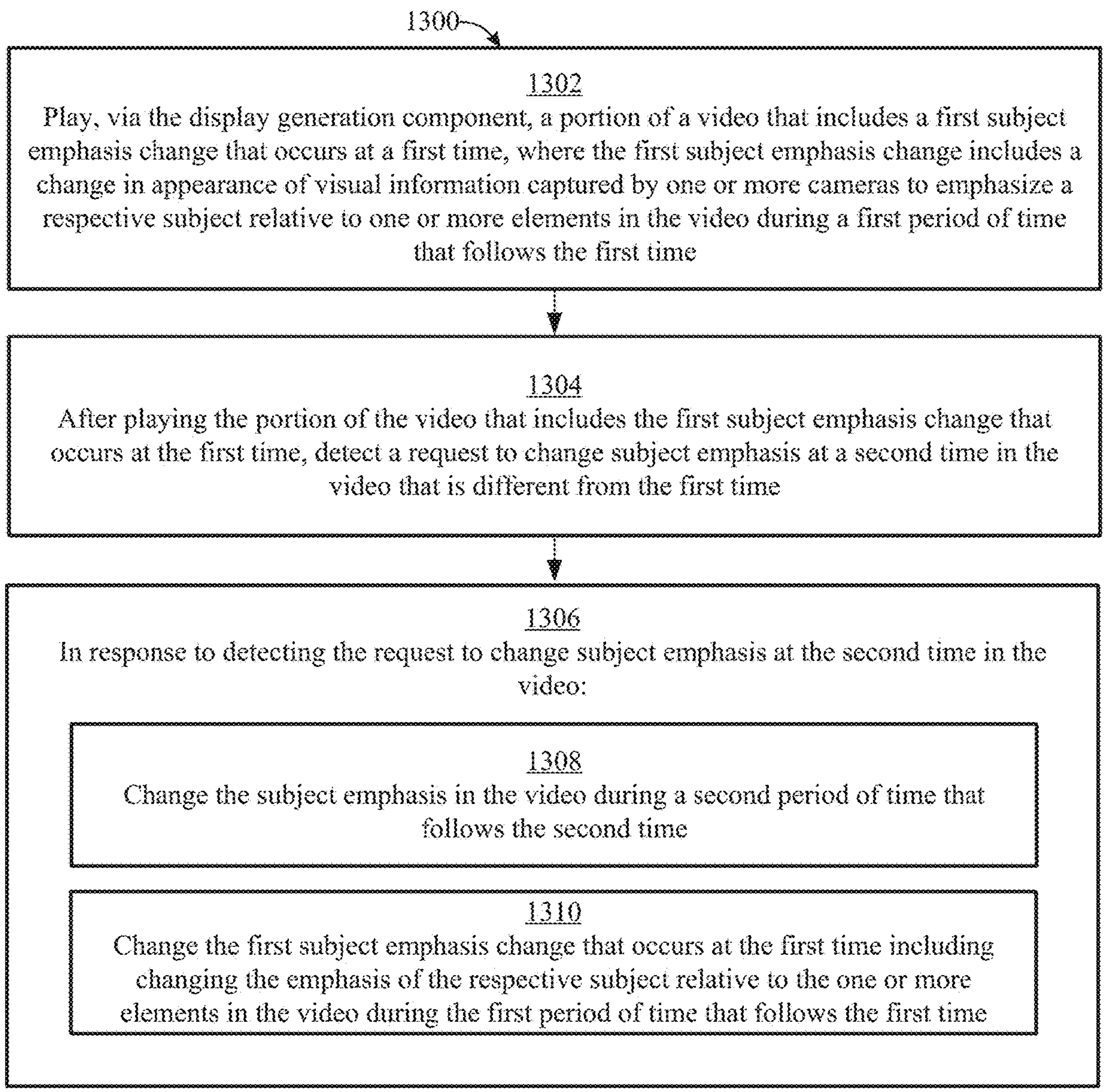
FIG. 13 is a flow diagram illustrating an exemplary method for altering visual media using a computer system in accordance with some embodiments.

FIGS. 6A-6BJ are user interfaces for altering visual media using a computer system in accordance with some embodiments. FIG. 7 is a flow diagram illustrating methods of altering visual content in accordance with some embodiments. FIG. 8 is a flow diagram illustrating methods of altering visual content in accordance with some embodiments. FIG. 9 is a flow diagram illustrating methods of altering visual content in accordance with some embodiments. FIG. 13 is a flow diagram illustrating methods of altering visual content in accordance with some embodiments. The user interfaces in FIGS. 6A-6BJ are used to illustrate the processes described below, including the processes in FIGS. 7, 8, 9, and 13.

FIGS. 10A-10I illustrate exemplary user interfaces for managing media capture using a computer system in accordance with some embodiments. FIG. 11 is a flow diagram illustrating an exemplary method for managing media capture using a computer system in accordance with some embodiments. The user interfaces in FIGS. 10A-10I are used to illustrate the processes described below, including the processes in FIG. 11.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
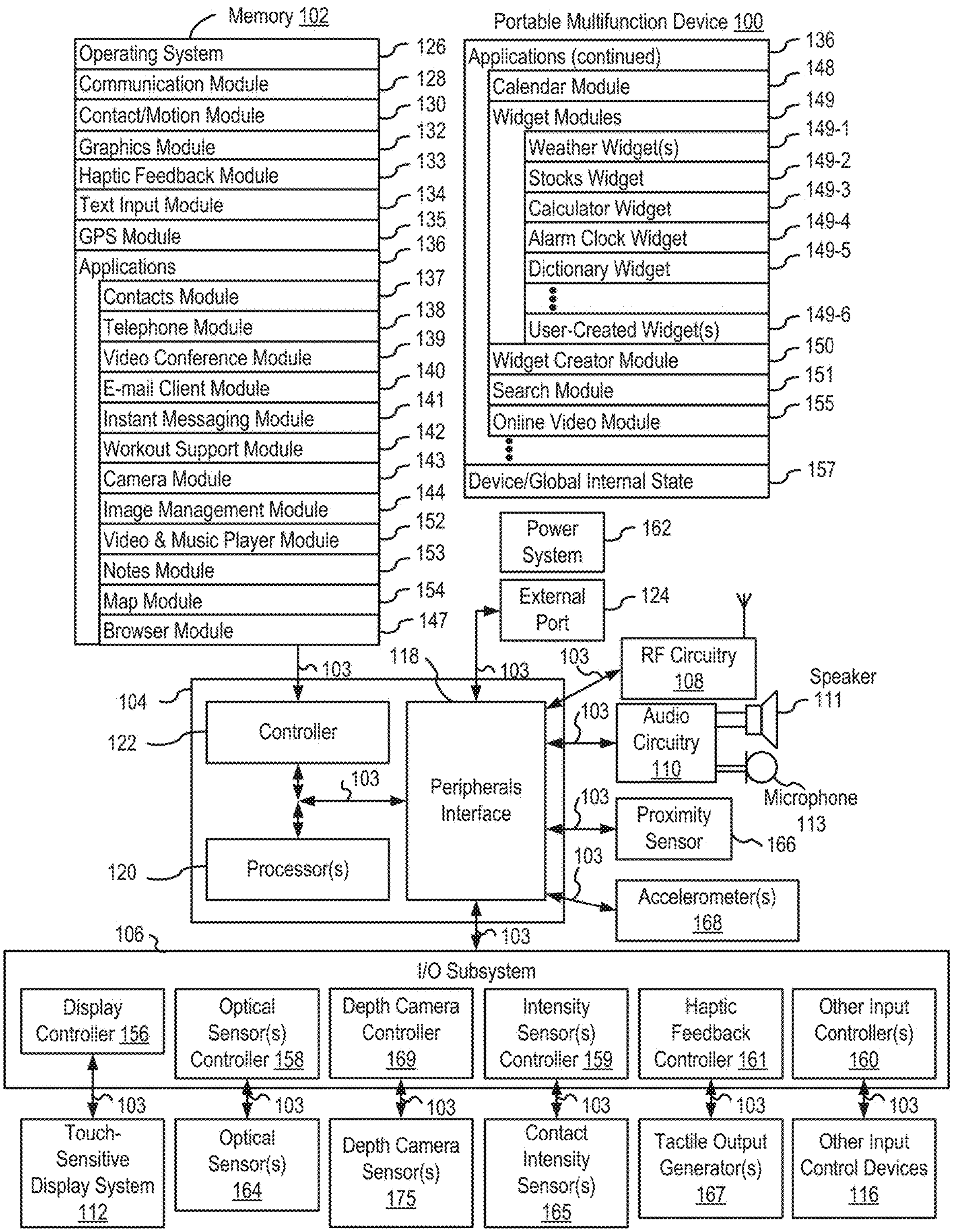
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
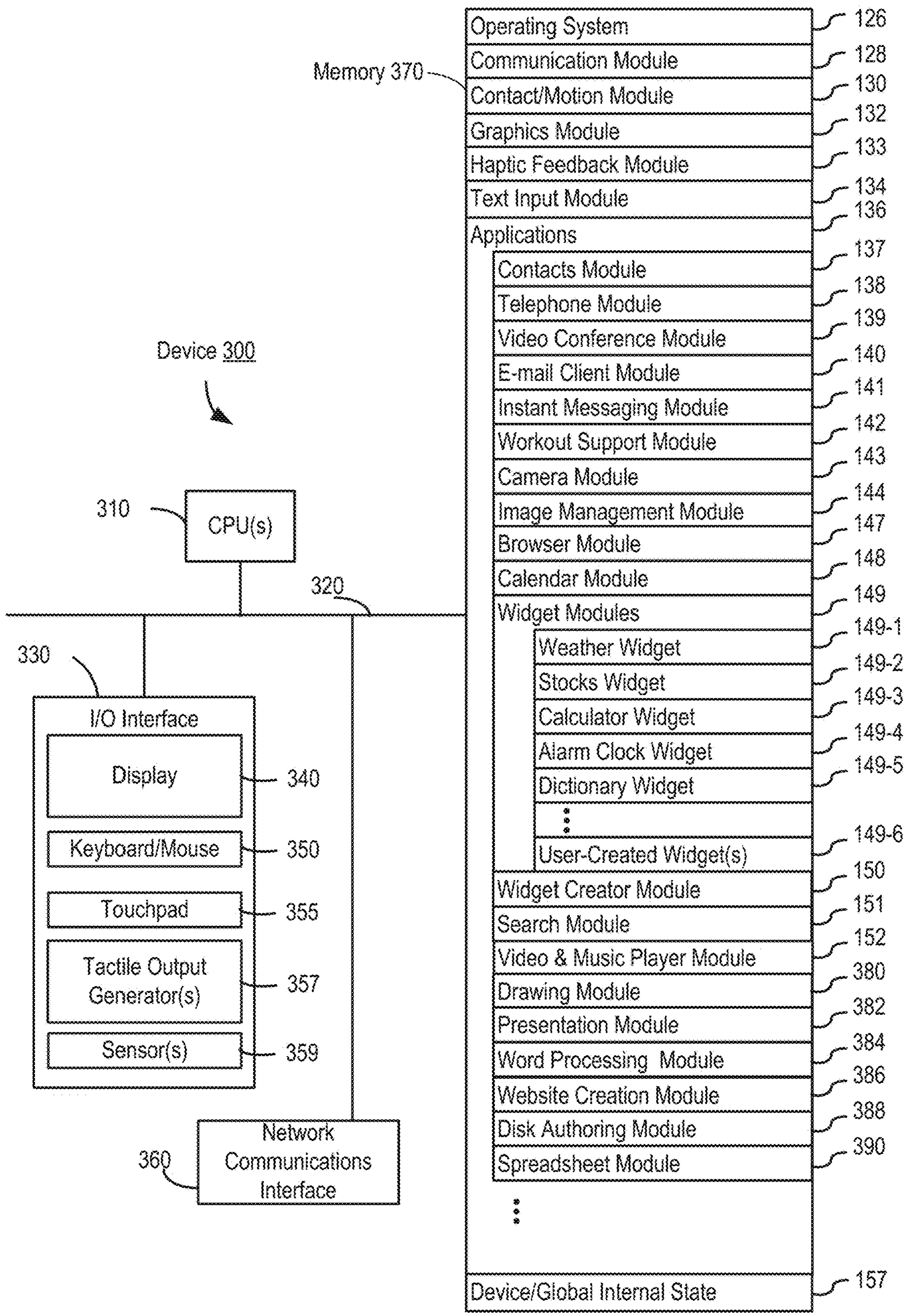
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
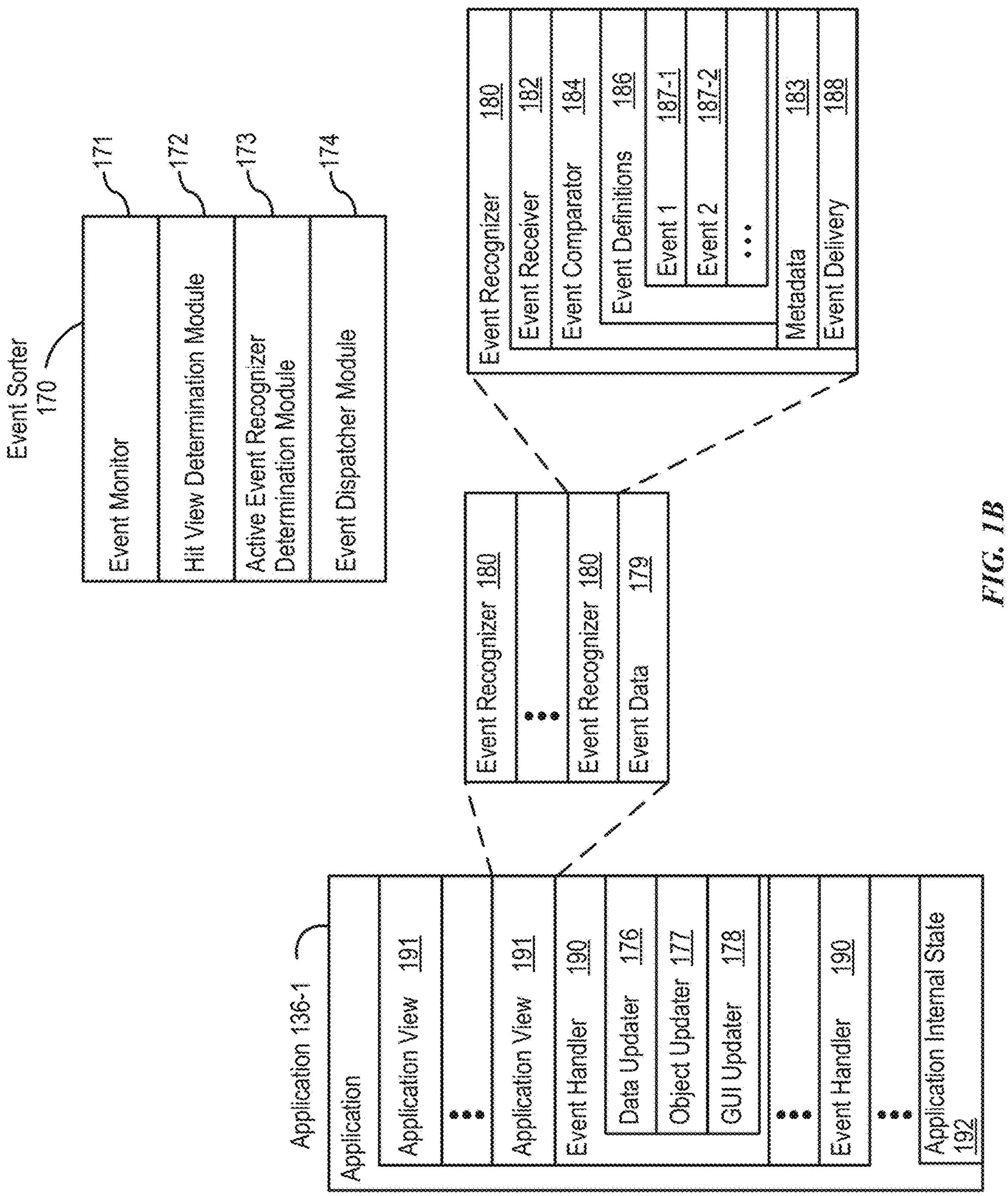
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
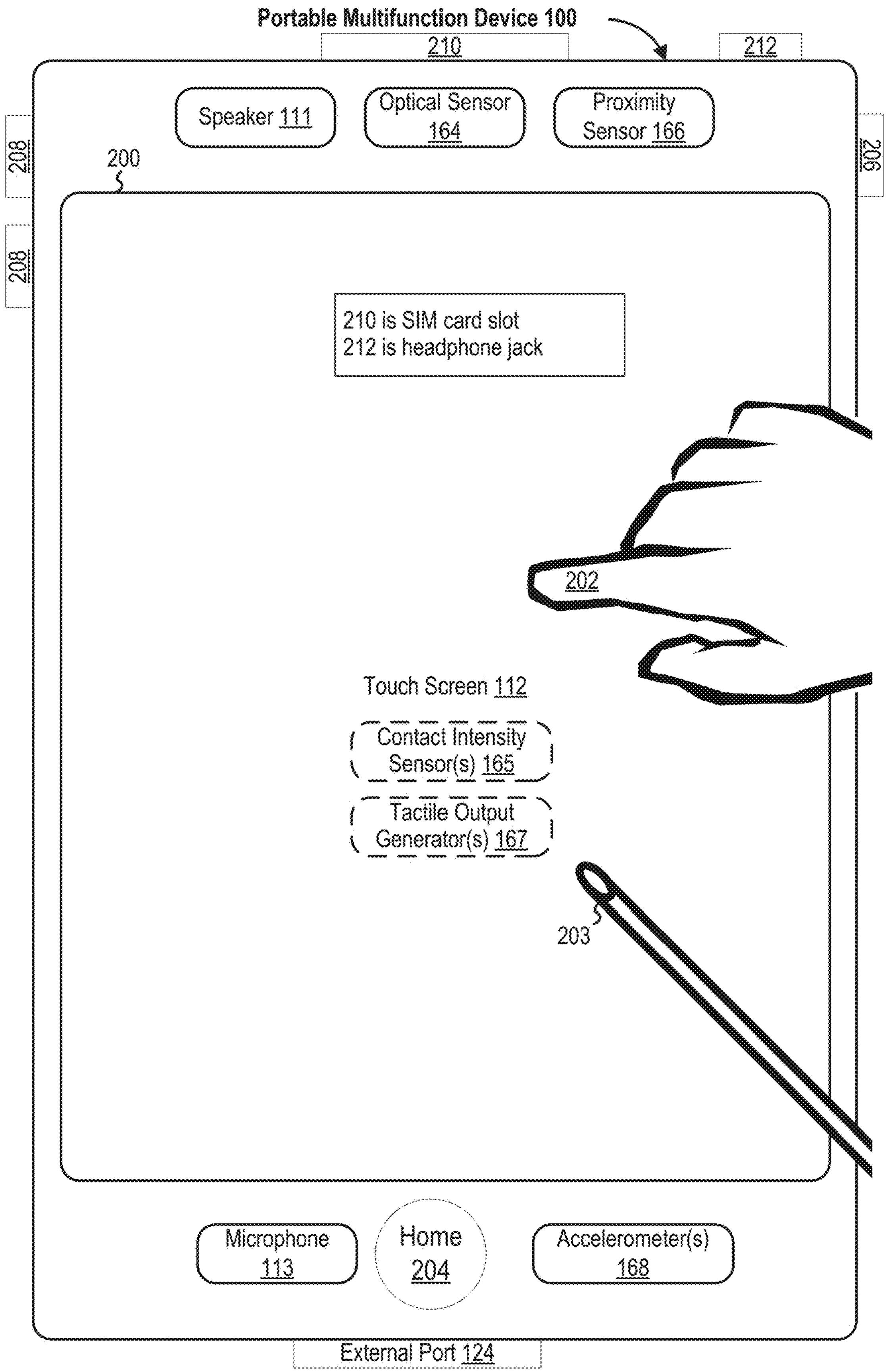
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
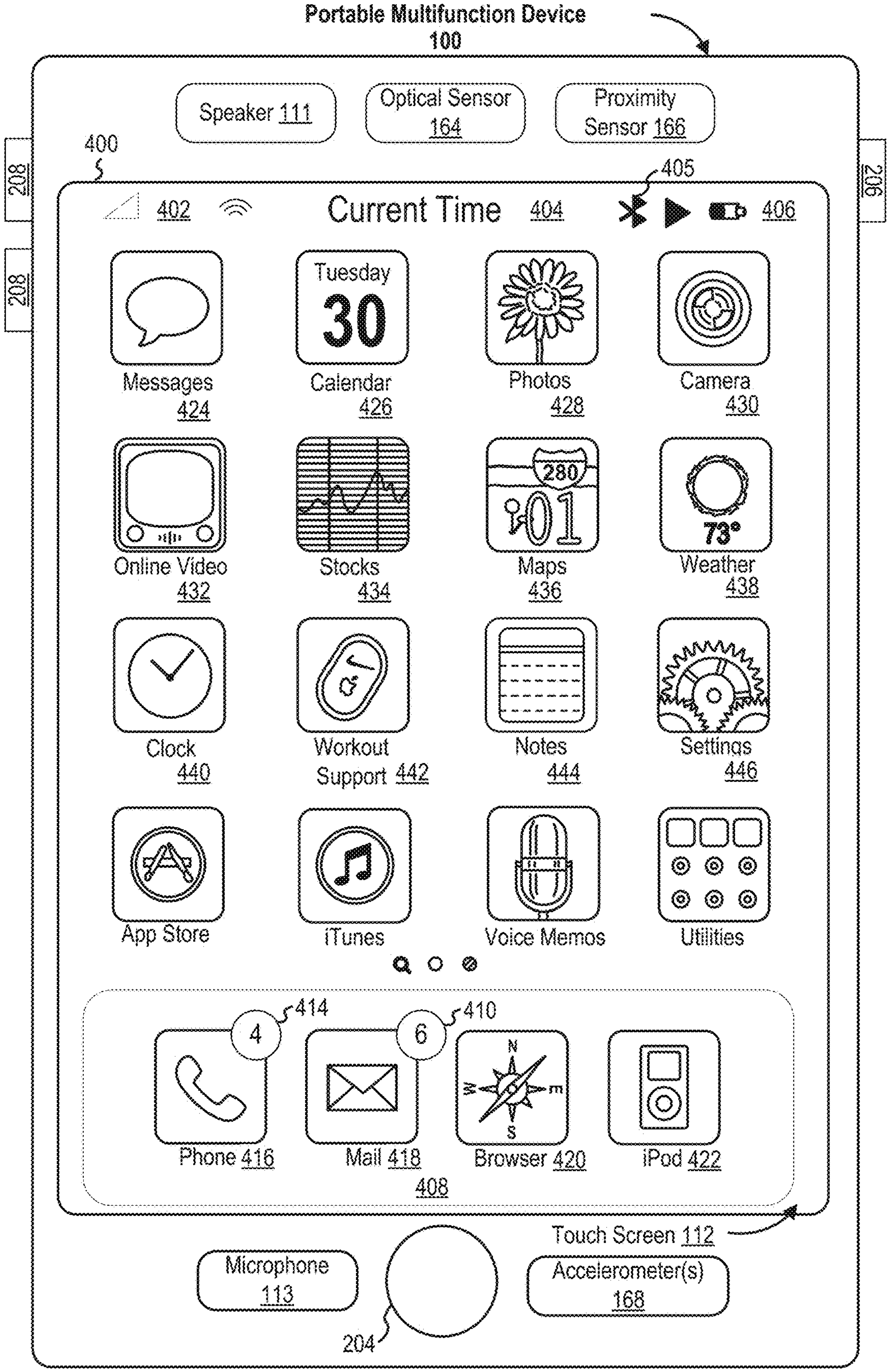
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
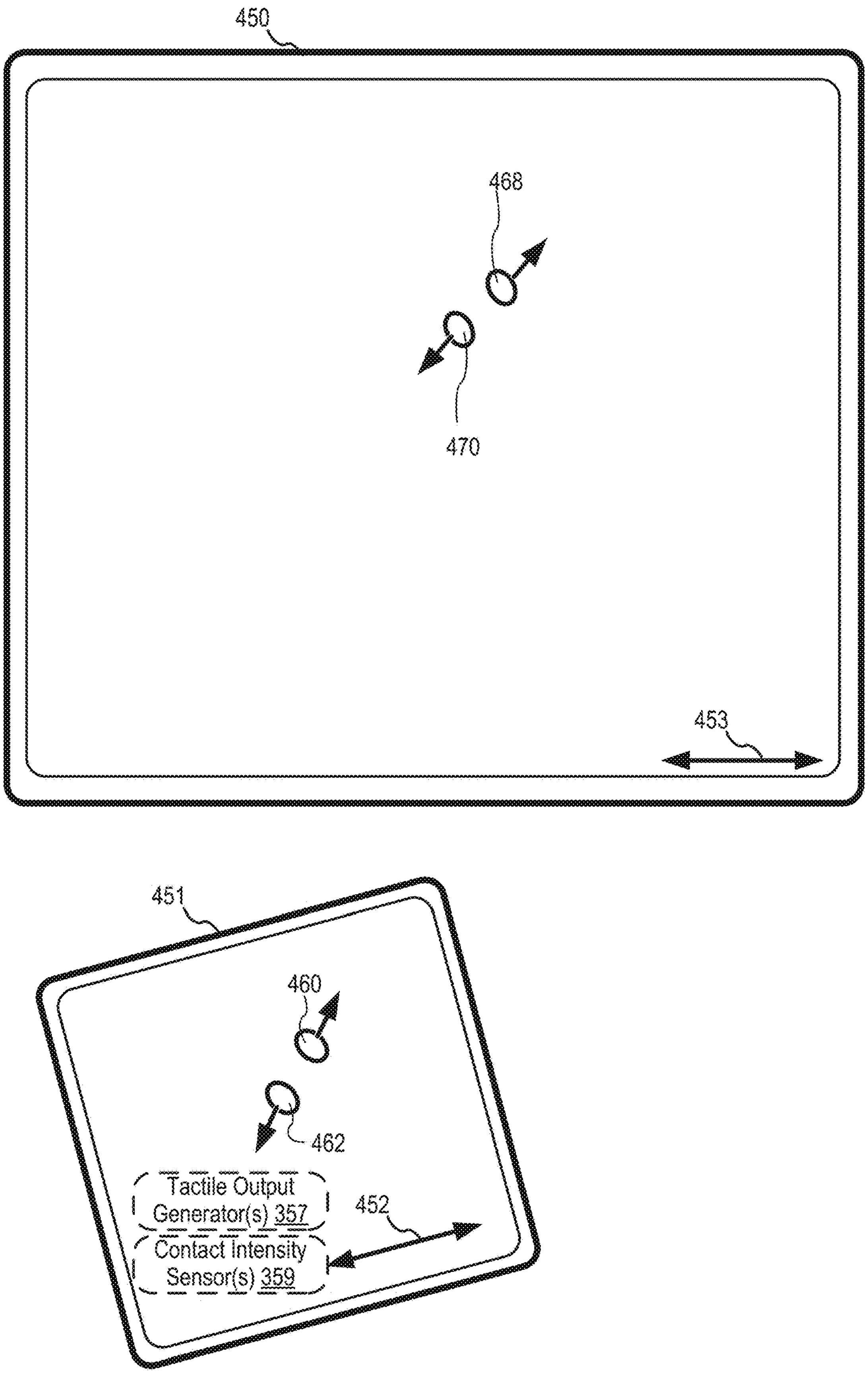
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
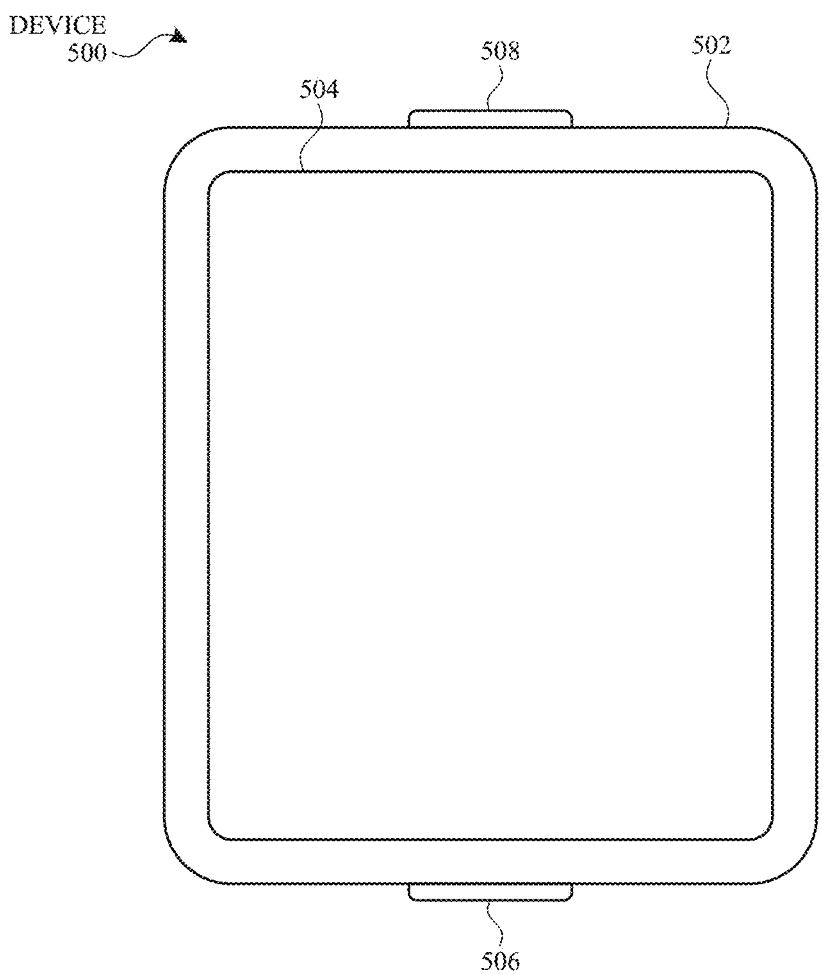
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
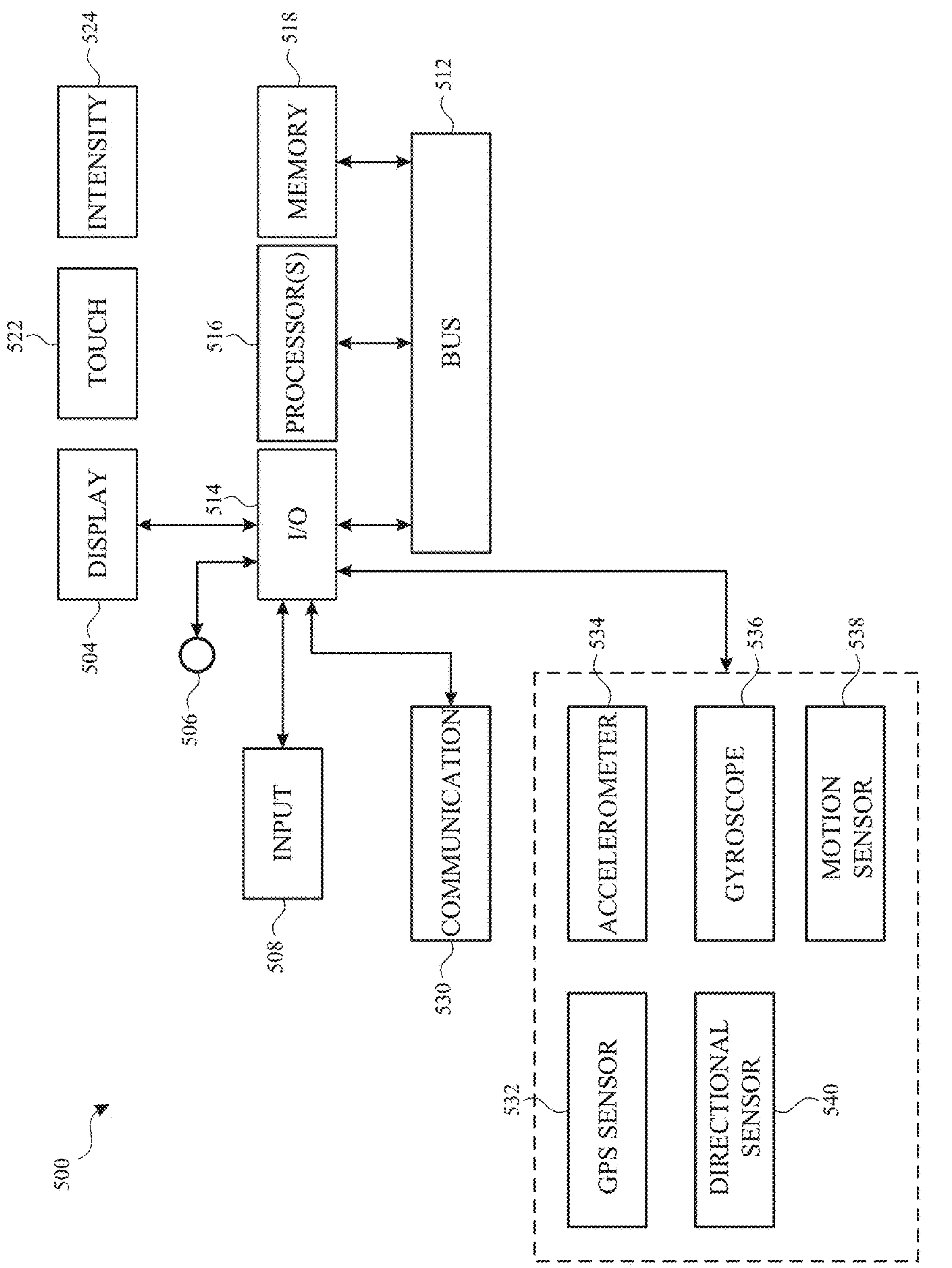
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, 900, 1100, and 1300 (FIGS. 7-9, 11, and 13). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6BJ illustrate exemplary user interfaces for altering visual content in media in accordance with some embodiments. The user interfaces in these figures are used to illustrate the processes described below, including the processes in FIGS. 7, 8, and 9. While the examples in FIGS. 6A-6BJ are described with respect to touch inputs on a touch-sensitive surface, it should be understood that taps, long presses, press-and-holds, swipes and other touch gestures could be replaced with other inputs directed to the relevant user interface elements. For example a tap could be replaced by a mouse click, a swipe could be replaced with a click and drag, a double tap could be replaced with a double click, and/or a long press (and/or press-and-hold) could be replaced with a right click or a click while holding down a modifier key. Similarly, air gestures such as a pinch of two fingers together or a touch of a finger to a hand could replace a tap, while a pinch of two fingers together followed by movement could replace a touch and drag, a double pinch could replace a double tap, and a long pinch could replace a long tap or tap and hold. In some embodiments, the location in the user interface to which an input is directed is determined based on direct touch (e.g., a tap, double-tap, long press, press-and-hold, or swipe on a user interface element), but the location to which an input is directed could also be determined based on other indications of user intent such as the location of a displayed cursor or the location toward which a gaze of a user is directed.

FIG. 6A illustrates computer system 600 (e.g., an electronic device) displaying a camera user interface, which includes live preview 630 that optionally extends from the top of the display of computer system 600 to the bottom of the display of computer system 600. In some embodiments, computer system 600 optionally includes one or more features of device 100, device 300, or device 500. In some embodiments, computer system 600 is a tablet, phone, laptop, desktop, and/or camera.

Live preview 630 is a representation of a field-of-view of one or more cameras of computer system 600 ("FOV"). In some embodiments, live preview 630 is a representation of a partial FOV. In some embodiments, live preview 630 is based on images detected by one or more camera sensors. In some embodiments, computer system 600 captures images using multiple camera sensors and combines them to display live preview 630. In some embodiments, computer system 600 captures images using a single camera sensor to display live preview 630.

The camera user interface of FIG. 6A includes indicator region 602 and control region 606, which are positioned with respect to live preview 630 such that indicators and controls can be displayed concurrently with live preview 630. Camera display region 604 is substantially not overlaid with indicators and/or controls. As illustrated in FIG. 6A, the camera user interface includes visual boundary 608 that indicates the boundary between indicator region 602 and camera display region 604 and the boundary between camera display region 604 and control region 606.

As illustrated in FIG. 6A, indicator region 602 includes indicators, such as flash indicator 602*a*, modes-to-settings indicator 602*b*, and animated image indicator 602*c*. Flash indicator 602*a* indicates whether a flash mode is on (e.g., active), off (e.g., inactive), or in another mode (e.g., automatic mode). In FIG. 6A, flash indicator 602*a* indicates that the flash mode is off, so a flash operation will not be used when computer system 600 is capturing media. Moreover, modes-to-settings indicator 602*b*, when selected, causes computer system 600 to replace camera mode controls 620 with camera settings controls for setting multiple settings for the currently selected camera mode (e.g., photo camera mode in FIG. 6A). Animated image indicator 602*c* indicates whether the camera is configured to capture a single image and/or multiple images (e.g., in response to detecting a request to capture media). In some embodiments, indicator region 602 is overlaid onto live preview 630 and, optionally, includes a colored (e.g., gray; translucent) overlay.

As illustrated in FIG. 6A, camera display region 604 includes live preview 630 and zoom controls (e.g., affordances) 622. Zoom controls 622 include 0.5× zoom control 622*a,* 1× zoom control 622*b*, and 2× zoom control 622*c*. As illustrated in FIG. 6A, 1× zoom control 622*b* is enlarged compared to the other zoom controls, which indicates that 1× zoom control 622*b* is selected and that computer system 600 is displaying live preview 630 at a "1×" zoom level. In some embodiments, computer system 600 displays 1× zoom control 622*b* as being selected by displaying 1× zoom control 622*b* in a different color than the other zoom controls 622.

As illustrated in FIG. 6A, control region 606 includes camera mode controls 620, shutter control 610, camera switcher control 614, and a representation of media collection 612. In FIG. 6A, camera mode controls 620*a*-620*e* are displayed, which includes panoramic mode control 620*a*, portrait mode control 620*b*, photo mode control 620*c*, video mode control 620*d*, and cinematic video mode control 620*e*. As illustrated in FIG. 6A, photo mode control 620*c* is selected, which is indicated by photo mode control 620*c* being bolded. When photo mode control 620*c* is selected, computer system 600 initiates capture of (e.g., and/or captures) photo media (e.g., a still photo) in response to computer system 600 detecting an input directed to shutter control 610. The photo media that is captured by computer system 600 is representative of live preview 630 that is displayed when the input is directed to shutter control 610. In some embodiments, in response to detecting an input directed to panoramic mode control 620*a*, computer system 600 initiates capture of panoramic media (e.g., a panoramic photo). In some embodiments, in response to detecting an input directed to portrait mode control 620*b*, computer system 600 initiates capture of portrait media (e.g., a still photo, a still photo having a bokeh applied). In some embodiments, in response to detecting an input directed to video mode control 620*d*, computer system 600 initiates capture of video media (e.g., a video). In some embodiments, the indicators and/or controls displayed on the camera user interface are based on the mode that is selected (e.g., and/or the mode that computer system 600 is configured to operate in based on the selected camera mode).

At FIG. 6A, shutter control 610, when activated, causes computer system 600 to capture media (e.g., a photo when shutter control 610 is activated in FIG. 6A), using the one or more camera sensors, based on the current state of live preview 630 and the current state of the camera application (e.g., which camera mode is selected). The captured media is stored locally at computer system 600 and/or transmitted to a remote server for storage. Camera switcher control 614, when activated, causes computer system 600 to switch to showing the field-of-view of a different camera in live preview 630, such as by switching between a rear-facing camera sensor and a front-facing camera sensor. The representation of media collection 612 illustrated in FIG. 6A is a representation of media (e.g., an image, a video) that was most recently captured by computer system 600. In some embodiments, in response to detecting an input directed to media collection 612, computer system 600 displays a similar user interface to the user interface illustrated in FIG. 7 (discussed below). In some embodiments, indicator region 602 is overlaid onto live preview 630 and, optionally, includes a colored (e.g., gray; translucent) overlay.

As discussed above, FIGS. 6A-6BJ illustrate exemplary user interfaces for altering visual content in accordance with some embodiments. In particular, FIGS. 6A-6AC illustrate an exemplary embodiment where a synthetic (e.g., simulated, computer-generated) depth-of-field effect is applied to visual content of media that is currently being captured. The synthetic depth-of-field effect is applied automatically (e.g., not in response to one or more inputs) and/or in response to a user input. When the synthetic depth-of-field effect is applied automatically, computer system 600 makes one or more determinations based on a set of criteria to determine how the synthetic depth-of-field effect is applied and applies the synthetic depth-of-field effect (e.g., without detecting an input to apply the synthetic depth-of-field effect). When the synthetic depth-of-field effect is applied in response to a user input, computer system 600 detects an input and applies the synthetic depth-of-field effect based on the type of input that was detected.

As illustrated in FIG. 6A, computer system 600 displays live preview 630 that includes John 632 and Jane 634. As shown by live preview 630, John 632 is positioned closer to one or more rear-facing cameras of computer system 600 than Jane 634. Live preview 630 of FIG. 6A is displayed without a synthetic depth-of-field effect applied. However, it should be understood that live preview 630 of FIG. 6A is displayed with a natural depth-of-field effect.

As used herein, a natural depth-of-field is different from the synthetic depth-of-field effect. The natural depth-of-field effect is created based on the size of the aperture and focal length of the one or more cameras capturing the scene along with the distance between subjects (e.g., people, animals, objects) in the scene and the one or more cameras. Therefore, the natural depth-of-field effect is directly limited by the physical specification(s) (e.g., focal length, size of the aperture) of the one or more cameras used to capture the scene. However, the synthetic depth-of-field effect is a computer-generated depth-of-field effect (e.g., via software) and is not strictly limited by the physical specification(s) of the one or more cameras and/or the distance between the subjects in the scene and the one or more cameras.

Thus, applying the synthetic depth-of-field effect can have distinct advantages over only applying a natural depth-of-field effect to media. For instance, applying the synthetic depth-of-field effect has an advantage over only applying a natural depth-of-field effect because the synthetic depth-of-field effect can be applied and adjusted in more ways during the capture of the media (e.g., in real-time) (e.g., while adjusting the natural depth-of-field effect is limited by the physical specifications of the one or more cameras). In addition, the synthetic depth-of-field effect provides an advantage because the hardware (e.g., one or more cameras) of computer system 600 do not have to be switched in order to apply a particular depth-of-field effect (e.g., and/or to replace a depth-of-field effect that has one type of tracking during a portion of a video with a depth-of-field effect that has another type of tracking). In some embodiments, the type of tracking with regards to a depth-of-field effect includes emphasizing a particular subject relative to one or more other subjects in the media (e.g., for the duration of the media, for a certain portion of the duration of the media), emphasizing subjects at a particular location of the media relative other subjects in the media, etc.

As illustrated in FIGS. 6A-6BJ, the synthetic depth-of-field effect of a scene (e.g., 630, 640, and/or 660) being displayed by computer system 600 is shown via shading (e.g., white, gray, black). A portion of the scene that is illustrated with darker shading has a greater amount of synthetic blur (e.g., synthetic depth-of-field effect) than a portion of the scene that has lighter shading. It should be understood that the shading shown in FIGS. 6A-6BJ does not represent an exact/accurate representation of the synthetic depth-of-field effect that would be applied to the scene depicted in these figures. However, the shading shown in FIGS. 6A-6BJ are provided to explain how the synthetic depth-of-field effect is applied and/or altered with respect to subjects in the scene automatically and/or in response to user inputs. As shown in FIG. 6A, live preview 630 is not shaded (e.g., is white), which indicates that live preview 630 has only the blur caused by the natural depth-of-field effect. At FIG. 6A, computer system 600 detects rightward swipe input 650*a*1 on live preview 630 and/or a tap input 650*a*2 on cinematic video mode control 620*e*.

At FIG. 6B, in response to detecting rightward swipe input 650*a*1 and/or tap input 650*a*2, computer system 600 moves camera mode controls 620 to the right so that cinematic video mode control 620*e* is displayed in the middle of the camera user interface. At FIG. 6B, computer system 600 displays cinematic video mode control 620*e* as being selected (e.g., bolds) and ceases to display photo mode control 620*a* as being selected. Moreover, in response to detecting rightward swipe input 650*a*, computer system 600 is transitioned from being configured to operate in the photo camera mode to a cinematic video camera mode. In some embodiments, computer system 600 detects a leftward swipe input while cinematic video mode control 620*e* is displayed as being selected and, in response to detecting the leftward swipe input (e.g., in opposite direction of rightward swipe input 650*a*1), computer system 600 moves the camera mode controls to the left so that photo mode control 620*c* is displayed as being selected.

While computer system 600 is operating in the cinematic video camera mode, computer system 600 applies a synthetic depth-of-field effect. In some embodiments, certain camera modes employ a synthetic depth-of-field effect (e.g., cinematic video camera mode) while other camera modes do not employ a synthetic depth-of-field effect (e.g., photo mode, portrait mode, video mode). In some embodiments, synthetic depth-of-field can be manually enabled or disabled for any given camera mode. At FIG. 6B, the applied, synthetic depth-of-field effect emphasizes John 632 relative to Jane 634 (e.g., makes John appear more prominent than Jane by virtue of being less blurred), which can be seen via live preview 630 that shows John 632 and the area around John 632 being shaded lighter than Jane 634 and the area around Jane 634. In particular, John 632 is not shaded in live preview 630, which indicates John 632 is being displayed with only the natural blur, if any, that is created by the natural depth-of-field effect of the one or more cameras of computer system 600. Moreover, John 632 not being shaded in live preview 630 indicates that the synthetic depth-of-field effect is not causing a synthetic blur to be applied to John 632. On the other hand, Jane 634 is displayed with shading (e.g., a darker than John 632) because computer system 600 is applying a synthetic blur to Jane 634 via the synthetic depth-of-field effect that is being applied at FIG. 6B. In some embodiments, the natural blur less visually prominent (or has less blur) than some of the blur that is displayed when applying synthetic depth-of-field effect.

As illustrated in FIG. 6B, computer system 600 displays primary subject indicator 672*a* around the head of John 632 and secondary subject indicator 674*b* around the head of Jane 634. Primary subject indicator 672*a* is displayed around the head of John 632 because John 632 is being emphasized via the applied synthetic depth-of-field effect. Secondary subject indicator 674*b* is displayed around the head of Jane 634 because Jane 634 is not being emphasized via the applied synthetic depth-of-field effect. Thus, at FIG. 6B, computer system 600 displays different indicators to distinguish the subject(s) who are being emphasized by the synthetic depth-of-field effect from the subject(s) who are not being emphasized by the synthetic depth-of-field effect. In some embodiments, secondary subject indicator 674*b* is displayed around the head of Jane 634 because computer system 600 has enough visual content to track and/or focus on (and/or apply a synthetic depth-of-field effect to emphasize) Jane 632. In some embodiments, if computer system 600 does not have enough visual content to track and/or focus on Jane 632, a secondary subject indicator is not displayed around the head of Jane 634 (and/or a secondary subject indicator that corresponds to Jane 634 is not displayed).

As illustrated in FIG. 6B, different portions of the scene shown in live preview 630 have different levels of blur applied. For instance, the tree and grass in live preview 630 of FIG. 6B is illustrated with less detail than the tree and grass in live preview 630 of FIG. 6A, which indicates that the background, foreground, and/or different portions of the scene are also blurred (e.g., not only the subjects in the scene). Moreover, portions of the background of the scene in live preview 630 are displayed with more blur (e.g., darker shading) than the subjects (e.g., John 632 and Jane 634) in live preview 630 after the synthetic depth-of-field effect is applied.

In addition to applying the synthetic depth-of-field effect, in response to detecting rightward swipe input 650*a*1 and/or tap input 650*a*2, computer system 600 expands live preview 630 such that live preview 630 of FIG. 6B takes up more of the area of computer system 600 than live preview 630 of FIG. 6A. In response to detecting rightward swipe input 650*a*1 and/or tap input 650*a*2, computer system 600 continues to display flash indicator 602*a* and ceases to display modes-to-settings indicator 602*b* and animated image indicator 602*c* of FIG. 6A in indicator region 602 of FIG. 6B. As illustrated in FIG. 6B, computer system 600 displays elapsed time indicator 602*d* at the position that modes-to-settings indicator 602*b* was previously displayed in FIG. 6A. In addition, computer system 600 displays depth indicator 602*e* in the place of animated image indicator 602*c*. In some embodiments, in response to receiving an input directed to depth indicator 602*e*, computer system 600 displays a control for adjusting a bokeh effect that is applied to captured media (e.g., as described below in to FIGS. 6AD-6AH). In some embodiments, computer system 600 updates live preview 630 as the control for adjusting the bokeh effect is changed (e.g., using one or more techniques as discussed below in relation to FIGS. 6AD-6AF).

As illustrated in FIG. 6B, in response to detecting rightward swipe input 650*a*1 and/or tap input 650*a*2, computer system 600 also ceases to display 0.5× zoom control 622*a* and 2× zoom control 622*c* and maintains display of 1× zoom control 622*b*. In some embodiments, computer system 600 continues to display 1× zoom control 622*b* because of a determination that is made that the synthetic depth-of-field effect is applied only when computer system 600 is displaying a particular zoom level (e.g., 1×) and/or a range of zoom levels (e.g., 0.8× zoom-1.7× zoom). In some embodiments, computer system 600 continues to display 1× zoom control 622*b* because a set of cameras (e.g., a wide-angle camera (e.g., a camera having a f/1.6 aperture (e.g., and/or f/1.4-f/8.0 aperture) and 60°-120° field of view) is used to capture cinematic video media at the 1× zoom level (and/or a range of zoom values that includes the 1× zoom level). In some embodiments, computer system 600 ceases to display zoom control 622*a* and 2× zoom control 622*c* because computer system 600 does not a particular set of cameras (e.g., an ultra-wide angle camera (e.g., a camera having a f/2.4 aperture (e.g., and/or f/1.4-f/8.0 aperture) and greater than a 120° field of view), a telephoto camera (e.g., a camera having a f/2.0 aperture (e.g., and/or f/1.4-f/8.0 aperture) and 30°-60° field of view and/or less than a 60° field of view) to capture cinematic media at the 0.5× and/or 2× zoom level. In some embodiments, computer system 600 use of the particular set of cameras when applying the syndetic depth-of-field effect is not preferred and/or not optimal (e.g., due to the physical specifications of the particular set of cameras). At FIG. 6B, computer system 600 detects rotation 650*b*1 and tap input 650*b*2 directed to shutter control 610.

Figure 6C:
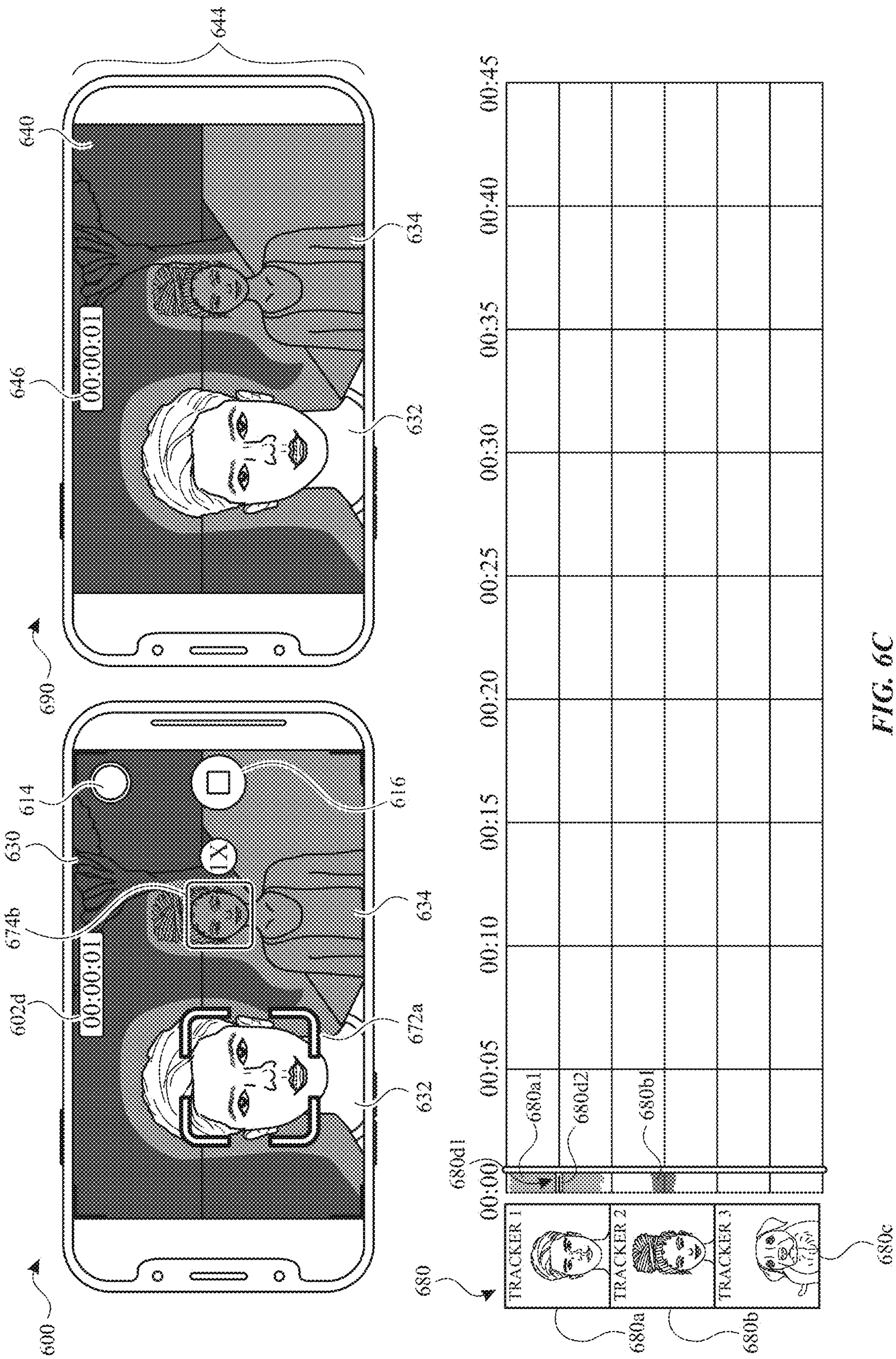

As illustrated in FIG. 6C, in response to detecting rotation 650*b*1, computer system 600 transitions the camera user interface from a portrait orientation to a landscape orientation. Notably, FIG. 6C illustrates two computer systems. Positioned on the right side of FIG. 6C is computer system 600, and positioned on the left side of FIG. 6C is computer system 690. Both computer system 600 and computer system 690 are illustrated such that their respective user interfaces are in a landscape orientation. Computer system 600 of FIG. 6C is capturing a video and displaying stop control 616 in response to tap input 650*b*2. In particular, computer system 600 of FIG. 6C is illustrated to show that the frame (e.g., live preview 630) of the video being captured is at the one second capture duration (e.g., as indicated by elapsed time indicator 602*d*) and/or that one second has elapsed since tap input 650*b*2 was received. Computer system 690 is provided to show how a computer system would display the frame of the video being captured by computer system 600 at FIG. 6C during playback of the video (e.g., after the full video has been captured by computer system 600). One reason why computer system 690 is provided is to show the differences and/or similarities between how a frame of the video is shown while the video is being captured and how a frame of the video is shown after the video has been captured and is being played back. In some embodiments, computer system 600 and computer system 690 are the same system (e.g., at different points in time). In some embodiments, computer system 600 and computer system 690 are different systems (e.g., where a file representing the video captured by computer system 600 has been transferred to computer system 690 after the video is captured).

As illustrated in FIG. 6C, computer system 690 illustrates a media playback user interface that includes previously captured media representation 640 and elapsed time indicator 646. As alluded to above, previously captured media representation 640 is the frame that is displayed during playback of the video that is being captured by computer system 600 (e.g., the frame that is captured and shown via live preview 630). Thus, as illustrated in FIG. 6C, live preview 630 and previously captured media representation 640 represent the same frame of the video being captured by computer system 600 but are shown at different instances in time (e.g., during capture of the video versus during playback of the video). Accordingly, previously captured media representation 640 is shown during the one second capture duration (and/or one second mark) of the video (e.g., as indicated by elapsed time indicator 646). Accordingly, elapsed time indicator 602*d* and elapsed time indicator 646 is displayed with the same elapsed time for the video (e.g., one second).

FIG. 6C also includes graph 680 that includes activity tracker 680*a*, activity tracker 680*b*, and activity tracker 680*c*. Displayed within activity tracker 680*a* is John's activity level 680*a*1 (e.g., activity level for John 632); and displayed within activity tracker 680*b* is Jane's activity level 680*b*1 (e.g., activity level for Jane 634). The John's activity level 680*a*1 and Jane's activity level 680*b*2 are the activity levels that computer system 600 has detected and registered to correspond to the activity levels for John 632 and Jane 634 in real time. Moreover, John's activity level 680*a*1 does not represent the absolute activity level of John 632, and Jane's activity level 680*b*2 does not represent the absolute activity level of Jane 634. Rather, John's activity level 680*a*1 represents the relative activity of John 632 compared to the activity level of Jane 634, and Jane's activity level 680*a*1 represents the relative activity of Jane 634 compared to the activity level of John 632. In addition, the activity levels shown in FIG. 6E represent activity levels that are detected/process by computer system 600 in real time, which can lagged behind the actual characteristics (e.g., physical/visual characteristics of a subject for determining whether a subject is talking, moving, gazing in a particular direction, obscured by one or more other objects in the scene, etc.) that are used to determine the activity levels of the subjects in the scene. As illustrated in FIG. 6C, activity tracker 680*c* does not include an activity level because dog 638 has not been captured by computer system 600 (e.g., not displayed in live preview 630) before the one second elapsed time indicated by elapsed time indicator 602*d*. Looking forward to FIG. 6W, when dog 638 is captured by computer system 600 (e.g., dog 638 displayed in live preview 630 of FIG. 6W), activity tracker 680*c* (e.g., in FIG. 6C) includes dog's activity level 680*c*1 (e.g., activity level for dog 638). The activity levels displayed in graph 680 represents a subject's activity level at a certain time (e.g., 0:00-0:45) in the video being captured by computer system 600. As illustrated in FIG. 6C, John's activity level 680*a*1 is higher than Jane's activity level 680*b*1 (e.g., as indicated by John's activity level 680*a*1 occupying more area than Jane's activity level 680*b*1). At FIG. 6C, John's activity level 680*a*1 is higher because John 632 is closer to the one or more cameras of computer system 600 (e.g., that are capturing the scene shown in live preview 630) and because John 632 is currently talking (e.g., as indicated by the mouth of John 632 being higher). Moreover, Jane's activity level 680*b*1 is lower because Jane 634 is further way from the one or more cameras of computer system 600 and because Jane 634 is not talking (e.g., as indicated by the mouth of Jane 634 being closed).

At FIG. 6C, in response to detecting tap input 650*b*2, computer system 600 initiates capture of the video and a determination is made that John 632 (e.g., based on the activity level of John 632) satisfies a set of automatic selection criteria. In particular, John 632 satisfies the set of automatic selection criteria because John 632 has had a higher activity level than Jane 634 during a duration of time that the video has been captured (e.g., as indicated by John's activity level 680*a*1 being higher than Jane's activity level 680*b*1 between zero seconds to one second). As illustrated in FIG. 6C, because the determination is made that John 632 satisfies the set of automatic selection criteria, computer system 600 applies a synthetic depth-of-field effect to the frame of the video being captured at the one second capture duration. As shown by live preview 630 of FIG. 6C, the synthetic depth-of-field effect that is applied emphasizes John 632 relative to Jane 634 such that John 632 is displayed with less blur than Jane 634 (e.g., as indicated by John 632 having lighter shading than Jane 634). In addition, computer system 600 displays primary subject indicator 672*a* around the head of John 632 because John 632 is being emphasized by the synthetic depth-of-field effect and displays secondary subject indicator 674*b* around the head of Jane 634 because Jane 634 is not being emphasized by the synthetic depth-of-field effect.

As shown in FIG. 6C, graph 680 is provided to indicate which subject is being emphasized by the synthetic depth-of-field effect at a particular instance in time. As illustrated in FIG. 6C, graph 680 includes media capture line 680*d*1 and media playback line 680*d*2. Media capture line 680*d*1 indicates which subject that the synthetic depth-of-field effect is emphasizing at a particular time during the capture of the video (e.g., by computer system 600). Moreover, media playback line 680*d*2 indicates which subject that the synthetic depth-of-field effect is emphasizing at a particular time during the playback of the video (e.g., by computer system 690). When media capture line 680*d*1 is at (or near) the center line of a respective activity tracker (e.g., media capture line 680*d*1 being on the center line of John's activity tracker 680*a* in FIG. 6C), computer system 600 is applying the synthetic depth-of-field effect to emphasize the respective subject over other subjects in the FOV at the particular time. Likewise, when media playback line 680*d*2 is at (or near) the center line of a respective activity tracker (e.g., media playback line 680*d*2 being on the center line of John's activity tracker 680*a* in FIG. 6C), computer system 600 is applying the synthetic depth-of-field effect to emphasize the respective subject over other subjects in the FOV at the particular time. Thus, computer system 600 displaying live preview 630 with the synthetic depth-of-field effect that emphasizes John 632 relative to Jane 634 is indicated by media capture line 680*d*1 being at the center of John's activity tracker 680*a*. And computer system 690 displaying previously captured media representation 640 with the synthetic depth-of-field effect that emphasizes John 632 relative to Jane 634 is indicated by media playback line 680*d*2 being at the center of John's activity tracker 680*a*. At particular times on graph 680 (e.g., graph 680 of FIG. 6F from two seconds to three seconds in the media) where a media capture line 680*d*1 or media playback line 680*d*2 is not at the center of a respective media tracker, a computer system is transitioning the synthetic depth-of-field effect such that a new subject will be emphasized over the respective subject in the media.

Figure 6D:
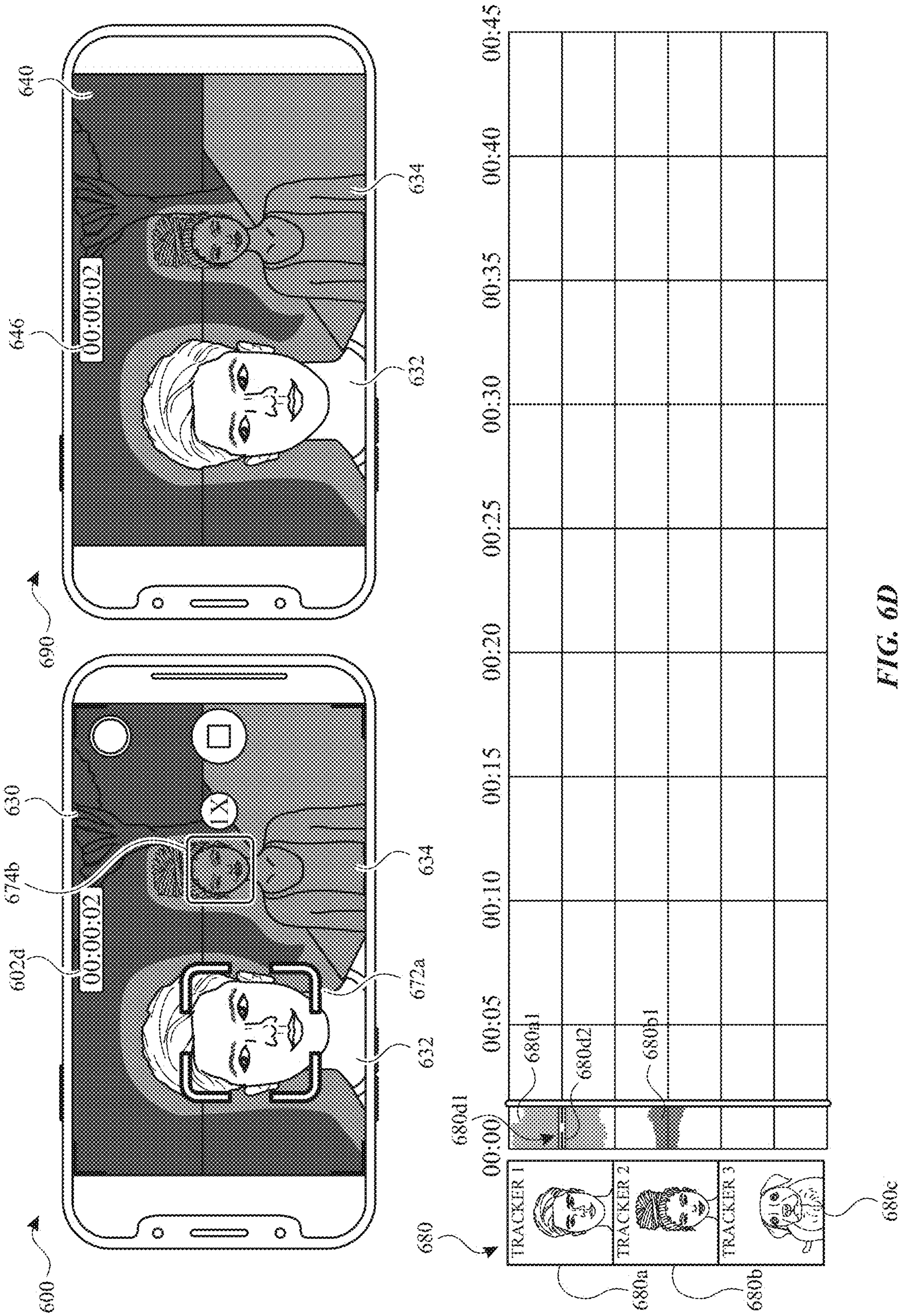
Figure 6E:
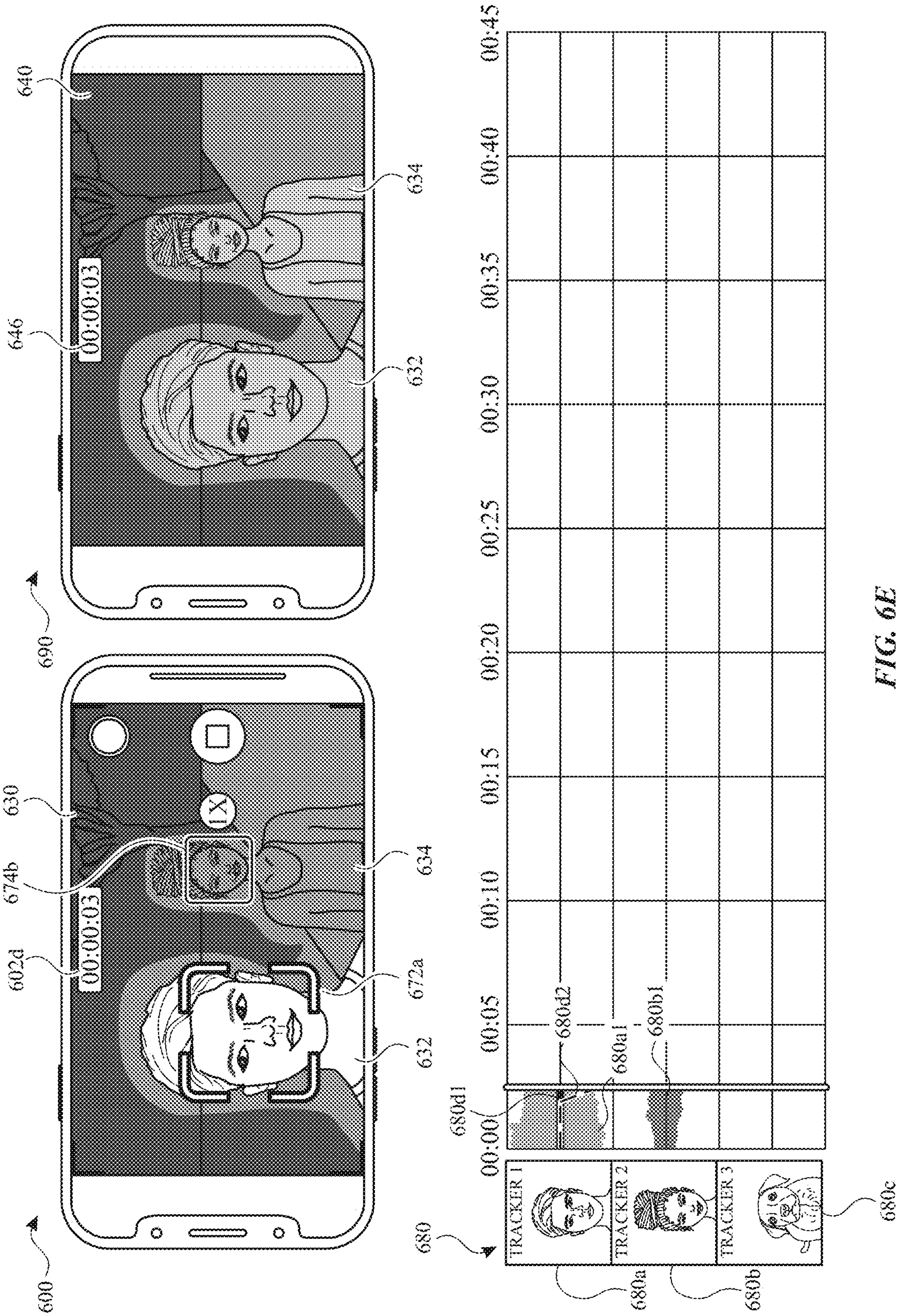

FIGS. 6D-6G illustrate an exemplary embodiment where computer system 600 automatically changes the synthetic depth-of-field effect to emphasize Jane 634 relative to John 632. As illustrated in FIG. 6D, computer system 600 displays the scene shown in live preview 630 (e.g., representing a frame of the video) at two seconds during the capture of the video (e.g., as indicated by elapsed time indicator 602*d*). Live preview 630 shows the eyes of John 632 looking away from the one or more cameras in FIG. 6D, which is a change from the eyes of John 632 in live preview 630 of FIG. 6C. Thus, the gaze of John 632 has changed from being directed towards the one or more cameras of computer system 600 in FIG. 6C to being directed away from the one or more camera of computer system 600 in FIG. 6D. The gaze of a subject being directed towards the one or more cameras of computer system 600 can increase the subject's activity level, which increases the probability of the subject satisfying the automatic selection criteria. However, the gaze of a subject being directed away from the one or more cameras of computer system 600 can decrease the subject's activity, which decreases the chances of the subject satisfying the automatic selection criteria. Thus, at FIG. 6D, the activity level of John 632 has started to decrease along with the probability that John 632 will continue to satisfy the set of automatic selection criteria. In addition to the change in gaze, John 632 has stopped talking in FIG. 6D and Jane 634 has started talking in FIG. 6D. However, computer system 600 has not made a determination that Jane 634 has satisfied the set of automatic selection criteria because computer system 600 is detecting the activity level of the subjects in real-time (e.g., as the video is being captured) and more information (e.g., data, visual content) is needed to make this determination. As illustrated in FIG. 6D, computer system 600 continues to apply the synthetic depth-of-field effect to emphasize John 632 relative to Jane 634 because the determination has not be made that Jane 634 satisfies the set of automatic selection criteria (e.g., computer system 600 is still relying on the determination that was made with regards to John satisfying the set of automatic selection criteria discussed above in FIG. 6C) during a timeframe of the video. Notably, to indicate that computer system 600 has not detected the relative change in activity levels of John 632 and Jane 634, John's activity level 680*a*1 continues to be larger than Jane's activity level 680*b*2 in graph 680 of FIG. 6D.

As opposed to computer system 600 of FIG. 6D, computer system 690 of FIG. 6D is playing back the video that was previously captured by computer system 600. Thus, computer system 690 has enough information to make the determination that Jane 634 satisfies the set of automatic selection criteria. This is at least because computer system 690 has more (or all) of the information that corresponds to the captured video. As such, computer system 690 can make a determination as to whether a subject satisfies the set of automatic criteria during a particular timeframe of the video because computer system 690 can access the information in the previously captured video. At FIG. 6D, computer system 690 makes a determination that Jane 634 satisfies the automatic selection criteria during a timeframe of the video and, based on this determination, automatically applies a synthetic depth-of-field effect to emphasize Jane 634 relative to John 632. However, as illustrated in FIGS. 6D-6G, computer system 690 displays an animation of previously captured media representation 640 smoothly transitioning from emphasizing John 632 relative to Jane 634 to emphasizing Jane 634 relative to John 632 (e.g., instead of a more abrupt transition). As a part of the animation, computer system 690 gradually displays John 632 with more blur and gradually displays Jane 634 with less blur such that Jane 634 is emphasized relative to John 632 (e.g., with about the same difference in blur when John 632 was emphasized relative to Jane 634 in FIG. 6B) at FIG. 6G.

As illustrated in FIG. 6E, computer system 600 displays the scene shown in live preview 630 at three seconds during the capture of the video (e.g., as indicated by elapsed time indicator 602*d*). Live preview 630 continues to show the eyes of John 632 looking away from the one or more cameras in FIG. 6E (e.g., which is unchanged from live preview 630 of FIG. 6D). At FIG. 6E, computer system 600 has not made a determination that Jane 634 satisfies the set of automatic selection criteria because computer system 600 needs more information (e.g., data, content) to make this determination. As illustrated in FIG. 6D, computer system 600 continues to apply the synthetic depth-of-field effect to emphasize John 632 relative to Jane 634 because the determination has not been made that Jane 634 satisfies the set of automatic selection criteria.

Figure 6F:
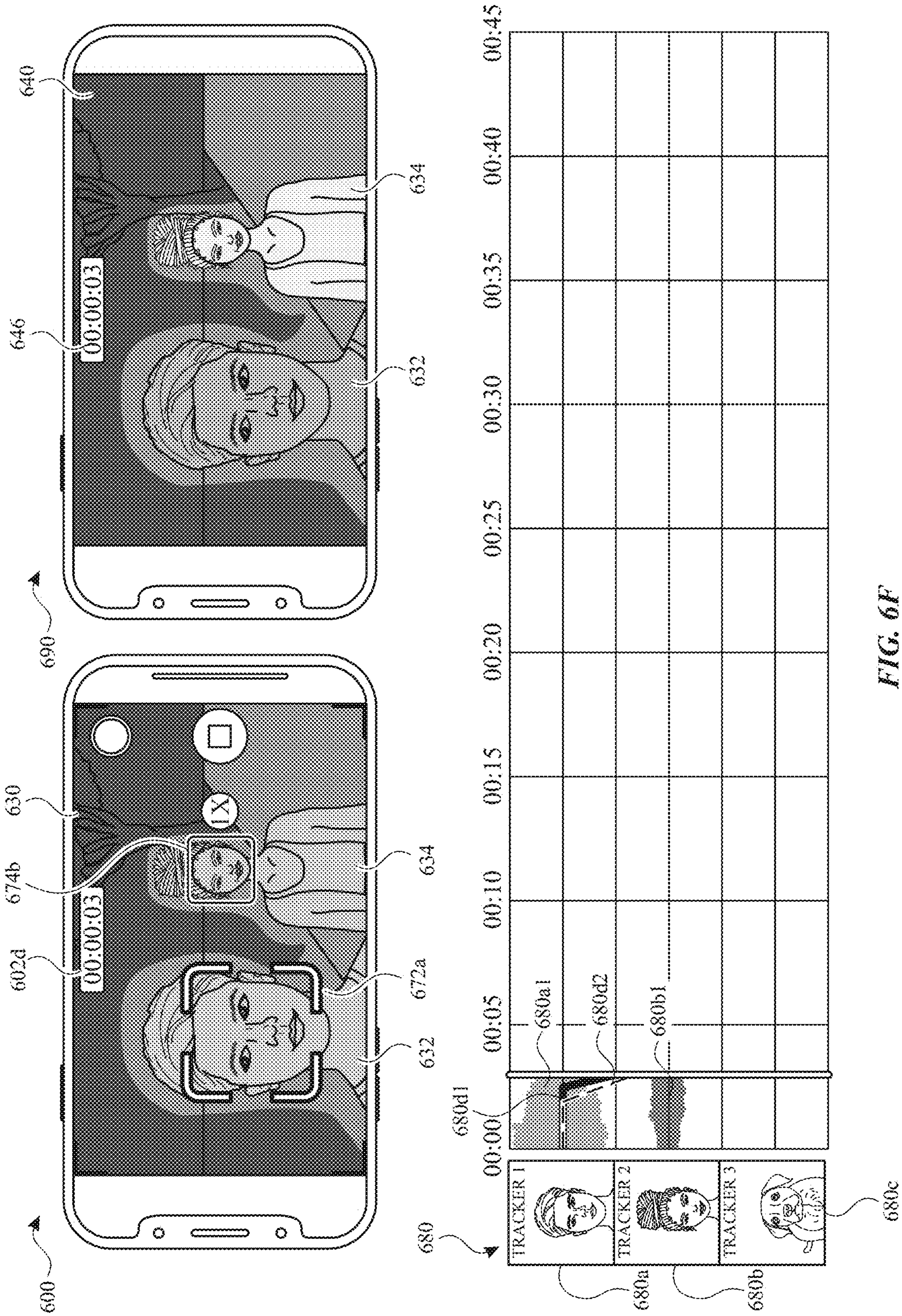

As illustrated in FIG. 6F, computer system 600 displays the scene shown in live preview 630 during the capture video. While elapsed time indicator 602*d* shows three seconds in FIG. 6F, live preview 630 of FIG. 6F is displayed after live preview 630 of FIG. 6E is displayed. At FIG. 6F, computer system 600 makes a determination that Jane 634 satisfies the set of automatic selection criteria (e.g., because computer system 600 has enough information at FIG. 6F). Based on this determination, computer system 600 automatically changes the synthetic depth-of-field effect to emphasize Jane 634 relative to John 632 and displays an animation of John 632 having more blur and Jane 634 having less blur in FIGS. 6F-6G.

Figure 6G:
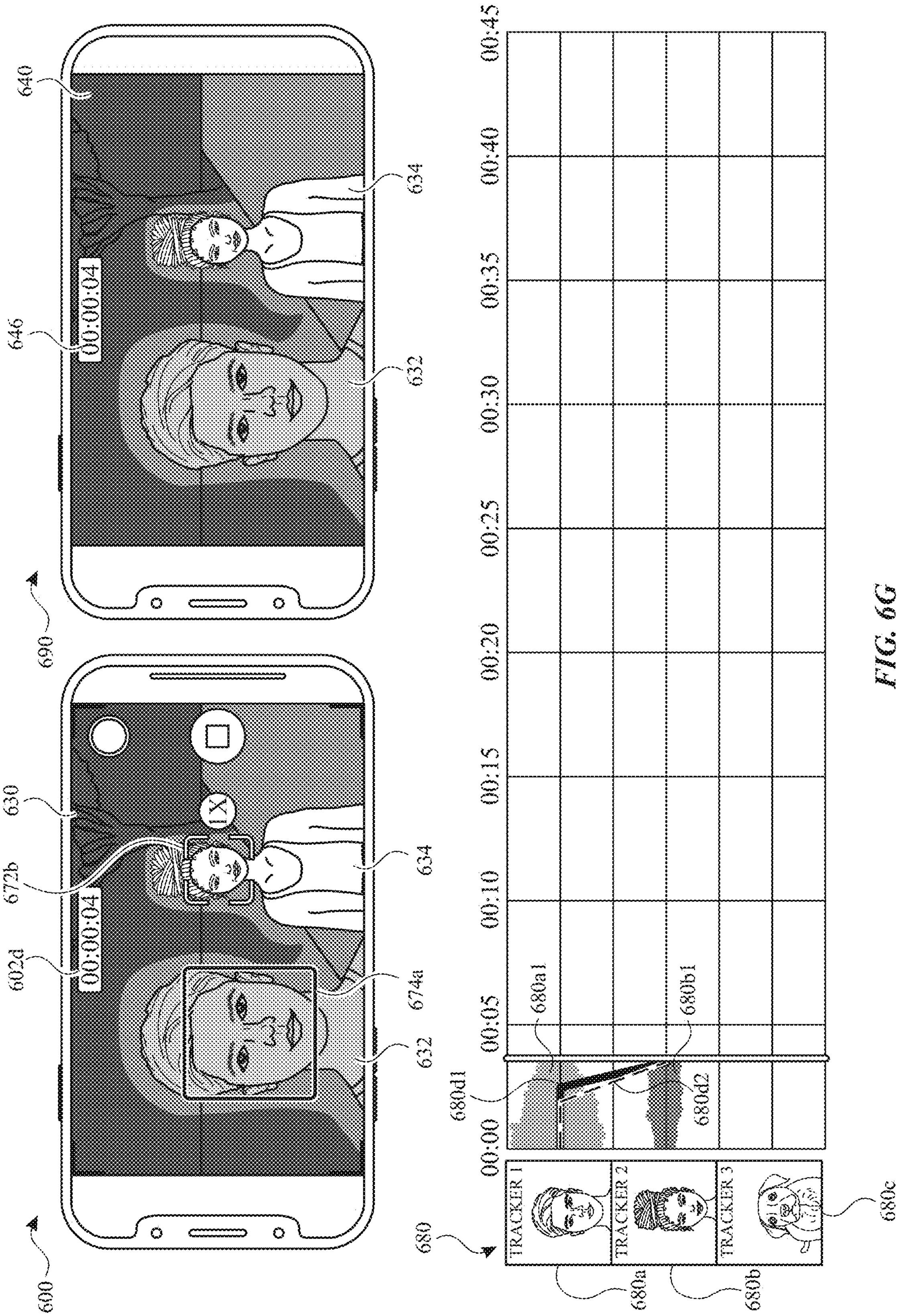

Notably, the animation displayed by computer system 600 in FIGS. 6F-6G includes a more abrupt and less smooth transition as compared to the transition included animation by computer system 690 in FIGS. 6E-6G. This is at least because computer system 690 was able to determine that the set of automatic selection criteria is satisfied and that the change in the synthetic depth-of-field effect to emphasize Jane 634 relative to John 632 would need to occur by four seconds (e.g., because of live preview 630 of computer system 600 being updated to show the completed change in the synthetic depth-of-field effect at FIG. 6G) into playback/capture of the video before computer system 600 was able to make this determination. At FIG. 6G, media capture line 680*d*1 and media playback line 680*d*2 of graph 680 provide context to the comparison of the animations displayed by computer system 600 and 690. Media capture line 680*d*1 moves from John's activity tracker 680*a* to women's activity tracker 680*b* at a later time than media playback line 680*d*2. In addition, media capture line 680*d*1 ramps down faster (e.g., shorter and more abrupt animation of FIGS. 6F-6G that was displayed by computer system 600) than media playback line 680*d*2 (e.g., longer and more smooth animation of FIGS. 6E-6G that was displayed by computer system 600).

As illustrated in FIG. 6G, computer system 600 and computer system 690 have applied the synthetic depth-of-field effect to emphasize Jane 634 relative to John 632 (e.g., where the shading of live preview 630 matches the shading of previously captured media representation 640). As illustrated in FIG. 6G, along with applying the synthetic depth-of-field effect to emphasize Jane 634 relative to John 632, computer system 600 ceases to display primary subject indicator 672*a* around the head of John 632 and secondary subject indicator 674*b* around the head of Jane 634 and displays primary subject indicator 672*b* around the head of Jane 634 and secondary subject indicator 674*a* around the head of John 632. Primary subject indicator 672*b* indicates that Jane 634 is currently being emphasized by the synthetic depth-of-field effect, and secondary subject indicator 674*b* indicates that John 632 is not being emphasized by the synthetic depth-of-field effect. As illustrated in FIGS. 6F-6G, primary subject indicator 672*a* of FIG. 6F and primary subject indicator 672*b* of FIG. 6G have the same visual appearance (e.g., a focus bracket, same shape, and/or same object). Likewise, secondary subject indicator 674*a* of FIG. 6G and secondary subject indicator 674*b* of FIG. 6F have the same visual appearance (e.g., a rectangle, same shape, and/or same object). However, a primary subject indicator and a secondary subject indicator do not have the same visual appearance (e.g., 672*a*-672*b* as compared to 674*a*-674*b* in FIGS. 6F-6G). In some embodiments, computer system 600 ceases to display primary subject indicator 672*a* around the head of John 632 and secondary subject indicator 674*b* around the head of Jane 634 and/or displays primary subject indicator 672*b* around the head of Jane 634 and secondary subject indicator 674*a* around the head of John 632 during the animation of the transition of the change in the application of the synthetic depth-of-field effect.

In some embodiments, computer system 600 and computer system 690 display their respective animations differently than the animations illustrated in and discussed above in relation to FIGS. 6AD-6AG. In some embodiments, computer system 600 determines that an automatic change in the synthetic depth-of-field effect should occur (e.g., computer system 600 makes this determination at four seconds during the capture of the video). In some embodiments, computer system 600 automatically displays an animation of the change in the synthetic depth-of-field effect when the determination is made that an automatic change in the synthetic depth-of-field effect should occur (e.g., animation that is played back between four and five during the capturing of the video). In some embodiments, the animation that is displayed is fully completed, such that live preview 630 is updated to show the completion of the change in the synthetic depth-of-field effect at some time after the determination is made (e.g., at five second during the capturing of the video). In some embodiments, computer system 690 determines that an automatic change in the synthetic depth-of-field effect should occur at the time (e.g., four seconds) that computer system 600 made this determination while capturing the live video (e.g., computer system 690 makes this determination at three seconds during playback of the video). In some embodiments, computer system 690 displays an animation of the change in the synthetic depth-of-field effect when computer system 690 determines that an automatic change in the synthetic depth-of-field effect should occur (e.g., animation that is displayed between three and four seconds during the playback of the video). In some embodiments, the animation of the change in the synthetic depth-of-field effect displayed by computer system 690 is fully completed, such that previously captured media representation 640 is updated to show the completion of the change in the synthetic depth-of-field effect at the time (e.g., four seconds) that computer system 600 made its determination while capturing the live video. In some embodiments, the animation that is displayed by computer system 690 is as long as the animation that is displayed by computer system 600 (e.g., both animations are 1-5 seconds). In some embodiments, the animation displayed by computer system 690 is fully completed at a time that corresponds to an earlier time of the video than the time at which the animation displayed by computer system 600 is fully completed.

Figure 6H:
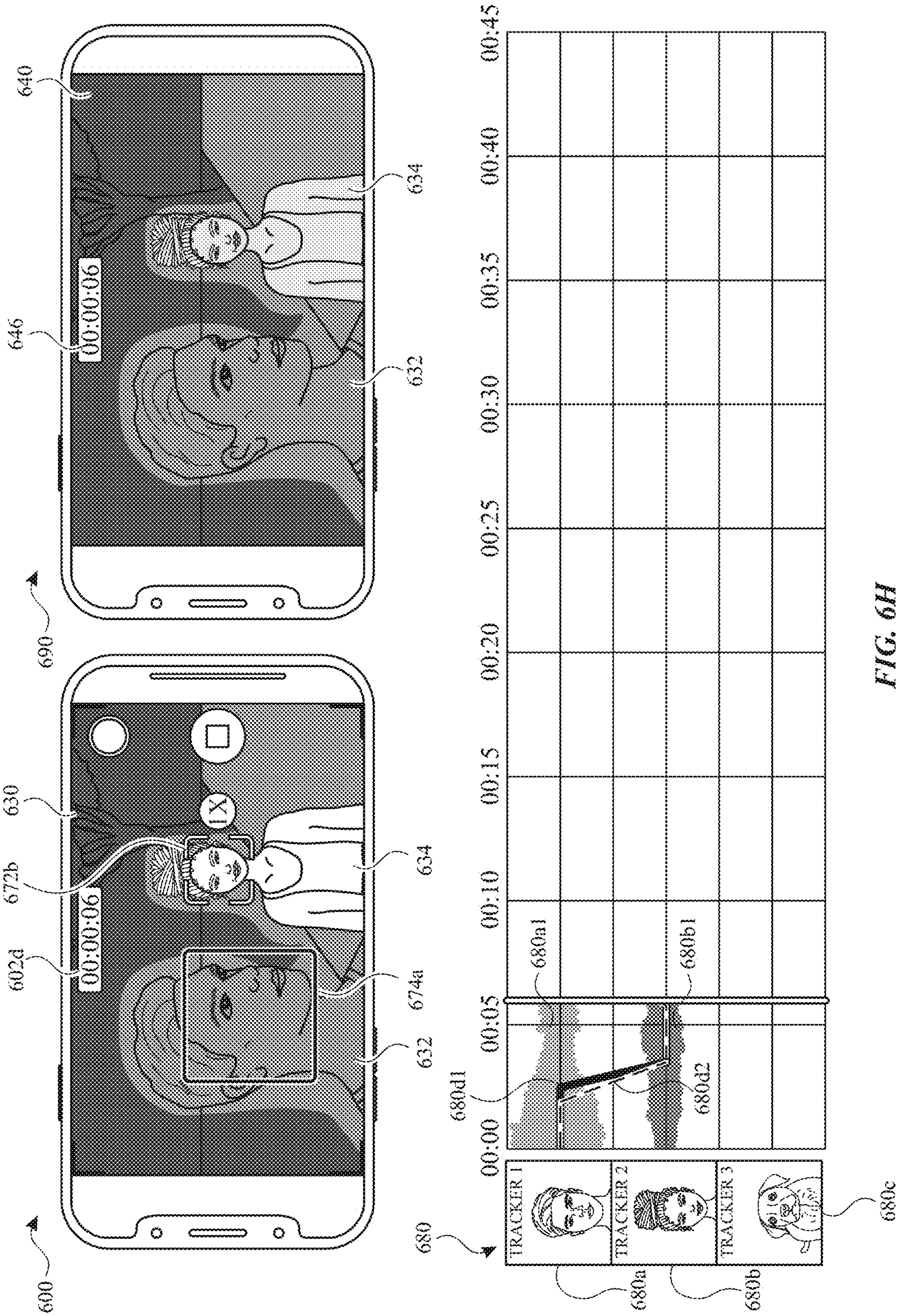

FIGS. 6H-6K illustrate an exemplary embodiment where computer system 600 automatically changes the synthetic depth-of-field effect to emphasize John 632 relative to Jane 634. As illustrated in FIG. 6H, computer system 600 displays the scene shown in live preview 630 (e.g., representing a frame of the video) at six seconds during the capture of the video (e.g., as indicated by elapsed time indicator 602*d*). Live preview 630 of FIG. 6H shows that the head of John 632 has moved (e.g., sideways), which indicates that John 632 is moving within the field-of-view of the one or more cameras. An increase in motion of a subject in the field-of-view of the one or more cameras can increase the subject's activity level, which increases the probability of the subject satisfying the automatic selection criteria. Conversely, a decrease in motion of a subject in the field-of-view of the one or more cameras can decrease the subject's activity level, which decreases the probability of the subject satisfying the automatic selection criteria. In addition, Jane 634 has stopped talking (e.g., as indicated by the mouth of Jane 634 being closed in FIG. 6H). As illustrated in FIG. 6H, computer system 600 continues to apply the synthetic depth-of-field effect to emphasize Jane 634 relative to John 632 because computer system 600 has not made the determination that Jane 634 satisfies the set of automatic selection criteria due to not having enough information (e.g., for similar reasons as discussed above in relation to FIG. 6D).

As opposed to computer system 600 of FIG. 6H, computer system 690 has made the determination that Jane 634 satisfies the set of automatic selection criteria during a particular time frame of the video (e.g., for similar reasons as discussed above in relation to FIGS. 6D-6G) and, based on this determination, automatically changes the synthetic depth-of-field effect to emphasize John 632 relative to Jane 634. As illustrated in FIGS. 6H-6K, computer system 690 displays an animation of previously captured media representation 640 smoothly transitioning from emphasizing Jane 634 relative to John 632 to emphasizing John 632 relative to Jane 634. As a part of the animation, computer system 690 gradually displays Jane 634 with more blur and gradually displays John 632 with less blur such that John 632 is emphasized relative to Jane 634 at FIG. 6K (e.g., using one or more similar techniques as described above in relation to FIGS. 6D-6G).

Figure 6I:
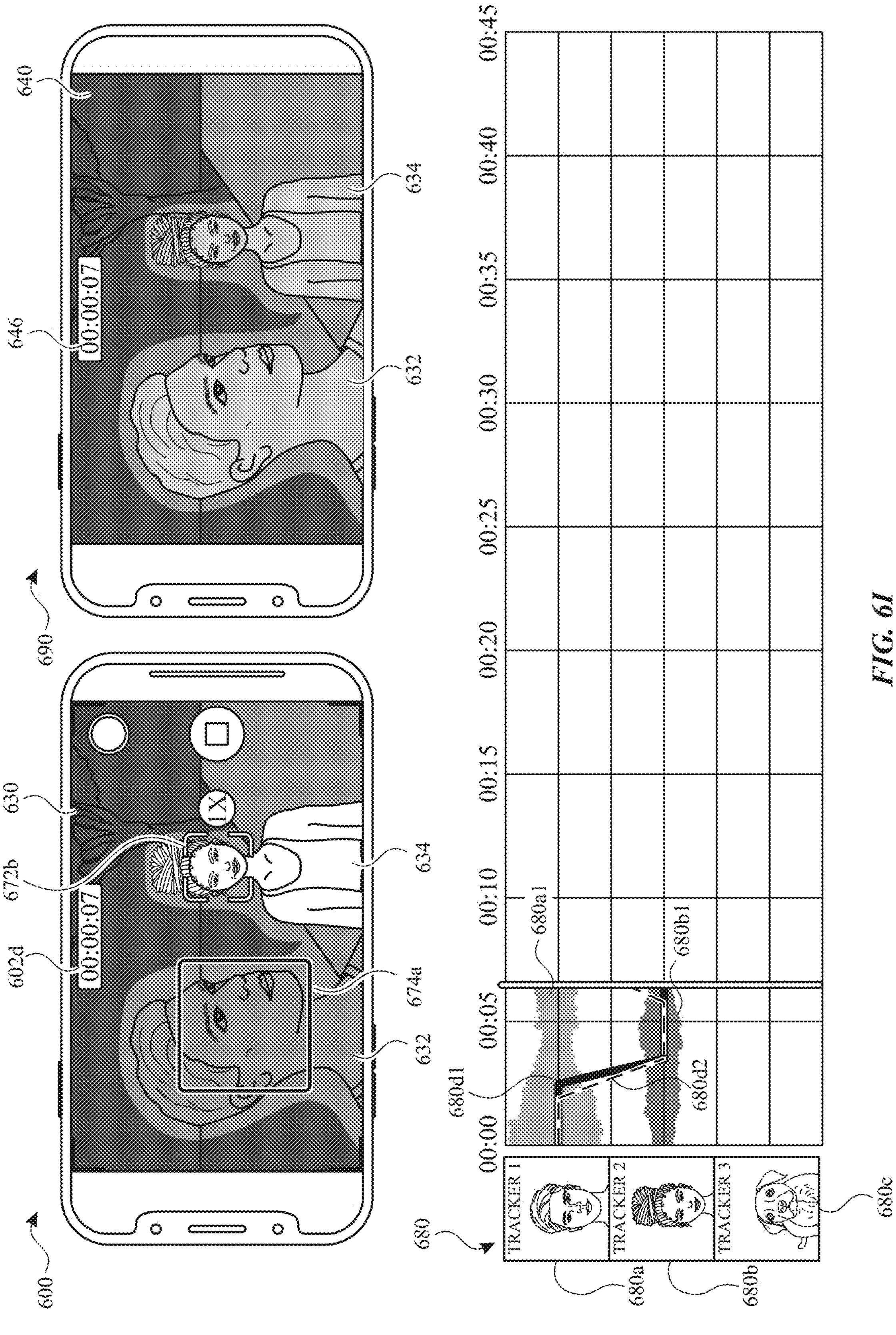

As illustrated in FIG. 6I, computer system 600 displays the scene shown in live preview 630 at seven seconds during the capture of the video (e.g., as indicated by elapsed time indicator 602*d*). Live preview 630 continues to show that John 632 is moving in the FOV (e.g., John 632 head is in a different position in FIG. 6I than in FIG. 6H). At FIG. 6I, computer system 600 has not made a determination that John 632 satisfies the set of automatic selection criteria because more information is needed to make this determination. As illustrated in FIG. 6I, computer system 600 continues to apply the synthetic depth-of-field effect to emphasize Jane 634 relative to John 632 because the determination has not be made that John 632 satisfies the set of automatic selection criteria (e.g., relying on the determination made in FIG. 6F).

Figure 6J:
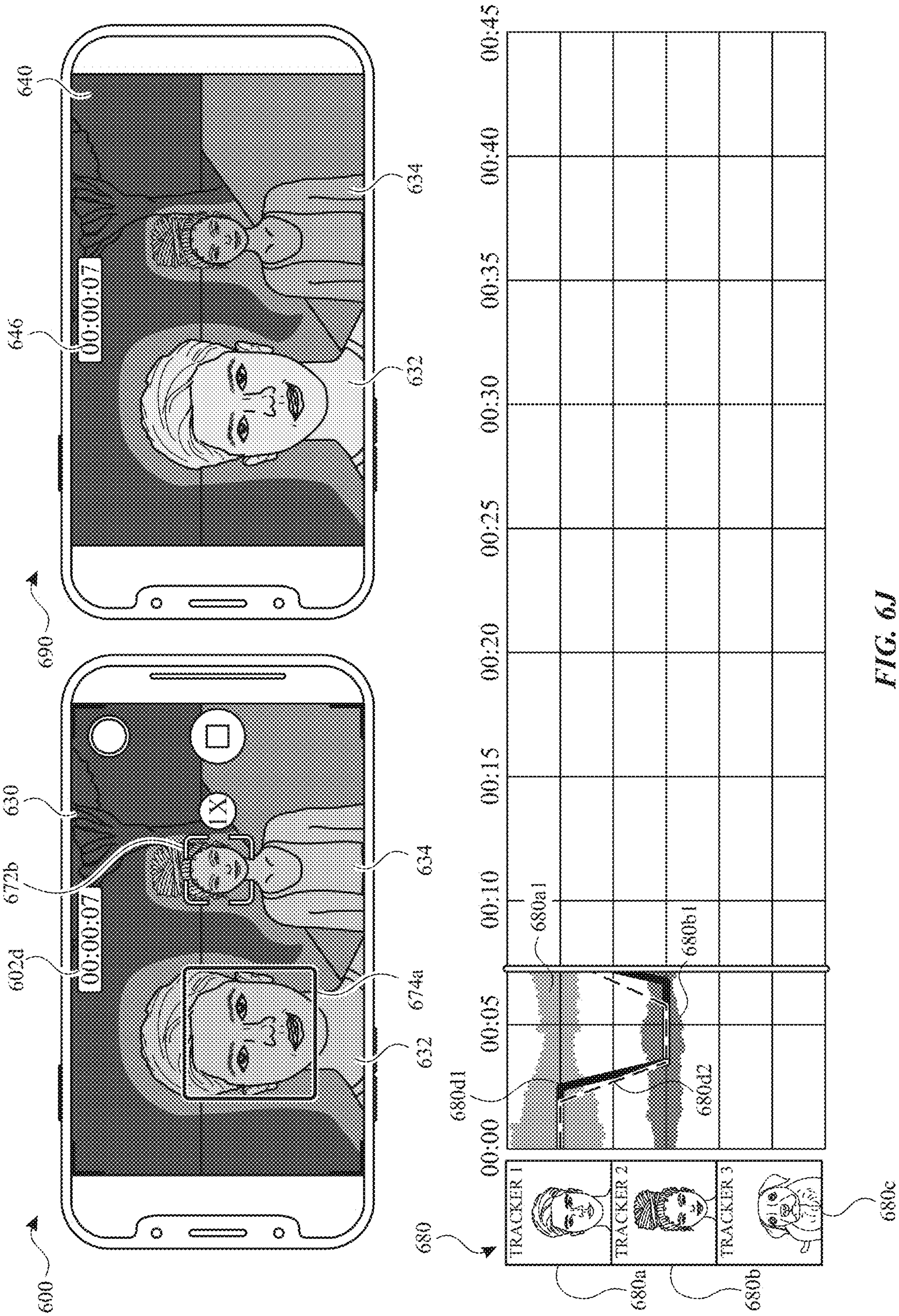
Figure 6K:
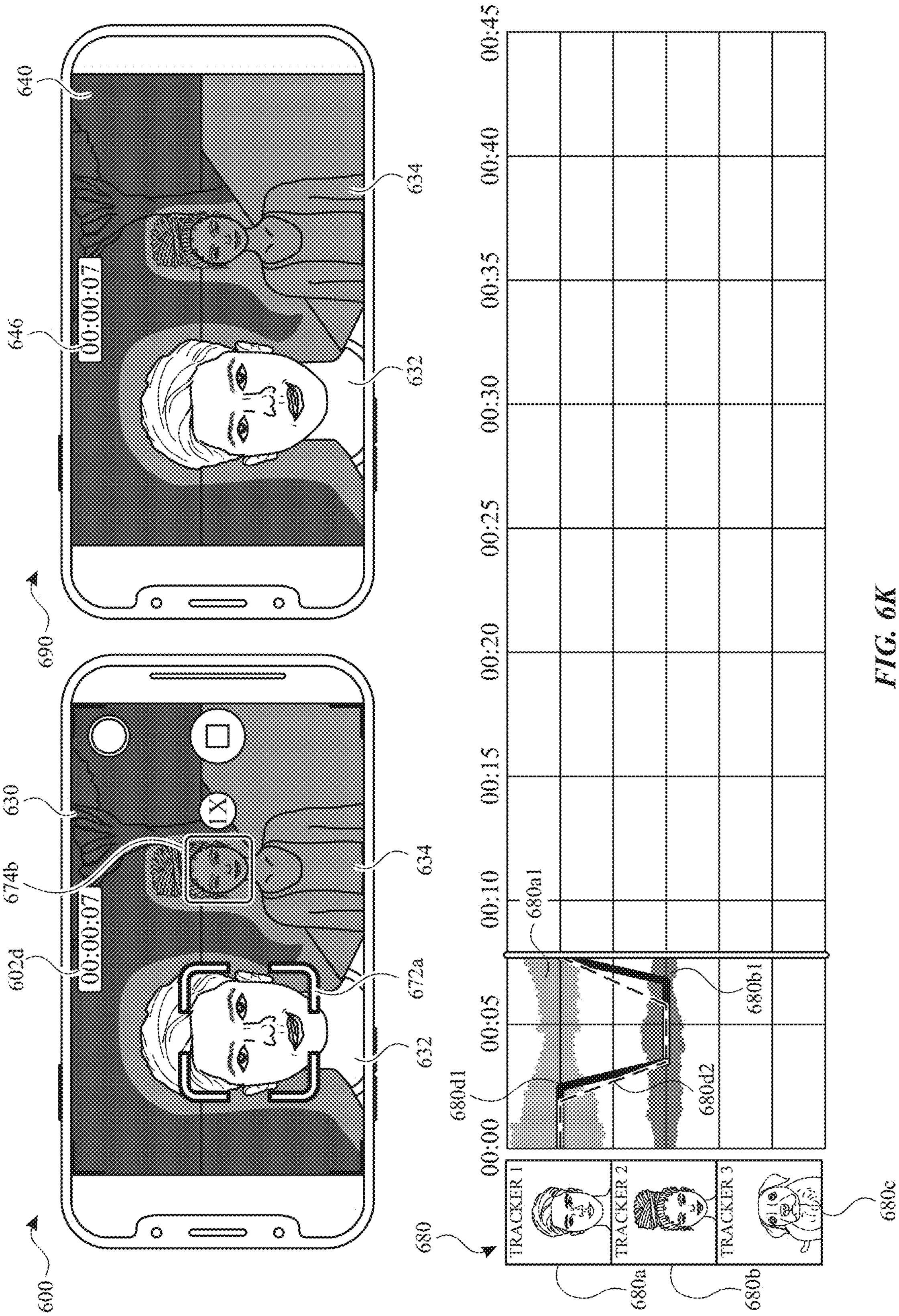

As illustrated in FIG. 6J, computer system 600 displays the scene shown in live preview 630 during the capture video and computer system 600 continues to show that John 632 is moving in the FOV. While elapsed time indicator 602*d* shows seven seconds, live preview 630 of FIG. 6J is displayed after live preview 630 of FIG. 6I is displayed. At FIG. 6J, computer system 600 makes a determination that John 632 satisfies the set of automatic selection criteria (e.g., for similar reasons as discussed above in relation to FIGS. 6F-6G). Based on this determination, computer system 600 automatically changes the synthetic depth-of-field effect to emphasize John 632 relative to Jane 634 and displays an animation of the blur that John 632 is displayed with decreasing and the blur that John 632 is displayed with increasing (e.g., using one or more techniques and for similar reasons as discussed above in relation to FIGS. 6F-6G). As illustrated in FIG. 6G, along with applying the synthetic depth-of-field effect to emphasize John 632 relative to Jane 634, computer system 600 displays primary subject indicator 672*a* around the head of John 632 and secondary subject indicator 674*b* around the head of Jane 634 (e.g., using one or more techniques and for similar reasons as discussed above in relation to FIGS. 6F-6G). Media capture line 680*d*1 and media playback line 680*d*2 of graph 680 of FIGS. 6G-6J are also updated and displayed for similar reasons as discussed above in relation to FIGS. 6F-6G.

Figure 6L:
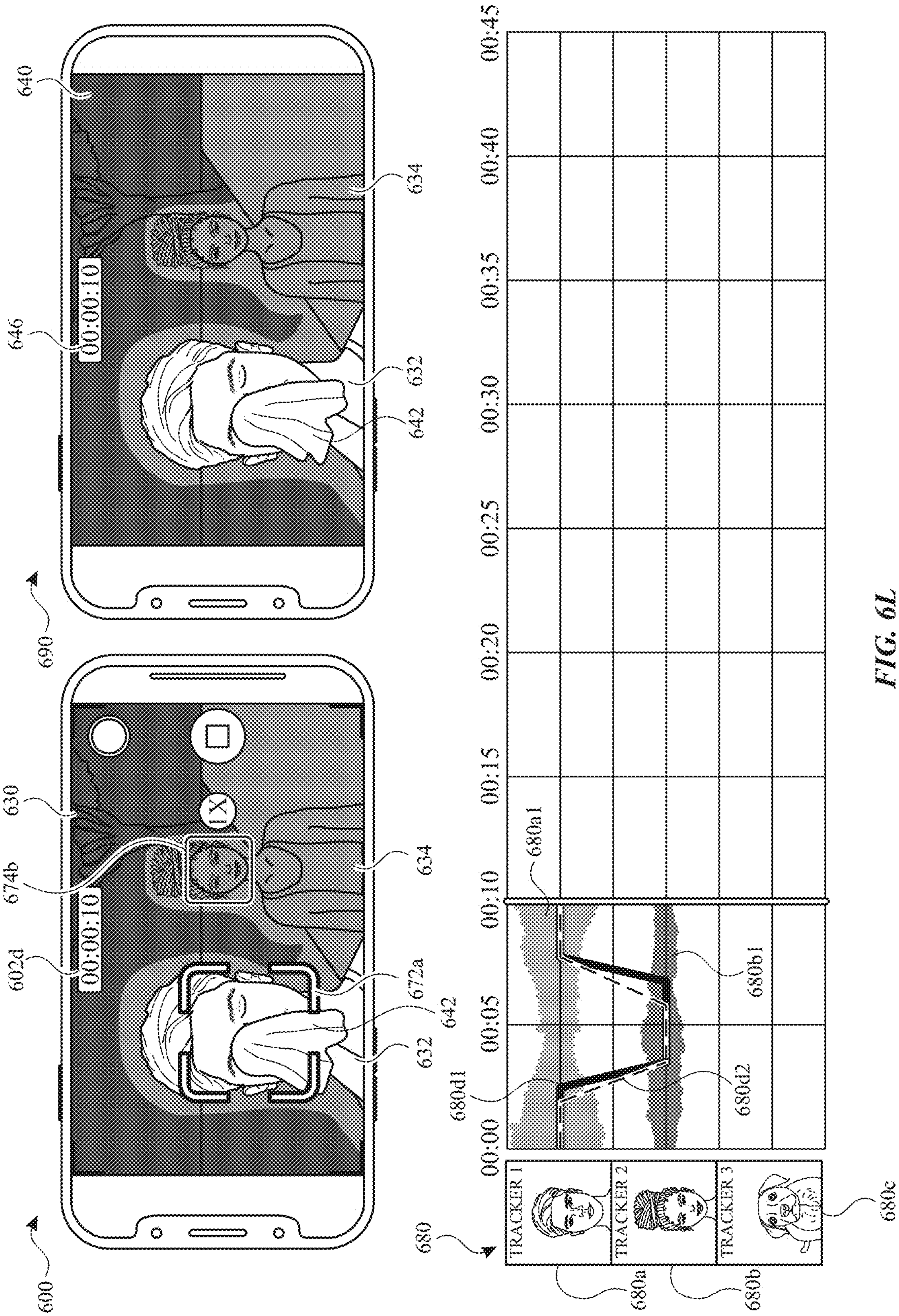
Figure 6M:
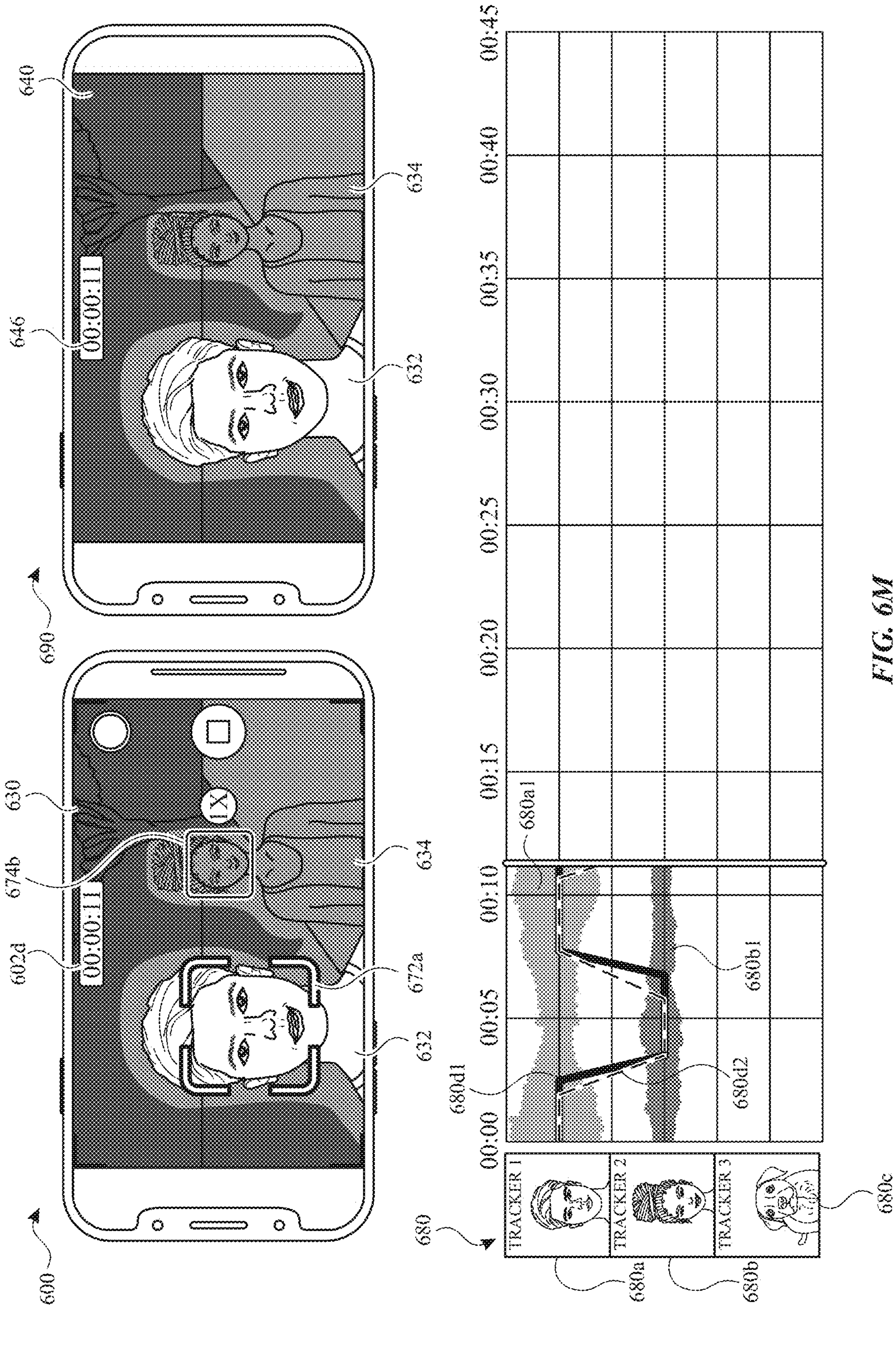

FIGS. 6L-6M illustrate an exemplary embodiment where computer system 600 does not change the synthetic depth-of-field effect that has been previously applied. As illustrated in FIG. 6L, computer system 600 displays the scene shown in live preview 630 at ten seconds during the capture of the video (e.g., as indicated by elapsed time indicator 602*d*), where John 632 is wiping his face with towel 642. As illustrated in FIG. 6L, towel 642 covers (and/or obscures) the face of John 632. In some embodiments, towel 642 covers the face of John 632 such that computer system 600 cannot detect the face of John 632 in the field-of-view of the one or more cameras (e.g., using one or more facial detection techniques). As illustrated in FIG. 6M, computer system 600 displays the scene shown in live preview 630 at eleven seconds, where live preview 630 shows that John 632 has removed towel 642 of FIG. 6L from his face. Thus, at FIG. 6M, the face of John 632 is no longer covered.

At FIGS. 6L-6M, computer system 600 and computer system 690 make individual determinations that the face of John 632 was covered and/or obscured (e.g., and/or the respective computer system could not detect the face of John 632) for less than a predetermined period of time (e.g., 2-60 seconds). At FIGS. 6L-6M, because of these individual determinations, computer system 600 and computer system 690 individually continue to apply the synthetic depth-of-field effect that has been previously applied (e.g., to emphasize John 632 relative to Jane 634 in FIGS. 6H-6K), irrespective of whether or not towel 642 obscures the face of John 632. As illustrated in FIG. 6L, John 632 is emphasized relative to Jane 634 in both live preview 630 and previously captured media representation 640 even when towel 642 is obscuring the face of John 632. As illustrated in FIGS. 6L-6M, computer system 600 continues to display primary subject indicator 672*a* and secondary subject indicator 674*a* because computer system 600 is continuing to apply the synthetic depth-of-field effect that was being previously applied before John 632 covered his face with a towel 642 in FIG. 6L. In some embodiments, the determination made by computer system 690 in FIGS. 6L-6M occurs earlier with respect to the elapsed time of the video than the determination made by computer system 600 (e.g., for similar reasons as discussed above in relation to FIGS. 6D-6G).

Figure 6N:
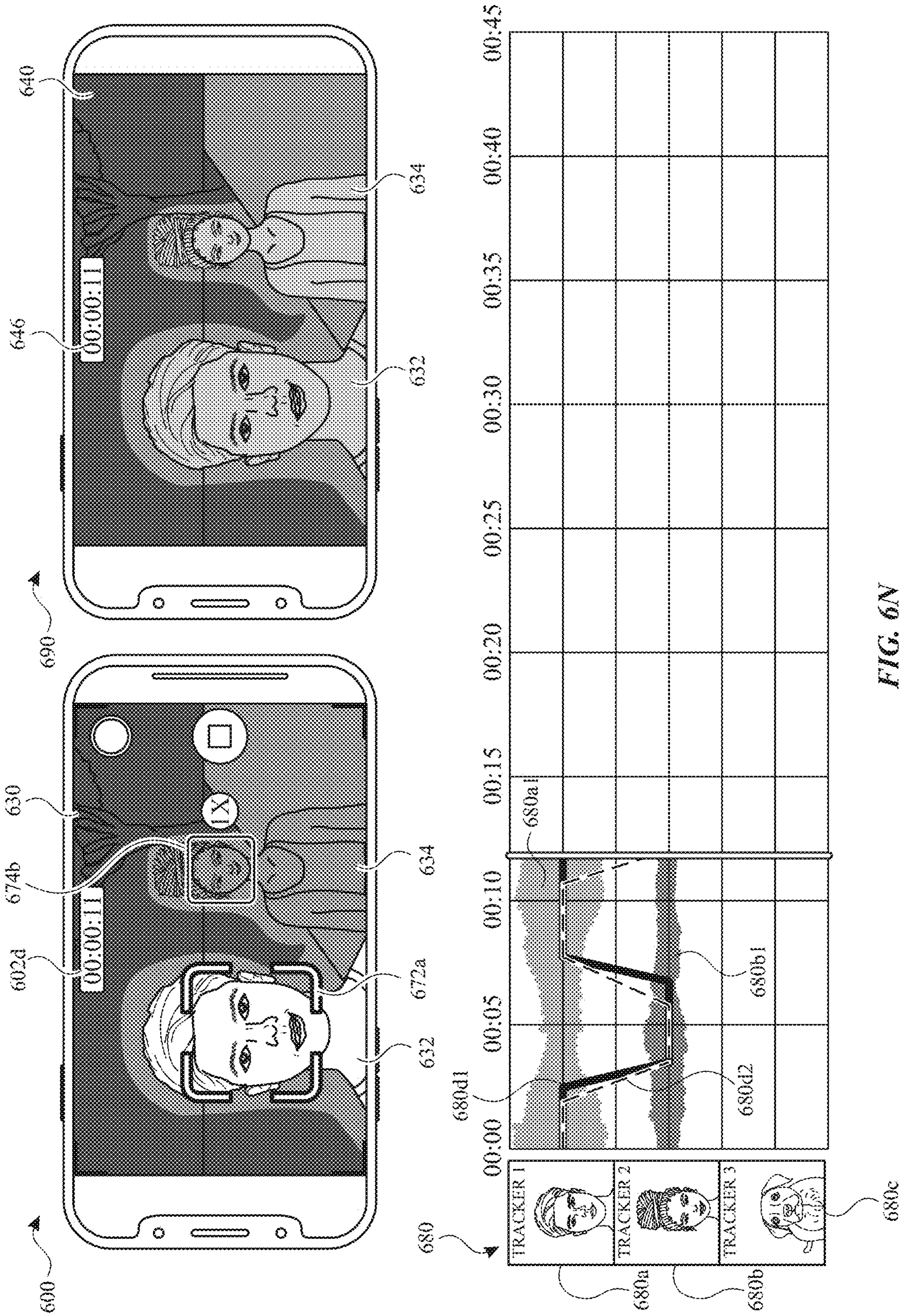
Figure 6O:
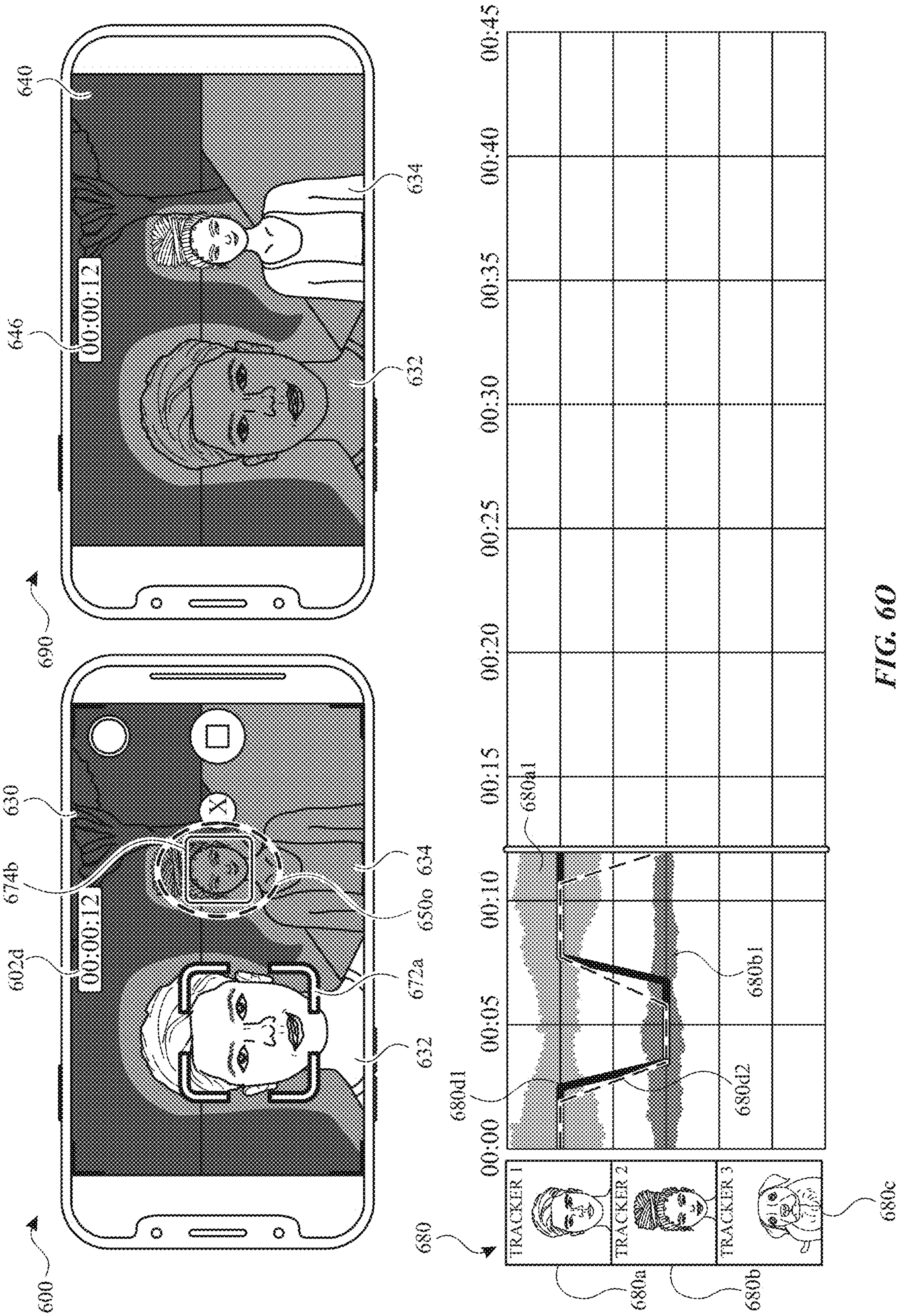

FIGS. 6N-6T illustrate an exemplary embodiment where computer system 600 changes the synthetic depth-of-field effect in response to a first type of user input (e.g., a user-specified change). As illustrated in FIG. 6O, computer system 600 displays the scene shown in live preview 630 (e.g., representing a frame of the video) at twelve seconds during the capture of the video (e.g., as indicated by elapsed time indicator 602*d*). At FIG. 6N, computer system 600 is continuing to apply the synthetic depth-of-field effect to emphasize John 632 over Jane 634 to the content being captured by the one or more cameras of computer system 600 (e.g., as illustrated by the shading of live preview 630 of FIG. 6N). At FIG. 6O, computer system 600 detects single tap input 650*o* on Jane 634.

Figure 6P:
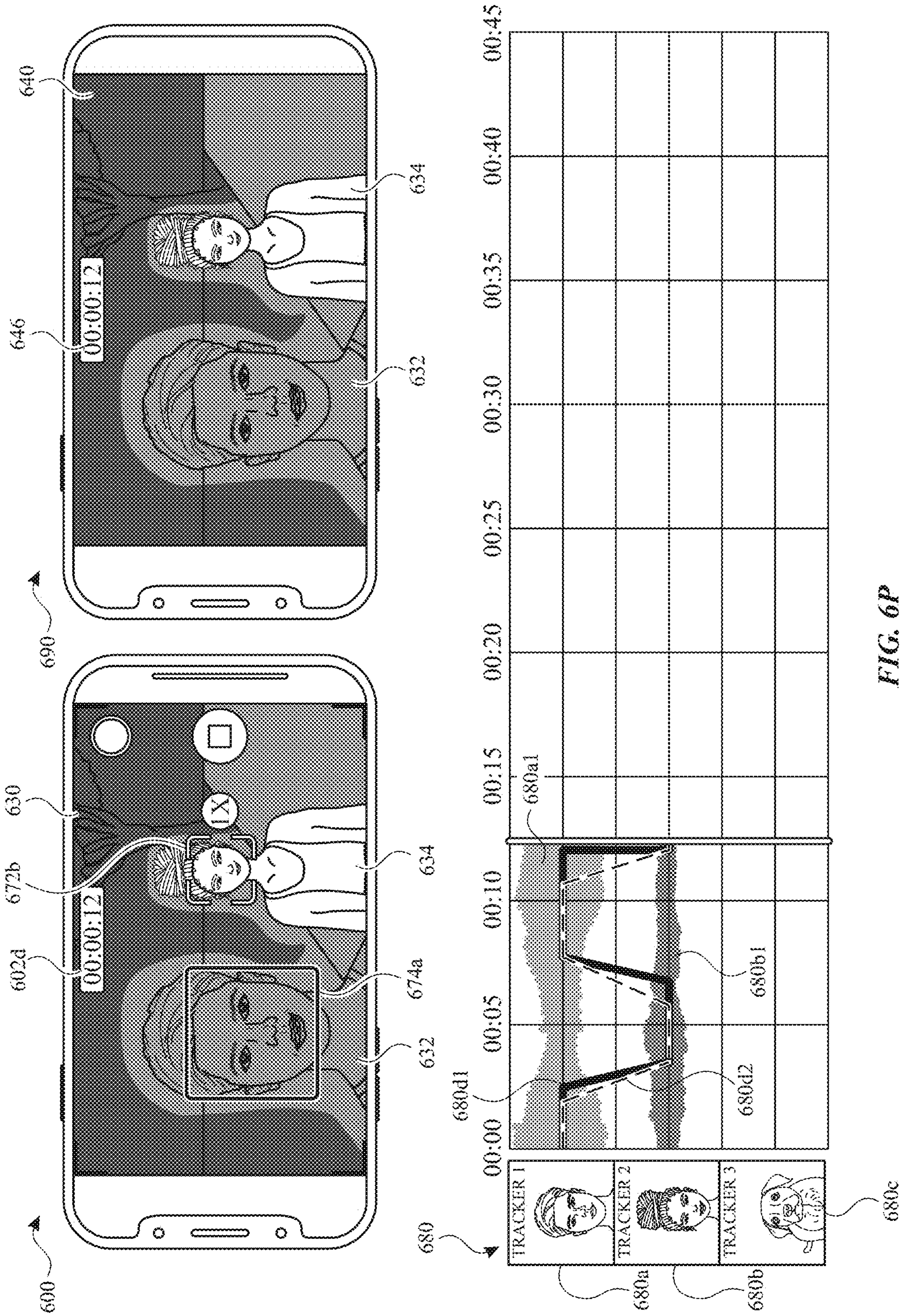

At FIG. 6P, in response to detecting single tap input 650*o*, computer system 600 changes the synthetic depth-of-field effect to emphasize Jane 634 over John 632 (e.g., as illustrated by the shading of live preview 630 of FIG. 6P). In response to detecting single tap input 650*o*, computer system 600 makes an immediate change to the synthetic depthof-field effect and does not display an animation of a transition that shows the synthetic depth-of-field effect changing (e.g., illustrated by live preview 630 of FIG. 6P being displayed at twelve seconds during the capture of the video). Thus, live preview 630 is updated to reflect user-specified change in the synthetic depth-of-field effect (e.g., a changed that occurs in response to detecting an input) differently than live preview 630 is updated to reflect an automatic change in the synthetic depth-of-field effect. When a user-specified change in the synthetic depth-of-field effect occurs, live preview 630 is updated immediately (e.g., and/or the changed in the application of the synthetic depth-of-field occurs immediately). However, when automatic change in the synthetic depth-of-field effect occurs, live preview 630 is updated more gradually (e.g., an animation is displayed of a transition between the current synthetic depth-of-field effect and a new synthetic depth-of-field effect, as discussed in relation to FIGS. 6D-6K). Further, graph 680 also shows this. In graph 680, media capture line 680*d*1 is drawn at a right angle at twelve seconds to reflect how the immediate change in the user-specified change in synthetic depth-of-field effect occurred (e.g., in response to single tap input 6500) and media capture line 680*d*1 between three and ten seconds and twelve seconds is drawn with a curve line to reflect how smoother automatic changes in synthetic depth-of-field effect occurred.

Turning back to FIGS. 6N-6P, computer system 690 displays previously captured media representation 640 with an animation of the user-specified change in the synthetic depth-of-field effect (e.g., that was occurs in response to detecting single tap input 6500) (e.g., during the playback of the captured video). As illustrated in FIGS. 6N-6P, computer system 690 provides a smoother transition when displaying previously captured media representation 640 with the user-specified change in the synthetic depth-of-field effect because computer system 690 has information that indicates that a user-specified change will occur (e.g., for similar reasons for those described above in relation to FIGS. 6D-6K). Thus, at FIG. 6N, previously captured media representation 640 differs from live preview 630, where previously captured representation media 640 has begun to show a change in the synthetic depth-of-field effect and live preview 630 has not. Notably, at FIG. 6O, computer system 690 previously captured media representation 640 represents the change in the synthetic depth-of-field effect in its final state. At FIG. 6O, computer system 690 completes the change in the synthetic depth-of-field effect to emphasize Jane 634 relative to John 632 at the frame where single tap input 650*o* was received (e.g., the blurring of previously captured media representation 640 of FIG. 6O looks is same as live preview 630 of FIG. 6P). Thus, computer system 690 is able to display the user-specified changed at the frame that corresponds to when the input that caused to user-specified change was received. In addition, the comparison of media capture line 680*d*1 and media playback line 680*d*2 shows how the user-specified change impacts the visual content (e.g., via live preview 630 and previously captured media representation 640) during the playback of the video differently than during the capture of media. As shown by graph 680, media playback line 680*d*2 shows a smoother and/longer transition than media capture line 680*d*1 (e.g., creates a right angle at twelve seconds) to change the synthetic depth-of-field effect in response to detecting single tap input 650*o*.

Figure 6Q:
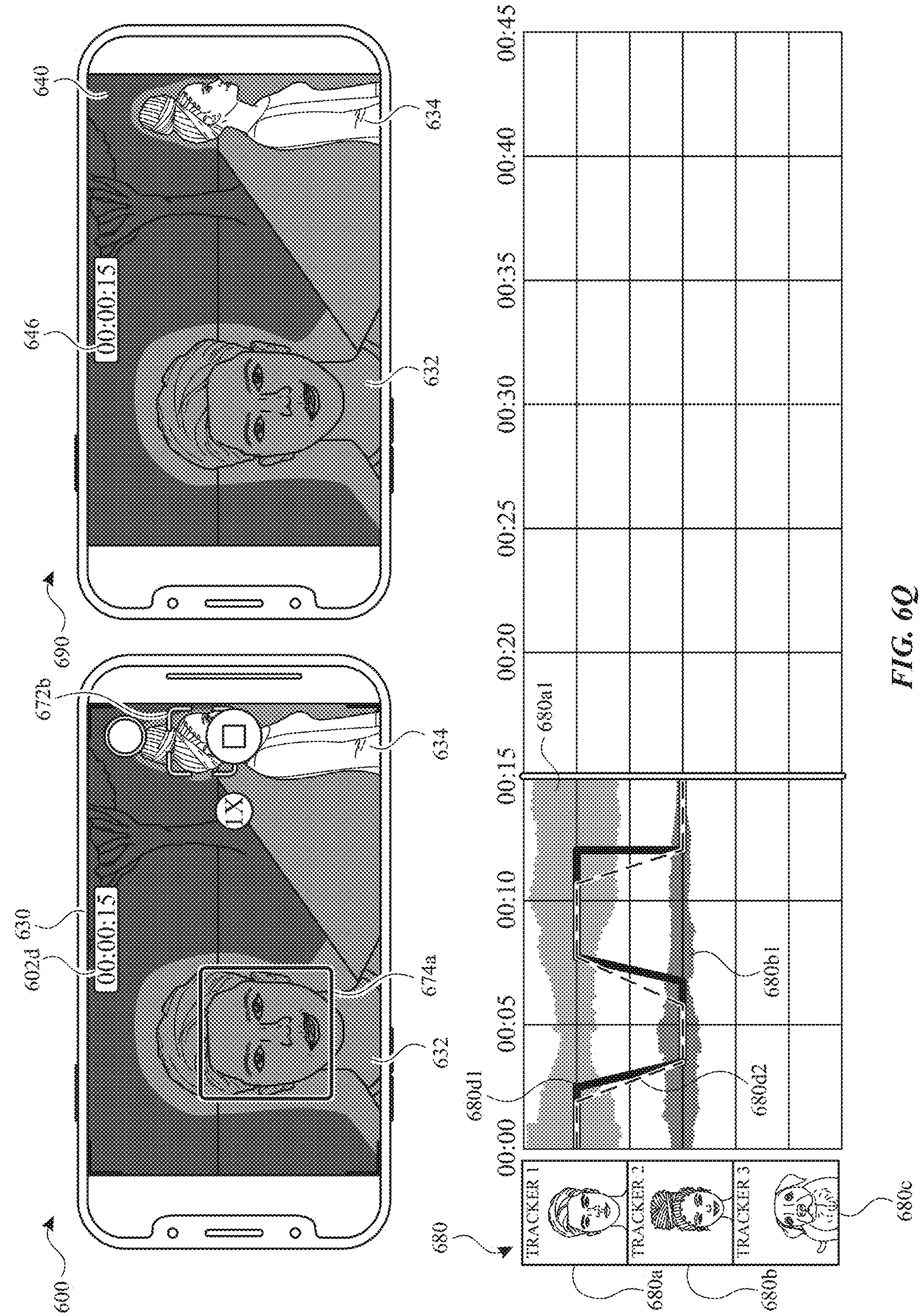

Turning to FIG. 6Q, live preview 630 (and previously captured media representation 640) is displayed with the user-specified synthetic depth-of-field effect change that was initiated via single tap input 650*o*, even though John's activity level 680*a*1 is greater than Jane's activity level 680*b*1 at FIG. 6Q. When a user-specified change synthetic depth-of-field effect occurs, computer system 600 uses a modified set of automatic selection criteria. The modified set of automatic criteria is different from the set of criteria used to make the automatic changes synthetic depth-of-field effect discussed above in FIGS. 6B-6K (e.g., that occurred before a request to a user-specified requested to change synthetic depth-of-field effect was received, before single tap input 650*o* was detected). In some embodiments, the modified set of automatic selection criteria has a higher threshold for automatically changing the synthetic depth-of-field effect than the set of criteria used to make the automatic changes synthetic depth-of-field effect discussed above in FIGS. 6B-6K. In some embodiments, John 632 would have to talk louder, move more, move closer to the camera, stare straight into the camera, etc. for a longer period of time for computer system 600 to automatically change the synthetic depth-of-field effect to emphasize John 632 over Jane 634. In some embodiments, after changing the application of the synthetic depth-of-field effect in response to detecting single tap input 650*o*, computer system 600 does not change the application of the synthetic depth-of-field effect for a predetermined period of time, irrespective of the subjects activity levels (e.g., unless the face of a subject is not detected for a predetermined period of time).

As illustrated in FIG. 6Q, Jane 634 has started to walk out of the field-of-view of the one or more cameras (e.g., walked out of the scene as shown by live preview 630 of FIG. 6Q). When looking at FIGS. 6P-6Q, Jane 634 is being emphasized relative to John 632 in live preview 630 (and previously captured media representation 640), while Jane 634 is moving in the field-of-view of the one or more cameras. This shows that the synthetic depth-of-field effect that is applied to emphasize a subject relative to other subjects follows and/or tracks the emphasized subject. In addition, subject indicators (e.g., as shown by primary subject indicator 672*b* of FIGS. 6P-6Q) moves with each of the respective subjects that a respective subject indicator surrounds. In some embodiments, in response to detecting an input at a location of live preview 630 that is not on a subject, the applied synthetic depth-of-field effect does not follow and/or track a subject.

Figure 6R:
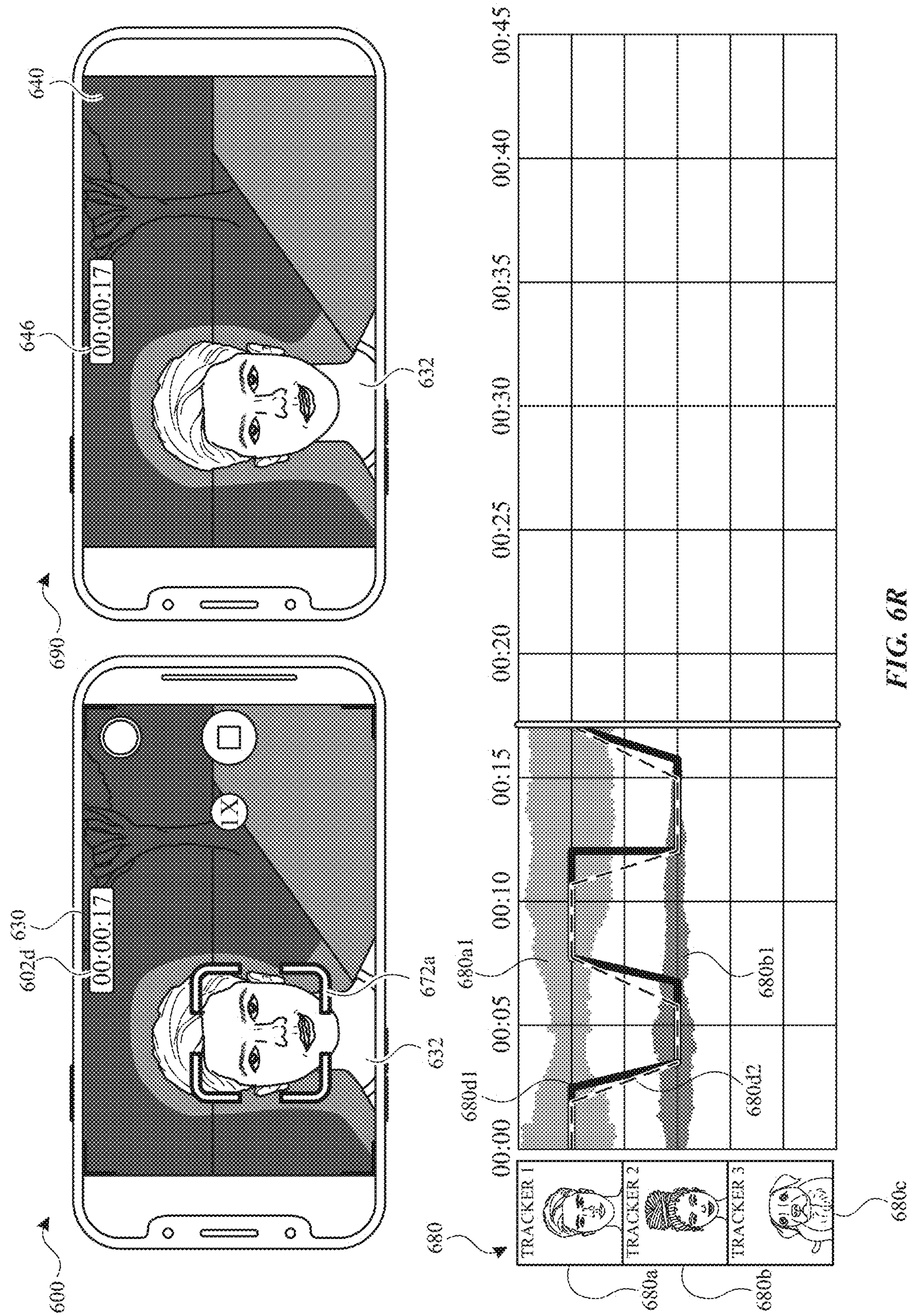

At FIG. 6R, Jane 634 is not in the field-of-view of the one or more cameras (e.g., has walked out of the scene). At FIG. 6R, a determination is made that John 632 satisfies the modified set of automatic selection criteria (e.g., because Jane 634 is out of the frame and/or computer system 600 is not detecting any activity from Jane 634, as indicated by Jane's activity level 680*b*1). As illustrated in FIG. 6R, computer system 600 automatically changes the synthetic depth-of-field effect to emphasize John 632 (e.g., John 632 is displayed with only a natural blur (e.g., no shading) while other portions of live preview 630 includes an amount of synthetic blur (e.g., shading)). Computer system 600 automatically changes the synthetic depth-of-field effect to emphasize John 632 relative to other portions of live preview 630 because the determination is made that John 632 satisfies the modified set of automatic selection criteria and/or because Jane's has not had any activity level for a predetermined period of time (e.g., 1 second).

FIG. 6R1 illustrates an exemplary embodiment of the position of Jane 634 relative to John 632 in the FOV of computer system 600. At FIG. 6R1, live preview 630 is being displayed at the seventeen second mark, using one or more similar techniques as discussed above in relation to FIG. 6R. At FIG. 6R1, boundary 601 is indicative of the size of the FOV, where the one or more cameras of computer system 600 can capture visual content inside of boundary 601 (e.g., within region 603 which includes live preview 630). As illustrated in FIG. 6R1, Jane 634 is within region 603. Thus, Jane 634 is being captured by the one or more cameras, although Jane 634 is not positioned within region 603 enough such that Jane 634 is captured by the one or more cameras to be displayed in live preview 630. As illustrated in FIG. 6R1, when Jane 634 is positioned within region 603 but outside of content in the FOV that is used to display live preview 630, computer system 600 continues to track Jane 634 for a predetermined period of time (e.g., 0.1-5 seconds). In some embodiments, while Jane 634 is position within region 603 but outside of content in the FOV that used to display live preview 630 (as illustrated in FIG. 6R1), computer system 600 (or another computer system) does not track Jane 634 after the predetermined period of time if a determination is made that Jane 634 cannot be captured in the visual content that corresponds to live preview 630. In some embodiments, a neural network (e.g., discussed in FIG. 12), still tracks Jane after a period of time and computer system 600 can provide one or more representations (e.g., stale representations and/or representations that were previously captured of Jane 634) of Jane 634 for a second predetermined period of time. In some embodiments, after the second predetermined period of time, computer system 600 automatically switches to emphasizing and/or tracking another subject and/or focal plane that is within the visual content captured in the FOV that corresponds to live preview 630. In some embodiments, when Jane 634 is positioned outside of region 603 (e.g., outside of boundary 601), computer system 600 does not track (e.g., and/or does not store an identifier corresponding to) Jane 634. In some embodiments, when Jane 634 is positioned within region 603 and inside of the content in the FOV that used to display live preview, computer system 600 tracks Jane 634, irrespective of a predetermined period of time. In some embodiments, computer system 600 automatically switches to emphasizing and/or tracking another subject (e.g., "John" and/or focal plane that is within the visual content captured in the FOV that corresponds to live preview 630 based on information (e.g., the period of time that Jane 632 has been in region 603 and/or outside of FOV for the content used to display live preview 630 and/or whether Jane 634 is moving towards and/or away the content used to display live preview 630 while Jane 634 is in region 603) that computer system 600 has concerning the user that is positioned within region 603 but outside of the content in the FOV that used to display live preview. This enables computer system 600 to switch emphasis to a subject entering the portion of the FOV that is used to display the live preview more quickly, because computer system 600 (and, optionally, a neural network making automatic emphasis decisions) has more time to track the subject and observe behavior of the subject that occurs within region 603 but outside of the FOV that is used to display the live preview to determine a relative importance of the subject as compared to other subjects who could be emphasized as compared to a situation where the computer system 600 does not have an opportunity to observe behavior of the subject before the subject enters the portion of the FOV that is used to display the live preview.

Figure 6S:
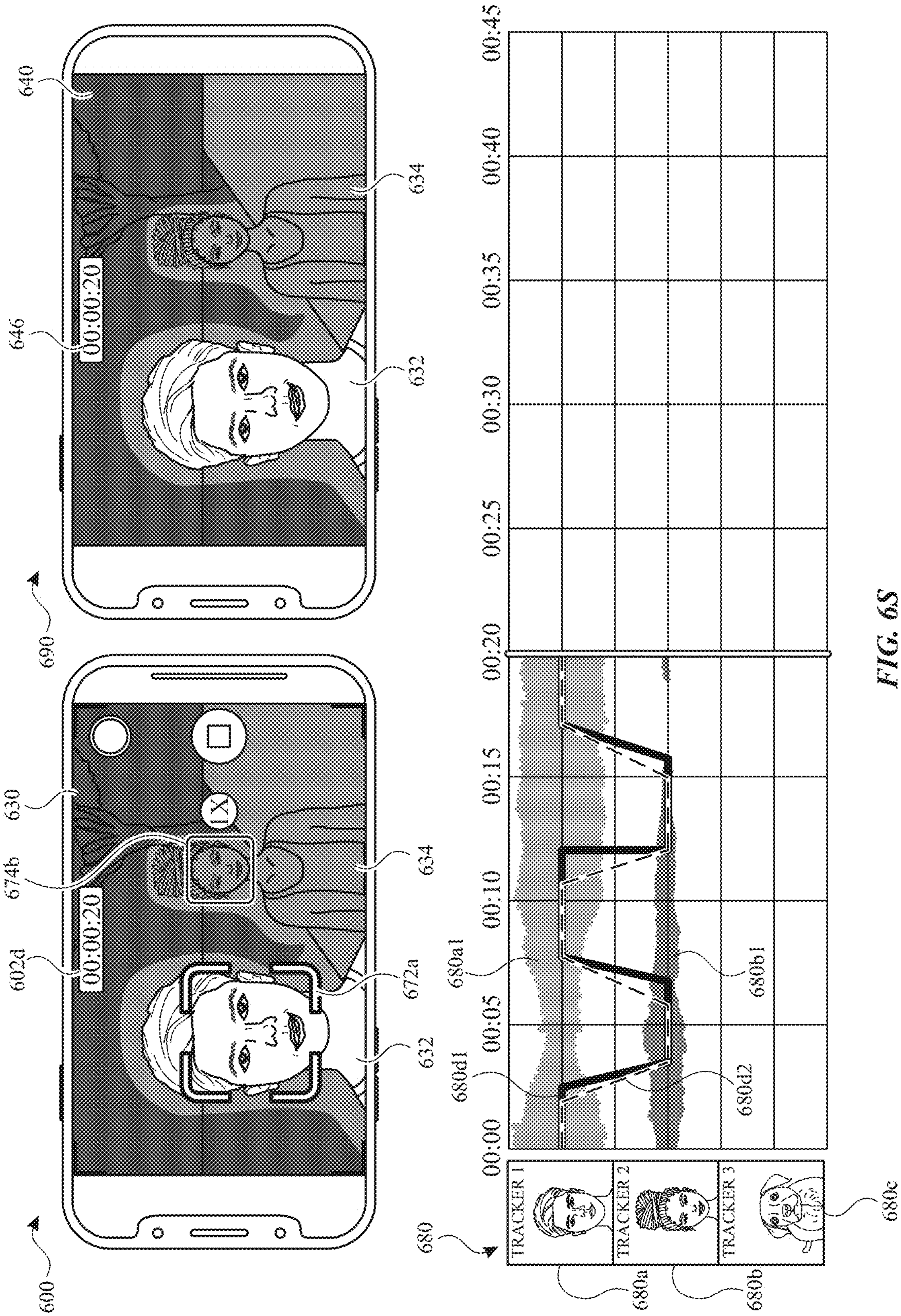

As illustrated in FIG. 6S, Jane 634 has walked back into the field-of-view of the one or more cameras (e.g., standing in the scene as shown by live preview 630 of FIG. 6S). At FIG. 6S, live preview 630 continues to be displayed with the synthetic depth-of-field effect that emphasizes John 632 relative to Jane 634, which is due to single tap input 650*o* of FIG. 6O being a first type of input. In particular, computer system 600 treats the change in the synthetic depth-of-field effect to emphasize Jane 634 relative John 632 as a temporary user-specified change to the application of synthetic depth-of-field effect because single tap input 650*o* of FIG. 6O is a first type of input. When a temporary user-specified change to the application synthetic depth-of-field effect occurs, computer system 600 does not automatically re-apply the application of the temporary change to the synthetic depth-of-field effect after an automatic change to the synthetic depth-of-field effect has occurred (e.g., irrespective of how long Jane 634 has been out of the visual content in the FOV that corresponds to live preview 630). Thus, computer system 600 continues to apply the synthetic depth-of-field effect to emphasize John 632 relative to other portions of live preview 630 because single tap input 650*o* of FIG. 6O was a first type of input and an automatic change to the synthetic depth-of-field effect occurred (e.g., change discussed in FIG. 6P) after single tap input 650*o* was detected.

Figure 6T:
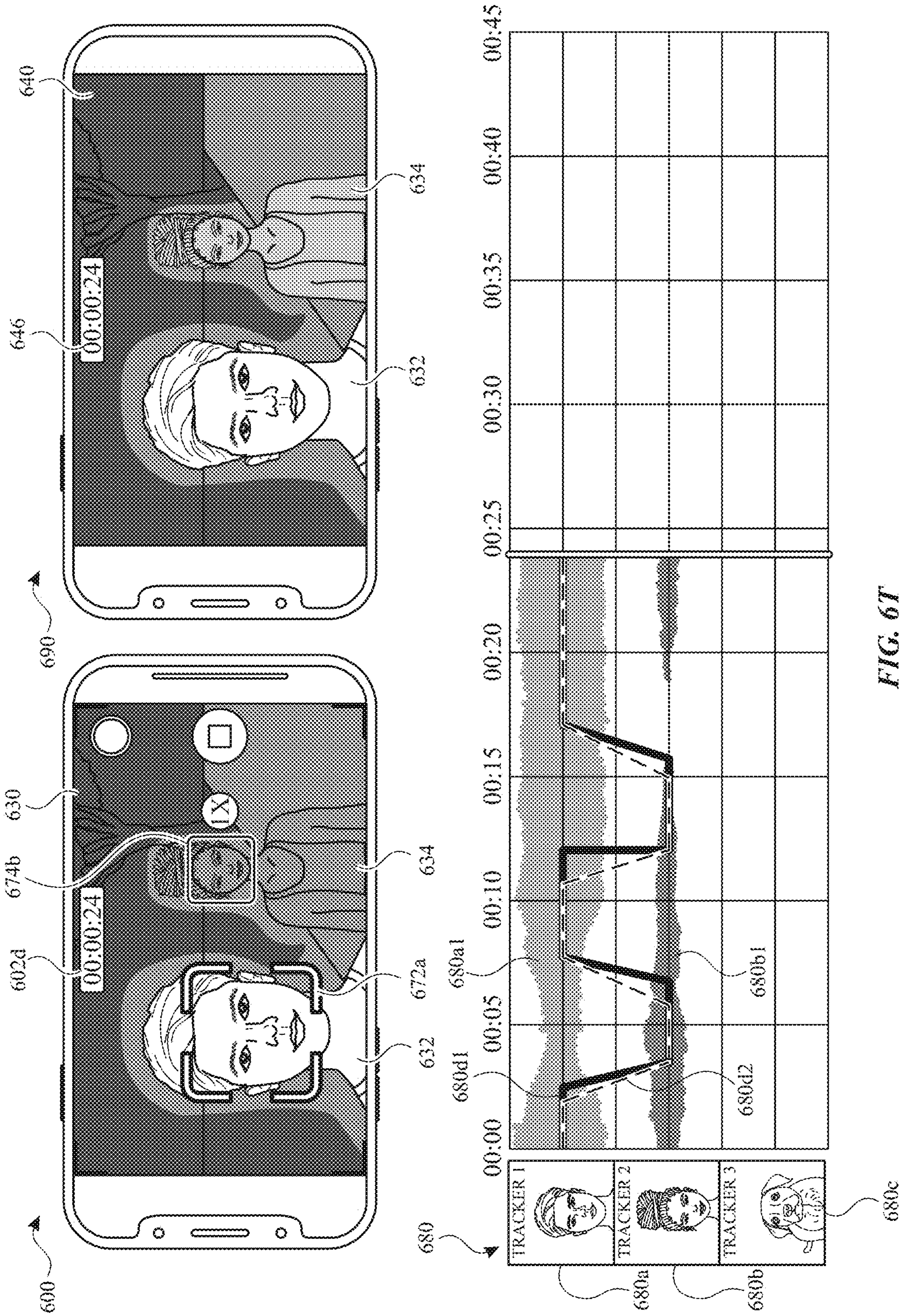

As illustrated in FIG. 6T, live preview 630 continues to be displayed with the synthetic depth-of-field effect that emphasizes John 632 relative to Jane 634, although four seconds has passed since live preview 630 of FIG. 6S was displayed (e.g., as indicated by 602*d* of FIGS. 6S-6T). At FIG. 6T, computer system 600 continues to apply the synthetic depth-of-field effect that emphasizes John 632 relative to Jane 634 because single tap input 650*o* of FIG. 6O was a first type of input and an automatic change to the synthetic depth-of-field effect occurred (e.g., change discussed in FIG. 6P) after single tap input 650*o* was detected.

Figure 6U:
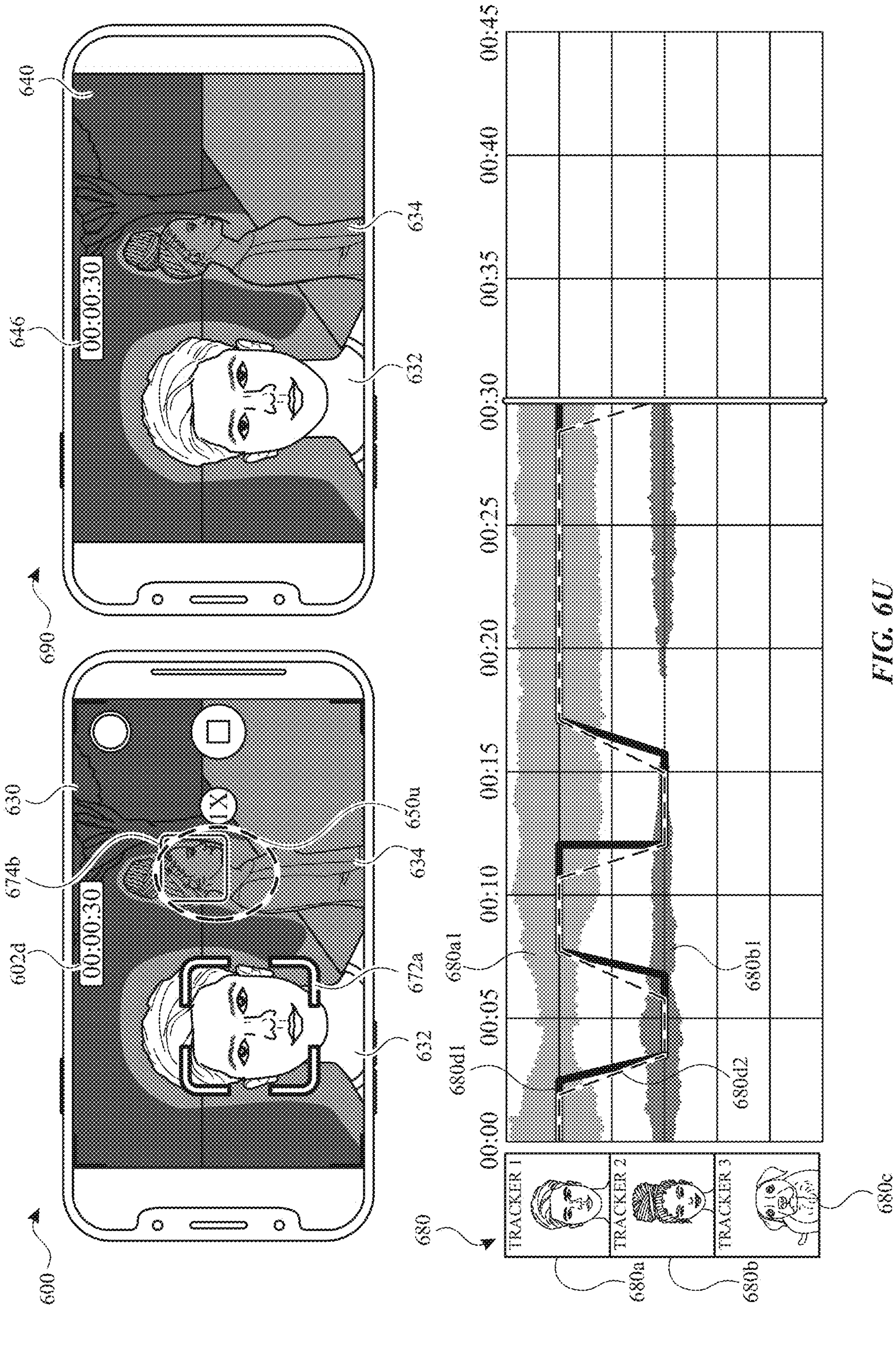

FIGS. 6U-6Y an exemplary embodiment where computer system 600 changes the synthetic depth-of-field effect in response to a second type user input (e.g., a user-specified change). As illustrated in FIG. 6U, computer system 600 live preview 630 continues to be displayed with the synthetic depth-of-field effect that emphasizes John 632 relative to Jane 634, although ten seconds has passed since live preview 630 of FIG. 6S was displayed e.g., as indicated by 602*d* of FIGS. 6S-6T). At FIG. 6U, live preview 630 is displayed with the synthetic depth-of-field effect that emphasizes John 632 relative to Jane 634 for similar reasons as discussed above in relation to FIGS. 6S-6T. At FIG. 6U, computer system 600 detects double tap input 650*u*.

Figure 6V:
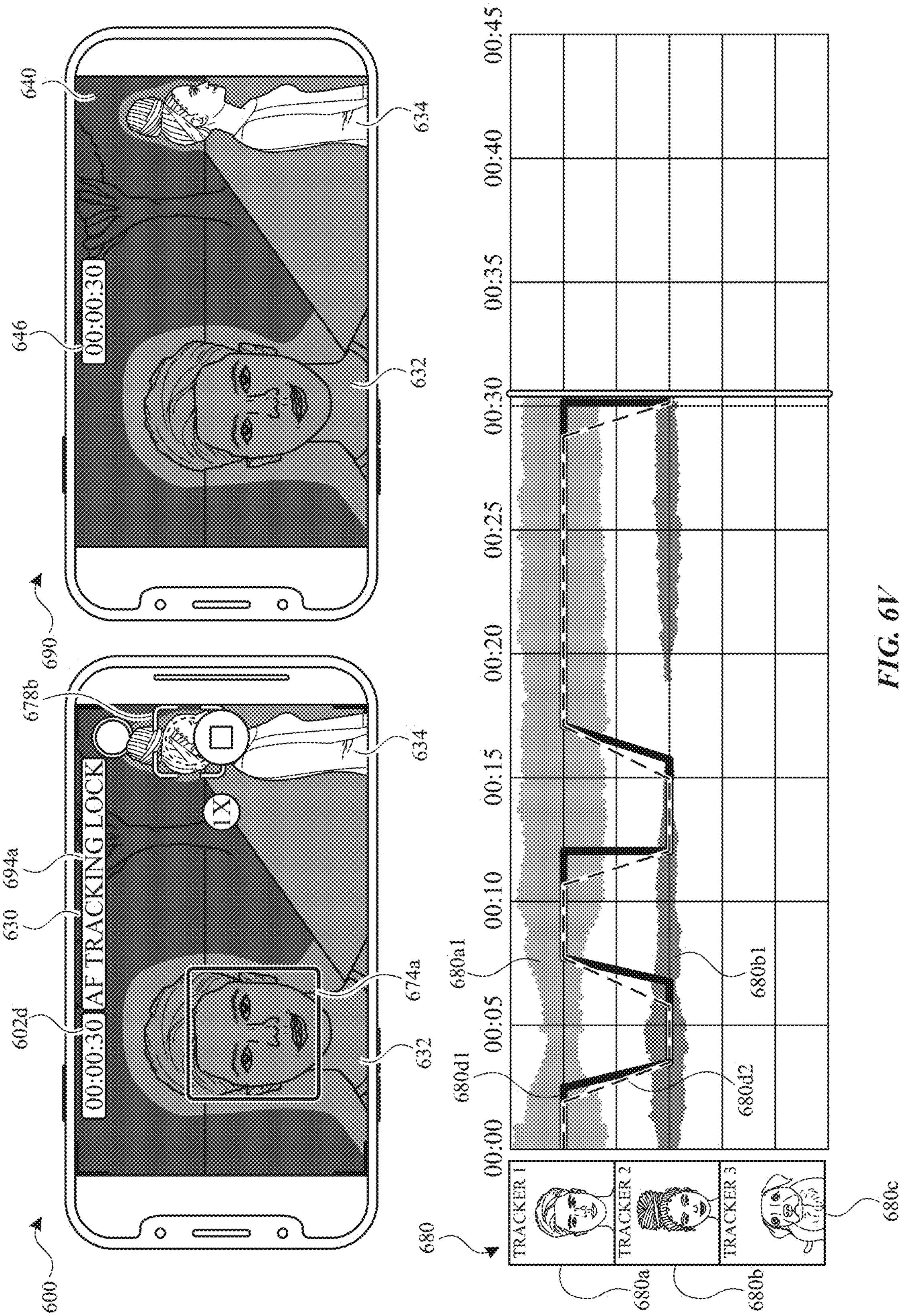

As illustrated in FIG. 6V, in response to detecting double tap input 650*u*, computer system 600 immediately changes the synthetic depth-of-field effect to emphasize Jane 634 over John 632 (e.g., as illustrated by the shading of live preview 630 of FIG. 6V). In response to detecting double tap input 650*u*, computer system 600 makes an immediate change to the synthetic depth-of-field effect and does not display an animation of a transition that shows the synthetic depth-of-field effect changing (e.g., for similar reasons as discussed above in relation to FIG. 6P and as indicated by 680*d*1 at thirty seconds).

At FIG. 6V, computer system 600 displays primary subject indicator 678*b* around the head of Jane 634 and secondary subject indicator 674*a* around the head of John 632. Notably, primary subject indicator 678*b* is different from primary subject indicator 672*b* that was displayed in response to detecting single tap input 650*o* because each respective indicator was displayed in response to detecting a different type of input. In particular, primary subject indicator 678*b* is displayed at FIG. 6V because a determination was made that a second type input was detected (e.g., double tap input 650*u* of FIG. 6U), and primary subject indicator 672*b* is displayed at FIG. 6P because a determination was made that the first type input was detected (e.g., single tap input 650*o* of FIG. 6O). Moreover, computer system 600 displays different subject indicators because a different type of tracking is applied when a second type of input is received than when a first type of input is received. As discussed above in relation to FIGS. 6O-6P, computer system 600 makes a temporary change to the synthetic depth-of-field effect applied when the first type of input (e.g., single tap input 650*o* of FIG. 6O) is received. As discussed above in relation FIGS. 6O-6P, computer system 600 does not automatically re-apply the application of the temporary change to the synthetic depth-of-field effect after an automatic change to the synthetic depth-of-field effect has occurred. However, when a second type of input is received (e.g., double tap input 650*u* of FIG. 6U), computer system 600 makes a user-specified change to the synthetic depth-of-field effect applied. When computer system 600 makes a user-specified change to the synthetic depth-of-field effect applied, computer system 600 does automatically re-apply the application of the user-specified change to the synthetic depth-of-field effect after an automatic change to the synthetic depth-of-field effect has occurred (e.g., as further discussed below in relation to FIG. 6Y). As illustrated in FIG. 6V, because computer system 600 determined that double tap input 650*v* is a second type of input, computer system 600 displays tracking indicator 694*a* (e.g., "AF TRACKING LOCK"). Tracking indicator 694*a* indicates that an auto-focus setting (e.g., and/or the currently applied synthetic-depth-of-field) will not be automatically changed by computer system 600. Tracking indicator 694*a* is displayed in the camera user interface and concurrently with live preview 630 of FIG. 6V.

Returning to FIGS. 6T-6V, computer system 690 displays previously captured media representation 640 with an animation of the user-specified change in the synthetic depth-of-field effect (e.g., that was occurs in response to detecting double tap input 650*u*) (e.g., during the playback of the captured video). As illustrated in FIGS. 6T-6V, computer system 690 provides a smoother transition when displaying previously captured media representation 640 with the user-specified change in the synthetic depth-of-field effect (e.g., than when displaying live preview 630 of FIGS. 6T-6V) because computer system 690 has information that indicates that a user-specified change will occur (e.g., for similar reasons for those described above in relation to FIGS. 6N-6P).

Figure 6W:
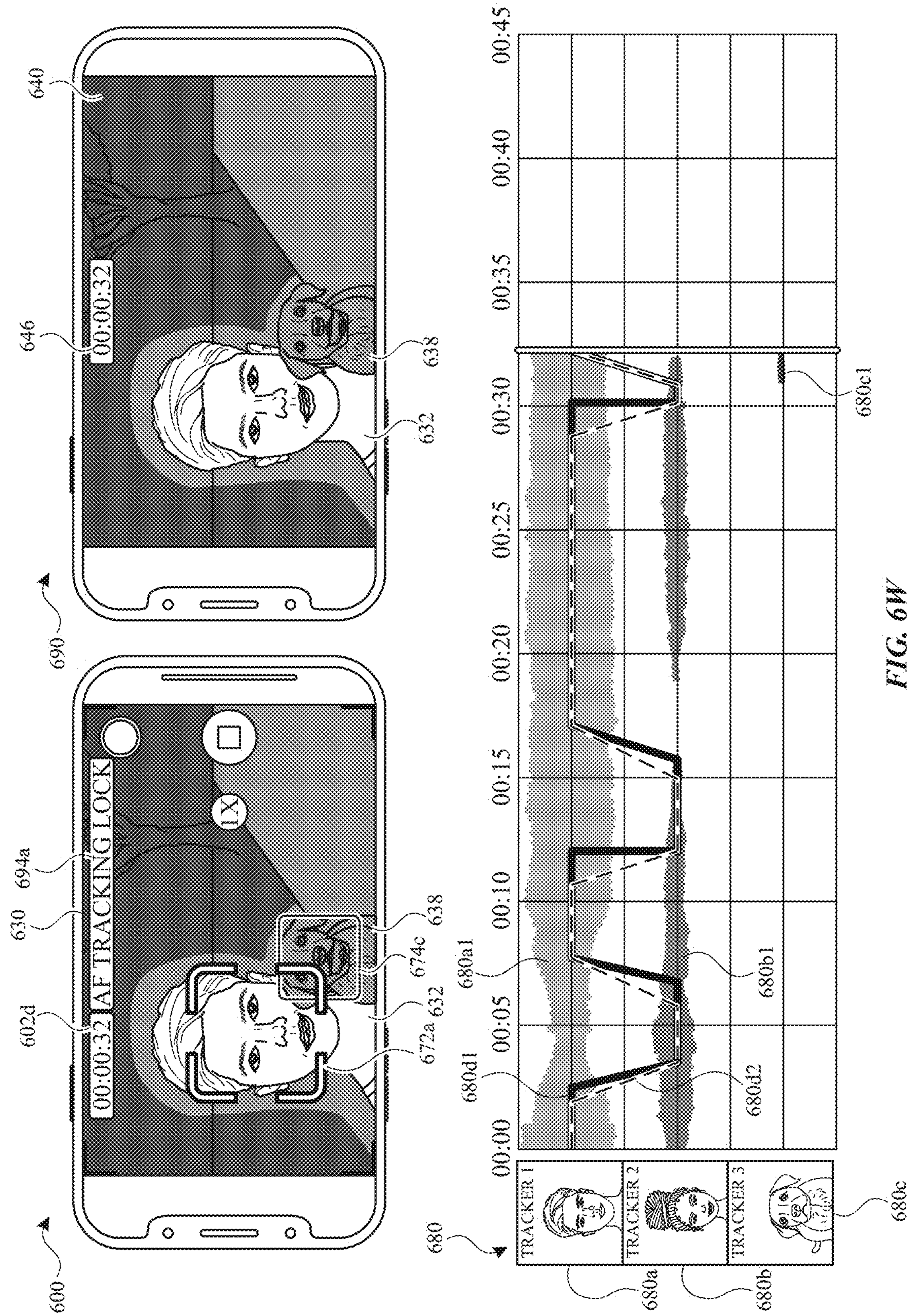

As shown by live preview 630 of FIG. 6V, Jane 634 has started to walk out of the field-of-view of the one or more cameras (e.g., walked out of the scene as shown by live preview 630 of FIG. 6Q) and the synthetic depth-of-field effect moves with Jane 634 (e.g., as shown in FIGS. 6U-6T and for similar reasons as discussed in relation to FIGS. 6P-6Q). At FIG. 6W, Jane 634 is not in the field-of-view of the one or more cameras (e.g., has walked out of the scene). At FIG. 6W, a determination is made that John 632 satisfies the modified set of automatic selection criteria (e.g., because Jane 634 is out of the FOV, the face of Jane 634 cannot be detected by computer system 600, and/or computer system 600 is not detecting any activity from Jane 634, as indicated by Jane's activity level 680). As illustrated in FIG. 6W, computer system 600 automatically changes the synthetic depth-of-field effect to emphasize John 632 (e.g., John 632 is displayed with only a natural blur (e.g., no shading) relative to dog 638, which has entered the field-of-view of the one more cameras. Computer system 600 automatically changes the synthetic depth-of-field effect to emphasize John 632 relative to dog 638 (e.g., for similar reasons and using similar techniques as disclosed above in relation to FIG. 6W). As illustrated in FIG. 6W, primary subject indicator 672*a* is displayed around the head of John 632 and secondary subject indicator 674*c* is displayed around the head of dog 638 because computer system 600 has applied the synthetic depth-of-field effect to emphasize John 632 relative to dog 638.

Figure 6X:
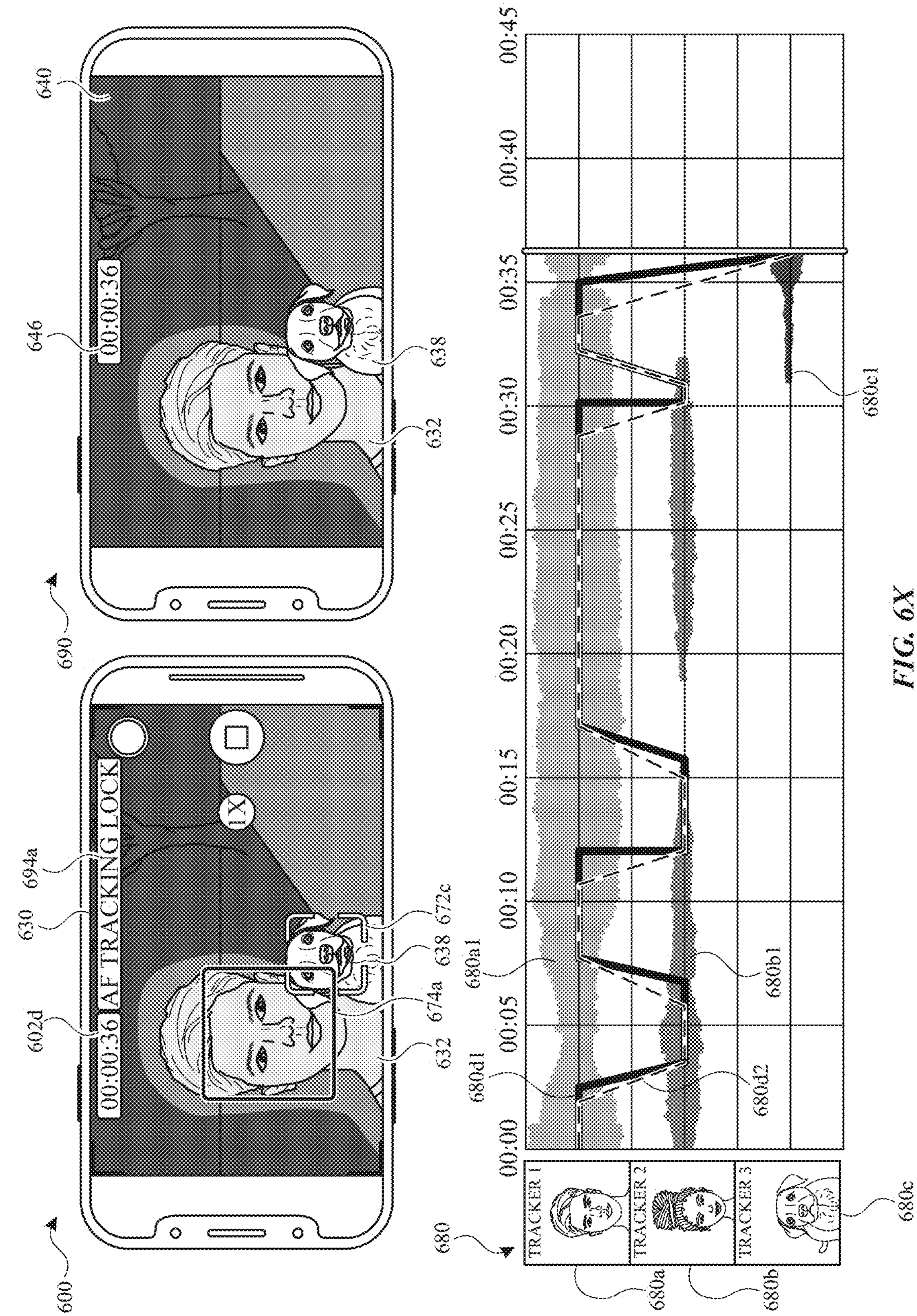

As illustrated in FIG. 6X, computer system 600 has changed the synthetic depth-of-field effect to emphasize dog 638 relative to John 632 because a determination was made that dog 638 satisfies the set of automatic selection criteria (e.g., as indicated by dog's activity level 680*c*1 being above John's activity level 680*a*1 at around thirty-four seconds on graph 680). Here, dog 638 satisfied the set of automatic selection criteria and not the modified set of criteria because Jane 634 is not in the field-of-view of the one or more cameras. In addition, because the determination was made that dog 638 satisfies the set of automatic selection criteria, computer system 600 displays primary subject indicator 672*c* is displayed around the head of dog 638 and secondary subject indicator 674*a* is displayed around the head of John 632.

Figure 6Y:
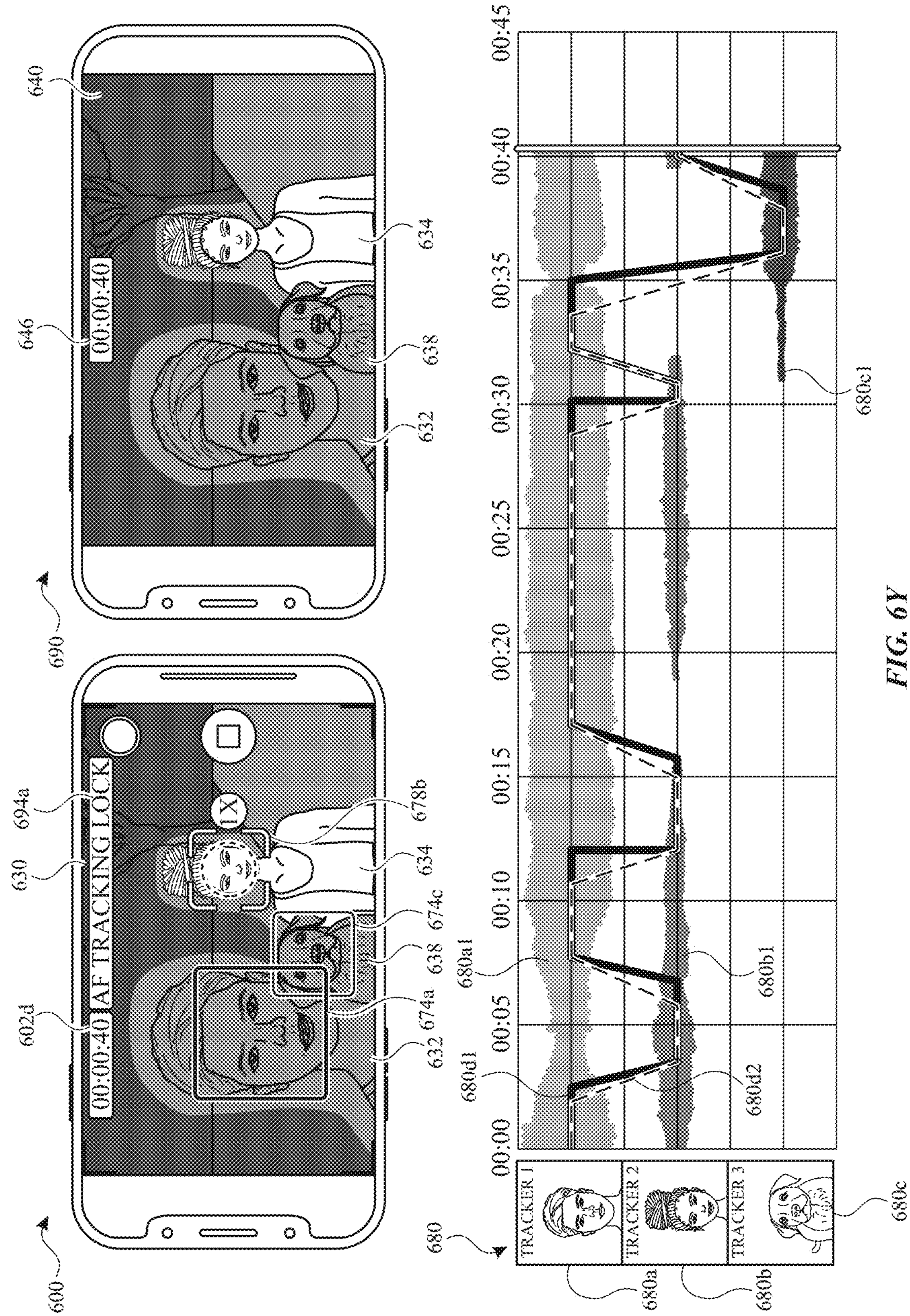

As illustrated in FIG. 6Y, Jane 634 has walked back into the field-of-view of the one or more cameras (e.g., standing in the scene shown by live preview 630 of FIG. 6Y). At FIG. 6Y, computer system 600 has changed the synthetic depth-of-field effect to emphasize Jane 634 relative to the other subjects (e.g., John 632, dog 638) in the field-of-view of the one or more cameras. In particular, computer system 600 changes the synthetic depth-of-field effect to emphasize Jane 634 relative to the other subjects because a user-specified change to the synthetic depth-of-field effect was applied in response to detecting double tap input 650*u*. That is, computer system 600 changes the synthetic depth-of-field effect to emphasize Jane 634 relative to the other subjects at FIG. 6Y, irrespective of whether an automatic change in the synthetic depth-of-field effect was applied after the permanent change to the synthetic depth-of-field effect was made (e.g., in response to detecting double tap input 650*u*). As illustrated in FIG. 6Y, because the synthetic depth-of-field effect has been applied to emphasize Jane 634 relative to the other subjects, computer system 600 displays primary subject indicator 678*b* around the head of Jane 634 and displays secondary subject indicators 674*a* and 674*c* around the heads of John 632 and dog 638, respectively. In some embodiments, at FIG. 6Y, computer system 600 applies the synthetic depth-of-field effect to emphasize Jane 634 relative to the other subjects based on a determination being made that Jane 634 is inside of region 603 of FIG. 6R1 and/or inside of region 603 of FIG. 6R1 for less than a predetermined period of time (e.g., 0.5 seconds-5 seconds). In some embodiments, based on a determination being made that Jane 634 is outside of region 603 of FIG. 6R1 and/or inside of region 603 of FIG. 6R1 for more than a predetermined period of time, computer system 600 does not apply the synthetic depth-of-field effect to emphasize Jane 634 relative to the other subjects.

Figure 6Z:
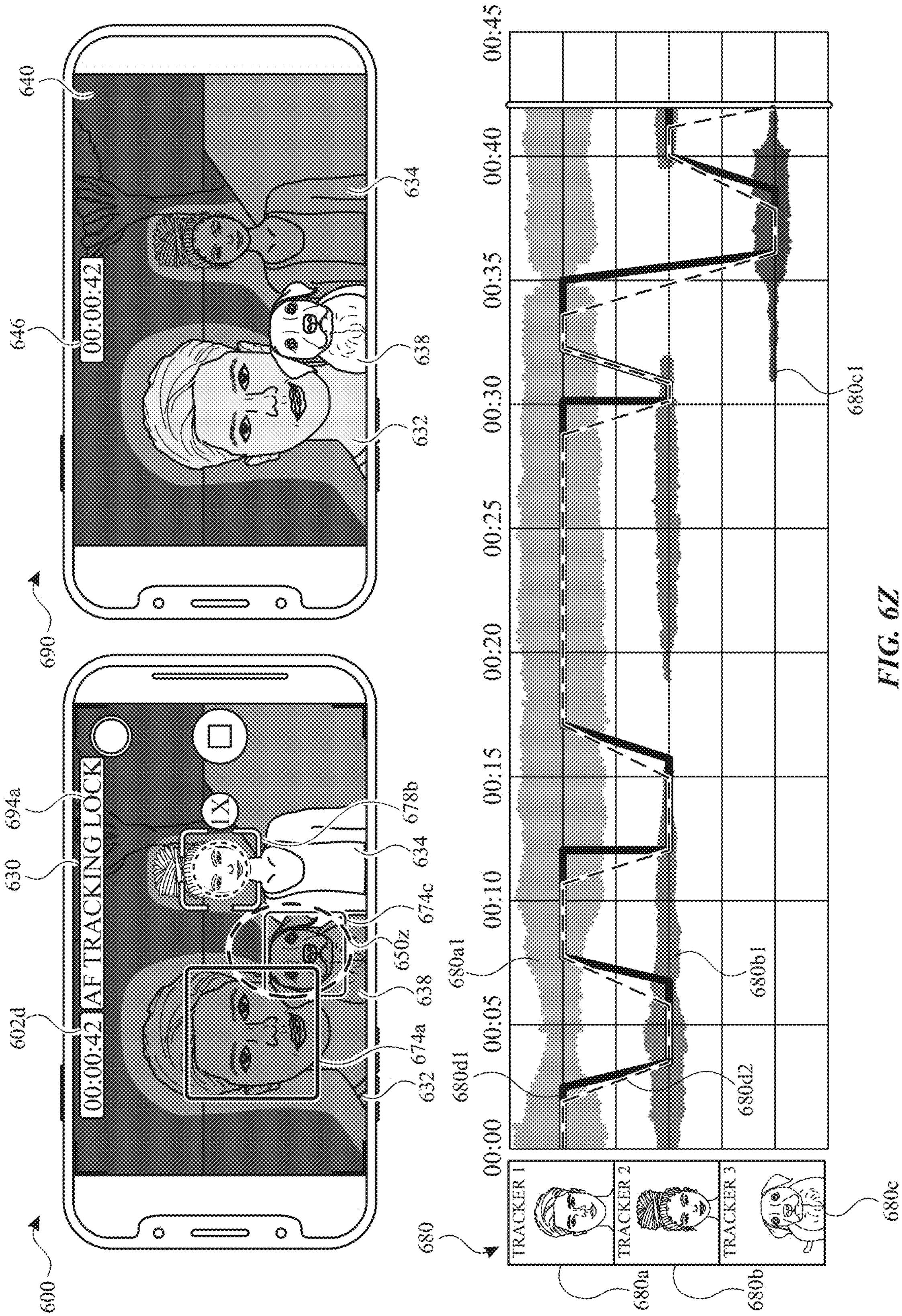
Figure 6A:
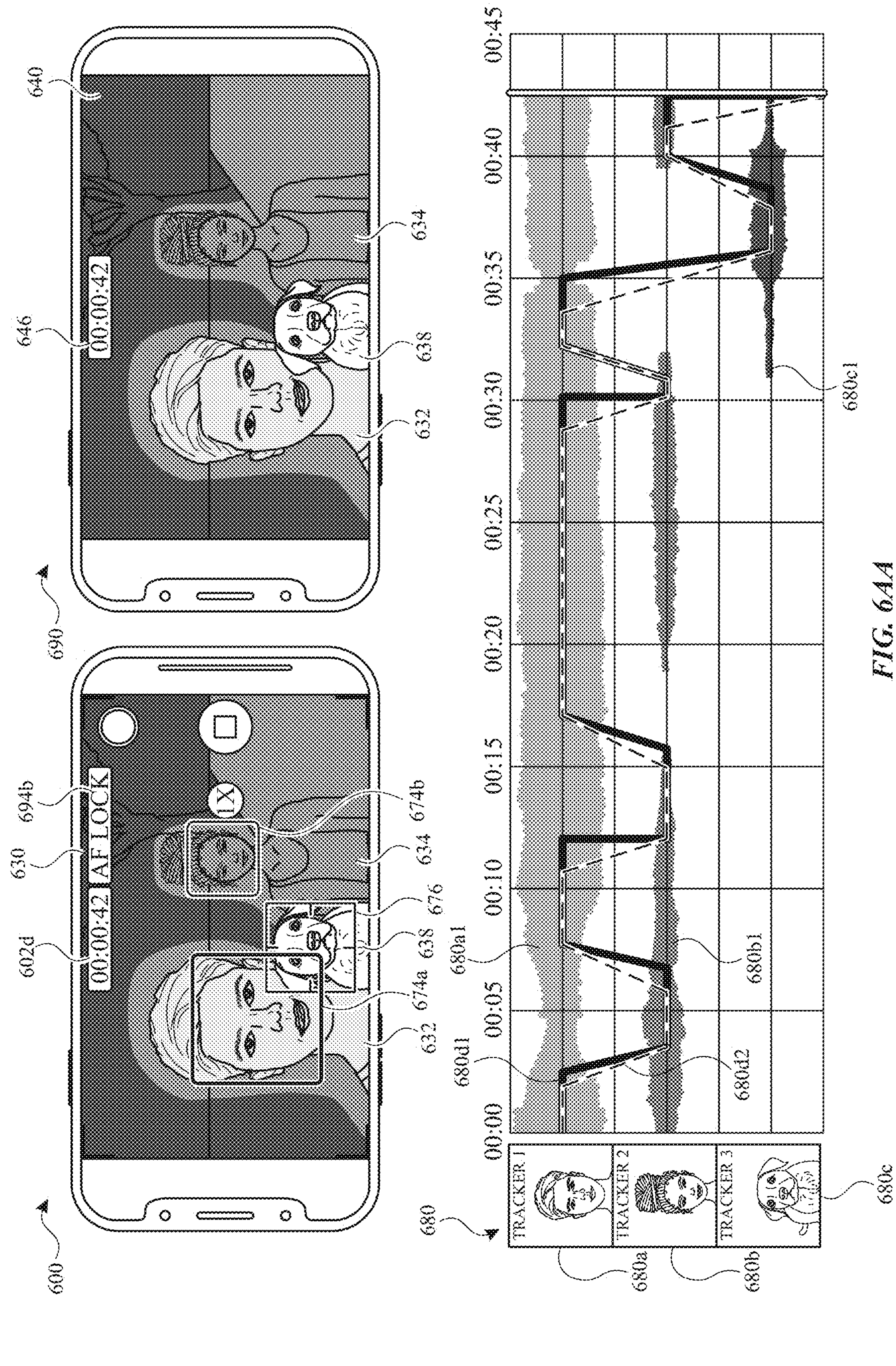
Figure 6A:
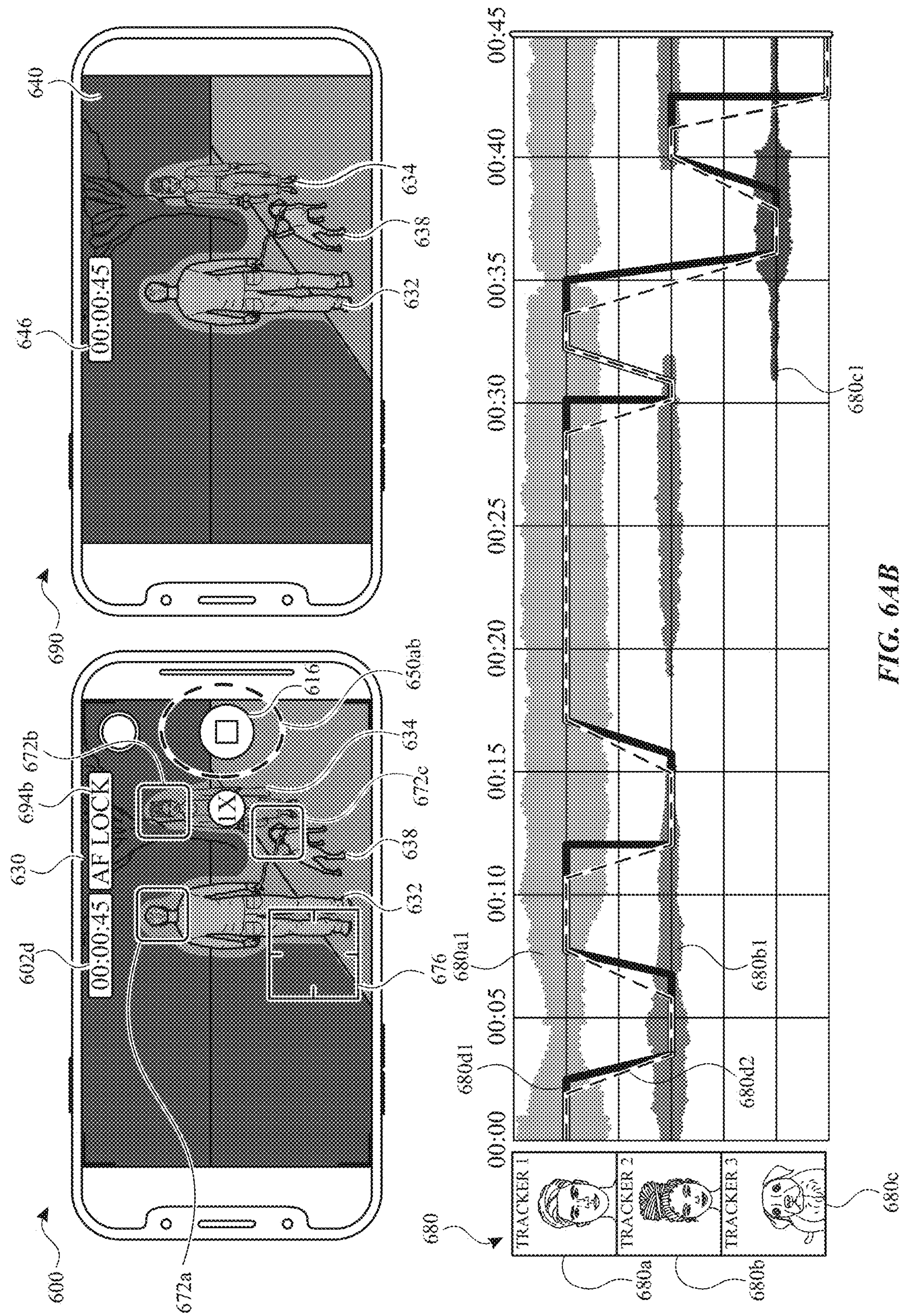
Figure 6A:
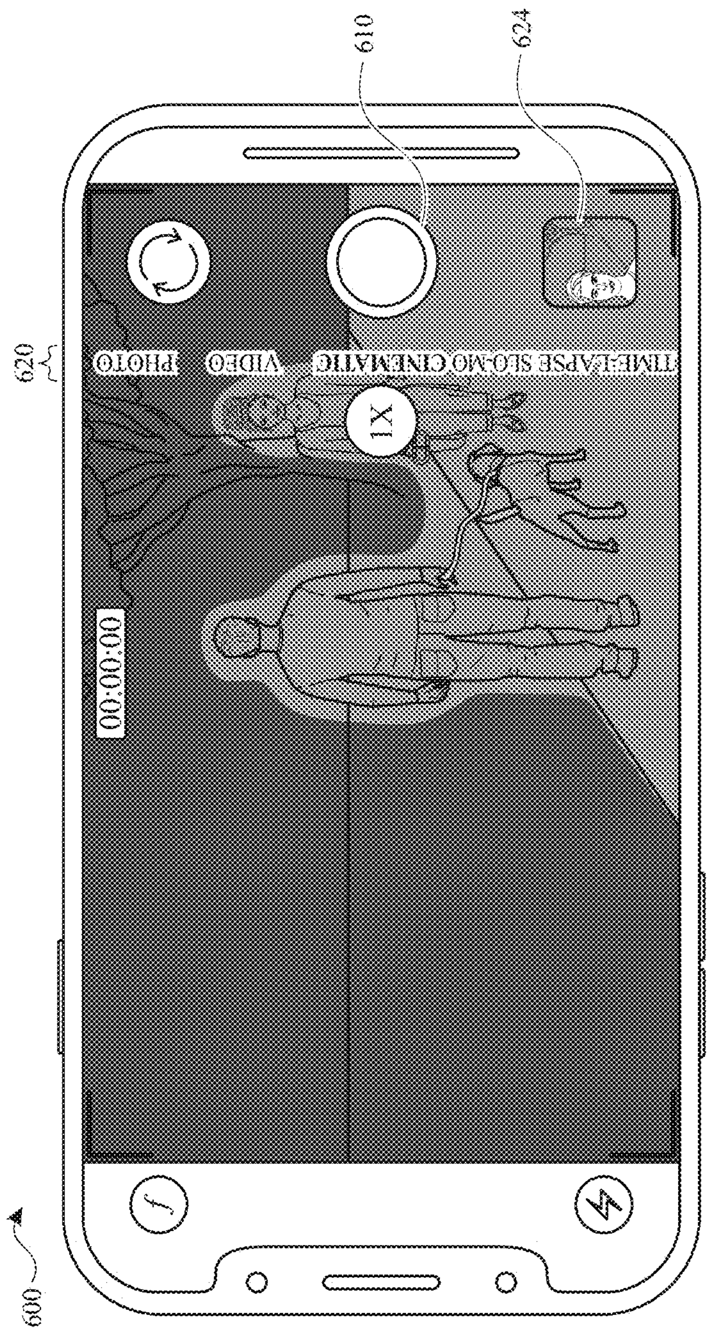
Figure 6A:
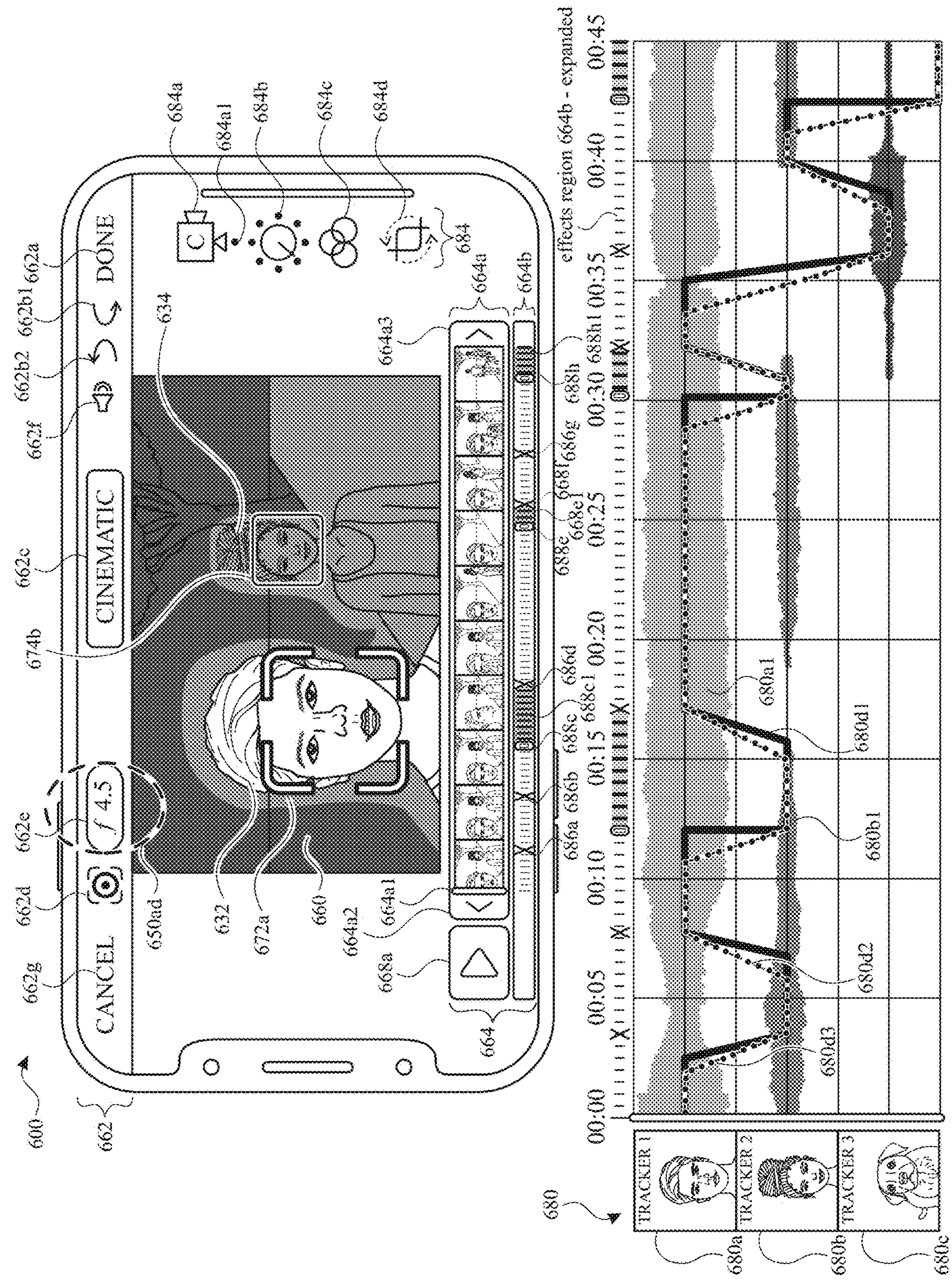
Figure 6A:
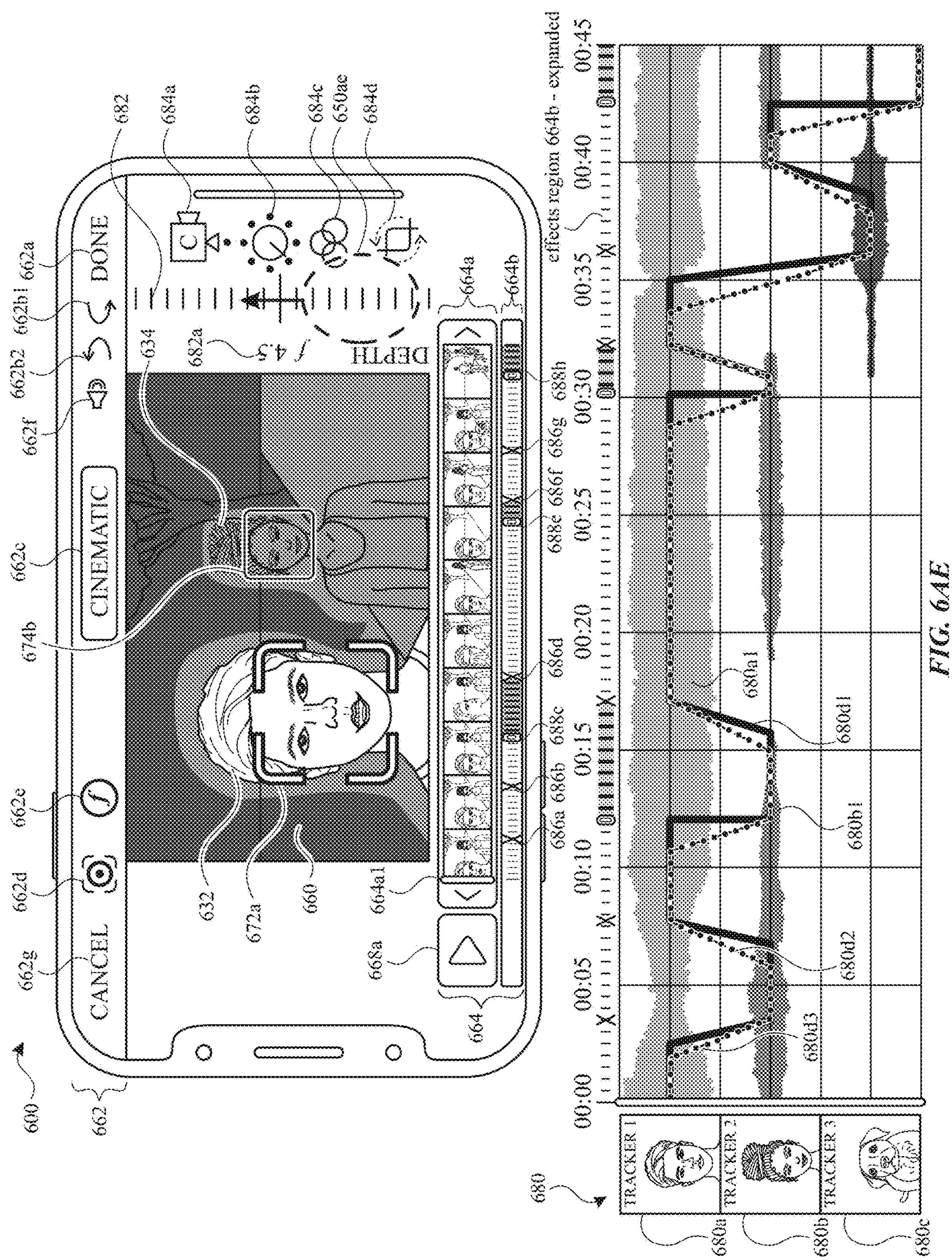
Figure 6A:
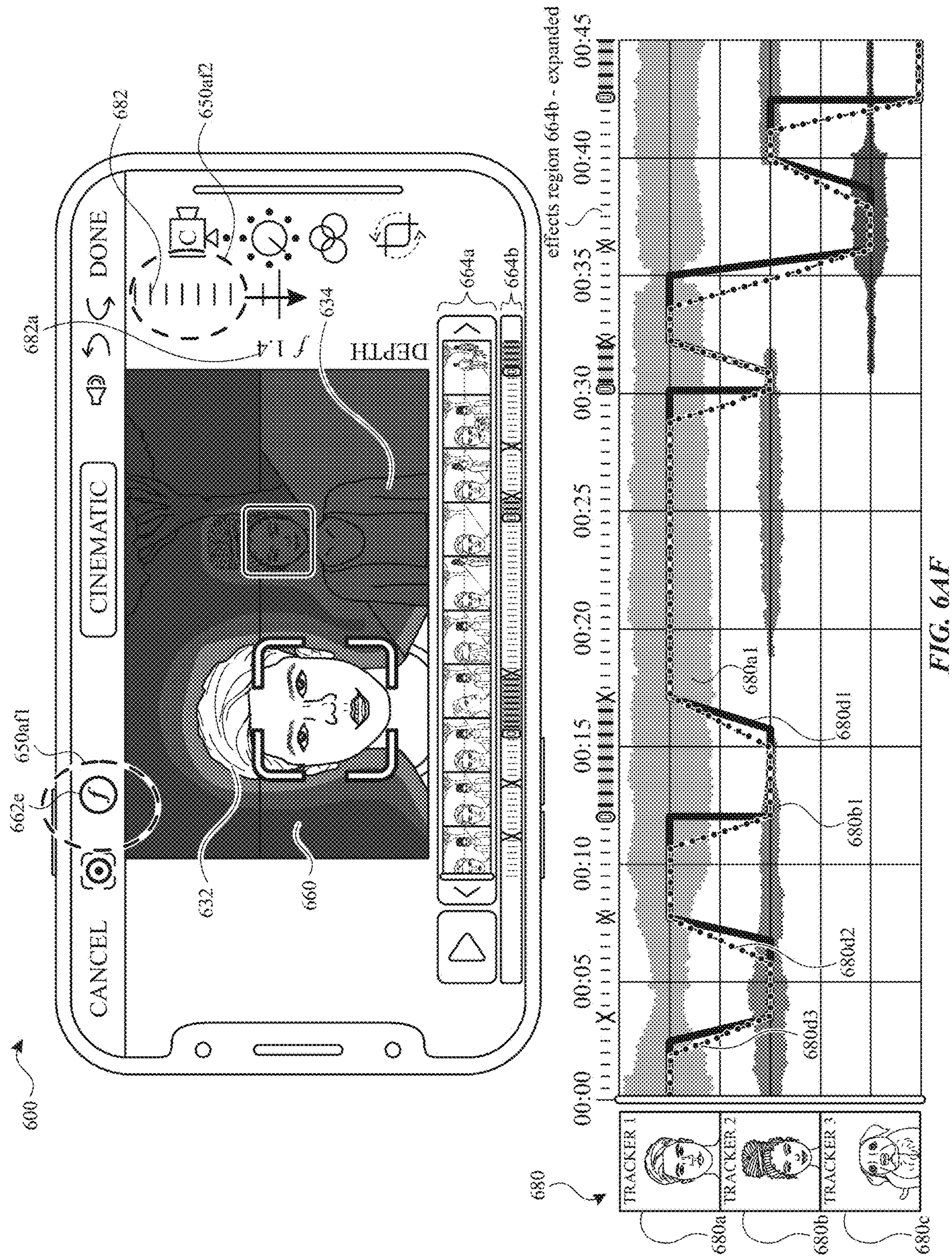
Figure 6A:
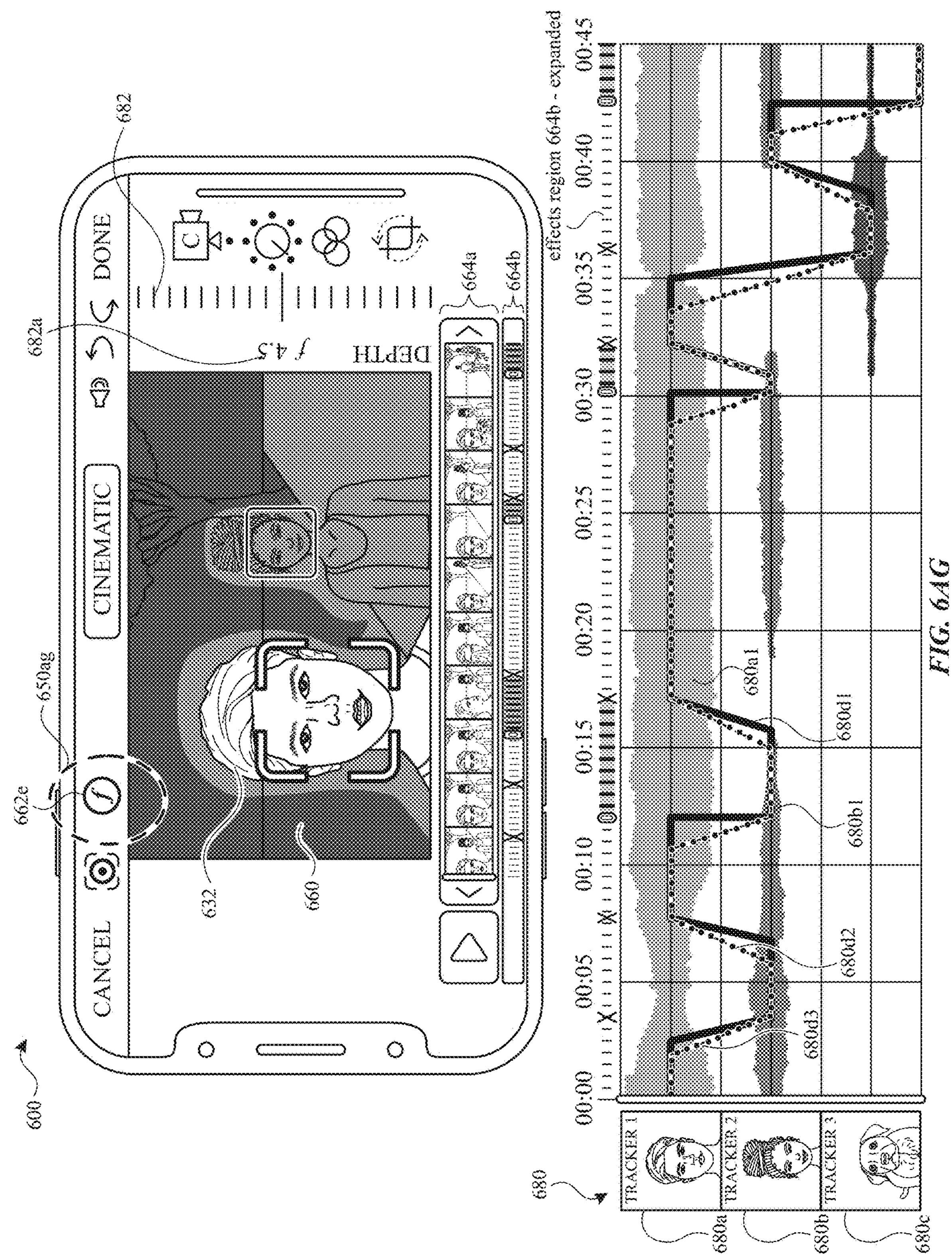
Figure 6A:
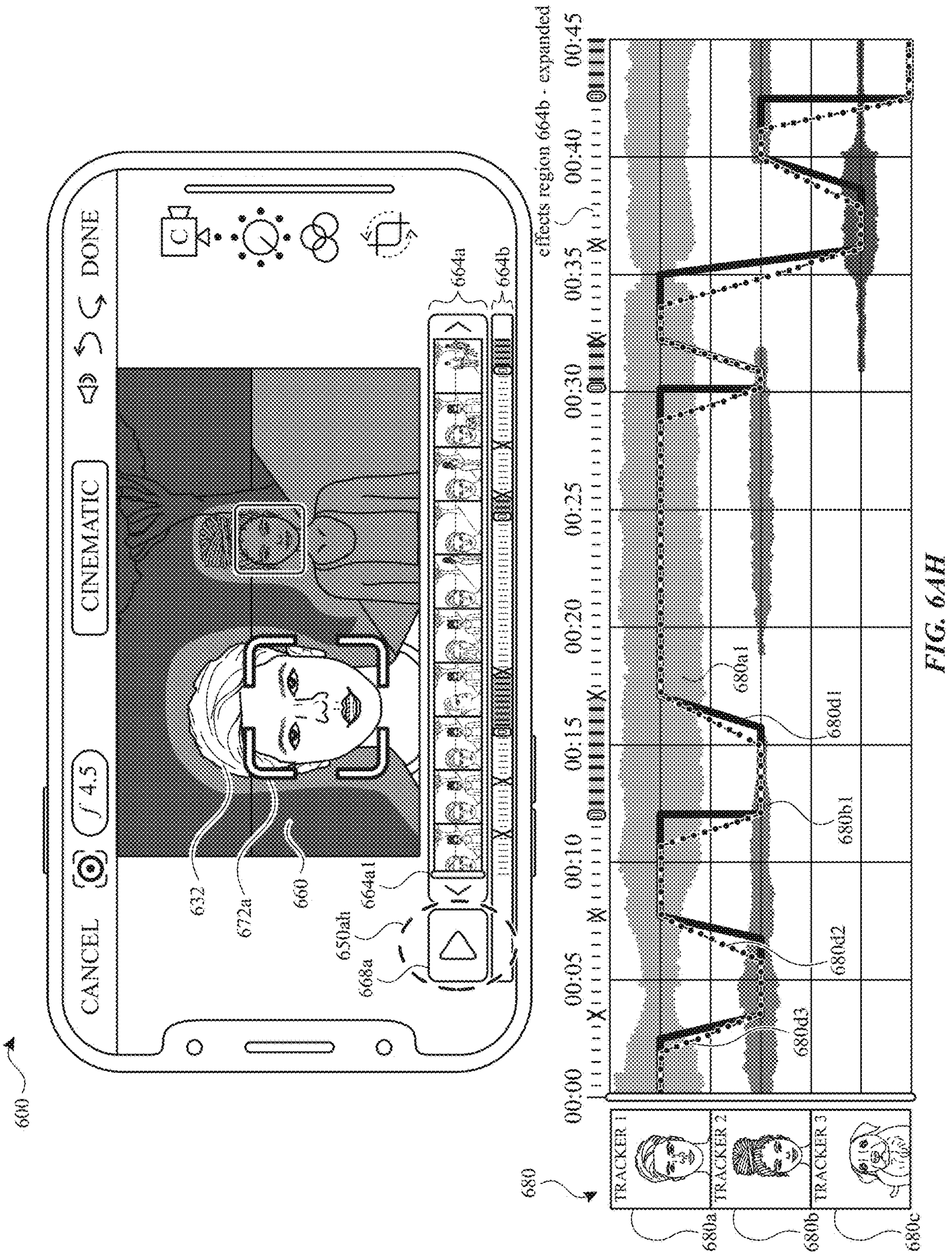
Figure 6A:
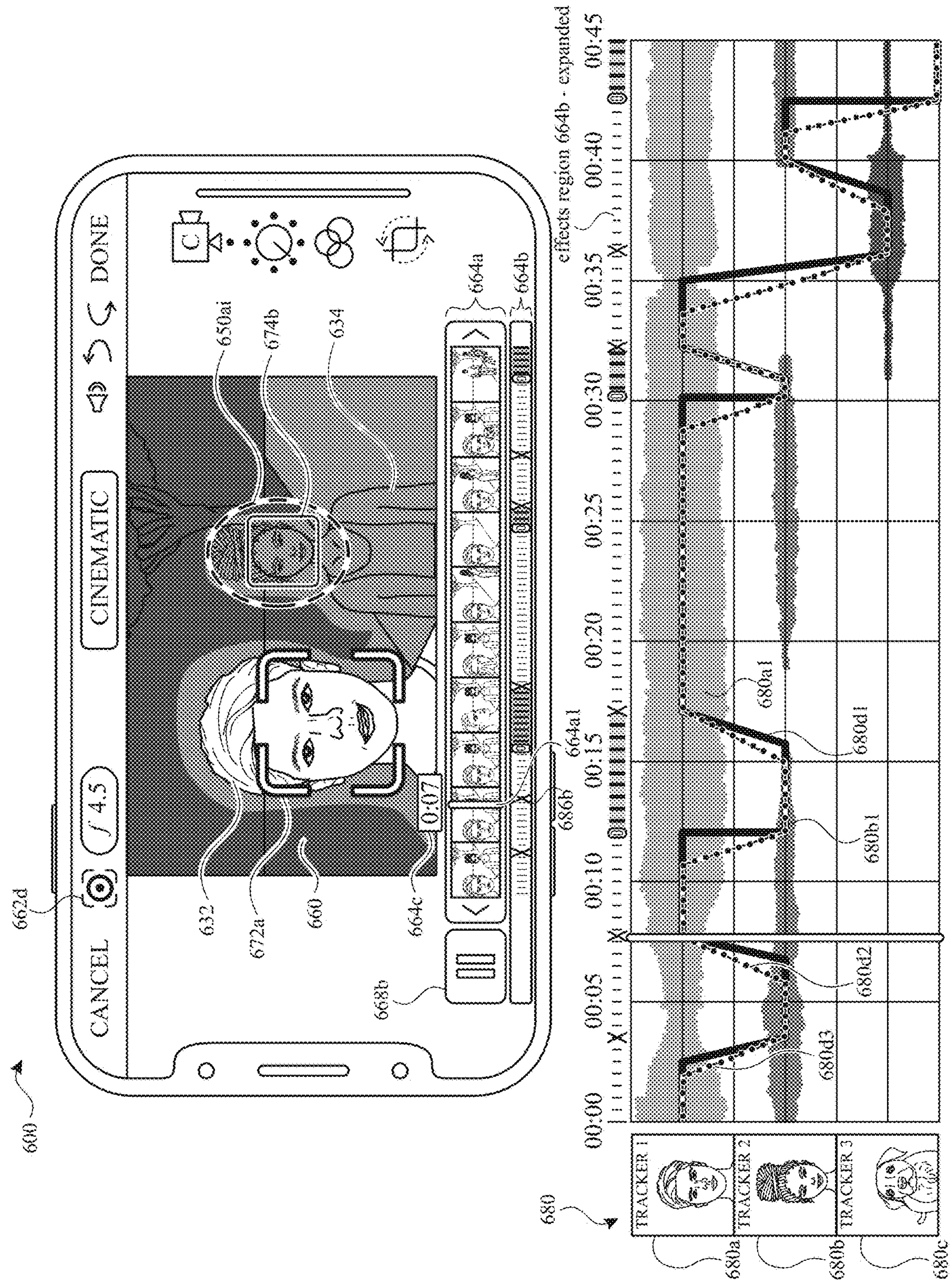
Figure 6A:
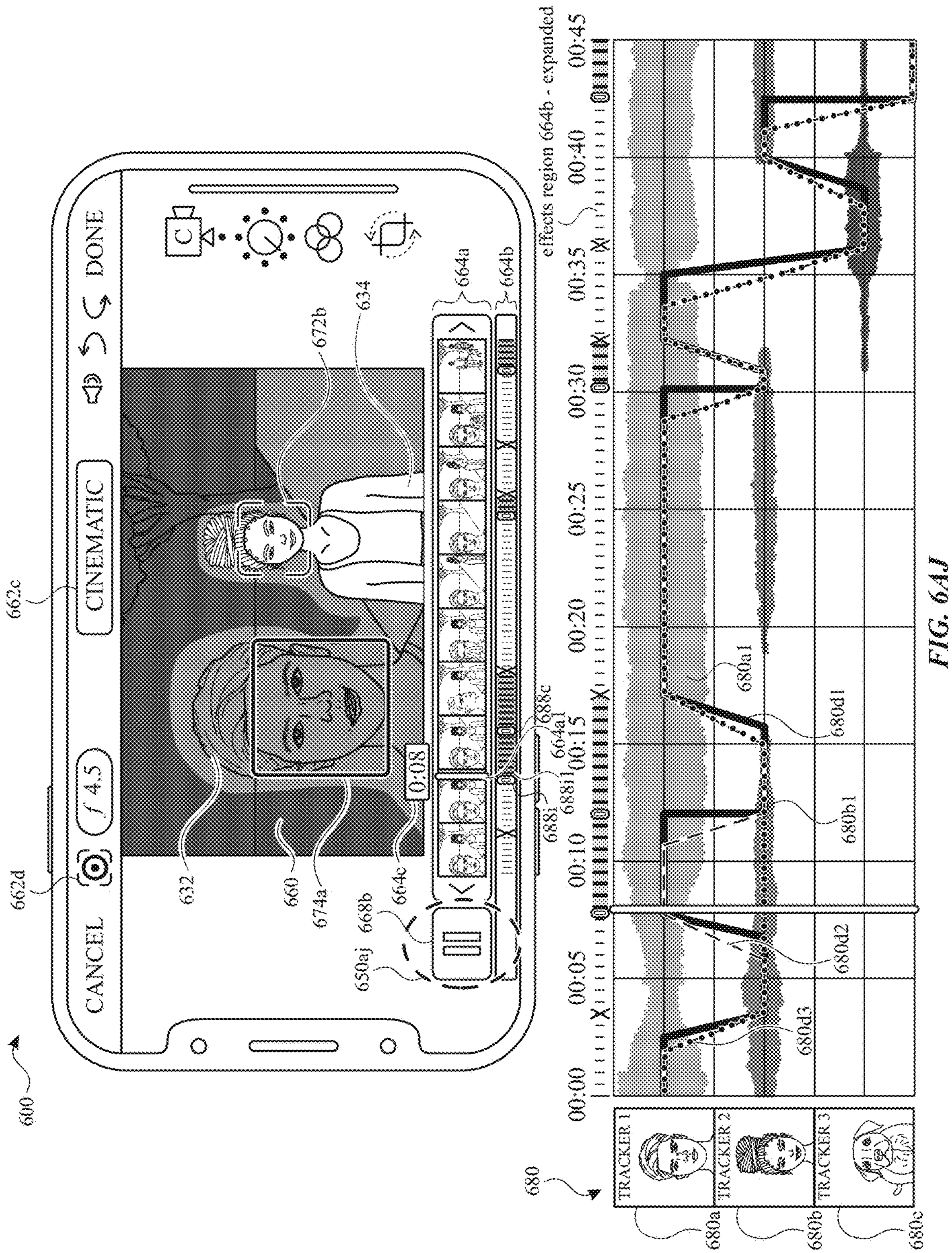
Figure 6A:
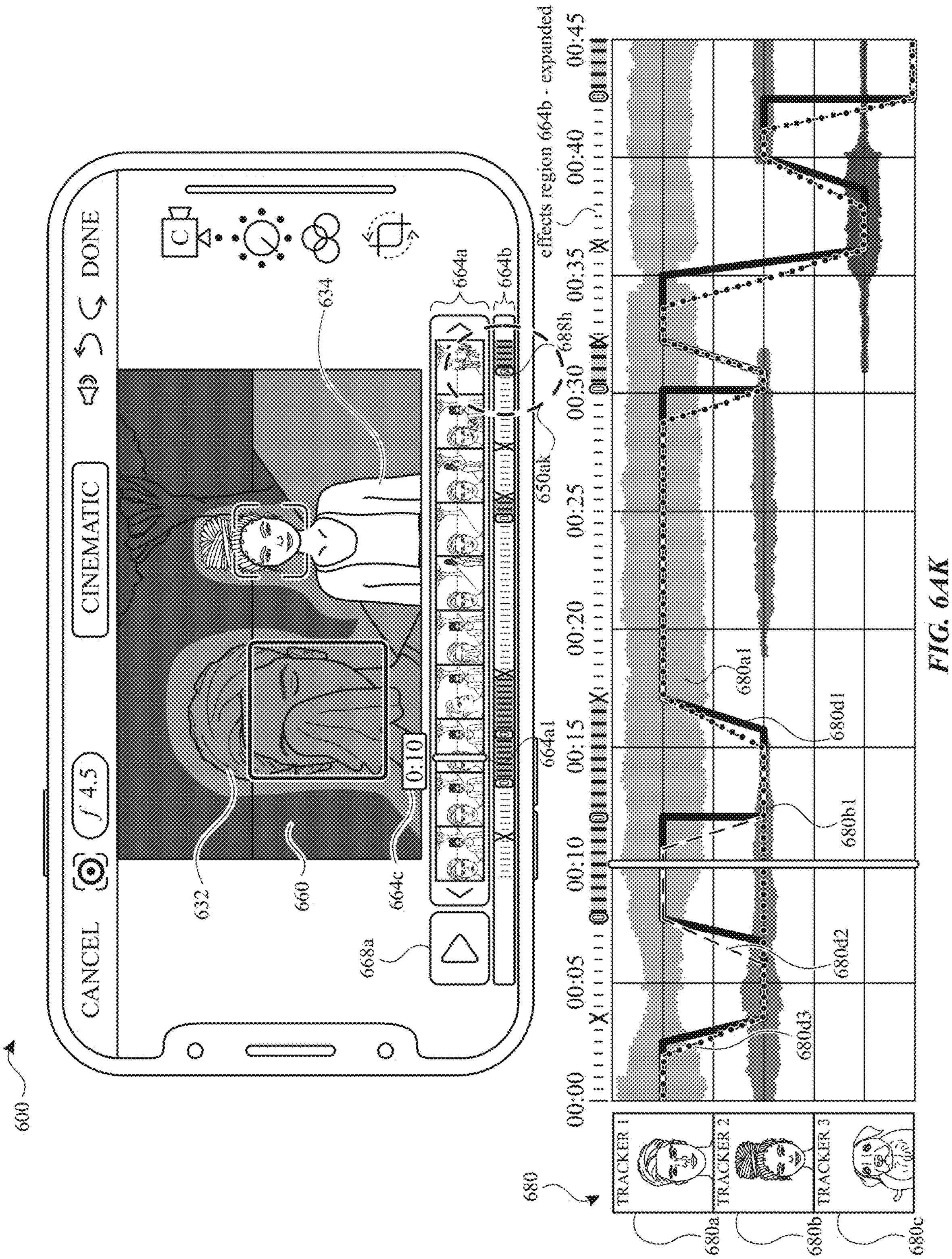
Figure 6A:
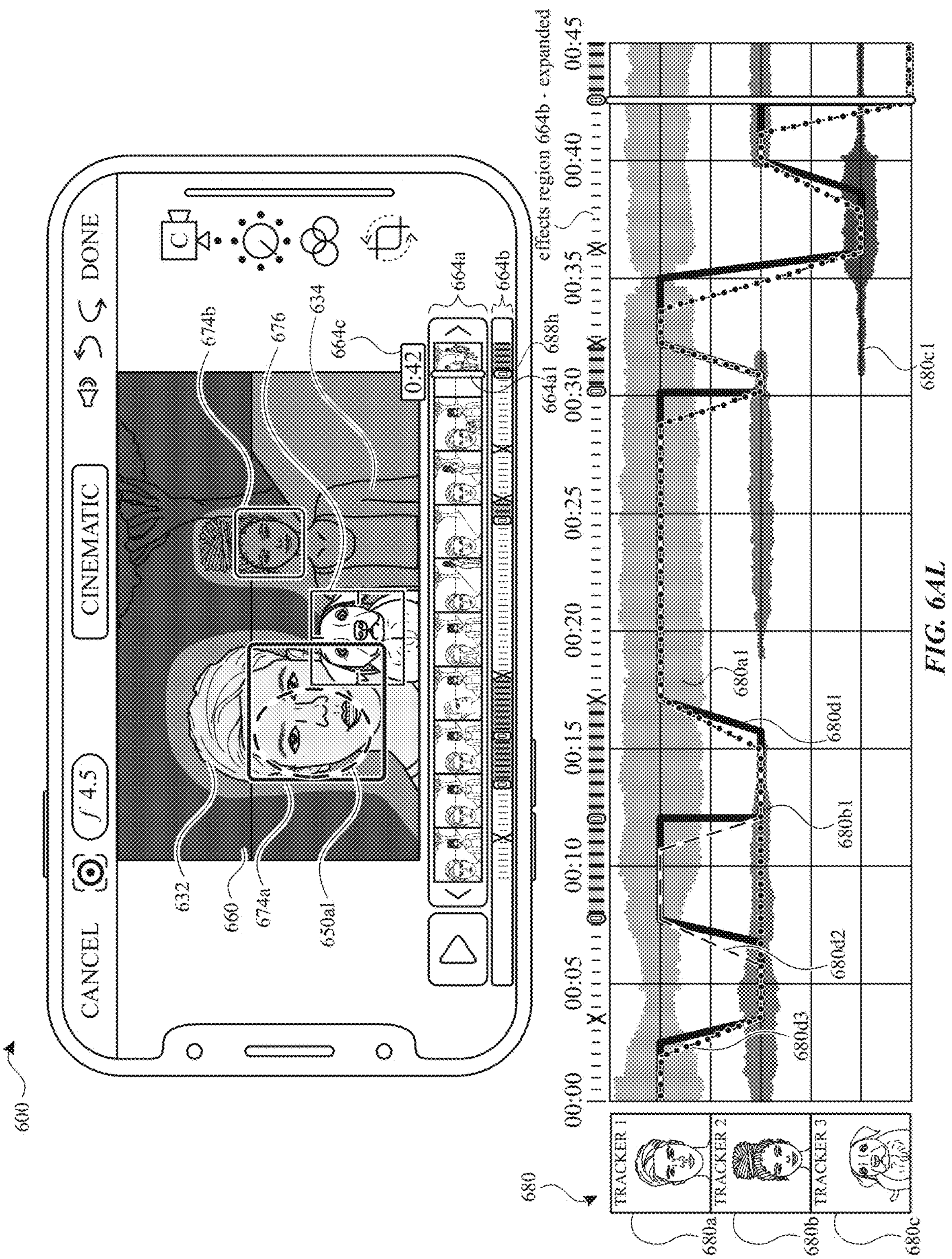
Figure 6A:
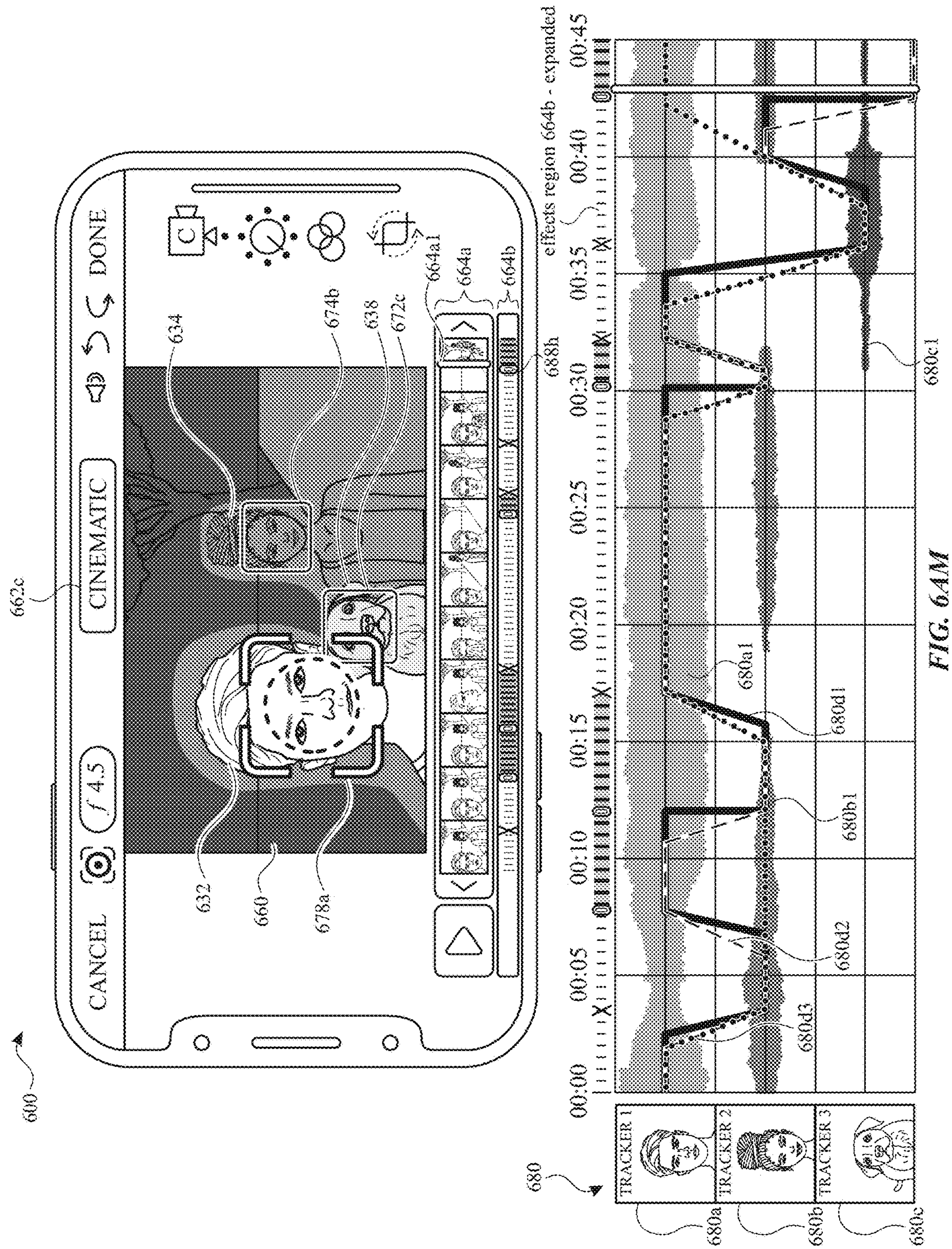
Figure 6A:
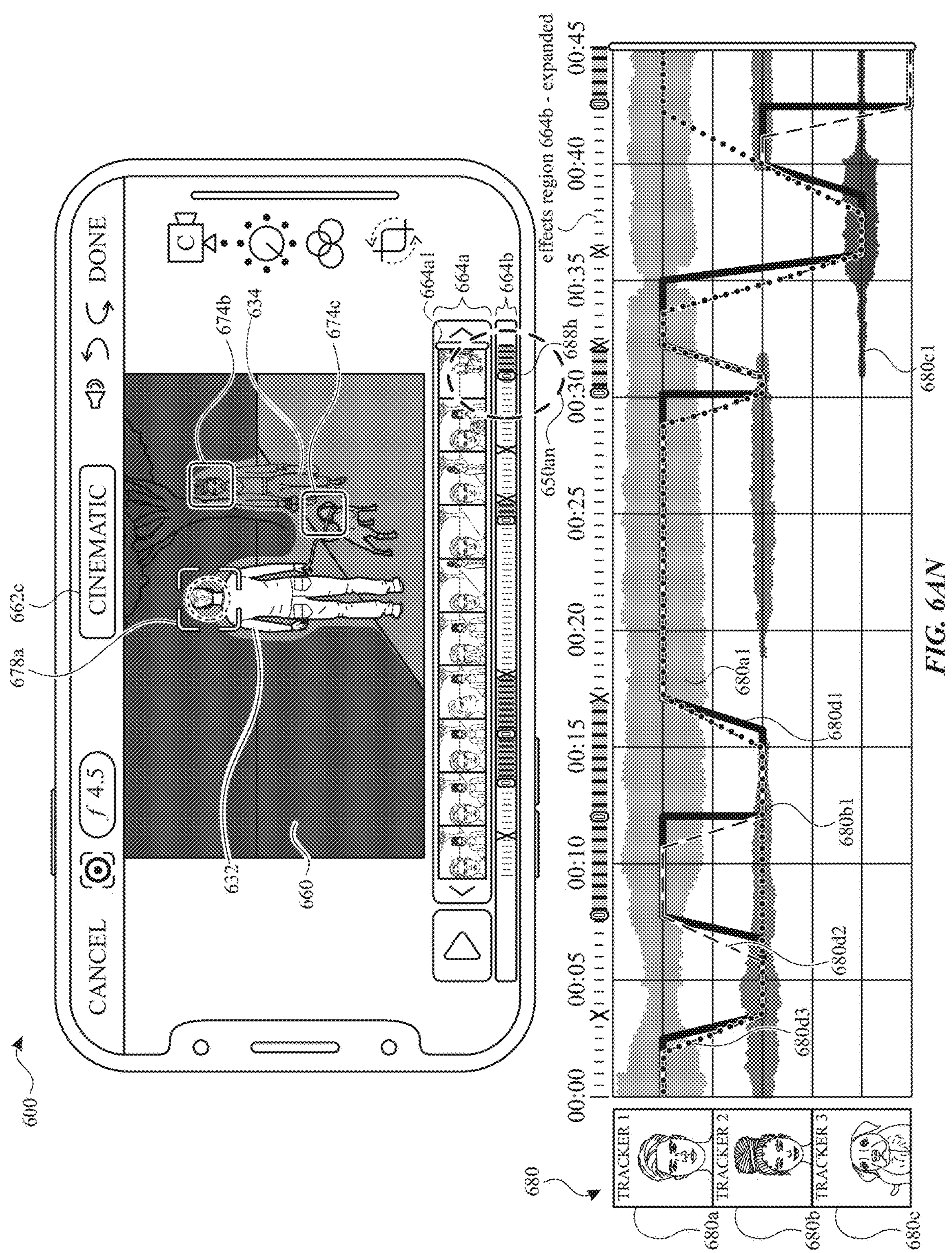
Figure 6A:
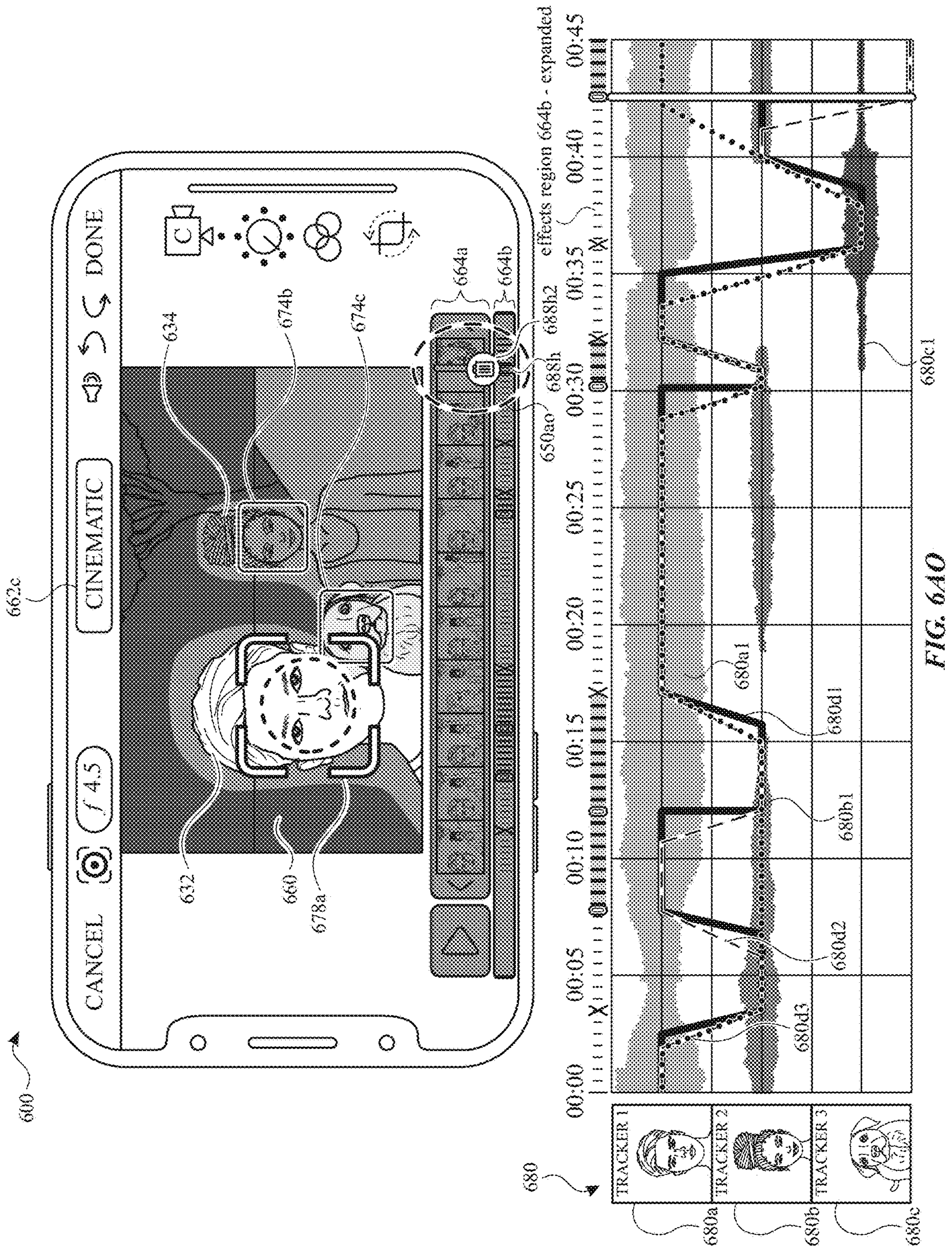
Figure 6A:
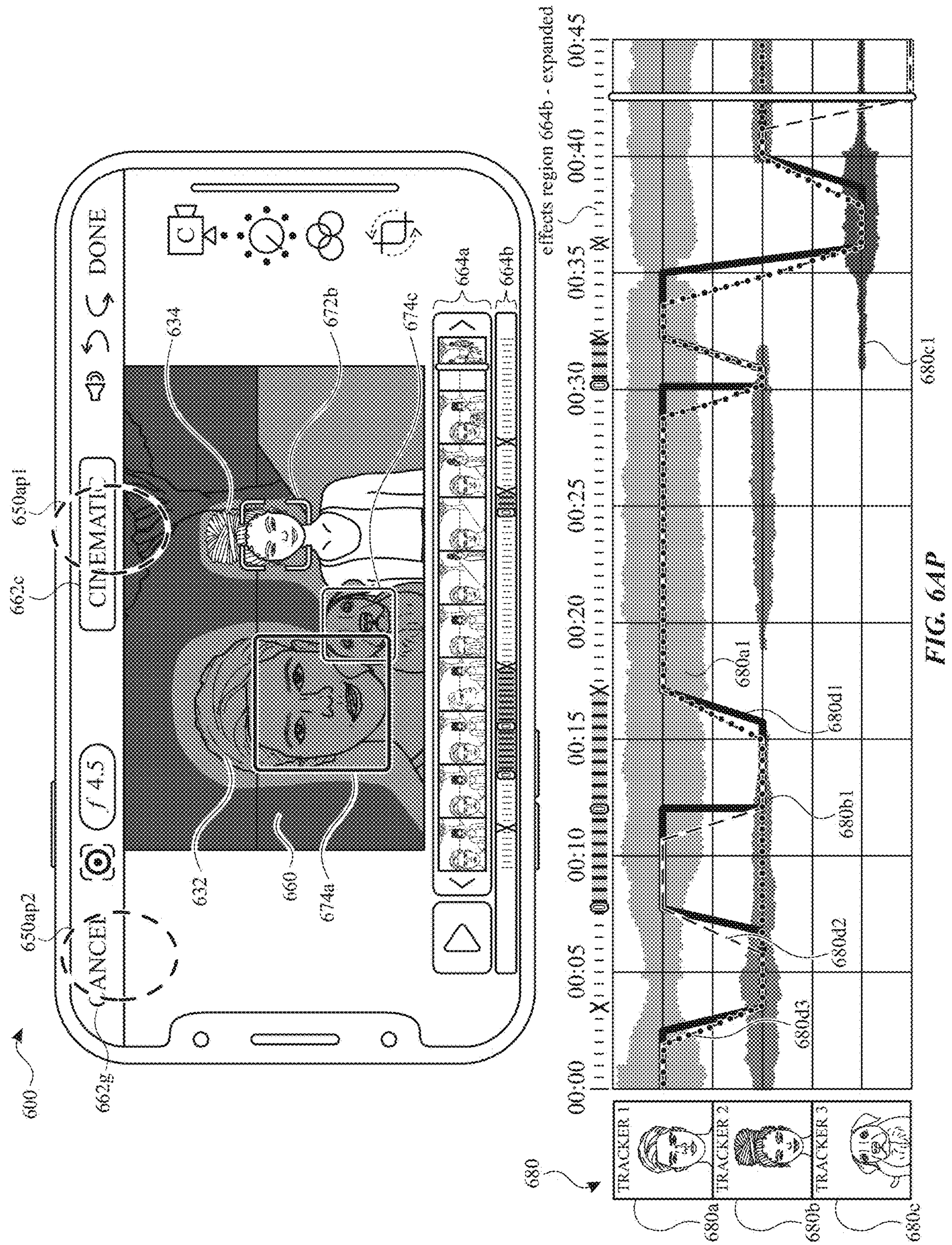
Figure 6A:
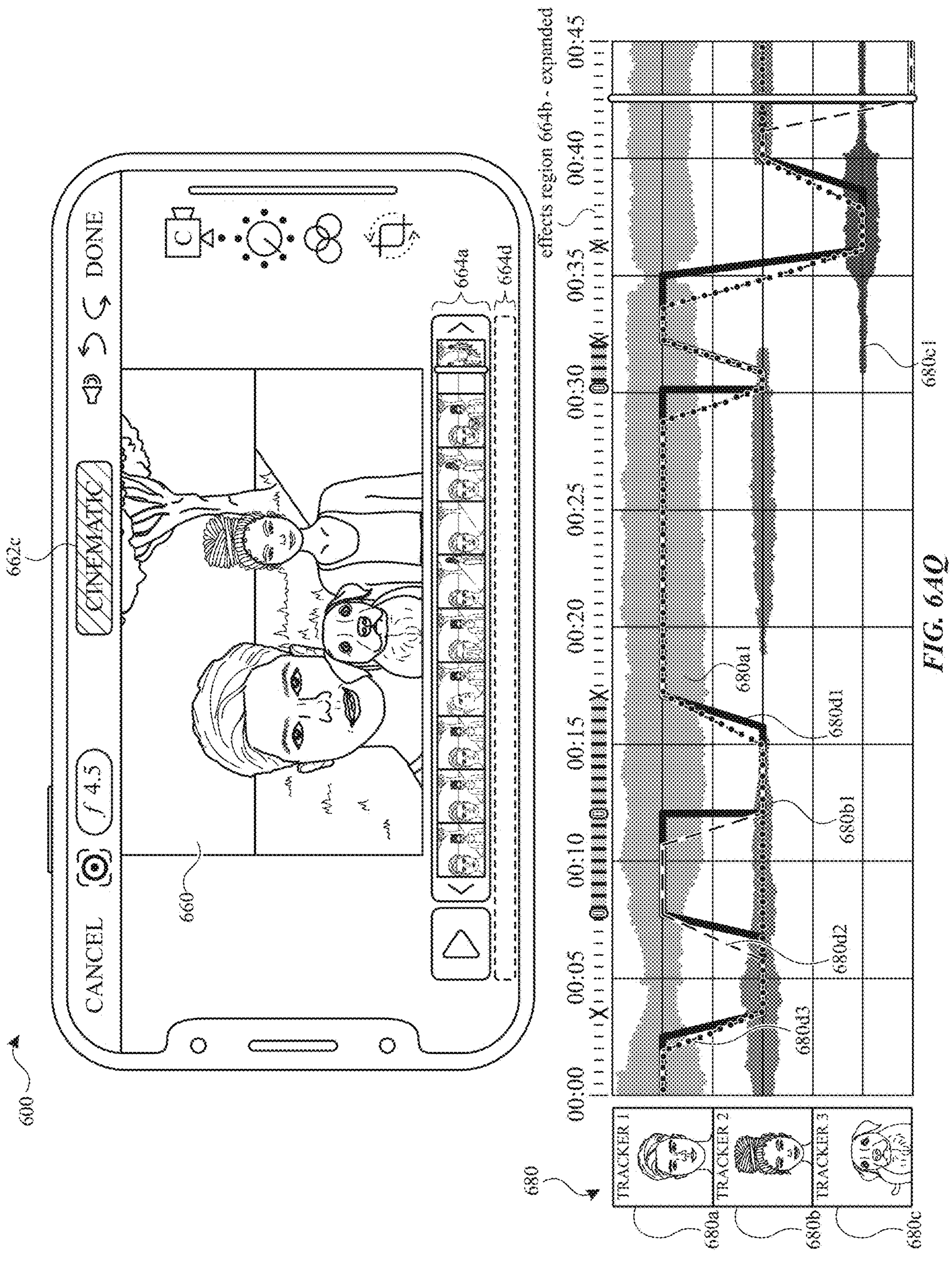
Figure 6A:
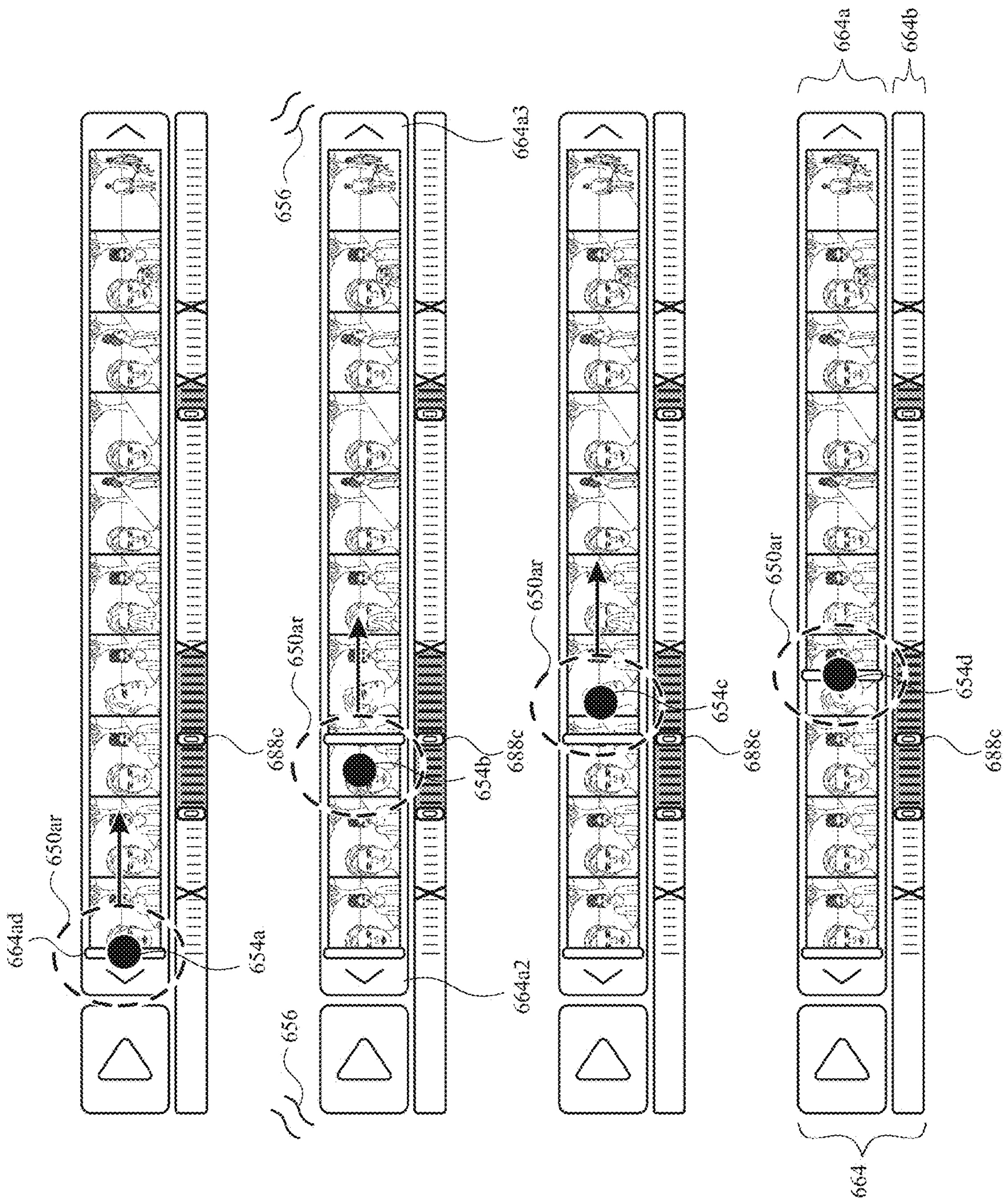
Figure 6A:
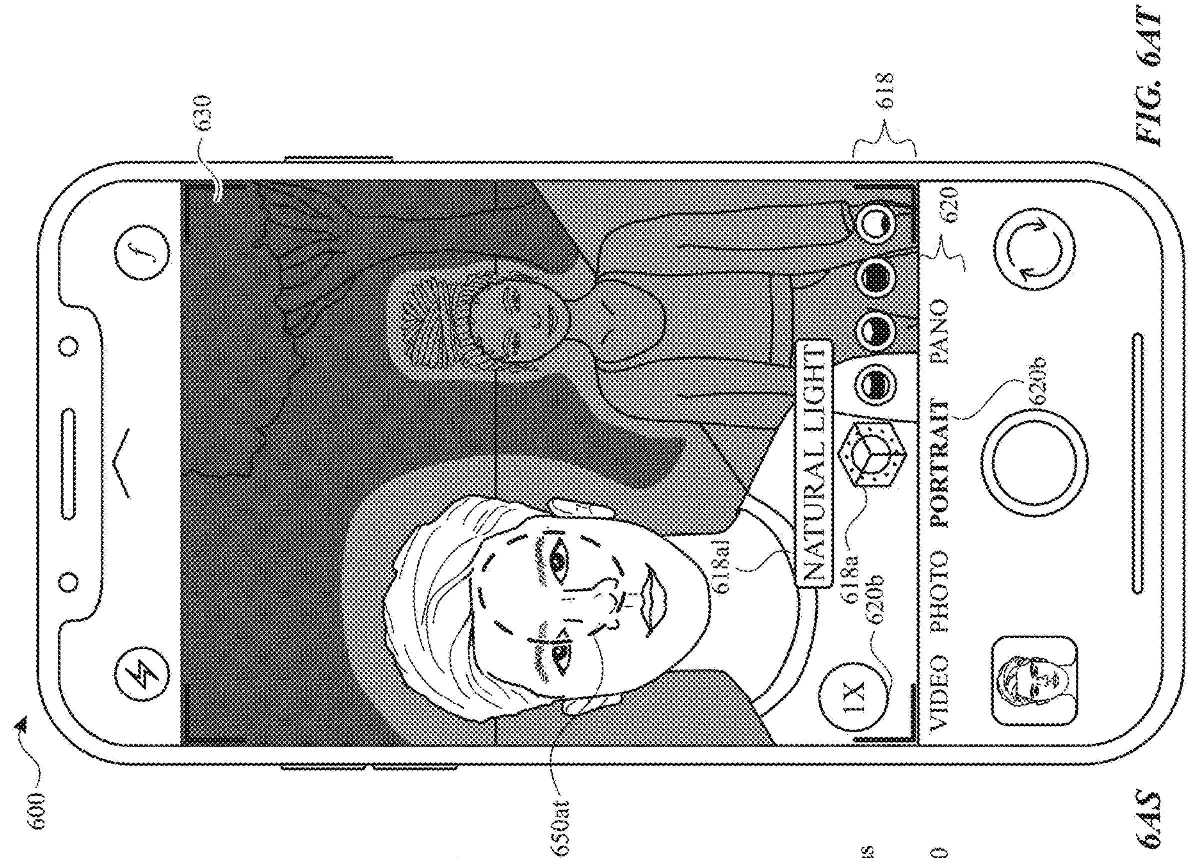
Figure 6A:
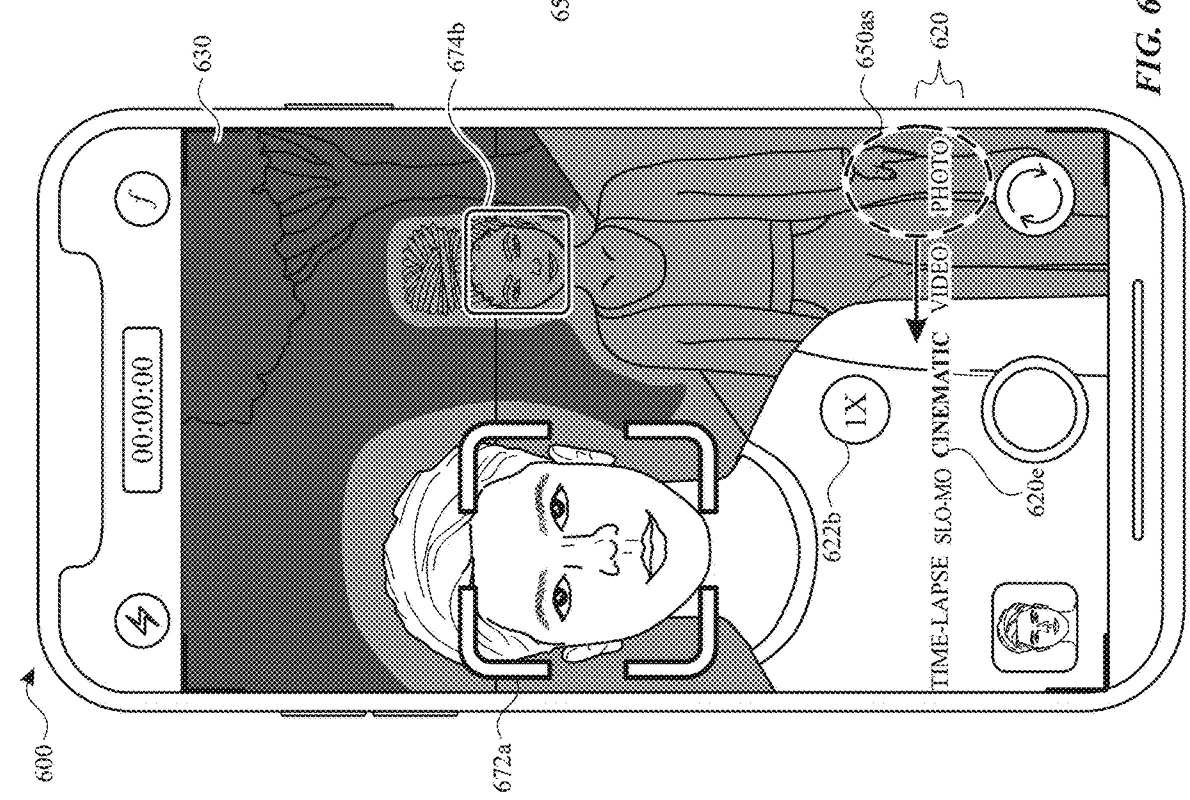
Figure 6A:
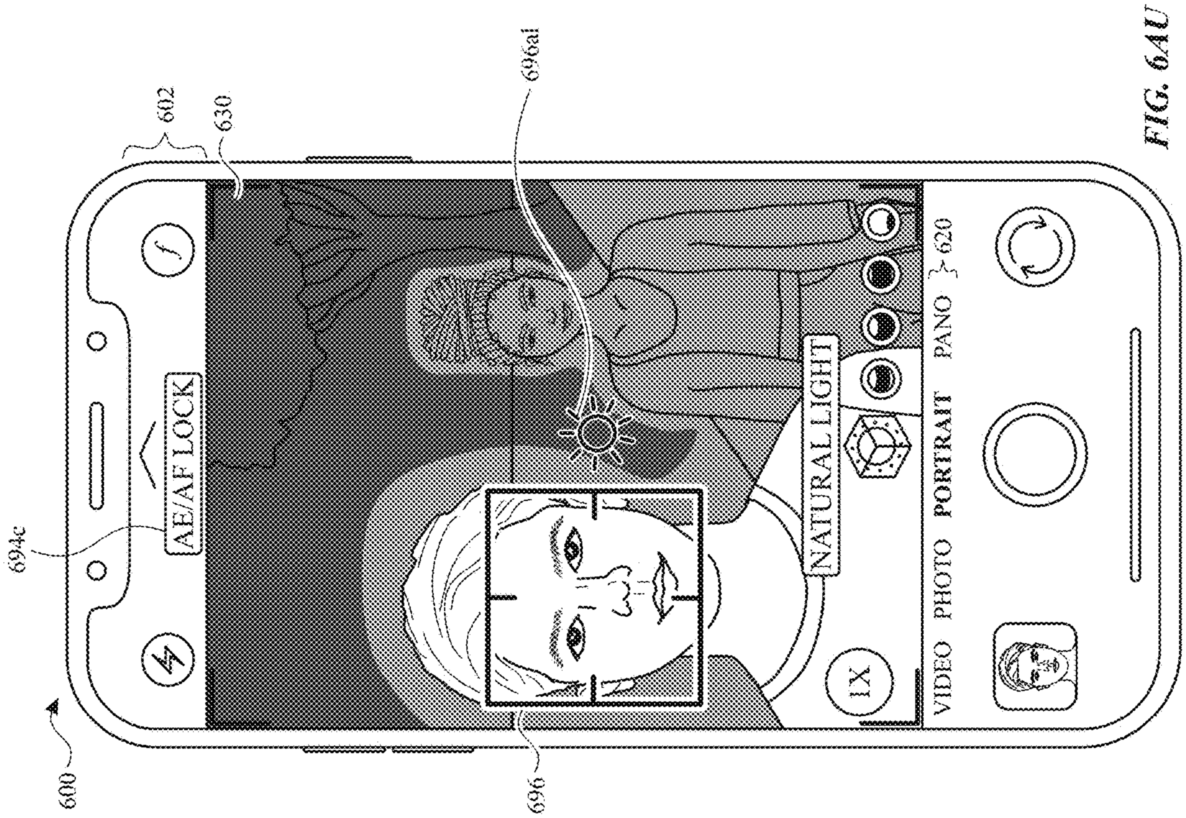
Figure 6A:
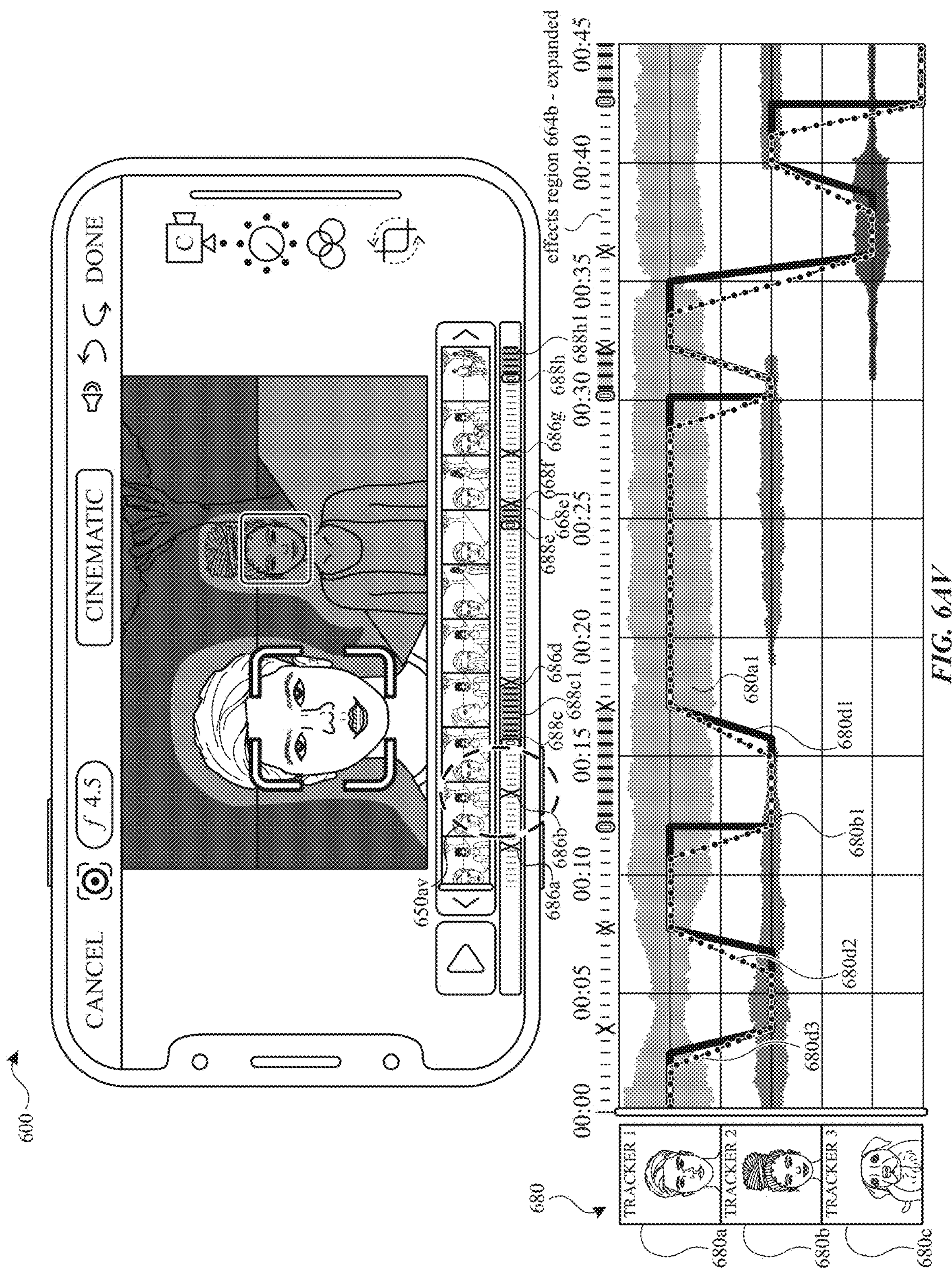
Figure 6A:
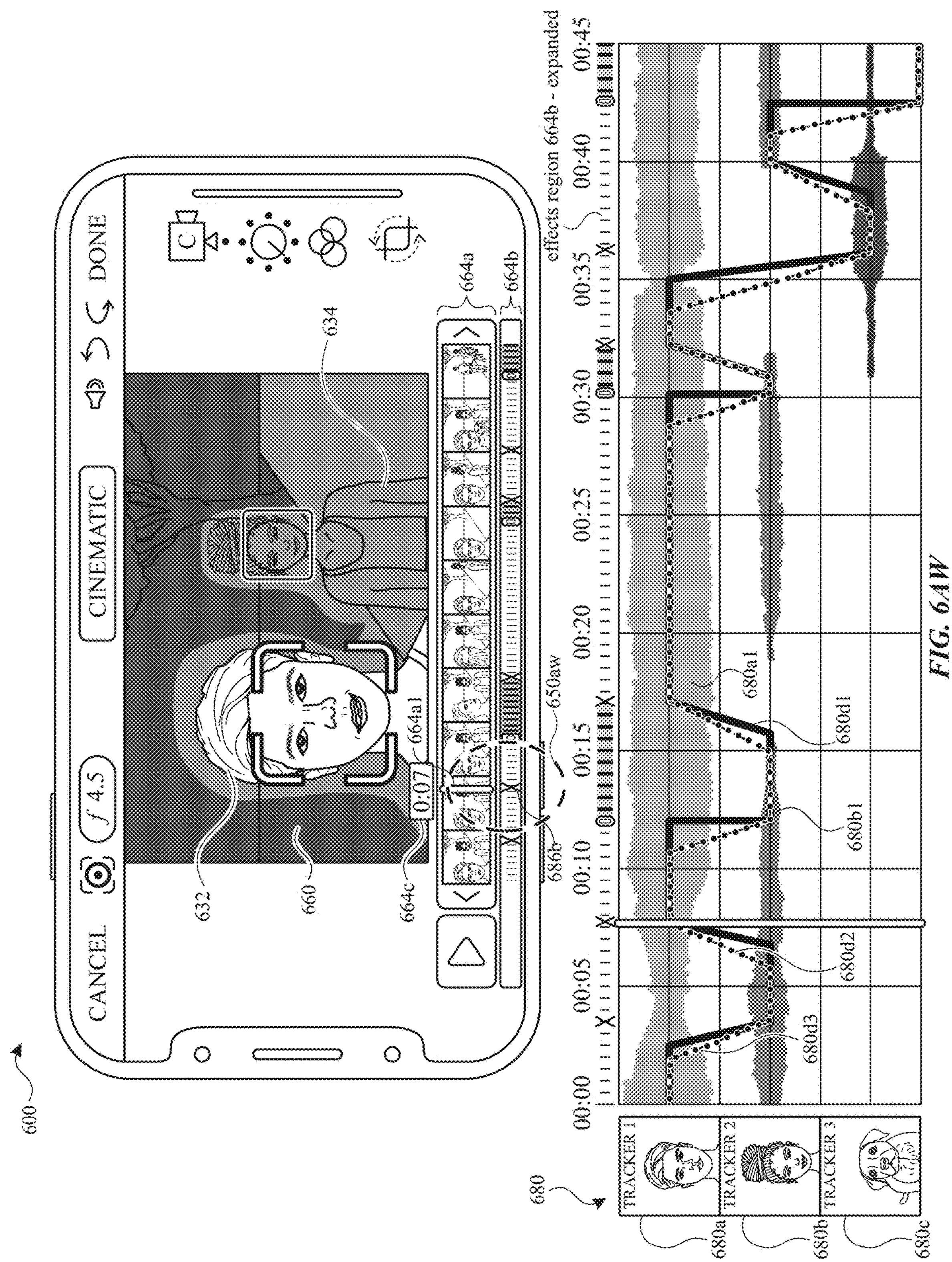
Figure 6A:
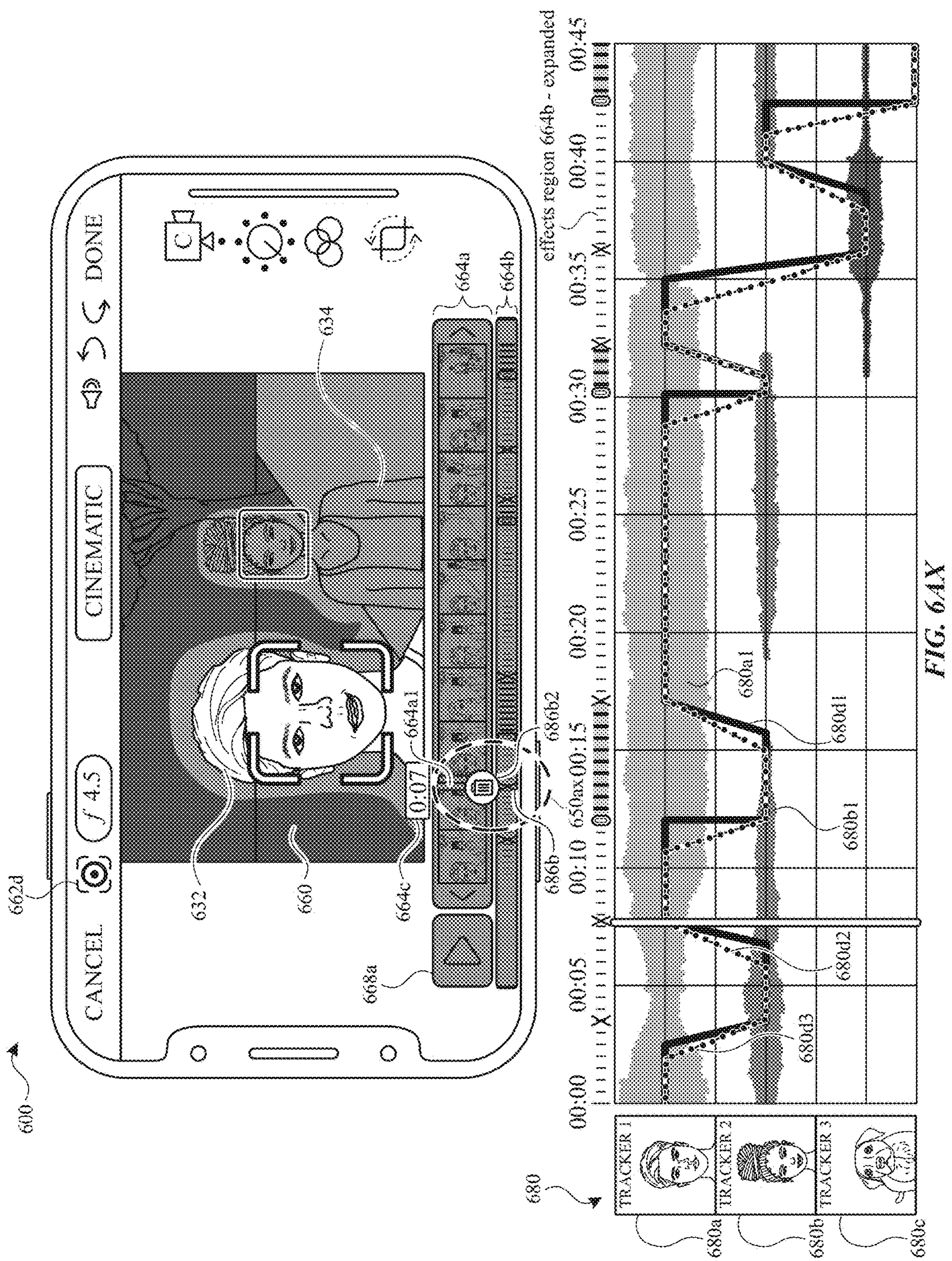
Figure 6A:
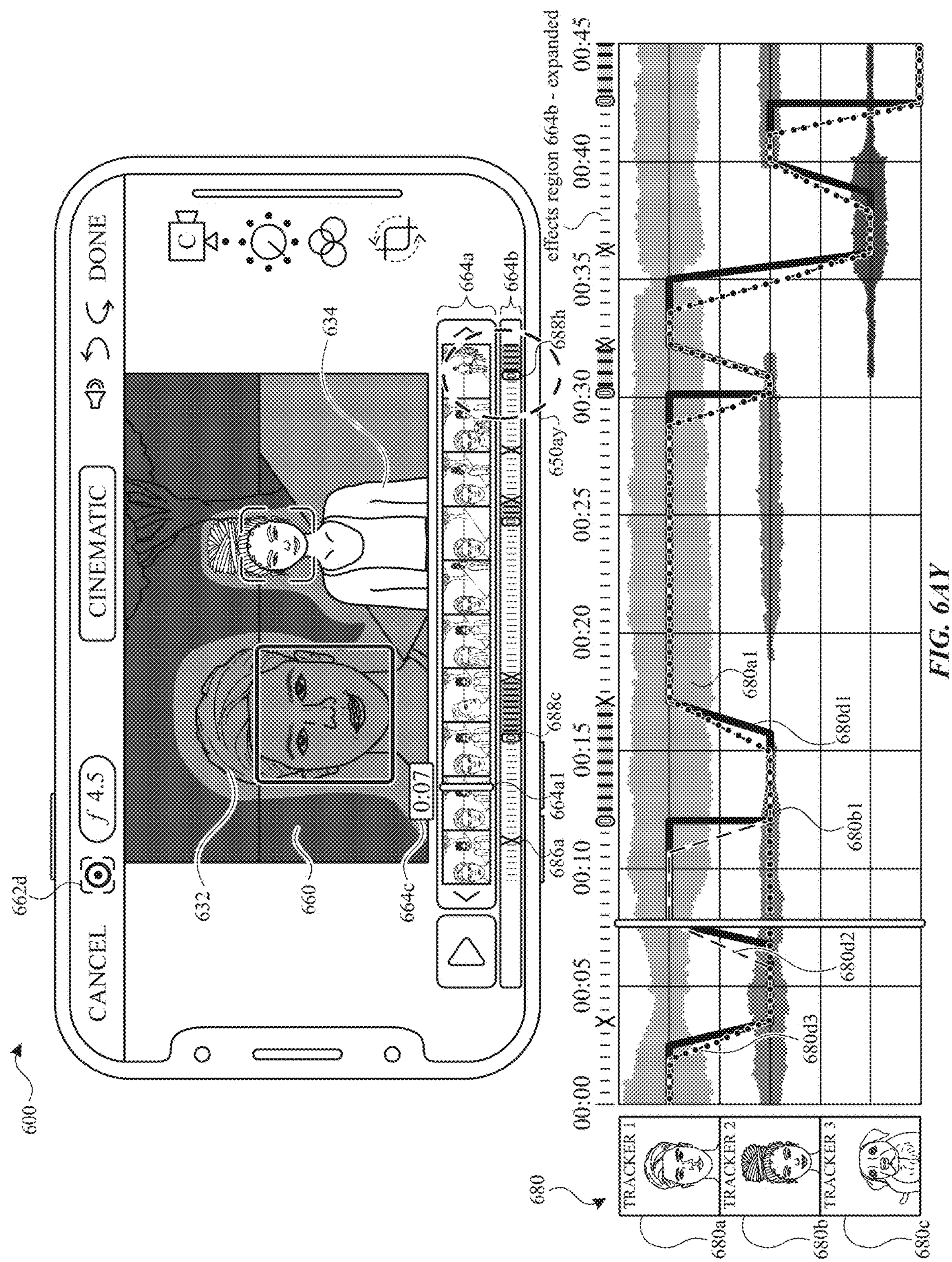
Figure 6A:
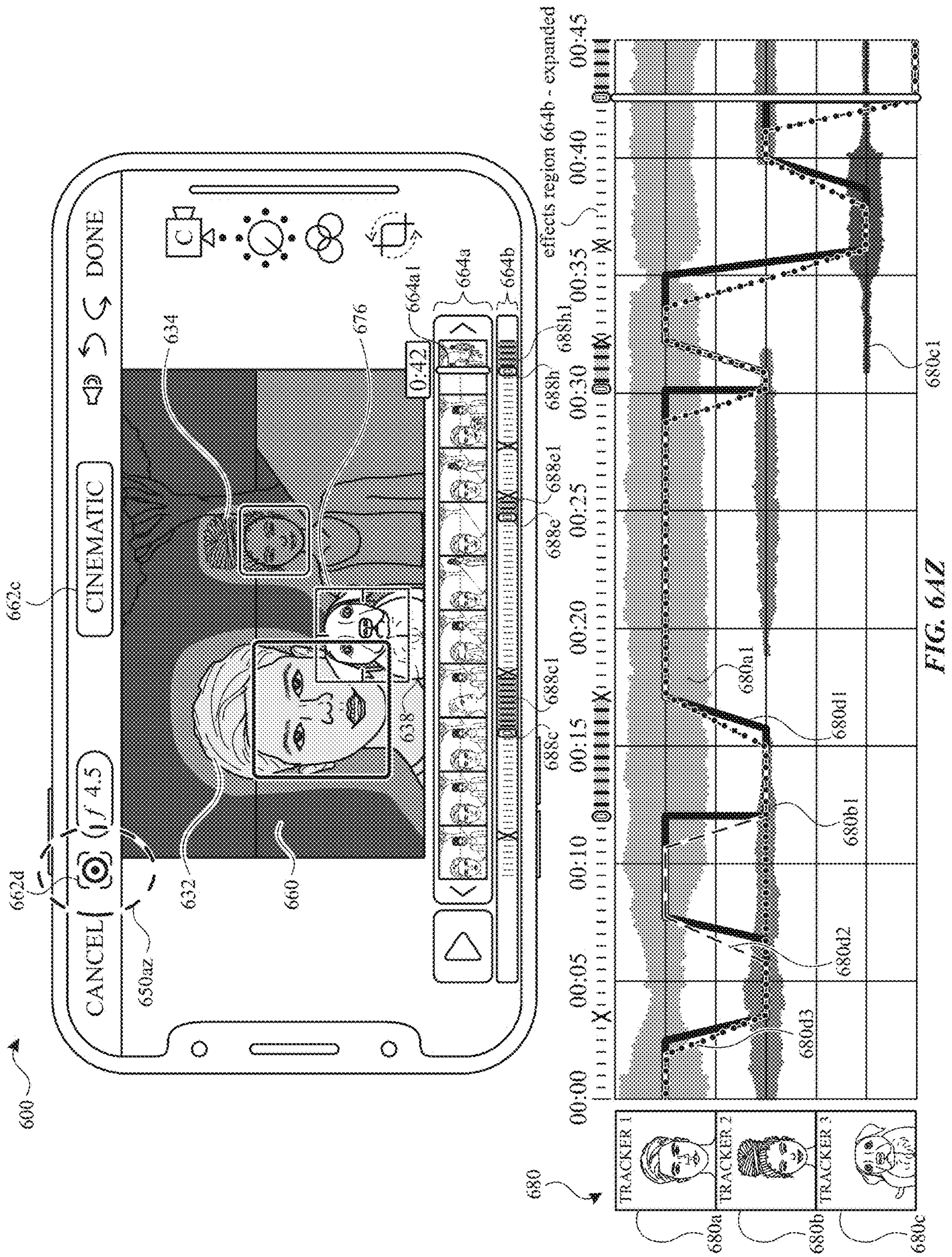
Figure 6B:
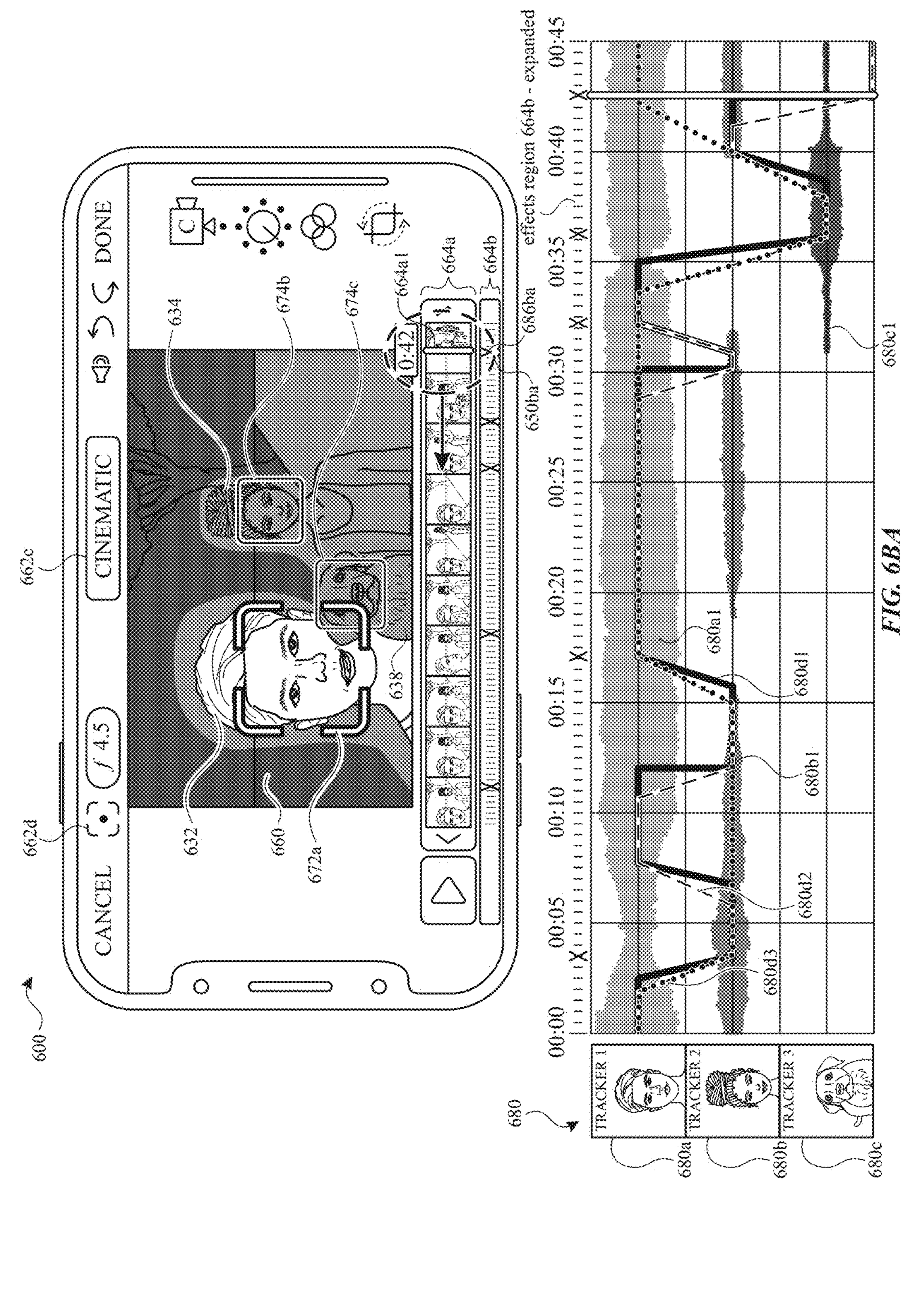
Figure 6B:
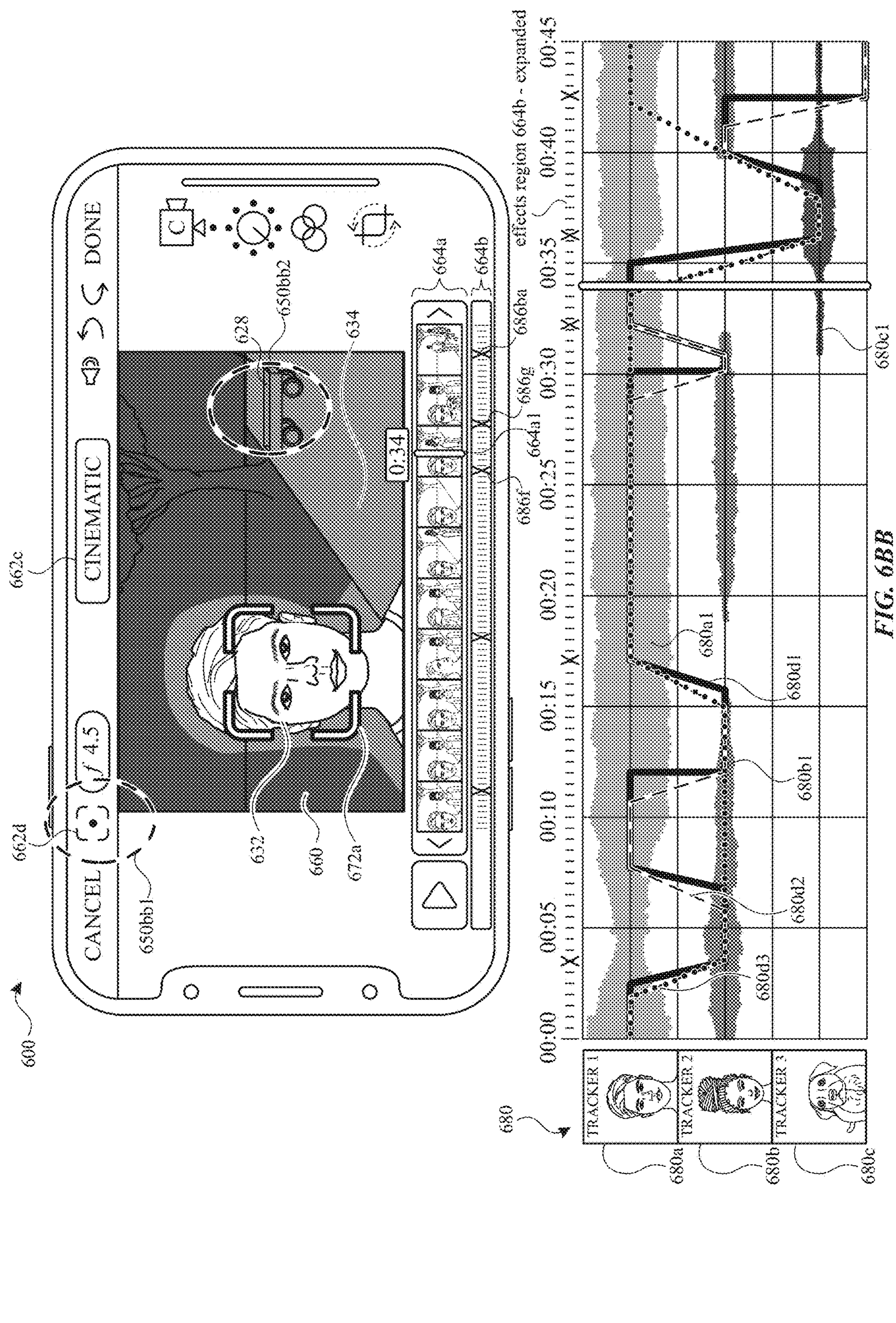
Figure 6B:
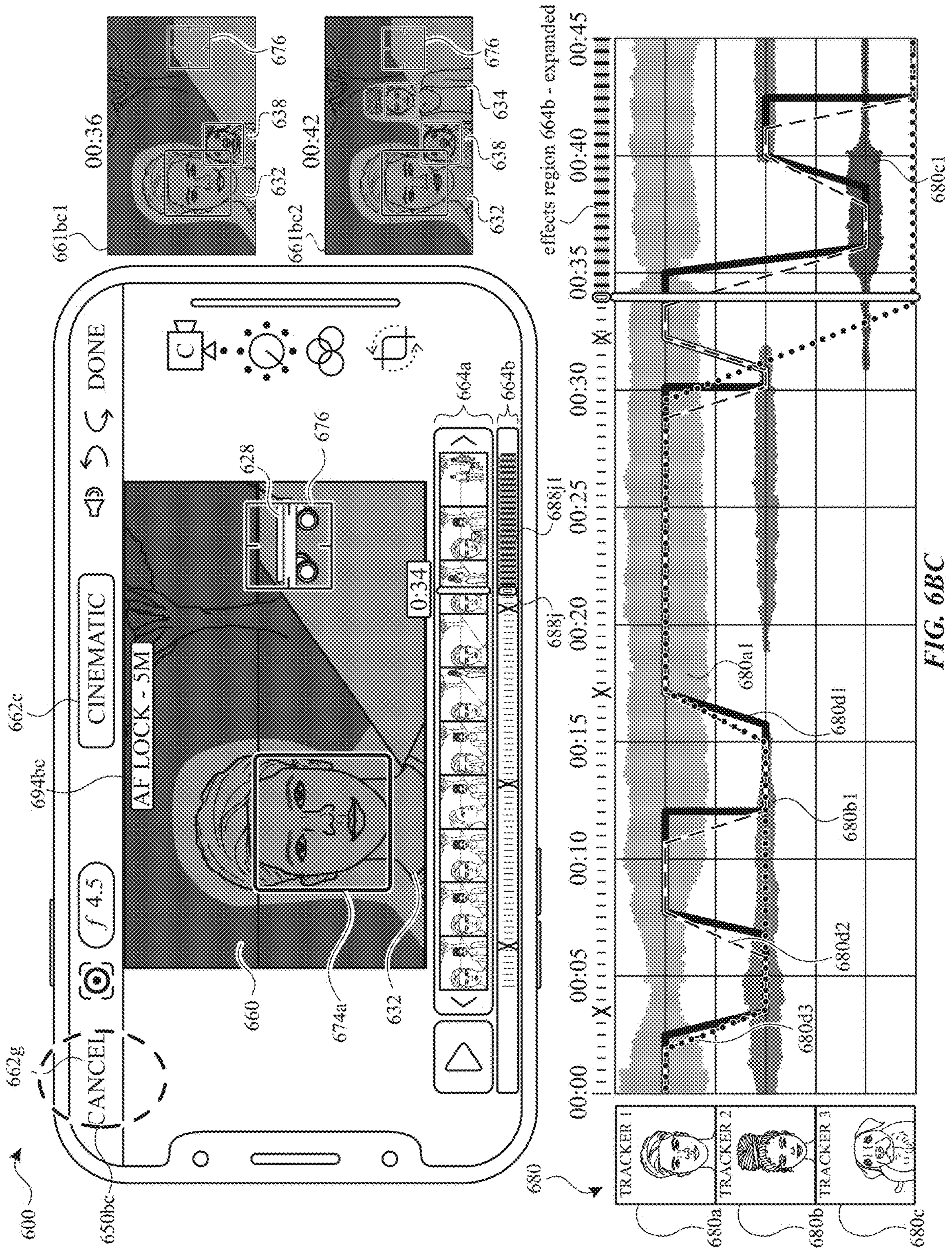
Figure 6B:
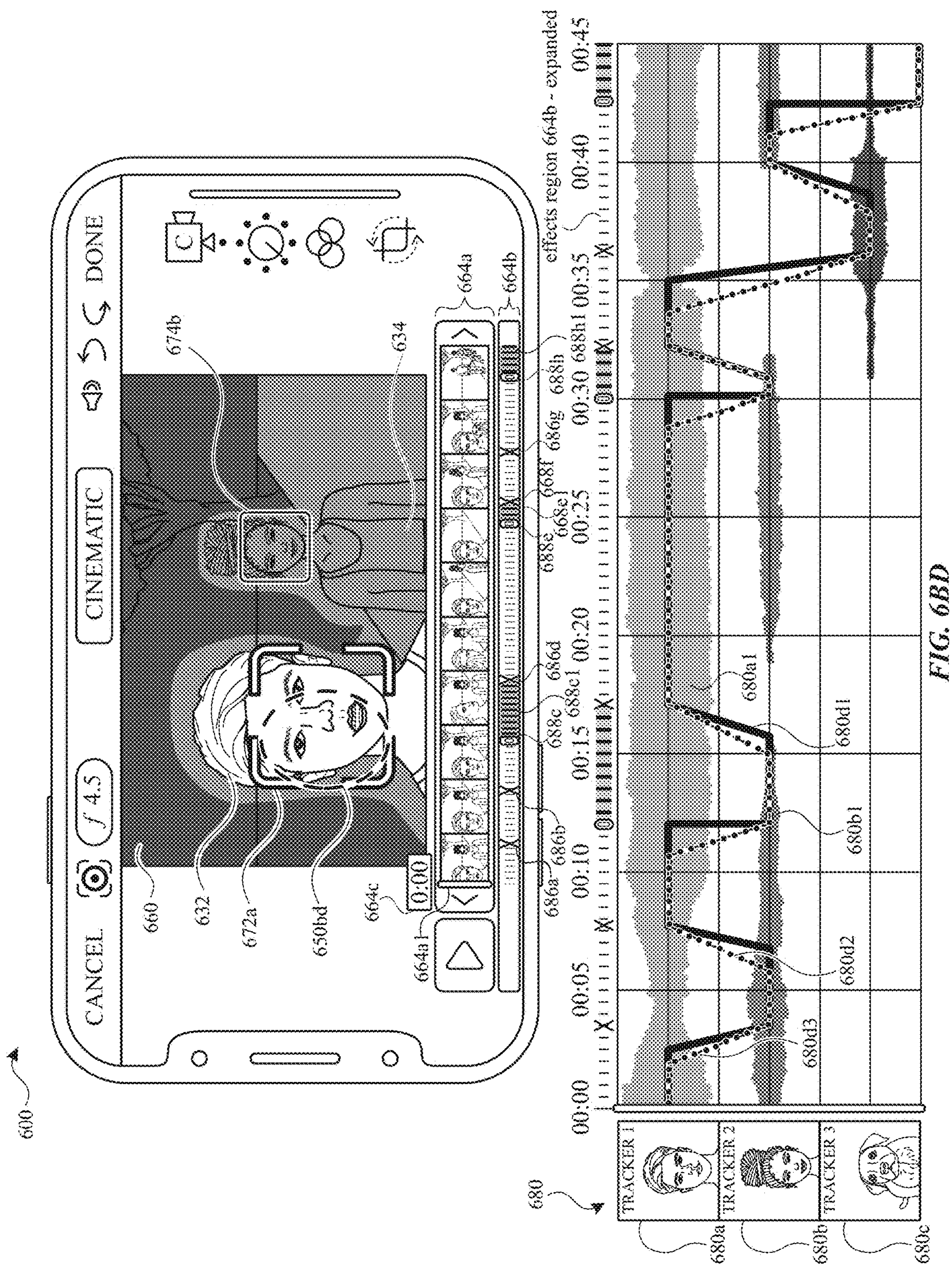
Figure 6B:
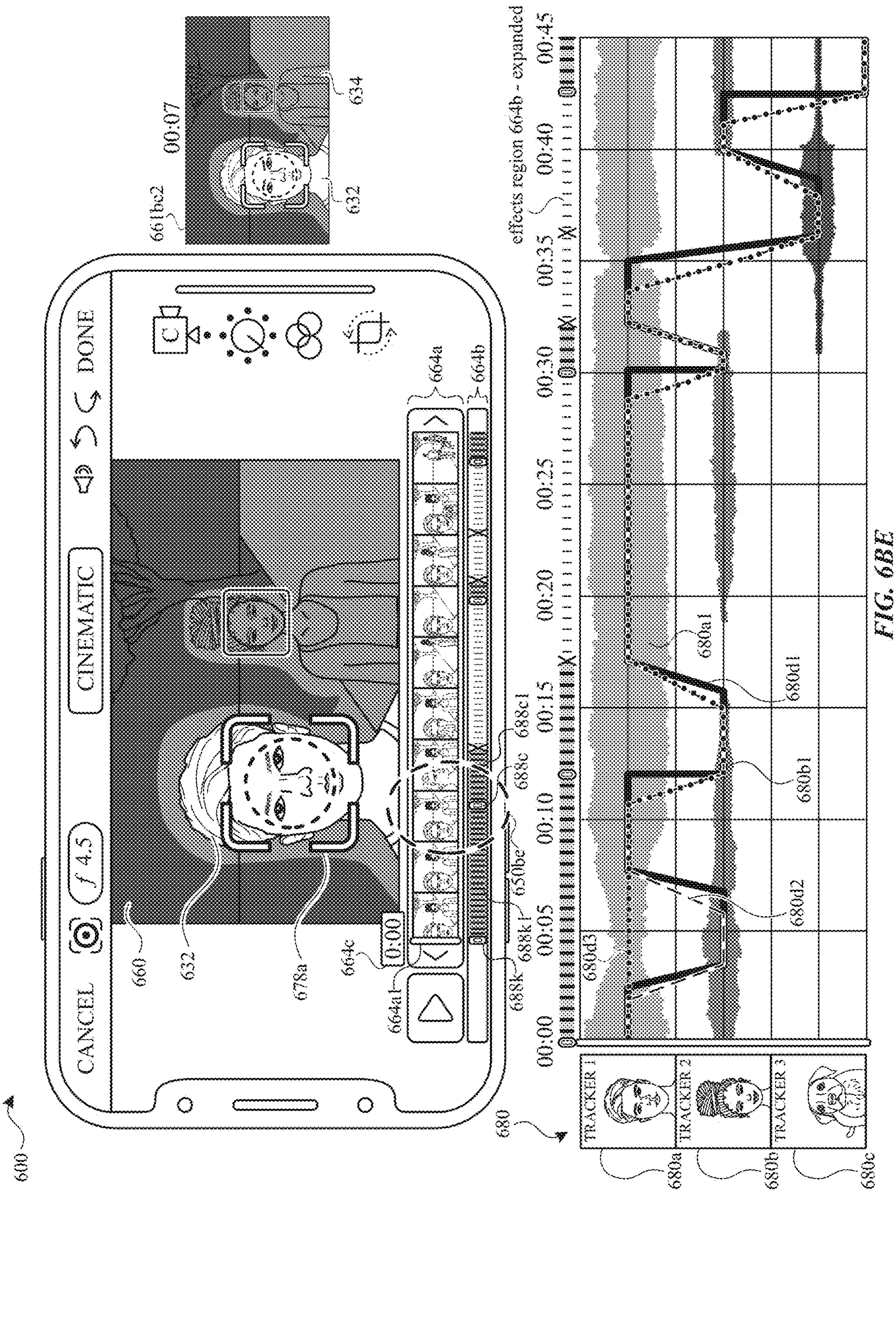
Figure 6B:
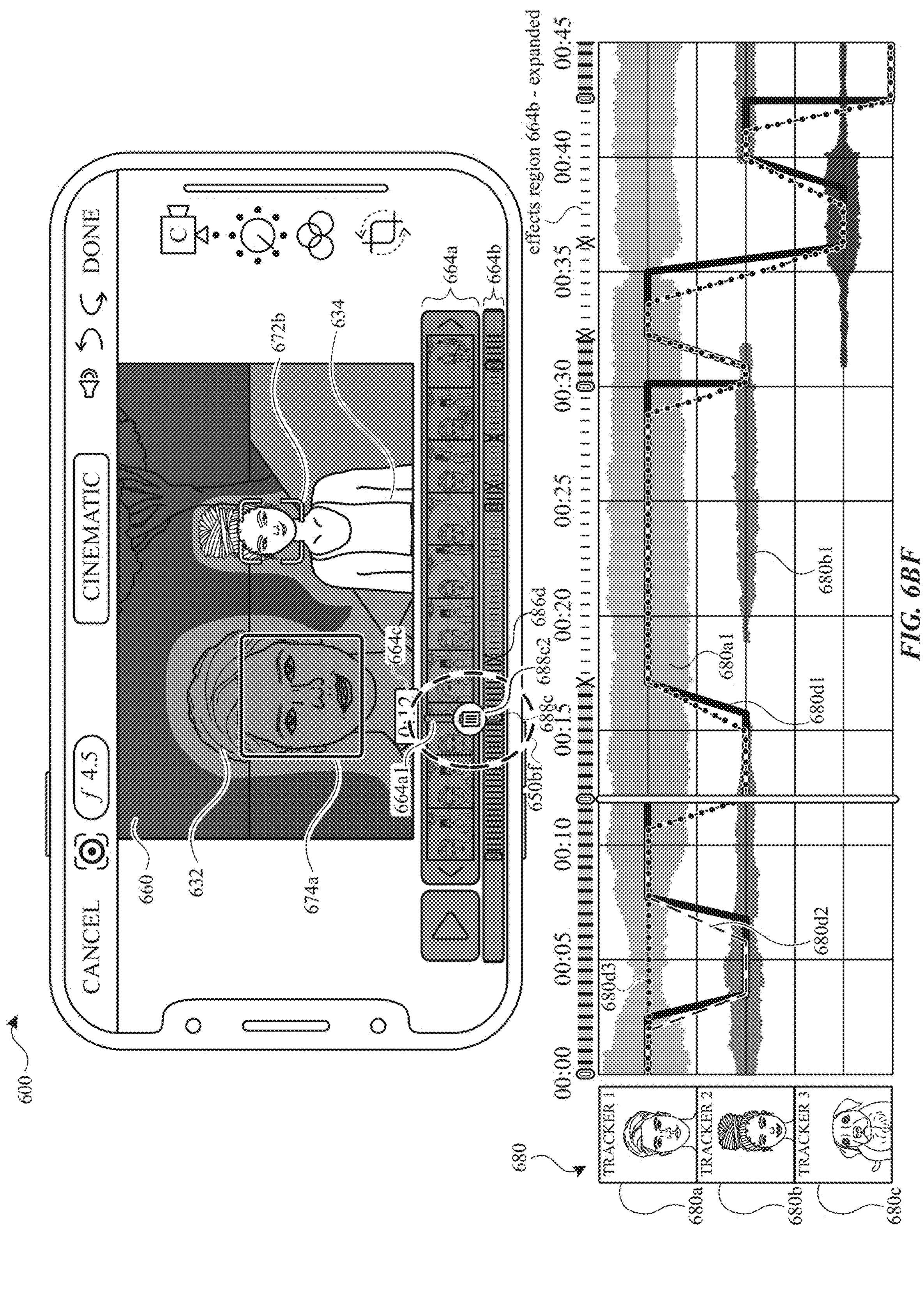
Figure 6B:
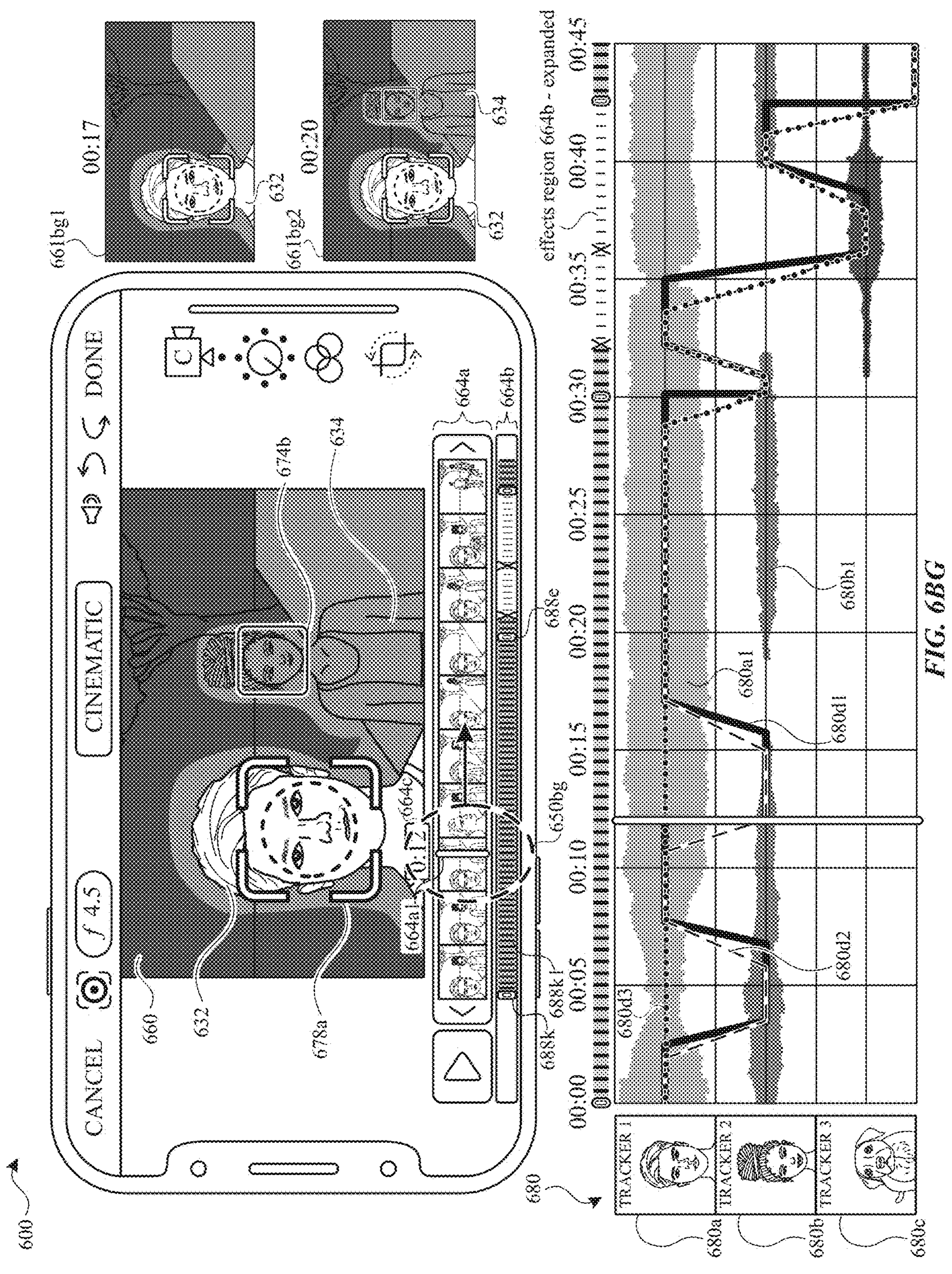
Figure 6B:
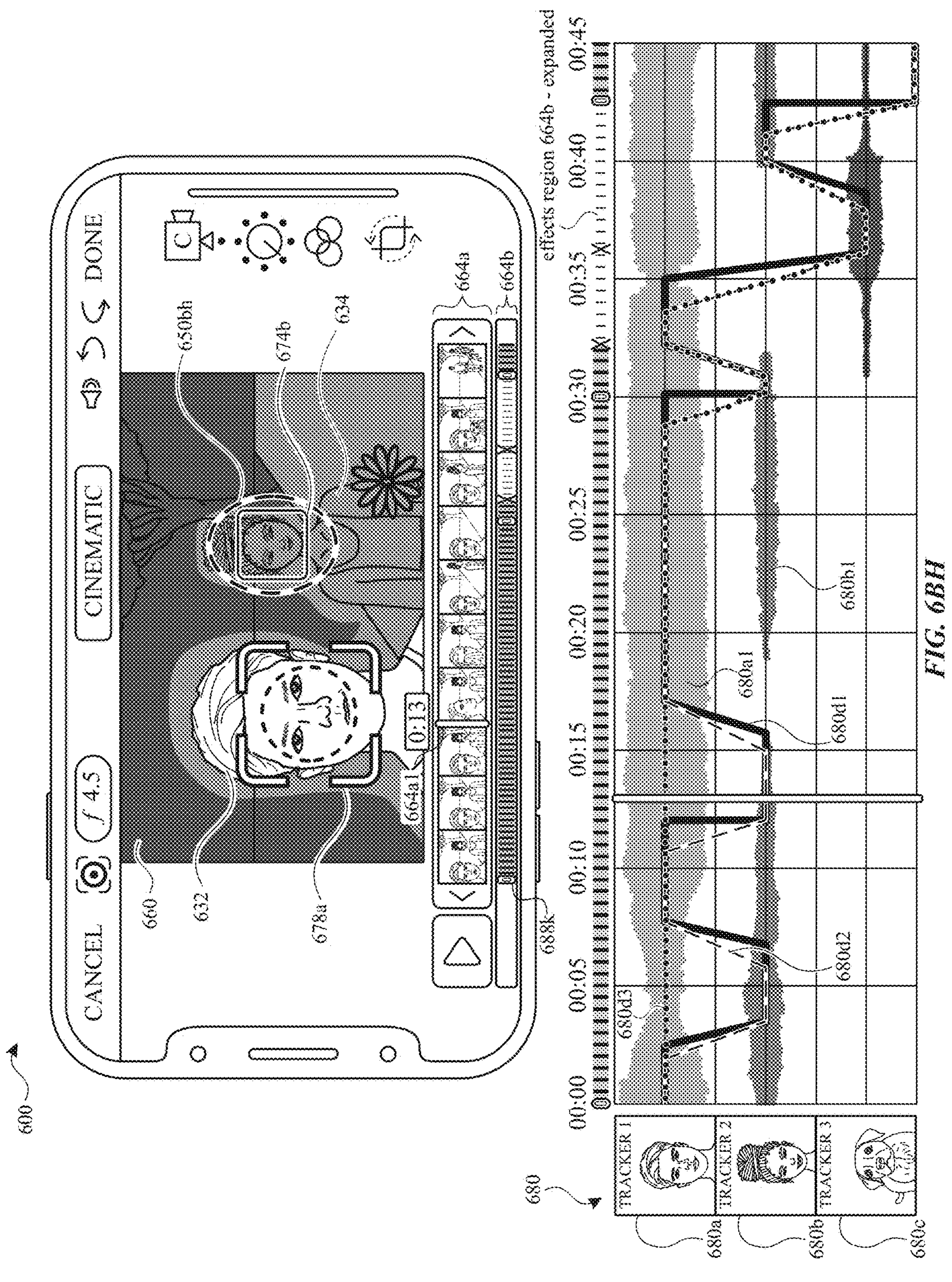
Figure 6B:
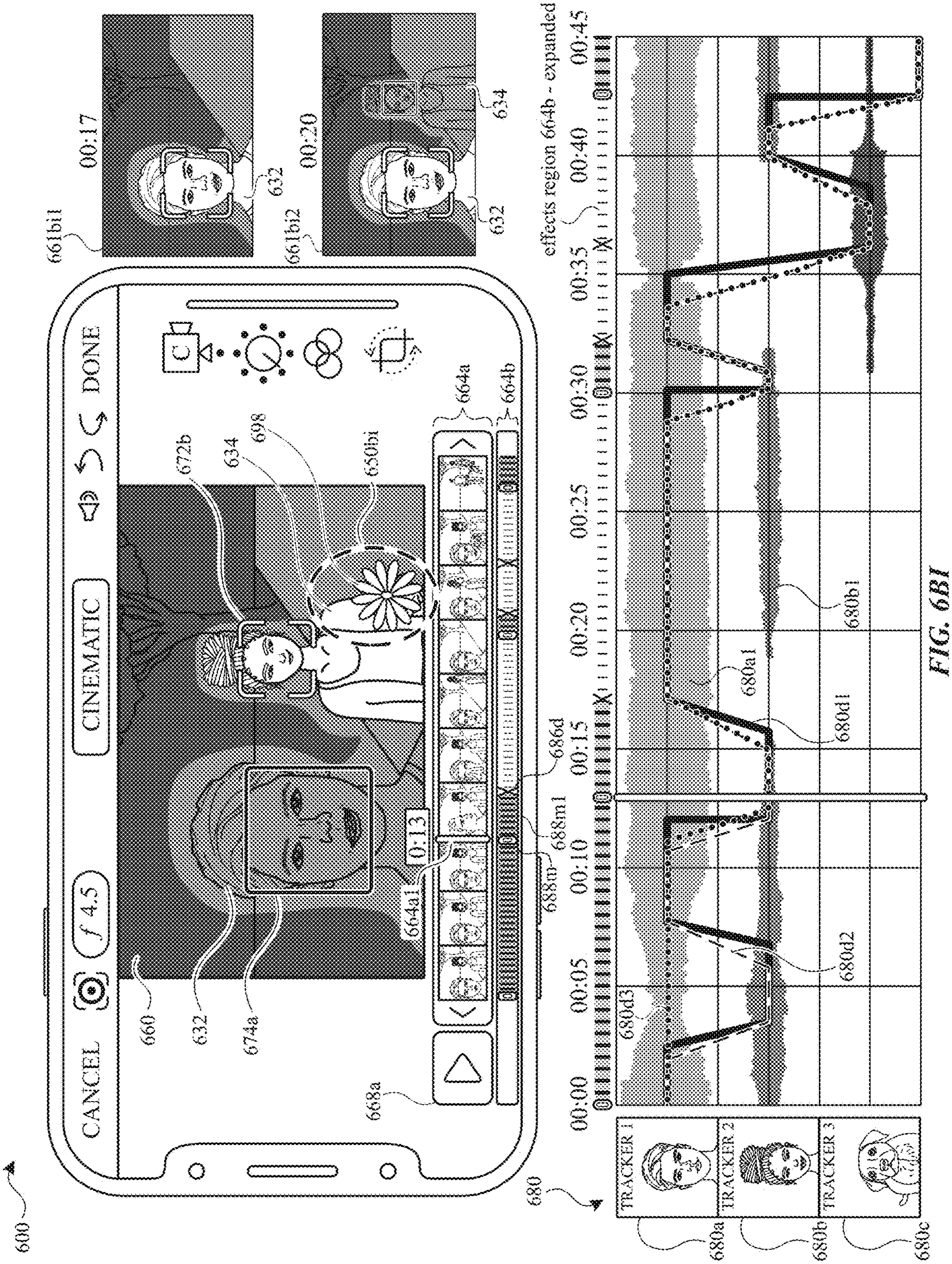
Figure 6B:
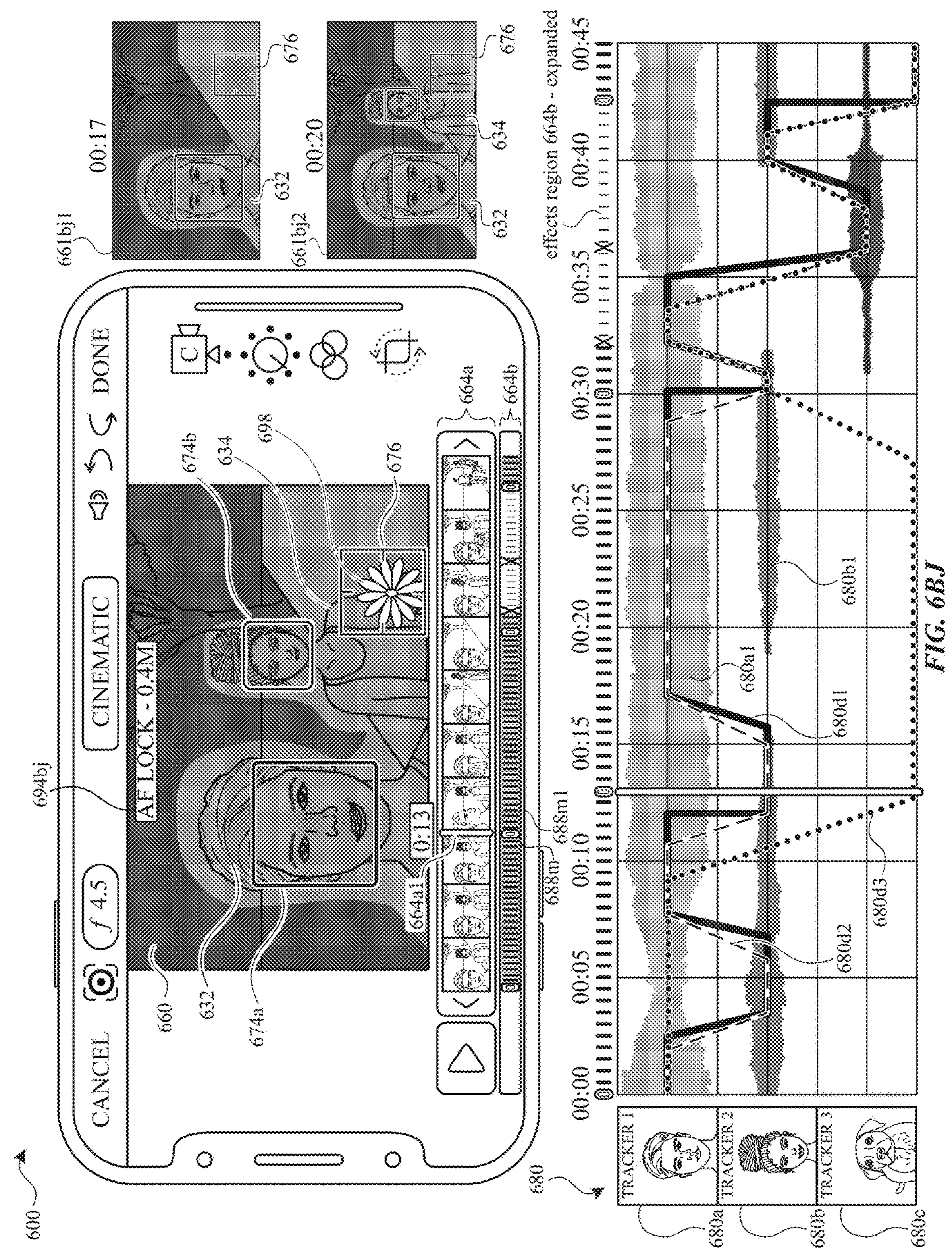

FIGS. 6Z-6AB an exemplary embodiment where computer system 600 changes the synthetic depth-of-field effect in response to a third type of user input (e.g., a user-specified change). As illustrated in FIG. 6Z, live preview 630 is displayed with the synthetic depth-of-field effect that emphasizes Jane 634 relative to the other subjects in the media. At FIG. 6Z, computer system 600 detects press-and-hold input 650*z* on dog 638. In some embodiments, pressand-hold input 650z is detected at another location on live preview 630 (e.g., such as a location that John 632, Jane 634, and dog 638 do not occupy, a location that does not correspond to a location of a subject).

At FIG. 6AA, in response to detecting press-and-hold input 650z on dog 638, computer system 600 changes the synthetic depth-of-field effect to emphasize a focal plane of the field-of-view of the one or more cameras (e.g., because the press-and-hold input is the third type of input that is different the first and second types of inputs). The focal plane that is emphasized includes a location, object, and/or subject that corresponds to the location, object, and/or subject at which press-and-hold input 650z was detected. Because dog 638 is located within the focal plane, dog 638 is emphasized relative to the other subjects in live preview 630 (e.g., as indicated by dog 638 having no shading). In addition, John 632 is displayed with less blur than Jane 634 because John 632 is closer to the focal plane being emphasized than Jane 634 (e.g., as indicated by the shading of live preview 630). In response to detecting press-and-hold input 650z, computer system 600 displays focus indicator 676 at a location that corresponds to the location at which press-and-hold input 650z was detected. Moreover, in response to detecting press-and-hold input 650z, computer system 600 displays secondary subject indicators 674a and 674b around the heads of John 632 and Jane 634, respectively. In FIG. 6AA, focus indicator 676 is displayed to indicated that the focal plane is being emphasized by the synthetic depth-of-field effect. In some embodiments, focus indicator 676 is displayed because dog 638 is in the focal plane and is currently being emphasized. However, in some embodiments, secondary subject indicator 674c is displayed around the head of dog 638.

At FIG. 6AB, live preview 630 shows John 632, Jane 634, and dog 638 moving away from the focal plane that is currently being emphasized (e.g., as indicated by focus indicator 676). As illustrated in FIG. 6AB, John 632, Jane 634, and dog 638 are displayed with a synthetic amount of blur because they are not within the focal plan that is currently being emphasized. In some embodiments, one or more portions of live preview 630 that are within the focal plane are emphasized (e.g., while the focal plane is emphasized in response to detecting press-and-hold input 650z). At FIG. 6AB, computer system 600 detects tap input 650ab on stop control 616.

FIGS. 6AC-6AQ illustrate an exemplary embodiment where the video captured in FIGS. 6B-6AB (e.g., in response to detecting tap input 650b2) is displayed and edited. At FIG. 6AC, in response to detecting tap input 650ab, computer system 600 stops the capture of video and saves the captured video (e.g., that was captured in FIGS. 6B-6AB). As illustrated in FIG. 6C, in response detecting tap input 650ab, computer system 600 updates media collection 624 to display a representation of the captured video (captured in FIGS. 6B-6AB). In some embodiments, computer system 600 detects one or more inputs and navigates to the cinematic video editing user interface shown in FIG. 6AD. In some embodiments, the one or more inputs includes an input directed to media collection 624. In some embodiments, in response to detecting an input on media collection 624, a representation of the captured video is displayed and a control for editing the captured video is displayed. In some embodiments, the one or more inputs includes an input on the control for editing the captured video. In some embodiments, in response to detecting an input directed to the control for editing the captured video, computer system 600 displays the cinematic video editing user interface of FIG. 6AD.

FIG. 6AD illustrates computer system 600 displaying a cinematic video editing user interface that includes control region 662, media representation 660, media navigation element 664, and media editing mode controls 684. Control region 662 is positioned above media representation 660 and includes done control 662a, redo control 662b1, undo control 662b2, cinematic video control 662c, synthetic depth-of-field effect (SDOFE) control 662d, depth indicator control 662e, mute control 662f, and cancel control 662g. In some embodiments, in response to detecting an input directed to done control 662a, computer system 600 saves a representation of media that has been edited while a the cinematic video editing user interface has been displayed. In some embodiments, computer system 600 displays done control 662a as not being selectable when no changes and/or modification has been made to media (e.g., media represented by media representation 660). In some embodiments, computer system 600 displays done control 662a as being selectable when at least one change and/or modification has been made to media using the cinematic video editing user interface. In some embodiments, when done control 662a is not selectable, computer system 600 does not save a representation of media in response to detecting an input directed to done control 662a. In some embodiments, in response to detecting an input directed to redo control 662b1, computer system 600 reverses the most recent undue operation. In some embodiments, in response to detecting an input directed to undo control 662b2, computer system 600 reverses the most recent edit (and, in some embodiments, reserves all edits) that has been made to the media. In some embodiments, in response to detecting an input directed to cinematic video control 662c, computer system 600 performs one or more operations as described below in relation to FIGS. 6AP-6AQ. In some embodiments, SDOFE control 662d indicates that the computer system 600 is displaying and/or is currently configured to display a frame of the media via media representation 660 where a synthetic depth-of-field effect has been manually applied to the frame (e.g., a user-specified change in the synthetic depth-of-field effect as discussed above in relation to FIGS. 6O-6AB). In some embodiments, SDOFE control 662d indicates that the computer system 600 is displaying and/or is currently configured to display a frame of the media via media representation 660 where a synthetic depth-of-field effect has been automatically applied to the frame (e.g., an automatic change in the synthetic depth-of-field effect as discussed above in relation to FIGS. 6B-6N). In some embodiments, in response to detecting an input directed to SDOFE control 662d, computer system 600 ceases to display the media using user-specified changes to the synthetic depth-of-field effect in the media while continuing to display the media using automatic changes to the synthetic depth-of-field effect. In some embodiments, in response to detecting an input directed to SDOFE 662d, computer system 600 modifies media representation 660 such that one or more user-specified changes in the synthetic depth-of-field effect are not applied to one or more frames of the media while maintaining the application of automatic changes in the synthetic depth-of-field effect (e.g., as discussed further below in relation to FIGS. 6AZ-6BC). In some embodiments, in response to detecting an input directed to SDOFE control 662d, computer system 600 modifies media representation 660 such that one or more automatic changes in the synthetic depth-of-field effect are not applied to one or more frames of the media while maintaining user-specified changes to the application of the synthetic depth-of-field effect (e.g., user-specified changes, such as those discussed in relation to FIGS. 6O-6AB). In some embodiments, in response to detecting an input directed to depth indicator control 662*e*, computer system 600 performs one or more operations as discussed above in relation to FIGS. 6AD-6AG. In some embodiments, in response to detecting an input directed to mute control 662*f*, computer system 600 toggles a setting (e.g., on/off) that configures computer system 600 to output sound while playing back media. In some embodiments, in response to detecting an input directed to cancel control 662*g*, computer system 600 displays a confirmation screen for canceling one or more edits that were made to media.

As illustrated in FIG. 6AD, media representation 660 is a representation of a frame of the video captured in FIGS. 6B-6AB ("captured video"). At FIG. 6AD, media representation 660 is the first frame of the video and that was captured before live preview 630 of FIG. 6B was captured (e.g., live preview 630 was captured during the 0:00). Notably, media representation 660 includes primary subject indicator 672*a* around the head of John 632 and secondary subject indicator 674*b* around the head of Jane 634 because media representation 660 is displayed with the synthetic depth-of-filed effect that is applied to emphasize John 632 relative to Jane 634 (e.g., for similar reasons as discussed above in relation to FIG. 6B). Thus, computer system 600 displays subject indicators (e.g., primary subject indicator and/or secondary subject indicator) during the capture of videos (e.g., live preview 630) and while displaying representations of previously captured videos (e.g., media representation 660). As illustrated herein, computer system 600 displays subject indicators while media is not being played back (e.g., media representation 660 of FIG. 6B) and during the playback of media (e.g., media representation 660 of FIG. 6AK discussed below). In some embodiments, computer system 600 does not display subject indicators (and/or any subject indicators) while media is not being played back and during the playback of media (e.g., previously captured media representation 640).

As illustrated in FIG. 6AD, media editing mode controls 684 includes cinematic video mode editing control 684*a*, visual characteristic editing mode control 684*b*, filter editing mode control 684*c*, and aspect ratio editing mode control 684*d*. As illustrated in FIG. 6AD, cinematic video mode editing control 684*a* is displayed as being selected (e.g., as indicated by selection indicator 684*a*1 being displayed below cinematic video mode editing control 684*a* in FIG. 6AD), which indicates that the cinematic video editing user interface is displayed. In some embodiments, in response to detecting an input directed to filter editing mode control 684*c* or aspect ratio editing mode control 684*d*, computer system 600 displays one or more controls that corresponds to the selected control (e.g., control in which the input was directed) for editing one or more frames of the video. In some embodiments, in response to detecting an input directed to filter editing mode control 684*c* or aspect ratio editing mode control 684*d*, one or more user interface objects that are displayed in the cinematic video editing media user interface cease to be displayed.

As illustrated in FIG. 6AD, media navigation element 664 includes scrubber region 664*a*, effects region 664*b*, and playback control 668*a*. Scrubber region 664*a* includes multiple representations of frames in the capture video, playhead 664*a*1, start crop control 664*a*2, end crop control 664*a*3. As illustrated in FIG. 6AD, playhead 664*a*1 is displayed at a location that corresponds to the start of a representation of the initial frame (e.g., frame that is furthest to the left in scrubber region 664*a*) of the captured video. Because playhead 664*a*1 is displayed at the location that corresponds to the start of a representation of the initial frame (e.g., zero seconds of the captured video), media representation 660 of FIG. 6A is a representation of the initial frame of the captured video (e.g., at the time in the video that corresponds to the location of playhead 664*a*1). Start crop control 664*a*2 and end crop control 664*a*3 indicate a portion of the captured video that will be cropped and saved in response to computer system 600 receiving a request to save edited media (e.g., selection of done control 662*a*). In particular, the portion of the video that will be cropped is the portion of the captured video that is between start crop control 664*a*2 and end crop control 664*a*3 (and/or that is from a time in the video that corresponds to the location of start crop control 664*a*2 in scrubber region 664*a* to a time in the captured video that corresponds to the location of end crop control 664*a*3 in scrubber region 664*a*).

As illustrated in FIG. 6AD, effects region 664*b* includes time bar 664*b*1 and change indicators 686*a*, 686*b*, 688*c*, 686*d*, 688*e*, 686*f*, 686*g*, and 688*h* ("change indicators"). Time bar 664*b*1 has multiple tick marks, where each tick mark corresponds to a time in the captured video. The tick marks displayed on time bar 664*b*1 cover at least a portion of the full length of the captured video. At FIG. 6AD, each change indicator is displayed near (e.g., on top of and/or adjacent to) a tick mark on time bar 664*b*1 that corresponds to a time in the captured video where computer system 600 changed the application of synthetic depth-of-field effect being applied to the visual content of the video that was being captured. At FIG. 6AD, effects region 664*b* has been copied above graph 680 ("effects region 664*b*-expanded") to indicate how the change indicators correspond to the changes in the application of synthetic depth-of-field effect being applied to the visual content of the video. In some embodiments, one or more change indicators are displayed at the beginning, end, middle (average) position (e.g., with respect to the tick marks of time bar 664*b*1) relative to when the actual application of the synthetic depth-of-field effect being applied to the visual content was changed (e.g., while the video was being captured and/or after the video has been captured). In some embodiments, each of the change indicators are displayed below a respective representation of a frame in scrubber region 664*a* that corresponds to the time at which the synthetic depth-of-field effect was applied to content representative of the respective frame. In some embodiments, the respective representation of the frame in the scrubber region is displayed with the synthetic depth-of-field effect that was applied during the time when the respective frame in the scrubber region was captured (e.g., such that the frames in the scrubber region include blurring). In some embodiments, the representations of the frames do not include blurring and/or do show the synthetic depth-of-field effect being applied.

Notably, change indicators 686*a*, 686*b*, 686*d*, 686*f*, and 686*g* ("automatic change indicators") represents changes in the application of the synthetic depth-of-field effect were automatically made by computer system 600. Table 1 (Change Indicator Corresponds Table) is provided below to quickly summarize the connection of each of the changes indicators of FIG. 6AD to the captured video.

TABLE 1

| Change Indicator Correspondence Table | | | | |
|---|---|---|---|---|
| Change Indication Identifier | Change Type | Application of Synthetic Depth-of-Field | Time of Final Change Shown in video (excluding transition) | Exemplary Figures |
| 686a | Automatic | Changed to emphasize Jane | 0:04 | FIGS. 6D-6G |
| 686b | Automatic | Changed to emphasize John | 0:07 | FIGS. 6H-6K |
| 688c | User-specified (input 650o) | Changed to emphasize Jane (temporary change) | 0:12 | FIGS. 60-6Q |
| 686d | Automatic | Changed to emphasize John | 0:17 | FIG. 6R |
| 688e | User specified (input 650u) | Changed to emphasize John | 0:30 | FIGS. 6U-6V |
| 686f | Automatic | Changed to emphasize John (while Jane was out of frame) | 0:32 | FIG. 6W |
| 686g | Automatic (talking) | Changed to emphasize dog (while Jane was out of frame) | 0:36 | FIGS. 6W-6X |
| 688h | User-specified (input 650z) | Changed to emphasize focal plane | 0:42 | FIGS. 6Y-6AB |

As illustrated in FIG. 6AD, the automatic change indicators are illustrated using X's while the user-specified change indicators are represented change indicators illustrated using 0's. The automatic change indicators are represented differently than the user-specified change indicators because automatic change indicators have a different visual appearance than the user-specified change indicators. Moreover, each of user-specified change indicators is displayed with a transition indicator (e.g., 688*c*1, 688*e*1, and/or 688*h*1) that extends from the user-specified change to the next change (e.g., change immediately to the right of the user-specified change and/or to the right end of effect region 664*b*). In some embodiments, a transition indicator represents a respective period of time during the media to which a user-specified change is applied the frames of media that occur during the respective period of time. In some embodiments, one or more other techniques (e.g., using different colors, sizes, changes, text, locations, etc.) can be used to distinguish the automatic change indicators from the user-specified change indicators. In some embodiments, the user-specified change indicators are displayed and automatic change indicators are not displayed and/or vice-versa. In some embodiments, computer system 600 includes a selectable option to cease to display automatic change and/or user-specified change indicators while maintaining display of the user-specified change indicators and/or vice-versa (e.g., SDOFE control 662*d*). In some embodiments, user-specified change indicators that occur during the capture of the video are displayed differently (e.g., is displayed with a different visual appearance) from user-specified change indicators that occur after the video has been captured (e.g., such as while editing the video). At FIG. 6AD, computer system 600 detects tap input 650*ad* on depth indicator control 662*e*.

As illustrated in FIG. 6AE, in response to detecting tap input 650*ad*, computer system 600 displays depth control 682 to the left of media editing mode controls 684 (e.g., or above in portrait orientation when computer system 600 is in a portrait orientation). Depth control 682 is a slider that is displayed with depth control value 682*a* (e.g., which was displayed in depth indicator control 662*e* of FIG. 6AD). In some embodiments, in response to detecting tap input 650*ad*, computer system 600 ceases to display scrubber region 664*a* and effects region 664*b* (e.g., scrubber region 664*a* and effects region 664*b* are not displayed while depth control 682 is not displayed and/or are displayed while depth control 682 is displayed). At FIG. 6AE, computer system 600 detects rightward swipe input 650*ae* on depth control 682.

At FIG. 6AF, in response to detecting rightward swipe input 650*ae*, computer system 600 changes depth control value 682*a* from a 4.5 f-stop value to a 1.4 f-stop value, which increases the blurring applied to the portions of the media representation 660 that does not include John 632 (e.g., that are not in focus), who is currently being emphasized (e.g., in focus) by the synthetic depth-of-field effect that has been applied to the frame that corresponds to media representation 660 of FIG. 6AF. At FIG. 6AF, John 632 is not displayed with an additional amount of blur (e.g., is not darker when compared to John 632 of FIG. 6AE) in response to detecting rightward swipe input 650*ae*, but Jane 634 and the background and foreground portions of media representation 660 are displayed with an additional amount of blur (e.g., are darker when compared to how each respective portion was blurred in FIG. 6AE). Accordingly, an adjustment to depth control 682 causes applied synthetic depth-of-field effect to be adjusted. In some embodiments, an adjustment to depth control 682 causes an adjustment to only the representation of the frame of the captured video that is displayed via media representation 660 when the adjustment is performed. In some embodiments, an adjustment to depth control 682 causes an adjustment to the frames (e.g., all of the frames and/or a majority of the frames) of the captured video, irrespective of whether a synthetic depth-of-field effect has been applied (e.g., global change) or not applied to the frames of the capture video. In some embodiments, an adjustment to depth control 682 causes an adjustment to the frames of the captured video that the same application of synthetic depth-of-field effect that has been applied (e.g., frames of the video where John 632 is emphasized by the synthetic depth-of-field effect at FIG. 6AF and/or frames of the video that correspond to and/or occur after a change in the synthetic depth-of-field effect that media representation 660 of FIG. 6AF but before a different change in the synthetic depth-of-field effect (e.g., between zero seconds and three seconds in FIG. 6AF)). At FIG. 6AF, computer system 600 detects tap input 650*af*1 on depth control 682 and/or leftward swipe input 650*af*2 on depth control 682.

As illustrated in FIG. 6AF1, in response to detecting tap input 650*af*1, computer system 600 ceases to display depth control 682 and continues to display media representation 660 with the same amount of blur that it had before tap input 650*af*1 was detected. In addition, computer system 600 updates display of depth indicator control 662*e* to include the value (e.g., 1.4) to which depth control 682 was previously set (e.g., in response to detecting rightward swipe input 650*ae*). In some embodiments, computer system 600 updates display of depth indicator control 662*e* to include the value (e.g., 1.4) that was selected in response to detecting rightward swipe input 650*ae*.

As illustrated in FIG. 6AG, in response to detecting leftward swipe input 650*af*2, computer system 600 changes depth control value 682*a* from the 1.4 f-stop value to the 4.5 f-stop value and decreases the blurring applied the portions of the media representation 660 that are not in focus (e.g., indicated by lighter shading when compared to FIG. 6AF). In some embodiments, the techniques described herein that relate to depth control 682 also work for depth indicator 602*e* (e.g., before/during the capture of media as discussed above in relation to FIG. 6B). At FIG. 6AG, computer system 600 detects tap input 650*ag* on depth indicator control 662*e*. As illustrated in FIG. 6AH, in response to detecting tap input 650*ag*, computer system 600 ceases to display depth control 682 and continues to display media representation 660 with the same amount of blur that it had before tap input 650*ag* was detected. In addition, computer system 600 updates display of depth indicator control 662*e* to include the value (e.g., 4.5) to which depth control 682 was previously set (e.g., in response to detecting leftward swipe input 650*af*2). As illustrated in FIG. 6AH, computer system 600 detects tap input 650*ah* on media playback control 668*a*. In response to detecting tap input 650*ah*, computer system 600 initiates playback of the captured video.

FIGS. 6AI-6AO illustrates exemplary embodiments where user-specified changes are created during the captured video. At FIG. 6AI, computer system 600 is playing back the captured video, which is indicated by pause playback control 668*b* being displaying and media playback control 668*a* of FIG. 6AH ceasing to be displayed. As illustrated in FIG. 6AI, playhead 664*a*1 is displayed at a location that corresponds to a frame that is displayed seven seconds into the duration of the captured video (indicated by elapsed time indicator 664*c* that is displayed above playhead 664*a*1) and media representation 660 has been updated to be the representation of the frame that is displayed seven seconds into the duration of the captured video. In particular, media representation 660 corresponds to (e.g., represents the same frame as) live preview 630 of FIG. 6K, where an automatic change to the synthetic depth-of-field effect was applied to emphasize John 632 relative to Jane 634. Accordingly, media representation 660 of FIG. 6AI includes primary subject indicator 672*a* around the head of John 632 and secondary subject indicator 674*b* around the head of Jane 634 to reflect the synthetic depth-of-field effect that was applied. At FIG. 6AI, computer system 600 detects single tap input 650*ai* on Jane 634 at the seven second mark in the playback of the media.

At FIG. 6AJ, in response to detecting single tap input 650*ai*, computer system 600 changes the synthetic depth-of-field effect to emphasize Jane 634 relative to John 632. As illustrated in FIG. 6AJ, the synthetic depth-of-field effect has been applied to a representation of a frame of the video that is displayed at the eight second mark in the captured video (e.g., as indicated by elapsed time indicator 664*c*). Although FIG. 6AJ illustrates a representation of a frame of the video that occurred after single tap input 650*ai* was detected, computer system 600 changes the synthetic depth-of-field effect has been applied to all of the frames of the edited media between the five second mark (e.g., when single tap input 650*ai* was detected) in the captured video up to the twelve second mark (e.g., when the next changed to the synthetic depth-of-field effect occurs in the captured video, as indicated by user-specified changed representation 688*c*). Edit media playback line 680*d*3 of graph 680 also indicates when and how the synthetic depth-of-field effect has been changed in response to the detection of single tap input 650*ai*. As shown by graph 680, edit media playback line 680*d*3 has decoupled from media playback line 680*d*2 to indicate that computer system 600 has changed the application of the synthetic depth-of-field effect in response to detecting single tap input 650*ai* and when the change occurred. In particular, edit media playback line 680*d*3 transitions to be positioned on activity tracker 680*b* (e.g., "Jane's tracker") between the five second mark and the twelve second mark because computer system 600 replaces automatic change indicator 686*b* of FIG. 6AI with user-specified change indicator 688*i* in response to detecting single tap input 650*ai*.

As illustrated in FIG. 6AJ, in response to detecting single tap input 650*ai*, computer system 600 ceases to display automatic change indicator 686*b* of FIG. 6AI and displays user-specified change indicator 688*i* (e.g., along with transition indicator 688*i*1) at the location in which automatic change indicator 686*b* was displayed. Thus, in some embodiments, a user-specified change during the editing of the media can replace an automatic and/or a user-specified change that occurred during the capture of the media and/or during the editing of the media. In some embodiments, computer system 600 detects a respective input on a representation of a frame on a video that does not correspond to a respective time in the video at which a change in the synthetic depth-of-field effect has occurred and, in response to detecting the respective input, computer system 600 displays an additional user-specified change indicator. In some embodiments, computer system 600 displays the additional user-specified change indicator while continuing to display the other change indicators. In some embodiments, in response to detecting the respective input, computer system 600 changes the application of the synthetic field-of-view (e.g., based on the input) to multiple frames of the video that start from the respective time in the video. In some embodiments, in response to detecting single tap input 650*ai*, computer system 600 displays an animation of transition indicator 688*i*1 gradually filling in from the position of user-specified change indicator 688*i* to the next change indicator (e.g., user-specified change indicator 688*c*) (e.g., gradually increasing in size by expanding from the right edge of the transition indicator). At FIG. 6AJ, computer system 600 detects tap input 650*aj* on pause playback control 668*b*. In response to detecting tap input 650*aj*, computer system 600 pauses the playback of media.

As illustrated in FIG. 6AK, media representation 660 is displayed with a representation of a frame that corresponds to the ten second mark of the video (e.g., as indicated by playhead 664*a*1 and elapsed time indicator 664*c*). In addition, playback control 668*a* is displayed at the location that pause playback control 668*b* was previously displayed in FIG. 6AJ. At FIG. 6AK, media representation 660 is a representation of the same frame in the captured media to which live preview 630 of FIG. 6AL corresponds. Notably, media representation 660 of FIG. 6AK is different from live preview 630 of FIG. 6AL, which is due to media representation 660 being the frame with synthetic depth-of-field effect applied to emphasize Jane 634 relative to John 632 and live preview 630 being the frame with synthetic depth-of-field effect applied to emphasize John 632 relative to Jane 634. When computer system 600 changes the application of depth-of-field effect due to an input detected on a frame of the video (e.g., a representation of a frame of the video), the computer system 600 also changes the application of depth-of-field effect applied to frames of the video that occur after the frame of the video on which the input was received. At FIG. 6AK, computer system 600 detects tap input 650*ak* on user-specified change indicator 688*h*.

As illustrated in FIG. 6AL, in response to detecting tap input 650*ak*, computer system 600 displays playhead 664*a*1 above user-specified change indicator 688*h*. By playhead 664*a*1 above user-specified change indicator 688*h*, playhead 664*a*1 is displayed at a location that corresponds to the time when the user-specified change (e.g., user-specified change represented by user-specified change indicator 688*h*) occurred in the captured video. In response to detecting tap input 650*ak*, computer system 600 updates media representation 660 to be a representation of the frame that displayed when the user-specified change occurred (e.g., as indicated by media representation 660 of FIG. 6AL being live preview 630 of FIG. 6Z with the synthetic depth-of-field effect applied to emphasize the focal plane and/or live preview 630 of FIG. 6AA). At FIG. 6AL, computer system 600 detects double tap input 650*a*1.

As illustrated in FIG. 6AM, in response to detecting double tap input 650*a*1, computer system 600 changes the synthetic depth-of-field effect to emphasize John 632 relative to Jane 634. Moreover, computer system 600 displays primary subject indicator 678*a* around the head of John 632 and secondary subject indicators 674*b*-674*c* around the heads of Jane 634 and dog 638, respectively. Because double tap input 650*a*1 is a double tap input, computer system 600 applies the synthetic depth-of-field effect to emphasize John 632 relative to Jane 634 such that computer system 600 does not automatically change the synthetic depth-of-field effect applied as long as John 632 (e.g., the face of John 632) can be detected in the visual content of the captured video (e.g., using one or more techniques as described above in relation to detecting double tap input 650*u*). Notably, computer system 600 performs (e.g., changes the synthetic depth-of-field effect in the same way, displays the same type of indicators) the same operations in response to detecting the same type of inputs, irrespective of whether computer system 600 is capturing media and/or editing media (e.g., performs the same operations described above in response to detecting single tap inputs 650*o*, 650*ai*, in response to detecting double tap inputs 650*u*, 650*a*1, in response to detecting press-and-hold inputs). As shown by graph 680, edit media playback line 680*d*3 has decoupled from media playback line 680*d*2 after the forty second mark to indicate that computer system 600 has changed the application of the synthetic depth-of-field effect in response to detecting double tap input 650*a*1 and when the change occurred. In particular, edit media playback line has been changed so that edit media playback line 680*d*3 is on activity tracker 680*a* (e.g., "John's Tracker") to represent that John 632 is being emphasized and tracked (and not a selected focal plane) in the edited media after the forty-two second mark (e.g., the frame of the media during which double tap input 650*a*1 was detected). In some embodiments, in response to detecting double tap input 650*a*1, computer system 600 replaces user-specified change indicator 688*h* with a new user-specified change indicator.

FIG. 6AN illustrates computer system 600 displaying media representation 660 that includes a representation of the captured video that occurs after previously captured media representation 660 of FIG. 6AM. As illustrated in FIG. 6AN, computer system 600 has applied the synthetic depth-of-field effect to emphasize John 632 relative to Jane 634 in the representation of media shown by media representation 660 (e.g., media representation 660 is different from live preview 630 of FIG. 6AB for similar reasons as discussed above in relation to FIG. 6AK).

FIGS. 6AO-6AP illustrate an exemplary embodiment where an option is displayed to remove a change in the application of the synthetic depth-of-field effect. At FIG. 6AN, computer system 600 detects tap input 650*an* on user-specified change indicator 688*h*. As illustrated in FIG. 6AO, in response to detecting tap input 650*an*, computer system 600 displays delete option 688*h*2 adjacent to user-specified change indicator 688*h* and deemphasizes (e.g., grey's out) scrubber region 664*a* and effects region 664*b*. Here, computer system 600 deemphasizes (e.g., grey's out) scrubber region 664*a* and effects region 664*b* to indicate that other portions (e.g., that do not include delete option 669*h*1) are unavailable, inactive, and/or not responsive to user input. Computer system 600 makes the other portions unavailable, inactive, and/or not responsive to user input to avoid the possibility of a user causing the computer system to perform unintentional operations as the user attempts to select delete option 688*h*2. In some embodiments, in response to detecting an input at a location that does not correspond to delete option 688*h*2, computer system 600 reemphasis scrubber region 664*a* and effects region 664*b* and/or ceases to display delete option 688*h*2. At FIG. 6AO, computer system 600 detects tap input 650*ao* on delete option 688*h*2. As illustrated in FIG. 6AP, in response to detecting tap input 650*ao*, computer system 600 changes the application of the synthetic depth-of-field effect from emphasizing John 632 relative to Jane 634 and reemphasizes scrubber region 664*a* and effects region 664*b* (e.g., making scrubber region 664*a* and effects region 664*b* active). When computer system 600 changes the application of the synthetic depth-of-field effect from emphasizing John 632 relative to Jane 634, computer system 600 reverts to the application of the synthetic depth-of-field effect that would have applied if the removed user-specified change had not occurred. Thus, at FIG. 6AP, computer system 600 updates media representation 660 to emphasize Jane 634 relative to John 632 because the permanent change in the application of the synthetic depth-of-field effect was applied in response to detecting double tap input 650*u* (e.g., using one or more techniques as described above in relation to FIGS. 6U-6Y). As shown by graph 680, edit media playback line 680*d*3 has been changed to indicate that computer system 600 has changed the application of the synthetic depth-of-field effect in response to detecting tap input 650*an* and when the change occurred. At FIG. 6AP, computer system 600 detects tap input 650*ap*1 on cinematic video control 662*c*.

As illustrated in FIG. 6AQ, in response to detecting tap input 650*ap*1, computer system 600 displays cinematic video control 662*c* in an inactive state and ceases applying a synthetic depth-of-field effect to the captured video (e.g., which is indicated by media representation 660 having no shading) in the media editing user interface. In some embodiments, in response to detecting tap input 650*ap*1, computer system 600 displays the change indicators as not being selectable (e.g., greyed-out) or ceases to display one or more of the change indicators. In some embodiments, in response to detecting an input directed to cinematic video control 662*c* of FIG. 6AQ, computer system 600 reapplies the synthetic depth-of-field effect to the captured video in the media editing user interface. In some embodiments, in response to detecting a tap input on done control 662*a*, computer system 600 saves a version of the captured video that does not have the synthetic depth-of-field effect applied (e.g., a version of the captured video that only has natural blur for one or more and/or all of the of frames in the video). In some embodiments, in response to detecting tap input 650*ap*1, computer system 600 ceases to display effects region 664*b* in region 664*d*. In some embodiments, computer system 600 moves scrubber region 664*a* down, where a portion of scrubber region 664*a* is moved down into region 664*d*. In some embodiments, computer system 600 expands the size of media representation 660 and/or scrubber region 664*a* in response to detecting tap input 650*ap*1. In some embodiments, in response to detecting tap input 650*ap*1, computer system 600 deemphasize effects region 664*b* and/or displays effects region 664*b* as being inactive.

FIG. 6AR illustrates an exemplary embodiment where playhead 664*a*1 is dragged across scrubber region 664*a* such that playhead 664*a*1 snaps to locations that corresponds to the change indicators. As illustrated in FIG. 6AR, rightward swipe input 650*ar* is detected at location 654*a*, computer system 600 displays playhead 664*a*1 is at location 654*a* because a determination was made that location 654*a* is not within a first predetermined distance away from the location that corresponds to user-specified change indicator 688*c* ("change indicator location") (e.g., and a determination is made that playhead 664*a*1 is not displayed at the change indicator location). When rightward swipe input 650*ar* is detected at location 654*b*, computer system 600 displays playhead 664*a*1 at the change location (e.g., above user-specified change indicator 688*c*), which is ahead of location 654*b* because a determination was made that location 654*b* is within a first predetermined distance away from the change indicator location (e.g., and a determination is made that playhead 664*a*1 is not displayed at the change indicator location). As illustrated in FIG. 6AR, when playhead 664*a*1 is displayed at the change location, computer system issues output 656 (e.g., a haptic output (e.g., a vibration), sound). When rightward swipe input 650*ar* is detected at location 654*c*, computer system 600 continues to display playhead 664*a*1 at the change location because a determination was made that location 654*c* is not within a second predetermined distance away from the change indicator location (e.g., and a determination is made that playhead 664*a*1 is displayed at the change indicator location). When rightward swipe input 650*ar* is detected at location 654*d*, computer system 600 displays playhead 664*a*1 at location 654*d* because a determination was made that location 654*d* is within a second predetermined distance away from the change indicator location (e.g., and a determination is made that playhead 664*a*1 is displayed at the change indicator location). Thus, in some embodiments, the playhead snaps to a location associated with the change indicator when the playhead is close to a change indicator. Moreover, in some embodiments, the playhead sticks at a location associated with the change indicator until the playhead is a certain distance away from the change indicator. In some embodiments, the first predetermined distance and/or the second predetermined distance is a non-zero distance and/or a distance that is greater than a certain number of tick marks (e.g., 2-5 tick marks) away from the change location.

FIGS. 6AS-6AU illustrate an exemplary embodiment where computer system 600 is transitioned from being configured to operate in the cinematic video camera mode to being configured to operate in a portrait camera mode. As illustrated in FIG. 6AS, computer system 600 is configured to operate in the cinematic video camera mode (e.g., indicated by cinematic video mode control 620*e* being in the active state) and, while being configured to operate in the cinematic video camera mode, computer system 600 displays the camera user interface using one or more techniques as described above in relation to FIG. 6B. In particular, as illustrated in FIG. 6AS, computer system 600 is applying the synthetic depth-of-field effect to visual content being captured by the one or more cameras of computer system 600 to emphasize John 632 relative to Jane 634 (e.g., as indicated by the shading of live preview 630 in FIG. 6AS). As illustrated in FIG. 6AS, computer system 600 displays primary subject indicator 672*a* around the head of John 632 and secondary subject indicator 674*b* around the head of Jane 634. At FIG. 6AS, computer system 600 detects leftward swipe input 650*as* on camera mode controls 620.

As illustrated in FIG. 6AT, in response to detecting leftward swipe input 650*as*, computer system 600 moves camera mode controls 620 to the left so that portrait mode control 620*b* is displayed in the middle of the camera user interface. At FIG. 6AT, computer system 600 displays portrait mode control 620*b* as being selected (e.g., bolds) and ceases to display cinematic video mode control 620*e* (e.g., which indicates that cinematic video mode control 620*e* as being not selected). Moreover, in response to detecting leftward swipe input 650*as*, computer system 600 is transitioned from being configured to operate in the cinematic video camera mode to a portrait camera mode. As illustrated in FIG. 6AT, in response to detecting leftward swipe input 650*as*, computer system 600 compacts live preview 630, where live preview 630 of FIG. 6AT is smaller and has a different aspect ratio than live preview 630 of FIG. 6AS. In addition to compacting live preview 630, computer system 600 is updated to include lighting effect control 618. Lighting effect control 618 indicates that a natural light effect is being applied to live preview 630 (e.g., as indicated by natural light control 618*a* and natural light indicator 618*a*1 being displayed). In some embodiments, when the natural light effect is applied to live preview 630, a bokeh effect and/or lighting effect is used/applied when capturing media. In some embodiments, adjustments to lighting effect control 618 are also reflected in live preview 630.

As illustrated in FIG. 6AT, computer system 600 does not display any subject indicators (e.g., primary subject indicator 672*a*, secondary subject indicator 674*b*) to indicate that a respective subject is/is not being emphasized. While operating in the portrait camera mode, computer system 600 is not applying a synthetic depth-of-field effect to emphasize another subject relative to another subject. However, computer system 600 is applying a bokeh effect and/or lighting effect based on the natural light control 618*a* being selected (e.g., illustrated by the shading of live preview 630 of FIG. 6AT) while operating in the portrait camera mode. At FIG. 6AT, computer system 600 detects press-and-hold input 650*at* on live preview 630.

As illustrated in FIG. 6AU, in response to detecting press-and-hold input 650*at*, computer system 600 displays focus and exposure control 696, which includes exposure control indicator 696*a*1. While displaying focus and exposure control 696, computer system 600 also displays focus setting indicator 694*c* ("AE/AF LOCK") in indicator region 602, which indicates that computer system 600 will not allow an auto-exposure setting and an auto-focus setting to change automatically. At FIG. 6AU, in response to detecting press-and-hold input 650*at*, computer system 600 blurs portions of the display such that computer system 600 focuses on a location that corresponds to the location in which press-and-hold input 650*at* was received and blurs other portions of the region. In some embodiments, in response to detecting a swipe input on live preview 630, computer system 600 adjusts an exposure setting based on the magnitude and direction of the swipe input.

In response to detecting a press-and-hold input, computer system 600 is configured to focus on a particular location in the FOV, irrespective of whether computer system 600 is operating in the cinematic camera mode (e.g., as discussed above in relation to the detection of press-and-hold input 650*z* in FIGS. 6Z-6AA) or the portrait camera mode (e.g., as discussed above in relation to leftward swipe input 650*as* in FIGS. 6AS-6AU). In addition, the visual appearance of focus and exposure control 696 of FIG. 6AU looks similar to focus indicator 676 of FIG. 6AA. However, focus and exposure control 696 includes exposure control indicator 696*a*1 while focus indicator 676 does not. In addition, exposure control indicator 696*a*1 of FIG. 6AU is also different than focus control indicator 694*b*. Exposure control indicator 696*a*1 indicates that computer system 600 has locked a focus setting (e.g., bokeh effect being applied in FIG. 6AU) and an exposure setting while focus control indicator 694*b* only indicates that computer system 600 has locked a focus setting (e.g., the synthetic depth-of-field effect being applied in FIG. 6AA). Thus, while computer system 600 is operating in the cinematic video camera mode, computer system 600 displays a control that indicates that computer system 600 is configured to focus on a particular location and that does allow computer system 600 to adjust and/or lock an exposure setting used to capture media (e.g., as discussed above in relation to FIGS. 6Z-6AA). Moreover, while computer system 600 is operating in the portrait camera mode, computer system 600 displays a control that indicates that computer system 600 is configured to focus on a particular location and allows computer system 600 to adjust and/or lock an exposure setting used to capture media (e.g., as discussed above in relation to FIGS. 6AS-6AU).

FIGS. 6AV-6AY illustrate an exemplary embodiment where an automatic change to apply a synthetic depth-of-field effect is removed while editing the media. Looking back at FIG. 6AP, computer system 600 detects one or more inputs that include tap input 650*ap*2 on cancel control 662*g* (e.g., as an alternative to detecting tap input 650*ap*1 as discussed above in relation to FIG. 6AP). Turning to FIG. 6AV, in response to detecting the one or more inputs that include tap input 650*ap*2, computer system 600 discards the previous changes made to the media (e.g., changes to the application of one or more synthetic depth-of-field effects discussed above in relation to FIGS. 6AD-6AP). In other words, computer system 600 resets the media to the condition that the media was in before it was edited in FIGS. 6AD-6AP and/or after it was captured. Thus, at FIG. 6AV, computer system 600 redisplays the cinematic video editing user interface of FIG. 6AD that includes, among other things, change indicators 686*a*, 686*b*, 688*c*, 686*d*, 688*e*, 686*f*, 686*g*, and 688*h* (the automatic and user-specified synthetic depth-of-field changes discussed above in relation to FIGS. 6A-6AC). At FIG. 6AV, computer system 600 detects tap input 650*av* on automatic change indicator 686*b*.

As illustrated in FIG. 6AW, in response to detecting tap input 650*av*, computer system 600 updates media representation 660 to a representation of the frame of the media that occurs at the seven second mark in the media (e.g., the frame of the media that corresponds to the occurrence of the automatic change to the synthetic depth-of-field indicated by automatic change indicator 686*b*). As shown by media representation 660 of FIG. 6AW, computer system 600 has automatically applied a synthetic depth-of-field effect to emphasize John 632 relative to Jane 634 at the seven second mark in the media. At FIG. 6AW, computer system 600 detects tap input 650*aw* (or a press-and-hold input) on automatic change indicator 686*b*. As illustrated in FIG. 6AX, in response to detecting tap input 650*aw*, computer system 600 displays delete option 686*b*2 adjacent to automatic change indicator 686*b* and deemphasizes (e.g., grey's out) scrubber region 664*a* and effects region 664*b* (e.g., using one or more similar techniques as discussed above in relation to FIGS. 6AN-6AO). At FIG. 6AX, computer system 600 detects tap input 650*ax* on delete option 686*b*2.

As illustrated in FIG. 6AY, in response to detecting tap input 650*ax*, computer system 600 removes automatic change indicator 686*b* of FIG. 6AX and the automatic change to the synthetic depth-of-field effect that was applied at the seven second mark in the media. As a part of removing the automatic change to the synthetic depth-of-field effect, computer system 600 updates media representation 660 to show Jane 634 being emphasized relative to John 632 at the seven second mark in the media. Here, Jane 634 is being emphasized relative to John 632 because the automatic depth-of-field effect that corresponds to automatic change indicator 686*a* (e.g., which was most recent synthetic depth-of-field effect that was applied before the seven second mark) (e.g., as discussed in relation to FIGS. 6D-6G) is now being applied to the frame of the media that occurs at the seven second mark in the media. Moreover, it should also be understood that the automatic synthetic depth-of-field effect that corresponds to automatic change indicator 686*a* applies to the other frames of the media that were captured between the time (e.g., 4 seconds) that corresponds to automatic change indicator 686*a* and the time (e.g., 12 seconds) that corresponds to user-specified change indicator 688*c*. Thus, when automatic change indicator 686*b* is removed, computer system 600 applies the synthetic depth-of-field effect that corresponds to automatic change indicator 686*a* to the frames of the media that previously had the synthetic depth-of-field effect that corresponds to automatic change indicator 686*b* applied. As shown by graph 680 of FIG. 6AY, edit media playback line 680*d*3 has decoupled from media playback line 680*d*2 between the six second mark and the ten second mark to indicate the change to the synthetic depth-of-field effect that occurred in response to detecting tap input 650*ax* (e.g., edit media playback line 680*d*3 is on activity tracker 680*b*, "Jane's Tracker", between the six second mark and the ten second mark at FIG. 6AY, which is different from the position of edit media playback line 680*d*3 during the corresponding timeframe in FIG. 6AX).

FIGS. 6AZ-6BC illustrate exemplary embodiments where computer system 600 detects one or more inputs on SDOFE control 662*d*. At FIG. 6AY, computer system 600 detects tap input 650*ay* on user-specified change indicator 688*h*. As illustrated in FIG. 6AZ, computer system 600 moves playhead 664*a*1 to right from the seven second mark to the forty-two second mark and updates media representation 660 to show the frame of the media that corresponds to the forty-two second mark (e.g., the frame that corresponds to user-specified change indicator 688*h*). As illustrated in FIG. 6AZ, media representation 660 has a synthetic depth-of-field effect applied to emphasize a focal plane (e.g., as discussed above in relation to FIGS. 6Z-6AB). At FIG. 6AZ, because dog 638 is located within the focal plane (e.g., indicated by focus indicator 676), dog 638 is emphasized relative to the other subjects in media representation 660 (e.g., as indicated by dog 638 having no shading in media representation 660). In addition, John 632 is displayed with less blur than Jane 634 because John 632 is closer to the focal plane being emphasized than Jane 634 (e.g., as indicated by the shading of media representation 660). At FIG. 6AZ, computer system 600 detects tap input 650*az* on SDOFE control 662*d*.

As illustrated in FIG. 6BA, in response to detecting tap input 650*az*, computer system 600 ceases to apply the changes in depth-of-field effect that corresponds to the user-specified changes (e.g., user-specified change indicators 688*c*, 688*e*, and 688*h* of FIG. 6AZ) in the edited media. Moreover, in response to detecting tap input 650*az*, computer system 600 ceases to display user-specified change indicators 688*c*, 688*e*, and 688*h* and transition indicators 688*c*1, 688*e*1, and 688*h*1 because computer system 600 has been configured to not apply previously applied user-specified synthetic depth-of-field effect changes (e.g., in response to detecting tap input 650*az*). Notably, computer system 600 removes user-specified change indicators 688*c* and 688*e* without replacing them with another change indicator. However, at the forty-two second mark, computer system 600 replaces user-specified change indicator 688*h* of FIG. 6AZ with automatic change indicator 686*ba* of FIG. 6BA. Therefore, computer system 600 can insert an automatic change to the synthetic depth-of-field effect upon removing a user-specified change to the synthetic depth-of-field effect based on a determination that an automatic change to the synthetic depth-of-field effect should be made (e.g., using one or more techniques discussed below in relation to FIG. 12). Here, this respective determination was made (e.g., the determination than an automatic change to the synthetic depth-of-field effect should be made) because activity level 680*a*1 ("John's activity level") was increased at the forty second mark relative to activity level 680*b*1 (Jane's activity level") and activity level 680*c*1 (the dog's activity level). Thus, as shown by media representation 660, computer system 600 automatically applies a synthetic depth-of-field effect to emphasize John 632 relative to Jane 634 and dog 638 at the forty-two second mark in the video based on this respective determination and because the user-specified change is no longer being applied at the forty-two second mark. In some embodiments, this respective determination is made while capturing the media (e.g., and/or before the user-specified change was removed) (e.g., as discussed below in relation to FIG. 12). In some embodiments, this respective determination is saved during the capture of media so that it can be available to be applied (or reapplied) once a user-specified change is removed (e.g., as discussed below in relation to FIG. 12). In some embodiments, a user-specified change can override a saved automatic change to the synthetic depth-of-field effect (e.g., as discussed below in relation to FIG. 12). In some embodiments, this respective determination is made after the user-specified change was removed. At FIG. 6BA, computer system 600 detects leftward swipe gesture 650*ba* on playhead 664*a*1.

As illustrated in FIG. 6BB, in response to detecting leftward swipe gesture 650*ba*, computer system 600 moves playhead 664*a*1 to the left from the location that corresponds to forty-two seconds in the media to a location that corresponds to thirty-four seconds in the media. As illustrated in FIG. 6BB, in response to detecting leftward swipe gesture 650*ba*, computer system 600 updates media representation 660 to show the frame of the media that corresponds to thirty-four seconds in the media. At the thirty-four second mark, computer system 600 has a synthetic depth-of-effect applied that emphasizes John 632 relative to wagon 628 (e.g., as discussed above in relation to FIG. 6W). In some embodiments, in response to detecting input 650*bb*1 on SDOFE control 662*d*, computer system 600 reapplies the user-specified depth-of-field changes to the representation of the media and redisplays user-specified change indicators 688*c*, 688*e*, and 688*h* and transition indicators 688*c*1, 688*e*1, and 688*h*1 (e.g., the edited media and the cinematic video editing user interface goes back to the state shown in FIG. 6AZ and/or before tap input 650*az* was detected). At FIG. 6BB, computer system 600 detects input 650*bb*2 on wagon 628.

As illustrated in FIG. 6BC, in response to detecting input 650*bb*2 and based on a determination that input 650*bb*2 is a press-and-hold input, computer system 600 changes the synthetic depth-of-field effect to emphasize the focal plane that is at the location of press-and-hold input 650*bb*2 (starting from the forty-two second mark in the media). Moreover, computer system 600 displays user-specified change indicator 688*j* and transition indicator 688*j* 1 at a location in effects region 664*b* that corresponds to the forty-two second mark in the media. As illustrated in FIG. 6BC, in response to detecting input 650*bb*2 and based on a determination that input 650*bb*2 is a press-and-hold input, computer system 600 also displays focus setting indicator 694*bc* ("AF LOCK—5M"), which includes an indication (e.g., "5M") of a distance between the computer system 600 and the currently selected focal plane (e.g., focal plane selected by input 650*bb*2). After applying the synthetic depth-of-field effect that emphasizes the focal plane at FIG. 6BC, media representation 660 shows wagon 628 being emphasized relative to John 632 and Jane 634. Here, wagon 628 is emphasized relative to John 632 and Jane 634 in media representation 660 because wagon 628 is located in the emphasized focal plane. Notably, computer system 600 ceases to display automatic change indicators 686*g* and 686*ba* of FIG. 6BB because a determination was made that the automatic change to the synthetic depth-of-field effect that corresponds to automatic change indicator 686*g* was not needed. Looking back at FIG. 6W, the automatic change to the synthetic depth-of-field effect that corresponds to automatic change indicator 686*g* was made because a determination was made that Jane 634 (e.g., a currently emphasized subject) was outside of the field-of-view of one or more cameras of computer system 600. However, Jane 634 is no longer being emphasized immediately before the time that corresponds to automatic change indicator 686*g* by a synthetic depth-of-field effect. Accordingly, at FIG. 6BC, because Jane 634 is no longer being emphasized, computer system 600 removes the automatic change to the synthetic depth-of-field effect that was made because a currently emphasized subject (e.g., Jane 634) could not be detected within the field-of-view of one or more cameras of computer system 600. Computer system 600 removes automatic change indicator 686*ba* for similar reasons (e.g., because the user specified that a focal plane is emphasized, the computer system determines that there is no need to implement a change to emphasize a subject in the media via the application of a synthetic depth-of-field effect). Thus, as illustrated in FIGS. 6BB-6BC, computer system 600 can remove changes to the synthetic depth-of-field effect in response to a user-specified change to the synthetic depth-of-field effect during the editing of captured media. At FIG. 6BC, media representation 661*bc*1 (e.g., frame of the edited media at the thirty-six second mark) and media representation 661*bc*2 (e.g., frame of the edited media at the forty-two second mark) are provided to show that the user-specified change to the synthetic depth-of-field effect that emphasizes the focal plane has been applied to frames of the media that occur after the time at which input 650*bb*2 was detected in the video (e.g., and that the changes to the synthetic depth-of-field effect that correspond to automatic change indicators 686*g* and 686*ba* of FIG. 6BB are no longer applied) (e.g., also shown by edit media playback line 680*d*3). As shown in media representations 661*bc*1 and 661*bc*2, subjects (e.g., John 632, Jane 634, and/or dog 638) that are not in the focal plane (e.g., indicated by focus indicator 676) are not emphasized.

As illustrated in FIG. 6BC, in response to input 650*bb*2, computer system 600 transitions SDOFE control 662*d* from being in an inactive state (e.g., in FIG. 6BB) to being in an active state (in FIG. 6BC). Thus, at FIG. 6BC, computer system 600 is configured to apply user-specified changes to the synthetic depth-of-field effect. However, in FIG. 6BC, user-specified change indicators 688*c*, 688*e*, and 688*h* of FIG. 6AZ are not applied because a user-specified change to the synthetic depth-of-field effect was added (e.g., the user-specified change that was added in response to detecting input 650*bb*2) while SDOFE control 662*d* was in the inactive state (and/or while the computer system is not configured to apply user-specified changes to the synthetic depth-of-field effect). In other words, at FIG. 6BC, the user-specified change added in response to detecting input 650*bb*2 overrides the previous user-specified changes to the synthetic depth-of-field effect (e.g., changes that were applied before the computer system was not configured to apply user-specified changes to the synthetic depth-of-field effect). In some embodiments, instead of overriding the previous user-specified changes, computer system 600 displays user-specified change indicators 688*c*, 688*e*, and 688*h* along with user-specified change indicator 688*j* and applies changes to the synthetic depth-of-field effect that correspond to user-specified change indicators 688*c*, 688*e*, 688*h*, and 688*j*.

FIG. 6BC1 illustrates an alternative situation to the situation described, in some embodiments, in FIG. 6BC. Where in FIG. 6BC, computer system 600 detected an input corresponding to selection of an object for which the computer system determined that the computer system did not have sufficient data to track the object through at least a predetermined portion of the video (e.g., through multiple frames in the video) (e.g., response to input 650*bb*2 being a tap input at FIGS. 6BB-6BC), in FIG. 6BC1, computer system 600 detects an input corresponding to selection of an object for which the device determined that the device does have sufficient data to track the object through at least the predetermined portion of the video. Thus, at FIG. 6BC1, in response to detecting input 650*bb*2 and based on a determination that input 650*bb*2 is a tap input, a determination is made that a user has requested to focus on wagon 628, which has not been tracked by computer system 600 (e.g., there is no focus indicator (e.g., like 674*a* and/or 674*b*) displayed around wagon 628 in FIG. 6BB), and for which, there is sufficient data to track the object through at least the predetermined portion of the video. Because the determination is made that wagon 628 has not been tracked by computer system 600 and a user has requested to focus on wagon 628, computer system 600 displays the user interface of FIG. 6BC1, which includes tracking progress indicator 694*bc*1, tracking focus indicator 674*d*, cancel control 688*n*3, temporary user-specific change indicator 688*n*, and temporary transition indicator 688*n*1 to indicate that the request is being processed. As illustrated in FIG. 6BC1, in response to detecting input 650*bb*2 and based on a determination that input 650*bb*2 is a tap input, computer system 600 also deemphasizes scrubber region 664*a* and effects region 664*b* to indicate that the request to focus on wagon 628 is being processed. At FIG. 6BC1, computer system 600 processes the request based whether there is enough information to track and focus on wagon 628 based on the visual content in the captured media. In some embodiments, based on a determination that is made that there is enough information to track and focus on wagon 628, computer system 600 applies a synthetic depth-of-field effect to emphasize wagon 628 relative to other subjects in the media (e.g., using one or more similar techniques as discussed above in relation to computer system 600 detecting a single tap input and/or a double tap input and/or as illustrated in FIG. 6BC2) and a new tracker (e.g., Tracker 4 in FIG. 6BC2) is shown to indicate that the wagon is available to be emphasized and tracked through a portion of the media (e.g., applying a synthetic depth-of-field effect that emphasizes the wagon over other portions of the media). In some embodiments, media representation 661*bc*1 that shows wagon 628 being emphasized is displayed at the thirty-five second time mark when determination that is made that there is enough information to track and focus on wagon 628 (and/or media representation 661*bc*2 is displayed at the thirty-six second time mark to show that no subjects are being emphasized when wagon 628 leaves the FOV for a brief period of time, as discussed above in relation to FIG. 6R1). In some embodiments, based on a determination that is made that there is not enough information to track and focus on wagon 628, computer system 600 applies a synthetic depth-of-field effect to emphasize a focal plane at the location of input 650*bb*2 (e.g., using one or more similar techniques as discussed above in relation to FIG. 6BC). In some embodiments, in response to detecting an input on cancel control 688*n*3, computer system 600 cancels the request to focus on wagon 628 and redisplays the user interface of FIG. 6BB. In some embodiments, in response to detecting an input on cancel control 688*n*3, computer system 600 applies a synthetic depth-of-field effect to emphasize a focal plane at the location of input 650*bb*2 (e.g., using one or more similar techniques as discussed above in relation to FIG. 6BC) and/or displays the user interface of FIG. 6BC. In some embodiments, computer system 600 displays one or more objects (e.g., tracking progress indicator 694*bc*1, temporary user-specific change indicator 688*n*, temporary transition indicator 688*n*1, and/or media representation 660) displayed in FIG. 6BC1 pulsating for a predetermined period of time and/or a portion (one or more corners) of the one or more objects (e.g., while processing the request to focus on, apply a synthetic depth-of-field effect to emphasize wagon 628, and/or to indicate that computer system 600 is focusing on wagon 628). In some embodiments, the size of temporary transition indicator 688*n*1 changes over a predetermined period of time (e.g., extends and/or moves along effects region 664*b* to the next change indicator) while computer system 600 indicates that the request is being processed.

FIGS. 6BD-6BE illustrate an exemplary embodiment where a user-specified change to apply a synthetic depth-of-field effect is added to the edited media, which leads to one or more other synthetic depth-of-field effect changes being removed from the edited media. Looking back at FIG. 6BC, computer system 600 detects one or more inputs that include tap input 650*bc* on cancel control 662*g*. As illustrated in FIG. 6BD, in response to detecting the one or more inputs that include tap input 650*bc*, computer system 600 discards the previous changes (e.g., changes made in FIGS. 6AV-6B made to the media), using one or more similar techniques as discussed above in relation to detecting tap input 650*ap*2. At FIG. 6BD, in response to detecting the one or more inputs that include tap input 650*bc*, computer system 600 redisplays the cinematic video editing user interface of FIG. 6AD that includes, among other things, change indicators 686*a*, 686*b*, 688*c*, 686*d*, 688*e*, 686*f*, 686*g*, and 688*h* (the automatic and user-specified synthetic depth-of-field changes discussed above in relation to FIGS. 6A-6AC). As illustrated in FIG. 6BD, computer system 600 is displaying primary subject indicator 672*a* around the head of John 632 and secondary subject indicator 674*b* around the head of Jane 634 in media representation 660 at a time that corresponds to zero seconds in the media (e.g., shown by the position of playhead 664*a*1). As discussed above (e.g., in relation to FIG. 6S), primary subject indicator 672*a* being shown around the head of John 632 indicates that computer system 600 is applying a temporary change to the synthetic depth-of-field effect to emphasize John 632 relative to Jane 634, which is represented by the shading in media representation 660. At FIG. 6BD, computer system 600 detects single tap input 650*bd* on John 632.

As illustrated in FIG. 6BE, in response to detecting single tap input 650*bd*, computer system 600 applies a respective non-temporary synthetic depth-of-field effect to emphasize John 632 relative to Jane 634 such that computer system 600 does not automatically change the synthetic depth-of-field effect applied as long as John 632 (e.g., the face of John 632) can be detected in the visual content of the captured video (e.g., using one or more techniques as described above in relation to detecting double tap input 650*u* and FIGS. 6R1 and 6N-6Z). Computer system 600 applies the respective non-temporary synthetic depth-of-field effect to emphasize John 632 relative to Jane 634 in response to detecting single tap input 650*bd* because John 632 was already being emphasized when single tap input 650*bd* was detected. Thus, computer system 600 can apply a non-temporary change to emphasized a subject based on a double tap input (e.g., the second type of input, as discussed above in relation to FIGS. 6S and 6U) and/or in response to detecting a single tap input (e.g., the first type of input, as discussed above in relation to FIG. 6N-6S) on a subject that is already being emphasized (and/or in focus) by a synthetic depth-of-field effect in the media.

As illustrated by media representation 660 in FIG. 6BE, in response to detecting single tap input 650*bd*, computer system 600 replaces primary subject indicator 672*a* with primary subject indicator 678*a* to indicate that the change to the synthetic depth-of-field effect is not a temporary change to the synthetic depth-of-field effect. Because computer system 600 has applied the respective non-temporary synthetic depth-of-field effect to emphasize John 632 relative to Jane 634, computer system 600 inserts user-specified change indicator 688*k*, at a location on effects region 664*b* that corresponds to the zero second mark, and transition indicator 688*k*1. In addition, computer system 600 removes automatic transition indicators 686*a* and 686*b* of FIG. 6BD because a respective determination is made that the automatic changes to the synthetic depth-of-field effect that correspond to automatic transition indicators 686*a* and 686*b* are not needed. Here, the respective determination is made because John 632 can be detected in the visual content of the captured media between zero seconds and ten seconds, so a change in synthetic depth-of-field to emphasize another subject (e.g., other than John 632) in the media is not needed. Notably, computer system 600 maintains user-specified change indicator 688*c* because computer system 600 determines that the user-specified change indicator 688*c* continues to be needed (e.g., user desires to emphasize Jane 634 at the twelve second mark although user wants to emphasize John 632 at the zero second mark). As shown by graph 680 of FIG. 6BE, edit playback line 680*d*3 has decoupled from media playback line 680*d*2 around the two second mark to indicate that computer system 600 has changed the application of the synthetic depth-of-field effect in response to detecting single tap input 650*bd* and when the changed occurred. In particular, edit playback line 680*d*3 has been changed so that edit media playback line 680*d*3 stays on activity tracker 680*a* (e.g., "John's Tracker") to represent that John 632 is being emphasized and tracked (and not Jane) between the zero second mark and the ten second mark in the edited media. Moreover, at FIG. 6BE, media representation 661*be*1 is displayed to show that a synthetic depth-of-field effect to emphasize John 632 relative to Jane 634 has been applied (e.g., instead of emphasizing Jane 634 relative to John 632 as described above in relation to FIGS. 6O-6Q at the seven second mark) (e.g., the respective non-temporary change to the synthetic depth-of-field effect applies to frames after transition).

FIGS. 6BF-6BG illustrate an exemplary embodiment where a user-specified change to apply a synthetic depth-of-field effect is removed from edited media, which leads to one or more other more synthetic depth-of-field effect changes being removed from the edited media. At FIG. 6BE, computer system 600 detects press-and-hold input 650*be* on user-specified change indicator 688*c*. As illustrated in FIG. 6BF, in response to detecting press-and-hold input 650*be*, computer system 600 displays delete option 688*c*2 adjacent to user-specified change indicator 688*c* and deemphasizes (e.g., greys out) scrubber region 664*a* and effects region 664*b* (e.g., using one or more similar techniques as discussed above in relation to FIGS. 6AN-6AO). At FIG. 6BF, computer system 600 detects tap input 650*bf* on delete option 688*c*2.

As illustrated in FIG. 6BG, in response to detecting tap input 650*bf*, computer system 600, removes user-specified change indicator 688*c* and the synthetic depth-of-field effect change that corresponds to user-specified change indicator 688*c*. Thus, at FIG. 6BG, media representation 660 has been updated so that John 632 is emphasized relative to Jane 634 (e.g., as opposed to Jane 634 being emphasized in FIG. 6BF before tap input 650*bf* was detected). As illustrated in FIG. 6BG, the respective non-temporary change to the synthetic depth-of-field effect (discussed above in relation to FIG. 6BE) is applied at the twelve second mark in the media (e.g., as indicated by primary subject indicator 678*a* and secondary subject indicator 674*b*). As illustrated in FIG. 6BG, in addition to removing the change to the synthetic depth-of-field effect that corresponds to user-specified change indicator 688*c* of FIG. 6BF, computer system 600 also removes automatic change indicator 686*d* of FIG. 6BF and ceases to apply the changes to the synthetic depth-of-field effect that correspond to automatic change indicator 686*d* (e.g., a change to emphasize John) of FIG. 6BF. At FIG. 6BG, computer system 600 removes automatic change indicator 686*d* because a determination is made that the automatic change to the synthetic depth-of-field effect is not needed (e.g., because John 632 would already be emphasized at the seventeen second mark after the change to the synthetic depth-of-field effect, a change to emphasize Jane 634, that corresponds to user-specified change indicator 688*c* is removed) (e.g., using similar techniques as discussed above in relation to FIG. 6BC). As shown by graph 680 of FIG. 6BG, edit playback line 680*d*3 has decoupled from media playback line 680*d*2 around the twelve second mark to indicate that computer system 600 has changed the application of the synthetic depth-of-field effect in response to detecting tap input 650*bf* and when the change occurred. In particular, edit media playback line 680*d*3 has been changed so that edit media playback line 680*d*3 stays on activity tracker 680*a* (e.g., "John's Tracker") to represent that John 632 is being emphasized and tracked (and not Jane) between the twelve second mark and the seventeen second mark in the edited media. Moreover, at FIG. 6BG, media representation 661*bg*1 and media representation 661*bg*2 are shown to indicate that synthetic depth-of-field effect to emphasize John 632 relative to Jane 634 (e.g., instead of emphasizing Jane 634 relative to John as described above in relation to FIGS. 6O-6Q at the seventeen second mark) (e.g., the respective non-temporary change to the synthetic depth-of-field effect applies to frames after transition). In some embodiments, in response to detecting tap input 650*bf*, computer system 600 removes user-specified change indicator 688*e* because a determination is made that the user-specified change is not needed due to John 632 already being emphasized (e.g., by the synthetic depth-of-field effect that corresponds to user-specified change indicator 688*k*). In some embodiments, upon removing automatic change indicator 686*d* of FIG. 6BF, computer system 600 displays an animation of transition indicator 688*k*1 expanding to the right, towards the position of user-specified change indicator 688*e*.

FIGS. 6BH-6BI illustrate an exemplary embodiment where a user-specified change to apply a synthetic depth-of-field effect is added to the edited media, which leads to one or more other one or more synthetic depth-of-field effect changes being added to the edited media. At FIG. 6BG, computer system 600 detects swipe input 650*bg* on playhead 664*a*1. As illustrated in FIG. 6BH, in response to detecting swipe input 650*bg*, computer system 600 displays playhead 664*a*1 at a location on scrubber region 664*a* that corresponds to the thirteen second mark in the captured media. In response to detecting swipe input 650*bg*, computer system 600 updates media representation 660 to be a representation of the frame that displayed at the thirteen second mark in the media. At FIG. 6BH, media representation 660 shows that a synthetic depth-of-field effect has been applied to the frame at the thirteen second mark to emphasize John 632 relative to Jane 634 (e.g., as discussed above in relation to user-specified change indicator 688*k*). At FIG. 6BH, computer system 600 detects single tap input 650*bh* on Jane 634.

As illustrated in FIG. 6BI, in response to detecting single tap input 650*bh*, computer system 600 updates media representation 660 and applies a respective temporary synthetic depth-of-field effect to emphasize Jane 634 relative to John 632 such that computer system 600 automatically changes the synthetic depth-of-field effect applied when Jane 634 (e.g., the face of Jane 634) can no longer be detected in the visual content of the captured video (e.g., using one or more techniques as described above in relation to FIG. 6R and FIG. 6R1). In response to detecting single tap input 650*bh*, computer system 600 displays primary subject indicator 672*b* around the head of Jane 634 and secondary subject indicator 674*a* around the head of John 632, where primary subject indicator 672*b* indicates that Jane 634 is temporarily being emphasized in the media (e.g., as discussed above in relation to FIG. 6R). As illustrated in FIG. 6B1, in response to detecting single tap input 650*bh*, computer system 600 displays user-specified change indicator 688*m* at and transition indicator 688*m*1 that starts from the thirteen second mark in the media. Along with adding user-specified change indicator 688*m*, computer system 600 also adds automatic change indicator 686*d* back at seventeen seconds because a determination is made that an automatic change to the synthetic depth-of-field effect is needed. Here, computer system 600 adds automatic change indicator 686*d* and applies a synthetic depth-of-field effect at seventeen seconds in the media because Jane 634 cannot be detected in the visual content of the captured video around the seventeen second mark in the media (e.g., using one or more similar techniques as discussed above in relation to FIG. 6R). Thus, in some embodiments, when changing and/or adding a user-specified change to a synthetic depth-of-field effect, one or more other change indicators can be added and/or one or more other changes to the synthetic depth-of-field effect can be applied (e.g., at a time after the user-specified change to a synthetic depth-of-field effect). Media representations 661*bi*1 and 661*bi*2 are provided to show that John 632 is being emphasized relative to Jane 634 after the automatic change to the synthetic depth-of-field effect is applied that corresponds to automatic change indicator 686*d*. As discussed above in relation to FIGS. 6R1 and 6Y, at seven seconds, Jane 634 is being tracked although she is outside of the captured visual content that corresponds live preview 630 of FIG. 6R1 and/or 6Y (and/or media representation 660 of FIG. 6BI). However, as discussed in relation to FIG. 6R1, Jane 634 will only continue to be tracked by computer system 600 for a predetermined period of time (e.g., 0.5-5 seconds). In some embodiments, based on a determination that Jane 634 is not within the captured visual content that corresponds live preview 630 of FIG. 6R1 (and/or media representation 660 of FIG. 6BI), computer system 600 will stop tracking Jane 634.

FIGS. 6BI-6BJ illustrate an exemplary embodiment where a user-specified change to apply a synesthetic depth-of-field effect is changed, which leads to one or more synthetic depth-of-field effect changes being removed from the edited media. At FIG. 6BI, computer system 600 detects press-and-hold input 650*bi* on flower 698. As illustrated in FIG. 6BJ, in response to press-and-hold input 650*bi*, computer system 600 changes the synthetic depth-of-field effect to emphasize the focal plane that is at the location of press-and-hold input 650*bi* (starting from the thirteen second mark in the media). As illustrated in FIG. 6BJ, in response to detecting press-and-hold input 650*bi*, computer system 600 also displays focus setting indicator 694*bj* ("AF LOCK—0.4M"), which includes an indication (e.g., "0.4M") of a distance (e.g., 0.4 meters) between the computer system 600 (e.g., one or more cameras of computer system 600) and the currently selected focal plane (e.g., focal plane selected by press-and-hold input 650*bi*). After applying the synthetic depth-of-field effect that emphasizes the focal plane at FIG. 6BJ, computer system 600 displays, via media representation 660, flower 698 being emphasized relative to John 632 and Jane 634. Notably, computer system 600 ceases to display automatic change indicator 686*d* of FIG. 6BI because a determination was made that the automatic change to the synthetic depth-of-field effect that corresponds to automatic change indicator 686*d* was not needed (e.g., using one or more techniques as discussed above to cease to display automatic change indicator 686*g* of FIGS. 6BB-6BC).

At FIG. 6BJ, media representation 661*bj* 1 (e.g., frame of the edited media at the seventeen second mark) and media representation 661*bj*2 (e.g., frame of the edited media at the twenty second mark) are provided to show that the user-specified change to the synthetic depth-of-field effect that emphasizes the focal plane has been applied to frames of the media that occur after the time at which press-and-hold input 650*bi* was detected in the video (e.g., and that the changes to the synthetic depth-of-field effect that correspond to automatic change indicator 686*d* of FIG. 6BI is no longer applied) (e.g., also shown by edit media playback line 680*d*3). As shown in media representations 661*bj* 1 and 661*bj*2, subjects (e.g., John 632 and Jane 634) that are not in the focal plane (e.g., indicated by focus indicator 676) are not emphasized. Notably, the selected focal plane in FIG. 6BJ is a different distance from the computer system than the focal plane that was selected in FIG. 6BC (e.g., 0.4M in FIG. 6BJ versus 5M in FIG. 6BC). In some embodiments, computer system 600 displays an animation of the transition of the synthetic depth-of-field of a focal plane being applied. In some embodiments, the animation is longer when the focal plane is a further distance from computer system 600 (e.g., animation of transition is longer between FIGS. 6BB and FIG. 6BC than the animation of transition in FIGS. 6BI-6BJ). In some embodiments, the animation is longer when a focal plane that corresponds to an emphasized subject is further away from a focal plane that is selected (e.g., in response to a press-and-hold input). In some embodiments, the animation is shorter when a focal plane that corresponds to an emphasized subject is closer to a focal plane that is selected (e.g., in response to a press-and-hold input).

FIG. 7 is a flow diagram illustrating an exemplary method for altering visual media using a computer system in accordance with some embodiments. Method 700 is performed at a computer system (e.g., 100, 300, 500, and/or 600) (e.g., a smartphone, a desktop computer, a laptop, and/or a tablet) that is in communication with one or more cameras (e.g., one or more cameras (e.g., dual cameras, triple camera, quad cameras, etc.) on the same side or different sides of the computer system (e.g., a front camera, a back camera) and/or one or more input devices (e.g., a touch-sensitive surface and/or). In some embodiments, the computer system is in communication with a display generation component (e.g., a display controller, a touch-sensitive display system). Some operations in method 700 are, optionally, combined, the orders of some operations are, optionally, changed, and some operations are, optionally, omitted.

As described below, method 700 provides an intuitive way for altering visual media. The method reduces the cognitive burden on a user for altering visual media, thereby creating a more efficient human-machine interface. For battery-operated computing devices, enabling a user to alter visual media faster and more efficiently conserves power and increases the time between battery charges.

The computer system (e.g., 600) detects (702), via the one or more input devices, a request (e.g., 650*b*2) (e.g., a tap gesture on a selectable user interface object for capturing media (e.g., 610)) (and/or, in some embodiments, a non-tap gesture (e.g., a press-and-hold gesture, a swipe gesture) directed to a selectable user interface object for capturing media) to capture a video (e.g., video media) representative of a field-of-view of the one or more cameras.

In response to detecting the request (e.g., 650*b*2) to capture the video, the computer system (e.g., 600) captures (704) (or initiates capture of) (e.g., via the one or more cameras) the video over a first capture duration (e.g., 602*d*). The video includes a plurality of frames (e.g., as indicated by live preview 630 of FIGS. 6C-6AB) (e.g., sequence of frames (e.g., images)) that are captured over the first capture duration. The plurality of frames represent (e.g., include, show) a first subject (e.g., 632, 634, 638) in the field-of-view of the one or more cameras (e.g., people, animals, other subjects (e.g., other subjects with faces), objects) and a second subject (e.g., 632, 634, 638) in the field-of-view of the one or more cameras. In the plurality of frames, the first subject (e.g., 634) is moving relative to the field-of-view of the one or more cameras over the first capture duration.

The computer system applies (706) (e.g., during the capture of the video (e.g., during the capture of the video over a second capture duration that is longer than the first capture duration) and/or before ceasing capture of the video (e.g., in response to detecting an gesture on a selectable user interface object for stopping the capture of the media), after the capture of the video and/or after ceasing capture of the video), to the plurality of frames of the video (e.g., 630, 640, and/or 660), a synthetic (e.g., computer-generated and/or computer-generated and applied after capture of a frame of the video), depth-of-field effect that alters visual information (e.g., visual content) captured by the one or more cameras to emphasize (and/or that emphasizes) (e.g., visually emphasize) the first subject (e.g., 632, 634, 638) in the plurality of frames of the video relative to the second subject (e.g., 632, 634, 638) (e.g., people, animals, other subjects (e.g., other subjects with faces), objects) in the plurality of frames of the video, where the synthetic depth-of-field effect changes (e.g., a magnitude and/or location of the synthetic depth of field effect changes) over time (e.g., over the first capture duration) as the first subject (e.g., 634) moves within the field-of-view of the one or more cameras (and the first subject continues to be emphasized relative to the second subject in each of the plurality of frames). In some embodiments, the synthetic depth of field effect changes through a plurality of intermediate states. In some embodiments, the synthetic (e.g., computer-generated), depth-of-field effect adjusts the captured video such that it appears that the one or more frames of the video have been captured with a camera that has a different aperture (e.g., physical aperture, effective aperture) and/or focal length (e.g., physical focal length, effective focal length) than the aperture and/or focal length of the one or more cameras (e.g., the one or more cameras that actually captured the video). In some embodiments, applying the synthetic depth-of-field effect to emphasize the first subject in video relative to a second subject in the plurality of frames of the video includes applying an amount of blur (or synthetic bokeh) to the second subject that is greater than the amount of blur (or synthetic bokeh) applied to the first subject. In some embodiments, when playing back the captured media, the second subject is appears to be blurred more than the first subject. In some embodiments, while capturing the video (and/or before ceasing capture of the video), the computer system displays (e.g., consecutively displays) the plurality of frames. In some embodiments, the changes in the synthetic depth of field effect over time are representative of changes in video recorded that capture the movement of the first subject over time. In some embodiments, the synthetic depth-of-field effect is applied in response to detecting the request to capture the video. Applying, to the plurality of frames of the video, a synthetic depth-of-field effect that alters visual information captured by the one or more cameras to emphasize the first subject in the plurality of frames of the video relative to the second subject in the plurality of frames of the video, where the synthetic depth-of-field effect changes in the plurality of frames of the video, where the synthetic depth-of-field effect changes as the first subject moves within the field-of-view of the one or more cameras (e.g., in response to a gesture) reduces the number of inputs that a user need to provider to apply a synthetic depth-of-field effect. Reducing the number of operations enhances the operability of the system and makes the user-system interface more efficient (e.g., by helping the user to provide proper inputs and reducing user mistakes when operating/ interacting with the system) which, additionally, reduces power usage and improves battery life of the system by enabling the user to use the system more quickly and efficiently.

In some embodiments, applying, to the plurality of frames of the video, the synthetic depth-of-field effect includes displaying a first set of frames (e.g., at a first time, during a first duration of time of the video, a first continuous duration of time in the video, a first part of the video) of the plurality of frames (e.g., of the plurality of frames of the video) (e.g., as indicated by live preview 630 of FIGS. 6C-6AB). In some embodiments, displaying the first set of frames (e.g., as indicated by live preview 630 of FIGS. 6C-6AB) includes (and/or modifying the first set of frames of the video to include) displaying the second subject (e.g., 634) at a first distance from (e.g., from a viewpoint (e.g., a position a frame of the video that corresponds to or is the position of the one or more cameras that captured the visual information of the frame) of the one or more cameras) the one or more cameras and with a first amount of blur (e.g., an amount of fading, appearing fuzziness, appearing out of focus). In some embodiments, the first amount of blur is based on the second subject being at the first distance from the one or more cameras. In some embodiments, the second subject is a respective distance from the first subject in the first set of frames. In some embodiments, the first set of frames includes one frame. In some embodiments, the first set of frames includes multiple frames in a continuous segment of the video, where the continuous segment of the video spans across the first set of frames. In some embodiments, applying, to the plurality of frames of the video (e.g., as indicated by live preview 630 of FIGS. 6C-6AB), the synthetic depth-of-field effect (e.g., as indicated by live preview 630 of FIGS. 6C-6AB) includes displaying a second set of frames (e.g., after displaying the first set of frames, at a second time different than the first time) of the plurality of frames. In some embodiments, displaying the second set of frames includes (e.g., as indicated by live preview 630 of FIGS. 6C-6AB) (and/or modifying the second set of frames of the video to include) displaying the second subject (e.g., 634) at a second distance from (e.g., the viewpoint of) the one or more cameras and with a second amount of blur (e.g., an amount of fading, appearing fuzziness, appearing out of focus) that is different from the first amount of blur. In some embodiments, the first distance is different from the second distance. In some embodiments, the second amount of blur is based on the second subject being at the second distance from the one or more cameras. In some embodiments, in accordance with a determination that the second subject is at a first respective distance from the one or more cameras in a first set of frames of the video, the computer system displays the second subject with the first blur; and in accordance with a determination that the second subject is at a second respective distance from the one or more cameras in the first set of frames of the video, where the second respective distance from the one or more cameras in the first set of frames is different from the first respective distance from the one or more cameras in the first set of frames, the computer system displays the second subject with the second amount of blur that is different from the first amount of blur. In some embodiments, in accordance with a determination that the second subject is at the first respective distance from the one or more cameras in a second set of frames of the video, the computer system displays the second subject with the first amount of blur. In some embodiments, the second subject is a respective distance from the first subject in the second set of frames that is greater than the respective distance between the first subject and the subject in the first set of frames. In some embodiments, the second set of frames includes one frame. In some embodiments, the second set of frames includes multiple frames in a continuous segment of the video, where the continuous segment of the video spans across the second set of frames. In some embodiments, the continuous segment of the video that corresponds to the first set of frames is different from the continuous segment of the video that corresponds to the second set of frames. Displaying frames with different amounts of blur as a part applying, to the plurality of frames of the video, the synthetic depth-of-field effect the user with feedback how a synthetic depth-of-field effect that is applied to the video. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, when (e.g., after and/or while the synthetic depth-of-field effect is applied) applying the synthetic depth-of-field effect, the first subject (e.g., 632, 634, 638) is displayed (e.g., in one or more frames of the plurality of frames of the video) with a third amount (e.g., greater than or equal to zero) of blur and the second subject (e.g., 632, 634, 638) is displayed (e.g., in the one or more frames) with a fourth amount (e.g., a non-zero amount) of blur that is greater than the third amount of blur (e.g., as described above in relation to FIGS. 6C-6AB). Displaying a first subject and a second subject with different amount of blur allows the user with feedback concerning which subject is being emphasized by the synthetic depth-of-field effect. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, applying, to the plurality of frames of the video (e.g., as indicated by live preview 630 of FIGS. 6C-6AB), the synthetic depth-of-field effect includes applying a fifth amount of blur to a first portion (e.g., as indicated by live preview 630 of FIGS. 6C-6AB) (e.g., an area of the scene and/or an object, an element, a subject in the scene) of a third frame (e.g., first frame, second frame, and/or another frame of the video) of the plurality of frames. In some embodiments, applying, to the plurality of frames of the video (e.g., as indicated by live preview 630 of FIGS. 6C-6AB), the synthetic depth-of-field effect includes applying a sixth amount of blur that is greater than the fifth amount of blur to a second portion (e.g., an area of the scene and/or an object, an element, a subject in the scene) of the third frame of the plurality of frames (e.g., as indicated by live preview 630 of FIGS. 6C-6AB). In some embodiments, the second portion of the third frame of the video is different from the first portion of the third frame of the video. In some embodiments, as a part of applying, to the plurality of frames of the video, the synthetic depth-of-field effect, the computer system displays the third frame of the video that includes the first portion (e.g., an area of the scene and/or an object, an element, a subject in the scene) that is displayed with the fifth amount (e.g., a non-zero amount) of blur and a second portion (e.g., an area of the scene and/or an object, an element, a subject in the scene) that is displayed with the sixth amount (e.g., a non-zero amount). Displaying different amounts of blur to different portions of a frame allows the user with feedback concerning how the synthetic depth-of-field effect is being applied to the frame. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, applying, to the plurality of frames of the video (e.g., as indicated by live preview 630 of FIGS. 6C-6AB), the synthetic depth-of-field effect includes blurring a portion of a fourth frame (e.g., first frame, second frame, third frame, and/or another frame of the video; a frame that includes the first subject and/or the second subject) of the plurality of frames (e.g., as indicated by live preview 630 of FIGS. 6C-6AB). In some embodiments, the portion of the fourth frame does not include a subject (e.g., first subject, second subject) (e.g., a representation of a subject) that is in the field-of-view of the one or more cameras (e.g., as described above in relation to FIG. 6AB). In some embodiments, as a part of applying, to the plurality of frames of the video, the synthetic depth-of-field effect, the computer system displays a frame (e.g., first frame, second frame, third frame, and/or another frame of the video) of the video that includes a portion of the video that does not include a subject, where the portion of the video that does not include a subject is blurred. Blurring a portion of the frame that does not include a subject allows the user with feedback concerning how the synthetic depth-of-field effect is being applied to the frame. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, applying, to the plurality of frames of the video (e.g., as indicated by live preview 630 of FIGS. 6C-6AB), the synthetic depth-of-field effect includes blurring a foreground of a fifth frame of the plurality of frames relative to the first subject (e.g., portion of scene shown in frame that is closet/nearest in the field-of-view to the one or more cameras and/or in front of the main subject(s) (e.g., the first subject) and/or object(s) in the field-of-view of the one or more cameras) and a background (e.g., portion of scene shown in frame that is furthest in the field-of-view to the one or more cameras and/or behind the main subject(s) (e.g., the first subject) and/or object(s) in the field-of-view of the one or more cameras) of the fifth frame relative to the subject (e.g., first frame, second frame, third frame, fourth frame, and/or another frame of the video; a frame that includes the first subject) (e.g., as indicated by live preview 630 of FIGS. 6C-6AB). In some embodiments, the foreground is blurred differently than the background. Blurring the background and the foreground of the frame allows the user with feedback concerning how the synthetic depth-of-field effect is being applied to the frame. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the video includes a second plurality of frames (e.g., as indicated by live preview 630 of FIGS. 6C-6AB) (e.g., that are different from the plurality of frames (e.g., a first plurality of frames),) that are captured over a second capture duration. In some embodiments, the second plurality of frames represent the first subject (e.g., 632, 634, 638) in the field-of-view of the one or more cameras and a third subject (e.g., 632, 634, 638) (e.g., the second subject or another subject that is different from the first subject and the second subject) (or an object) in the field-of-view of the one or more cameras. In some embodiments, the second plurality of frames are captured and/or displayed after the first plurality of frames. In some embodiments, the second capture duration is different from the first capture duration. In some embodiments, the plurality of frames represent the first subject, the second subject, and the third subject. In some embodiments, the second subject is the same subject as the third subject. In some embodiments, the third subject is different from the first subject. In some embodiments, in the second plurality of frames, the first subject and the third subject are moving relative to the field-of-view of the one or more cameras over the first capture duration. In some embodiments, while capturing the video over the first capture duration (e.g., and when (e.g., after/while) applying, to the plurality of frames of the video (e.g., a first plurality of frames of the video), that alters the visual information captured by the one or more cameras to emphasize the first subject in the plurality of frames relative to the second subject in the plurality of frames of the video), the computer system (600) detects an indication (e.g., as described above in relation to FIGS. 6D-6G, FIGS. 6H-6K, inputs 650*u*, 650*z*, and/or 650*z*) (e.g., a user input selecting the third subject) that the third subject should be emphasized in the second plurality of frames relative to the first subject (e.g., 632, 634, 638) in the second plurality of frames (e.g., a user input selecting the third subject (e.g., a tap on the third subject or an affordance corresponding to the third subject); a system-generated indication). In some embodiments, in response to detecting the indication (e.g., as described above in relation to FIGS. 6D-6G, FIGS. 6H-6K, inputs 650*u*, 650*z*, and/or 650*z*), the computer system applies, to the second plurality of frames of the video (e.g., as indicated by live preview 630), a second synthetic depth-of-field effect that alters the visual information captured by the one or more cameras to emphasize the third subject (e.g., 632, 634, 638) in the second plurality of frames of the video relative to the first subject in the second plurality of frames of the video. In some embodiments, the synthetic depth-of-field effect that alters the visual information captured by the one or more cameras to emphasize the third subject in the plurality of frames of the video relative to the first subject in the plurality of frames of the video changes over time as the third subject moves within the field-of-view of the one or more cameras. Applying, to the second plurality of frames of the video, a second synthetic depth-of-field effect that alters the visual information captured by the one or more cameras to emphasize the third subject in the second plurality of frames of the video relative to the first subject in the second plurality of frames of the video in response to detecting the indication allows the system/user to control how a synthetic depth-of-field effect is applied to a video when prescribed conditions are met. Performing an optimized operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the computer system automatically (e.g., without intervening user input and/or a user gesture, not in response to detecting an input/gesture (e.g., an input/gesture corresponding to a request to emphasize the third subject relative to the first subject (e.g., for example as described below in relation to method 800) via the one or more input devices)) detects (e.g., generates) the indication when the third subject in the second plurality of frames satisfies a set of automatic selection criteria (e.g., as described in relation to FIGS. 6D-6G, FIGS. 6H-6K). In some embodiments, the set of automatic selection criteria is based on properties of the scene detected by the one or more cameras rather than being based on an input/gesture detected by the device via one or more input devices (e.g., an input/gesture corresponding to a request to emphasize the third subject relative to the first subject (e.g., for example as described below in relation to method 800) via the one or more input devices)). Applying, to the second plurality of frames of the video, the second synthetic depth-of-field effect automatically when prescribed condition are met allows the system to control how a synthetic depth-of-field effect is applied to a video without user input. Performing an optimized operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the set of automatic selection criteria includes a criterion that is satisfied based on a motion of the third subject (e.g., 632, 634, 638) (e.g., or any other respective subject) in the field-of-view of the one or more cameras (e.g., as described above in relation to FIGS. 6H-6K) (e.g., when the motion (e.g., movement (e.g., speed, translation) of a respective subject (e.g., third subject) in the field-of-view of the one or more cameras is greater than the motion of other subjects (e.g., first subject) in the field-of-view of the one or more cameras). In some embodiments, the motion of the third subject is based on the prominence of the motion of the third subject (e.g., prominence of the motion (e.g., motion compared to a motion threshold (e.g., a non-zero threshold)) (e.g., the absolute (e.g., actual motion) of the third subject and/or the motion of the third subject as compared to the motion of other subjects in the field-of-view of the one or more cameras). Applying, to the second plurality of frames of the video, the second synthetic depth-of-field effect automatically based on motion of a subject allows the system to control how a synthetic depth-of-field effect is applied to a video, without user input, based on the motion of a subject. Performing an optimized operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the set of automatic selection criteria includes a criterion that is satisfied when (e.g., in accordance with) a determination is made that a face of the third subject (e.g., 632, 634, 638) (e.g., or any other respective subject) is detected in the field-of-view of the one or more cameras (e.g., as described above in relation to FIGS. 6D-6G, FIGS. 6H-6K, FIGS. 6O-6Q, FIGS. 6U-6V). In some embodiments, the determination is made that the face of a respective subject is detected using a facial recognition algorithm. In some embodiments, the set of automatic selection criterion includes a criterion that is satisfied when a determination is made that a face of the third subject is detected in the field-of-view of the one or more cameras for a predetermined period of time (e.g., 0.1-5 seconds) and a face of the first subject is not detected in the field-of-view of the one or more cameras for another predetermined period of time (e.g., 0.1-5 seconds). In some embodiments, a determination that a face of the third subject is detected in the field-of-view of the one or more cameras is based on the prominence of the face (e.g., the absolute prominence (e.g., size, visibility (e.g., clearness, less obscured)) of the face and/or the prominence of the face relative to other faces in the field-of-view of the one or more cameras). Applying, to the second plurality of frames of the video, the second synthetic depth-of-field effect automatically based on face detection allows the system to control how a synthetic depth-of-field effect is applied to a video, without user input, based on detection of a subject's face. Performing an optimized operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the set of automatic selection criteria includes a criterion that is satisfied based on audio corresponding to (e.g., associated with, coming from, detected to be coming from) the third subject (e.g., 632, 634, 638) (e.g., as described above in relation to FIGS. 6D-6G, FIGS. 6H-6K) (e.g., or any other respective subject) (e.g., when the audio (e.g., movement (e.g., speed, translation) of a respective subject (e.g., third subject) in the field-of-view of the one or more cameras is greater than the audio of other subjects (e.g., first subject) in the field-of-view of the one or more cameras). In Some Embodiments, the criterion is satisfied based on audio corresponding the third subject being above an audio threshold (e.g., a non-zero threshold) (e.g., an absolute/actual prominence (e.g., audio level) of the audio of the third subject and/or audio of third subject relative to audio of other subjects (e.g., in the field-of-view of the one or more cameras)). Applying, to the second plurality of frames of the video, the second synthetic depth-of-field effect automatically based on audio corresponding to the subject allows the system to control how a synthetic depth-of-field effect is applied to a video, without user input, based on the subject's audio. Performing an optimized operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the set of automatic selection criteria include a criterion that is satisfied based on a distance between the third subject (e.g., 632, 634, 638) (e.g., or any other respective subject) in one or more of the second plurality of the frames and the one or more cameras (e.g., as described above in relation to FIGS. 6D-6G, FIGS. 6H-6K) (e.g., a viewpoint (e.g., a position a frame of the video that corresponds to or is the position of the one or more cameras that captured the visual information of the frame) of the one or more cameras). In some embodiments, the set of automatic selection criterion include a criterion that is satisfied when a respective subject (e.g., third subject (is closer to the one or more cameras than another subject (e.g., first subject) in the second plurality of frames (and/or closer for a more than a predetermined period of time (e.g., 0.1-5 seconds))). In some embodiments, the criterion that is satisfied based on a distance between the third subject in one or more of the second plurality of the frames and the one or more cameras is satisfied based on the prominence (e.g., measure of distance) of the distance of the third subject being above a distance threshold (e.g., a non-zero threshold) (e.g., an absolute/actual distance) of the audio of the third subject and/or the distance between third subject and the one or more cameras relative to one or more distances of other subjects (e.g., in the field-of-view of the one or more cameras)) between the one or more cameras. Applying, to the second plurality of frames of the video, the second synthetic depth-of-field effect automatically based on distance between the subject and a camera allows the system to control how a synthetic depth-of-field effect is applied to a video, without user input, based on the distance between the subject and a camera. Performing an optimized operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the set of automatic selection criteria include a criterion that is satisfied based on a gaze (e.g., a detected gaze) of the third subject (e.g., 632, 634, 638) (e.g., or any other respective subject) (e.g., as described above in relation to FIGS. 6D-6G). In some embodiments, the set of automatic selection criteria include a criterion that is satisfied when it is determined that the third subject is looking at the one or more cameras that captured the third subject (e.g., in the second plurality of frames). In some embodiments, the set of automatic selection criteria include a criterion that is not satisfied when it is determined that the third subject is determined to be looking away from the one or more cameras and/or looking away from the one or more cameras more than another subject is looking away from the one or more cameras. In some embodiments, the criterion that is satisfied based on the gaze of the third subject is determined based on absolute gaze of the third subject and/or the gaze of the third subject relative to one or more other subjects in the field-of-view of the one or more cameras (e.g., when the third subject is determined to be looking more towards the representation of the field-of-view of the one or more cameras than another subject in the representation of the field-of-view of the one or more cameras). Applying, to the second plurality of frames of the video, the second synthetic depth-of-field effect based on the detected gaze of the subject allows the system to control how a synthetic depth-of-field effect is applied to a video, without user input, based on the detected gaze of the subject. Performing an optimized operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the set of automatic selection criteria include a criterion that is satisfied based on a position of an appendage (e.g., hand, feet, fingers, and/or toes) of the third subject (e.g., as discussed above in relation to FIGS. 6A-6AC and below in relation to FIG. 12). Applying, to the second plurality of frames of the video, the second synthetic depth-of-field effect based on a position of an appendage of the subject allows the system to control how a synthetic depth-of-field effect is applied to a video, without user input, based on a position of an appendage, which performs an operation when a set of conditions has been met without requiring further user input and reduces the number of inputs needed to perform an operation.

In some embodiments, the set of automatic selection criteria include a criterion that is satisfied based on one or more changes in a feature (e.g., a feature of or associated with a user) detected in the captured video (e.g., one or more features selected from the group consisting of a face, a gaze, audio, distance, and/or position of an appendage) (e.g., over a predetermined period of time and/or above/below some non-zero threshold level of change over a predetermined period of time) (e.g., as discussed above in relation to FIGS. 6A-6AC and below in relation to FIG. 12). Applying, to the second plurality of frames of the video, the second synthetic depth-of-field effect based on one or more changes in a feature allows the system to control how a synthetic depth-of-field effect is applied to a video, without user input, based on one or more changes in a feature. Performing an optimized operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while capturing the video over the first capture duration, the computer system (e.g., 600) detects, via the one or more input devices, a first gesture (e.g., 650*o*, 650*u*, 650*z*). In some embodiments, in response to detecting the first gesture, the computer system modifies the set of automatic selection criteria (e.g., as described above in relation to FIGS. 6O-6Q, FIGS. 6U-6V). In some embodiments, the set of automatic selection criteria includes a first set of automatic selection criteria before the computer system detects an indication that a respective subject should be emphasized by detecting a first gesture (e.g., a tap gesture, a press-and-hold gesture, a swipe gesture) (e.g., as further described in relation to method 800 and 900 and FIGS. 6O-6Y) via the one or more input devices. In some embodiments, in response to detecting the first gesture, the computer system modifies the set of automatic selection criteria to include a second set of automatic selection criteria that is different from the first set of automatic selection criteria. In some embodiments, the modified set of automatic selection criteria does not include the first set of automatic selection criteria (and/or one or more criteria in the first set of automatic selection criteria). In some embodiments, when the modified set of automatic selection criteria is used to detect an indication that a respective subject (or object) should be emphasized, the computer system is less likely to change (or the number of changes are reduced) the synthetic depth-of-field effect to emphasize another subject (e.g., a different subject than the subject being emphasized) than when the unmodified set of automatic selection criteria is being used. Automatically modifying the set of automatic selection criteria when a gesture is received allows the computer system to switch the set of automatic selection criteria that used to automatically switch between which subjects are being emphasized and/or automatically change the synthetic depth-of-field effect that is applied based on the prescribed conditions. Performing an optimized operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the computer system (e.g., 600) detects the indication (e.g., as described above in relation to FIGS. 6O-6Q, FIGS. 6U-6V, input(s) 650*o*, 650*u*, and/or 650*z*) when a second gesture (e.g., a tap gesture, a press-and-hold gesture, a swipe gesture, and/or etc.) (e.g., as further described in relation to method 800) (e.g., a gesture directed to the third subject) is detected via the one or more input devices. In some embodiments, the computer system detects the indication when the second gesture is detected irrespective of the third subject (e.g., or any other respective subject) satisfying the set of automatic selection criteria. Applying, to the second plurality of frames of the video, a second synthetic depth-of-field effect that alters the visual information captured by the one or more cameras to emphasize the third subject in the second plurality of frames of the video relative to the first subject in the second plurality of frames of the video in response to detecting the second gesture provides the user with more control of the system by helping the user change the synthetic depth-of-field effect to alter the visual information by providing a type of input. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to detecting the indication and while capturing the video, the computer system (e.g., 600) displays a first animation (e.g., as described above in relation to live preview 630 of FIGS. 6C-6AB) (e.g., that is displayed over a period of time (e.g., 1-5 seconds)) that includes a first transition (e.g., as described above in relation to FIGS. 6C-6AB) (e.g., a fading (e.g., gradual fading) transition, a cross-fade transition) from display of one or more representations (e.g., live preview 630) of the plurality of frames that have the synthetic depth-of-field effect that alters the visual information captured by the one or more cameras to emphasize the first subject in the plurality of frames relative to the second subject applied to display of one or more representations (e.g., live preview 630) of the second plurality of frames that have the second synthetic depth-of-field effect that alters the visual information captured by the one or more cameras to emphasize the third subject (e.g., 632, 634, 638) in the second plurality of frames of the video relative to the first subject in the second plurality of frames of the video applied e.g., as described above in relation to FIGS. 6C-6AB). Displaying a first animation that includes a first transition between displaying representation(s) that have one synthetic depth-of-field effect applied to representation(s) that have another synthetic depth-of-field effect applied provides the user with feedback to understand that the synthetic depth-of-field effect is changing. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while playing back the video at a time after capture of the video ended, the computer system displays a second animation (e.g., as described above in relation to previously captured media representation 640 of FIGS. 6C-6AB) (e.g., that has a smooth transition) that corresponds to the first animation (e.g., that has an abrupt transition) (e.g., as described above in relation to live preview 630 of FIGS. 6C-6AB). In some embodiments, the second animation (e.g., as described above in relation to previously captured media representation 640 of FIGS. 6C-6AB) starts in a playback of the video at a time (e.g., 646) that corresponds to a point in time in the video that occurred before the point in time in the video at which the indication (e.g., as described above in relation to FIGS. 6D-6G, FIGS. 6H-6K, 650*o*, 650*u*, 650*z*) was detected. In some embodiments, displaying the second animation offers a benefit over traditional cameras, which do not allow you to change the focus at a particular point (e.g., after the video is taken) (e.g., cannot go back in time to change focus point while capturing video). In some embodiments, the first transition has a first transition duration. In some embodiments, after capturing the video, via the one or more input devices, the computer system detects one or more gestures (e.g., one or more tap gestures, swipe gestures, and/or press-and-hold gestures) to initiate playback of the video. In some embodiments, in response to detecting the one or more gestures to initiate playback of the video, the computer system initiates playback of the video. In some embodiments, while playing back the video, the computer system displays a second animation that includes a second transition (e.g., a fading (e.g., gradual fading) transition, a cross-fade transition) from the display of one or more representations of the plurality of frames that have the synthetic depth-of-field effect that alters the visual information captured by the one or more cameras to emphasize the first subject in the plurality of frames relative to the second subject applied to the display of one or more representations of the second plurality of frames that have the second synthetic depth-of-field effect that alters the visual information captured by the one or more cameras to emphasize the third subject in the second plurality of frames of the video relative to the first subject in the second plurality of frames of the video applied. In some embodiments, the second transition has a second transition duration that is different from the first transition duration.

In some embodiments, the second synthetic depth-of-field effect that alters the visual information captured by the one or more cameras to emphasize the third subject in the second plurality of frames of the video relative to the first subject in the second plurality of frames of the video is a synthetic depth-of-field effect that alters the visual information captured by the one or more cameras to emphasize a selected focal plane in the video, and wherein a transition characteristic (e.g., a speed of transition, acceleration curve of the transition, and/or a duration of transition) for displaying the first animation (e.g., and/or the second animation) is based on a difference (e.g., distance) between the selected focal plane in the video and a previous focal plane in the video (e.g., the focal plane in the video that was emphasized before the indication was detected) (e.g., as discussed above in relation to FIGS. 6A-6AC and FIGS. 6BI-6BJ). Displaying the first animation where a transition characteristic for displaying the first animation is based on a difference between the selected focal plane in the video and a previous focal plane in the video provides visual feedback that allows a user to ascertain the magnitude of distance between the focal planes, which provides improved visual feedback.

In some embodiments, in accordance with a determination that a distance between the selected focal plane and the previous focal plane is a first distance, a speed of the animation is a first speed (e.g., as discussed above in relation to FIGS. 6A-6AC and FIGS. 6BI-6BJ). In some embodiments, in accordance with a determination that a distance between the selected focal plane and the previous focal plane is a second distance that is shorter than the first distance, the speed of the animation is a second speed that is faster than the first speed (e.g., as discussed above in relation to FIGS. 6A-6AC and FIGS. 6BI-6BJ). Displaying the first animation where a speed for displaying the first animation is based on a difference between the selected focal plane in the video and a previous focal plane in the video provides visual feedback that allows a user to ascertain the magnitude of distance between the focal planes without reducing the abruptness of a transition that can cause visual distractions, which provides improved visual feedback.

In some embodiments, applying the synthetic depth-of-field effect includes maintaining focus on a location (e.g., at a depth or focal plane in the video) that corresponds to (e.g., the location of the first subject, the last known location of the first subject or a projected location of the first subject) the first subject (e.g., 632) (e.g., maintaining the application of the synthetic depth-of-field effect) while the first subject (e.g., 632) is at least partially obscured (e.g., by 642) (e.g., as described above in relation to FIGS. 6L-6M) (e.g., obscured behind another object, where a portion (e.g., or the entirety) of the first subject is not visible and/or behind another object) (e.g., in at least one frame of the plurality of frames). In some embodiments, as a part of applying the synthetic depth-of-field effect, the computer system maintains focus on a location that corresponds to the first subject (e.g., maintaining the application of the synthetic depth-of-field effect) while the first subject is obscured for a first period of time and ceases to maintain focus on a location that corresponds to the first subject (e.g., maintaining the application of the synthetic depth-of-field effect) while the first subject is obscured for a second predetermined period of time that is longer than the first predetermined period of time.

In some embodiments, the computer system displays a first user interface object (e.g., 672*a*-672*c*) indicating that the first subject (e.g., 632, 634, 638) is being emphasized while applying the synthetic depth-of-field effect (e.g., using one or more techniques as described below in relation to methods 800 and 900). Displaying the first user interface object indicating that the first subject is being emphasized provides the user with feedback concerning a subject that is emphasized by a synthetic depth-of-field effect relative to other subject(s) in the video. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first user interface object (e.g., 672*a*-672*c*) indicating that the first subject is being emphasized (e.g., in a live preview, a representation of the current (e.g., live) field-of-view of the one or more cameras) is displayed while the video is being captured (e.g., 672*a*-672*c* in live preview 630). In some embodiments, the first user interface object indicating that the first subject is being displayed can be displayed while the video is being captured and while capture of the video has ended (e.g., where the video is a previously captured video). In some embodiments, in other words, the same user interface object is displayed, irrespective of whether a representation of the video is being captured is displayed and/or a representation of a previously captured video is displayed. Displaying the first user interface object indicating that the first subject is being emphasized while the video is being captured provides the user with feedback concerning a subject that is emphasized by a synthetic depth-of-field effect relative to other subject(s) in the video that is being captured. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first user interface object (e.g., 672*a*-672*c*) indicating that the first subject is being emphasized (e.g., in a representation of previously captured media) is displayed after capture of the video has ended (e.g., 672*a*-672*c* in media representation 660). Displaying the first user interface object indicating that the first subject is being emphasized while the video has been provides the user with feedback concerning a subject that is emphasized by a synthetic depth-of-field effect relative to other subject(s) in the video that has been captured. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the computer system displays a second user interface object (e.g., 674*a*-674*c*) corresponding to the second subject (e.g., 632, 634, 638) while applying the synthetic depth-of-field effect (e.g., indicating that the second subject is not being emphasized). In some embodiments, the second user interface object (e.g., 674*a*-674*c*) is different in appearance (e.g., different in color, shape, etc.) from a user interface object (e.g., 672*a*-672*c*) (e.g., the first user interface object) that indicates a first subject (e.g., 632, 634, 638) to which the synthetic depth-of-field effect is being applied. In some embodiments, the first subject (e.g., 632, 634, 638) is a person (e.g., 632, 634), an animal (e.g., 638), or an object (e.g., as described above in relation to FIGS. 6B-6C). Displaying the first user interface object indicating that the first subject is being emphasized that is different from as the second user interface object corresponding to the second subject provides visual feedback for the user to distinguish between which subject(s) are being emphasized and which subject(s) are not being emphasized by a synthetic depth-of-field effect. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, before the computer system (e.g., 600) detects the request (e.g., 650*b*2) to capture the video and while the computer system (e.g., 600) is configured to operate in a first capture mode (e.g., as indicated by 620*c*) (e.g., a still or video capture mode that is not the cinematic video capture mode), the computer system (e.g., 600) detects a third gesture (e.g., a first gesture directed to the first representation) (e.g., a swipe gesture) (and/or, in some embodiments, a non-swipe gesture (e.g., tap gesture, a press-and-hold gesture)). In some embodiments, before the computer system (e.g., 600) detects the request (e.g., 650*b*2) to capture the video and in response to detecting the third gesture (e.g., 650*a*1, 650*a*2), the computer system (e.g., 600) is configured to operate in a cinematic video capture mode (e.g., 620*e*) (e.g., as indicated by FIG. 6B) (e.g., as described above in relation to methods 800 (e.g., 802) and 900 (e.g., 902, 904), as described in relation to the camera user interface of FIGS. 6A-6C, the media editing user interface of FIGS. 6D-6AQ) that is different from the first capture mode (e.g., 620*c*). In some embodiments, while the computer system is in the cinematic video mode, the computer system is configured to apply a synthetic depth-of-field effect to alter visual information to emphasize a subject in one or more frames of media. In some embodiments, the computer system displays a camera control region that includes a plurality of selectable user interface objects for camera capture modes. In some embodiments, each camera mode (e.g., 620) (e.g., video (e.g., 620*d*), photo (e.g., 620*c*), portrait (e.g., 620*b*), slow-motion (e.g., 620*f*), panoramic modes (e.g., 620*a*), time lapse (e.g., 620*g*)) has a plurality of settings (e.g., for a portrait capture mode: a studio lighting setting, a contour lighting setting, a stage lighting setting) with multiple values (e.g., levels of light for each setting) of the mode (e.g., portrait capture mode) that a camera (e.g., a camera sensor) is operating in to capture media (including post-processing performed automatically after capture). In this way, for example, capture modes are different from modes which do not affect how the camera operates when capturing media or do not include a plurality of settings (e.g., a flash mode having one setting with multiple values (e.g., inactive, active, auto). In some embodiments, capture modes allow user to capture different types of media (e.g., photos or video) and the settings for each mode can be optimized to capture a particular type of media corresponding to a particular mode (e.g., via post processing) that has specified properties (e.g., shape (e.g., square, rectangle), speed (e.g., slow motion, time elapse), audio, video). For example, when the computer system is configured to operate in a still photo capture mode, the one or more cameras of the computer system, when activated, captures media of a first type (e.g., rectangular photos) with particular settings (e.g., flash setting, one or more filter settings); when the computer system is configured to operate in a square capture mode, the one or more cameras of the computer system, when activated, captures media of a second type (e.g., square photos) with particular settings (e.g., flash setting and one or more filters); when the computer system is configured to operate in a slow motion capture mode, the one or more cameras of the computer system, when activated, captures media that media of a third type (e.g., slow motion videos) with particular settings (e.g., flash setting, frames per second capture speed); when the computer system is configured to operate in a portrait capture mode, the one or more cameras of the computer system captures media of a fifth type (e.g., portrait photos (e.g., photos with blurred backgrounds)) with particular settings (e.g., amount of a particular type of light (e.g., stage light, studio light, contour light), f-stop, blur); when the computer system is configured to operate in a panoramic capture mode, the one or more cameras of the computer system captures media of a fourth type (e.g., panoramic photos (e.g., wide photos) with particular settings (e.g., zoom, amount of field to view to capture with movement). In some embodiments, when switching between capture modes, the display of the representation of the field-of-view changes to correspond to the type of media that will be captured by the capture mode (e.g., the representation is rectangular while the computer system is operating in a still photo capture mode and the representation is square while the computer system is operating in a square capture mode)). Configuring the computer system to operate in a cinematic video capture mode that is different from the first capture mode in response to detecting a third gesture provides the user with more control by allowing the user to change between camera modes. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while the computer system (e.g., 600) is configured to operate in the first capture mode (e.g., 620*c*), a first representation (e.g., live preview 630 of FIG. 6A) of the field-of-view of the one or more cameras is displayed. In some embodiments, while the computer system (e.g., 600) is configured to operate in the cinematic video capture mode (e.g., 620*e*), a second representation (e.g., live preview 630 of FIG. 6B) of the field-of-view of the one or more cameras is displayed. In some embodiments, the first representation has less blur (e.g., has less than an amount of blur) than the second representation. In some embodiments, the first representation does not have a synthetic depth-of-field effect application to the visual information captured by the one or more cameras and the second representation has the synthetic depth-of-field application to the visual information captured by the one or more cameras. In some embodiments, a subject is not emphasized in the first representation while a subject is emphasized in the second representation. Displaying different representations of the field-of-view while the computer is in different capture modes provides the user with visual feedback concerning how the settings of each respective mode will alter the appearance of captured media. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while the computer system (e.g., 600) is configured to operate in the cinematic video capture mode (e.g., 620*e*), the computer system (e.g., 600) detects a fourth gesture (e.g., 650*ar*) (e.g., a swipe gesture) (and/or in some embodiments, a non-swipe gesture (e.g., a tap gesture, a press-and-hold gesture)) that is in a different direction that the third gesture (e.g., 650*ar*) (e.g., 650*a*1). In some embodiments, in response to detecting the fourth gesture, the computer system is configured to operate in a still photo capture mode (e.g., as described above in relation to FIGS. 6A-6B) (e.g., that is different from the second mode). In some embodiments, while the computer system is configured to operate in a still photo mode, the one or more cameras of the computer system, when activated (e.g., via detecting a request to capture media), captures media of a first type (e.g., rectangular still photos photos) with particular settings (e.g., flash setting, one or more filter settings). In some embodiments, while the computer system is configured to operate in a still photo mode, the computer system is not configured to apply (e.g., automatically apply) a synthetic depth-of-field effect to alter visual information to emphasize a subject in one or more frames of media. In some embodiments, in response to detecting the fourth gesture, a third representation is displayed. In some embodiments, the third representation does not have a synthetic depth-of-field effect application to the visual information captured by the one or more cameras and the second representation has the synthetic depth-of-field application to the visual information captured by the one or more cameras. In some embodiments, a subject is not emphasized in the third representation while a subject is emphasized in the second representation. Configuring the computer system to operate in a cinematic video capture mode that is different from the first capture mode in response to detecting a fourth gesture that is different from the third gesture provides the user with more control by allowing the user to change between camera modes by providing user inputs that have different directions. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, before detecting the request (e.g., 650*b*2) to capture the video and while the computer system (e.g., 600) is configured to operate in a second capture mode (e.g., 650*e*), the computer system detects a fifth gesture (e.g., 650*ar*) (e.g., a gesture directed to the first representation, a gesture that is in the same direction as the second gesture) (e.g., a swipe gesture) (and/or in some embodiments, a non-swipe gesture (e.g., a tap gesture, a press-and-hold gesture)); and in response to detecting the fifth gesture (e.g., 650*ar*), configuring the computer system to operate in a portrait capture mode (e.g., 620*b*) (e.g., that is different from the still photo capture mode, the cinematic video capture mode). In some embodiments, while the computer system is in the cinematic video mode, the computer system is configured to apply a synthetic depth-of-field effect to alter visual information to emphasize a subject in one or more frames of media. In some embodiments, in response to detecting the second fifth, a fourth representation is displayed. In some embodiments, the fourth representation does not have a synthetic depth-of-field effect application to the visual information captured by the one or more cameras and the second representation has the synthetic depth-of-field application to the visual information captured by the one or more cameras. In some embodiments, a subject is not emphasized in the fourth representation while a subject is emphasized in the second representation. In some embodiments, when the electronic device is configured to operate in a portrait mode, the one or more cameras of the computer system captures media of a fifth type (e.g., portrait photos (e.g., photos with blurred backgrounds)) with particular settings (e.g., amount of a particular type of light (e.g., stage light, studio light, contour light), f-stop, blur). Configuring the computer system to operate in a cinematic video capture mode that is different from the first capture mode in response to detecting the fifth gesture provides the user with more control by allowing the user to change between camera modes. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, applying, to the plurality of frames of the video (e.g., media representation 660), the synthetic depth-of-field effect (e.g., 662, 682, 650*ae*, and/or 650*af*2) includes adjusting (e.g., changing) a magnitude (e.g., a magnitude of a simulated aperture or a magnitude of a simulated and/or synthetic depth-of-field) of the synthetic depth-of-field effect that is applied to the video. In some embodiments, the computer system is in communication with a display generation component. In some embodiments, after (e.g., and/or while) adjusting the magnitude of the synthetic depth-of-field effect that is applied to the video, the computer system displays a representation (e.g., 602*e*) (e.g., numbers, words, and/or symbols) (e.g., a distance between the computer system and/or one or more cameras of the computer system to a plane that is in the field-of-view of the one or more cameras) of the magnitude (e.g., amount of blur) of the synthetic depth-of-field effect that is applied to the video. In some embodiments, in accordance with a determination the magnitude of the synthetic depth-of-field effect that is applied to the video is a default magnitude and/or in accordance with a determination that one or more default settings are set, the computer system forgoes displaying the representation of the magnitude of the synthetic depth-of-field effect that is applied to the video and/or displays a representation of the magnitude of the synthetic depth-of-field effect that is applied to the video with a different visual appearance than the representation of the magnitude of the synthetic depth-of-field effect that is applied to the video in accordance with a determination that the magnitude of the synthetic depth-of-field effect that is applied to the video is not the default magnitude. Displaying a representation of the magnitude of the synthetic depth-of-field effect that is applied to the video applied to the video provides visual feedback that informs the user about the magnitude to which the synthetic depth-of-field that has been adjusted, which provides improved visual feedback.

In some embodiments, after applying the synthetic depth-of-field effect to the plurality of frames of the video, the computer system (e.g., 600), detects a second request (e.g., 650*ai*, 650*a*1) to apply a synthetic depth-of-field effect to a second plurality of frames (e.g., media representation 660) of the video that have been captured. In some embodiments, in response to detecting the second request (e.g., 650*ai*, 650*a*1) and in accordance with a determination that the second request (e.g., 650*ai*, 650*a*1) was detected based on a first type of gesture (e.g., 650*ai*) (e.g., a single-tap gesture) (and/or, in some embodiments, a non-tap gesture (e.g., a swipe gesture, a press-and-hold gesture)) being detected, the computer system (e.g., 600) applies the synthetic depth-of-field effect to the second plurality of frames of the video that have been captured with a first type of tracking (e.g., as described above in relation to FIGS. 6AI-6AK). In some embodiments, in response to detecting the second request (e.g., 650*ai*, 650*a*1) and in accordance with a determination that the second request (e.g., 650*ai*, 650*a*1) was detected based on a second type of gesture (e.g., 650*a*1) (e.g., a multi-tap gesture (e.g., double-tap gesture)) (and/or, in some embodiments, a non-tap gesture (e.g., a swipe gesture, a press-and-hold gesture)) being detected, applies the synthetic depth-of-field effect to the second plurality of frames of the video that have been captured with a second type of tracking (e.g., as described above in relation to FIGS. 6AL-6AN). In some embodiments, the second type of tracking (e.g., as described above in relation to FIGS. 6AL-6AN) is different from the first type of tracking (e.g., as described above in relation to FIGS. 6AI-6AK). In some embodiments, computer system 600 displays different visual indicators (e.g., 672*a*-672*c* vs. 676 vs. 678*a*-678*b*) to emphasize a portion of a frame is displayed for types of tracking (e.g., as described above in relation to FIGS. 6O-6Q, FIGS. 6U-6V, FIGS. 6Z-6AA, and FIGS. 6AI-6AM)

In some embodiments, in response to detecting the second request (e.g., 650*ai*, 650*a*1, 650*z*) and in accordance with a determination that the second request was detected based on a third type of gesture (e.g., 650*z*) (e.g., a press-and-hold gesture) (and/or, in some embodiments, a non-pressing gesture (e.g., a swipe gesture, a tap gesture)) being detected, the computer system (e.g., 600) applies the synthetic depth-of-field effect to the second plurality of frames of the video that have been captured with a third type of tracking (e.g., as described above in relation to FIGS. 6Z-6AA). In some embodiments, the third type of tracking is different from the first type of tracking and the second type of tracking (e.g., different types of depth-of-field effects (e.g., a depth-of-field effect where a subject is in focus temporarily, a depth-of-field effect where a subject is in focus permanently, depth-of-field effect where a plane and/or area of the representation is in focus (e.g., as described above in relation to method 800). In some embodiments, the first type of gesture, the second type of gesture, and the third type of gesture are different from each other (e.g., different types of gestures from each other). In some embodiments, the computer system displays different types of indicators for different types of tracking. Altering the visual information differently based on the type of gesture (e.g., first type of gesture, second type of gesture, third-type of gesture) that is received provides the user with more control of the system by helping the user change the synthetic depth-of-field effect to alter the visual information in a particular way by providing a particular type of input. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the second request (e.g., 650*ai*, 650*a*1, 650*z*) is one of a single-tap gesture (e.g., 650*ai*), a multi-tap gesture (e.g., 650*a*1) (e.g., a double-tap gesture), and a press-and-hold gesture (e.g., 650*z*).

In some embodiments, the second request (e.g., 650*ai*, 650*a*1, 650*z*) is based on a gesture (e.g., 650*z*) (e.g., the third type of gesture) that is not directed to one or more subjects (e.g., the first subject, the second subject) in the plurality of frames. In some embodiments, the second request is based on a gesture that is directed to the one or more subjects in the plurality of frames. In some embodiments, in response detecting a gesture that is not directed to the one or more subjects, the computer system does not apply the synthetic depth-of-field effect to the plurality of frames of the video that have been captured with a type of tracking that tracks a subject when the subject moves relative to the field-of-view of the one or more cameras (e.g., as discussed above in relation to FIGS. 6Y-6AB).

In some embodiments, method 800 includes operation regarding computer system 600 automatically applying a synthetic depth of field effect to the video (e.g., visual information to the video) (e.g., to one or more frames (e.g., a sequence of frames over a capture duration) of the video). The computer system automatically synthetic depth of field effect to the video reduces the number of inputs needed to perform a set of operations and provides the user with more control of the system by helping the user change the synthetic depth-of-field effect to alter the visual information for a sequence of frames in the video rather than reviewing and modifying individual frames to blur the background using one or more user inputs to apply a blur to each of the individual frames. Reducing the number of inputs to perform a set of operations and providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first subject (e.g., 632, 634, and/or 638) in the plurality of frames of the video is at a third distance from the one or more cameras. In some embodiments, the second subject (e.g., 632, 634, 638) in the plurality of frames of the video is at a fourth distance from the one or more cameras that is closer to the one or more cameras than the third distance (e.g., as described above in relation to FIG. 6AG.

In some embodiments, as a part of capturing the video over the first capture duration" at a first time during the first capture duration, the computer system adjusts one or more settings of a first camera of the one or more cameras (e.g., length of the optical path between a lens and a sensor; aperture/effective aperture) to bring into focus a first focal plane that corresponds to the first subject (e.g., to bring the first subject within an acceptable are of focus); at a second time during the first capture duration and while the first camera is aligned to the first focal plane, the computer system detects a change in the distance between the first subject and the first camera; in response to detecting the change in the distance between the first subject and the first camera, the computer system adjusts the one or more settings of the first camera to bring into focus a second focal plane, different from the first focal plane, that corresponds to the first subject; after capturing the video over the first capture duration (and, in some embodiments, after applying, to the plurality of frames of the video, the synthetic depth-of-field effect that alters visual information captured by the one or more cameras to emphasize the first subject in the plurality of frames of the video relative to the second subject in the plurality of frames of the video), the computer system detects an indication (e.g., 686*a*, 686*b*, 688*c*, 686*d*, 688*e*, 686*f*, 686*g*, 688*h*, 688*i*, 688*j*, 688*k*, and/or 688*m*) (e.g., a user input selecting the second subject) (e.g., as described in relation to method 800) that the second subject should be emphasized in the first plurality of frames relative to the first subject in the second plurality of frames, where the first plurality of frames corresponds to the second time; and in response to detecting the indication that the second subject should be emphasized in the first plurality of frames relative to the first subject in the second plurality of frames and while the second focal plane is not altered (e.g., applying the synthetic depth-of-field effect does not include adjusting one or more settings of the first camera; the underlying, unmodified video data still has the second focal plane in focus), the computer system applies, to the plurality of frames of the video, a respective synthetic depth-of-field effect that alters visual information captured by the one or more cameras to emphasize the second subject in the plurality of frames of the video relative to the first in the plurality of frames of the video. In some embodiments, while capturing the video over a first capture duration, the computer system tracks one or more respective subjects in the plurality of frames of the video by focusing on a set of focal planes (e.g., a first set of true focal planes) (e.g., one or more focal planes that were used to track the one or more respective subjects while capturing the video). In some embodiments, focusing on the set of focal planes causes the plurality of frames have a natural amount of blur. In some embodiments, the one or more focal planes that were used to track the one or more respective subjects while capturing the video were identified by a subject (and/or object) detection algorithm and/or by an autofocus algorithm (e.g., and/or setting) on the computer system. In some embodiments, by tracking one or more respective subjects in the plurality of frames of the video by focusing on a first set of focal plane, a first blur is applied to the captured video. In some embodiments, after capturing the video over the first capture duration (and, in some embodiments, after applying, to the plurality of frames of the video, the synthetic depth-of-field effect that alters visual information captured by the one or more cameras to emphasize the first subject in the plurality of frames of the video relative to the second subject in the plurality of frames of the video), the computer system detects an indication (e.g., a user input selecting the second subject) (e.g., as described in relation to method 800) that the second subject should be emphasized in the first plurality of frames relative to the first subject in the second plurality of frames. In some embodiments, in response to detecting the indication that the second subject should be emphasized in the first plurality of frames relative to the first subject in the second plurality of frames, the computer system applies, to the plurality of frames of the video, a respective synthetic depth-of-field effect that alters visual information captured by the one or more cameras to emphasize the second subject in the plurality of frames of the video relative to the first in the plurality of frames of the video, wherein, after applying the respective synthetic depth-of-field effect, the plurality of frames continue to include the natural amount of blur. In some embodiments, the synthetic depth-of-field effect changes over time as the second subject moves within the field-of-view of the one or more cameras.

In some embodiments, as a part of applying, to the plurality of frames (e.g., 1230) of the video, the synthetic depth-of-field effect that alters visual information captured by the one or more cameras to emphasize the first subject in the plurality of frames of the video relative to the second subject in the plurality of frames of the video, the computer system: identifies (e.g., using an image signal processor (e.g., a software algorithm and/or a hardware processor), in the plurality of frames of the video, one or more objects (e.g., 1232) (e.g., subjects, animals, and/or inanimate objects (e.g., a sports ball) and/or a portion of one or more objects (e.g., 1232) (e.g., face and/or head, torso, and/or a body) and one or more characteristics (e.g., 1234) (e.g., object type, position, size, and/or orientation, a face pose (e.g., the roll of a detected face, a yaw of a detected face, and/or the pitch of the detected face), and/or human key points (e.g., a face size, face position, face orientation and/or hand size, hand position, hand orientation, and/or a normalized (x, y) position and confidence of each detected person's nose, and/or left/right eye, ear, shoulder, elbow, wrist, hip, knee, and/or ankle)) of the one or more objects using an object detection algorithm; provides the one or more identified objects and the one or more identified characteristics of the one or more identified objects to a neural network (e.g., 1224) (e.g., an artificial neural network; a set of algorithms operating as a networked set of artificial neurons that process information); and obtains output (e.g., 1236) from the neural network based the one or more identified objects and the one or more identified characteristics of the one or more identified objects. In some embodiments, the output from the neural network identifies the first subject (e.g., 632, 634, 628, 638, and/or 698) from among the one or more objects for application of the synthetic depth-of-field effect. In some embodiments, the computer system applies to the plurality of frames of the video, the synthetic depth-of-field effect that alters visual information captured by the one or more cameras to emphasize the first subject in the plurality of frames of the video relative to the second subject in the plurality of frames of the video based on the output from the neural network. In some embodiments, after providing the one or more identified objects and the one or more identified characteristics of the one or more identified objects to a neural network, the determination is made to applying, to the plurality of frames of the video, the synthetic depth-of-field effect that alters visual information captured by the one or more cameras to emphasize the first subject in the plurality of frames of the video relative to the second subject in the plurality of frames of the video (e.g., based on output received from the neural network) and/or the synthetic depth-of-field effect (e.g., and/or the amount of the synthetic depth-of-field effect) is applied based on output received from the neural network.

In some embodiments, the neural network (e.g., 1224) was trained using training data (e.g., 1220) that includes user preference data (e.g., 1222) that identifies which objects in videos (e.g., 1206) in the set of captured videos a user would have selected for emphasis at a plurality of times in a set of captured videos. In some embodiments, the training data includes user preference data from multiple different users for the same video or for multiple individual videos. In some embodiments, the training data includes user preference data for multiple different times within a single video (e.g., selection of different objects to be emphasized at different times). In some embodiments, the training data includes data from a large number of videos (e.g., 50, 100, 1000, and/or 10,000 videos). In some embodiments, the training data identifies different objects to be emphasized at different points in time. In some embodiments, the neural network learns from the characteristics in one or more videos via the training to identify which characteristics of the video are likely to have caused the objects to be selected.

In some embodiments, after applying, to the plurality of frames of the video, the synthetic depth-of-field effect that alters visual information captured by the one or more cameras to emphasize the first subject in the plurality of frames of the video relative to the second subject in the plurality of frames of the video and while the neural network (e.g., 1224) continues to identify (e.g., via 1236) the first subject from among the one or more objects for a respective application of a respective synthetic depth-of-field effect (and/or continues to identify the first subject as a designated point-of-interest (e.g., the subject that should emphasized)), the computer system detects (g., 650*o*, 650*u*, 650*z*, 650*a*1, 650*ai*, and/or one or more inputs described below in relation method 800) a request to emphasize the second subject in the plurality of frames of the video. In some embodiments, in response to detecting the request (e.g., 650*o*, 650*u*, 650*z*, 650*a*1, 650*ai*, and/or one or more inputs described below in relation method 800) to emphasize a different subject in the plurality of frames of the video (e.g., and while the neural network continues to identify the first subject as a designated point-of-interest), the computer system applies (e.g., via 1238 as discussed above in relation to FIG. 12), to the plurality of frames of the video, a different synthetic depth-of-field effect that alters visual information captured by the one or more cameras to emphasize the second subject in the plurality of frames of the video relative to the first subject in the plurality of frames of the video. In some embodiments, after applying the different synthetic depth-of-field effect, the synthetic depth-of-field effect that alters visual information captured by the one or more cameras to emphasize the first subject in the plurality of frames of the video relative to the second subject in the plurality of frames of the video is saved as a default depth-of-field effect change. In some embodiments, after removing the different depth-of-field effect, the computer system, automatically (e.g., without intervening user input), reapplies, to the plurality of frames of the video, the synthetic depth-of-field effect that alters visual information captured by the one or more cameras to emphasize the first subject in the plurality of frames of the video relative to the second subject in the plurality of frames of the video.

Note that details of the processes described above with respect to method 700 (e.g., FIG. 7) are also applicable in an analogous manner to the methods described herein. For example, methods 800, 900, 1100, and/or 1300 optionally includes one or more of the characteristics of the various methods described above with reference to method 700. For example, the method described below in method 900 can be used to display media in a media editing user interface after the media is captured using one or more techniques described in relation to method 700.

For example, characteristics of method 700 could be combined with method 800 and/or method 900 to improve how visual media is altered. For brevity, these details are not repeated below.

FIG. 8 is a flow diagram illustrating an exemplary method for altering visual media using a computer system in accordance with some embodiments. Method 800 is performed at a computer system (e.g., 100, 300, 500, 600, a smartphone, a desktop computer, a laptop, and/or a tablet) that is in communication with one or more cameras (e.g., one or more cameras (e.g., dual cameras, triple camera, quad cameras, etc.) on the same side or different sides of the computer system (e.g., a front camera, a back camera)), a display generation component (e.g., a display controller, a touch-sensitive display system), and/or one or more input devices (e.g., a touch-sensitive surface). Some operations in method 800 are, optionally, combined, the orders of some operations are, optionally, changed, and some operations are, optionally, omitted.

As described below, method 800 provides an intuitive way for altering visual media. The method reduces the cognitive burden on a user for altering visual media, thereby creating a more efficient human-machine interface. For battery-operated computing devices, enabling a user to alter visual media faster and more efficiently conserves power and increases the time between battery charges.

The computer system (e.g., 600) displays (802), via the display generation component, a user interface (e.g., a media capture user interface, a media viewer/editing user interface) (and, in some embodiments, the user interface is displayed using one or more techniques as described above/below in relation to methods 700 and 900) that includes (e.g., concurrently displaying) a representation (e.g., 630, 660) (e.g., of a frame (an image)) of a video (e.g., video media) (e.g., video captured using one or more techniques as described above/below in relation to methods 700 and 900) that includes a plurality of frames. The representation including a first subject (e.g., 632, 634, 638) (e.g., subject identified by the computer system; an identified subject) and a second subject (e.g., 632, 634, 638) (e.g., subject identified by the computer system; an identified subject).

The computer system (e.g., 600) displays (804), via the display generation component, the user interface (e.g., a media capture user interface, a media viewer/editing user interface) (and, in some embodiments, the user interface is displayed using one or more techniques as described above/below in relation to methods 700 and 900) that includes (e.g., concurrently displaying) a first user interface object (e.g., 672*a*-672*c*) indicating that the first subject (e.g., 632, 634, 638) is being emphasized by a (e.g., synthetic (e.g., computer-generated and/or computer-generated and applied after capture of a frame of the video)) synthetic depth-of-field effect that alters visual information captured by the one or more cameras to emphasize (and/or that emphasizes) (e.g., visually emphasize) the first subject (e.g., 632, 634, 638) in the plurality of frames relative to the second subject (e.g., 632, 634, 638) (e.g., in the plurality of frames) (that has been applied (e.g., by the computer system) to the representation of the video and/or the video) (e.g., using one or more techniques as described above/below in relation to methods 700 and 900). In some embodiments, user interface does not include a user interface object indicating that the second subject is being emphasized by a depth-of-field effect before the gesture that corresponds to selection of the second subject in the representation of the video is received. In some embodiments, only one instance of the first user interface object is displayed in the user interface at any given time. In such embodiments, the first user interface object also indicates what subject(s) are not being emphasized by a depth-of-field effect by virtue of not being associated with those subject(s).

While displaying the user interface that includes the representation (e.g., 630, 660) of the video and the first user interface object (e.g., 672*a*-672*c*, 678*a*-678*b*), the computer system (e.g., 600) detects (806), via the one or more input devices, a gesture (e.g., 650*o*, 650*u*, 650*z*, 650*a*1, 650*ai*) (e.g., a single-tap gesture, a multiple-tap gesture (e.g., double-tap gesture), a press-and-hold gesture) that corresponds to selection of (e.g., directed to, on) the second subject (e.g., 632, 634, 638) (e.g., a subject that is different from the first subject) in the representation (e.g., 630, 660) of the video.

In response to (808) detecting the gesture (e.g., 650*o*, 650*u*, 650*z*, 650*a*1, 650*ai*) that corresponds to selection of the second subject (e.g., 632, 634, 638) in the representation (e.g., 630, 660) of the video, the computer system (e.g., 600) changes (810) the synthetic depth-of-field effect to alter the visual information captured by the one or more cameras to emphasize (and/or that emphasizes) (e.g., visually emphasize) the second subject (e.g., 632, 634, 638) in the plurality of frames relative to the first subject (e.g., 632, 634, 638) (e.g., as described above in relation to FIGS. 6B-6AO). Changing the synthetic depth-of-field effect to alter the visual information captured by the one or more cameras to emphasize the second subject in the plurality of frames relative to the first subject in response to detecting a detecting the gesture that corresponds to selection of the second subject in the representation of the video provides the user with control over the system by allowing the user to control how a synthetic depth-of-field effect is applied to a video. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In response to (808) detecting the gesture (e.g., 650*o*, 650*u*, 650*z*, 650*a*1, 650*ai*) that corresponds to selection of the second subject (e.g., 632, 634, 638) in the representation (e.g., 630, 660) of the video, the computer system (e.g., 600) displays (812) a second user interface object (e.g., 672*a*-672*c*, 678*a*-678*b*) indicating that the second subject (e.g., 632, 634, 638) is being emphasized by the changed synthetic depth-of-field effect that alters the visual information captured by the one or more cameras to emphasize (and/or that emphasizes) (e.g., visually emphasize) the second subject (e.g., 632, 634, 638) in the plurality of frames relative to the first subject (e.g., 632, 634, 638) (e.g., in the plurality of frames). In some embodiments, in response to detecting the gesture directed to the second subject in the representation of the video, the computer system applies the synthetic depth-of-field effect (e.g., synthetic and/or computer-generated) that emphasizes the second subject in video relative to the first subject (e.g., people, animals, other subjects (e.g., other subjects with faces), objects) in the representation (e.g., one or more frames) and/or one or more subsequent representations (e.g., that are displayed after the representation) of the video. In some embodiments, the user interface object (e.g., first user interface object, second user interface object) is displayed around the body or a body part (e.g., head) of a respective subject. In some embodiments, the user interface object (e.g., first user interface object, second user interface object) is a shape (e.g., circle, square, cross) and/or bracket that is displayed around or on the user. In some embodiments, the color of the user interface object and/or shape of the user interface object (e.g., first user interface object, second user interface object) indicates whether or not a respective subject is being emphasized by the synthetic depth-of-field effect. In some embodiments, when the user interface object indicates that a respective subject is being emphasized by the (e.g., computer-generated) depth-of-field effect, the respective subject is less blurred than other subjects in the representation of the video. In some embodiments, when the user interface object indicates that the respective subject is not being emphasized by the (e.g., computer-generated) depth-of-field effect, the respective subject is more blurred than another subject in the representation of the video. Displaying the second user interface object indicating that the second subject is being emphasized in response to detecting a detecting the gesture that corresponds to selection of the second subject in the representation of the video provides the user with feedback concerning a subject that is emphasized by a synthetic depth-of-field effect relative to other subject(s) in the video. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first user interface object (e.g., 672*a*-672*c*, 678*a*-678*b*) and the second user interface object (e.g., 672*a*-672*c*, 678*a*-678*b*) have a same visual appearance (e.g., a same color and/or a shape). Displaying the first user interface object indicating that the first subject is being emphasized with the same visual appearance as the second user interface object indicating that the second subject is being emphasized provides the user with consistent feedback concerning a subject that is emphasized by a synthetic depth-of-field effect relative to other subject(s) in the video. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, before detecting the gesture (e.g., 650*o*, 650*u*, 650*z*, 650*a*1, 650*ai*) that corresponds to selection of the second subject, the computer system (e.g., 600) displays (e.g., concurrently with the first user interface object), via the display generation component (e.g., in the user interface, concurrently with the first user interface object), a third user interface object (e.g., 674*a*-674*c*) (e.g., a box or outline associated with the second subject; an object having a different color and/or shape than that of the first user interface object). In some embodiments, the third use interface object is displayed at a location near or surrounding the second subject indicating that the second subject (e.g., 632, 635, 638) is not being emphasized (e.g., by the synthetic depth-of-field effect that alters the visual information captured by the one or more cameras to emphasize the first subject in the plurality of frames relative to the second subject and by the changed synthetic depth-of-field effect that alters the visual information captured by the one or more cameras to emphasize the second subject in the plurality of frames relative to the first subject) (e.g., a grey box (e.g., a grey subject detect box). In some embodiments, in response to detecting the gesture that corresponds to selection of the second subject in the representation of the video, the computer system ceases to display the third user interface object and/or replaces display of the third user interface object with the display of the second user interface object. Displaying the third user interface indicating that the second subject is not being emphasized provides the user with feedback concerning a subject that is not being emphasized by a synthetic depth-of-field effect. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first user interface object (e.g., 672*a*-672*c*) has a different visual appearance from the third user interface object (e.g., 674*a*-674*c*) (e.g., a color (e.g., not grey), a shape and/or another visual characteristic other than location of the user interface object in the timeframe). In some embodiments, the second user interface object has a visual appearance that is the same as the second visual appearance third user interface object. Displaying the first user interface object indicating that the first subject is being emphasized with a different visual appearance as the third user interface indicating that the second subject is not being emphasized provides visual feedback for the user to distinguish between which subject(s) are being emphasized and which subject(s) are not being emphasized by a synthetic depth-of-field effect. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the representation (e.g., 630, 660) of the video includes a third subject. In some embodiments, before detecting the gesture (e.g., 650*o*, 650*u*, 650*z*, 650*a*1, 650*ai*) that corresponds to selection of the second subject (e.g., 632, 634, 638), the computer system (e.g., 600) displays, via the display generation component (e.g., in the user interface, concurrently with the first user interface object and/or the third user interface object), a fourth user interface object (e.g., 674*a*-674*c*) (e.g., the third use interface object) indicating that the second subject (e.g., 632, 634, 638) is not being emphasized (e.g., by the synthetic depth-of-field effect that alters the visual information captured by the one or more cameras to emphasize the first subject in the plurality of frames relative to the second subject and by the changed synthetic depth-of-field effect that alters the visual information captured by the one or more cameras to emphasize the second subject in the plurality of frames relative to the first subject) and (and/or concurrently with) a fifth user interface object (e.g., 674*a*-674*c*) indicating that the third subject (e.g., 632, 634, 638) is not being emphasized (e.g., as described above in relation to FIG. 6AB) (e.g., by the synthetic depth-of-field effect that alters the visual information captured by the one or more cameras to emphasize the first subject in the plurality of frames relative to the second subject and by the changed synthetic depth-of-field effect that alters the visual information captured by the one or more cameras to emphasize the second subject in the plurality of frames relative to the first subject). In some embodiments, in response to detecting the gesture that corresponds to selection of the second subject in the representation of the video, the computer system continues to display the fifth user interface object and/or ceases to display the fourth user interface object. Displaying a fourth user interface object indicating that the second subject is not being emphasized and a fifth user interface object indicating that the third subject is not being emphasized provides the user with feedback concerning subjects that are not being emphasized by a synthetic depth-of-field effect and allows the user to identify which subjects are being tracked by the computer system and are available to be emphasized with the synthetic depth-of-field effect. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the fourth user interface object (e.g., 674*a*-674*c*) and the fifth user interface object (e.g., 674*a*-674*c*) have different visual appearances (e.g., different colors and/or shapes). Displaying a fourth user interface object indicating that the second subject is not being emphasized with the same visual appearance a fifth user interface object indicating that the third subject is not being emphasized provides the user with consistent feedback concerning subjects that are not being emphasized by a synthetic depth-of-field effect. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to detecting the gesture (e.g., 650*o*, 650*u*, 650*z*, 650*ai*, 650*a*1) that corresponds to selection of the second subject (e.g., 632, 634, 638), the computer system (e.g., 600) ceases to display the first user interface object (e.g., 672*a*-672*c*). Ceasing to display the first user interface object in response to detecting the gesture that corresponds to selection of the second subject provides the user with feedback that the first subject is no longer being emphasized. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to detecting the gesture (e.g., 650*o*, 650*u*, 650*z*, 650*a*1, 650*ai*) that corresponds to selection of the second subject (e.g., 632, 634, 638), the computer system (e.g., 640) displays a sixth user interface object (e.g., 672*a*-672*c*) (e.g., an object having a visual appearance (e.g., color and/or shape) different than the second user interface object) indicating that the first subject (e.g., 632, 634, 638) is not being emphasized (e.g., by the synthetic depth-of-field effect that alters the visual information captured by the one or more cameras to emphasize the first subject in the plurality of frames relative to the second subject and by the changed synthetic depth-of-field effect that alters the visual information captured by the one or more cameras to emphasize the second subject in the plurality of frames relative to the first subject). Displaying a sixth user interface object indicating that the first subject is not being emphasized in response to detecting the gesture that corresponds to selection of the second subject provides the user with feedback that the first subject is no longer being emphasized. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the gesture (e.g., 650*o*, 650*u*, 650*z*, 650*a*1, 650*ai*) that corresponds to selection of the second subject (e.g., 632, 634, 638) is detected while the one or more cameras are capturing the visual information (e.g., as described above in relation to FIGS. 6O-6Z) (e.g., visual information that corresponds to the representation of the video) (e.g., capturing the video). In some embodiments, the user interface is a user interface for capturing media. In some embodiments, the user interface for capturing media includes a selectable user interface object for capturing media. In some embodiments, before the user interface is displayed, the computer systems detects selection of the user interface object for capturing media and, in response to detecting selection of the user interface object for capture media, the computer system displays the user interface and initiates capture of media via the one or more cameras. In some embodiments, the user interface object for capture media (e.g., a shutter affordance, start/stop affordance) is displayed concurrently with the first user interface object. In some embodiments, the first user interface object is displayed with one or more camera setting(s) user interface objects. Detecting the gesture that corresponds to selection of the second subject while the one or more cameras are capturing the visual information provides the user with more control of the system by helping the user change the synthetic depth-of-field effect that is applied while the video is being captured. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the gesture (e.g., 650*o*, 650*u*, 650*z*, 650*a*1, 650*ai*) that corresponds to selection of the second subject is detected during playback (e.g., subsequent playback; non-live playback; playback after capture of the video is complete) of the video after capture of the video has ended (e.g., as described below in relation to FIGS. 6AD-6AQ). In some embodiments, the representation of media is a representation of media that has been previously captured. In some embodiments, before displaying the user interface that includes the representation of the video and the first user interface object, the computer system displays a media gallery user interface that includes a thumbnail representation (among a plurality of thumbnail representations that represent a plurality of media items) that corresponds to the video. In some embodiments, in response to detecting a gesture directed to the thumbnail representation that corresponds to the video, the computer system displays the user interface that include the representation of the video and the first user interface object. Detecting the gesture that corresponds to selection of the second subject during the playback of the video provides the user with more control of the system by helping the user change the synthetic depth-of-field effect after the video has been captured. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the computer system (e.g., 600) detects the same gestures (e.g., 650*o* and 650*ai*, 650*u* and 650*a*1) to change the synthetic depth-of-field effect to alter the visual information captured by the one or more cameras to the second subject in the plurality of frames relative to the first subject while capturing the video as the gestures that the computer system detects to change the synthetic depth-of-field effect to alter the visual information captured by the one or more cameras to the second subject in the plurality of frames relative to the first subject while editing a previously captured video. In some embodiments, using the same gestures to change the synthetic depth-of-field effect to alter the visual information captured by the one or more cameras to the second subject in the plurality of frames relative to the first subject while capturing the video as the gestures that the computer system detects to change the synthetic depth-of-field effect to alter the visual information captured by the one or more cameras to the second subject in the plurality of frames relative to the first subject while editing a previously captured video makes the system easier to use because the same feedback and inputs are used for performing the same operations whether the device is recording video or editing recorded video.

In some embodiments, the gesture (e.g., 650*o*, 650*u*, 650*z*, 650*a*1, 650*ai*) that corresponds to selection of the second subject (e.g., 632, 634, 638) is a first single-tap gesture (e.g., 650*o*, 650*ai*) (e.g., a tap gesture directed to (e.g., on) the second subject) (and/or, in some embodiments, a non-tap gesture (e.g., a rotational gesture, swipe gesture) directed to the subject). Detecting a single-tap gesture that corresponds to selection of the second subject in the representation of the video media provides the user with more control of the system by helping the user change the synthetic depth-of-field effect after the video has been captured by providing a particular type of input. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the gesture (e.g., 650*o*, 650*u*, 650*z*, 650*a*1, 650*ai*) that corresponds to selection of the second subject (e.g., 632, 634, 638) is a first multi-tap gesture (e.g., 650*u*, 650*a*1) (e.g., a multi-tap gesture (e.g., a double-tap gesture) directed to (e.g., on) the second subject) (and/or, in some embodiments, a non-tap gesture (e.g., a rotational gesture, swipe gesture) directed to the subject). In some embodiments, a multi-tap gesture includes more taps than a single-tap gesture. Detecting a multi-tap gesture that corresponds to selection of the second subject in the representation of the video media provides the user with more control of the system by helping the user change the synthetic depth-of-field effect after the video has been captured by providing a particular type of input. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the gesture (e.g., 650$o$, 650$u$, 650$z$, 650$a$1, 650$ai$) that corresponds to selection of the second subject (e.g., 632, 634, 638) is a first press-and-hold gesture (e.g., 650$z$) (e.g., a press-and-hold gesture directed to (e.g., on) the second subject) (and/or, in some embodiments, a non-press-and-hold gesture (e.g., a tap gesture, swipe gesture) directed to the subject). In some embodiments, a press-and-hold gesture is a gesture that is detected via the one or more input devices for a long period of time than the single-tap gesture. Detecting a press-and-hold gesture that corresponds to selection of the second subject in the representation of the video media provides the user with more control of the system by helping the user change the synthetic depth-of-field effect after the video has been captured by providing a particular type of input. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, changing the synthetic depth-of-field effect to alter the visual information captured by the one or more cameras to emphasize the second subject (e.g., 632, 634, 638) in the plurality of frames (e.g., as shown in 630, 660) relative to the first subject (e.g., 632, 634, 638) includes, in accordance with a determination that the gesture that corresponds to selection of the second subject is a first type of gesture (e.g., 650$o$, 650$ai$) (e.g., a single tap gesture) (e.g., a tap gesture directed to (e.g., on) the second subject) (and/or, in some embodiments, a non-tap gesture (e.g., rotational gesture, swipe gesture) directed to the subject), altering the visual information captured by the one or more cameras to emphasize the second subject until first criteria are met (e.g., and not a second set of the plurality of frames). In some embodiments, changing the synthetic depth-of-field effect to alter the visual information captured by the one or more cameras to emphasize the second subject in the plurality of frames relative to the first subject includes, in accordance with determination that the gesture that corresponds to selection of the second subject is a second type of gesture (e.g., 650$u$, 650$l$) (e.g., a multi-tap gesture (e.g., a double-tap gesture) directed to (e.g., on) the second subject) (and/or, in some embodiments, a non-tap gesture (e.g., a rotational gesture, swipe gesture) directed to the subject) that is different from the first type of gesture, altering the visual information captured by the one or more cameras to emphasize the second subject until second criteria are met. In some embodiments, the second criteria are different from the first criteria. In some embodiments, in accordance with a determination that the gesture that corresponds to selection of the second subject is the first type of gesture, the computer system applies the synthetic depth-of-field effect to alter the visual information captured by the one or more cameras to emphasize the second subject in the plurality of frames relative to the first subject for a set of frames (e.g., first set of frames (e.g., that are displayed by the computer system)) that occur over a first duration of the video. In some embodiments, in accordance with determination that the gesture that corresponds to selection of the second subject is a second type of gesture, the computer system applies the synthetic depth-of-field effect to alter the visual information captured by the one or more cameras to emphasize the second subject in the plurality of frames relative to the first subject for a set of frames (e.g., second set of frames (e.g., that are displayed by the capture system)) that occur over a second duration of the video that is longer than the first duration of the video. In some embodiments, in accordance with a determination that the gesture that corresponds to selection of the second subject is the first type of gesture, the visual information ceases to be altered for the duration of the video until a gesture is detected and/or until a predetermined time has passed and/or whether one or more automatic selection and/or irrespective of whether one or more automatic selection criteria are met for another subject (e.g., using one or more techniques as described above in relation to method 700). In some embodiments, in accordance with a determination that the gesture that corresponds to selection of the second subject is the second type of gesture, the visual information ceases to be altered for the duration of the video until a gesture is detected (e.g., a gesture that corresponds to selection of a subject in the representation of the media) and irrespective of whether a predetermined period of time has passed. Altering the visual information differently based on the type of gesture (e.g., first type of gesture and/or second type of gesture) that is received provides the user with more control of the system by helping the user change the synthetic depth-of-field effect to alter the visual information in a particular way by providing a particular type of input. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first type of gesture (e.g., 650$o$, 650$u$, 650$z$, 650$a$1, 650$ai$) is a second single-tap gesture (e.g., 650$o$, 650$ai$) (e.g., a tap gesture directed to (e.g., on) the second subject) (and/or, in some embodiments, a non-tap gesture (e.g., a rotational gesture, swipe gesture) directed to the subject). In some embodiments, the second type of gesture (e.g., 650$o$, 650$u$, 650$z$, 650$a$1, 650$ai$) is a second multi-tap gesture (e.g., 650$u$, 650$a$1) (e.g., a multi-tap gesture (e.g., a double-tap gesture) directed to (e.g., on) the second subject) (and/or, in some embodiments, a non-tap gesture (e.g., a rotational gesture, swipe gesture) directed to the subject). In some embodiments, a multi-tap gesture includes more taps than a single-tap gesture. Altering the visual information differently based on the type of gesture (e.g., single-tap gesture and/or multi-tap gesture) that is received provides the user with more control of the system by helping the user change the synthetic depth-of-field effect to alter the visual information in a particular way by providing a particular type of input. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while the visual information captured by the one or more cameras is being altered to emphasize the second subject until first criteria are met (e.g., after a determination was made that the gesture that corresponds to selection of the second subject is a first type of gesture), the computer system detects a gesture of the first type of gesture (e.g., 650$be$) (and not the second type of gesture) that is directed to the second subject. In response to detecting the gesture of the first type of gesture (e.g., 650*be*) (e.g., while the visual information captured by the one or more cameras is being altered to emphasize the second subject until first criteria are met) that is directed to the second subject, the computer system alters the visual information captured by the one or more cameras to emphasize the second subject until second criteria are met (e.g., in relation to the temporary/non-temporary change to the synthetic depth-of-field effect discussed above in relation to FIGS. 6S and 6BE). In some embodiments, in accordance with a determination that the gesture that corresponds to selection of the second subject is the second type of gesture, the visual information ceases to be altered for the duration of the video until a gesture is detected (e.g., a gesture that corresponds to selection of a subject in the representation of the media) and irrespective of whether a predetermined period of time has passed (e.g., using one or more techniques as described above in relation to method 800). In some embodiments, while the visual information captured by the one or more cameras is being altered to emphasize the second subject until first criteria are met, the computer system detects a gesture of the first type of gesture that is directed to a subject that is not the second subject and, in response to detecting the gesture of the first type of gesture that is directed to the subject (e.g., the first subject) that is not the second subject, the computer system alters the visual information captured by the one or more cameras to emphasize the subject that is not the second subject until first criteria are met. Altering the visual information captured by the one or more cameras to emphasize the second subject until second criteria are met in response to detecting the gesture of the first type of gesture that is directed to the second subject while the visual information captured by the one or more cameras is being altered to emphasize the second subject until first criteria are met provides the user additional control over the user interface by allowing the user to forgo inputting a more complex gesture to altering the visual information captured by the one or more cameras to emphasize the second subject until second criteria are met in certain situations, which reduces the number of inputs needed to perform an operation and can lead to more efficient control of the user interface for some users.

In some embodiments, changing the synthetic depth-of-field effect to alter the visual information captured by the one or more cameras to emphasize the second subject in the plurality of frames relative to the first subject includes, in accordance with determination that the gesture (e.g., 650*o*, 650*u*, 650*z*, 650*a*1, 650*ai*) that corresponds to selection of the second subject is a third type of gesture (e.g., 650*z*) (e.g., that is different from the first type of gesture and the second type of gesture) (e.g., a press-and-hold gesture) (and/or, in some embodiments, a non-press-and-hold gesture (e.g., a tap gesture, swipe gesture) directed to the subject), altering the visual information captured by the one or more cameras to emphasize the second subject by applying the synthetic depth-of-field effect to a fixed focal plane (e.g., a focal plane that does not change as a respective subject (e.g., a second subject) moves within the plurality of frames) in the plurality of frames. In some embodiments, the fixed focal plane includes a location at which the gesture that corresponds to selection of the second subject was detected via the one or more input devices. Altering the visual information differently based on the type of gesture (e.g., third type of gesture) that is received provides the user with more control of the system by helping the user change the synthetic depth-of-field effect to alter the visual information in a particular way by providing a particular type of input. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in accordance with determination that the gesture that corresponds to selection of the second subject is the third type of gesture (e.g., 650*bb*2 and/or 650*bi*), displaying an indication of a distance to the fixed focal plane (e.g., 694*bc* and/or 694*bj*) (e.g., at a location on the representation of the video) (e.g., numbers, words, and/or symbols) (e.g., 0.01 mm-50 meters) (e.g., a distance between the computer system and/or one or more cameras of the computer system to a plane that is in the field-of-view of the one or more cameras) (e.g., on a representation of a previously captured video and/or a representation of a video that is being captured). Displaying an indication of a distance to the fixed focal plane in response to detecting the request to change subject emphasis at the second time in the video provides visual feedback to the user regarding the fixed focal plane that was selected, which provides improved visual feedback.

In some embodiments, while displaying the second user interface object (and determining whether emphasis should be changed from the first subject to the second subject and after detecting the gesture that corresponds to selection of the second subject) and not displaying the first user interface object, and in accordance with a determination that the first subject (e.g., relative to the other subjects) in the plurality of frames (e.g., in a subset of the plurality of frames) satisfies a set of automatic selection criteria (e.g., as described above in relation to methods 700), the computer system displays (redisplays) the first user interface object and ceases to display the second user interface object (and changes (automatically (e.g., without detecting a gesture directed to the first subject and/or to a location on the user interface)) the synthetic depth-of-field effect to alter the visual information captured by the one or more cameras to emphasize the first subject in the plurality of frames relative to the second subject). Automatically displaying the first user interface object and ceasing to display the second user interface object when prescribed conditions are met allows the computer system to automatically switch between subjects that are emphasized and/or not emphasized based on the prescribed conditions. Performing an optimized operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in accordance with a determination that the gesture (e.g., 650*o*, 650*u*, 650*z*, 650*a*1, 650*ai*) corresponds to selection of the second subject is a fourth type of gesture (e.g., 650*o*, 650*ai*) (e.g., single tap gesture) (and/or, in some embodiments, a non-tap gesture (e.g., a rotational gesture, swipe gesture) directed to the subject), the set of automatic selection criteria is a first set of automatic selection criteria (e.g., that when satisfied causes the computer system to permanently switch emphasis to another subject when an emphasized subject goes out of the frame and irrespective of whether the emphasized subject goes back into the frame). In some embodiments, in accordance with a determination that the gesture corresponds to selection of the second subject is a fifth type of gesture (e.g., 650_u_, 650_a_1) (e.g., a multi-tap gesture (e.g., a double-tap gesture)) (and/or, in some embodiments, a non-tap gesture (e.g., a rotational gesture, swipe gesture) directed to the subject) that is different from the fourth type of gesture, the set of automatic selection criteria is a second set of automatic selection criteria (e.g., that when satisfied causes the computer system to temporarily switch emphasis to another subject until an emphasized subject comes back in frame after going out of the frame) that is different from the first set of automatic selection criteria (e.g., as discussed above in relation to FIGS. 6O-6V and FIGS. 6AI-6AM). Automatically changing the set of automatic selection criteria when prescribed conditions are met allows the computer system to switch the set of automatic selection criteria that used to automatically switch between which subjects are being emphasized and/or automatically change the synthetic depth-of-field effect that is applied based on the prescribed conditions. Performing an optimized operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, before detecting the gesture (e.g., 650_o_, 650_u_, 650_z_, 650_a_1, 650_ai_) that corresponds to selection of the second subject, the set of automatic selection criteria includes a criterion that is satisfied when a respective subject (e.g., 632, 634, 638) in the representation (e.g., 630, 660) of the media satisfies a first selection confidence threshold (e.g., a confidence threshold based on the detected movement, gaze, face, distance from a viewpoint of the one or more cameras of the respective subject). In some embodiments, in response to detecting the gesture (e.g., 650_o_, 650_u_, 650_z_, 650_a_1, 650_ai_) that corresponds to selection of the second subject (e.g., 632, 634, 638), the set of automatic selection criteria includes a criterion that is satisfied when the respective subject (e.g., 632. 634, 638) in the representation of the media satisfies a second selection confidence threshold (e.g., a confidence threshold based on the detected movement, gaze, face, distance from a viewpoint of the one or more cameras of the respective subject) that is higher than the first selection confidence threshold (e.g., a confidence threshold based on the detected movement, gaze, face, distance from a viewpoint of the one or more cameras of the respective subject). In some embodiments, when the set of automatic selection criteria includes the criterion that is satisfied when the respective subject in the representation of the media satisfies the second selection confidence threshold, the number of changes to the synthetic depth-of-field effect is decreased as opposed to the number of changes that occur when the set of automatic selection criteria includes the criterion that is satisfied when the respective subject in the representation of the media satisfies the first selection confidence threshold. Automatically increasing a threshold for the automatic selection criteria to be satisfied when prescribed conditions are met allows the computer system to reduce the amount of changes in the synthetic depth-of-field effect that is applied after a gesture to change the synthetic depth-of-field effect is received. Performing an optimized operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the synthetic depth-of-field effect that alters the visual information captured by the one or more cameras to emphasize the second subject (e.g., 632, 634, 638) in the plurality of frames relative to the first subject e.g., 632, 634, 638) changes {(e.g., a magnitude and/or location of the synthetic depth of field effect changes) and, in some embodiments, the synthetic depth of field effect changes through a plurality of intermediate states.} over time (e.g., over the first capture duration) as the second subject moves within a field-of-view of the one or more cameras (and the second subject continues to be emphasized relative to the first subject in each of the plurality of frames) (e.g., using one or more techniques as described above in relation to method 700) (e.g., as discussed above in relation to FIGS. 6O-6V). In some embodiments, as a part of displaying the second user interface object, the computer system moves the second user interface object moves as the second subject moves in the plurality of frames.

In some embodiments, the user interface includes a video navigation user interface element (e.g., 664) (and, in some embodiments, the video navigation user interface element does not include the representation of the video and/or the first user interface object and/or the second user interface object) (and, in some embodiments, the synthetic depth-of-field effect is not applied to the video navigation user interface element while being applied to the representation of the video) (and, in some embodiments, the video navigation user interface element is displayed with the representation of the video and/or the first user interface object and/or the second user interface object).

In some embodiments, while displaying the video navigation user interface element (e.g., 664) and in response to detecting the gesture (e.g., 650_o_, 650_u_, 650_z_, 650_a_1, 650_ai_) that corresponds to selection of the second subject, the computer system (e.g., 600) displays, in the video navigation user interface element (e.g., 664) (e.g., a time line scrubber), a user interface object (e.g., 688_c_, 688_e_, 688_h_) indicating that a user-specified change occurred (e.g., concerning which subjects have been emphasized) at a time in (during playback of, during capture of) the video (e.g., a first indication that represents the changing of the synthetic depth-of-field effect to alter the visual information captured by the one or more cameras to emphasize the second subject in the plurality of frames relative to the first subject) (e.g., as described below in relation to method 900). In some embodiments, a user interface object indicating that a user-specified change occurred at the time (e.g., a time when the gesture that corresponds to selection of the second subject was detected) in the video is displayed at a location that corresponds to a frame in the video at which the second subject was displayed when the gesture that corresponds to selection of the second subject was detected. Displaying a user interface object indicating that a user-specified change occurred at a time in the video in response to detecting the gesture provides the user with feedback that the gesture caused a user-specified change to a synthetic depth-of-field effect occurred at the time in the video. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the user interface object (e.g., 688*c*, 688*e*, 688*h*) indicating that the user-specified change occurred includes, in accordance with a determination that the gesture (e.g., 650*o*, 650*u*, 650*z*, 650*ai*, 650*a*1) corresponds to selection of the second subject (e.g., 632, 634, 638) is a sixth type of gesture (e.g., single tap gesture) (and/or, in some embodiments, a non-tap gesture (e.g., a rotational gesture, swipe gesture) directed to the subject) (e.g., a request to make a temporary emphasis change), a fourth visual appearance (e.g., color, highlighting, text, shape) (e.g., a bracket without a shape (e.g., circle) inside of it). In some embodiments, the user interface object (e.g., 688*c*, 688*e*, 688*h*) indicating that the user-specified change occurred includes, in accordance with a determination that the gesture corresponds to selection of the second subject is a seventh type of gesture (e.g., 650*o*, 650*u*, 650*z*, 650*ai*, 650*a*1) (e.g., a multi-tap gesture (e.g., a double-tap gesture)) (and/or, in some embodiments a non-tap gesture (e.g., a rotational gesture, swipe gesture) directed to the subject) (e.g., a request to make a permanent emphasis change) that is different from the sixth type of gesture, a fifth visual appearance (e.g., color, highlighting, text, shape) (e.g., a bracket with a shape (e.g., circle) inside of it) that is different from the fourth visual appearance (e.g., as discussed above in relation to FIGS. 6AI-6AM). Displaying the user interface indicating that a user-specified change occurred differently based on the type of gesture that was received provides the user with feedback that a particular synthetic depth-of-field effect that was applied to the video. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, displaying the second user interface object (e.g., 672*a*-672*c*, 678*a*-678*b*) includes, in accordance with a determination that the gesture corresponds to selection of the second subject (e.g., 632, 634, 638) is an eighth type of gesture (e.g., 650*o*, 650*ai*) (e.g., single tap gesture) (and/or, in some embodiments a non-tap gesture (e.g., a rotational gesture, swipe gesture) directed to the subject) (e.g., a request to make a temporary emphasis change), displaying the second user interface object (e.g., 672*a*-672*c*) with a sixth visual appearance (e.g., color, highlighting, text, shape) (e.g., a bracket without a shape (e.g., circle) inside of the bracket). In some embodiments, displaying the second user interface object (e.g., 672*a*-672*c*, 678*a*-678*b*) includes, in accordance with a determination that the gesture corresponds to selection of the second subject is a ninth type of gesture (e.g., 650*u*, 650*a*1) (e.g., a multi-tap gesture (e.g., a double-tap gesture)) (and/or, in some embodiments a non-tap gesture (e.g., a rotational gesture, swipe gesture) directed to the subject) (e.g., a request to make a permanent emphasis change) that is different from the eighth type of gesture, displaying the second user interface object (e.g., 678*a*-678*b*) with a seventh visual appearance (e.g., color, highlighting, text, shape) e.g., a bracket with a shape (e.g., circle) inside of the bracket) that is different from the sixth visual appearance. Displaying the second user interface object differently based on the type of gesture that was received provides the user with feedback that a particular synthetic depth-of-field effect that was applied to the video. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the user interface is a media capturing user interface (e.g., a user interface for capturing media, a user interface that includes a selectable user interface object for capturing media, a user interface that does not include a video scrubber) (e.g., user interface of FIGS. 6B-6AB, as described in relation to method 700). In some embodiments, after detecting the gesture (e.g., 650*o*, 650*u*, 650*z*, 650*a*1, 650*ai*) that corresponds to selection of the second subject and while displaying the user interface (e.g., and after capturing the video), the computer system detects, via the one or more input devices, one or more gestures (e.g., one or more tap gestures, swipe gestures, and/or press-and-hold gestures, a sequence of gestures). In some embodiments, in response to detecting the one or more gestures, the computer system displays a media editing user interface (e.g., user interface of FIGS. 6AD-6AQ) (e.g., user interface for editing media, a user interface that does not include a selectable user interface object for capturing media, a user interface that includes a video scrubber) (e.g., as described above in relation to FIG. 6AC). In some embodiments, in response to detecting the one or more gestures, the computer system (e.g., 600) displays a media editing user interface that includes a second representation of the video that includes a third plurality of frames. In some embodiments, the second representation (e.g., 660) includes the first subject and the second subject. In some embodiments, in response to detecting the one or more gestures, the computer system displays a media editing user interface that includes a sixth user interface object (e.g., 672*a*-672*c*) indicating that the first subject is being emphasized by a synthetic depth-of-field effect that alters the visual information captured by the one or more cameras to emphasize the first subject in the third plurality of frames relative to the second subject. In some embodiments, while displaying the media editing user interface, the computer system detects, via the one or more input devices, a second gesture (e.g., 650*ai*, 650*a*1) that corresponds to selection of the second subject (e.g., 632, 634, 638) in the second representation (e.g., 660) of the video (e.g., a tap gesture, swipe gesture, and/or press-and-hold gesture). In some embodiments, the second gesture is the gesture of the same type as the type of gesture that corresponds to selection of the second subject in the representation of the video (e.g., that was displayed in the media capturing user interface). In some embodiments, the second type of gesture will cause the computer system to perform the same functions in response to receiving the second type of gesture as the type of gesture that corresponds to selection of the second subject in the representation of the video (e.g., when the computer system performs the same functions in response to receiving a type of gesture to change the synthetic depth-of-field effect, irrespective of whether the video is being captured (and/or record) or the video is being edited after it has been captured and/or recorded. In some embodiments, while displaying a video that does not have a synthetic depth-of-field effect applied (was captured when the video was not operating in a cinematic mode) or does not have depth information (or with insufficient depth information to generate a synthetic depth-of-field effect) (e.g., irrespective of whether the video is being captured and/or has been captured), the computer system does not apply and/or change a synthetic depth-of-field effect to alter the visual information captured by the one or more cameras and/or perform any action in response to receiving one or more inputs to change the synthetic depth-of-field effect. In some embodiments, in response to detecting the second gesture that corresponds to selection of the second subject in the second representation of the video, the computer system changes the synthetic depth-of-field effect to alter the visual information captured by the one or more cameras to emphasize the second subject in the third plurality of frames relative to the first subject. In some embodiments, in response to detecting the second gesture that corresponds to selection of the second subject in the second representation of the video, the computer system displays a seventh user interface object indicating that the second subject is being emphasized by the changed synthetic depth-of-field effect that alters the visual information captured by the one or more cameras to emphasize the second subject in the third plurality of frames relative to the first subject. In some embodiments, the representation of the video is a representation of a video that is currently being captured and the second representation of the video is a representation of the video that has been previously captured. In some embodiments, the same gestures (e.g., single tap gesture, multi-tap gesture, press-and-hold gesture) that cause the synthetic depth-of-field effect to be changed when the computer system is in a video editing mode causes the synthetic depth-of-field effect to be changed the computer system is in a video capturing mode. Performing the same operations when a second gesture that corresponds to selection of the second subject in the second representation of the video is received during editing media that were performed when a gesture that corresponds to selection of the second subject in the second representation of the video was received during capturing the media provides the user more control over the system by allowing the user to control multiple user interfaces in the same way. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, after detecting the gesture (e.g., 650*o*, 650*u*, 650*z*, 650*a*1, 650*ai*) that corresponds to selection of the second subject (e.g., 632, 635, 638) and changing the synthetic depth-of-field effect to alter the visual information captured by the one or more cameras to emphasize the second subject in the plurality of frames relative to the first subject, the computer system detects a first gesture (e.g., 650*o*, 650*u*, 650*z*, 650*a*1, 650*ai*) (e.g., a press-and-hold gesture) (and/or, in some embodiments, a non-press-and-hold gesture (e.g., a tap gesture, a swipe gesture)) that is directed to the representation of the media (e.g., 630, 660) (and not directed to any subject in the representation of the media). In some embodiments, in response to detecting the first gesture (e.g., 650*o*, 650*u*, 650*z*, 650*a*1, 650*ai*) that is directed to the representation of the media, the computer system (e.g., 600) modifies the changed synthetic depth-of-field effect to alter the visual information captured by the one or more cameras (e.g., based on the location of the gesture that is directed to the representation of media (and not directed to any subject in the representation of the media)) (e.g., as described above in relation to FIGS. 6O-6V and FIGS. 6AI-6AL). In some embodiments, as a part of modifying the changed synthetic depth-of-field effect to alter the visual information captured by the one or more cameras in response to detecting the gesture that is directed to the representation of the media, the computer system alters the visual information captured by the one or more cameras to emphasize the second subject applying the synthetic depth-of-field effect to a fixed focal plane (e.g., a focal plane that does not change as a respective subject (e.g., a second subject) moves within the plurality of frames).

In some embodiments, the user interface includes a selectable user interface object (e.g., 622*e*) for changing the synthetic depth-of-field effect that, when selected, changes (e.g., changes a characteristic of the effect (e.g., a visual intensity of the effect)) the synthetic depth-of-field effect. In some embodiments, while displaying the user interface for changing the synthetic depth-of-field effect and while the synthetic depth-of-field effect to alter the visual information captured by the one or more cameras to emphasize the second subject in the plurality of frames relative to the first subject, the computer detects one or more gestures that include a gesture directed to the a selectable user interface object for changing the synthetic depth-of-field effect and, in response to detecting the one or more gestures that include the gesture directed to the a selectable user interface object for changing the synthetic depth-of-field effect, modifies the changed synthetic depth-of-field effect to alter the visual information captured by the one or more camera differently (and, in some embodiments, while continuing to emphasize the second subject in the plurality of frames relative to the first subject and/or continuing to display the second user interface object). Displaying a selectable user interface object for changing the synthetic depth-of-field effect that, when selected, changes the synthetic depth-of-field effect provides the user with more control over the system and allows the user to change the synthetic depth-of-field effect that is applied to the video. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the user interface includes a selectable user interface object for controlling a video capture mode (e.g., a cinematic video capture mode) (e.g., 622*c*) (e.g., as described above in relation to 620*e* and 622*c*). In some embodiments, the selectable user interface object for controlling the video capture mode (e.g., 622*c*) is displayed with (e.g., includes) a status indication that indicates that the video capture mode is in an active state (e.g., 622*c* in FIG. 6AP). In some embodiments, while displaying the user interface that includes the representation (e.g., 660) of the video, the first user interface object (e.g., 672*a*-672*c*, 678*a*-678*b*) (and/or the second user interface object), and the selectable user interface object for controlling the video capture mode (e.g., 622*c*) is displayed with (e.g., includes) the status indication that indicates that the video capture mode is in an active state (e.g., 622*c* in FIG. 6AP), the computer system (e.g., 600) applies the synthetic depth-of-field effect that alters the visual information captured by the one or more cameras to emphasize the first subject in the plurality of frames relative to the second subject (e.g., and/or applying the synthetic depth-of-field effect that alters the visual information captured by the one or more cameras to emphasize the second subject in the plurality of frames relative to the first subject). In some embodiments, while applying the synthetic depth-of-field effect that alters the visual information captured by the one or more cameras to emphasize the first subject in the plurality of frames relative to the second subject (e.g., 632, 634, 638) (e.g., and/or while displaying the user interface that includes the representation of the video, the first user interface object (and/or the second user interface object), and the selectable user interface object for controlling the video capture mode with the status indication that indicates that the video capture mode is in an active state), the computer system detects a gesture (e.g., 650*ap*1) directed to the selectable user interface object for controlling the video capture mode (e.g., a tap gesture) (and/or, in some embodiments, a non-tap gesture (e.g., a press-and-hold gesture, a swipe gesture)). In some embodiments, in response to detecting the gesture directed to the selectable user interface object for controlling the video capture mode (e.g., 620*e*), the computer system (e.g., 600) ceases to apply the synthetic depth-of-field effect that alters the visual information captured by the one or more cameras to emphasize the first subject in the plurality of frames relative to the second subject (e.g., as described above in relation to FIG. 6AQ) (e.g., and/or ceases to apply the synthetic depth-of-field effect that alters the visual information captured by the one or more cameras to emphasize the second subject in the plurality of frames relative to the first subject) (e.g., ceases to apply any synthetic depth-of-field effect). In some embodiments, in response to detecting the gesture directed to the selectable user interface object for controlling the video capture mode, the computer system displays the selectable user interface object for controlling a video capture mode with a status indication that indicates that the video capture mode is in an inactive state. In some embodiments, in response to detecting the gesture directed to the selectable user interface object for controlling the video capture mode, the computer system ceases to display the first user interface object (and/or the second user interface object). In some embodiments, after ceasing to apply the synthetic depth-of-field effect that alters the visual information captured by the one or more cameras to emphasize the first subject in the plurality of frames relative to the second subject in response to detecting the gesture directed to the selectable user interface object for controlling the video capture mode, the computer system detects a second gesture directed to the selectable user interface object for controlling the video capture mode and, in response to detecting the second gesture directed to the selectable user interface object for controlling the video capture mode, applies (reapplies) the synthetic depth-of-field effect that alters the visual information captured by the one or more cameras to emphasize the first subject in the plurality of frames relative to the second subject (e.g., and/or applies the synthetic depth-of-field effect that alters the visual information captured by the one or more cameras to emphasize the second subject in the plurality of frames relative to the first subject) and/or displays the selectable user interface object for controlling the video capture mode with the status indication that indicates that the video capture mode is in the active state. In some embodiments, after ceasing to apply the synthetic depth-of-field effect that alters the visual information captured by the one or more cameras to emphasize the first subject in the plurality of frames relative to the second subject, the computer systems displays a representation of the video without the synthetic depth-of-field effect applied. In some embodiments, the representation of the video that is displayed without the synthetic depth-of-field effect applied includes a physical depth of field effect that occurs naturally due to the camera lens but is less prominent (e.g., less blurred) than the synthetic depth of field effect. Displaying the selectable user interface object for controlling the video capture mode that turns on/off the application of the synthetic depth-of-field effect reduces the number of operations needed for a the user to change the synthetic depth-of-field effect that is applied to the video. Reducing the number of operations enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, before detecting the gesture (e.g., 650*ap*1) directed to the selectable user interface object for controlling the video capture mode (e.g., 622*c*), the representation (e.g., 660) is displayed with a first amount of blur (e.g., synthetic blur (and, in some embodiments, and natural blur), synthetic blur caused by the synthetic depth-of-field effect being applied) (e.g., foreground and background blur). In some embodiments, in response to detecting the gesture (e.g., 650*ap*1) directed to the selectable user interface object for controlling the video capture mode, the computer system displays, via the display generation component, the representation (e.g., 660) of the video with a second amount of blur (e.g., natural blur) that is lower than the first amount of blur. In some embodiments, in response to detecting the gesture directed to the selectable user interface object for controlling the video capture mode, the computer system reduces the amount of blur in the representation of the video media and/or removes the synthetic blur (e.g., blur caused by the synthetic depth-of-field effect being applied). Displaying the representation of video with different amounts of blur in response to detecting the gesture directed to the selectable user interface object for controlling the video capture mode provides the user with visual feedback concerning whether a synthetic depth-of-field effect will be and/or is applied to the video. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to detecting the gesture (e.g., 650*o*, 650*u*, 650*ai*, 650*a*1) that corresponds to selection of the second subject, the computer system (e.g., 600) configures a focus setting of one or more cameras to focus on the second subject (e.g., 638) in the representation of the video. In some embodiments, the computer system is not configured to automatically change the focus setting of the one or more cameras (e.g., between one or more portions of the representation of the video (e.g., based on changes in the representation of the media while the representation of media includes the first subject)) for at least a predetermined period of time (e.g., 30-90 seconds). In some embodiments, while the computer system is configured to focus on the second subject (e.g., 632, 634, 638) in the representation (e.g., 630, 660) of the video, the computer system (e.g., 600) detects a second gesture (e.g., 650*ai*) (e.g., a single-tap gesture, a gesture that is not a press-and-hold gesture) (and/or, in some embodiments, a non-tap gesture (e.g., a rotational gesture, a swipe gesture)) that is directed to the representation (e.g., 660) of the video (and not directed to any subject in the representation of the media). In some embodiments, in response to detecting the second gesture (e.g., 650*ai*) that is directed to the representation of the video, the computer system (e.g., 600) is enabled to automatically change the focus setting of the one or more cameras for at least the predetermined period of time (e.g., as described below in relation to FIGS. 6AI-6AM). In some embodiments, while the first user interface object is displayed, the one or more cameras are focused on the first subject. In some embodiments, in response to detecting the gesture that corresponds to selection of the second subject in the representation of the video media, the computer system changes the one or more cameras from being focused on the first subject to be focused on the second subject. In some embodiments, in response to detecting the gesture that corresponds to selection of the second subject in the representation of the video media, the computer system is not configured to maintain a set of auto exposure values.

In some embodiments, the representation of the video includes a representation (e.g., visible representation) of a subset of content from a first portion (e.g., live preview 630 of FIG. 6R) of a field-of-view of one or more cameras. In some embodiments, the field-of-view of the one or more cameras extends beyond the first portion of the field-of-view to a second portion (e.g., 603 of FIG. 6R1) of the field-of-view of the one or more cameras that is not included in the representation (e.g., the displayed representation of the video) of the video (e.g., without including a representation of content from the second camera (e.g., as discussed below)). In some embodiments, a determination as to which subject to emphasize is based on information from the second portion of the field-of-view of the one or more cameras during the video (e.g., during capture of the video or after capture of the video). In some embodiments, the first portion of the video and the second portion of the video is in the field-of-view of a first camera. In some embodiments, the first portion of the video is in the field-of-view of the first camera and the second portion of the video is in the field-of-view of a second camera that is different from the first camera. In some embodiments, the first portion of the video is outside of the field-of-view of the first camera and inside of the field-of-view of the second camera (e.g., a camera that has a wider field-of-view than the first camera). In some embodiments, the determination as to which subject to emphasize includes automatically selecting a respective subject to be emphasized before the respective subject is visible in the first portion of the field of view. In some embodiments, the determination as to which subject to emphasize includes: detecting the respective subject move out of the first portion of the field-of-view while the respective subject is being emphasized; and in response to detecting the respective subject move out of the first portion of the field-of-view: in accordance with a determination that the respective subject moves out of the second portion of the field of view, automatically select a different subject to be emphasized; and in accordance with a determination that the first subject remains in the second portion of the field of view, forgo selecting a different subject to be emphasized for at least a predetermined period of time (e.g., and continuing to emphasize the respective subject if the respective subject returns to the first portion of the field of view) (e.g., as discussed above in relation to automatic change indicator 686*c*). In some embodiments, if the predetermined period of time elapses without the respective subject returning to the first portion of the field of view, the computer system automatically selects a different subject to be emphasized. In some embodiments, if the respective subject ceases to be detected in the second portion of the field-of-view (e.g., whether or not the predetermined period of time has elapsed), the computer system automatically selects a different subject to be emphasized.

Note that details of the processes described above with respect to method 800 (e.g., FIG. 8) are also applicable in an analogous manner to the methods described herein. For example, methods 700, 900, 1100, and/or 1300 optionally includes one or more of the characteristics of the various methods described above with reference to method 800. For example, the method described below in method 900 can be used to display media in a media editing user interface after the media is captured using one or more techniques described in relation to method 800. For brevity, these details are not repeated above and/or below.

FIG. 9 is a flow diagram illustrating an exemplary method for altering visual media using a computer system in accordance with some embodiments. Method 900 is performed at a computer system (e.g., 100, 300, 500, 600, a smartphone, and/or a smartwatch) that is in communication with a display generation component (e.g., a display controller and/or a touch-sensitive display system). In some embodiments, the computer system is in communication with one or more input devices (e.g., a touch-sensitive surface) and/or one or more cameras (e.g., one or more cameras (e.g., dual cameras, triple camera, quad cameras, etc.) on the same side or different sides of the computer system (e.g., a front camera, a back camera)). Some operations in method 900 are, optionally, combined, the orders of some operations are, optionally, changed, and some operations are, optionally, omitted.

As described below, method 900 provides an intuitive way for altering visual media. The method reduces the cognitive burden on a user for altering visual media, thereby creating a more efficient human-machine interface. For battery-operated computing devices, enabling a user to alter visual media faster and more efficiently conserves power and increases the time between battery charges.

The computer system (e.g., 600) displays (902), via the display generation component, a user interface (e.g., a media viewer/editing user interface) (and, in some embodiments, the user interface is displayed using one or more techniques as described above in relation to methods 700 and 800) that includes (e.g., concurrently displaying) concurrently displaying (904) a representation (e.g., 660) (e.g., of a frame (an image)) of a video (e.g., a video media) (e.g., video captured using one or more techniques as described above in relation to methods 700 and 800) having a first duration. The video includes a plurality of changes in subject (e.g., 632, 634, 638) emphasis in the video, where a change in subject emphasis in the video includes a change in appearance of visual information captured by one or more cameras to emphasize one subject relative to one or more elements in the video (e.g., via a synthesized depth of field-of-effect, as described above in relation to methods 700 and 800) (e.g., a first subject is emphasized at a first time with a change to a second subject being emphasized at a second time). The plurality of changes include an automatic change in subject emphasis at a first time during the first duration (e.g., as described above in relation to FIGS. 6D-6K) (e.g., a change that occurs without intervening user input/gesture(s) (e.g., using one or more techniques as described above in relation to methods 700 and 800; at least one automatic change) and a user-specified change in subject emphasis at a second time during the first duration that is different from the first time (e.g., as described above in relation to FIGS. 6O-6Q, FIGS.

6U-6V, and FIGS. 6Z-6AB) (e.g., a manual change, a change that occurred in response to one or more gestures (e.g., using one or more techniques as described above in relation to methods 800); at least one user-specified change).

The computer system (e.g., 600) displays (902) the user interface that includes concurrently displaying (906) a video navigation user interface element (e.g., 664) (e.g., timeline scrubber) for navigating through (e.g., a plurality of frames (e.g., images) of) the video that includes a representation (e.g., 686*a*, 686*b*, 686*d*, 686*f*, and/or 686*g*) (e.g., an image/frame of video) of the first time and a representation (e.g., 688*c*, 688*e*, and/or 688*h*) (e.g., an image/frame of video) of the second time. The representation (e.g., 688*c*, 688*e*, and/or 688*h*) of the second time is visually distinguished from other times (e.g., other representations of other times) (e.g., 664*b*) in the first duration of the video that do not correspond to changes in subject emphasis. In some embodiments, the representation of the first time is visually distinguished from other times (in the first duration of the video that do not correspond to changes in subject emphasis. The representation (e.g., 686*a*, 686*b*, 686*d*, 686*f*, and/or 686*g*) (e.g., 664*b*) of the first time is visually distinguished from the representation (e.g., 688*c*, 688*e*, and/or 688*h*) (e.g., 664*b*) of the second time (e.g., to indicate that a user-specified change in subject emphasis occurred at a location). In some embodiments, the representation of the first time is visually distinguished from the representation of the second time using some visual distinction other than a location of the representation of the first time in the video navigation user interface element (e.g., that the location of the representation of the first time is displayed closer to an indication (e.g., graphical object) of the automatic change than the representation of the second time, that the location of the representation of the second time is displayed closer to an indication (e.g., the graphical object, the representation of the second time is displayed with a different synthetic depth-of-field effect that has been applied than the representation of the first time (e.g., portions of the representation of the second time is blurred different from corresponding portions of the representation of the first time)) of the automatic change than the representation of the first time, the representation is displayed). In some embodiments, the first time is a time where the computer system has automatically determined that the automatic change should occur. In some embodiments, the first time is a time (e.g., or more times) at which the emphases of the subject(s) has changed a representation that is displayed at the first time during playback of the video. In some embodiments, the second time is a time where a user input/gesture was detected that caused the user-specified change to occur. In some embodiments, the second time is time at which the emphases of the subject(s) has changed a representation that is displayed at the second time during playback of the video. Displaying a representation of a first time (e.g., automatic change) that is visually distinguished from other representations (e.g., representations of a second time (e.g., user-specified change)) provides the user with visual feedback that a different change in emphasis has occurred at the first time than at other times. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the automatic change in subject emphasis is a first synthetic depth-of-field effect that alters the visual information captured by one or more cameras (e.g., one or more cameras of the computer system and/or another computer system) to emphasize a first subject (e.g., 632, 634, 638) (e.g., third subject, fourth subject, or another subject) in the video relative to a second subject (e.g., 632, 634, 638) (e.g., third subject, fourth subject, or another subject) in the video (e.g., using one or more techniques as described above in relation to methods 700 and 800) (e.g., as described above in relation to Table I). The user-specified change in subject emphasis is a second synthetic depth-of-field effect that alters the visual information captured by the one or more cameras to emphasize a third subject (e.g., first subject, second subject, or another subject) in the video relative to a fourth subject (e.g., first subject, second subject, or another subject) in the video (e.g., using one or more techniques as described above in relation to methods 700 and 800) (e.g., as described above in relation to Table I).

In some embodiments, the video navigation user interface element (e.g., 664) for navigating through the video does not include a graphical user interface object (e.g., 686*a*, 686*b*, 686*d*, 686*f*, and/or 686*g*) indicating that the automatic change occurred at the first time. In some embodiments, while the video navigation user interface element for navigating through the video does not include the graphical user interface object indicating that the automatic change occurred at the first time, the video navigation user interface element for navigating through the video includes a graphical user interface object indicating that the user-specified change occurred at the second time. Displaying a graphical user interface object indicating that the automatic change occurred at the first time provides the user with visual feedback that an automatic change in emphasis has occurred at the first time than at other times. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, video navigation user interface element (e.g., 664) for navigating through the video includes, at a first location (e.g., location of (e.g., 686*a*, 686*b*, 686*d*, 686*f*, and/or 686*g*) on the video navigation user interface element (e.g., above, below, and/or on a first frame of the video), a first graphical user interface object (e.g., 686*a*, 686*b*, 686*d*, 686*f*, and/or 686*g*) indicating that the automatic change occurred (e.g., concerning which subjects have been emphasized) at the first time in (during playback of, during capture of) the video (e.g., indicating that an automatic change has occurred concerning which subjects have been emphasized in a first frame of the video). In some embodiments, the first graphical user interface object (e.g., 686*a*, 686*b*, 686*d*, 686*f*, and/or 686*g*) has a first visual appearance (e.g., color, highlighting, text, shape) (e.g., a diamond, a white user interface object, a white diamond). In some embodiments, the video navigation user interface element (e.g., 644) for navigating through the video includes, at a second location (e.g., location of 688*c*, 688*e*, 688*h*) on the video navigation user interface element that is different from the first location, a second graphical user interface object (e.g., 688*c*, 688*e*, 688*h*) indicating that the user-specified change occurred (e.g., concerning which subjects have been emphasized) at the second time, different from the first time, in the video (e.g., indicating that a user-specified change occurred concerning which subjects have been emphasized in a second frame of the video that is different from the first frame). In some embodiments, the second graphical user interface object (e.g., 688*c*, 688*e*, 688*h*) has a second visual appearance (e.g., color, highlighting, text, shape) (e.g., a circle, a yellow user interface object, a yellow circle) that is different from the first visual appearance (e.g., irrespective of the location of the display in which the first user interface object and the second user interface object are displayed). In some embodiments, manual changes made during video capture looks the same as manual changes made during editing video (and, in some embodiments, manual changes look different. Displaying a first graphical user interface object indicating that the automatic change occurred with a different visual appearance than a second graphical user interface object indicating that the user-specified change occurred provides the user with visual feedback to distinguish between representations of when an automatic change in emphasis has occurred and a user-specified change has occurred. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the video navigation user interface element for navigating through the video includes, at a respective location on the video navigation user interface element, a graphical user interface object indicating that a respective change (e.g., a next change) has occurred at a respective time in the video that occurs before the second time in the video. In some embodiments, in accordance with a determination that the respective change that occurred at the respective time in the video is a respective user-specified change, the computer system displays a visual indication (e.g., 688*c*1, 688*e*1, 688*h*1, 688*i*1, 688*k*1, and/or 688*m*1) (e.g., a color (e.g., yellow and/or white) that is different the one or more colors of the video navigation element when the visual indication is not displayed) that extends from the respective location (e.g., location of 688*c*, 688*e*, 688*h*, 688*i*, 688*k*, and/or 688*m*) on the video navigation user interface element (e.g., 664) to the second location (e.g., 686*d* and/or 686*f*) on the video navigation user interface element. In some embodiments, in accordance with a determination that the respective change that occurred at the respective time in the video is a respective automatic change and/or in accordance with a determination that the respective change occurs at the respective time in the video is not the respective user-specified change, forgoing displaying the visual indication that extends from the respective location on the video navigation user interface element to the second location on the video navigation user interface element. Displaying a visual indication that extends from the respective location on the video navigation user interface element to the second location on the video navigation user interface element provides visual feedback that informs the user how long a user-specified change will take place and/or over what particular portions of the video that a user-specified change will impact the video, which provides improved visual feedback.

In some embodiments, the second graphical user interface object (e.g., 688*c*, 688*e*, 688*h*) is displayed at or adjacent to the representation (e.g., 664*b*) of the second time. In some embodiments, the second graphical user interface object is displayed closer to the representation of the second time than the first graphical user interface object is displayed to the representation of the second time. In some embodiments, the first graphical user interface object is displayed on or adjacent to the representation of the first time. In some embodiments, the representation of the second time includes the second graphical user interface object. In some embodiments, the representation of the first time includes the first graphical user interface object. Displaying the second graphical user interface object is displayed on or adjacent to the representation of the second time provides the user with visual feedback concerning when a user-specified change has occurred. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the user-specified change in subject emphasis was caused in response to a gesture (e.g., 650*o*, 650*u*, 650*z*) (e.g., a single-tap gesture, a multi-tap gesture (e.g., a double-tap gesture), a press-and-hold gesture) that was detected while the video was being captured (e.g., being captured by one or more cameras of the computer system or another computer system) (e.g., using one or more techniques as described above in relation to method 800) (e.g., and/or was captured while a media capture user interface was displayed, while a selectable user interface object for capturing media was in an active state). In some embodiments, the user-specified change in subject emphasis was caused in response to a gesture that was detected after the video had been captured (e.g., while displaying a user interface that is a media editing user interface, while displaying the user interface that includes the representation of the video and the video navigation user interface element). Displaying a representation of the user-specified change in subject emphasis be caused in response to a gesture while the video was being captured provides the user with visual feedback concerning changes to the video that occurred while the video was being captured. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the representation (e.g., 688*c*, 688*e*, 688*h*) (e.g., 664) of the second time (e.g., and/or while displaying a graphical user interface object indicating that the user-specified change occurred at the second time), the computer system (e.g., 600) detects a gesture (e.g., 650*ak*) directed to the representation (e.g., 688*c*, 688*e*, 688*h*) (e.g., 664) of the second time (e.g., and/or directed to the graphical user interface object that the user-specified change occurred at the second). In some embodiments, in response to detecting the gesture (e.g., 650*ak*) directed to the representation (e.g., 688*c*, 688*e*, 688*h*) of the second time, the computer system displays a second representation (e.g., 660 in FIG. 6AL) of the second time during the first duration of the video. In some embodiments, the second representation of the second time during the first duration of video is bigger than the representation (e.g., the first representation) of the second time. In some embodiments, the second representation of the second time during the first duration of video is a representation of the video being played back and the representation of the second time is a thumbnail representation (e.g., a representation of the media that is not being played back). In some embodiments, in response to detecting the gesture directed to the representation of the second time, replacing the representation of the video with the second representation of the second time. Displaying the second representation of the second time in response to detecting the gesture directed to the representation of the second time provides the user with more control of the system by allow the user to navigate to a portion of the video that corresponds to the representation that the gesture was directed towards. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the video navigation user interface element (e.g., 664), the computer system (e.g., 600) detects a gesture (e.g., 6*ar*) directed to the video navigation user interface element. In some embodiments, in response to (e.g., and/or while) detecting the gesture (e.g., 6*ar*) directed to the video navigation user interface element (e.g., 664), navigating through the representation of the video (e.g., as described above in relation to FIG. 6R). In some embodiments, as a part of navigating through the video, the computer system displays a plurality of representations of the video in sequence while the detecting gesture directed to the video navigation user interface element and/or based on the movement of the gesture directed to the video navigation user interface element. Navigating through the video in response to detecting the gesture directed to the video navigation user interface element provides the user with more control of the system by allow the user to navigate through the video via the gesture. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, before the detecting the gesture (e.g., 650*ar*) directed to the video navigation user interface element, the video navigation user interface element includes a first playhead (e.g., 664*a*1) (e.g., a vertical line, an indicator of a time/location of a current representation of the video that is displayed, an indicator of a time/location of video playback) at a first playhead location (e.g., location of 66*a*1 in FIG. 6AR). In some embodiments, the representation (e.g., 660) of the video is a representation (e.g., 660) of the video at a time that corresponds to the first playhead location (e.g., location of 66*a*1 in FIG. 6AR). In some embodiments, in response to (e.g., and/or while) detecting the gesture (e.g., 650*ar*) directed to the video navigation user interface element, the computer system (e.g., 600) moves the first playhead (e.g., 664*a*1) from the first playhead location (e.g., location of 66*a*1 in FIG. 6AR) to a second playhead location (e.g., location of 66*a*1 in FIG. 6AR) (e.g., direction and amount or speed of movement of the playhead based on a direction amount or speed of movement of the gesture). In some embodiments, in response to (e.g., and/or while) detecting the gesture (e.g., 650*ar*) directed to the video navigation user interface element, the computer system (e.g., 600) displays a representation (e.g., 660) of the video at a time that corresponds to the second playhead location while ceasing to display the representation (e.g., 660) of the video at the time that corresponds to the first playhead location (e.g., as described above in relation to FIGS. 6AK-6AL and FIG. 6AR). Displaying a representation of the video at a time that corresponds to the second playhead location while ceasing to display the representation of the video at the time that corresponds to the first playhead location in response to a gesture allows the user to see the frame of the video that corresponds to the playhead. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while detecting the gesture (e.g., 650*ar*) directed to the video navigation user interface element (e.g., 664) (and/or in response to detecting the end of the gesture), the computer system moves a selectable indicator (e.g., 664*a*2, 664*a*3) (e.g., the first playhead, a trim indicator (e.g., an indicator that indicates the beginning and/or end of a portion of a modified video that will be saved once editing the video (e.g., an original video, the video before editing) is completed)), including in accordance with a determination that the selectable indicator is not within a threshold distance from the representation of the second time (or the representation of the first time), displaying the selectable indicator (e.g., 664*a*2, 664*a*3) moving in accordance with a detected speed of the gesture directed to the video navigation user interface element (e.g., 664). In some embodiments, while detecting the gesture directed to the video navigation user interface element (and/or in response to detecting the end of the gesture), the computer system (e.g., 600) moves the selectable indicator, including in accordance with a determination that the selectable indicator is within a threshold distance from the representation of the second time, displaying the selectable indicator (e.g., 664*a*2, 664*a*3) at the representation of the second time (e.g., as described above in relation to FIG. 6AR). In some embodiments, the selectable indicator moves faster as it gets closer to the representation of the second time (e.g., snapping point). Displaying the selectable indicator moving at a second speed that is different from the first speed in accordance with a determination that the selectable indicator is within a threshold distance from the representation of the second time reduces the number of inputs and/or the length of the inputs needed to navigate to a particular location of the video (e.g., change in synthetic depth-of-field effect). Reducing the number of inputs (and/or the length of an input) enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in accordance with a determination that the selectable indicator (e.g., 664*a*1, 664*a*2, 664*a*3) is within a threshold distance from the representation of the second time, the computer system (e.g., 600) provides a haptic output that corresponds to snapping to the second time (e.g., a vibration) (e.g., as described above in relation to FIG. 6AR). In some embodiments, the selectable indicator is the first playhead (e.g., 664*a*1). In some embodiments, the selectable indicator is a trim indicator (e.g., 664*a*2, 664*a*3) (e.g., an indicator that indicates the beginning and/or end of a portion of a modified video that will be set once editing the video (e.g., an original video, the video before editing) is completed) (e.g., a trim indicator is different from the playhead indicator). In some embodiments, the playhead is displayed between two trim indicators. In some embodiments, moving a trim indicator does not include moving a playhead and vice-versa. In some embodiments, in accordance with a determination that the second playhead is within the threshold distance from the representation of the second time, the computer system provides another type of output, such as an audio or a visual output. In some embodiments, in accordance with a determination that the second playhead is not within the threshold distance from the representation of the second time, the computer system does not provide the haptic output (e.g., moves the playhead without providing a haptic output) or the other type of output. Providing the haptic output provides the user with visual feedback concerning when the change in synthetic depth-of-field effect occurred in the video. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the representation (e.g., 660) of the video is a representation of a third time (e.g., and/or the first time or the second time) during the first duration that includes a fifth subject (e.g., 632, 634, 638) and a sixth subject (e.g., 632, 634, 638). In some embodiments, the representation of the video is displayed separately from (e.g., not a part of, with space in between or other user interface elements between, displaying in a different portion of the user interface) the video navigation user interface element. In some embodiments, displaying the representation (e.g., 660) of the video includes displaying a first user interface object (e.g., 672*a*-672*c*, 678*a*-678*b*) indicating that the fifth subject is being emphasized by a synthetic depth-of-field effect that alters the visual information captured by the one or more cameras to emphasize the fifth subject (e.g., 632, 634, 638) in the representation of the video relative to the sixth subject (e.g., 632, 634, 638) (e.g., using one or more techniques as described above in relation to method 700). Displaying the first user interface object indicating that the fifth subject is being emphasized provides the user with feedback concerning a subject that is emphasized by a synthetic depth-of-field effect relative to other subject(s) in the video. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the fifth subject (e.g., 632, 634, 638) in a plurality of frames is displayed with a first visual characteristic (e.g., a first amount of blur and/or fading) (e.g., because the first subject is emphasized). In some embodiments, the sixth subject in the plurality of frames is displayed with a second visual characteristic (e.g., second amount of blur and/or fading) that is different from the first visual characteristic (e.g., because the second subject is not emphasized) (e.g., as described above in relation to FIGS. 6AI-6AM). Displaying the fifth subject that is emphasized differently than a sixth subject who is not emphasized provides the user with feedback to distinguish a subject that is emphasized by a synthetic depth-of-field effect relative to other subject(s) in the video. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the representation (e.g., 660) of the video and the first user interface object, the computer system detects a gesture (e.g., 650*ai*, 650*a*1) that corresponds to selection of the sixth subject (e.g., 632, 634, 638) in the representation (e.g., 660) of the video (e.g., using one or more techniques as described above in relation to methods 800). In some embodiments, in response to detecting the gesture (e.g., 650*ai*, 650*a*1) (e.g., a tap gesture, a press-and-hold gesture, a mouse click) that corresponds to selection of the sixth subject (e.g., 632, 634, 638) in the representation (e.g., 660) of the video, the computer system changes the synthetic depth-of-field effect to alter the visual information captured by the one or more cameras to emphasize the sixth subject in the representation of the video relative to the fifth subject (e.g., using one or more techniques as described above in relation to methods 800) (e.g., as described above in relation to FIGS. 6AI-6AM). Changing the synthetic depth-of-field effect to alter the visual information captured by the one or more cameras to emphasize the fifth subject in the plurality of frames relative to the sixth subject in response to detecting a detecting the gesture that corresponds to selection of the second subject in the representation of the video provides the user with control over the system by allowing the user to control how a synthetic depth-of-field effect is applied to a video. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to detecting the gesture (e.g., 650*ai*, 650*a*1) (e.g., a tap gesture, a press-and-hold gesture) that corresponds to selection of the sixth subject in the representation of the video, the computer system displays a seventh graphical user interface object (e.g., 672*a*-672*c*, 678*a*-678*b*) indicating that the sixth subject is being emphasized by the changed synthetic depth-of-field effect that alters the visual information captured by the one or more cameras to emphasize the sixth subject (e.g., 632, 634, 638) in the representation of the video relative to the fifth subject (e.g., 632, 634, 638) (e.g., using one or more techniques as described above in relation to methods 700 and 800). Displaying a seventh graphical user interface object indicating that the sixth subject is being emphasized by the changed synthetic depth-of-field effect that alters the visual information captured by the one or more cameras to emphasize the sixth subject in the representation of the video relative to the fifth subject in response to detecting a detecting the gesture that corresponds to selection of the second subject in the representation of the video provides the user with control over the system by allowing the user to control how a synthetic depth-of-field effect is applied to a video. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the video navigation user interface element (e.g., 664) for navigating through the video that includes: at a seventh location on the video navigation user interface element, the seventh graphical user interface object (e.g., 668*c*, 688*e*, 688*h*, 688*i*, 688*j*, 688*k*, and/or 688*m*); at an eighth location on the video navigation user interface element, an eighth graphical object (e.g., 686*d* and/or 686*f*) indicating that a synthetic depth-of-field change (e.g., a user-specified change and/or an automatic change) has occurred at an eighth time in the video (and, in some embodiments, the seventh location is before the eighth location on the video navigation user interface element); and a portion that is between the seventh location and the eighth location (e.g., a portion of 664*b*). In some embodiments, before detecting the gesture that corresponds to selection of the sixth subject in the representation of the video, the portion of the video navigation user interface element that is between the seventh location and the eighth location is displayed in a first visual state (e.g., a portion of the video navigation user interface element that extends from the seventh location to the eighth location and/or a portion of the video navigation user interface element that extends from the seventh graphic object to the eighth graphical object) (e.g., as shown above in relation to FIG. 6BB). In some embodiments, in response to detecting the gesture (e.g., 650*bb*2) that corresponds to selection of the sixth subject in the representation of the video, the computer system displays an animation of the portion of the video navigation user interface element that is between the seventh location and the eighth location changing from the first visual state to a second visual state (e.g., 688*c*1, 688*e*1, 688*h*1, 688*i*1, 688*k*1, and/or 688*m*1) that is different from the first visual state (e.g., as discussed and shown in relation to FIG. 6BC). In some embodiments, in response to detecting the gesture that corresponds to selection of the sixth subject in the representation of the video, a portion of the video navigation user interface element that is before the seventh location continues to be displayed in the same state that it was displayed in before detecting the gesture that corresponds to selection of the sixth subject in the representation of the video. In some embodiments, in response to detecting the gesture that corresponds to selection of the sixth subject in the representation of the video, a portion of the video navigation user interface element that is after the eighth location continues to be displayed in the same state that it was displayed in before detecting the gesture that corresponds to selection of the sixth subject in the representation of the video. Displaying an animation of the portion of the video navigation user interface element that is between the seventh location and the eighth location changing from the first visual state to a second visual state that is different from the first visual state in response to detecting the gesture that corresponds to selection of the sixth subject in the representation of the video provides visual feedback that informs a user about what portions of the video navigation user interface element have been altered based on the change to the synthetic depth-of-field effect that corresponds to the graphical object displayed at the seventh location, which provides improved visual feedback.

In some embodiments, in response to detecting the gesture (e.g., 650*ai*, 650*a*1) (e.g., a tap gesture, a press-and-hold gesture) that corresponds to selection of the sixth subject in the representation of the video, the computer system displays, in the video navigation user interface element, a second representation (e.g., 688*h*, 688*i*) (e.g., a thumbnail representation) of the third time. In some embodiments, the second representation (e.g., 688*h*, 688*i*) of the third time represents a user-specified change in subject emphasis (e.g., where the second representation of the third time was not previously displayed before detecting the gesture that corresponds to the second subject in the representation of the video). In some embodiments, in response to detecting the gesture (e.g., a tap gesture, a press-and-hold gesture) that corresponds to selection of the second subject in the representation of the video, the computer system displays a first graphical object that is displayed at the fifth location in the video navigation user interface element to indicate that a user-specified change has occurred at the third time in the video. In some embodiments, before detecting the gesture, a third representation of the third time (and/or a second graphical object that is displayed at the fifth location in the video navigation user interface element to indicate that an automatic change has occurred at the third time in the video) that represents an automatic change in subject emphasis is displayed and, in response to detecting the gesture that corresponds to selection of the second subject in the representation of the video, the computer system ceases to display the third representation of the third time (and/or a second graphical object that is displayed at the fifth location in the video navigation user interface element) and/or replaces the third representation of the third time with the second representation of the third time (and/or the first graphical object that is displayed at the fifth location in the video navigation user interface element). Displaying, in the video navigation user interface element, the second representation of the third time, where the second representation of the third time represents a user-specified change in subject emphasis provides the user with feedback that a user-specified change has occurred at the third time in response to detecting the gesture that corresponds to selection of the second subject. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the representation (e.g., 660) of the third time includes a seventh subject. In some embodiments, while displaying the representation (e.g., 660) of the video and the first user interface object (e.g., 672*a*-672*c*), the computer system (e.g., 600) detects a gesture (e.g., 650*ai*, 650*a*1) that corresponds to selection of the seventh subject in the representation of the video (e.g., using one or more techniques as described above in relation to method 800). In some embodiments, in response to detecting the gesture (e.g., 650*ai*, 650*a*1) (e.g., a tap gesture, a press-and-hold gesture) that corresponds to selection of the seventh subject in the representation of the video, the computer system (e.g., 600) changes the synthetic depth-of-field effect to alter the visual information captured by the one or more cameras to emphasize the seventh subject (e.g., 632, 634, 638) in the representation of the video relative to the fifth subject (and the fifth subject and/or sixth subject) (e.g., using one or more techniques as described above in relation to method 800)). In some embodiments, in response to detecting the gesture (e.g., 650*ai*, 650*a*1) (e.g., a tap gesture, a press-and-hold gesture) that corresponds to selection of the seventh subject (e.g., 632, 634, 638) in the representation (e.g., 660) of the video, the computer system displays a third user interface object indicating that the seventh subject is being emphasized by the changed synthetic depth-of-field effect that alters the visual information captured by the one or more cameras to emphasize the seventh subject in the representation of the video relative to the fifth subject (and the fifth subject and/or sixth subject) (e.g., using one or more techniques as described above in relation to method 800) (e.g., as described above in relation to FIGS. 6AI-6AM). Changing the synthetic depth-of-field effect to alter the visual information captured by the one or more cameras to emphasize the seventh subject in the representation of the video relative to the fifth subject provides the user with control over the system by allowing the user to control how a synthetic depth-of-field effect is applied to a video. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the video navigation user interface element (e.g., 664) for navigating through the video that includes, at a third location on the video navigation user interface element (e.g., 664) (e.g., above, below, and/or on a first frame of the video), a third graphical user interface object (e.g., 688*c*, 688*e*, 688*h*, 688*i*) indicating that the user-specified change occurred (e.g., concerning which subjects have been emphasized) at the second time in the video (or indicating that the automatic change occurred (e.g., concerning which subjects have been emphasized) at the second time in (during playback of, during capture of) the video). In some embodiments, while displaying the third graphical user interface object (e.g., 688*c*, 688*e*, 688*h*, 688*i*), the computer system (e.g., 600) detects a gesture (e.g., a tap gesture) directed to the third graphical user interface object (e.g., 688*c*, 688*e*, 688*h*, 688*i*). In some embodiments, in response to detecting the gesture directed to the third graphical user interface object (e.g., 688*c*, 688*e*, 688*h*, 688*i*), computer system displays an option (e.g., 688*h*1) (e.g., a selectable option) to remove the user-specified change that occurred at the second time in the video. In some embodiments, in response to detecting a gesture directed to the option, the computer system removes the user-specified change that occurred at the second time in the video, ceases to display the third graphical user interface object (and, in some embodiments, displays another graphic user interface object (e.g., that is representative of automatic change and/or system-generate change), ceases to display the representation of the second time, replaces display of the representation of the second time with display of a different representation of the second time that does not include a subject that is emphasized relative to another subject, replaces display of the representation of the second time with display of a different representation of the second time that includes the synthetic depth-of-field effect that has a different type of tracking than the type of track to which the user-specified change corresponded. Providing an option to remove the user-specified change that occurred at the second time in the video in response to detecting the gesture directed to the third graphical user interface object provides the user with control over the system by allowing the user to remove a synthetic depth-of-field effect that has been applied. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the video navigation user interface element (e.g., 664) for navigating through the video includes, at a fourth location on the video navigation user interface element (e.g., above, below, and/or on a first frame of the video), a fourth graphical user interface object (e.g., 688*c*, 688*e*, 688*h*, 688*i*) indicating that the user-specified change occurred (e.g., concerning which subjects have been emphasized) at the second time in the video (or indicating that the automatic change occurred (e.g., concerning which subjects have been emphasized) at the second time in (during playback of, during capture of) the video). In some embodiments, after the representation of the second time, a plurality of representations (a plurality of representations, where each representation represents a time in the video that is after the second time) are displayed that include the one subject that is emphasized relative to one or more elements in the video (e.g., 664*a*) (e.g., based on the user-specified change (e.g., that occurred at the second time)). In some embodiments, none or the plurality of representations are displayed adjacent to or on to a graphical user interface object indication that a change has occurred at the respective times of each of the respective plurality of representations. Displaying the plurality of representations displayed that include the one subject that is emphasized relative to one or more elements in the video after the representation of the second time provides the user with feedback that a user-specified change has occurred at the third time and has changed frames of the video that are displayed the third time. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the representation of the video is a third representation of the second time. In some embodiments, the third representation of the second time has, in accordance with a determination that the user-specified change is a first type (e.g., a temporary emphasis change) (e.g., using one or more techniques as described above in relation to method 800, a change that occurs in response to detecting a single-tap gesture as described above in relation to method 80)) of user-specified change, a third visual appearance (e.g., color, highlighting, text, shape) e.g., a bracket without a shape (e.g., circle) inside of the bracket) (e.g., as described above in relation to FIGS. 6AI-6AL). In some embodiments, the third representation of the second time has, in accordance with a determination that the user-specified change is a second type of user-specified change (e.g., a temporary emphasis change) (e.g., using one or more techniques as described above in relation to method 800, a change that occurs in response to detecting a multi-tap gesture as described above in relation to method 800) that is different from the first type of user-specified change, a fourth visual appearance (e.g., color, highlighting, text, shape) e.g., a bracket with a shape (e.g., circle) inside of the bracket) that is different from the third visual appearance (e.g., as described above in relation to FIGS. 6AI-6AL). Displaying the third representation of the second time differently based on the type of user-specified change that occurred provides the user with feedback and enabled the user to distinguish the particular type of user-specified change that occurred. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the video navigation user interface element (e.g., 664), the computer system (e.g., 600) detects a gesture (e.g., 650*ak*) directed to a sixth location on the video navigation user interface element (e.g., 664). In some embodiments, in response to detecting the gesture (e.g., 650*ak*) directed to the sixth location on the video navigation user interface element (e.g., detecting a gesture directed to the representation of the first time, the representation of the second time or a graphical user interface object indicating that the user-specified change occurred a particular time or an automatic change has occurred at a particular time), the computer system displays a progress indicator that represents a time (e.g., 664*c*) in a playback of the video that corresponds (e.g., that is represented by) to the sixth location. Displaying a progress indicator that represents a time in a playback of the video that corresponds to the sixth location provides the user with feedback about the time in the video that the user has selected. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the user interface includes a selectable user interface object for controlling a video editing mode (e.g., a cinematic video editing mode) (e.g., 662*c*). In some embodiments, the selectable user interface object for controlling the video editing mode is displayed with a status indication that indicates that the video editing mode is in an active state (e.g., 662 in FIG. 6AP). In some embodiments, the video navigation user interface element (e.g., 664) for navigating through the video that includes, at a seventh location on the video navigation user interface element (e.g., 664) (e.g., above, below, and/or on a first frame of the video), a sixth graphical user interface object (e.g., 688*c*, 688*e*, 688*h*, and/or 688*i*) indicating that the user-specified change occurred (e.g., concerning which subjects have been emphasized) at the second time in the video (or indicating that the automatic change occurred (e.g., concerning which subjects have been emphasized) at the second time in (during playback of, during capture of) the video) (e.g., not displayed with a particular color (e.g., grey)). In some embodiments, the sixth graphical user interface object is displayed in a selectable state (e.g., 688*c*, 688*e*, 688*h*, and/or 688*i*) (e.g., where selection of the fifth graphical user interface object would cause the computer system to perform an operation). In some embodiments, while displaying the selectable user interface object for controlling the video editing mode with the status indication that indicates that the video editing mode is in the active state (e.g., 662*c* in FIG. 6AP), the computer system (e.g., 600) detects a gesture (e.g., 650*ap*1) directed to the selectable user interface object for controlling the video editing mode (e.g., 662*c*). In some embodiments, in response to detecting the gesture (e.g., 650*ap*1) directed to the selectable user interface object (e.g., 662*c*) for controlling the video editing mode, forgoing display of the sixth graphical user interface object in the selectable state (e.g., as discussed above in relation to FIGS. 6AP-6AQ) (e.g., displaying the sixth graphical user interface object in a non-selectable state or ceasing to display the sixth graphical use interface object) (e.g., where selection of the fifth graphical user interface object would not cause the computer system to perform an operation) (e.g., displayed with a particular color (e.g., grey)) (e.g., where the non-selectable state is different from the selectable state). Displaying the sixth graphical user interface object in a non-selectable state in response to detecting the gesture directed to the selectable user interface object for controlling the video editing mode provides the user with feedback that the graphical user interface object indicating that the user-specified change occurred is not available and/or the cinematic video editing mode has been disabled. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, wherein, before detecting the gesture directed to the selectable user interface object for controlling the video editing mode, the video navigation user interface element for navigating through the video is displayed with a first amount of visual emphasis (e.g., as discussed above in relation to FIG. 6AP). In some embodiments, in response to detecting the gesture (e.g., 650*ap*1) directed to the selectable user interface object for controlling the video editing mode, the computer system displays the video navigation user interface element for controlling the video editing mode with a second amount of visual emphasis (e.g., as discussed above in relation to FIG. 6AQ) that is less than the first amount of visual emphasis (e.g., as discussed above in relation to FIG. 6AP). In some embodiments, the video navigation user interface element is visually de-emphasized (e.g., more blurred, smaller, grayed-out, more translucent, and/or less zoomed in) when computer to the video navigation user interface element with the first amount of visual emphasis. Displaying the video navigation user interface element with the second amount of visual emphasis that is less than the first amount of visual emphasis as a part of displaying the option to remove the second subject emphasis change that occurs at the second time in response to detecting the input directed to the first graphical user interface object provides visual feedback to the user regarding the subject emphasis and/or the graphical user interface object that will be removed (e.g., to avoid unintended removal), which provides improved visual feedback.

Note that details of the processes described above with respect to method 900 (e.g., FIG. 9) are also applicable in an analogous manner to the methods described above and/or below. For example, methods 700, 800, 1100, and/or 1300 optionally includes one or more of the characteristics of the various methods described above with reference to method 900. For example, the method described below in method 900 can be used to display media in a media editing user interface after the media is captured using one or more techniques described in relation to method 700. For brevity, these details are not repeated above.

FIGS. 10A-10I illustrate exemplary user interfaces for managing media capture using a computer system in accordance with some embodiments. The user interfaces in these figures are used to illustrate the processes described below, including the processes in FIG. 11.

Figure 10A:
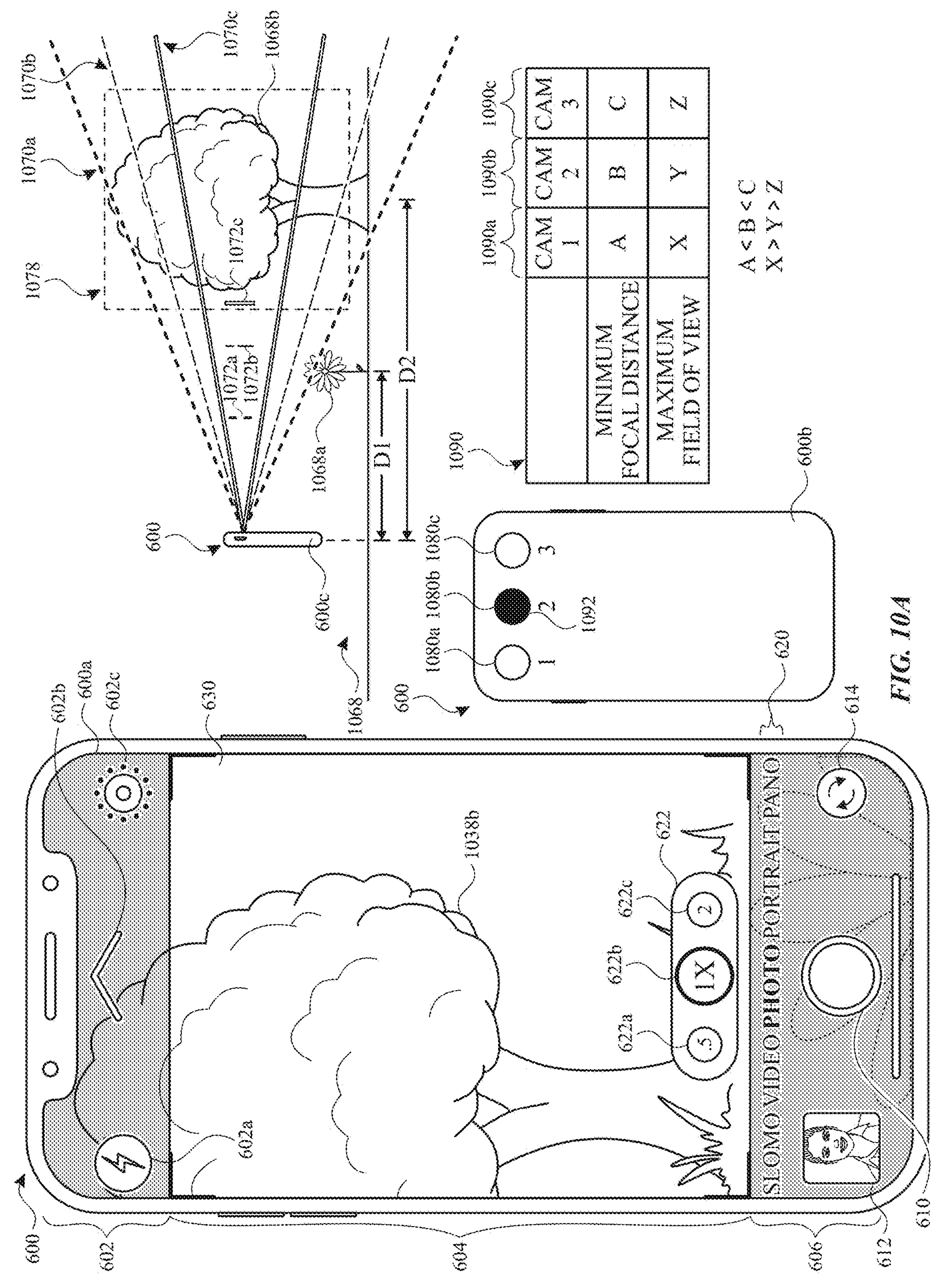
FIGS. 10A-10I illustrate exemplary user interfaces for managing media capture using a computer system in accordance with some embodiments.

FIG. 10A illustrates computer system 600 having front-side 600*a* and back-side 600*b*. Cameras 1080*a*-1080*c* are positioned on back-side 600*b* of computer system 600. Cameras 1080*a*-1080*c* are different from each other, where cameras 1080*a*-1080*c* have different hardware specifications (e.g., camera sensor size, shape, and/or placement, camera lens shape, size, and/or placement, and/or aperture size, shape, and/or placement). Because the hardware of cameras 1080*a*-1080*c* is different, each of cameras 1080*a*-1080*c* have a different set of image capture parameters, such as a minimum focal distance, a maximum and/or minimum field-of-view, a focal length, an aperture size range, and/or a maximum/minimum optical zoom.

Table 1090 (e.g., of FIG. 10A) is provided to show a comparison between a subset of exemplary image capture parameters (e.g., minimum focal distance and maximum field-of-view) for each respective camera (e.g., 1080*a*-1080*c*) that will be used in the exemplary described in relation to FIGS. 10A-10I. As shown in FIG. 10A, camera 1080*a* (e.g., "CAM 1") has a set of images capture parameters that are displayed in parameter column 1090*a*, camera 1080*b* (e.g., "CAM 2") has a set of images capture parameters that are displayed in parameter column 1090*b*, and camera 1080*c* (e.g., "CAM 3") has a set of images capture parameters that are displayed in parameter column 1090*c*. As shown in FIG. 10A, camera 1080*a* has a minimum focal distance (e.g., "A") that is less than the minimum focal distance (e.g., "B") of camera 1080*b* ("CAM 2"). Moreover, camera 1080*b* has a minimum focal distance (e.g., "B") that is less than the minimum focal distance (e.g., "C") of camera 1080*c* ("CAM 3"). Cameras that have a shorter minimum focal distance are able to focus on objects that are closer to the camera than cameras that have longer minimum focal distance. For example, graphical illustration 1068 is provided and shows the position of one or more cameras of computer system 600 relative to flower 1068*a* (e.g., closer to the camera, on the left) and tree 1068*b* (e.g., further away from the camera, on the right) in an environment. Distance marker 1072*a* is an exemplary representation of the minimum focal distance of camera 1080*a*, distance marker 1072*b* is an exemplary representation of the minimum focal distance of camera 1080*b*, and distance marker 1072*c* an exemplary representation of the minimum focal distance of camera 1080*c*. Each distance marker denotes an example of what objects (e.g., flower 1068*a*, tree 1068*b*) that a respective camera can focus on while computer system 600 is at a particular location in the environment. A respective camera can only focus on objects that are to the right of a respective distance marker (e.g., no closer to the camera than the distance of the respective distance marker) while computer system 600 is at a particular location in the environment. At FIG. 10A, camera 1080*a* is able to focus on flower 1068*a* and tree 1068*b* because distance marker 1072*a* is positioned before flower 1068*a* (e.g., and/or flower 1068*a* and tree 1060*b* is further away from camera 1080*a* than the minimum focal distance of camera 1080*a*). Cameras 1080*b* and 1080*c* are not able to focus on flower 1068*a* but are able to focus on tree 1068*b* because distance markers 1072*b* and 1072*c* are positioned between flower 1068*a* (e.g., and/or flower 1068*a* is closer to and tree 1060*b* is further away from cameras 1080*b* and 1080*c* than the minimum focal distances of cameras 1080*b* and 1080*c*). In some embodiments, the minimum focal distance of camera 1080*c* is such that it is not able to focus on flower 1068*a* and the tree 1068*b* (e.g., the portion of the tree that is closest to computer system 600).

In FIGS. 10A-10I, camera 1080*a* has the ability to focus on objects that are closer to computer system 600 than camera 1080*b*, and camera 1080*b* has the ability to focus on objects that are closer to computer system 600 than camera 1080*c* (e.g., given that the cameras are all positioned on back-side 600*b*). In other words, computer system 600 is able to display a representation of an object and/or capture media corresponding to the object that is in focus using camera 1080*a* when the object is within the minimum focal distance of camera 1080*a* but outside of the minimum focal distance of camera 1080*b* (e.g., and the same relationship would apply to cameras 1080*b* versus camera 1080*c*). Thus, computer system 600 will use camera 1080*a* when focusing on an object and/or capture an object that is in focus using camera 1080*a* when the object is within the minimum focal distance of camera 1080*a* but outside of the minimum focal distance of camera 1080*b*. However, using the camera with the minimum focal distance is not optimal in some situations where an object is within the minimum focal distance of multiple cameras, such as cameras 1080*a* and 1080*b*. In some situations, it can be optimal for computer system 600 to use the camera with the greater minimum focal distance (e.g., 1080*b*) when focusing on an object that is within the minimum focal distances of cameras 1080*a* and 1080*b*. In some embodiments, this is because computer system 600 has to apply more digital zoom (e.g., digital and/or computer-generated magnification) (e.g., rather than an optical zoom that uses one or more cameras lenses to magnify) to display a representation of an object and/or capture media corresponding to the object at a particular zoom level when using a camera with a shorter minimum focal distance, but larger field-of-view, than when using a camera with a longer minimum focal distance, and narrower field-of-view. In some embodiments, applying more digital zoom leads to more distortion and/or less fidelity in the displayed representation of the object and/or the captured media corresponding to the object. In some embodiments, camera 1080*a* has a minimum focal distance that is a distance between 0-6 cm. In some embodiments, camera 1080*b* has a minimum focal distance that is a distance between 7-12 cm. In some embodiments, camera 1080*b* has a minimum focal distance that is a distance between 12-15 cm. In some embodiments, one or more of the minimum focal distances of cameras 1080*a*-1080*c* is a range of distance and/or a distance that is another distance than the examples provided above.

As shown in FIG. 10A, Table 1080 also provides a maximum field-of-view parameter for each respective camera. Camera 1080*a* has a maximum field-of-view (e.g., "X") that is greater than the maximum field-of-view (e.g., "Y") of camera 1080*b*, and camera 1080*b* has a maximum field-of-view that is greater than the maximum field-of-view (e.g., "Z") of camera 1080*c*. At FIG. 10A, field-of-view indicators 1070*a*-1070*c* are provided to show the relative field-of-views for each camera. For example, field-of-view indicator 1070*a* is the widest field-of-view indicator to indicate that camera 1080*a* has the largest field-of-view, field-of-view indicator 1070*c* is the smallest field-of-view indicator to indicate that camera 1080*c* has the smallest field-of-view, and field-of-view indicator 1070*b* is provided to show that camera 1080*b* has a field-of-view that is between the field-of-view of cameras 1080*a* and 1080*c*. In some embodiments, camera 1080*a* is an ultra-wide-angle camera (e.g., a camera that has an ultra-wide field-of-view), camera 1080*b* is a wide-angle camera (e.g., includes a camera sensor that has a wide field-of-view and/or a field-of-view that is narrower than the ultra-wide field-of-view), and camera 1080*c* is a telephoto camera (e.g., includes a camera sensor that has a field-of-view that is narrower than the wide field-of-view).

As illustrated in FIG. 10A, computer system 600, via the display, displays a camera user interface that includes indicator region 602, camera display region 604, and control region 606. Indicator region 602 includes flash indicator 602*a*, modes-to-settings indicator 602*b*, and animated image indicator 602*c*, which are displayed using one or more techniques as described above in relation to FIG. 6A. Control region 606 includes camera mode controls 620 including camera mode controls 620, shutter control 610, camera switcher control 614, and a representation of media collection 612, which are displayed using one or more techniques as described above in relation to FIG. 6A. As illustrated in FIG. 10A, camera display region 604 includes live preview 630 and zoom controls 622. Zoom controls 622 include 0.5× zoom control 622*a,* 1× zoom control 622*b*, and 2× zoom control 622*c*. As illustrated in FIG. 10A, 1× zoom control 622*b* is enlarged compared to the other zoom controls, which indicates that 1× zoom control 622*b* is selected and that computer system 600 is displaying live preview 630 at a "1×" zoom level. While live preview 630 is displayed at the 1× zoom level, computer system 600 uses camera 1080*b* (e.g., as indicated by use indicator 1092 being located at camera 1080*b* in FIG. 10A), which is presented on back-side 600*b* of computer system 600 to display the portion of live preview 630 that is in camera display region 604. At FIG. 10A, computer system 600 is focused on tree 1068*b* (e.g., denoted by focus indicator 1078). Thus, computer system 600 has the option of choosing camera 1080*a* and/or 1080*b* (e.g., based on the minimum focal distances, as illustrated by distance markers 1072*a* and 1072*b* being positioned before the portion of tree 1068*b* that is closet to computer system 600) to display live preview 630. Here, as alluded to above, computer system 600 uses camera 1080*b* because less digital zoom is applied to display live preview 630 (e.g., that includes tree representation 1038*b*) at the 1× zoom level while focusing on tree 1068*b* than the digital zoom that would need to be applied to display live preview 630 at the 1× zoom level using camera 1080*a*. In some embodiments, no digital zoom is required when using camera 1080*b* to display live preview 630 at the 1× zoom level. In some embodiments, computer system 600 uses camera 1080*a*, 1080*b*, and/or 1080*c* to display the portions of live preview 630 that are in indicator region 602 and/or control region 606, while computer system 600 uses camera 1080*b* to display the portion of live preview 630 that is in camera display region 604. At FIG. 10A, computer system 600 is moved downward to a new position, such that flower 1068*a* is, at least partially, within the field-of-view of camera 1080*a*-1080*c*.

Figure 10B:
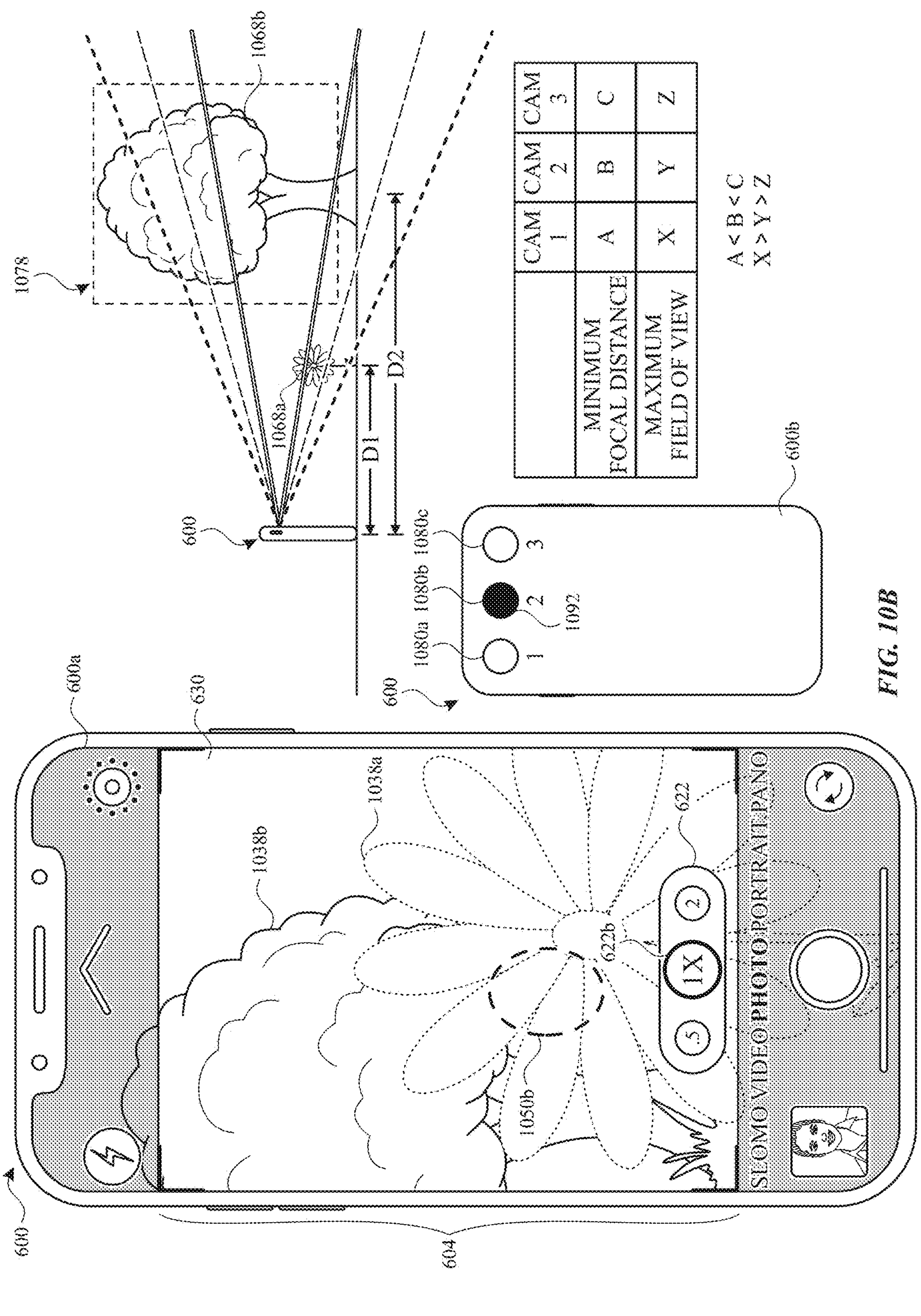

At FIG. 10B, while in the new position, computer system 600 detects a change in distance between cameras 1080*a*-1080*c* (e.g., at least one) and the focal point (e.g., a specific location of tree 1068*b*), due to the downward movement. In response to detecting the change in distance, a determination is made that the changed distance is not less than a predetermined distance (e.g., closer than the minimum focal distance of the camera (e.g., camera 1080*b*) that computer system 600 is using to display live preview 630 in FIG. 10A and/or a distance that is based on a minimum focal distance). As illustrated in FIG. 10B, because the determination is made that the changed distance is not less than the predetermined distance, computer system 600 continues to display the portion of live preview 630 in camera display region 604 using camera 1080*b* (e.g., as indicated by use indicator 1092 being located at camera 1080*b* in FIG. 10B). At FIG. 10B, computer system 600 detects tap input 1050*b* on (e.g., at a location that corresponds to) flower representation 1038*a* in live preview 630.

Figure 10C:
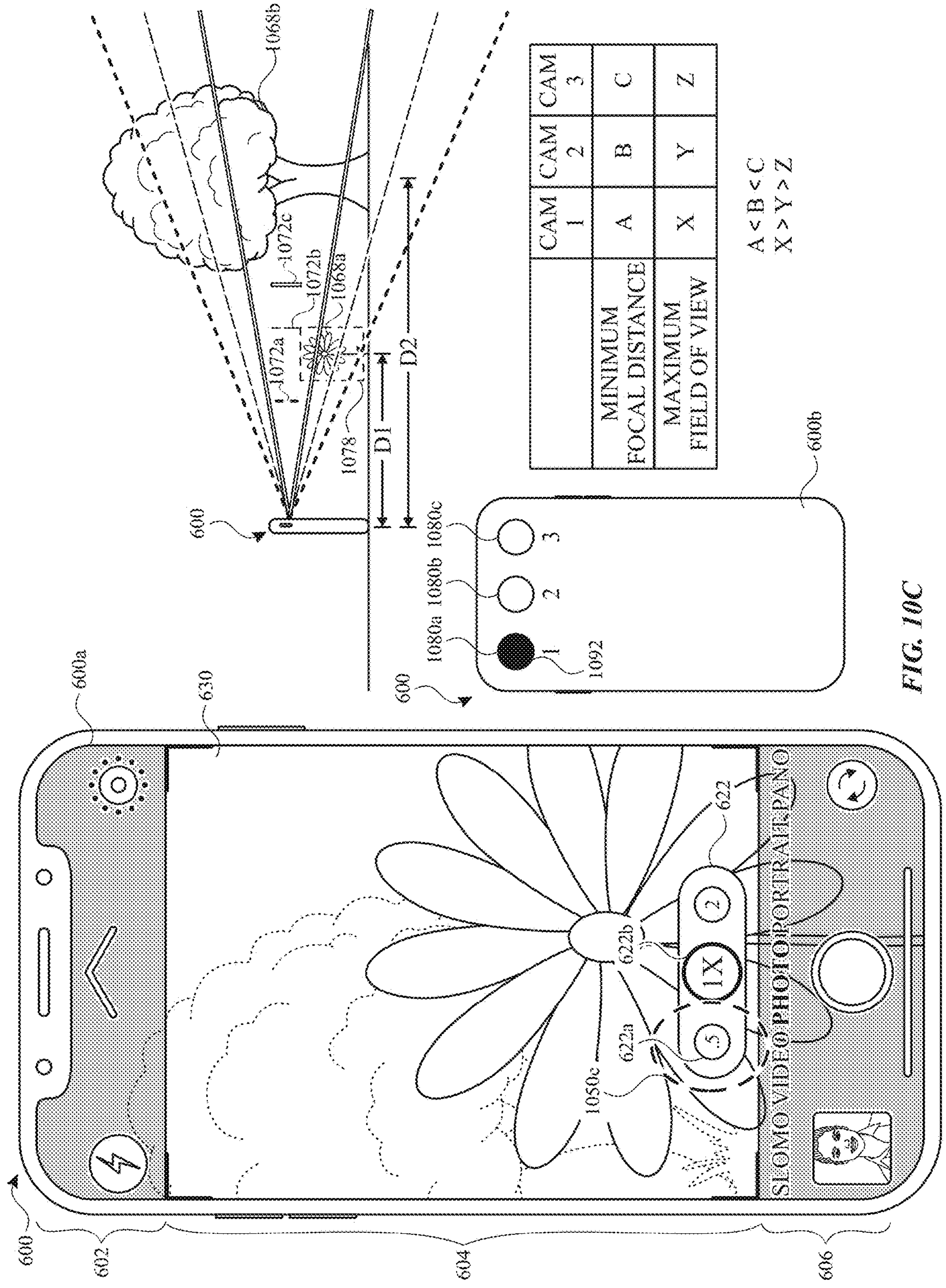

As illustrated in FIG. 10C, in response to detecting tap input 1050*b*, computer system 600 changes the focal point of cameras 1080*a*-1080*c* (e.g., at least one of the cameras). At FIG. 10C, computer system 600 changes the focal point of cameras 1080*a*-1080*c*, such that cameras 1080*a*-1080*c* are configured to focus on flower 1068*a* instead of tree 1068*b* in the environment. At FIG. 10C, the change to the focal point is indicated by flower representation 1038*a* being bolded (e.g., the object in focus) and tree representation 1038*b* being dotted (e.g., the object out of focus) in live preview 630, which is different from tree representation 1038*b* being bolded and flower representation 1038*a* being dotted in FIG. 10B. In addition, focus indicator 1078 is displayed as being positioned around flower 1068*a* to indicate that cameras 1068*a*-1068*c* are configured to focus on flower 1068*a* instead of tree 1068*b* in the environment. After changing the focal point of cameras 1080*a*-1080*c*, computer system 600 detects a change in distance between cameras 1080*a*-1080*c* and the focal point of cameras 1080*a*-1080*c* due to the new focal point being selected. At FIG. 10C, distance D2 between cameras 1080*a*-1080*c* and tree 1068*b* is longer than distance D1 between cameras 1080*a*-1080*c* and flower 1068*a*. Thus, at FIG. 10C, computer system 600 detects a decrease in distance between cameras 1080*a*-1080*c* and the focal point. In response to detecting the decreased distance between cameras 1080*a*-108*c* and the focal point, a determination is made that the decreased distance between cameras 1080*a*-1080*c* and the focal point is less than a predetermined distance (e.g., a distance that is based on the minimum focal distance of the camera (e.g., camera 1080*b*) that was being used to the captured the portion of live preview 630 before the decreased distance was detected) (e.g., cameras 1080*a*-1080*c* is closer to the focal point than the predetermined distance).

At FIG. 10C, because the determination is made that the decreased distance between cameras 1080*a*-1080*c* and the focal point is less than the predetermined distance, computer system 600 switches (e.g., transitions) from using camera 1080*b* to using camera 1080*a* (e.g., as indicated by use indicator 1092 being located at camera 1080*a* in FIG. 10C) to display the portion of live preview 630 in camera display region 604. As indicated above, camera 1080*a* has a shorter minimum focal distance than camera 1080*b*. Thus, at FIG. 10C, computer system 600 automatically switches to using camera 1080*a* because the distance between cameras 1080*a*-1080*c* and the focal point is shorter than the minimum focal distance of camera 1080*b*. At FIG. 10C, computer system 600 applies a digital zoom to continue to display live preview 630 at the 1× zoom level (e.g., as indicated by 1× zoom control 622*b* being selected). In some embodiments, as a part of transitioning from using camera 1080*b* to using camera 1080*a* to display the portion of live preview 630 in camera display region 604, computer system 600 updates and/or changes the appearance of live preview 630. In some embodiments, because camera 1080*a* has a different field-of-view than camera 1080*b* (e.g., due to the different physical positions of cameras 1080*a* and 1080*b* on back-side 600*b*), computer system 600 translates and/or moves the scene of live preview 630 relative to the display of computer system 600 when updating live preview 630 (e.g., to compensate for a change in angle due to the different physical positions of cameras 1080*a* and 1080*b* on back-side 600*b*). In some embodiments, computer system 600 translates and/or moves the scene of live preview 630 relative to the display of computer system 600 in order to reduce the amount of shifting in the center of live preview 630 and/or at the focal point (e.g., flower 1068*a*). In some embodiments, after computer system 600 translates and/or moves live preview 630 relative to the display of computer system 600, computer system 600 increases the amount of shifting that occurs to the scene of live preview 630 in other areas of the display (e.g., the region near the boundary of camera display region 604 and indicator region 602 and/or near the boundary of camera display region 604 and control region 606).

Although FIGS. 10B-10C illustrate an exemplary embodiment where computer system changes the focal point of cameras 1080*a*-1080*c* from tree 1068*b* to flower 1068*a* in response to an input (e.g., 1050*b*), computer system 600 can automatically change the focal point of cameras 1080*a*-1080*c* from tree 1068*b* to flower 1068*a* (e.g., without receiving an input; based on one or more autofocus criteria). Thus, in some embodiments, computer system 600 does not detect tap input 1050*b* and changes the focal point of cameras 1080*a*-1080*c* from tree 1068*b* to flower 1068*a*. In some embodiments, computer system 600 automatically changes the focal point of cameras 1080*a*-1080*c* from tree 1068*b* to flower 1068*a* based on the movement of computer system 600. In some embodiments, computer system 600 automatically changes the focal point of cameras 1080*a*-1080*c* from tree 1068*b* to flower 1068*a* based on flower 1068*a* occupying a larger portion of the field-of-view of cameras 1080*a*-1080*c* than tree 1068*b* at a particular instance in time (e.g., at FIG. 10B).

Figure 10D:
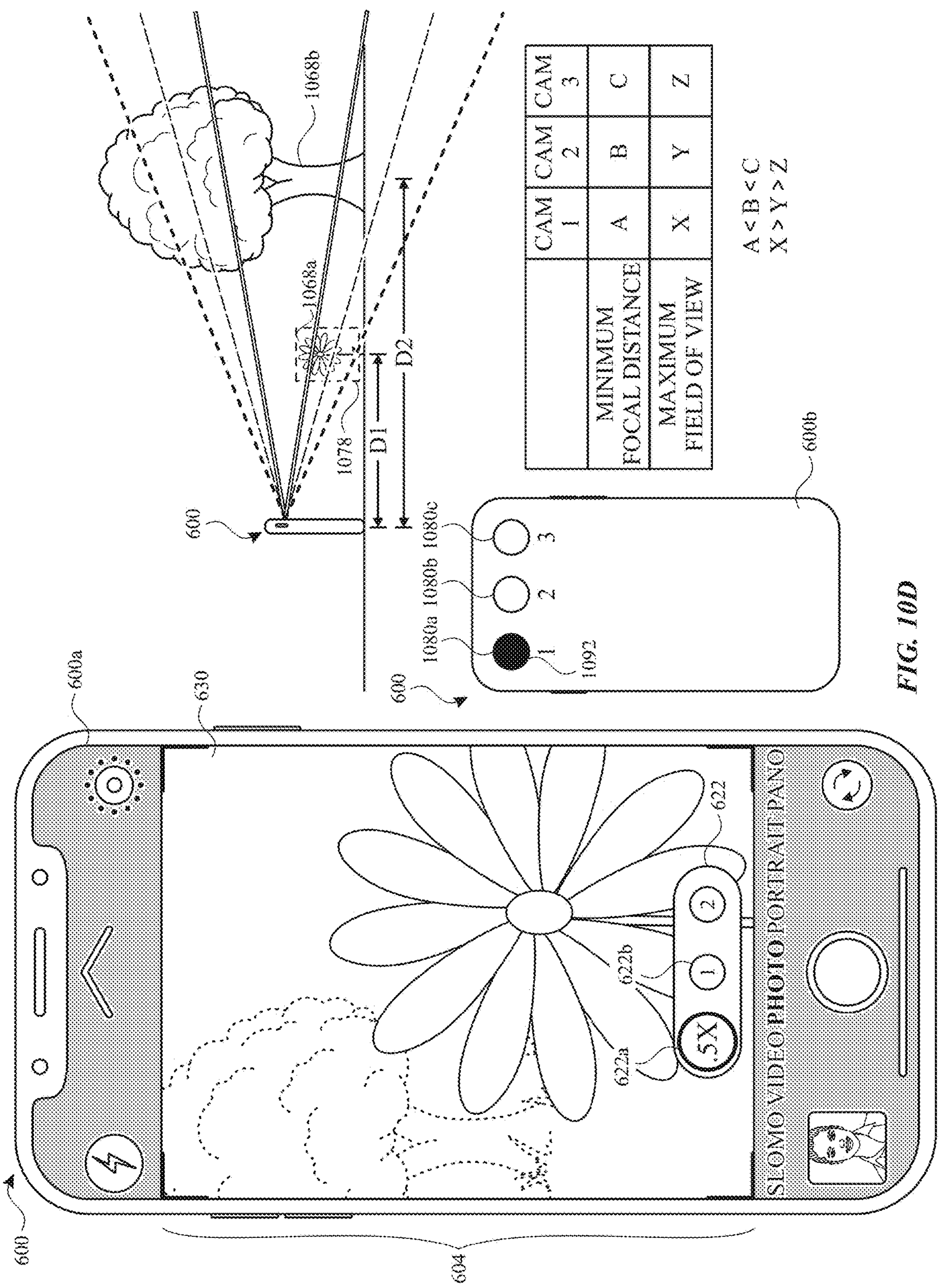
Figure 10E:
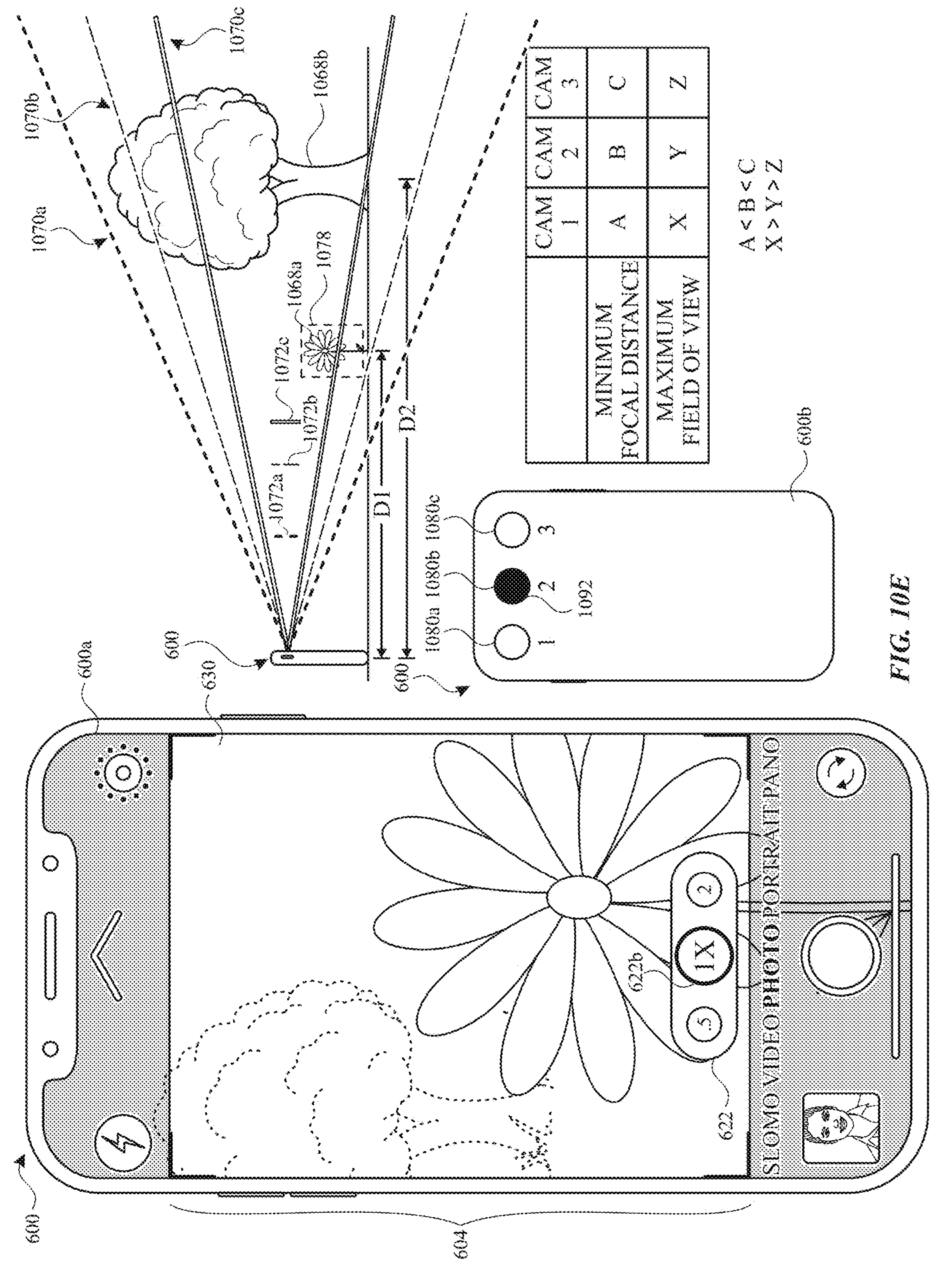

FIGS. 10D-10E are alternative scenarios that can occur after computer system 600 displays the camera user interface of FIG. 10C. FIG. 10D is a scenario where computer system 600 displays live preview 630 at different zoom levels (0.5× zoom level) in response to detecting an input one of zoom control 622. FIG. 10D-10E is a scenario where computer system 600 switches to display live preview 630 to use a different camera when computer system 600 is moved to a different location in the environment.

At FIG. 10C, computer system detects tap input 1050*c* on 1× zoom control 622*b*. As illustrated in FIG. 10D, in response to detecting tap input 1050*c*, computer system 600 displays live preview 630 at a 0.5× zoom level (e.g., as indicated by zoom control 622*a* being enlarged and bolded). While displaying live preview 630 at the 0.5× zoom level, computer system 600 continues to use camera 1080*a* (e.g., as indicated by use indicator 1092 being located at camera 1080*a* in FIG. 10D). To display live preview 630 at the 0.5× zoom level using use camera 1080*a*, computer system 600 applies less digital zoom (e.g., or no digital zoom) than computer system 600 applied to display live preview 630 at the 1× zoom level in FIG. 10C. In some embodiments, at FIG. 10D, computer system 600 displays the content from the entire field-of-view of camera 1080*a* as live preview 630 in camera display region 604 and there is no content from the field-of-view of camera 1080*a* displayed as live preview 630 in indicator region 602 and/or control region 606 in FIG. 10D. In some embodiments, at FIG. 10C, computer system 600 displays the content from only a portion of the field-of-view of camera 1080*a* in camera display region 604, so there is content from the field-of-view of camera 1080*a* displayed as live preview 630 in indicator region 602 and/or control region 606 in FIG. 10C.

Alternatively, at FIG. 10C, computer system 600 is moved to a different position in the environment (e.g., moved further away from flower 1068*a* and tree 1068*b*), as shown in FIG. 10E. At FIG. 10E, computer system 600 detects that the distance between cameras 1080*a*-1080*c* and the focal point (e.g., 1068*a*) has increased. In response to detecting that the increased distance, computer system 600 detects that the increased distance between cameras 1080*a*-1080*c* and the focal point is not less than the predetermined distance (e.g., a predetermined distance that is based on camera 1080*b* (e.g., the minimum focal distance of camera 1080*b*). At FIG. 10E, because the increased distance between cameras 1080*a*-1080*c* and the focal point is not less than the predetermined distance, computer system 600 switches from using camera 1080*a* to using camera 1080*b* (e.g., as indicated by use indicator 1092 being located at camera 1080*a* in FIG. 10E) to display the portion of live preview 630 in camera display region 604. Here, computer system 600 switches from using camera 1080*a* to using camera 1080*b* in response to a change in distance that occurred due to movement of computer system 600 while the focal point was maintained on the same object (e.g., 1078 surrounding flower 1068*a* in FIG. 10E). In some embodiments, computer system 600 switches from using camera 1080*a* to using camera 1080*b* to display the portion of live preview 630 in camera display region 604 using similar techniques and for similar reasons as those discussed above in relation to FIGS. 10A-10C (e.g., because doing so would reduce the use of digital zoom).

Figure 10F:
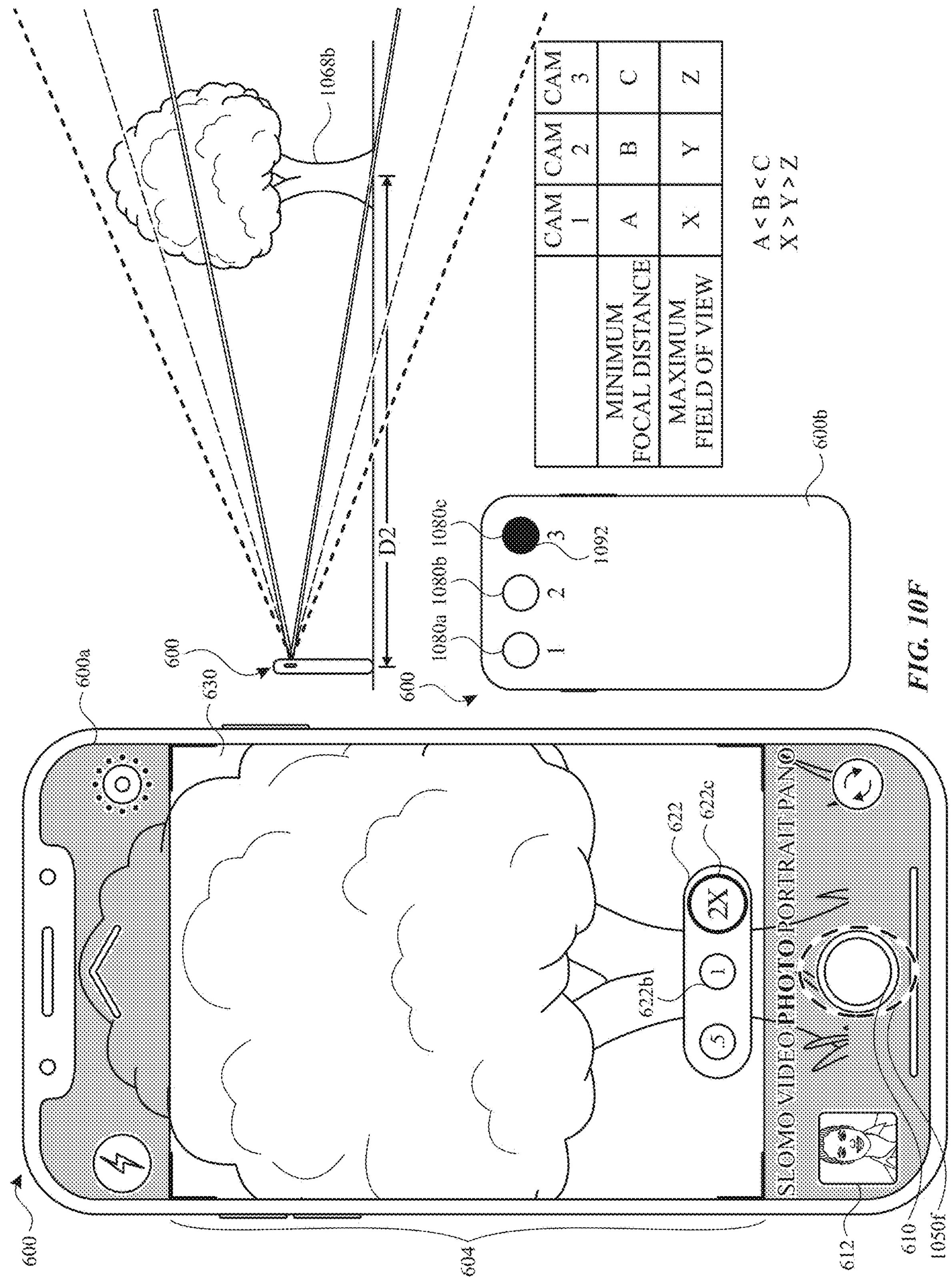

FIGS. 10F-10I illustrate an exemplary embodiment, where computer system 600 is moved closer to a focal point (e.g., tree 1068*b*). As illustrated in FIG. 10F, computer system 600 is using camera 1080*c* to display the portion of live preview 630 in camera display region 604. As illustrated in FIG. 10F, live preview 630 is displayed at the 2× zoom level (e.g., as indicated by 2× zoom control 622*c*). At FIG. 10F, computer system 600 detects tap input 1050*f* on shutter control 610. At FIG. 10F, a determination is made that the current distance (e.g., D2 in FIG. 10F) between the focal point and cameras 1080*a*-1080*c* is greater than a first predetermined threshold distance (e.g., based on the minimum focal distance of camera 1080*c*). At FIG. 10F, because the determination is made that the current distance between the focal point and cameras 1080*a*-1080*c* is greater than the first predetermined threshold distance, computer system 600 captures media representative of live preview 630 using camera 1080*c*.

Figure 10G:
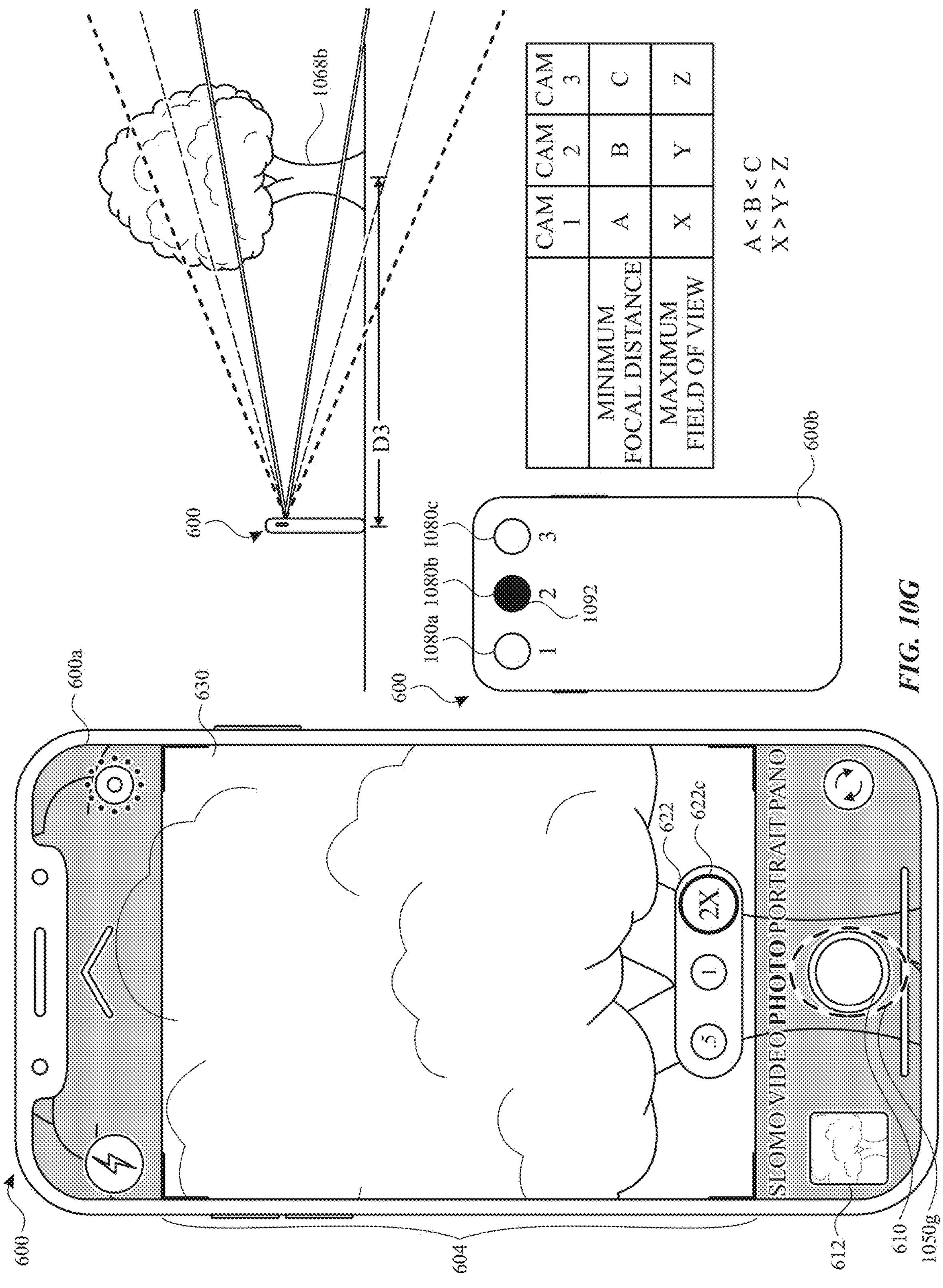

As illustrated in FIG. 10G, computer system 600 updates media collection 612 to include a representation of media that was captured in response to detecting tap input 1050*f*. In some embodiments, because a determination is made that the current distance between the focal point and cameras 1080*a*-1080*c* is less than the first predetermined threshold distance, computer system 600 initiates capture of media representative of live preview 630 using another camera, such as camera 1080*b*. Thus, in some embodiments, computer system 600 automatically selects a camera to capture media using similar techniques to those discussed above in relation to automatically selecting a camera to display live preview 630.

As illustrated in FIG. 10G, computer system 600 has moved closer to the focal point (e.g., tree 1068*b*). At FIG. 10G, in response to detecting a change in distance between the focal point and cameras 1080*a*-1080*c*, a determination is made that the current distance (e.g., D3 in FIG. 10G) between the focal point and cameras 1080*a*-1080*c* is not greater than the first predetermined threshold distance (e.g., based on the minimum focal distance of camera 1080*c*). Based on this determination, computer system 600 switches from using camera 1080*c* to using camera 1080*b* (e.g., as indicated by use indicator 1092 being located at camera 1080*b* in FIG. 10G) to display the portion of live preview 630 in camera display region 604 (e.g., using similar techniques and for similar reasons as those discussed above in relation to FIGS. 10A-0C). At FIG. 10G, computer system 600 detects tap input 1050*g* on shutter control 610. At FIG. 10G, a determination is made that the current distance (e.g., D3 in FIG. 10G) between the focal point and cameras 1080*a*-1080*c* is not greater than the first predetermined threshold distance (e.g., based on the minimum focal distance of camera 1080*c*). At FIG. 10G, because the determination is made that the current distance between the focal point and cameras 1080*a*-1080*c* is not greater than the first predetermined threshold distance, computer system 600 captures media representative of live preview 630 using camera 1080*b*.

Figure 10H:
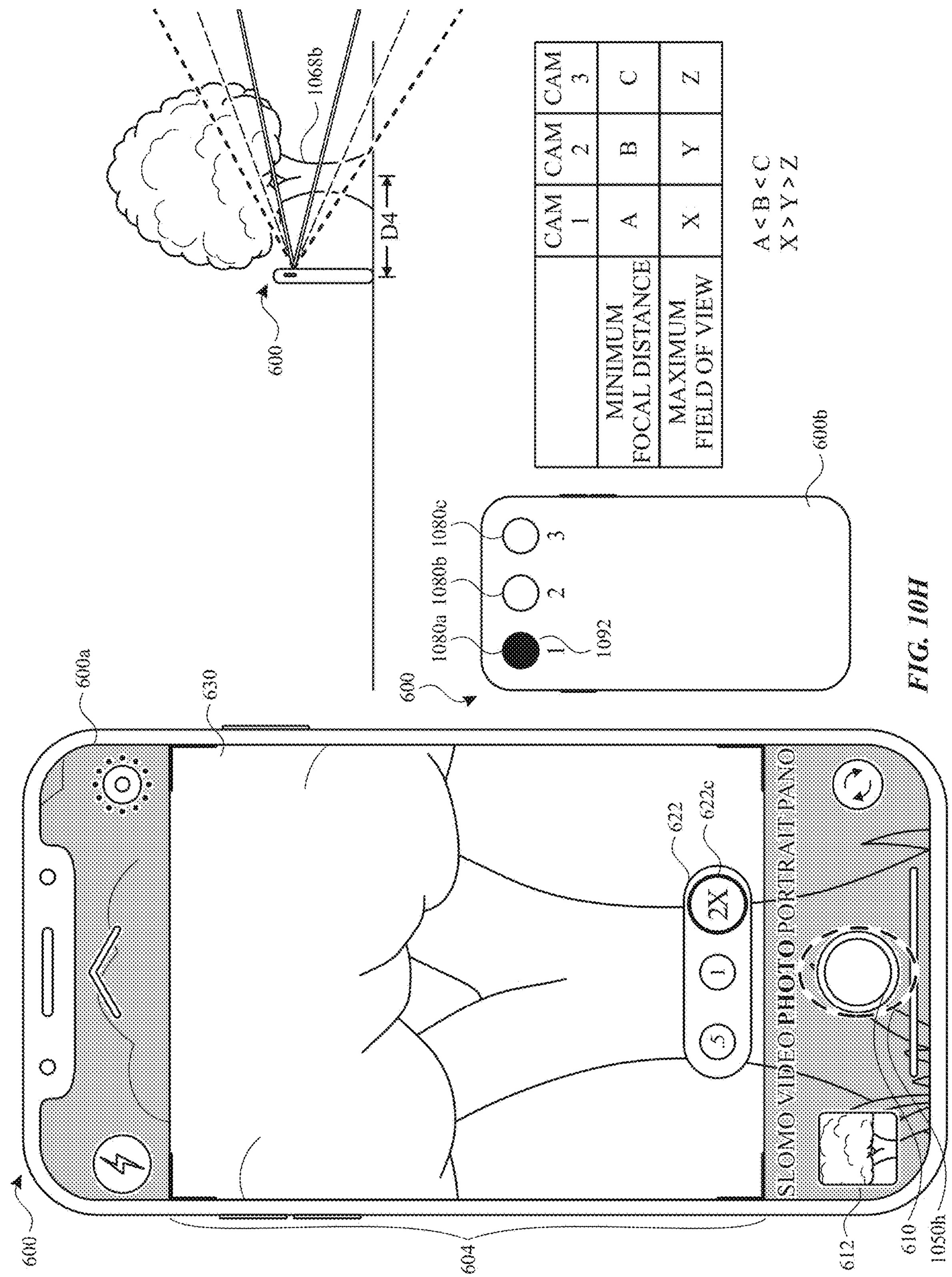
Figure 10I:
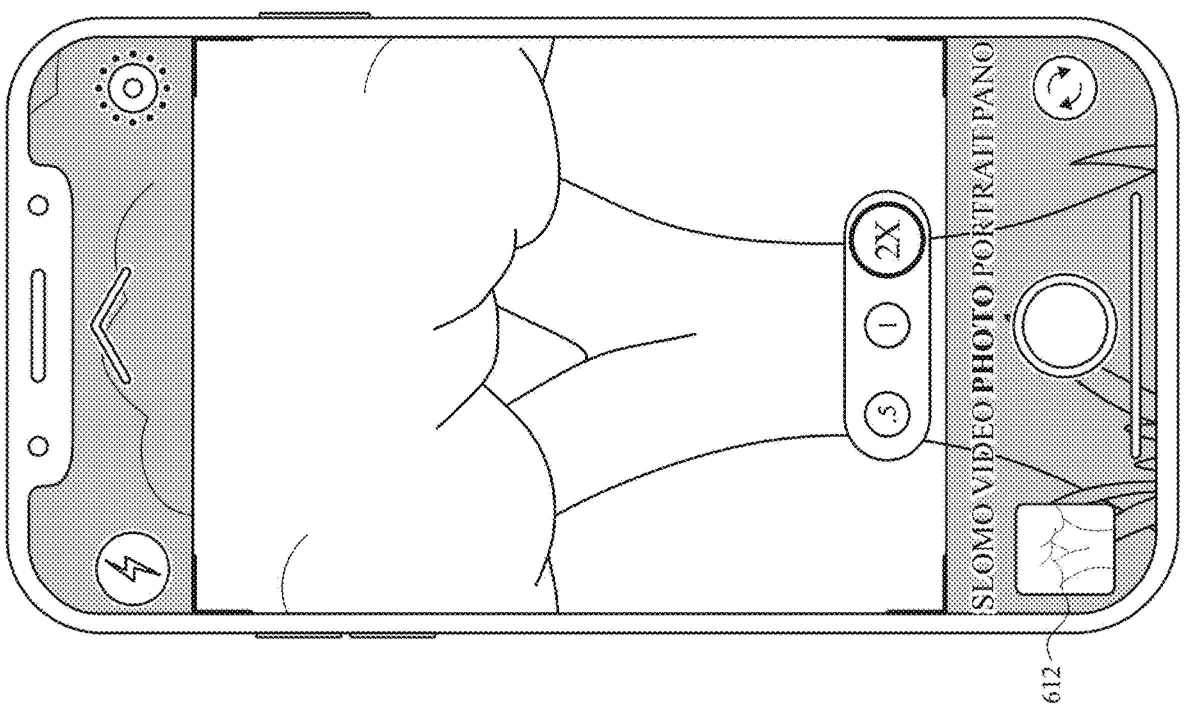

As illustrated in FIG. 10H, computer system 600 updates media collection 612 to include a representation of media that was captured in response to detecting tap input 1050*g*. As illustrated in FIG. 10H, computer system 600 has moved closer to the focal point (e.g., tree 1068*b*). At FIG. 10H, in response to detecting a change in distance between the focal point and cameras 1080*a*-1080*c*, a determination is made that the current distance (e.g., D4 in FIG. 10H) between the focal point and cameras 1080*a*-1080*c* is not greater than a second predetermined threshold distance (e.g., based on the minimum focal distance of camera 1080*b*, a smaller threshold distance than the first predetermined threshold distance of FIGS. 10F-10G). Based on this determination, computer system 600 switches from using camera 1080*b* to using camera 1080*a* (e.g., as indicated by use indicator 1092 being located at camera 1080*a* in FIG. 10H) to display the portion of live preview 630 in camera display region 604 (e.g., using similar techniques and for similar reasons as those discussed above in relation to FIGS. 10A-0C). At FIG. 10H, computer system 600 detects tap input 1050*h* on shutter control 610. At FIG. 10H, a determination is made that the current distance (e.g., D4 in FIG. 10H) between the focal point and cameras 1080*a*-1080*c* is not greater than the second predetermined threshold distance (e.g., based on the minimum focal distance of camera 1080*b*, a smaller threshold distance than the first predetermined threshold distance of FIGS. 10F-10G). At FIG. 10H, because the determination is made that the current distance between the focal point and cameras 1080*a*-1080*c* is not greater than the second predetermined threshold distance, computer system 600 captures media representative of live preview 630 using camera 1080*a*. As illustrated in FIG. 10I, computer system 600 updates media collection 612 to include a representation of media that was captured in response to detecting tap input 1050*h*.

FIGS. 10A-10I describe embodiments where computer system 600 determines whether or not to automatically switch between using cameras to display live preview 630 and/or capture media based on the distance between the focal point and cameras 1080*a*-1080*c* being greater than and/or less one or more predetermined threshold distances. In some embodiments, the predetermined threshold distances are adjusted and/or changed based on the detected amount of light in the field-of-view of the one or more cameras. In some embodiments, when the detected amount of light in the field-of-view of the one or more cameras is below a light threshold (e.g., 20 lux, 15 lux, 10 lux, or 5 lux), the predetermined threshold distances are adjusted to make switching between a set of cameras and/or to a camera (e.g., camera 1080*a*) occur at different distances than when the detected amount of light in the field-of-view of the one or more cameras is above the light threshold. In some embodiments, the predetermined threshold distances are adjusted to make switching between a set of cameras and/or to a respective camera (e.g., camera 1080*a*) occur at different distances by making a range of distances smaller for which computer system 600 switches to the set of cameras and/or the respective camera. For example, if the predetermined threshold distance is 8-10 cm when the amount of light detected in the field-of-view is above the light threshold, the predetermined threshold distance can be adjusted to 6-8 cm when the detected amount of light in the field-of-view is below the light threshold.

FIG. 11 is a flow diagram illustrating an exemplary method for managing media capture using a computer system in accordance with some embodiments. Method 1100 is performed at a computer system (e.g., 600) (e.g., a smartphone, a desktop computer, a laptop, and/or a tablet) that is in communication with a display generation component (e.g., a display controller and/or a touch-sensitive display system) and a plurality of cameras (e.g., 1080*a*, 1080*b*, and/or 1080*c*) (e.g., one or more cameras/camera sensors (e.g., dual cameras/camera sensors, triple camera/camera sensors, and/or quad cameras/camera sensors) on the same side or different sides of the computer system (e.g., a front camera and/or a back camera))) (e.g., one or more ultra wide-angle, wide-angle, an/or telephoto cameras) that includes a first camera (e.g., 1080*b* or 1080*c*) (e.g., a hardware camera and/or camera sensor (e.g., a wide-angle camera and/or camera sensor, a camera having a wide-angled width) and/or (e.g., a telephoto camera)) with (e.g., one or more) first image capture parameters (e.g., represented by 1090*b* or 1090*c*) (e.g., 1072*b* or 1072*c*) determined by hardware (e.g., sensor size, shape, and/or placement; lens shape, size, and/or placement; and/or aperture size, shape, and/or placement) of the first camera (e.g., a first minimum focal distance (e.g., 7-12 cm or 12-15 cm) and a first field-of-view (e.g., an open observable area that is visible to a camera, the horizontal (or vertical or diagonal) length of an image at a given distance from the camera lens) (and, in some embodiments, a hardware or optical field-of-view (FOV) based on the sensor size and the focal length of the lens (e.g., not a digitally zoomed in FOV))) and a second camera (e.g., 1080*a* or 1080*b*) (e.g., a hardware camera and/or camera sensor (e.g., an ultra-angle camera and/or camera sensor, a camera having an ultra-wide-angle width) and/or (e.g., a wide angled camera) with (e.g., one or more) second image capture parameters (e.g., represented by 1090*a* or 1090*b*) (e.g., 1072*a* or 1072*b*) determined by hardware (e.g., sensor size, shape, and/or placement; lens shape, size, and/or placement; and/or aperture size, shape, and/or placement) of the second camera (e.g., a second minimum focal distance (e.g., 0-6 cm or 7-12 cm) that is shorter than the first minimum focal distance (e.g., 7-12 cm or 12-15 cm) of the first camera and/or a second field of view that is wider than the first field-of-view (e.g., a FOV that has a wider angle of view in at least one dimension) of the first camera) (e.g., the wide-angle camera). The second image capture parameters are different than the first image capture parameters. In some embodiments, the computer system is in communication with one or more input devices (e.g., a touch-sensitive surface).

As described below, method 1100 provides an intuitive way for altering visual media. The method reduces the cognitive burden on a user for managing media capture, thereby creating a more efficient human-machine interface. For battery-operated computing devices, enabling a user to manage media capture faster and more efficiently conserves power and increases the time between battery charges.

The computer system (e.g., 600) displays (1102), via a display generation component, a camera user interface that includes a representation (e.g., 630) (e.g., a representation over-time and/or a live preview feed of data from a camera) of a field-of-view of one or more of the plurality of cameras, where (e.g., 630) the representation of the field-of-view is displayed using visual information collected by (e.g., using/based on (e.g., generated based on/using) data captured by) the first camera (e.g., 1080*b* or 1080*c*) with the first image capture parameters (e.g., represented by 1090*b* or 1090*c*) (e.g., without using the second camera (and/or visual information collected by the second camera with the second camera image capture parameters) to display the representation of the media). In some embodiments, the first camera is a first type of camera.

While displaying the representation (e.g., 630) of the field-of-view using the visual information collected by the first camera (e.g., 1080*b* or 1080*c*) (e.g., with the first image capture parameters), the computer system detects (1104) a decrease in distance (e.g., D1 or D2 in FIGS. 10A-10I) (e.g., a physical distance or a distance of an optical path) between a camera location (e.g., position of 1080*a*, 1080*b*, or 1080*c*) (e.g., a location of a focal plane of a camera or a location based on a focal plane of the camera) that corresponds to at least one of the plurality of cameras (e.g., 1080*a*, 1080*b*, or 1080*c*) (e.g., the first camera and/or the second camera) and a focal point location (e.g., represented by position of 1078) that correspond to a focal point (e.g., represented by 1078) (e.g., an estimated or determined distance to a physical object at a focal point that has been selected (e.g., automatically (e.g., without user input) or with user input corresponding to selection of the focal point (e.g., user input such as tap input (e.g., single tap and/or double tap), press-and-hold input, and/or dragging input) (e.g., for media capture) (e.g., In some embodiments, due to movement of computer system and/or at least one of the plurality of cameras, the focal point moving (e.g., an object that the camera is focus on moving), and/or selection of a different focal point). In some embodiments, the computer system is configured to cause at least one of the plurality of cameras to focus at the focal point (e.g., focal point in the field-of-view).

In response to (1106) detecting the decrease in distance (e.g., D1, D2, or D3 in FIGS. 10A-10I) between the camera location (e.g., position of 1080*a*, 1080*b*, or 1080*c* and/or viewpoint of 1080*a*, 1080*b*, 1080*c*) and the focal point location (e.g., represented by position of 1078) and in accordance with a determination that the decreased distance (e.g., D1, D2, or D3 in FIGS. 10A-10I) between the camera location and the focal point location is closer than a predetermined threshold distance (e.g., 2-3 cm, 8-10 cm, 0-6 cm, 7-12 cm, 12-15 cm, 1-5 m, 2-6 m, or 3-10 m), the computer system transitions (1108) (e.g., switches) from using the visual information collected by the first camera (e.g., 1080*b* or 1080*c*) to display the representation (e.g., 630) of the field-of-view to using visual information collected by the second camera (e.g., 1080*a* or 1080*b*) (e.g., that has a wider field-of-view than the field-of-view of the first camera) to display the representation (e.g., 630) of the field-of-view (e.g., without using the first camera to display the representation of the media). In some embodiments, the second camera is a different type of camera (e.g., has a lens with a different (e.g., wider) lens than camera) than the first type of camera that corresponds to the first camera. Automatically transitioning from using the visual information collected by the first camera to display the representation of the field-of-view to using visual information collected by the second camera to display the representation of the field-of-view when prescribed conditions are met allows the computer system to automatically choose whether the first camera or second camera will be used to display the representation, without requiring the user to choose and select (e.g., via one or more additional inputs) the preferred camera (e.g., based on the image capture parameters for the camera) for displaying the representation of the field-of-view at a particular point in time, which performs an operation when a set of conditions has been met without requiring further user input and reduces the number of inputs needed to perform an operation.

In some embodiments, the predetermined threshold distance (e.g., 2-3 cm, 8-10 cm, 0-6 cm, 7-12 cm, 12-15 cm, 1-5 m, 2-6 m, or 3-10 m) is based on (e.g., at least) the first image capture parameters (e.g., represented by 1090*b* or 1090*c*) (e.g., of the first camera) (e.g., such as the minimum focal distance of the first camera) (and/or the second image capture parameters (e.g., represented by 1090*a* or 1090*b*)). Automatically transitioning from using the visual information collected by the first camera to display the representation of the field-of-view to using visual information collected by the second camera to display the representation of the field-of-view when prescribed conditions are met, where at least one of the prescribed conditions is based on the image capture parameters of a camera of the device allows the computer system to automatically choose whether the first camera or second camera will be used to display the representation, without requiring the user to choose and select (e.g., via one or more additional inputs) the preferred camera for displaying the representation of the field-of-view at a particular point in time, which performs an operation when a set of conditions has been met without requiring further user input and reduces the number of inputs needed to perform an operation.

In some embodiments, while displaying the representation (e.g., 630) of the field-of-view using the visual information collected by the first camera, the computer system detects a request (e.g., 1050*f*, 1050*g*, or 1050*h*) to capture media. In some embodiments, as a part of detecting a request to capture media, the computer system detects an input directed to (e.g., on, at a location corresponding to) a user interface object (e.g., a shutter button) for capturing media. In some embodiments, the computer system displays the camera user interface includes the user interface object for capturing media. In some embodiments, the computer system displays the user interface object for capturing media is displayed concurrently with the representation of the media. In some embodiments, in response to detecting the request to capture media, the computer system captures media (e.g., represented by 612 in FIGS. 10G-10I) using: in accordance with a determination that a current distance (e.g., D2 in FIGS. 10F-10G) (e.g., that was determined after the capture of media was detected) between the camera location (e.g., position of camera and/or view point of camera 1080*a*, 1080*b*, or 1080*c*) and the focal point location (e.g., represented by 1078) is closer than a second predetermined threshold distance (e.g., 2-3 cm, 8-10 cm, 0-6 cm, 7-12 cm, 12-15 cm, 1-5 meters, 2-6 meters, or 3-10 meters) (e.g., as discussed above in relation to FIGS. 10F-10G), second visual information collected by the first camera (e.g., 1080*b* or 1080*c*) (e.g., without using visual information collected by the second camera); and in accordance with a determination that the current distance between the camera location (e.g., position of 1080*a*, 1080*b*, or 1080*c* and/or viewpoint of 1080*a*, 1080*b*, 1080*c*) and the focal point location (e.g., represented by position of 1078) is not closer than the second predetermined threshold distance (e.g., as discussed above in relation to FIGS. 10F-10G), second visual information collected by the second camera (e.g., 1080*a* or 1080*b*) (e.g., without using visual information collected by the first camera). In some embodiments, in response to detecting the request to capture media, the computer system determines whether or not the current distance between the camera location and the focal point location is closer than the second predetermined threshold distance. In some embodiments, the second visual information collected by the first camera is visual information that has been captured after the request to capture media was detected. In some embodiments, the second visual information collected by the second camera is visual information that has been captured after the request to capture media was detected. In some embodiments, the second predetermined threshold distance is the same as the predetermined threshold distance. Choosing whether to capture media using the first camera or the second camera when prescribed conditions are met allows the computer system to automatically choose whether the first camera or second camera will be used to capture media, without requiring the user to choose and select (e.g., via one or more additional inputs) the preferred camera for capturing media at a particular point in time, which performs an operation when a set of conditions has been met without requiring further user input and reduces the number of inputs needed to perform an operation.

In some embodiments, in response to (1106) detecting the decrease in distance (e.g., D1, D2, or D3 in FIGS. 10A-10I) between the camera location (e.g., position of 1080*a*, 1080*b*, or 1080*c* and/or viewpoint of 1080*a*, 1080*b*, 1080*c*) and the focal point location (e.g., represented by position of 1078) and in accordance with a determination that the decreased distance (e.g., D1, D2, or D3 in FIGS. 10A-10I) between the camera location (e.g., position of 1080*a*, 1080*b*, or 1080*c* and/or viewpoint of 1080*a*, 1080*b*, 1080*c*) and the focal point location (e.g., represented by position of 1078) is not closer than the predetermined threshold distance, the computer system forgoes transitioning from using the visual information collected by the first camera (e.g., 1080*b* or 1080*c*) to display the representation (e.g., 630) of the field-of-view to using the visual information collected by the second camera (e.g., 1080*a* or 1080*b*) to display the representation of the field of view (and continuing to display the representation of the field-of-view using the visual information collected by the first camera). Choosing whether or not to transitioning from using the visual information collected by the first camera to display the representation of the field-of-view to using visual information collected by the second camera to display the representation of the field-of-view when prescribed conditions are met, without requiring the user to choose and select (e.g., via one or more additional inputs) the preferred camera for displaying the representation of the field-of-view at a particular point in time, which performs an operation when a set of conditions has been met without requiring further user input and reduces the number of inputs needed to perform an operation.

In some embodiments, the decrease in distance between the camera location (e.g., position of 1080*a*, 1080*b*, or 1080*c* and/or viewpoint of 1080*a*, 1080*b*, 1080*c*) and the focal point location (e.g., represented by position of 1078) is detected based on (e.g., at least) (e.g., in response to) movement (e.g., as shown in FIGS. 10A-10I) of the computer system (e.g., 600) (e.g., the decrease in distance between the camera location and the focal point location is detected in response to the one or more cameras moving and/or the computer system moving). In some embodiments, the computer system is in communication with one or more sensors (e.g., motion sensors and/or accelerometers) that are capable of detecting movement of the computer system and detecting the decrease in distance includes detecting movement of the computer system, via the one or more sensors. Automatically transitioning from using the visual information collected by the first camera to display the representation of the field-of-view to using visual information collected by the second camera to display the representation of the field-of-view when prescribed conditions are met due to movement of a camera allows the computer system to automatically choose whether the first camera or second camera will be used to display the representation, without requiring the user to choose and select (e.g., via one or more additional inputs) the preferred camera (e.g., based on the image capture parameters for the camera) for displaying the representation of the field-of-view at a particular point in time when a camera has been moved, which performs an operation when a set of conditions has been met without requiring further user input and reduces the number of inputs needed to perform an operation.

In some embodiments, the decrease in distance between the camera location (e.g., position of 1080*a*, 1080*b*, or 1080*c* and/or viewpoint of 1080*a*, 1080*b*, 1080*c*) and the focal point location (e.g., represented by position of 1078) is detected based on a new focal point (e.g., 1078) being selected (e.g., as shown in FIGS. 10A-10D) (e.g., where the new focal point and/or the focal point was not selected before the decrease in distance between the camera location and the focal point location was detected). In some embodiments, the new focal point is automatically (e.g., without user input directed to the display generation component) selected (and/or a focal point is changed from an old focal point to a new focal point) by the computer system based on one or more conditions in the field-of-view. In some embodiments, the new focal point is manually selected (e.g., by a user of the device, via one or more inputs directed to the display generation component). In some embodiments, the one or more inputs is a tap input (e.g., a single tap input and/or a multi-tap input) directed to the display generation component. In some embodiments, the one or more inputs is a non-tap input (e.g., a press-and-hold input, voice input, a pinch input (e.g., to change the zoom level of the representation), and/or a swipe input (e.g., to pan the representation)). Automatically transitioning from using the visual information collected by the first camera to display the representation of the field-of-view to using visual information collected by the second camera to display the representation of the field-of-view when prescribed conditions are met due to a new focal point being selected allows the computer system to automatically choose whether the first camera or second camera will be used to display the representation, without requiring the user to choose and select (e.g., via one or more additional inputs) the preferred camera (e.g., based on the image capture parameters for the camera) for displaying the representation of the field-of-view at a particular point in time when a new focal point has been selected, which performs an operation when a set of conditions has been met without requiring further user input and reduces the number of inputs needed to perform an operation.

In some embodiments, while displaying the representation (e.g., 630) of the field-of-view using visual information collected by the second camera (e.g., 1080*a* or 1080*b*), the computer system detects an increase in distance between the camera location (e.g., position of 1080*a*, 1080*b*, or 1080*c* and/or viewpoint of 1080*a*, 1080*b*, 1080*c*) and the focal point location (e.g., represented by position of 1078). In some embodiments, in response to (1106) detecting the decrease in distance (e.g., D1, D2, or D3 in FIGS. 10A-10I) between the camera location (e.g., position of 1080*a*, 1080*b*, or 1080*c* and/or viewpoint of 1080*a*, 1080*b*, 1080*c*) and the focal point location (e.g., represented by position of 1078) and in accordance with a determination that the increased distance (e.g., D1, D2, or D3 in FIGS. 10A-10I) between the camera location (e.g., position of 1080*a*, 1080*b*, or 1080*c* and/or viewpoint of 1080*a*, 1080*b*, 1080*c*) and the focal point location (e.g., represented by position of 1078) is not closer (e.g., is further) than a third predetermined threshold distance (e.g., 2-3 cm, 8-10 cm, 0-6 cm, 7-12 cm, 12-15 cm, 1-5 m, 2-6 m, or 3-10 m), the computer system transitions from using the visual information collected by the second camera (e.g., 1080*a* or 1080*b*) to display the representation of the field-of-view to using visual information collected by the first camera (e.g., 1080*b* or 1080*c*) to display the representation of the field-of-view (e.g., without displaying the representation of the media using visual information collected by the first camera). In some embodiments, the third predetermined threshold distance is the same as the predetermined threshold distance. In some embodiments, the third predetermined threshold distance is different (e.g., greater than) than the predetermined threshold distance. In some embodiments, the third predetermined threshold distance is the same as the predetermined threshold distance. In some embodiments, in response to detecting the increase in distance between the camera location and the focal point location and in accordance with a determination that the increased distance between the camera location and the focal point location is closer than the third predetermined threshold distance, the computer system does not transition (e.g., forgoes transitioning) from using the visual information collected by the second camera to display the representation of the field-of-view to using visual information collected by the first camera to display the representation of the field-of-view (and continuing to display the representation of the field-of-view using the visual information collected by the second camera). Transitioning from using the visual information collected by the second camera to display the representation of the field-of-view to using visual information collected by the first camera to display the representation of the field-of-view when prescribed conditions are met allows the computer system to automatically choose whether the first camera or second camera will be used to display the representation, without requiring the user to choose and select (e.g., via one or more additional inputs) the preferred camera (e.g., based on the image capture parameters for the camera) for displaying the representation of the field-of-view at a particular point in time, which performs an operation when a set of conditions has been met without requiring further user input and reduces the number of inputs needed to perform an operation.

In some embodiments-, the representation of the field-of-view is displayed at an effective zoom level (e.g., a zoom level at which the representation appears to be displayed, a range of zoom levels that are within a predetermined amount (e.g., below a threshold amount) from each other (e.g., 0.00000001×, 0.0000004×, 0.0003×, 0.03×, 0.07×. 0.1×, 0.16×, or 0.2× zoom amount) before the decrease in distance between the camera location (e.g., position of 1080*a*, 1080*b*, or 1080*c* and/or viewpoint of 1080*a*, 1080*b*, 1080*c*) and the focal point location (e.g., represented by position of 1078) was detected. In some embodiments, as a part of transitioning from using the visual information collected by the first camera (e.g., 1080*b* or 1080*c*) to display the representation (e.g., 630) of the field-of-view to using visual information collected by the second camera (e.g., 1080*a* or 1080*b*) to display the representation of the field-of-view, the computer system continues to display the representation of the field-of-view at the effective zoom level (e.g., as represented by 622*a*, 622*b*, 622*c*). In some embodiments, the effective zoom level is different from a native zoom level of the second camera (e.g., displaying the representation of the field-of-view at the effective zoom level includes displaying the representation of the field-of-view at a digital zoom level relative to the native zoom level of the second camera) (e.g., at which representation was displayed before the decrease in distance between the camera location and the focal point location was detected). In some embodiments, after transitioning from using the visual information collected by the first camera to display the representation of the field-of-view to using visual information collected by the second camera to display the representation of the field-of-view, the representation of the field-of-view is displayed at a zoom level that is no more than a first amount of zoom (e.g., 0.0001× to 0.02×) from the zoom level, such that the representation appears to continue to be displayed at the zoom level. In some embodiments, in response to detecting the decreased distance between the camera location and the focal point location and in accordance with a determination that the decreased distance between the camera location and the focal point location is closer than a predetermined threshold distance, the computer system continues to display the representation of the field-of-view at the zoom level. Continuing to display the representation of the field-of-view at the effective zoom level as a part of transitioning from using the visual information collected by the first camera to display the representation of the field-of-view to using visual information collected by the second camera to display the representation of the field-of-view provides the user with improved visual feedback by maintaining (and/or reducing) the effective zoom at which the representation of the field-of-view is displayed, which provides improved visual feedback.

In some embodiments, transitioning from using the visual information collected by the first camera (e.g., 1080*b* or 1080*c*) to display the representation of the field-of-view to using the visual information collected by the second camera (e.g., 1080*a* or 1080*b*) to display the representation (e.g., 630) of the field-of-view includes changing an appearance of the representation of the field-of-view (e.g., visually updating the appearance of the representation of the field-of-view). In some embodiments, the updated representation of the field-of-view has a different appearance than the representation of the field-of-view that was displayed before transitioning from using the visual information collected by the first camera to display the representation of the field-of-view to using the visual information collected by the second camera to display the representation of the field-of-view. Changing an appearance of the representation of the field-of-view as a part of transitioning from using the visual information collected by the first camera to display the representation of the field-of-view to using the visual information collected by the second camera to display the representation of the field-of-view provides feedback to the user that one or more changes have occurred with respective to how the representation of the field-of-view is being displayed, which provides improved visual feedback.

In some embodiments, the first camera (e.g., 1080_b_ or 1080_c_) is located (e.g., physically located) at a first position on the computer system (e.g., 600). In some embodiments, the second camera (e.g., 1080_a_ or 1080_b_) is located (e.g., physically located) at a second position (e.g., different from the first position) on the computer system (e.g., 600). In some embodiments, as a part of transitioning from using the visual information collected by the first camera (e.g., 1080_b_ or 1080_c_) to display the representation (e.g., 630) of the field-of-view to using visual information collected by the second camera (e.g., 1080_a_ or 1080_b_) to display the representation of the field-of-view, the computer system displays the representation of the field-of-view that is shifted to increase alignment between the field of view of the first camera and the field of view of the second camera near a predetermined portion (e.g., a portion at the center of the representation of the field-of-view (e.g., live preview) or the focal point) of the camera user interface (e.g., user interface that includes 602, 604, and 606) than the amount of translation near the predetermined portion while decreasing alignment between the field of view of the first camera and the field of view of the second camera at one or more portions of the representation of the field-of-view that are further away from the predetermined portion. In some embodiments, the amount of translation at the predetermined portion of the camera user interface is less than an amount of translation at a second predetermined portion (e.g., at an edge) of the camera user interface. In some embodiments, in accordance with a determination that the focal point corresponds to a first location on the camera user interface, the computer system shifts the representation of the field-of-view by a first amount to increase the alignment between the field of view of the first camera and the field of view of the second camera near a predetermined portion of the camera user interface. In some embodiments, in accordance with a determination that the focal point corresponds to a first location on the camera user interface, the computer system shifts the representation of the field-of-view by a second amount that is different from (e.g., larger than or smaller than) the first amount to increase the alignment between the field of view of the first camera and the field of view of the second camera near a predetermined portion of the camera user interface. Displaying the representation of the field-of-view with a reduced amount of translation near a predetermined portion of the camera user interface than the amount of translation near the predetermined portion that would occur when the first camera is located at a position that is different from the first position and/or when the second camera is located at a position that is different from the second position as a part of transitioning from using the visual information collected by the first camera to display the representation of the field-of-view to using visual information collected by the second camera to display the representation of the field-of-view provides the user with improved visual feedback by reducing the amount of translation (and/or distractions and changes to the camera user interface) that transitioning between using the cameras could cause to the display of the camera user interface and/or the representation of the field-of-view, which provides improved visual feedback.

In some embodiments, the plurality of cameras includes a third camera (e.g., 1080_b_ or 1080_c_) (e.g., a hardware camera and/or camera sensor (e.g., an telephoto camera and/or camera sensor, a camera having a width)) (e.g., a camera that is different from the first camera and/or the second camera) with (e.g., one or more) third image capture parameters (e.g., 1090_b_ or 1090_c_) determined by hardware (e.g., sensor size, shape, and/or placement; lens shape, size, and/or placement; and/or aperture size, shape, and/or placement) of the third camera (e.g., a third minimum focal distance that is longer than the first minimum focal distance of the first camera and the second minimum focal distance of the second camera and/or a third field of view that is narrower than the first field-of-view and/or the second field-of-view), and wherein the third image capture parameters (e.g., 1090_b_ or 1090_c_) are different than the first image capture parameters (e.g., 1090_b_ or 1090_c_) and the second image capture parameters (e.g., 1090_a_ or 1090_b_). In some embodiments, before displaying the representation (e.g., 630) of the field-of-view using the visual information collected by the first camera (e.g., 1090_b_ or 1090_c_) with the first image capture parameters, the computer system displays the representation of the field-of-view using visual information collected by the third camera with the third image capture parameters. In some embodiments, while displaying the representation of the field-of-view using the visual information collected by the third camera (e.g., 1090_b_ or 1090_c_) (e.g., with the third image capture parameters), the computer system detects a second decrease in distance (e.g., represented by D1, D2, or D3) (e.g., a physical distance or a distance of an optical path) between the camera location (e.g., position of 1080_a_, 1080_b_, or 1080_c_ and/or viewpoint of 1080_a_, 1080_b_, 1080_c_) and the focal point location (e.g., represented by position of 1078). In some embodiments, the second decrease in distance occurs due to a different set of circumstance than the decrease in distance. In some embodiments, in response to detecting the second decrease in distance between the camera location and the focal point location and in accordance with a determination that the second decreased distance between the camera location and the focal point location is closer than a fourth predetermined distance (e.g., 2-3 cm, 8-10 cm, 0-6 cm, 7-12 cm, 12-15 cm, 1-5 m, 2-6 m, or 3-10 m), the computer system transitions (e.g., switches) from using the visual information collected by the third camera to display the representation of the field-of-view to using the visual information collected by the first camera to display the representation of the field-of-view (e.g., without using visual information collected by the first camera and/or the third camera). In some embodiments, in response to detecting the second decrease in distance between the camera location and the focal point location and in accordance with a determination that the second decreased distance between the camera location and the focal point location is not closer than the fourth predetermined distance, the computer system forgoes transitioning from using the visual information collected by the third camera to display the representation of the field-of-view to using visual information collected by the first camera to display the representation of the field-of-view. In some embodiments, as a part of and/or after transitioning from using the visual information collected by the third camera to display the representation of the field-of-view to using the visual information collected by the first camera to display the representation of the field-of-view, the computer system displays the representation of the field-of-view to using visual information collected by the first camera. Automatically transitioning from using the visual information collected by the third camera to display the representation of the field-of-view to using visual information collected by the first camera to display the representation of the field-of-view when prescribed conditions are met allows the computer system to automatically choose whether the first camera or second camera will be used to display the representation, without requiring the user to choose and select (e.g., via one or more additional inputs) the preferred camera (e.g., based on the image capture parameters for the camera) for displaying the representation of the field-of-view at a particular point in time, which performs an operation when a set of conditions has been met without requiring further user input and reduces the number of inputs needed to perform an operation.

In some embodiments, in accordance with a determination that an amount of light (e.g., ambient light and/or available light) in the field-of-view of one or more of the plurality of cameras (e.g., when detecting the decrease in distance (e.g., a physical distance or a distance of an optical path) between the camera location and the focal point location) is above a threshold amount of light (e.g., 22 lux, 20 lux, 11 lux, 10 lux, 5 lux, and/or 1 lux) (e.g., a low-light threshold, a threshold where the computer system can be configured to operate in a low-light mode when the amount of light in the field-of-view is below the threshold), the predetermined threshold distance is a first threshold distance (e.g., as discussed above (e.g., in relation to FIG. 10I)). In some embodiments, in accordance with a determination that the amount of light in the field-of-view of one or more of the plurality of cameras is not above the threshold amount of light (e.g., when detecting the decrease in distance (e.g., a physical distance or a distance of an optical path) between the camera location and the focal point location), the predetermined threshold distance is a second threshold distance that is different from (e.g., shorter than) the first threshold distance (e.g., as discussed above (e.g., in relation to FIG. 10I)). In some embodiments, in accordance with a determination that the amount of light in the field-of-view of one or more of the plurality of cameras is not above the threshold, the camera location has to be closer to the focal point location before the computer system transitions from using the visual information collected by one camera (e.g., the first camera and/or third camera) to display the representation of the field-of-view to using visual information collected by the other camera (e.g., second camera and/or third camera) to display the representation of the field-of-view. Automatically having a predetermined threshold distances that changes when prescribed conditions are met allows the computer system automatically choose whether the first camera or second camera will be used to display the representation based on the amount of light in the field-of-view which performs an operation when a set of conditions has been met without requiring further user input and reduces the number of inputs needed to perform an operation.

In some embodiments, the first camera (e.g., 1080*b* or 1080*c*) has a first fixed focal length (e.g., a first fixed angular field of view) and the second camera (e.g., 1080*a* or 1080*b*) has a second fixed focal length (e.g., corresponding to a second fixed angular field of view) that is different from the first fixed focal length (e.g., the first and second prime cameras). In some embodiments, the first camera has a fixed focal length that is different (e.g., longer or shorter) than the fixed focal length of the second camera. In some embodiments, the first camera (e.g., 1080*b* or 1080*c*) has a first minimum focal distance (e.g., A, B, or C in 1090) (e.g., 1072*a*, 1072*b*, or 1072*c*) (e.g., 7-12 cm or 12-15 cm). In some embodiments, the second camera (e.g., 1080*a* or 1080*b*) has a second minimum focal distance (e.g., A, B, or C in 1090) (e.g., 1072*a*, 1072*b*, or 1072*c*) (e.g., 1-6 cm or 7-12 cm). In some embodiments, the first minimum focal distance is longer (e.g., larger; greater in length) than the second minimum focal distance. In some embodiments, the first camera has a first minimum zoom level. In some embodiments, the second camera has a second minimum zoom level. In some embodiments, the first minimum zoom level is different than (e.g., larger or smaller) the second minimum zoom level. In some embodiments, the first camera has a first maximum zoom level (e.g., X, Y, or Z in 1090). In some embodiments, the second camera has a second maximum zoom level (e.g., X, Y, or Z in 1090). In some embodiments, the first maximum zoom level is different than (e.g., larger or smaller) the second maximum zoom level.

Note that details of the processes described above with respect to method 1100 (e.g., FIG. 11) are also applicable in an analogous manner to the methods described above and/or below. For example, methods 700, 800, 900, and/or 1300 optionally includes one or more of the characteristics of the various methods described above with reference to method 1100. For example, the method described above in method 900 can be used to display media in a media editing user interface after the media is captured using one or more techniques described in relation to methods 700 and/or method 1100. For brevity, these details are not repeated above.

Figure 12:
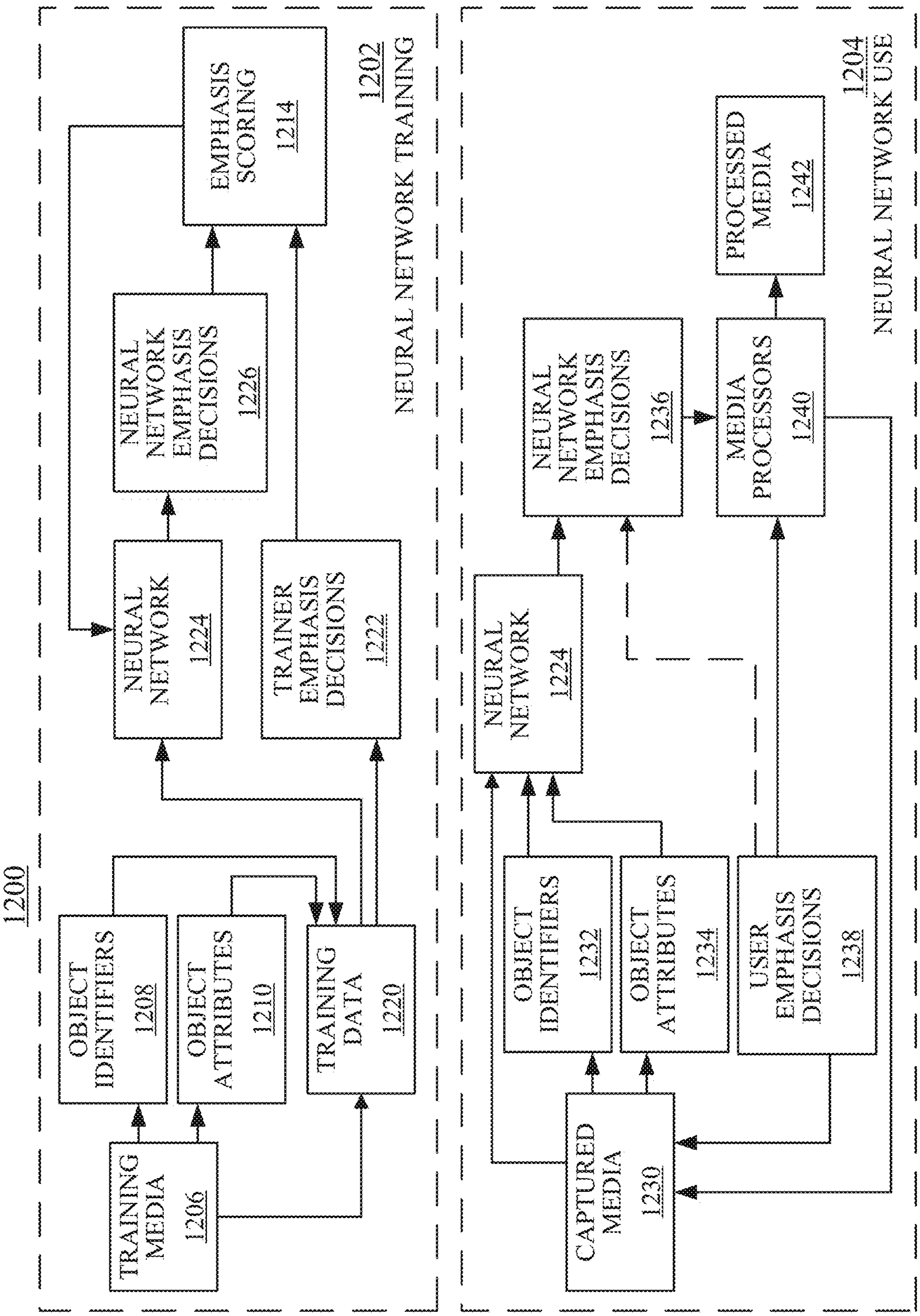
FIG. 12 is a block diagram illustrating a neural network system.

FIG. 12 is a block diagram illustrating exemplary neural network system 1200. In some embodiments, one or more components of neural network system 1200 are used to make a determination of whether an automatic change to the synthetic depth-of-field effect should be applied to the captured and/or edited media (e.g., in one or more scenarios as discussed above in relation to FIGS. 6A-6BJ). In some embodiments, neural network system 1200 includes neural network training portion 1202 and neural network use portion 1204.

Neural network training portion 1202 provides exemplary embodiments concerning how neural network 1224 is trained. Neural network training portion 202 includes training media 1206. In some embodiments, training media 1262 includes data representing one or more frames of media (e.g., video). In some embodiments, training media includes one or more frames from 100, 200, 500, 1000, and/or 100,000 videos. In some embodiments, the one or more frames have previously been captured by one or more cameras of computer system 600. In some embodiments, training media 1206 is processed by one or more object processing algorithms (e.g., one or more machine learning algorithms). In some embodiments, the one or more object processing algorithms use computer vision to identify one or more objects in media. In some embodiments, the one or more object processing algorithms identify one or more object identifiers 1208 and one or more object attributes 1210 in the one or more frames of training media 1206. In some embodiments, object identifiers 1208 include identifiers that correspond to a face and/or head of a person (e.g., John 632 and/or Jane 634) and/or animal (e.g., dog 638), a torso of a person and/or animal, and/or an inanimate object (e.g., wagon 626 and/or flower 698), such as a ball (e.g., a sports ball) and/or a wagon. In some embodiments, object identifiers 1208 include an object type (e.g., a person, an animation, a plant, a flower, etc.). In some embodiments, object attributes 1210 include one or more attributes (e.g., characteristics) of an object, such a face pose. In some embodiments, a face pose includes one or more attributes, such as the roll, pitch, and/or yaw of a detected face. In some embodiments, object attributes 1210 can include as a normalized (x, y) position, size, and/or confidence of a nose of a detected face and/or a left and/or right eye, ear, shoulder, elbow, wrist, hip, knee, and/or ankle of a detected person and/or animal.

As shown in neural network training portion 1202 of FIG. 12, training media 1206, object identifiers 1208, and object attributes 1210 are used as training data 1220, which is fed into neural network 1224. Training data 1220 is used to train neural network 1224 and is also used by human reviewers to make trainer emphasis decisions 1222. In some embodiments, neural network 1224 is a multilayer perceptron (e.g., an algorithm for supervised learning of binary classifiers). In some embodiments, the neural network outputs neural network emphasis decisions 1226 based on training data 1220. In some embodiments, neural network emphasis decisions 1226 includes one or more determinations of whether an automatic change to the synthetic depth-of-field effect is needed at different times in a plurality of videos. In some embodiments, trainer emphasis decisions 1222 and neural network emphasis decisions 1226 are compared with an emphasis scoring module 1214 to generate emphasis scores. In some embodiments, trainer emphasis decisions 1222 is representative of a set of human opinions, where one or more people (e.g., multiple human annotators) have provided an indication of which subject (e.g., person, animal, and/or object optionally identified by an algorithm as object identifiers 1208) and/or focal plane should be emphasized in one or more frames of training media 1206 by reviewing the video. The trainer emphasis decisions 1222 optionally indicate at what points a synthetic depth-of-field effect should be applied to emphasize the subject and/or focal plane in the one or more frames of training media 1206. In some embodiments, emphasis scoring 1214 compares neural network emphasis decisions 1226 to trainer emphasis decisions 1222, and neural network 1224 is trained to minimize a difference between neural network emphasis decisions 1226 and trainer emphasis decisions 1222; this process can be repeated iteratively with additional neural network emphasis decisions 1226 based on changes to the neural network 1224, additional trainer emphasis decisions 1222 based on additional reviewers reviewing the training media 1206, or new training media 1206 being reviewed. In some embodiments, a greater or lesser number of emphasis scoring modules are used to train neural network 1224. In some embodiments trainer emphasis decisions 1222 are representative of different people scoring the same media (e.g., where the person and/or people are different for each different frame of the media). When multiple people are scoring the same video there will sometimes be a disagreement on which subject should be emphasized at different times, when this occurs, the neural network training can take an average or most frequent trainer emphasis decision for use in training while less frequent trainer emphasis decisions are discarded or ignored. In some embodiments, emphasis scoring 1214 (e.g., a comparison of the neural network emphasis decisions with corresponding trainer emphasis decisions) are fed into neural network 1224 along with training data 1220 for training.

Neural network use portion 1204 provides exemplary embodiments concerning how neural network 1224 is used (e.g., during the capturing and/or editing of media). Neural network 1224 of neural network use portion 1204 is the trained and/or tuned version of neural network 1224 of neural network training portion 1202 (e.g., the neural network 1224 that was trained using the trainer emphasis decisions 1222 from human reviewers of training media 1206). In some embodiments, the neural network 1224 is periodically updated when the software of the device (e.g., such as computer system 600) running the neural network 1224 is updated (e.g., the training of the neural network occurs on a separate device from the device that is running the neural network). As shown in neural network use portion 1204, captured media 1230 is provided. In some embodiments, captured media 1230 includes frames of media that are currently being captured. In some embodiments, captured media 1230 includes frames of media that is currently being edited and/or frames of media after the media has been captured. In some embodiments, one or more object identifiers 1232 and/or object attributes 1234 are determined from captured media 1230 (e.g., using one or more techniques as discussed above in relation to training media 1206, object identifiers 1208, and object identifiers 1208). In some embodiments, captured media 1230, object identifiers 1232, and object attributes 1234 are fed into the neural network 1224 (e.g., the trained and/or tuned network). In some embodiments, neural network 1224 outputs one or more neural network emphasis decisions 1236 based on the captured media 1230, object identifiers 1232, and object attributes 1234. In some embodiments, neural network 1224 outputs one or more neural network emphasis decisions 1236 based on user emphasis decisions 1238, where user emphasis decisions 1238 can override a neural network emphasis decision that is based on the captured media 1230, object identifiers 1232, and object attributes 1234. In some embodiments, user emphasis decisions 1238 are used as input for neural network 1224 to determine additional neural network emphasis decisions 1236 (e.g., adding or removing neural network emphasis decisions based on user emphasis decisions). In some embodiments, neural network emphasis decisions 1236 are used by media processor 1240 to output processed media 1242. In some embodiments, media processor 1240 decided that neural network emphasis decisions 1236 should be overridden by whether user emphasis decisions 1238. In some embodiments, when media processor 1240 decides that neural network emphasis decisions 1236 should be overridden by user emphasis decisions 1238, the overridden neural network emphasis decisions 1236 is saved for future use (e.g., when a user-specified change is deleted as discussed above in relation to FIGS. 6AZ-6BJ) (e.g., along with and/or associated with a depth map of the media that was determined, saved, and/or created while capturing and/or after (e.g., immediately after) capturing the media). In some embodiments, output from media processors 1240 and user emphasis decisions 1238 is fed back to captured media 1230 so that the capture of media can be adjusted (e.g., as discussed above in relation to computer system 600 and computer system 690 of FIGS. 6A-6AA).

FIG. 13 is a flow diagram illustrating an exemplary method for altering visual media using a computer system in accordance with some embodiments. Method 1300 is performed at a computer system (e.g., 100, 300, 500, 600, a smartphone, and/or a smartwatch) that is in communication with a display generation component (e.g., a display controller and/or a touch-sensitive display system).

As described below, method 1300 provides an intuitive way for altering visual media. The method reduces the cognitive burden on a user for managing media capture, thereby creating a more efficient human-machine interface. For battery-operated computing devices, enabling a user to manage media capture faster and more efficiently conserves power and increases the time between battery charges. In some embodiments, the computer system is in communication with one or more input devices (e.g., a touch-sensitive surface) and/or one or more cameras (e.g., one or more cameras (e.g., dual cameras, triple camera, quad cameras, etc.) on the same side or different sides of the computer system (e.g., a front camera, a back camera)).

The computer system plays (1302), via the display generation component, a portion of a video (e.g., represented by 660) (e.g., previously captured video media) (e.g., video captured using one or more techniques as described above in relation to methods 700, 800, and 900) (e.g., one or more frames of the video are displayed via the display generation component while the portion of the video is being played) that includes a first subject emphasis change (e.g., 686*a*, 686*b*, 688*c*, 686*d*, 688*e*, 686*f*, 686*g*, 688*h*, 688*i*, 688*j*, 688*k*, and/or 688*m*) (e.g., a synthetic depth-of-field transition) that occurs at a first time, where the first subject emphasis change (e.g., 686*a*, 686*b*, 688*c*, 686*d*, 688*e*, 686*f*, 686*g*, 688*h*, 688*i*, 688*j*, 688*k*, and/or 688*m*) includes a change in appearance of visual information (e.g., as represented by 660) captured by one or more cameras to emphasize a respective subject relative to one or more elements (e.g., one or more subjects (e.g., people, objects, and/or animals)) in the video during a first period of time that follows the first time (e.g., via a synthesized depth of field-of-effect, as described above in relation to methods 700, 800, and 900) (e.g., a first subject is emphasized at a first time with a change to a second subject being emphasized at a second time). In some embodiments, the first period of time includes the first time. In some embodiments, the plurality of changes in subject emphasis in the video are represented by a plurality of representations of times (e.g., as described above in relation to the representation of the first time and/or the representation of the second time in method 900).

After playing the portion of the video that includes the first subject emphasis change that occurs at the first time, the computer system detects (1304) a request (e.g., 650*ax*, 650*az*, 650*bb*1, 650*bb*2, 650*bd*, 650*bf*, 650*bh*, and/or 650*bi*) to change subject emphasis at a second time in the video that is different from the first time (e.g., at a first period of time during the duration of the video). In some embodiments, as a part of detecting the request to change subject emphasis in the video at a first period of time, the computer system detects a user input, such as tap input (e.g., single tap and/or double tap), press-and-hold input, and/or dragging input, that directed to the representation of the video and/or on a video navigation element (e.g., using one or more techniques, as described above in relation to methods 700, 800, and 900)).

In response to (1306) detecting the request (e.g., 650*ax*, 650*az*, 650*bb*1, 650*bb*2, 650*bd*, 650*bf*, 650*bh*, and/or 650*bi*) to change subject emphasis at the second time in the video (e.g., and automatically, without intervening user input), the computer system changes (1308) the subject emphasis in the video during a second period of time that follows the second time (e.g., 686*a*, 686*b*, 688*c*, 686*d*, 688*e*, 686*f*, 686*g*, 688*h*, 688*i*, 688*j*, 688*k*, and/or 688*m*) (e.g., as indicated by 661*bc*2-661*bi*2) (e.g., applying a synthetic depth-of-field effect to a plurality of frames of the video that occur during the second period of time, where the synthetic depth-of-field effect that is applied to the plurality of frames of the video that occur during the second period of time is different from the synthetic depth-of-field effect that was applied to the plurality of frames of the video that occur during the second period of time (e.g., using one or more techniques as discussed above in relation to method 700)) (and modifying (e.g., adding, updating, and/or deleting) a subject emphasis change that occurs during the second period of time and/or adding a new subject emphasis change during the second period of time). In some embodiments, the second period of time includes the second time. In some embodiments, the second period of time is different from the first period of time. In some embodiments, the second time is not included in the first time period. In some embodiments, the second time is before the first time. In some embodiments, the second period of time is not included in the first period of time and the first period of time is not included in the second period time. In some embodiments, no portion of the second period of time overlaps with the first period of time.

In response to (1306) detecting the request (e.g., 650*ax*, 650*az*, 650*bb*1, 650*bb*2, 650*bd*, 650*bf*, 650*bh*, and/or 650*bi*) to change subject emphasis at the second time in the video (e.g., and automatically, without intervening user input), the computer system changes (1310) the first subject emphasis change that occurs at the first time including changing the emphasis of the respective subject relative to the one or more elements in the video during the first period of time that follows the first time (e.g., as discussed above in relation to FIGS. 6AV-6BJ) (e.g., applying a synthetic depth-of-field effect to a plurality of frames of the video that occurs at the first time (e.g., and during the first period of time), where the synthetic depth-of-field effect that is applied to the plurality of frames of the video that occur at the first time is different from the synthetic depth-of-field effect that was applied to the plurality of frames of the video that occur at the first time (e.g., using one or more techniques as discussed above in relation to method 700)) (and modifying (e.g., adding, updating, and/or deleting) a subject emphasis change that occurs during the first period of time and/or adding a new subject emphasis change during the first period of time). In some embodiments, after changing the subject emphasis in the video during a second period of time that follows the second time and changing the first subject emphasis change that occurs at the first time including changing the emphasis of the respective subject relative to the one or more elements in the video during the first period of time that follows the first time (and/or in response to detecting the request to change subject emphasis that occurs at the second time in the video), the subject emphasis in the video at the first time and/or during the first time period is different from the subject emphasis in the video during the second time period. In some embodiments, before the computer system detects the request to change subject emphasis that occurs at the second time in the video (and/or before changing the subject emphasis in the video at the first period time and changing the subject emphasis in the video at the first period time), the subject emphasis in the video at the first time and/or during the first period of time is different from the subject emphasis in the video during the second period of time. Changing the subject emphasis in the video during the second period of time that follows the second time and changing the first subject emphasis change that occurs at the first time in response to detecting the request to change subject emphasis at the second time in the video allows the computer system to automatically change the subject emphasis at a time to which the request is not directed while also changing the subject emphasis at a time to which the request is directed to and allows the computer system to intelligently change the subject emphases during one or more times in the video that are different from the time in the video to which the request to change subject emphasis corresponded, which performs an operation when a set of conditions has been met without requiring further user input and reduces the number of inputs needed to perform an operation.

In some embodiments, before detecting the request (e.g., 650*ax*, 650*az*, 650*bb*1, 650*bb*2, 650*bd*, 650*bf*, 650*bh*, and/or 650*bi*) to change subject emphasis at the second time, the video includes a second subject emphasis change (e.g., 686*a*, 686*b*, 688*c*, 686*d*, 688*e*, 686*f*, 686*g*, 688*h*, 688*i*, 688*j*, 688*k*, and/or 688*m*) that occurs at the second time. In some embodiments, as a part of changing the subject emphasis in the video during the second period of time that follows the second time, the computer system removes the second subject emphasis change that occurs at the second time (e.g., as discussed above in relation to FIGS. 6BB-6BC, 6BF-6BG and FIG. 6BI-6BJ). In some embodiments, changes to the synthetic depth-of-field effect (and/or synthetic depth-of-field effect change indicators) are removed when the computer system applies a synthetic depth-of-field effect to emphasize a focal plane and/or non-temporarily emphasize a subject in response to detecting user input (e.g., a single tap input, a double tap input, and/or a press-and-hold input). In some embodiments, when the computer system applies a synthetic depth-of-field effect to emphasize a focal plane and/or non-temporarily emphasize a subject in response to detecting user input (e.g., a single tap input, a double tap input, and/or a press-and-hold input), one or more automatic changes to the synthetic depth-of-field effect are removed and/or ignored. In some embodiments, when the computer system applies a synthetic depth-of-field effect to emphasize a subject that a respective automatic change (e.g., that occurs after the first time and/or before another user-specified change to the synthetic depth-of-field effect) to the synthetic depth-of-field effect has also determined to emphasize, the respective automatic change is removed and/or ignored. Removing the second subject emphasis change that occurs at the second time and changing the first subject emphasis change that occurs at the first time in response to detecting the request to change subject emphasis at the second time in the video allows the computer system to intelligently change the subject emphases during one or more times in the video that are different from the time at which the subject emphasis was removed, which performs an operation when a set of conditions has been met without requiring further user input and reduces the number of inputs needed to perform an operation.

In some embodiments, before detecting the request (e.g., 650*ax*, 650*az*, 650*bb*1, 650*bb*2, 650*bd*, 650*bf*, 650*bh*, and/or 650*bi*) to change subject emphasis at the second time, the computer displays a first graphical user interface object (e.g., 688*c* and/or 688*h*)(e.g., a graphical user interface object indicating that an automatic change in subject emphasis occurred at the second time and/or a graphical user interface object indicating that an manual change occurred at the second time) (e.g., using one or more techniques as described above in relation to method 900) (e.g., the representation of the second time, the representation of the first time, a graphical user interface object indicating that an automatic change in subject emphasis occurred at the second time and/or a graphical user interface object indicating that an manual change occurred at the second time)) indicating that the second subject emphasis change that occurs at the second time (on a video navigation user interface element at a location on the video navigation user interface element that corresponds to the second time (e.g., using one or more techniques, as described above in relation to method 900)) (e.g., via the display generation component). As a part of detecting the request to change subject emphasis that occurs at the second time, the computer system: while displaying the first graphical user interface object (e.g., 688*c* and/or 688*h*), detects an input (e.g., 650*be*) (e.g., a tap gesture/input and/or, in some embodiments, a press-and-hold gesture/input, a mouse click, and/or a swipe gesture/input) directed to the first graphical user interface object; in response to detecting the input directed to the first graphical user interface object, displays an option (e.g., 688*c*2 and/or 688*h*2) (e.g., a selectable option) to remove the second subject emphasis change that occurs at the second time (e.g., using one or more similar techniques as described above in relation to the option to remove the user-specified change in subject emphasis that occurred at the second time in the video and method 900); and while displaying the option to remove the second subject emphasis change that occurs at the second time, detects an input (e.g., 650*bf*) (e.g., a tap gesture/input and/or, in some embodiments, a press-and-hold gesture/input, a mouse click, and/or a swipe gesture/input) directed to the option to remove the second subject emphasis change that occurs at the second time; and in response to detecting the input directed to the option to remove the second subject emphasis change that occurs at the second time, changes the subject emphasis in the video during the second period of time that follows the second time by removing the second subject emphasis change that occurs at the second time (e.g., as discussed above in relation to FIG. 6BG). In some embodiments, in response to detecting the input directed to the option to remove the second subject emphasis change that occurs at the second time, the computer detects the request to change subject emphasis at the second time in the video.

In some embodiments, before detecting the input directed to the first graphical user interface object, the first graphical user interface object is displayed concurrently with (e.g., adjacent to, above, below, to the right of, to the left of, near, and/or on) a video navigation user interface element (e.g., 664*a* and/or 664*b*) with a first amount of visual emphasis (e.g., as discussed above in relation to FIG. 6BE). In some embodiments, the option (e.g., 688*c*2 and/or 688*h*2) to remove the second subject emphasis change that occurs at the second time in response to detecting the input (e.g., 650*be*) directed to the first graphical user interface object is concurrently displayed with the video navigation user interface element with a second amount of visual emphasis that is less than the first amount of visual emphasis (e.g., as discussed above in relation to FIG. 6BF). In some embodiments, the video navigation user interface element is visually de-emphasized (e.g., more blurred, smaller, grayed-out, more translucent, and/or less zoomed in) when computer to the video navigation user interface element with the first amount of visual emphasis. In some embodiments, before detecting the input directed to the first graphical user interface object, the first graphical user interface object is displayed concurrently with a first visual appearance. In some embodiments, displaying the option to remove the second subject emphasis change that occurs at the second time in response to detecting the input directed to the first graphical user interface object includes displaying the video navigation user interface element with a second visual appearance, where video navigation user interface element displayed with the second visual appearance is less visually emphasized (e.g., more blurred, smaller, grayed-out, more translucent, and/or less zoomed in) than the video navigation user interface element displayed with the first visual appearance. Displaying the video navigation user interface element concurrently with the second amount of visual emphasis that is less than the first amount of visual emphasis as a part of displaying the option to remove the second subject emphasis change that occurs at the second time in response to detecting the input directed to the first graphical user interface object provides visual feedback to the user regarding the subject emphasis and/or the graphical user interface object that will be removed (e.g., to avoid unintended removal), which provides improved visual feedback.

In some embodiments, before detecting the request to change subject emphasis at the second time, the video does not include a (or, in some embodiments, any) subject emphasis change that occurs at the second time (e.g., as discussed above in relation to FIGS. 6BH-6BI). In some embodiments, as a part of changing the subject emphasis in the video during the second period of time that follows the second time, the computer system adds a third subject emphasis change (e.g., 686*d*) that occurs at the second time (e.g., as discussed above in relation to FIGS. 6BH-6BI). Adding a third subject emphasis change that occurs at the second time in response to detecting the request to change subject emphasis at the second time in the video allows the computer system to intelligently change the subject emphases during one or more times in the video that are different from the time at which the subject emphasis was added, which performs an operation when a set of conditions has been met without requiring further user input and reduces the number of inputs needed to perform an operation.

In some embodiments, detecting the request to change subject emphasis that occurs at the second time includes detecting a first type of input (e.g., 650*bb*2 and/or 650*bi*) (e.g., a press-and-hold gesture) (in some embodiments, a non-press-and-hold gesture (e.g., a tap gesture, swipe gesture) directed to the subject) that is directed to a first representation (e.g., 660) of the video. In some embodiments, the first type of input is a first input (e.g., a press-and-hold gesture) (in some embodiments, a non-press-and-hold gesture (e.g., a tap gesture, swipe gesture) directed to the subject as described above in relation to methods 700, 800, and 900) to select a first fixed focal plane (e.g., as indicated by 676) in the video. In some embodiments, changing the subject emphasis in the video during the second period of time that follows the second time includes applying a synthetic depth-of-field effect to the first fixed focal plane (e.g., a focal plane that does not change as a respective subject (e.g., a second subject) moves within the plurality of frames) in a first plurality of frames of the video that correspond to the second period of time (e.g., altering the visual information captured by the one or more cameras to emphasize one or more objects/subjects near, on, and/or adjacent to the fixed focal plane) (e.g., using one or more techniques as described above in relation to methods 700, 800, and 900) (e.g., as discussed in relation to FIGS. 6BC-6BD and FIG. 6BI-6BJ). In some embodiments, the fixed focal plane includes a location at which the input was directed to on the representation of the video. Applying the synthetic depth-of-field effect to a fixed focal plane in response to detecting the first type of input as a part of changing the subject emphasis in the video during the second period of time that follows the second time in response to detecting the first type of input allows the user to control how a synthetic depth-of-field effect is applied to a video and provides the user with more control of the system, which leads to more efficient control of the user interface.

In some embodiments, detecting the request to change subject emphasis that occurs at the second time includes detecting a second type of input (e.g., 650*bd* and/or 650*bh*) (e.g., a tap gesture directed to (e.g., on) a subject) (in some embodiments, a non-tap gesture (e.g., a rotational gesture, swipe gesture) directed to the subject) e.g., a multi-tap gesture (e.g., a double-tap gesture) directed to (e.g., on) a subject) (in some embodiments, a non-tap gesture (e.g., a rotational gesture, swipe gesture) directed to the subject as described above in relation to methods 700, 800, and 900) that is directed to a second representation (e.g., 660) of the video. In some embodiments, the second type of input is an input to select a first subject (e.g., 632, 634, and/or 638) to focus on in the video. In some embodiments, changing the subject emphasis in the video during the second period of time that follows the second time includes applying a synthetic depth-of-field effect to emphasize the first subject relative to a second subject (e.g., the respective subject) in a second plurality of frames of the video that correspond to the second period of time (e.g., as discussed above in relation to FIGS. 6BC-6BD and FIG. 6BH-6BI) (e.g., altering the visual information captured by the one or more cameras to emphasize the first subject relative to the second subject) (e.g., using one or more techniques as described above in relation to methods 700, 800, and 900). Applying the synthetic depth-of-field effect to emphasize the first subject relative to a second subject in a second plurality of frames of the video that correspond to the second period of time in response to detecting the second type of input allows the user to control how a synthetic depth-of-field effect is applied to a video and provides the user with more control of the system, which leads to more efficient control of the user interface.

In some embodiments, detecting the request to change subject emphasis that occurs at the second time includes detecting a third type of input (e.g., 650*bb*2 and/or 650*bi*) (e.g., a press-and-hold gesture) (in some embodiments, a non-press-and-hold gesture (e.g., a tap gesture, swipe gesture) directed to the subject) that is directed to a third representation (e.g., 660) of the video. In some embodiments, the third type of input is a second input (e.g., a press-and-hold gesture) (in some embodiments, a non-press-and-hold gesture (e.g., a tap gesture, swipe gesture) directed to the subject as described above in relation to methods 700, 800, and 900) to select a second fixed focal plane in the video. In some embodiments, in response to detecting the request to change subject emphasis at the second time in the video, the computer system displays an indication (e.g., 694*bc* and/or 694*bj*) of a distance to the second fixed focal plane (e.g., numbers, words, and/or symbols) (e.g., 0.01-50 meters) (e.g., a distance between the computer system and/or one or more cameras of the computer system to a plane that is in the field-of-view of the one or more cameras). In some embodiments, while and/or after displaying the indication of the distance to the fixed focal plane, the computer system detects a fourth input to select a third fixed focal plane that is different from the second fixed focal plane and, in response to detecting the fourth input, the computer system displays an indication of the distance to the third fixed focal plane. In some embodiments, the indication of the distance to the third fixed focal plane is different from the indication of the distance to the second fixed focal plane. In some embodiments, the indication of the distance to the second fixed focal plane is displayed on a frame of the video (e.g., a frame of the video) at the second time and/or in the second time period and/or while the video is being played. In some embodiments, after a predetermined period of time, the indication of the distance to the second fixed focal plane goes away. Displaying an indication of a distance to the second fixed focal plane in response to detecting the request to change subject emphasis at the second time in the video provides visual feedback to the user regarding the fixed focal plane that was selected, which provides improved visual feedback.

In some embodiments, the first subject emphasis change that occurs at the first time is a first type (e.g., applying a synthetic depth of field effect to a fixed focal place, applying a synthetic depth of field effect to emphasize a different subject relative to one or more subjects in the video) (e.g., as described above in relation to methods 700, 800, and 900) of subject emphasis change. In some embodiments, changing the first subject emphasis change that occurs at the first time includes adding a fourth subject emphasis change (e.g., 688*i*, 688*j*, 688*k*, and/or 688*m*) at the first time (e.g., and removing the first subject emphasis change that occurs at the first time). In some embodiments, the fourth subject emphasis change is a second type (e.g., applying a synthetic depth of field effect to a fixed focal place, applying a synthetic depth of field effect to emphasize a different subject relative to one or more subjects in the video) (e.g., as described above in relation to methods 700, 800, and 900) of subject emphasis change that is different from the first type of subject emphasis change. In some embodiments, automatic changes to synthetic depth-of-field are added when an emphasized subject (e.g., a subject emphasized in response to detecting the request to change subject emphasis at the second time in the video) ceases to be detected in the field-of-view of a camera (and the computer system, thus, needs to automatically select a new subject. Adding a fourth subject emphasis change at the first time as a part of changing the first subject emphasis change that occurs at the first time video allows the computer system to intelligently change the subject emphases during one or more times in the video that are different from the time at which the subject emphases change was selected, which performs an operation when a set of conditions has been met without requiring further user input and reduces the number of inputs needed to perform an operation.

In some embodiments, the first time corresponds to a first subset of the video at which an emphasized subject (e.g., a subject that was selected, using one or more techniques as described above in relation to methods 700, 800, and 900), that was visible in a second portion of the video that preceded the first time, ceases to be visible (e.g., as discussed above in relation to FIGS. 6BH-BI).

In some embodiments, changing the first subject emphasis change that occurs at the first time includes removing the first subject emphasis change that occurs at the first time (e.g., as discussed above in relation to FIG. 6BF-6BG). Removing the first subject emphasis change that occurs at the first time as a part of changing the first subject emphasis change that occurs at the first time video allows the computer system to intelligently change the subject emphases during one or more times in the video that are different from the time at which the subject emphases change was selected, which performs an operation when a set of conditions has been met without requiring further user input and reduces the number of inputs needed to perform an operation.

In some embodiments, the first subject emphasis change that occurs at the first time is an automatic change (e.g., 686*d*, 686*f*, and/or 686*g*) (e.g., computer-generated change and/or a change that was not generated in response to an explicit user input to generate the subject emphasis change at the first time) in subject emphasis (and not a user-specified change in subject emphases as described above in relation to methods 700, 800, and 900) (e.g., a change that occurs without intervening user input/gesture(s) (e.g., an automatic change in subject emphasis as described above in relation to methods 700, 800, and 900). Removing the first subject emphasis change that is an automatic change in subject emphasis and occurs at the first time as a part of changing the first subject emphasis change that occurs at the first time video allows the computer system to intelligently change the subject emphases during one or more times in the video that are different from the time at which the subject emphases change was selected, which performs an operation when a set of conditions has been met without requiring further user input and reduces the number of inputs needed to perform an operation.

In some embodiments, before detecting the request to change subject emphasis at the second time in the video that is different from the first time, the video includes a fifth subject emphasis change that occurs at a third time. In some embodiments, in response to detecting the request to change subject emphasis at the second time in the video and in accordance with a determination that a set of emphasis change criteria are met, the set of emphasis change criteria including a criterion that is met when the fifth subject emphasis change that occurs at the third time is a user-specified change in subject emphasis, the computer system forgoes changing the fifth subject emphasis change that occurs at the third time (e.g., as discussed above in relation to FIG. 6BG) (e.g., while forgoing including changing the emphasis of the respective subject relative to the one or more elements in the video during a third period of time that follows the third time). In some embodiments, in response to detecting the request to change subject emphasis at the second time in the video and in accordance with a determination that the set of emphasis change criteria are not met (e.g., fifth subject emphasis change that occurs at the third time is an automatic (e.g., computer-generated) change in subject emphasis), the computer system changes the fifth subject emphasis change that occurs at the third time including changing the emphasis of the respective subject relative to the one or more elements in the video during a third period of time that follows the third time. Forgoing changing the fifth subject emphasis change that occurs at the third time in accordance with a determination that the fifth subject emphasis change that occurs at the third time is a user-specified change in subject emphasis allows the computer system to intelligently choose not to remove user-specified changes in subject emphasis, which performs an operation when a set of conditions has been met without requiring further user input and reduces the number of inputs needed to perform an operation.

In some embodiments, the second time occurs after (e.g., occurs at a later time in the video than) the first time in the video (e.g., in the duration of the video). In some embodiments, the second period of time occurs after the first period of time (e.g., in the duration of the video). In some embodiments, the second time occurs before (e.g., occurs at an earlier time in the video than) the first time in the video (e.g., in the duration of the video). In some embodiments, the second period of time occurs before the first period of time (e.g., in the duration of the video).

In some embodiments, the video includes a fifth subject emphasis change that occurs at a fourth time (and/or one or more other subject emphases changes). In some embodiments, the computer system displays a first selectable user interface object (e.g., 662*d*). In some embodiments, while displaying the first selectable user interface object and while the video includes the fifth subject emphasis change that occurs at the fourth time, the computer system detects a first input (e.g., 650*az*) directed to the first selectable user interface object. In some embodiments, in response to detecting the first input directed to the first selectable user interface object and in accordance with a determination that the fifth subject emphasis change that occurs at the fourth time is a user-specified change in subject emphasis (and/or the one or more other subject emphases changes that are one or more user-specified changes in subject emphases), the computer system removes (e.g., disabling and/or deleting) the fifth subject emphasis change (e.g., 688*c*, 688*e*, and/or 688*h*) that occurs at the fourth time from the video (e.g., removing a synthetic depth of field effect that corresponds to the fifth subject emphasis change) (and/or removing the one or more other subject emphases changes that are one or more user-specified changes in subject emphasis) (e.g., ceasing to display a graphic indicator that corresponds to the fifth subject emphasis change). In some embodiments, the fifth subject emphasis change is a change that was requested during the capture of the media and/or during the editing (e.g., post-capture editing) of the media. In some embodiments, in response to detecting the first input directed to the first selectable user interface object, the computer system removes one or more user-specified changes that were requested during the capture of the media and remove one or more user-specified changes that were requested during the editing of the media. In some embodiments, in response to detecting the first input directed to the first selectable user interface object, the computer system displays the first selectable user interface object in an inactive state. In some embodiments, before detecting the first input directed to the first selectable user interface object, the first selectable user interface object is displayed in an active state. In some embodiments, in response to detecting the first input directed to the first selectable user interface object, all user-specified changes that are, applied to the media are, optionally, removed from being applied to the media. Removing the fifth subject emphasis change that occurs at the fourth time from the video in response to detecting the first input directed to the first selectable user interface object and in accordance with a determination that the fifth subject emphasis change is a user-specified change in subject emphasis and in response to detecting the first input directed to the first selectable user interface object allows the user to control whether user-specified changes in subject emphasis and provides the user with more control of the system, which leads to more efficient control of the user interface.

In some embodiments, in response to detecting the input directed to the first selectable user interface object and in accordance with a determination that the fifth subject emphasis change that occurs at the fourth time is an automatic change in subject emphasis, the computer system forgoes removing the fifth subject emphasis change that occurs at the fourth time from the video (e.g., 686*f* and/or 686*g* in FIG. 6AZ) (e.g., as discussed above in relation to FIGS. 6AZ-6BA) (and/or forgoing removing the one or more other subject emphases changes that are one or more user-specified changes in subject emphases) (e.g., continuing to display a graphic indicator that corresponds to the fifth subject emphasis change). Forgoing removing the fifth subject emphasis change that occurs at the fourth time from the video in response to detecting the first input directed to the first selectable user interface object and in accordance with a determination that the fifth subject emphasis change is an automatic change in subject emphasis and in response to detecting the first input directed to the first selectable user interface object allows the user to control whether user-specified changes in subject emphasis and provides the user with more control of the system, which leads to more efficient control of the user interface.

In some embodiments, while displaying the first selectable user interface object (e.g., 662*d*) and while the fifth subject emphasis change that occurs at the fourth time is removed from the video, the computer system detects a second input (e.g., 650*bb*1) directed to the first selectable user interface object. In response to detecting the second input (e.g., 650*bb*1) directed to the first selectable user interface object, the computer system adds (e.g., re-adding and/or re-enabling) the fifth subject emphasis change that occurs at the fourth time to the video (e.g., as discussed above in relation to 650*bb*1) (e.g., re-applying a synthetic depth of field effect that corresponds to the fifth subject emphasis change) (and/or adding the one or more other subject emphases changes that are one or more user-specified changes in subject emphases). In some embodiments, in response to detecting the second input directed to the first selectable user interface object, the computer system displays the first selectable user interface object in an active state. In some embodiments, before detecting the second input directed to the first selectable user interface object, the first selectable user interface object is displayed in an inactive state. In some embodiments, in accordance with a determination that the video does not include one or more user-specified (or any user-specified) subject emphasis changes, the first selectable user interface object is displayed in the inactive state (e.g., disabled state) and, in accordance with a determination that the video includes one or more user-specified (or any user-specified) subject emphasis changes, the first selectable user interface object is displayed in the active state (e.g., enabled state). Adding the fifth subject emphasis change that occurs at the fourth time from the video in response to detecting the first input directed to the first selectable user interface object that was detected while displaying the first selectable user interface object and while the fifth subject emphasis change that occurs at the fourth time is removed from the video allows the user to control whether user-specified changes in subject emphasis and provides the user with more control of the system, which leads to more efficient control of the user interface.

In some embodiments, while the fifth subject emphasis change (e.g., 688*c*) that occurs at the fourth time is removed from the video and while displaying the first selectable user interface object (e.g., 662*d* in FIG. 6BB) in an inactive state, the computer system detects a request (e.g., 650*bb*2) to add one or more user-specified changes in subject emphasis. IN some embodiments, in response to detecting the request to add one or more user-specified changes in subject emphasis, the computer system displays the first selectable user interface object (e.g., 622*d* in FIG. 6BC) in an active state that is different from an inactive state without adding (e.g., re-adding and/or re-enabling) the fifth subject emphasis change that occurs at the fourth time to the video. In some embodiments, in response to detecting the request to add one or more user-specified changes in subject emphases, the computer system adds the one or more user-specified changes in subject emphases to the video and the deletes the fifth subject emphasis change that occurs at the fourth time to the video. Displaying the first selectable user interface object in an active state that is different from an inactive state without adding the fifth subject emphasis change that occurs at the fourth time to the video in response to detecting the request to add one or more user-specified changes in subject emphases allows the computer system to manage new changes in subject emphasis and delete old changes in subject emphasis and provides the user with more control of the system, which leads to more efficient control of the user interface.

In some embodiments, while the video includes the first subject emphasis change that occurs at the first time and in accordance with a determination that the first subject emphasis (e.g., 686*a*, 686*b*, 688*c*, 686*d*, 688*e*, 686*f*, 686*g*, 688*h*, 688*i*, 688*j*, 688*k*, and/or 688*m*) change is a user-specified change in subject emphasis, the computer displays a second graphical user interface object indicating that the first subject emphasis change that occurs at the first time with a first visual appearance (e.g., 688*c*, 688*e*, 688*h*, 688*i*, 688*j*, 688*k*, and/or 688*m*) (e.g., as describe above in relation to method 900). In some embodiments, while the video includes the first subject emphasis change that occurs at the first time and in accordance with a determination that the first subject emphasis (e.g., 686*a*, 686*b*, 688*c*, 686*d*, 688*e*, 686*f*, 686*g*, 688*h*, 688*i*, 688*j*, 688*k*, and/or 688*m*) change is an automatic change in subject emphasis, the computer system displays the second graphical user interface object with a second visual appearance (e.g., appearance of 686*a*, 686*b*, 686*d*, 686*f*, and/or 686*g*,) (e.g., as describe above in relation to method 900) that is different from the first visual appearance. In some embodiments, the computer system concurrently displays a graphical object indicating an automatic change in subject emphasis with a graphical object indicating a user-specified change in subject emphasis. In some embodiments, the graphical object indicating an automatic change in subject the second visual appearance and the graphical object indicating a user-specified change in subject emphasis has the first visual appearance. Displaying the second graphical user interface object indicating that the first subject emphasis change that occurs at the first time differently based on whether the first subject emphasis change is a user-specified change or an automatic change provides visual feedback to the user regarding what source caused the subject emphasis change, which provides improved visual feedback.

In some embodiments, the subject emphasis at the second time in the video is a third type of subject emphasis. In some embodiments, after playing the portion of the video that includes the first subject emphasis change at the first time, the computer system detects a second request (e.g., 650*bd*) to change subject emphasis at the second time. In some embodiments, in response to detecting the second request (e.g., 650*bd*) to change subject emphasis at the second time and in accordance with a determination that the second request to change subject emphasis at the second time is a request to change the subject emphasis at the second time in video to the third type of subject emphasis (e.g., a request to apply the same synthetic depth of field effect that is currently being applied to the second time in the video) (e.g., a request to emphasize a subject relative to other subjects, where the subject is already emphasized relative to the other subjects and/or a request to emphasize a focal plane (and/or one or more objects on a focal place) that is currently emphasized at the second time), the computer system forgoes changing the subject emphasis in the video during the second period of time that follows the second time (e.g., as discussed above in relation to FIG. 6BD). In some embodiments, in response to detecting the second request to change subject emphasis at the second time and in accordance with a determination that the second request to change subject emphasis at the second time is a request to change the subject emphasis at the second time in video to a second type of subject emphasis that is different from the first type of subject emphasis, the computer system changes the subject emphasis in the video during the second period of time that follows the second time. Forgoing changing the subject emphasis in the video during the second period of time that follows the second time in response to detecting the second request to change subject emphasis at the second time and in accordance with a determination that the second request to change subject emphasis at the second time is a request to change the subject emphasis at the second time in video to the third type of subject emphasis allows the computer system to intelligently forgo applying changes in subject emphasis that are determined to be not needed, which performs an operation when a set of conditions has been met.

Note that details of the processes described above with respect to method 1300 (e.g., FIG. 13) are also applicable in an analogous manner to the methods described above and/or below. For example, methods 700, 800, 900, and/or 1100 optionally includes one or more of the characteristics of the various methods described above with reference to method 1300. For example, the method described above in method 1300 can be used to display media in a media editing user interface after the media is captured using one or more techniques described in relation to methods 700 and/or method 1100. For brevity, these details are not repeated above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve how visual media is altered. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to alter visual media. Accordingly, use of such personal information data enables users to have calculated control of altering visual media. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of altering visual media, the present technology can be configured to allow users to select to "opt in" or "opt out" of participation in the collection of personal information data during registration for services or anytime thereafter. In another example, users can select not to provide data for altering visual media. In yet another example, users can select to limit the length of time data is maintained or entirely prohibit the altering of visual media. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, visual media can be altered by inferring preferences based on non-personal information data or a bare minimum amount of personal information, such as the content being requested by the device associated with a user, other non-personal information available to alter visual media, or publicly available information.

What is claimed is:

1. A computer system configured to communicate with one or more cameras, a display generation component, and one or more input devices, the computer system comprising:
- one or more processors; and
- memory storing one or more programs configured to be executed by the one or more processors, the one or more programs including instructions for:
  - displaying, via the display generation component, a user interface that includes:
    - a representation of a video that includes a plurality of frames, the representation including a first subject and a second subject; and
    - a first user interface object indicating that the first subject is being emphasized by a synthetic depth-of-field effect that alters visual information captured by the one or more cameras to emphasize the first subject in the plurality of frames relative to the second subject;
  - while displaying the user interface that includes the representation of the video and the first user interface object, detecting, via the one or more input devices, a gesture that corresponds to selection of the second subject in the representation of the video; and
  - in response to detecting the gesture that corresponds to selection of the second subject in the representation of the video:
    - changing the synthetic depth-of-field effect to alter the visual information captured by the one or more cameras to emphasize the second subject in the plurality of frames relative to the first subject; and
    - displaying a second user interface object indicating that the second subject is being emphasized by the changed synthetic depth-of-field effect that alters the visual information captured by the one or more cameras to emphasize the second subject in the plurality of frames relative to the first subject.

2. The computer system of claim 1, wherein the first user interface object and the second user interface object have a same visual appearance.

3. The computer system of claim 1, the one or more programs further including instructions for:
- before detecting the gesture that corresponds to selection of the second subject, displaying, via the display generation component, a third user interface object indicating that the second subject is not being emphasized.

4. The computer system of claim 3, wherein the first user interface object has a different visual appearance from the third user interface object.

5. The computer system of claim 1, wherein the representation of the video includes a third subject, the one or more programs further including instructions for:
- before detecting the gesture that corresponds to selection of the second subject, displaying, via the display generation component, a fourth user interface object indicating that the second subject is not being emphasized and a fifth user interface object indicating that the third subject is not being emphasized.

6. The computer system of claim 5, wherein the fourth user interface object and the fifth user interface object have different visual appearances.

7. The computer system of claim 1, the one or more programs further including instructions for:

in response to detecting the gesture that corresponds to selection of the second subject, ceasing to display the first user interface object.

8. The computer system of claim 1, the one or more programs further including instructions for:

in response to detecting the gesture that corresponds to selection of the second subject, displaying a sixth user interface object indicating that the first subject is not being emphasized.

9. The computer system of claim 1, wherein the gesture that corresponds to selection of the second subject is detected while the one or more cameras are capturing the visual information.

10. The computer system of claim 1, wherein the gesture that corresponds to selection of the second subject is detected during playback of the video after capture of the video has ended.

11. The computer system of claim 1, wherein changing the synthetic depth-of-field effect to alter the visual information captured by the one or more cameras to emphasize the second subject in the plurality of frames relative to the first subject includes:

in accordance with a determination that the gesture that corresponds to selection of the second subject is a first type of gesture, altering the visual information captured by the one or more cameras to emphasize the second subject until first criteria are met; and in accordance with determination that the gesture that corresponds to selection of the second subject is a second type of gesture that is different from the first type of gesture, altering the visual information captured by the one or more cameras to emphasize the second subject until second criteria are met, wherein the second criteria are different from the first criteria.

12. The computer system of claim 11, the one or more programs further including instructions for:

while the visual information captured by the one or more cameras is being altered to emphasize the second subject until first criteria are met, detecting a gesture of the first type of gesture that is directed to the second subject; and in response to detecting the gesture of the first type of gesture that is directed to the second subject, altering the visual information captured by the one or more cameras to emphasize the second subject until second criteria are met.

13. The computer system of claim 1, wherein changing the synthetic depth-of-field effect to alter the visual information captured by the one or more cameras to emphasize the second subject in the plurality of frames relative to the first subject includes:

in accordance with determination that the gesture that corresponds to selection of the second subject is a third type of gesture, altering the visual information captured by the one or more cameras to emphasize the second subject by applying the synthetic depth-of-field effect to a fixed focal plane in the plurality of frames.

14. The computer system of claim 13, the one or more programs further including instructions for:

in accordance with determination that the gesture that corresponds to selection of the second subject is the third type of gesture, displaying an indication of a distance to the fixed focal plane.

15. The computer system of claim 1, the one or more programs further including instructions for:

while displaying the second user interface object and not displaying the first user interface object:

in accordance with a determination that the first subject in the plurality of frames satisfies a set of automatic selection criteria, displaying the first user interface object and ceasing to display the second user interface object.

16. The computer system of claim 15, wherein:

in accordance with a determination that the gesture corresponds to selection of the second subject is a fourth type of gesture, the set of automatic selection criteria is a first set of automatic selection criteria; and in accordance with a determination that the gesture corresponds to selection of the second subject is a fifth type of gesture that is different from the fourth type of gesture, the set of automatic selection criteria is a second set of automatic selection criteria that is different from the first set of automatic selection criteria.

17. The computer system of claim 15, wherein:

before detecting the gesture that corresponds to selection of the second subject, the set of automatic selection criteria includes a criterion that is satisfied when a first respective subject in the representation of the video satisfies a first selection confidence threshold; and in response to detecting the gesture that corresponds to selection of the second subject, the set of automatic selection criteria includes a criterion that is satisfied when the first respective subject in the representation of the video satisfies a second selection confidence threshold that is higher than the first selection confidence threshold.

18. The computer system of claim 1, wherein the synthetic depth-of-field effect that alters the visual information captured by the one or more cameras to emphasize the second subject in the plurality of frames relative to the first subject changes over time as the second subject moves within a field-of-view of the one or more cameras.

19. The computer system of claim 1, wherein the user interface includes a video navigation user interface element, the computer system further comprising:

while displaying the video navigation user interface element and in response to detecting the gesture that corresponds to selection of the second subject, displaying, in the video navigation user interface element, a user interface object indicating that a user-specified change occurred at a time in the video navigation user interface element, wherein the user interface object indicating that the user-specified change occurred includes:

in accordance with a determination that the gesture corresponds to selection of the second subject is a sixth type of gesture, a fourth visual appearance; and in accordance with a determination that the gesture corresponds to selection of the second subject is a seventh type of gesture that is different from the sixth type of gesture, a fifth visual appearance that is different from the fourth visual appearance.

20. The computer system of claim 1, wherein displaying the second user interface object includes:

in accordance with a determination that the gesture corresponds to selection of the second subject is an eighth type of gesture, displaying the second user interface object with a sixth visual appearance; and in accordance with a determination that the gesture corresponds to selection of the second subject is a ninth type of gesture that is different from the eighth type of gesture, displaying the second user interface object with a seventh visual appearance that is different from the sixth visual appearance.

21. The computer system of claim 1, wherein the user interface is a media capturing user interface, the one or more programs further including instructions for:

after detecting the gesture that corresponds to selection of the second subject and while displaying the user interface, detecting, via the one or more input devices, one or more gestures;

in response to detecting the one or more gestures, displaying a media editing user interface that includes:

a second representation of the video that includes a third plurality of frames, the second representation including the first subject and the second subject; and a sixth user interface object indicating that the first subject is being emphasized by a synthetic depth-of-field effect that alters the visual information captured by the one or more cameras to emphasize the first subject in the third plurality of frames relative to the second subject; and while displaying the media editing user interface, detecting, via the one or more input devices, a second gesture that corresponds to selection of the second subject in the second representation of the video; and in response to detecting the second gesture that corresponds to selection of the second subject in the second representation of the video:

changing the synthetic depth-of-field effect to alter the visual information captured by the one or more cameras to emphasize the second subject in the third plurality of frames relative to the first subject; and displaying a seventh user interface object indicating that the second subject is being emphasized by the changed synthetic depth-of-field effect that alters the visual information captured by the one or more cameras to emphasize the second subject in the third plurality of frames relative to the first subject.

22. The computer system of claim 1, the one or more programs further including instructions for:

after detecting the gesture that corresponds to selection of the second subject and changing the synthetic depth-of-field effect to alter the visual information captured by the one or more cameras to emphasize the second subject in the plurality of frames relative to the first subject, detecting a first gesture that is directed to the representation of the video; and in response to detecting the first gesture that is directed to the representation of the video, modifying the changed synthetic depth-of-field effect to alter the visual information captured by the one or more cameras.

23. The computer system of claim 1, wherein:

the user interface includes a selectable user interface object for controlling a video capture mode;

the selectable user interface object for controlling the video capture mode is displayed with a status indication that indicates that the video capture mode is in an active state; and the one or more programs further including instructions for:

while displaying the user interface that includes the representation of the video, the first user interface object, and the selectable user interface object for controlling the video capture mode is displayed with the status indication that indicates that the video capture mode is in an active state, applying the synthetic depth-of-field effect that alters the visual information captured by the one or more cameras to emphasize the first subject in the plurality of frames relative to the second subject;

while applying the synthetic depth-of-field effect that alters the visual information captured by the one or more cameras to emphasize the first subject in the plurality of frames relative to the second subject, detecting a gesture directed to the selectable user interface object for controlling the video capture mode; and in response to detecting the gesture directed to the selectable user interface object for controlling the video capture mode, ceasing to apply the synthetic depth-of-field effect that alters the visual information captured by the one or more cameras to emphasize the first subject in the plurality of frames relative to the second subject.

24. The computer system of claim 23, wherein, before detecting the gesture directed to the selectable user interface object for controlling the video capture mode, the representation is displayed with a first amount of blur, the one or more programs further including instructions for:

in response to detecting the gesture directed to the selectable user interface object for controlling the video capture mode, displaying, via the display generation component, the representation of the video with a second amount of blur that is lower than the first amount of blur.

25. The computer system of claim 1, the one or more programs further including instructions for:

in response to detecting the gesture that corresponds to selection of the second subject, configuring a focus setting of one or more cameras to focus on the second subject in the representation of the video, wherein the computer system is not configured to automatically change the focus setting of the one or more cameras for at least a predetermined period of time;

while the computer system is configured to focus on the second subject in the representation of the video, detecting a second gesture that is directed to the representation of the video; and in response to detecting the second gesture that is directed to the representation of the video, enabling the computer system to automatically change the focus setting of the one or more cameras for at least the predetermined period of time.

26. The computer system of claim 1, wherein:

the representation of the video includes a representation of a subset of content from a first portion of a field-of-view of one or more cameras, wherein:

the field-of-view of the one or more cameras extends beyond the first portion of the field-of-view to a second portion of the field-of-view of the one or more cameras that is not included in the representation; and a determination as to which subject to emphasize is based on information from the second portion of the field-of-view of the one or more cameras during the video.

27. The computer system of claim 26, wherein the determination as to which subject to emphasize includes automatically selecting a second respective subject to be emphasized before the second respective subject is visible in the first portion of the field-of-view.

28. The computer system of claim 26, wherein the determination as to which subject to emphasize includes:

detecting the second respective subject move out of the first portion of the field-of-view while the second respective subject is being emphasized; and in response to detecting the second respective subject move out of the first portion of the field-of-view:

in accordance with a determination that the second respective subject moves out of the second portion of the field-of-view, automatically select a different subject to be emphasized; and in accordance with a determination that the first subject remains in the second portion of the field-of-view, forgo selecting a different subject to be emphasized for at least a predetermined period of time.

29. A non-transitory computer-readable storage medium storing one or more programs configured to be executed by one or more processors of a computer system that is in communication with one or more cameras, a display generation component, and one or more input devices, the one or more programs including instructions for:

displaying, via the display generation component, a user interface that includes:

a representation of a video that includes a plurality of frames, the representation including a first subject and a second subject; and a first user interface object indicating that the first subject is being emphasized by a synthetic depth-of-field effect that alters visual information captured by the one or more cameras to emphasize the first subject in the plurality of frames relative to the second subject;

while displaying the user interface that includes the representation of the video and the first user interface object, detecting, via the one or more input devices, a gesture that corresponds to selection of the second subject in the representation of the video; and in response to detecting the gesture that corresponds to selection of the second subject in the representation of the video:

changing the synthetic depth-of-field effect to alter the visual information captured by the one or more cameras to emphasize the second subject in the plurality of frames relative to the first subject; and displaying a second user interface object indicating that the second subject is being emphasized by the changed synthetic depth-of-field effect that alters the visual information captured by the one or more cameras to emphasize the second subject in the plurality of frames relative to the first subject.

30. A method, comprising:

at a computer system that is in communication with one or more cameras, a display generation component, and one or more input devices:

displaying, via the display generation component, a user interface that includes:

a representation of a video that includes a plurality of frames, the representation including a first subject and a second subject; and a first user interface object indicating that the first subject is being emphasized by a synthetic depth-of-field effect that alters visual information captured by the one or more cameras to emphasize the first subject in the plurality of frames relative to the second subject;

while displaying the user interface that includes the representation of the video and the first user interface object, detecting, via the one or more input devices, a gesture that corresponds to selection of the second subject in the representation of the video; and in response to detecting the gesture that corresponds to selection of the second subject in the representation of the video:

changing the synthetic depth-of-field effect to alter the visual information captured by the one or more cameras to emphasize the second subject in the plurality of frames relative to the first subject; and displaying a second user interface object indicating that the second subject is being emphasized by the changed synthetic depth-of-field effect that alters the visual information captured by the one or more cameras to emphasize the second subject in the plurality of frames relative to the first subject.

31. The non-transitory computer-readable storage medium of claim 29, wherein the first user interface object and the second user interface object have a same visual appearance.

32. The non-transitory computer-readable storage medium of claim 29, the one or more programs further including instructions for:

before detecting the gesture that corresponds to selection of the second subject, displaying, via the display generation component, a third user interface object indicating that the second subject is not being emphasized.

33. The non-transitory computer-readable storage medium of claim 32, wherein the first user interface object has a different visual appearance from the third user interface object.

34. The non-transitory computer-readable storage medium of claim 29, wherein the representation of the video includes a third subject, the one or more programs further including instructions for:

before detecting the gesture that corresponds to selection of the second subject, displaying, via the display generation component, a fourth user interface object indicating that the second subject is not being emphasized and a fifth user interface object indicating that the third subject is not being emphasized.

35. The non-transitory computer-readable storage medium of claim 34, wherein the fourth user interface object and the fifth user interface object have different visual appearances.

36. The non-transitory computer-readable storage medium of claim 29, the one or more programs further including instructions for:

in response to detecting the gesture that corresponds to selection of the second subject, ceasing to display the first user interface object.

37. The non-transitory computer-readable storage medium of claim 29, the one or more programs further including instructions for:

in response to detecting the gesture that corresponds to selection of the second subject, displaying a sixth user interface object indicating that the first subject is not being emphasized.

38. The non-transitory computer-readable storage medium of claim 29, wherein the gesture that corresponds to selection of the second subject is detected while the one or more cameras are capturing the visual information.

39. The non-transitory computer-readable storage medium of claim 29, wherein the gesture that corresponds to selection of the second subject is detected during playback of the video after capture of the video has ended.

40. The non-transitory computer-readable storage medium of claim 29, wherein changing the synthetic depth-of-field effect to alter the visual information captured by the one or more cameras to emphasize the second subject in the plurality of frames relative to the first subject includes:

in accordance with a determination that the gesture that corresponds to selection of the second subject is a first type of gesture, altering the visual information captured by the one or more cameras to emphasize the second subject until first criteria are met; and in accordance with determination that the gesture that corresponds to selection of the second subject is a second type of gesture that is different from the first type of gesture, altering the visual information captured by the one or more cameras to emphasize the second subject until second criteria are met, wherein the second criteria are different from the first criteria.

41. The non-transitory computer-readable storage medium of claim 40, the one or more programs further including instructions for:

while the visual information captured by the one or more cameras is being altered to emphasize the second subject until first criteria are met, detecting a gesture of the first type of gesture that is directed to the second subject; and in response to detecting the gesture of the first type of gesture that is directed to the second subject, altering the visual information captured by the one or more cameras to emphasize the second subject until second criteria are met.

42. The non-transitory computer-readable storage medium of claim 29, wherein changing the synthetic depth-of-field effect to alter the visual information captured by the one or more cameras to emphasize the second subject in the plurality of frames relative to the first subject includes:

in accordance with determination that the gesture that corresponds to selection of the second subject is a third type of gesture, altering the visual information captured by the one or more cameras to emphasize the second subject by applying the synthetic depth-of-field effect to a fixed focal plane in the plurality of frames.

43. The non-transitory computer-readable storage medium of claim 42, the one or more programs further including instructions for:

in accordance with determination that the gesture that corresponds to selection of the second subject is the third type of gesture, displaying an indication of a distance to the fixed focal plane.

44. The non-transitory computer-readable storage medium of claim 29, the one or more programs further including instructions for:

while displaying the second user interface object and not displaying the first user interface object:

in accordance with a determination that the first subject in the plurality of frames satisfies a set of automatic selection criteria, displaying the first user interface object and ceasing to display the second user interface object.

45. The non-transitory computer-readable storage medium of claim 44, wherein:

in accordance with a determination that the gesture corresponds to selection of the second subject is a fourth type of gesture, the set of automatic selection criteria is a first set of automatic selection criteria and in accordance with a determination that the gesture corresponds to selection of the second subject is a fifth type of gesture that is different from the fourth type of gesture, the set of automatic selection criteria is a second set of automatic selection criteria that is different from the first set of automatic selection criteria.

46. The non-transitory computer-readable storage medium of claim 44, wherein:

before detecting the gesture that corresponds to selection of the second subject, the set of automatic selection criteria includes a criterion that is satisfied when a first respective subject in the representation of the video-satisfies a first selection confidence threshold; and in response to detecting the gesture that corresponds to selection of the second subject, the set of automatic selection criteria includes a criterion that is satisfied when the first respective subject in the representation of the video-satisfies a second selection confidence threshold that is higher than the first selection confidence threshold.

47. The non-transitory computer-readable storage medium of claim 29, wherein the synthetic depth-of-field effect that alters the visual information captured by the one or more cameras to emphasize the second subject in the plurality of frames relative to the first subject changes over time as the second subject moves within a field-of-view of the one or more cameras.

48. The non-transitory computer-readable storage medium of claim 29, wherein the user interface includes a video navigation user interface element, the non-transitory computer-readable storage medium further comprising:

while displaying the video navigation user interface element and in response to detecting the gesture that corresponds to selection of the second subject, displaying, in the video navigation user interface element, a user interface object indicating that a user-specified change occurred at a time in the video navigation user interface element, wherein the user interface object indicating that the user-specified change occurred includes:

in accordance with a determination that the gesture corresponds to selection of the second subject is a sixth type of gesture, a fourth visual appearance; and in accordance with a determination that the gesture corresponds to selection of the second subject is a seventh type of gesture that is different from the sixth type of gesture, a fifth visual appearance that is different from the fourth visual appearance.

49. The non-transitory computer-readable storage medium of claim 29, wherein displaying the second user interface object includes:

in accordance with a determination that the gesture corresponds to selection of the second subject is an eighth type of gesture, displaying the second user interface object with a sixth visual appearance; and in accordance with a determination that the gesture corresponds to selection of the second subject is a ninth type of gesture that is different from the eighth type of gesture, displaying the second user interface object with a seventh visual appearance that is different from the sixth visual appearance.

50. The non-transitory computer-readable storage medium of claim 29, wherein the user interface is a media capturing user interface, the one or more programs further including instructions for:

after detecting the gesture that corresponds to selection of the second subject and while displaying the user interface, detecting, via the one or more input devices, one or more gestures;

in response to detecting the one or more gestures, displaying a media editing user interface that includes:

a second representation of the video that includes a third plurality of frames, the second representation including the first subject and the second subject; and a sixth user interface object indicating that the first subject is being emphasized by a synthetic depth-of-field effect that alters the visual information captured by the one or more cameras to emphasize the first subject in the third plurality of frames relative to the second subject; and while displaying the media editing user interface, detecting, via the one or more input devices, a second gesture that corresponds to selection of the second subject in the second representation of the video; and in response to detecting the second gesture that corresponds to selection of the second subject in the second representation of the video:

changing the synthetic depth-of-field effect to alter the visual information captured by the one or more cameras to emphasize the second subject in the third plurality of frames relative to the first subject; and displaying a seventh user interface object indicating that the second subject is being emphasized by the changed synthetic depth-of-field effect that alters the visual information captured by the one or more cameras to emphasize the second subject in the third plurality of frames relative to the first subject.

51. The non-transitory computer-readable storage medium of claim 29, the one or more programs further including instructions for:

after detecting the gesture that corresponds to selection of the second subject and changing the synthetic depth-of-field effect to alter the visual information captured by the one or more cameras to emphasize the second subj ect in the plurality of frames relative to the first subject, detecting a first gesture that is directed to the representation of the video; and in response to detecting the first gesture that is directed to the representation of the video, modifying the changed synthetic depth-of-field effect to alter the visual information captured by the one or more cameras.

52. The non-transitory computer-readable storage medium of claim 29, wherein:

the user interface includes a selectable user interface object for controlling a video capture mode;

the selectable user interface object for controlling the video capture mode is displayed with a status indication that indicates that the video capture mode is in an active state; and the one or more programs further including instructions for:

while displaying the user interface that includes the representation of the video, the first user interface object, and the selectable user interface object for controlling the video capture mode is displayed with the status indication that indicates that the video capture mode is in an active state, applying the synthetic depth-of-field effect that alters the visual information captured by the one or more cameras to emphasize the first subject in the plurality of frames relative to the second subj ect;

while applying the synthetic depth-of-field effect that alters the visual information captured by the one or more cameras to emphasize the first subject in the plurality of frames relative to the second subject, detecting a gesture directed to the selectable user interface object for controlling the video capture mode; and in response to detecting the gesture directed to the selectable user interface object for controlling the video capture mode, ceasing to apply the synthetic depth-of-field effect that alters the visual information captured by the one or more cameras to emphasize the first subject in the plurality of frames relative to the second subject.

53. The non-transitory computer-readable storage medium of claim 52, wherein, before detecting the gesture directed to the selectable user interface object for controlling the video capture mode, the representation is displayed with a first amount of blur, the one or more programs further including instructions for:

in response to detecting the gesture directed to the selectable user interface object for controlling the video capture mode, displaying, via the display generation component, the representation of the video with a second amount of blur that is lower than the first amount of blur.

54. The non-transitory computer-readable storage medium of claim 29, the one or more programs further including instructions for:

in response to detecting the gesture that corresponds to selection of the second subject, configuring a focus setting of one or more cameras to focus on the second subject in the representation of the video, wherein the non-transitory computer-readable storage medium is not configured to automatically change the focus setting of the one or more cameras for at least a predetermined period of time;

while the non-transitory computer-readable storage medium is configured to focus on the second subject in the representation of the video, detecting a second gesture that is directed to the representation of the video; and in response to detecting the second gesture that is directed to the representation of the video, enabling the non-transitory computer-readable storage medium to automatically change the focus setting of the one or more cameras for at least the predetermined period of time.

55. The non-transitory computer-readable storage medium of claim 29, wherein:

the representation of the video includes a representation of a subset of content from a first portion of a field-of-view of one or more cameras, wherein:

the field-of-view of the one or more cameras extends beyond the first portion of the field-of-view to a second portion of the field-of-view of the one or more cameras that is not included in the representation; and a determination as to which subject to emphasize is based on information from the second portion of the field-of-view of the one or more cameras during the video.

56. The non-transitory computer-readable storage medium of claim 55, wherein the determination as to which subject to emphasize includes automatically selecting a second respective subject to be emphasized before the second respective subject is visible in the first portion of the field-of-view.

57. The non-transitory computer-readable storage medium of claim 55, wherein the determination as to which subject to emphasize includes:

detecting the second respective subject move out of the first portion of the field-of-view while the second respective subject is being emphasized; and in response to detecting the second respective subject move out of the first portion of the field-of-view:

in accordance with a determination that the second respective subject moves out of the second portion of the field-of-view, automatically select a different subject to be emphasized; and in accordance with a determination that the first subject remains in the second portion of the field-of-view, forgo selecting a different subject to be emphasized for at least a predetermined period of time.

58. The method of claim 30, wherein the first user interface object and the second user interface object have a same visual appearance.

59. The method of claim 30, further comprising:

before detecting the gesture that corresponds to selection of the second subject, displaying, via the display generation component, a third user interface object indicating that the second subject is not being emphasized.

60. The method of claim 59, wherein the first user interface object has a different visual appearance from the third user interface object.

61. The method of claim 30, wherein the representation of the video includes a third subject, the method further comprising:

before detecting the gesture that corresponds to selection of the second subject, displaying, via the display generation component, a fourth user interface object indicating that the second subject is not being emphasized and a fifth user interface object indicating that the third subject is not being emphasized.

62. The method of claim 61, wherein the fourth user interface object and the fifth user interface object have different visual appearances.

63. The method of claim 30, further comprising:

in response to detecting the gesture that corresponds to selection of the second subject, ceasing to display the first user interface object.

64. The method of claim 30, further comprising:

in response to detecting the gesture that corresponds to selection of the second subject, displaying a sixth user interface object indicating that the first subject is not being emphasized.

65. The method of claim 30, wherein the gesture that corresponds to selection of the second subject is detected while the one or more cameras are capturing the visual information.

66. The method of claim 30, wherein the gesture that corresponds to selection of the second subject is detected during playback of the video after capture of the video has ended.

67. The method of claim 30, wherein changing the synthetic depth-of-field effect to alter the visual information captured by the one or more cameras to emphasize the second subject in the plurality of frames relative to the first subject includes:

in accordance with a determination that the gesture that corresponds to selection of the second subject is a first type of gesture, altering the visual information captured by the one or more cameras to emphasize the second subject until first criteria are met; and in accordance with determination that the gesture that corresponds to selection of the second subject is a second type of gesture that is different from the first type of gesture, altering the visual information captured by the one or more cameras to emphasize the second subject until second criteria are met, wherein the second criteria are different from the first criteria.

68. The method of claim 67, further comprising:

while the visual information captured by the one or more cameras is being altered to emphasize the second subject until first criteria are met, detecting a gesture of the first type of gesture that is directed to the second subject; and in response to detecting the gesture of the first type of gesture that is directed to the second subject, altering the visual information captured by the one or more cameras to emphasize the second subject until second criteria are met.

69. The method of claim 30, wherein changing the synthetic depth-of-field effect to alter the visual information captured by the one or more cameras to emphasize the second subject in the plurality of frames relative to the first subject includes:

in accordance with determination that the gesture that corresponds to selection of the second subject is a third type of gesture, altering the visual information captured by the one or more cameras to emphasize the second subj ect by applying the synthetic depth-of-field effect to a fixed focal plane in the plurality of frames.

70. The method of claim 69, further comprising:

in accordance with determination that the gesture that corresponds to selection of the second subject is the third type of gesture, displaying an indication of a distance to the fixed focal plane.

71. The method of claim 30, further comprising:

while displaying the second user interface object and not displaying the first user interface object:

in accordance with a determination that the first subject in the plurality of frames satisfies a set of automatic selection criteria, displaying the first user interface object and ceasing to display the second user interface object.

72. The method of claim 71, wherein:

in accordance with a determination that the gesture corresponds to selection of the second subject is a fourth type of gesture, the set of automatic selection criteria is a first set of automatic selection criteria and in accordance with a determination that the gesture corresponds to selection of the second subject is a fifth type of gesture that is different from the fourth type of gesture, the set of automatic selection criteria is a second set of automatic selection criteria that is different from the first set of automatic selection criteria.

73. The method of claim 71, wherein:

before detecting the gesture that corresponds to selection of the second subject, the set of automatic selection criteria includes a criterion that is satisfied when a first respective subject in the representation of the video-satisfies a first selection confidence threshold; and in response to detecting the gesture that corresponds to selection of the second subject, the set of automatic selection criteria includes a criterion that is satisfied when the first respective subject in the representation of the video-satisfies a second selection confidence threshold that is higher than the first selection confidence threshold.

74. The method of claim 30, wherein the synthetic depth-of-field effect that alters the visual information captured by the one or more cameras to emphasize the second subject in the plurality of frames relative to the first subject changes over time as the second subject moves within a field-of-view of the one or more cameras.

75. The method of claim 30, wherein the user interface includes a video navigation user interface element, the method further comprising:

while displaying the video navigation user interface element and in response to detecting the gesture that corresponds to selection of the second subject, displaying, in the video navigation user interface element, a user interface object indicating that a user-specified change occurred at a time in the video navigation user interface element, wherein the user interface object indicating that the user-specified change occurred includes:

in accordance with a determination that the gesture corresponds to selection of the second subject is a sixth type of gesture, a fourth visual appearance; and in accordance with a determination that the gesture corresponds to selection of the second subject is a seventh type of gesture that is different from the sixth type of gesture, a fifth visual appearance that is different from the fourth visual appearance.

76. The method of claim 30, wherein displaying the second user interface object includes:

in accordance with a determination that the gesture corresponds to selection of the second subject is an eighth type of gesture, displaying the second user interface object with a sixth visual appearance; and in accordance with a determination that the gesture corresponds to selection of the second subject is a ninth type of gesture that is different from the eighth type of gesture, displaying the second user interface object with a seventh visual appearance that is different from the sixth visual appearance.

77. The method of claim 30, wherein the user interface is a media capturing user interface, the method further comprising:

after detecting the gesture that corresponds to selection of the second subject and while displaying the user interface, detecting, via the one or more input devices, one or more gestures;

in response to detecting the one or more gestures, displaying a media editing user interface that includes:

a second representation of the video that includes a third plurality of frames, the second representation including the first subject and the second subject; and a sixth user interface object indicating that the first subject is being emphasized by a synthetic depth-of-field effect that alters the visual information captured by the one or more cameras to emphasize the first subject in the third plurality of frames relative to the second subject; and while displaying the media editing user interface, detecting, via the one or more input devices, a second gesture that corresponds to selection of the second subject in the second representation of the video; and in response to detecting the second gesture that corresponds to selection of the second subject in the second representation of the video:

changing the synthetic depth-of-field effect to alter the visual information captured by the one or more cameras to emphasize the second subject in the third plurality of frames relative to the first subject; and displaying a seventh user interface object indicating that the second subject is being emphasized by the changed synthetic depth-of-field effect that alters the visual information captured by the one or more cameras to emphasize the second subject in the third plurality of frames relative to the first subject.

78. The method of claim 30, further comprising:

after detecting the gesture that corresponds to selection of the second subject and changing the synthetic depth-of-field effect to alter the visual information captured by the one or more cameras to emphasize the second subj ect in the plurality of frames relative to the first subject, detecting a first gesture that is directed to the representation of the video; and in response to detecting the first gesture that is directed to the representation of the video, modifying the changed synthetic depth-of-field effect to alter the visual information captured by the one or more cameras.

79. The method of claim 30, wherein:

the user interface includes a selectable user interface object for controlling a video capture mode;

the selectable user interface object for controlling the video capture mode is displayed with a status indication that indicates that the video capture mode is in an active state; and the method further comprising:

while displaying the user interface that includes the representation of the video, the first user interface object, and the selectable user interface object for controlling the video capture mode is displayed with the status indication that indicates that the video capture mode is in an active state, applying the synthetic depth-of-field effect that alters the visual information captured by the one or more cameras to emphasize the first subject in the plurality of frames relative to the second subj ect;

while applying the synthetic depth-of-field effect that alters the visual information captured by the one or more cameras to emphasize the first subject in the plurality of frames relative to the second subject, detecting a gesture directed to the selectable user interface object for controlling the video capture mode; and in response to detecting the gesture directed to the selectable user interface object for controlling the video capture mode, ceasing to apply the synthetic depth-of-field effect that alters the visual information captured by the one or more cameras to emphasize the first subject in the plurality of frames relative to the second subject.

80. The method of claim 79, wherein, before detecting the gesture directed to the selectable user interface object for controlling the video capture mode, the representation is displayed with a first amount of blur, the method further comprising:

in response to detecting the gesture directed to the selectable user interface object for controlling the video capture mode, displaying, via the display generation component, the representation of the video with a second amount of blur that is lower than the first amount of blur.

81. The method of claim 30, further comprising:

in response to detecting the gesture that corresponds to selection of the second subject, configuring a focus setting of one or more cameras to focus on the second subject in the representation of the video, wherein the method is not configured to automatically change the focus setting of the one or more cameras for at least a predetermined period of time;

while the method is configured to focus on the second subject in the representation of the video, detecting a second gesture that is directed to the representation of the video; and in response to detecting the second gesture that is directed to the representation of the video, enabling the method to automatically change the focus setting of the one or more cameras for at least the predetermined period of time.

82. The method of claim 30, wherein:

the representation of the video includes a representation of a subset of content from a first portion of a field-of-view of one or more cameras, wherein:

the field-of-view of the one or more cameras extends beyond the first portion of the field-of-view to a second portion of the field-of-view of the one or more cameras that is not included in the representation; and a determination as to which subject to emphasize is based on information from the second portion of the field-of-view of the one or more cameras during the video.

83. The method of claim 82, wherein the determination as to which subject to emphasize includes automatically selecting a second respective subject to be emphasized before the second respective subject is visible in the first portion of the field-of-view.

84. The method of claim 82, wherein the determination as to which subject to emphasize includes:

detecting the second respective subject move out of the first portion of the field-of-view while the second respective subject is being emphasized; and in response to detecting the second respective subject move out of the first portion of the field-of-view:

in accordance with a determination that the second respective subject moves out of the second portion of the field-of-view, automatically select a different subject to be emphasized; and in accordance with a determination that the first subject remains in the second portion of the field-of-view, forgo selecting a different subject to be emphasized for at least a predetermined period of time.

* * * * *